US010311383B2

(12) United States Patent
Holmes et al.

(10) Patent No.: US 10,311,383 B2
(45) Date of Patent: Jun. 4, 2019

(54) DEVICE, METHOD, AND GRAPHICAL USER INTERFACE FOR MEETING SPACE MANAGEMENT AND INTERACTION

(71) Applicant: Apple Inc., Cupertino, CA (US)

(72) Inventors: Betsy J. Holmes, San Carlos, CA (US); Duncan Hugh Keefe, San Jose, CA (US); Cameron J. Wolff, Sunnyvale, CA (US); William J. Symons, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/616,356

(22) Filed: Jun. 7, 2017

(65) Prior Publication Data

US 2017/0357917 A1 Dec. 14, 2017

Related U.S. Application Data

(60) Provisional application No. 62/348,897, filed on Jun. 11, 2016, provisional application No. 62/367,534, (Continued)

(51) Int. Cl.
*G06Q 10/00* (2012.01)
*G06Q 10/02* (2012.01)
(Continued)

(52) U.S. Cl.
CPC ............... *G06Q 10/02* (2013.01); *G06F 9/54* (2013.01); *G06Q 10/06314* (2013.01);
(Continued)

(58) Field of Classification Search
CPC .... G01M 11/0292; G06T 7/13; G06T 7/0085; G06T 2207/30168
(Continued)

(56) References Cited

U.S. PATENT DOCUMENTS

2009/0119604 A1 5/2009 Simard et al.
2012/0269334 A1* 10/2012 Goguen ................ H04M 3/565 379/202.01
(Continued)

OTHER PUBLICATIONS

International Search Report and Written Opinion for PCT/US2017/036350 dated Nov. 23, 2017.

*Primary Examiner* — Ping Y Hsieh
(74) *Attorney, Agent, or Firm* — Fernando & Partners, LLP; Jacob A. Smith

(57) ABSTRACT

An electronic device, with a display and one or more input devices: displays a first user interface element provided to create a calendar event, the first user interface element includes a location input element provided to receive user inputs in order to add a location for the calendar event; detects a first input that corresponds to the location input element; in response to detecting the first input, displays in association with the location input element one or more locations for the calendar event, where at least one of the one or more locations corresponds to a virtual conference; detects a second input that corresponds to the virtual conference; and, in response to detecting the second input: generates call-in information and a link for the virtual conference; and associates the call-in information and the link with the calendar event.

26 Claims, 196 Drawing Sheets

Related U.S. Application Data filed on Jul. 27, 2016, provisional application No. 62/492,253, filed on Apr. 30, 2014.

(51) Int. Cl.

| | |
|---|---|
| ***G06Q 10/06*** | (2012.01) |
| ***G06Q 10/10*** | (2012.01) |
| ***G06F 9/54*** | (2006.01) |
| ***G07C 1/10*** | (2006.01) |
| *G06F 3/041* | (2006.01) |

(52) U.S. Cl.

CPC ....... *G06Q 10/109* (2013.01); *G06Q 10/1093* (2013.01); *G06Q 10/1095* (2013.01); *G07C 1/10* (2013.01); *G06F 3/0416* (2013.01)

(58) Field of Classification Search

USPC .......................................................... 382/266

See application file for complete search history.

(56) References Cited

U.S. PATENT DOCUMENTS

| | | | | |
|---|---|---|---|---|
| 2014/0236876 A1 | 8/2014 | Hapse et al. | | |
| 2016/0006824 A1* | 1/2016 | Wu | ........................ | H04W 4/21 709/204 |

* cited by examiner

Figure 7R
504-A-1
753a
706
Meeting Manifest Interface
752a
752b
The meeting for Admiral Appleseed has expired.
You are now signed out.
7148
752c
752d
753b
754a
754b

Figure 19B
504-A-1
Ganymede
Wed 14:01
1906
1910
(123) 456-8888
:33
mute
keypad
speaker
1922A
1922B
1922C
add call
facetime
contacts
1922D
1922E
1922F
1922G
1924
minimize
1930
1928
1926

Figure 21C:
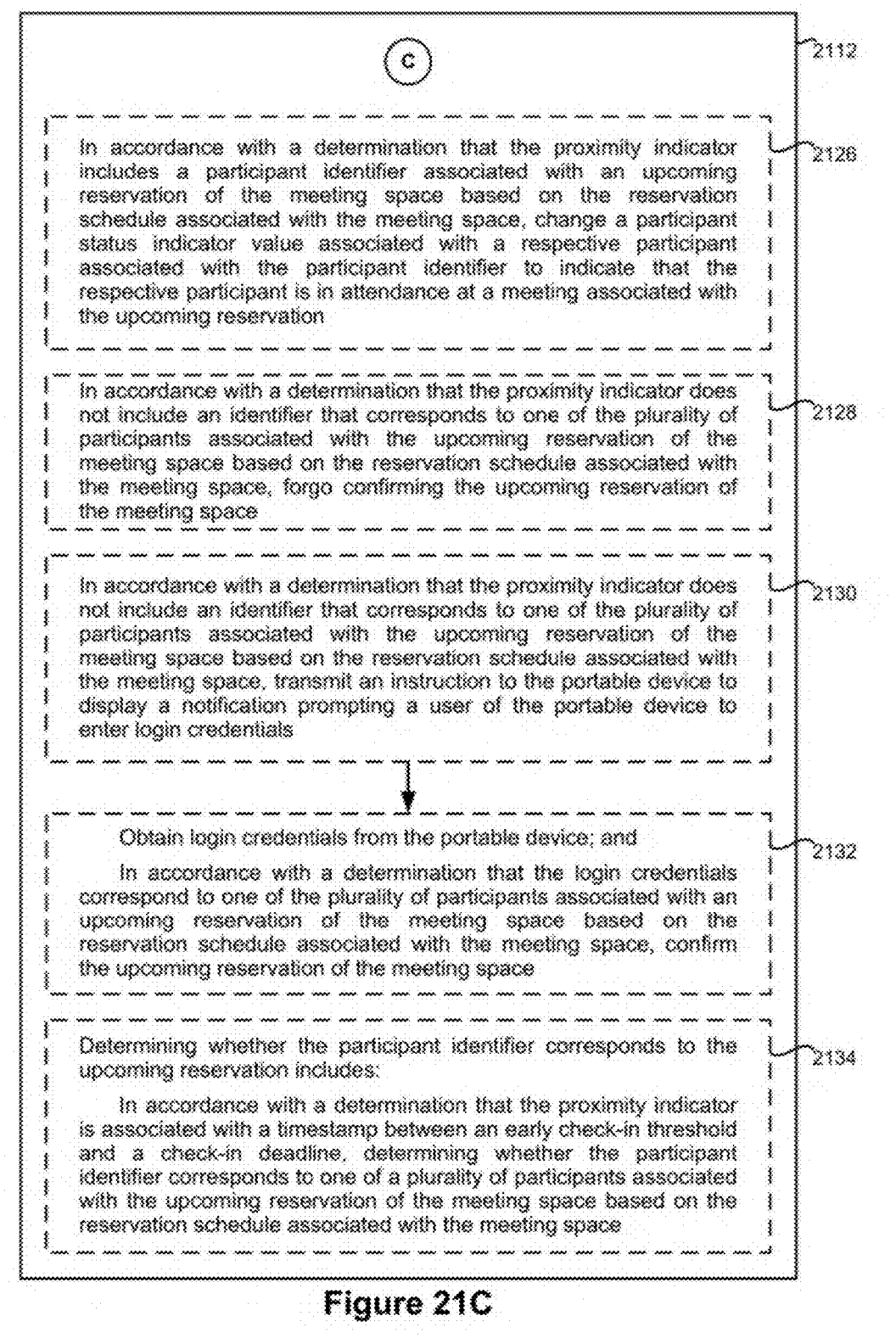

2112

C

2126 In accordance with a determination that the proximity indicator includes a participant identifier associated with an upcoming reservation of the meeting space based on the reservation schedule associated with the meeting space, change a participant status indicator value associated with a respective participant associated with the participant identifier to indicate that the respective participant is in attendance at a meeting associated with the upcoming reservation 2128 In accordance with a determination that the proximity indicator does not include an identifier that corresponds to one of the plurality of participants associated with the upcoming reservation of the meeting space based on the reservation schedule associated with the meeting space, forgo confirming the upcoming reservation of the meeting space 2130 In accordance with a determination that the proximity indicator does not include an identifier that corresponds to one of the plurality of participants associated with the upcoming reservation of the meeting space based on the reservation schedule associated with the meeting space, transmit an instruction to the portable device to display a notification prompting a user of the portable device to enter login credentials 2132 Obtain login credentials from the portable device; and In accordance with a determination that the login credentials correspond to one of the plurality of participants associated with an upcoming reservation of the meeting space based on the reservation schedule associated with the meeting space, confirm the upcoming reservation of the meeting space 2134 Determining whether the participant identifier corresponds to the upcoming reservation includes:

In accordance with a determination that the proximity indicator is associated with a timestamp between an early check-in threshold and a check-in deadline, determining whether the participant identifier corresponds to one of a plurality of participants associated with the upcoming reservation of the meeting space based on the reservation schedule associated with the meeting space

Figure 22A:
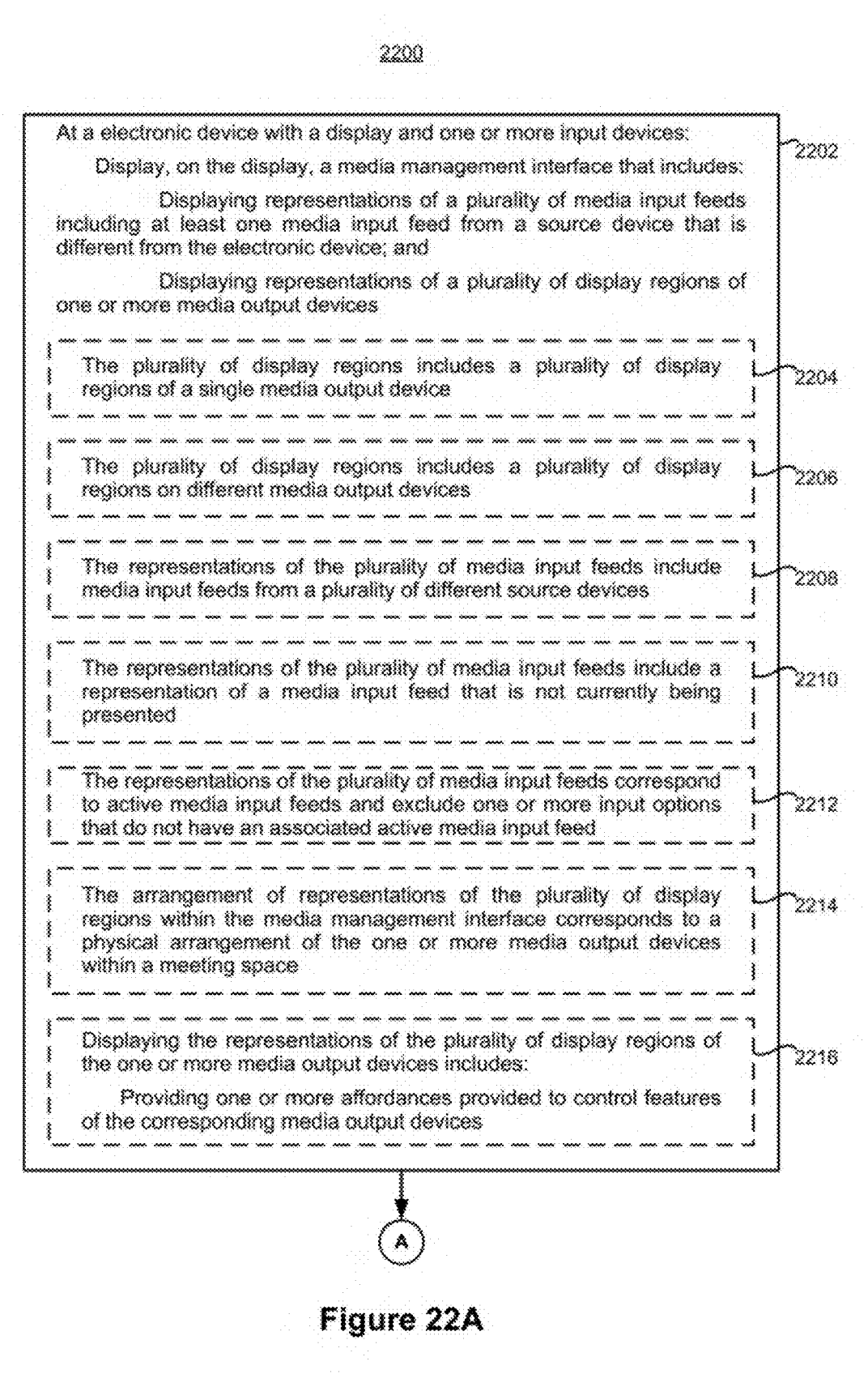

At a electronic device with a display and one or more input devices: 2202

Display, on the display, a media management interface that includes:

Displaying representations of a plurality of media input feeds including at least one media input feed from a source device that is different from the electronic device; and Displaying representations of a plurality of display regions of one or more media output devices The plurality of display regions includes a plurality of display regions of a single media output device 2204

The plurality of display regions includes a plurality of display regions on different media output devices 2206

The representations of the plurality of media input feeds include media input feeds from a plurality of different source devices 2208

The representations of the plurality of media input feeds include a representation of a media input feed that is not currently being presented 2210

The representations of the plurality of media input feeds correspond to active media input feeds and exclude one or more input options that do not have an associated active media input feed 2212

The arrangement of representations of the plurality of display regions within the media management interface corresponds to a physical arrangement of the one or more media output devices within a meeting space 2214

Displaying the representations of the plurality of display regions of the one or more media output devices includes: 2216

Providing one or more affordances provided to control features of the corresponding media output devices

Figure 30D:
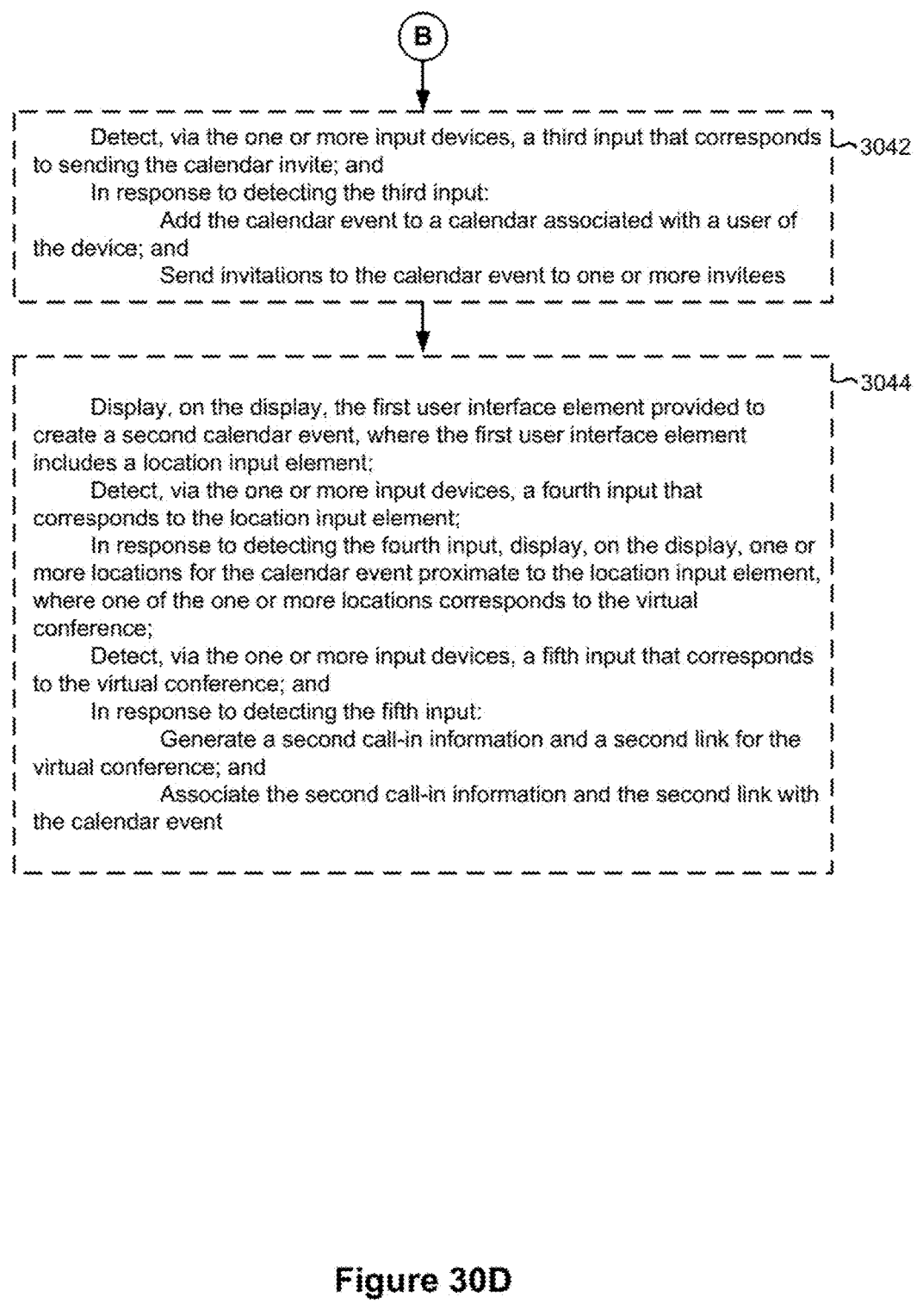

Detect, via the one or more input devices, a third input that corresponds to sending the calendar invite; and In response to detecting the third input:

Add the calendar event to a calendar associated with a user of the device; and

Send invitations to the calendar event to one or more invitees

3044

Display, on the display, the first user interface element provided to create a second calendar event, where the first user interface element includes a location input element;

Detect, via the one or more input devices, a fourth input that corresponds to the location input element;

In response to detecting the fourth input, display, on the display, one or more locations for the calendar event proximate to the location input element, where one of the one or more locations corresponds to the virtual conference;

Detect, via the one or more input devices, a fifth input that corresponds to the virtual conference; and In response to detecting the fifth input:

Generate a second call-in information and a second link for the virtual conference; and Associate the second call-in information and the second link with the calendar event

Figure 31A:
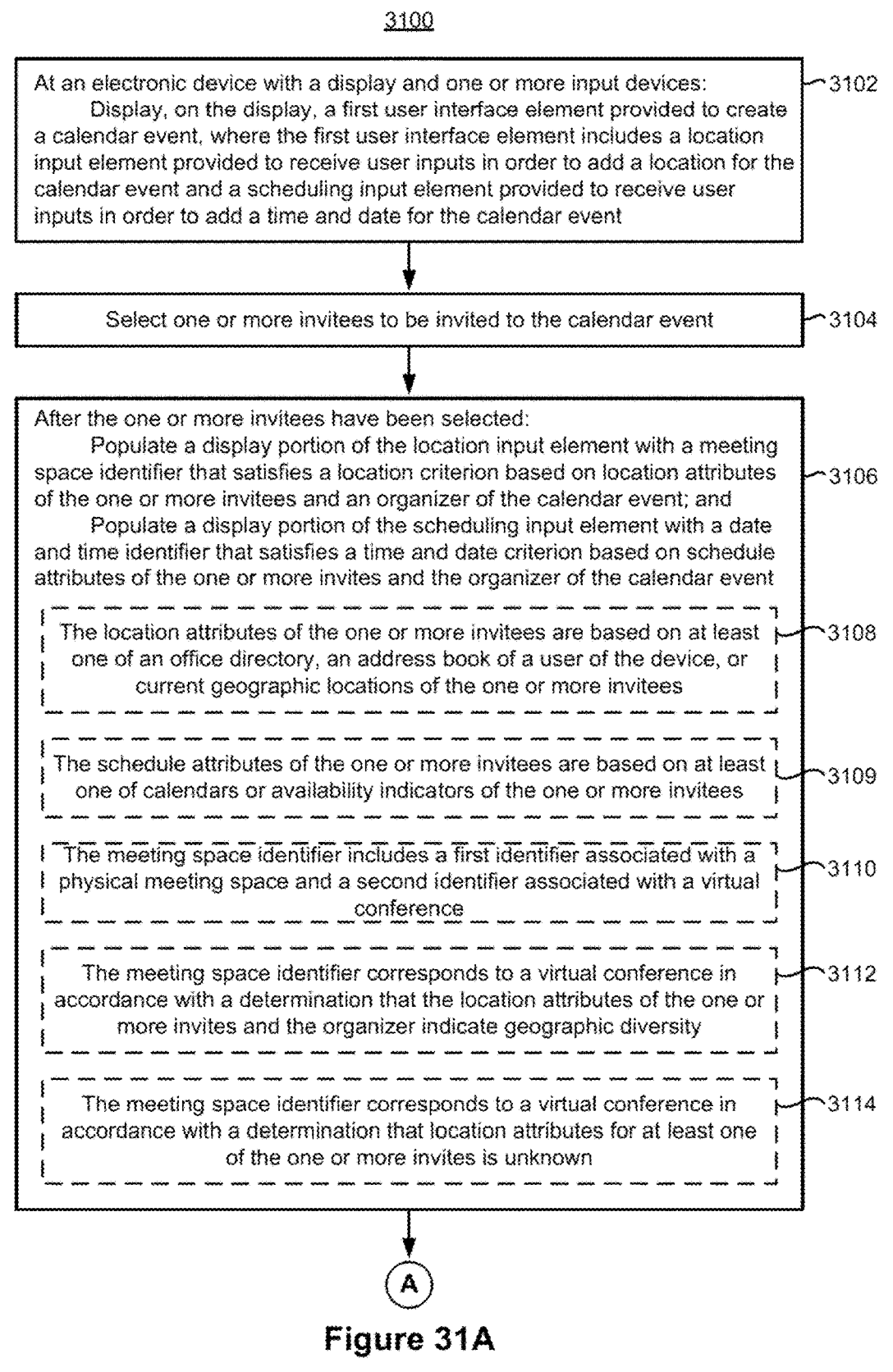

At an electronic device with a display and one or more input devices:
Display, on the display, a first user interface element provided to create a calendar event, where the first user interface element includes a location input element provided to receive user inputs in order to add a location for the calendar event and a scheduling input element provided to receive user inputs in order to add a time and date for the calendar event — 3102

Select one or more invitees to be invited to the calendar event — 3104

After the one or more invitees have been selected:
Populate a display portion of the location input element with a meeting space identifier that satisfies a location criterion based on location attributes of the one or more invitees and an organizer of the calendar event; and
Populate a display portion of the scheduling input element with a date and time identifier that satisfies a time and date criterion based on schedule attributes of the one or more invites and the organizer of the calendar event — 3106

The location attributes of the one or more invitees are based on at least one of an office directory, an address book of a user of the device, or current geographic locations of the one or more invitees — 3108

The schedule attributes of the one or more invitees are based on at least one of calendars or availability indicators of the one or more invitees — 3109

The meeting space identifier includes a first identifier associated with a physical meeting space and a second identifier associated with a virtual conference — 3110

The meeting space identifier corresponds to a virtual conference in accordance with a determination that the location attributes of the one or more invites and the organizer indicate geographic diversity — 3112

The meeting space identifier corresponds to a virtual conference in accordance with a determination that location attributes for at least one of the one or more invites is unknown — 3114

Figure 32A:
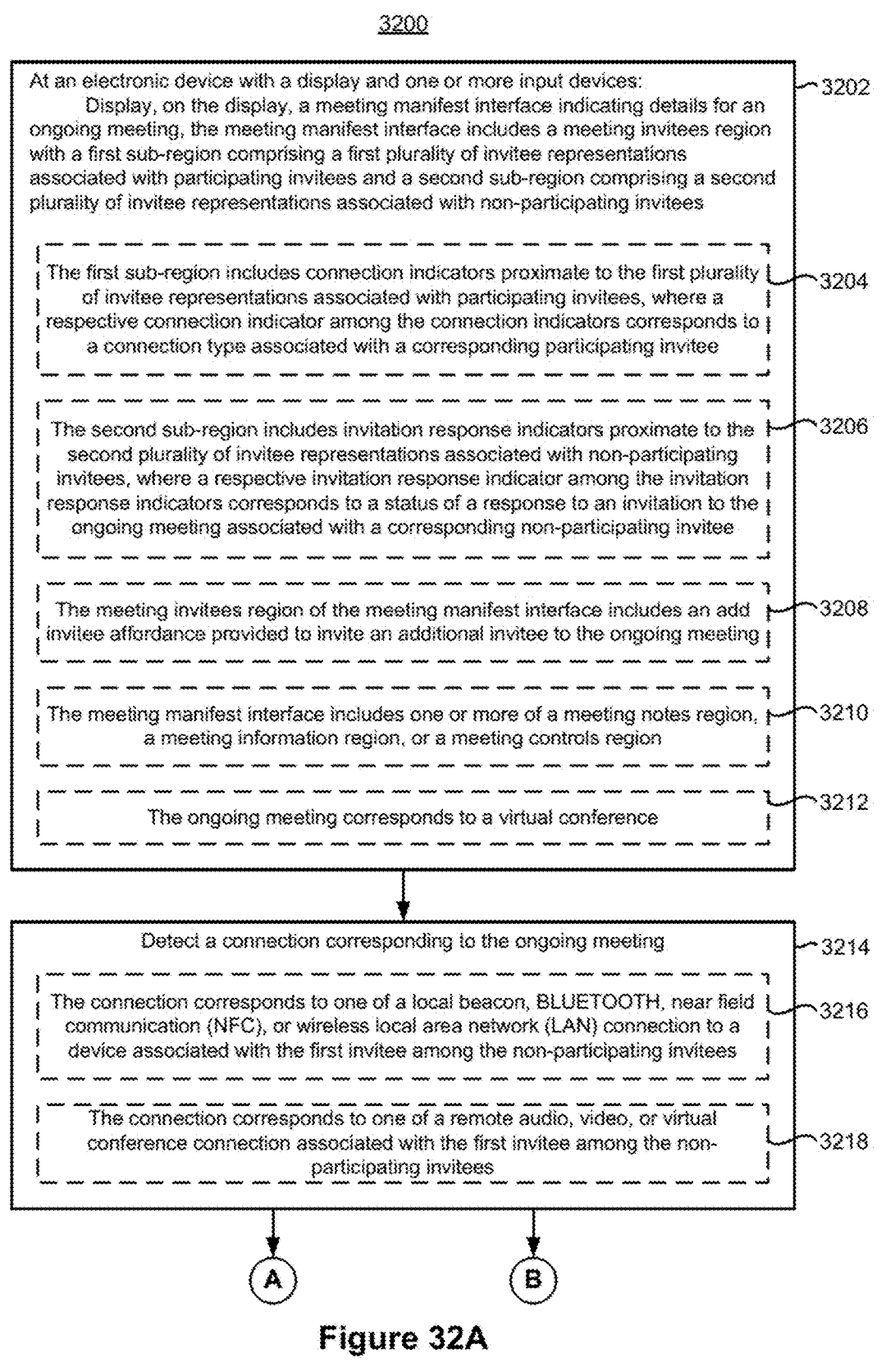

3202: At an electronic device with a display and one or more input devices:
Display, on the display, a meeting manifest interface indicating details for an ongoing meeting, the meeting manifest interface includes a meeting invitees region with a first sub-region comprising a first plurality of invitee representations associated with participating invitees and a second sub-region comprising a second plurality of invitee representations associated with non-participating invitees 3204: The first sub-region includes connection indicators proximate to the first plurality of invitee representations associated with participating invitees, where a respective connection indicator among the connection indicators corresponds to a connection type associated with a corresponding participating invitee 3206: The second sub-region includes invitation response indicators proximate to the second plurality of invitee representations associated with non-participating invitees, where a respective invitation response indicator among the invitation response indicators corresponds to a status of a response to an invitation to the ongoing meeting associated with a corresponding non-participating invitee 3208: The meeting invitees region of the meeting manifest interface includes an add invitee affordance provided to invite an additional invitee to the ongoing meeting 3210: The meeting manifest interface includes one or more of a meeting notes region, a meeting information region, or a meeting controls region 3212: The ongoing meeting corresponds to a virtual conference

↓

3214: Detect a connection corresponding to the ongoing meeting

3216: The connection corresponds to one of a local beacon, BLUETOOTH, near field communication (NFC), or wireless local area network (LAN) connection to a device associated with the first invitee among the non-participating invitees 3218: The connection corresponds to one of a remote audio, video, or virtual conference connection associated with the first invitee among the non-participating invitees

Figure 33B:
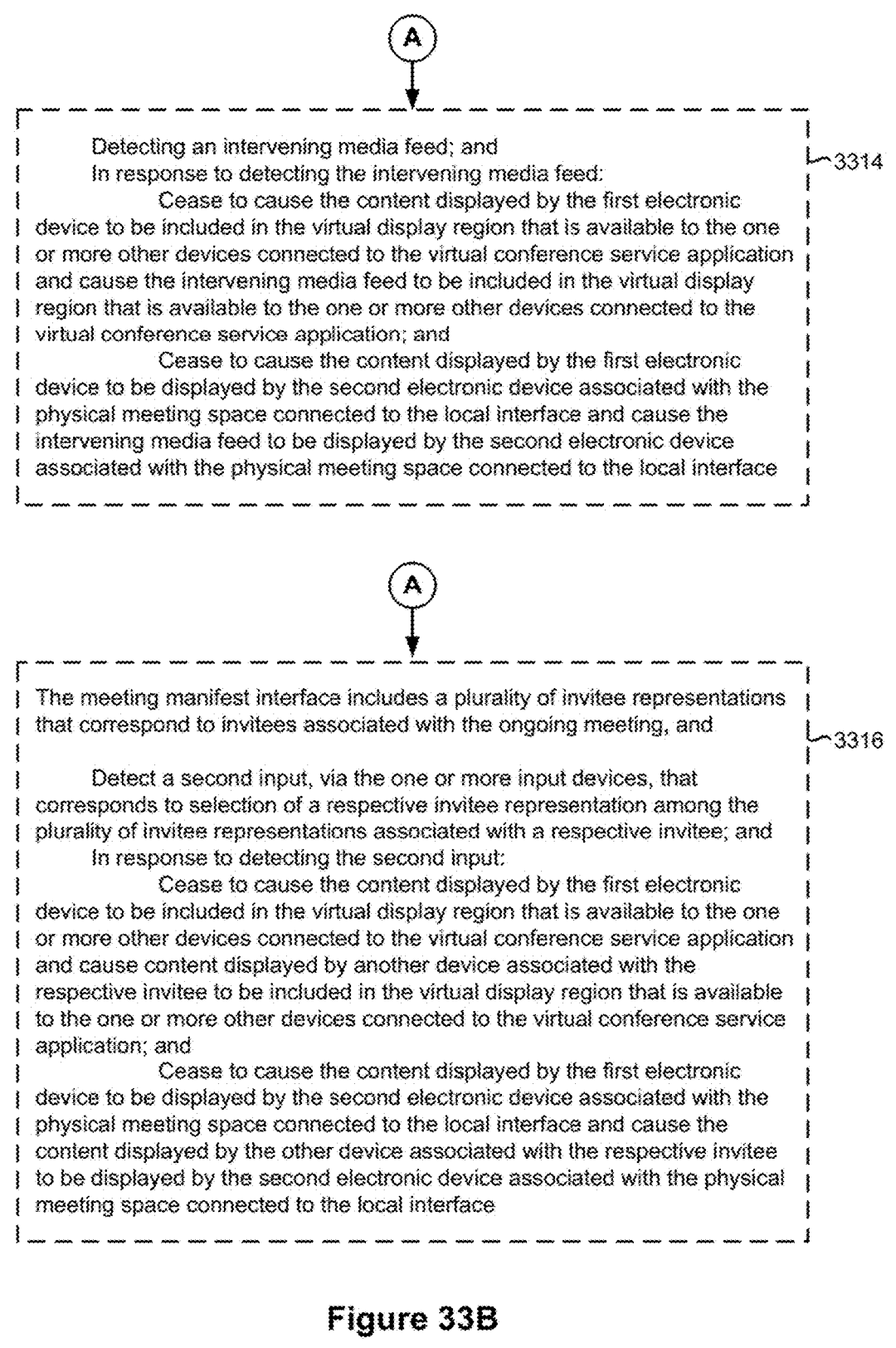

Detecting an intervening media feed; and
In response to detecting the intervening media feed:
Cease to cause the content displayed by the first electronic device to be included in the virtual display region that is available to the one or more other devices connected to the virtual conference service application and cause the intervening media feed to be included in the virtual display region that is available to the one or more other devices connected to the virtual conference service application; and
Cease to cause the content displayed by the first electronic device to be displayed by the second electronic device associated with the physical meeting space connected to the local interface and cause the intervening media feed to be displayed by the second electronic device associated with the physical meeting space connected to the local interface

3314

A

The meeting manifest interface includes a plurality of invitee representations that correspond to invitees associated with the ongoing meeting, and Detect a second input, via the one or more input devices, that corresponds to selection of a respective invitee representation among the plurality of invitee representations associated with a respective invitee; and
In response to detecting the second input:
Cease to cause the content displayed by the first electronic device to be included in the virtual display region that is available to the one or more other devices connected to the virtual conference service application and cause content displayed by another device associated with the respective invitee to be included in the virtual display region that is available to the one or more other devices connected to the virtual conference service application; and
Cease to cause the content displayed by the first electronic device to be displayed by the second electronic device associated with the physical meeting space connected to the local interface and cause the content displayed by the other device associated with the respective invitee to be displayed by the second electronic device associated with the physical meeting space connected to the local interface

Figure 33C:
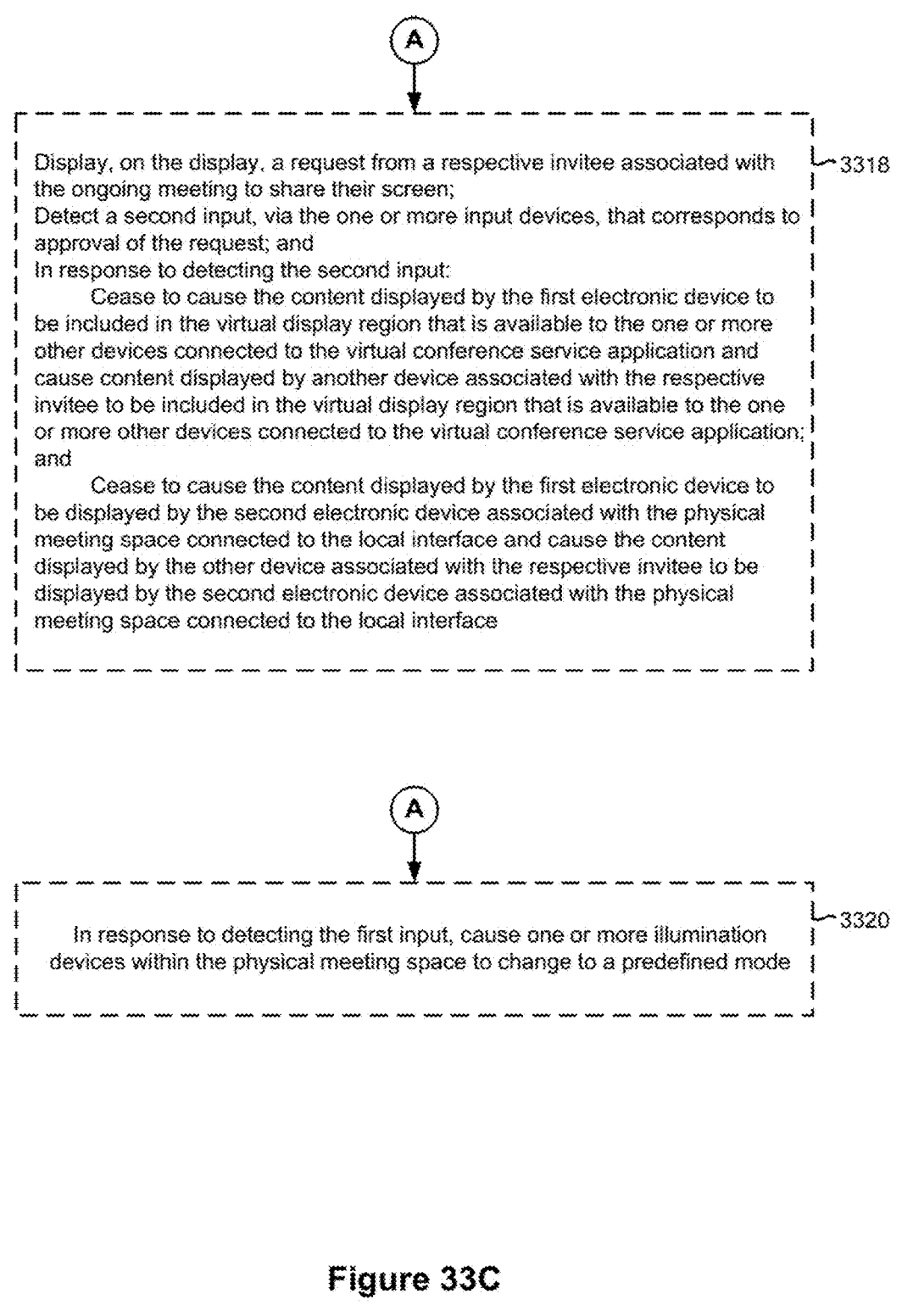

Display, on the display, a request from a respective invitee associated with the ongoing meeting to share their screen;
Detect a second input, via the one or more input devices, that corresponds to approval of the request; and
In response to detecting the second input:
Cease to cause the content displayed by the first electronic device to be included in the virtual display region that is available to the one or more other devices connected to the virtual conference service application and cause content displayed by another device associated with the respective invitee to be included in the virtual display region that is available to the one or more other devices connected to the virtual conference service application; and
Cease to cause the content displayed by the first electronic device to be displayed by the second electronic device associated with the physical meeting space connected to the local interface and cause the content displayed by the other device associated with the respective invitee to be displayed by the second electronic device associated with the physical meeting space connected to the local interface

3318

A

In response to detecting the first input, cause one or more illumination devices within the physical meeting space to change to a predefined mode

DEVICE, METHOD, AND GRAPHICAL USER INTERFACE FOR MEETING SPACE MANAGEMENT AND INTERACTION

RELATED APPLICATION(S)

This application claims priority to U.S. Provisional App. No. 62/348,897, filed Jun. 11, 2016, U.S. Provisional App. No. 62/367,534, filed Jul. 27, 2016, and U.S. Provisional App. No. 62/492,253, filed Apr. 30, 2017, which are hereby incorporated by reference in their entirety. This application is related to U.S. application Ser. No. 15/273,647, filed Sep. 22, 2016, which is hereby incorporated by reference in its entirety.

TECHNICAL FIELD

This relates generally to electronic devices with touch-sensitive surfaces, including but not limited to electronic devices with touch-sensitive surfaces that manage and interact with meeting spaces.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for managing and interacting with meeting spaces. Such methods and interfaces optionally complement or replace conventional methods for managing and interacting with meeting spaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device, associated with a meeting space, with one or more processors, non-transitory memory, a display, and an input device. The method includes: displaying, on the display, a meeting space status interface that includes a status indicator indicating a current reservation status for the meeting space and a claiming affordance provided to claim reservations of the meeting space; and, while displaying the meeting space status interface, detecting a change in conditions at the meeting space. In response to detecting the change in conditions at the meeting space, and in accordance with a determination, based on the change in conditions at the meeting space, that the one or more claiming criteria are satisfied, the method also includes enabling the claiming affordance. In response to detecting the change in conditions at the meeting space, and in accordance with a determination, based on the change in conditions at the meeting space, that the one or more claiming criteria are not satisfied, the method further includes disabling the claiming affordance.

In accordance with some embodiments, a method is performed at a device, associated with a meeting space, with one or more processors, non-transitory memory, a display, and an input device. The method includes: displaying, on the display, a reporting interface with a plurality of affordances provided to report problems associated with corresponding features of the meeting space; detecting a sequence of one or more user inputs, via the input device, that corresponds to selecting one or more affordances from among the plurality of affordances; and, in response to the sequence of one or more user inputs selecting the one or more affordances, initiating a process for generating a service request associated with one or more features of the meeting space that corresponds to the selected one or more affordances.

In accordance with some embodiments, a method is performed at a device, associated with a first meeting space, with one or more processors, non-transitory memory, a display, and an input device. The method includes: displaying, on the display, a meeting space discovery interface with a plurality affordances corresponding to a plurality of available meeting spaces different from the first meeting space; detecting a first user input, via the input device, that corresponds to selecting a respective affordance corresponding to a second meeting space from among the plurality affordances displayed within the meeting space discovery interface; and, in response to the first user input selecting the respective affordance, providing instructions for navigating from the first meeting space to the second meeting space.

In accordance with some embodiments, a method is performed at a first electronic device with a display and one or more input devices. The method includes: displaying, on the display of the first electronic device, a user interface that includes information about a schedule of meeting in a meeting space; while displaying the user interface, determining that a change in reservation information for a respective meeting from the schedule of meetings in the meeting space has occurred based on input from a second electronic device that is associated with the meeting space; and, in response to determining that the change in reservation information for the respective meeting has occurred, updating the user interface displayed on the display of the first electronic device to show the change in the reservation information.

In accordance with some embodiments, a method is performed at a first electronic device with a display and one or more input devices. The method includes: obtaining a reservation schedule associated with a meeting space that has a plurality of scheduled meetings including a next meeting that has not yet been confirmed; and obtaining a proximity indicator indicating that a portable device is within a predefined distance of the meeting space. In response to obtaining the proximity indicator, and in accordance with a determination that the proximity indicator includes a participant identifier associated with an upcoming reservation of the meeting space based on the reservation schedule associated with the meeting space, the method also includes confirming the upcoming reservation of the meeting space.

In accordance with some embodiments, a method is performed at an electronic device with a display and one or more input devices. The method includes displaying, on the display, a media management interface that includes: displaying representations of a plurality of media input feeds including at least one media input feed from a source device that is different from the electronic device; and displaying representations of a plurality of display regions of one or more media output devices. While displaying the media management interface, the method also includes detecting a first user input, via the one or more input devices, that corresponds to movement of a first representation of a first media input feed to a representation of a first display region of the plurality of display regions. In response to detecting the first user input, the method further includes coordinating display of the first media input feed on the first display region In accordance with some embodiments, a method is performed at an electronic device with one or more processors and non-transitory memory. The method includes: facilitating presentation of an electronic conference that corresponds to an ongoing reservation within a meeting space, where presenting the electronic conference that corresponds to the ongoing reservation within the meeting space includes presenting electronic conference data with equipment in the meeting space; and while facilitating presentation of the electronic conference, obtaining a request to continue the meeting outside of the meeting space. In response to obtaining the request to continue the meeting outside of the meeting space, the method also includes displaying, on the display, one or more options for transferring the electronic conference. The method further includes: detecting, via the one or more input devices, selection of a first option from the one or more options for transferring the electronic conference; and, in response to detecting selection of the first option: ceasing to present the electronic conference via the equipment in the meeting space; and initiating a process for transferring the electronic conference to equipment that is not associated with the meeting space.

In accordance with some embodiments, a method is performed at an electronic device with a display and one or more input devices. The method includes displaying, on the display, a first user interface element provided to create a calendar event, where the first user interface element includes a location input element provided to receive user inputs in order to add a location for the calendar event. The method also includes: detecting, via the one or more input devices, a first input that corresponds to the location input element; and, in response to detecting the first input, displaying in association with the location input element, on the display, one or more locations for the calendar event, where at least one of the one or more locations corresponds to a virtual conference. The method further includes: detecting, via the one or more input devices, a second input that corresponds to the virtual conference; and, in response to detecting the second input: generating call-in information and a link for the virtual conference; and associating the call-in information and the link with the calendar event.

In accordance with some embodiments, a method is performed at an electronic device with a display and one or more input devices. The method includes displaying, on the display, a first user interface element provided to create a calendar event, where the first user interface element includes a location input element provided to receive user inputs in order to add a location for the calendar event and a scheduling input element provided to receive user inputs in order to add a time and date for the calendar event. The method also includes: selecting one or more invitees to be invited to the calendar event; and, after the one or more invitees have been selected: populating a display portion of the location input element with a meeting space identifier that satisfies a location criterion based on location attributes of the one or more invitees and an organizer of the calendar event; and populating a display portion of the scheduling input element with a date and time identifier that satisfies a time and date criterion based on schedule attributes of the one or more invites and the organizer of the calendar event.

In accordance with some embodiments, a method is performed at an electronic device with a display and one or more input devices. The method includes displaying, on the display, a meeting manifest interface indicating details for an ongoing meeting, the meeting manifest interface includes a meeting invitees region with a first sub-region comprising a first plurality of invitee representations associated with participating invitees and a second sub-region comprising a second plurality of invitee representations associated with non-participating invitees. The method also includes: detecting a connection corresponding to the ongoing meeting; and, in accordance with a determination that the connection corresponds to a first invitee among the non-participating invitees, updating the meeting manifest interface by ceasing to display a first representation of a first invitee in the second plurality of invitee representations in the second sub-region and displaying the first representation of the first invitee in the first plurality of invitee representations in the first sub-region associated with participating invitees.

In accordance with some embodiments, a method is performed at a first electronic device with a display and one or more input devices. The method includes displaying, on the display of the first electronic device, a meeting manifest interface indicating details for an ongoing meeting associated with a virtual conference service application and a physical meeting space, the meeting manifest interface includes a screen sharing affordance provided to share content displayed on the display of the first electronic device to one or more other devices connected to the virtual conference service application and to a second electronic device associated with the physical meeting space connected to a local interface different from the virtual conference service application. The method also includes: detecting a first input, via the one or more input devices, that corresponds to selection of the screen sharing affordance displayed by the first electronic device; and, in response to detecting the first input: causing content displayed by the first electronic device to be included in a virtual display region that is available to the one or more other devices connected to the virtual conference service application; and causing the content displayed by the first electronic device to be displayed by the second electronic device associated with the physical meeting space connected to the local interface.

In accordance with some embodiments, an electronic device, associated with a meeting space, includes a display unit configured to display a user interface, one or more input units configured to receive user inputs, and a processing unit coupled with the display unit and the one or more input units. The processing unit is configured: enable display of, on the display unit, a meeting space status interface that includes a status indicator indicating a current reservation status for the meeting space and a claiming affordance provided to claim reservations of the meeting space; and, while displaying the meeting space status interface, detect a change in conditions at the meeting space. In response to detecting the change in conditions at the meeting space, and in accordance with a determination, based on the change in conditions at the meeting space, that the one or more claiming criteria are satisfied, the processing unit is further configured to enable the claiming affordance. In response to detecting the change in conditions at the meeting space, and in accordance with a determination, based on the change in conditions at the meeting space, that the one or more claiming criteria are not satisfied, the processing unit is further configured to disable the claiming affordance.

In accordance with some embodiments, an electronic device, associated with a meeting space, includes a display unit configured to display a user interface, one or more input units configured to receive user inputs, and a processing unit coupled with the display unit and the one or more input units. The processing unit is configured to: enable display of, on the display unit, a reporting interface with a plurality of affordances provided to report problems associated with corresponding features of the meeting space; detecting a sequence of one or more user inputs, via the one or more input units, that corresponds to selecting one or more affordances from among the plurality of affordances; and, in response to the sequence of one or more user inputs selecting the one or more affordances, initiate a process for generating a service request associated with one or more features of the meeting space that corresponds to the selected one or more affordances.

In accordance with some embodiments, an electronic device includes a display unit configured to display a user interface, one or more input units configured to receive user inputs, and a processing unit coupled with the display unit and the one or more input units. The processing unit is configured to: enable display of, on the display unit, a meeting space discovery interface with a plurality affordances corresponding to a plurality of available meeting spaces different from the first meeting space; detect a first user input, via the one or more input units, that corresponds to selecting a respective affordance corresponding to a second meeting space from among the plurality affordances displayed within the meeting space discovery interface; and, in response to the first user input selecting the respective affordance, provide instructions for navigating from the first meeting space to the second meeting space.

In accordance with some embodiments, an electronic device includes a display unit configured to display a user interface, one or more input units configured to receive user inputs, and a processing unit coupled with the display unit and the one or more input units. The processing unit is configured to: enable display of, on the display unit of the electronic device, a user interface that includes information about a schedule of meeting in a meeting space; while displaying the user interface, determine that a change in reservation information for a respective meeting from the schedule of meetings in the meeting space has occurred based on input from another electronic device that is associated with the meeting space; and, in response to determining that the change in reservation information for the respective meeting has occurred, update the user interface displayed on the display unit of the electronic device to show the change in the reservation information.

In accordance with some embodiments, an electronic device includes an optional display unit configured to display a user interface, one or more optional input units configured to receive user inputs, and a processing unit coupled with the display unit and the one or more input units. The processing unit is configured to: obtain a reservation schedule associated with a meeting space that has a plurality of scheduled meetings including a next meeting that has not yet been confirmed; and obtain a proximity indicator indicating that a portable device is within a predefined distance of the meeting space. In response to obtaining the proximity indicator, and in accordance with a determination that the proximity indicator includes a participant identifier associated with an upcoming reservation of the meeting space based on the reservation schedule associated with the meeting space, the processing unit is further configured to confirm the upcoming reservation of the meeting space.

In accordance with some embodiments, an electronic device includes a display unit configured to display a user interface, one or more input units configured to receive user inputs, and a processing unit coupled with the display unit and the one or more input units. The processing unit is configured to: enable display of, on the display unit, a media management interface that includes: displaying representations of a plurality of media input feeds including at least one media input feed from a source device that is different from the electronic device; and displaying representations of a plurality of display regions of one or more media output devices. While displaying the media management interface, the processing unit is further configured to detect a first user input, via the one or more input units, that corresponds to movement of a first representation of a first media input feed to a representation of a first display region of the plurality of display regions. In response to detecting the first user input, the processing unit is further configured to coordinate display of the first media input feed on the first display region In accordance with some embodiments, an electronic device includes a display unit configured to display a user interface, one or more input units configured to receive user inputs, and a processing unit coupled with the display unit and the one or more input units. The processing unit is configured to: facilitate presentation of an electronic conference that corresponds to an ongoing reservation within a meeting space, where presenting the electronic conference that corresponds to the ongoing reservation within the meeting space includes presenting electronic conference data with equipment in the meeting space; and while facilitating presentation of the electronic conference, obtain a request to continue the meeting outside of the meeting space. In response to obtaining the request to continue the meeting outside of the meeting space, the processing unit is further configured to enable display of, on the display unit, one or more options for transferring the electronic conference. The processing unit is further configured to: detect, via the one or more input units, selection of a first option from the one or more options for transferring the electronic conference; and, in response to detecting selection of the first option: cease to present the electronic conference via the equipment in the meeting space; and initiate a process for transferring the electronic conference to equipment that is not associated with the meeting space.

In accordance with some embodiments, an electronic device includes a display, an input device, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and an input device, cause the device to perform or cause performance of the operations of any of the methods described herein. In accordance with some embodiments, a graphical user interface on an electronic device with a display, an input device, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, an input device; and means for performing or causing performance of the operations of any of the methods described herein. In accordance with some embodiments, an information processing apparatus, for use in an electronic device with a display and an input device, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for managing and interacting with meeting spaces, thereby increasing the effectiveness, efficiency, and user satisfaction with such devices. Such methods and interfaces may complement or replace conventional methods for managing and interacting with meeting spaces.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 21A-21D illustrate a flow diagram of a method of confirming a reservation of a meeting space in accordance with some embodiments.

FIGS. 22A-22C illustrate a flow diagram of a method of managing media input/output (I/O) for a meeting space in accordance with some embodiments.

FIGS. 30A-30D illustrate a flow diagram of a method of creating a calendar event associated with a virtual conference in accordance with some embodiments.

FIGS. 31A-31C illustrate a flow diagram of a method of populating scheduling and/or location portions of a new calendar event based on invitees in accordance with some embodiments.

FIGS. 32A-32C illustrate a flow diagram of a method of managing the attendance of meeting invitees in accordance with some embodiments.

FIGS. 33A-33C illustrate a flow diagram of a method of screen sharing via a remote virtual conference service application and also via a local interface in accordance with some embodiments.

DESCRIPTION OF EMBODIMENTS

At corporate campuses, meeting/conference rooms are a valuable commodity. Even with the existence of a robust scheduling system, typical no-show rates range from 20 to 30%. Thus, it is beneficial to make meeting spaces available in such no-show situations by enforcing room reservation policies and etiquette. In some implementations, a first device for reservation claiming (e.g., checking into reservations and taking over available spaces) is located outside of the meeting space adjacent to the entrance. In some embodiments, a second device located inside of the meeting space is synchronized with the first device (e.g., a meeting organizer can check into a meeting with either device) and also capable of interfacing with a user account and/or equipment within the meeting space (e.g., environmental controls, projector, smart TV, teleconferencing equipment, etc.). In some embodiments, the first device indicates the status of the meeting space (and optionally allows the schedule to be displayed), and the second device is used to claim the meeting space (e.g., check into an existing reservation, or commandeer an available meeting space) and control the meeting space. In some embodiments, both the first and second devices indicate the status of the meeting space and can be used to claim reservations. In some embodiments, a single device provides the functionalities of the first and second devices.

In some embodiments, an action detected by the first device that changes reservation information causes the second device (and potentially also the first device) to update its user interface. In some embodiments, a proximity indicator (e.g., broadcast by a device associated with the meeting space or a portable device of a user) that includes identification information (e.g., a participant ID and a location ID) is used to perform a confirmation process to determine whether to confirm (e.g., passively) an upcoming reservation. In some embodiments, a media management interface including representations of media input feeds and representations of display regions of output devices within a meeting space enables a user to coordinate the presentation of media input feeds on the output devices from a unified interface. In some embodiments, while facilitating an electronic conference for a meeting within a meeting space, the device displays options for continuing the electronic conference outside of the current meeting space by transferring the electronic conference to equipment associated with another available meeting space or a phone of at least one of the participants of the meeting.

Figure 9A:
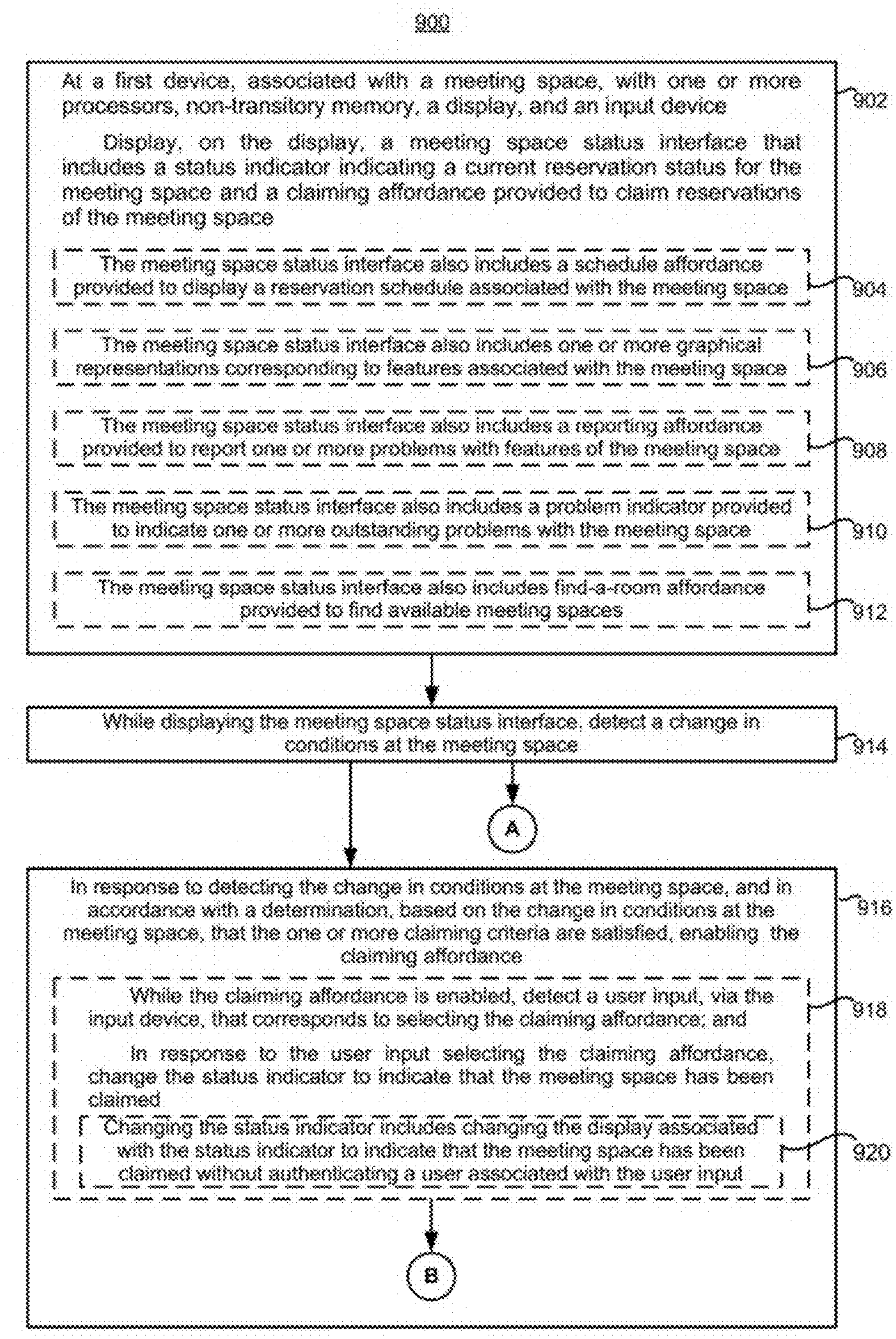
FIGS. 9A-9B illustrate a flow diagram of a method of claiming meeting spaces in accordance with some embodiments.
Figure 9B:
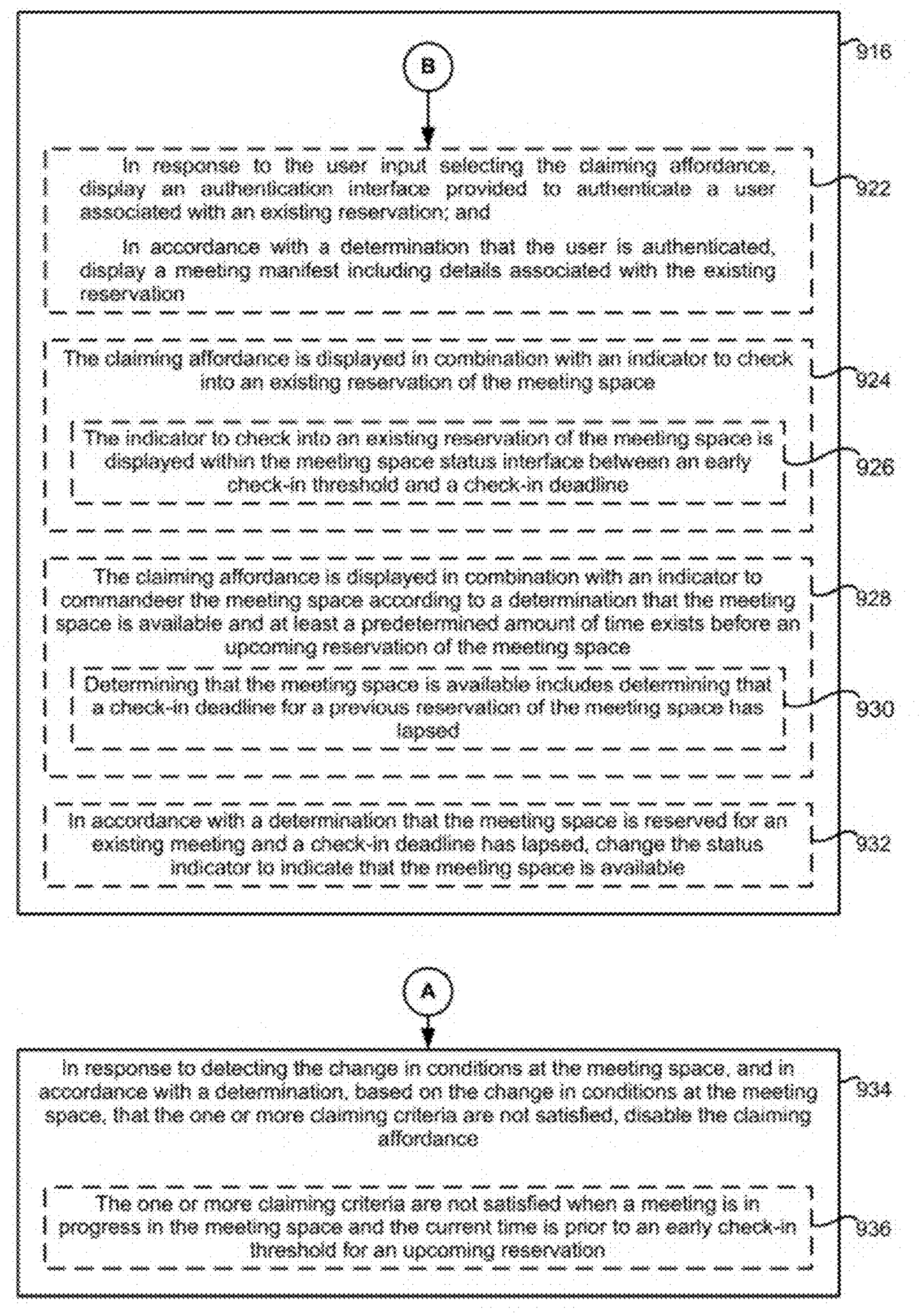
Figure 10A:
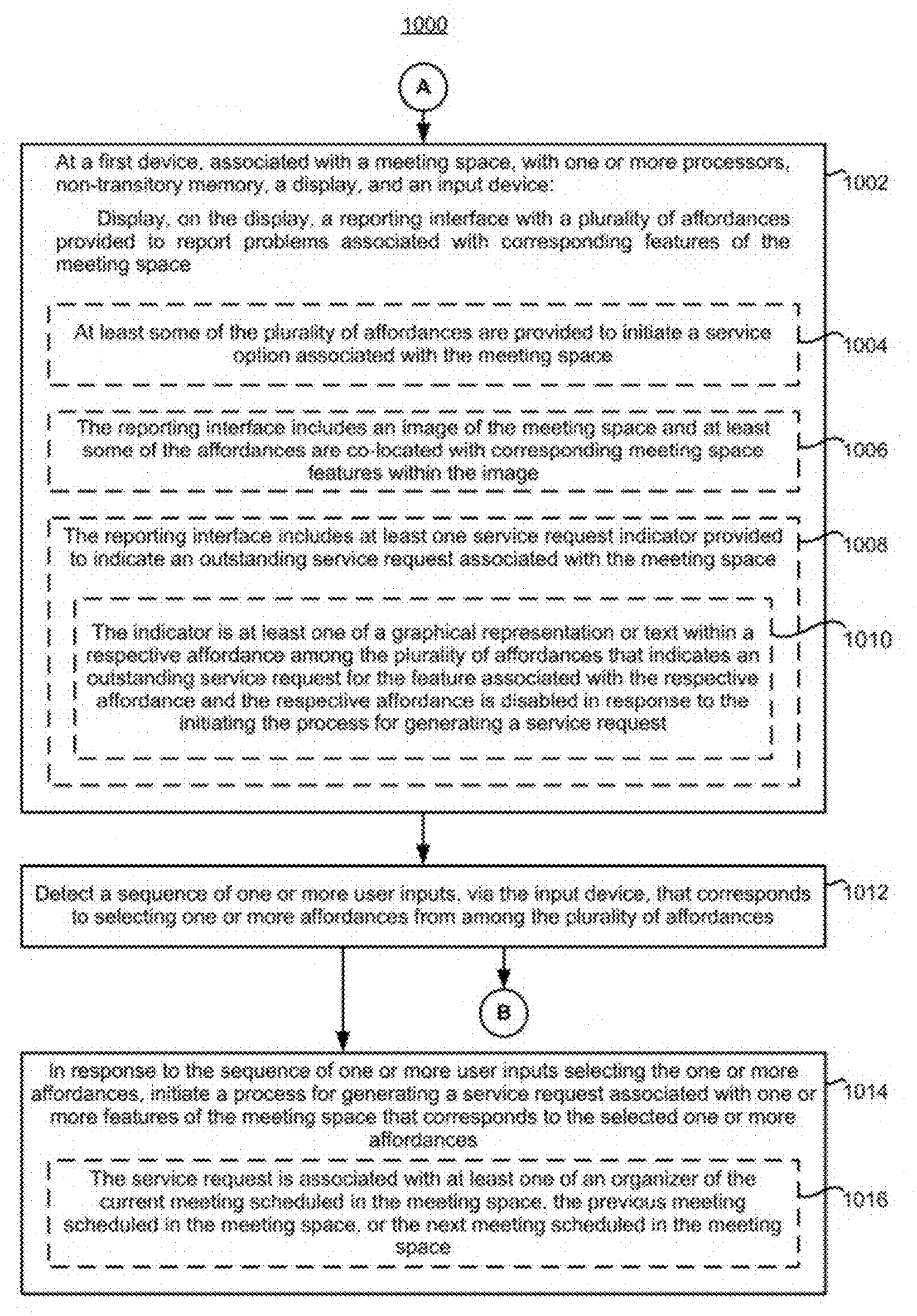
FIGS. 10A-10B illustrate a flow diagram of a method of reporting problems with a meeting space in accordance with some embodiments.
Figure 10B:
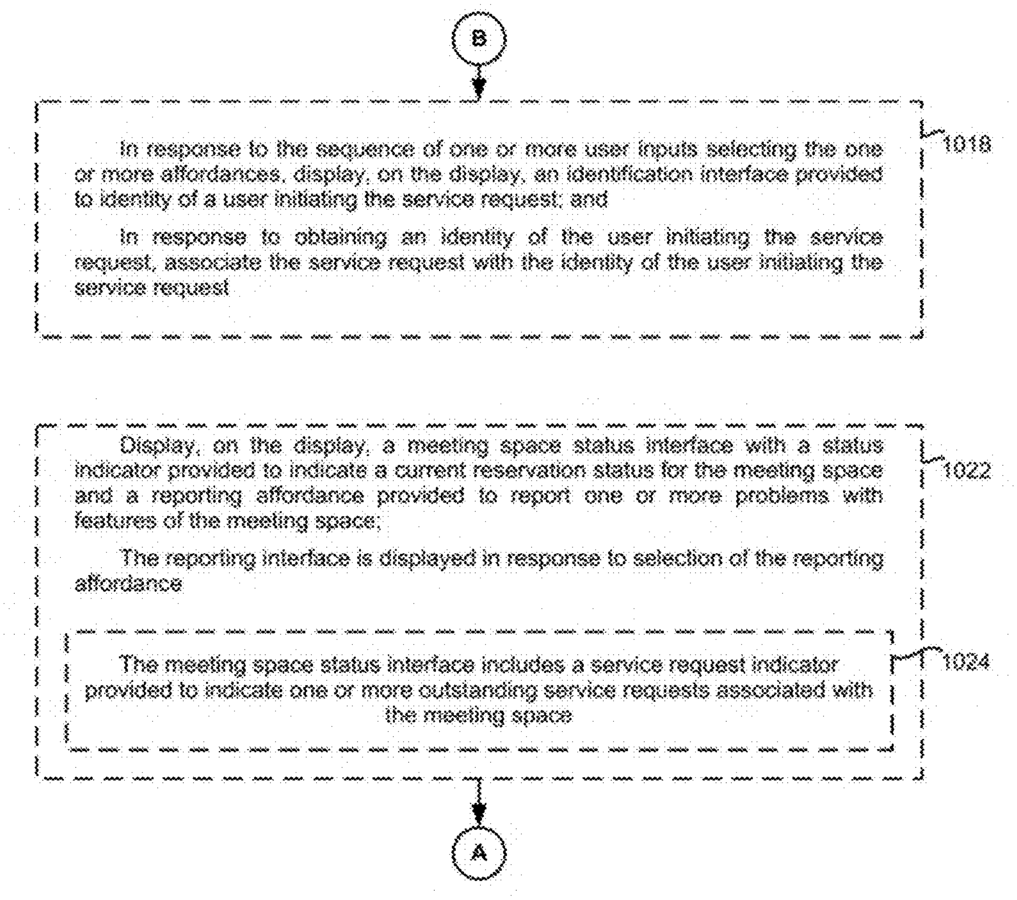
Figure 11A:
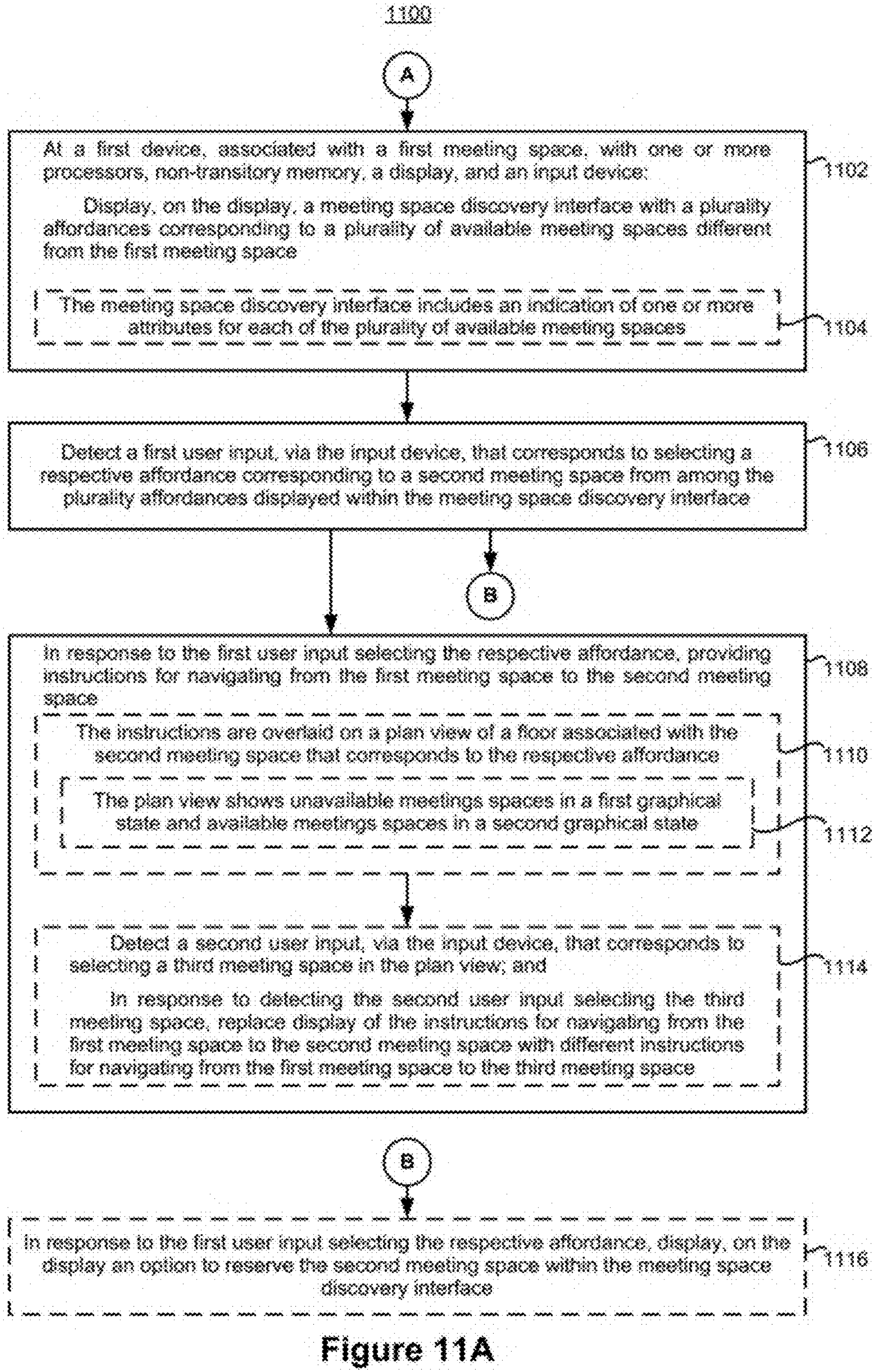
FIGS. 11A-11C illustrate a flow diagram of a method of finding available meeting spaces in accordance with some embodiments.
Figure 11B:
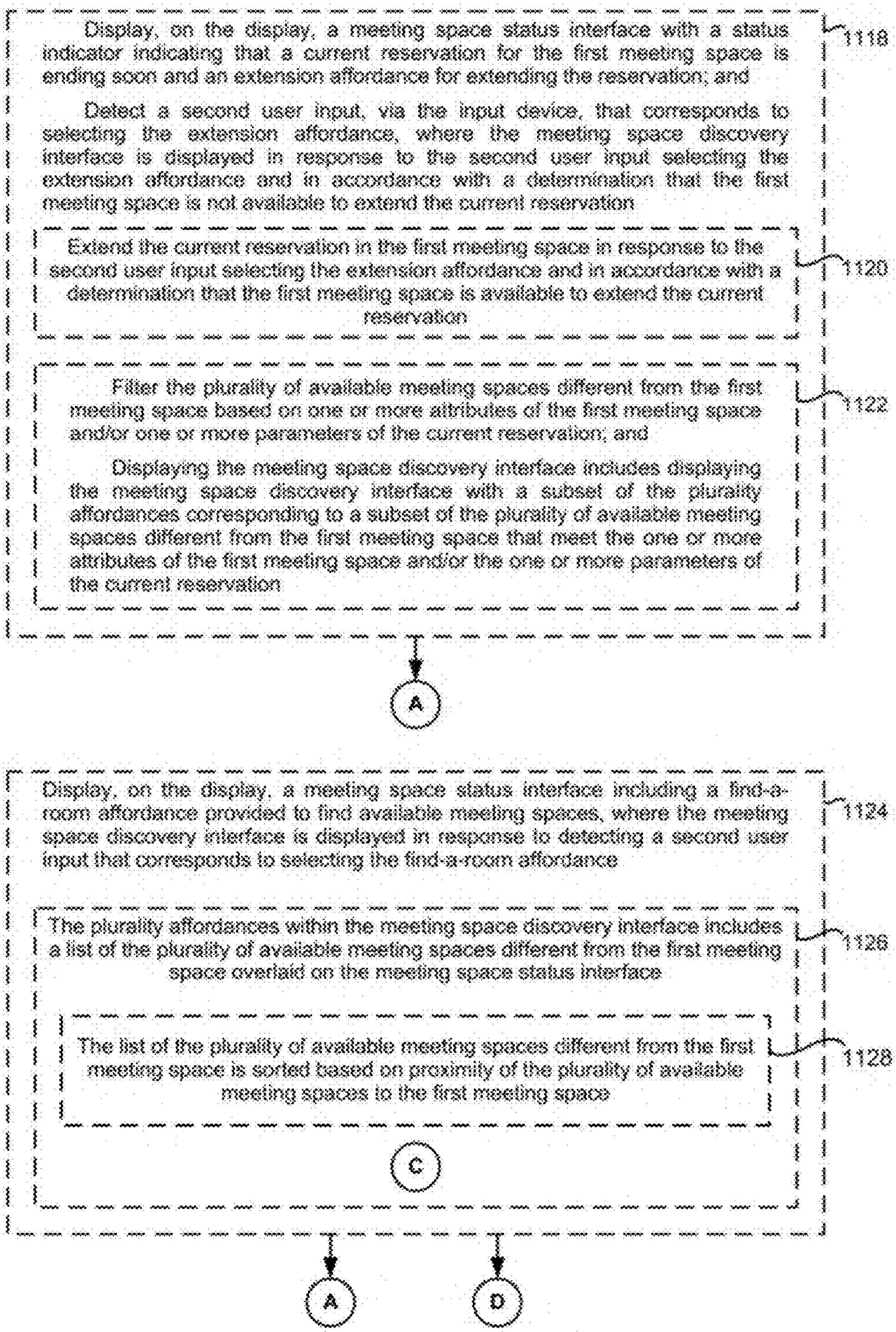
Figure 11C:
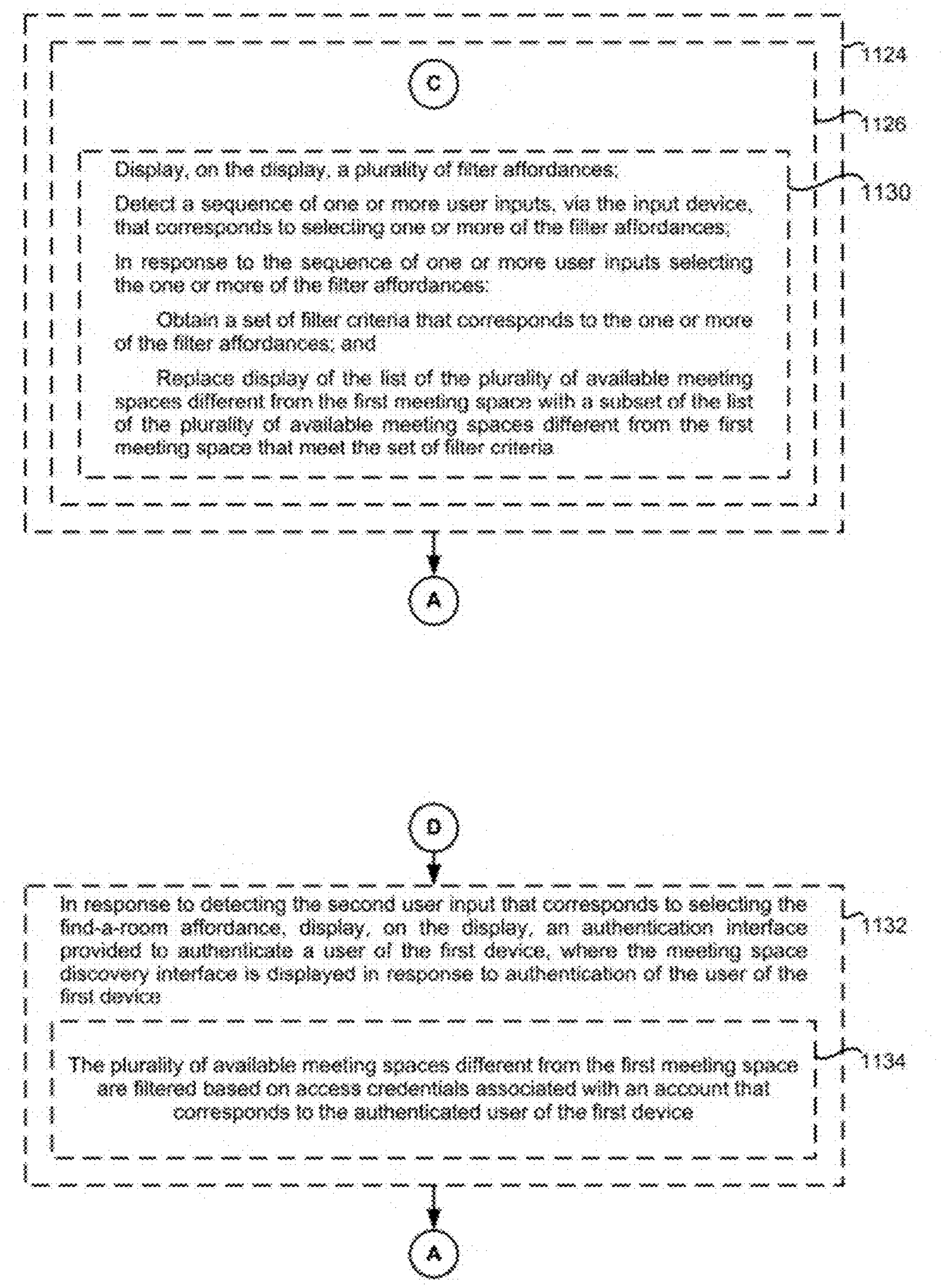

Below, FIGS. 1A-1B, 2-3, and 4A-4B provide a description of example devices. FIGS. 5A-5B illustrate an example usage environment. FIGS. 9A-9B illustrate a process for claiming meeting spaces. FIGS. 10A-10B illustrate a process for reporting problems with a meeting space. FIGS. 11A-11C illustrate a process for finding available meeting spaces. FIGS. 6A-6W and 7A-7Z describe example user interfaces for managing and interacting with meeting spaces as performed by a device such as the devices described in FIGS. 12-14. The user interfaces in FIGS. 6A-6W and 7A-7Z are used to illustrate the processes in FIGS. 9A-9B, 10A-10B, and 11A-11C.

Figure 15A:
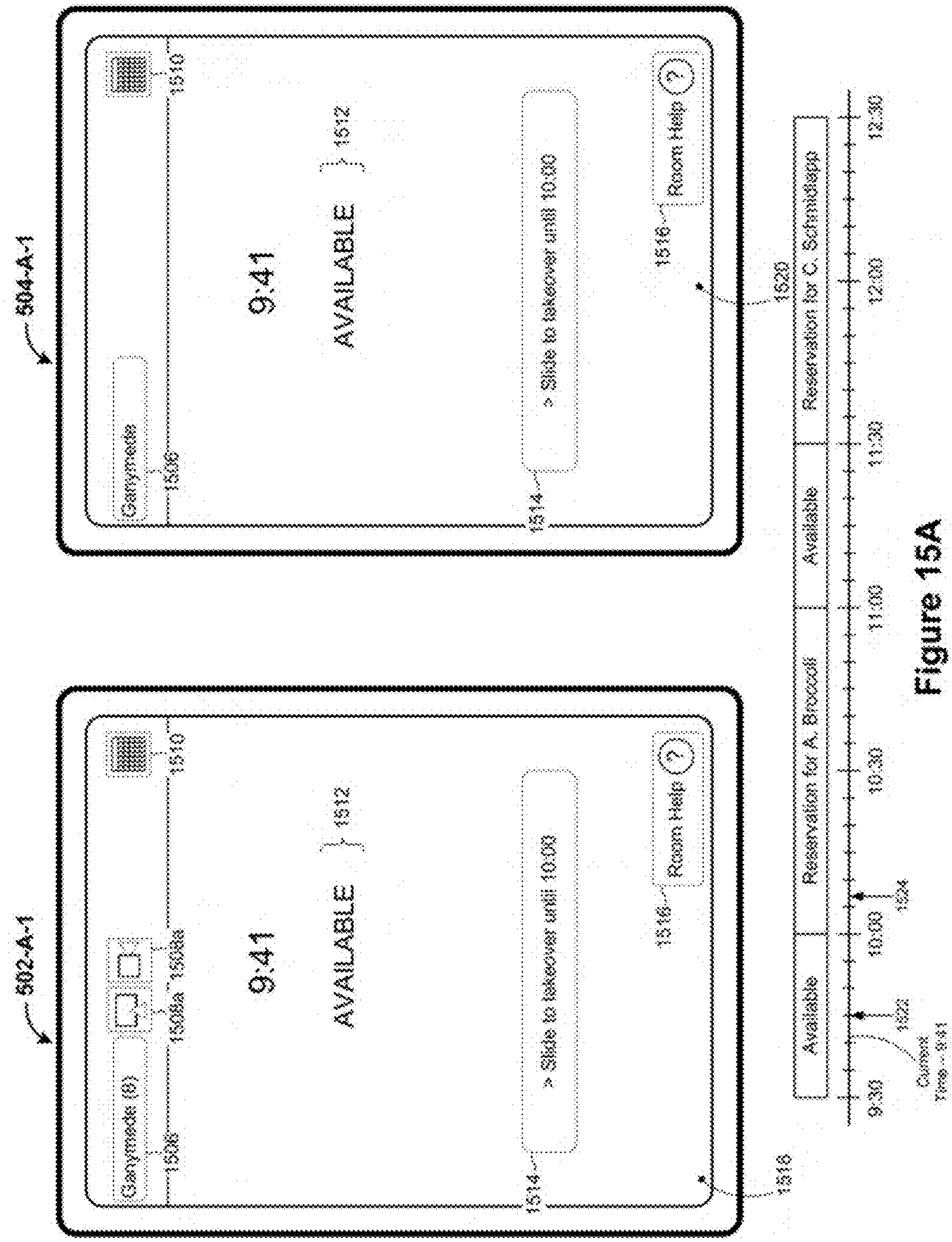
FIGS. 15A-15R illustrate example user interfaces for updating a user interface displayed on a first device based on input from a second device in accordance with some embodiments.
Figure 18A:
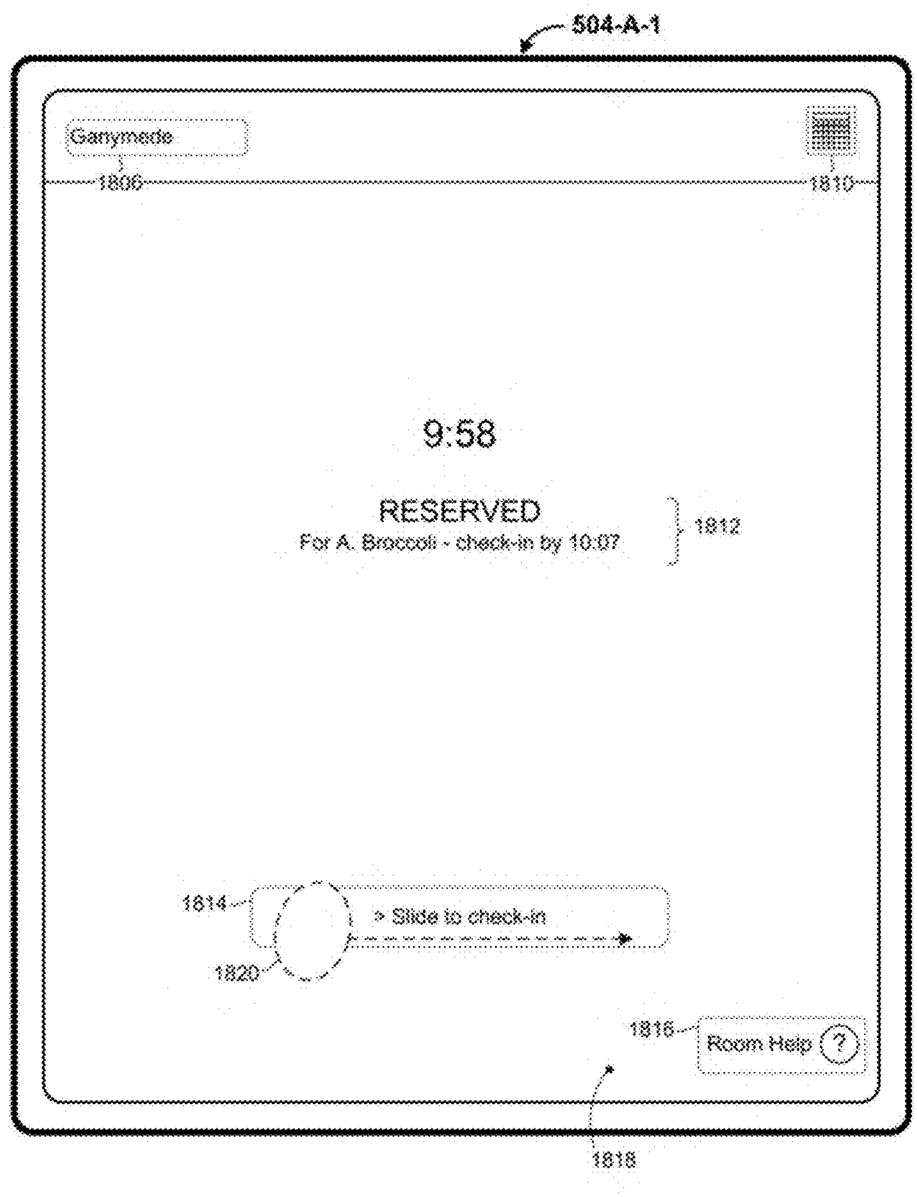
FIGS. 18A-18S illustrate example user interfaces for managing media input/output (I/O) for a meeting space in accordance with some embodiments.
Figure 18S:
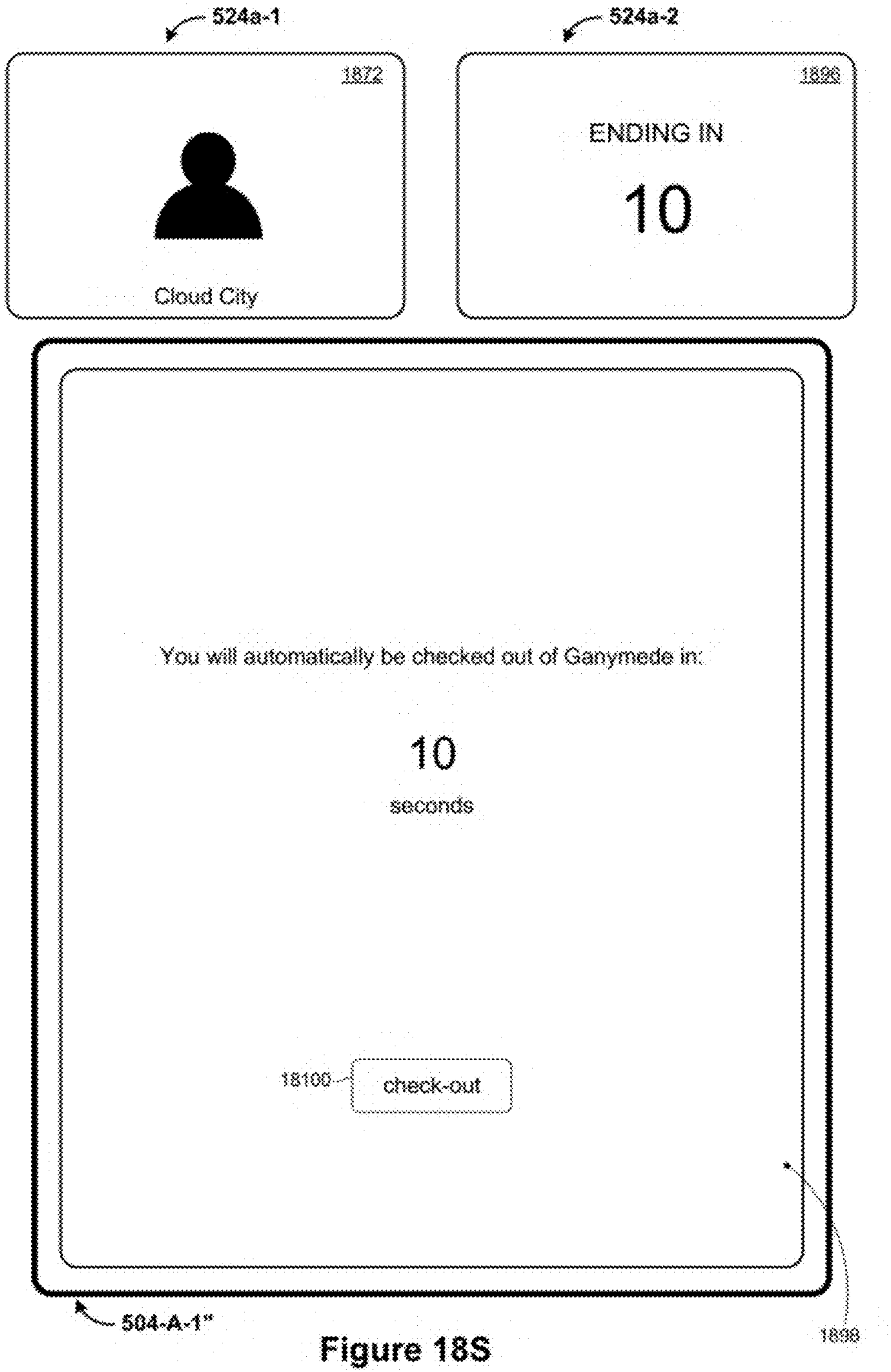
Figure 19A:
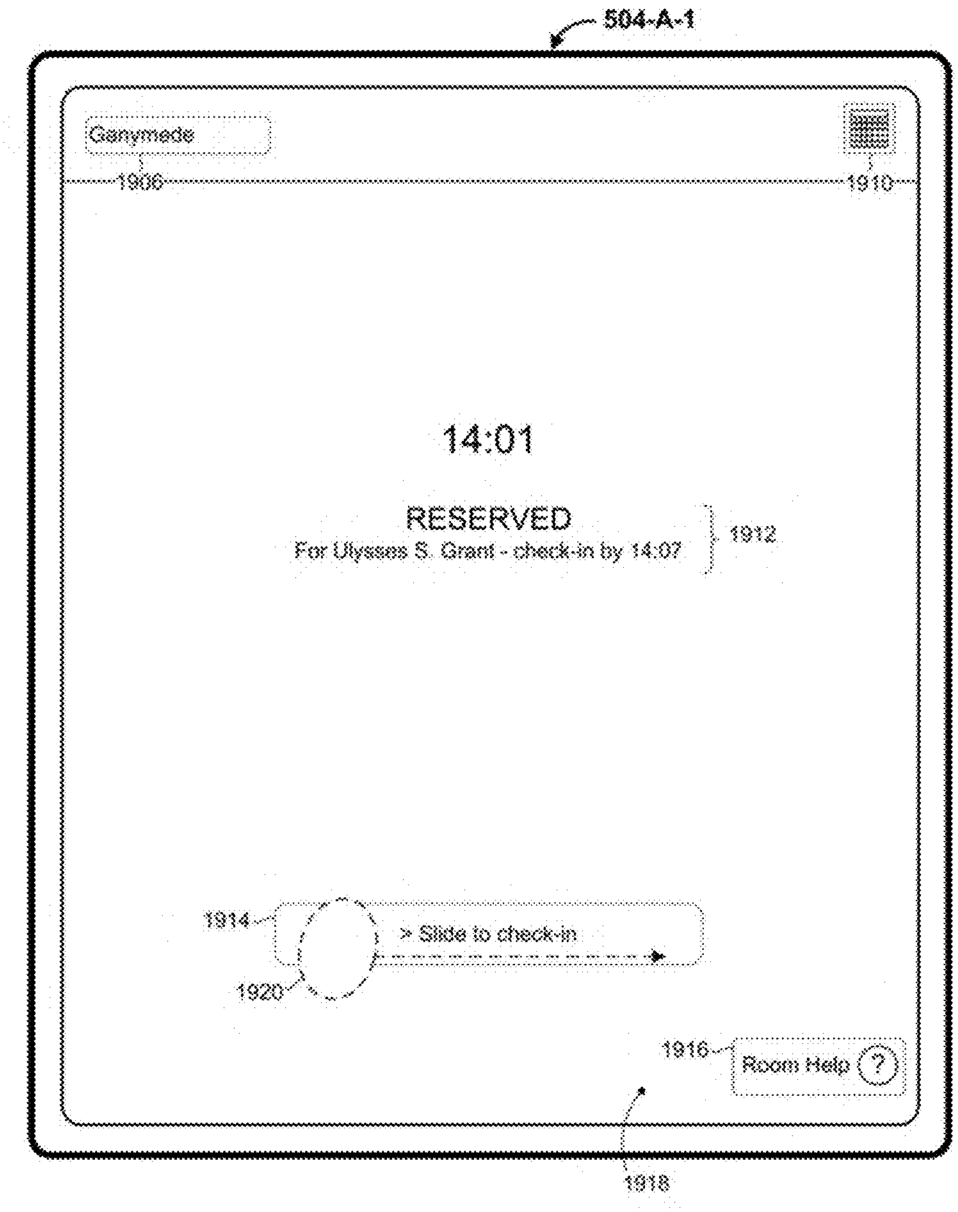
FIGS. 19A-19N illustrate example user interfaces for continuing an electronic conference in accordance with some embodiments.
Figure 19N:
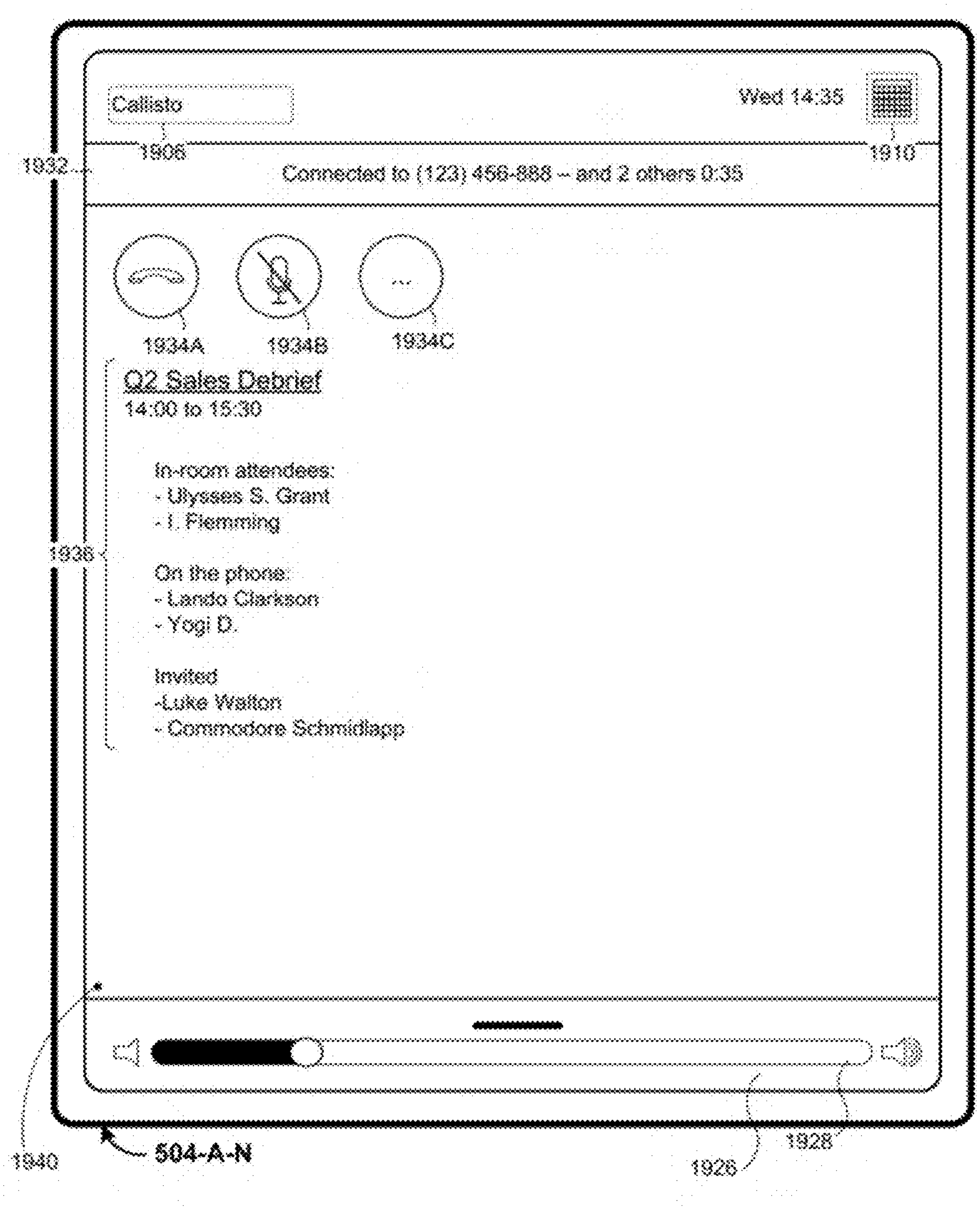
Figure 20A:
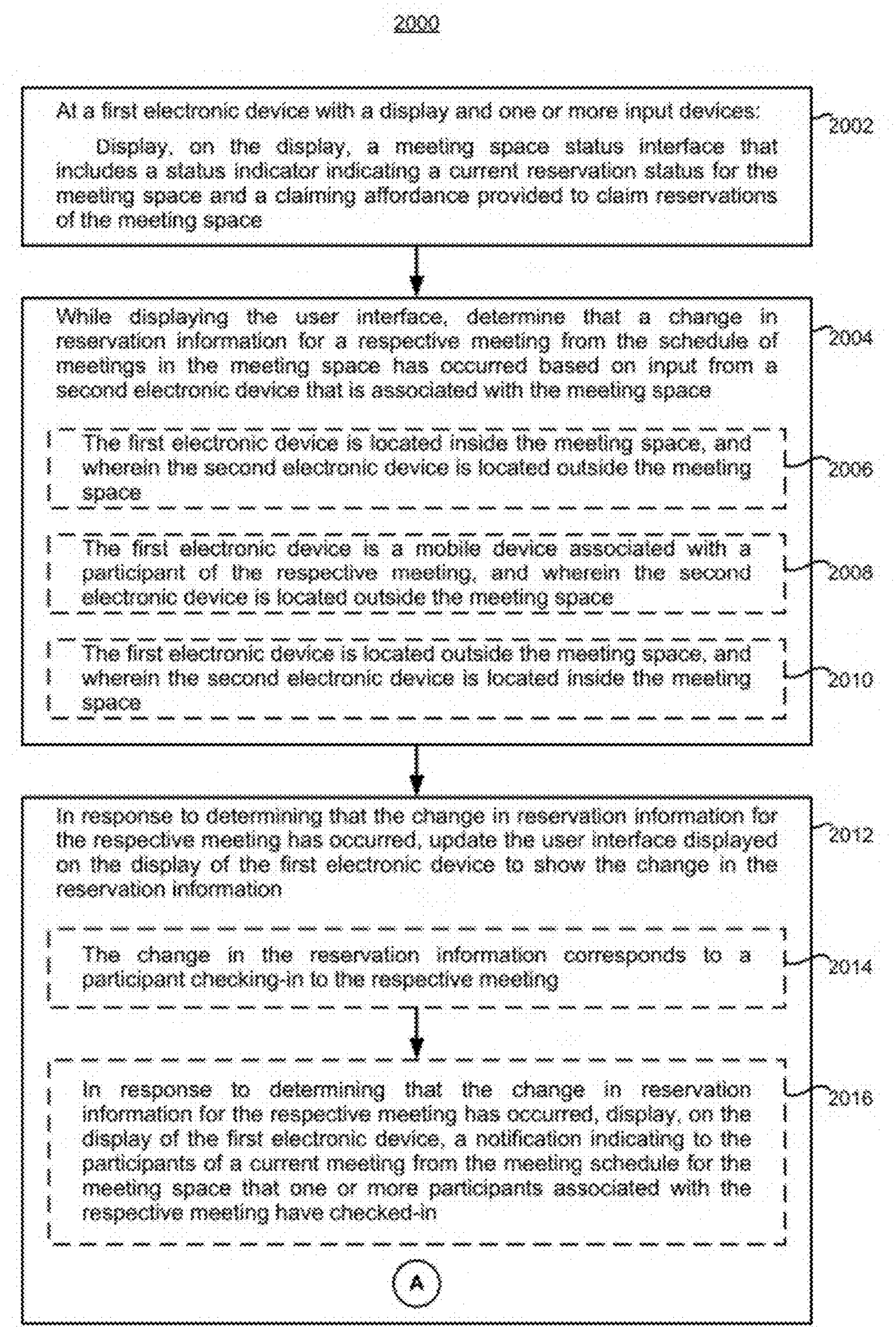
FIGS. 20A-20B illustrate a flow diagram of a method of updating a user interface displayed on a first device based on input from a second device in accordance with some embodiments.
Figure 20B:
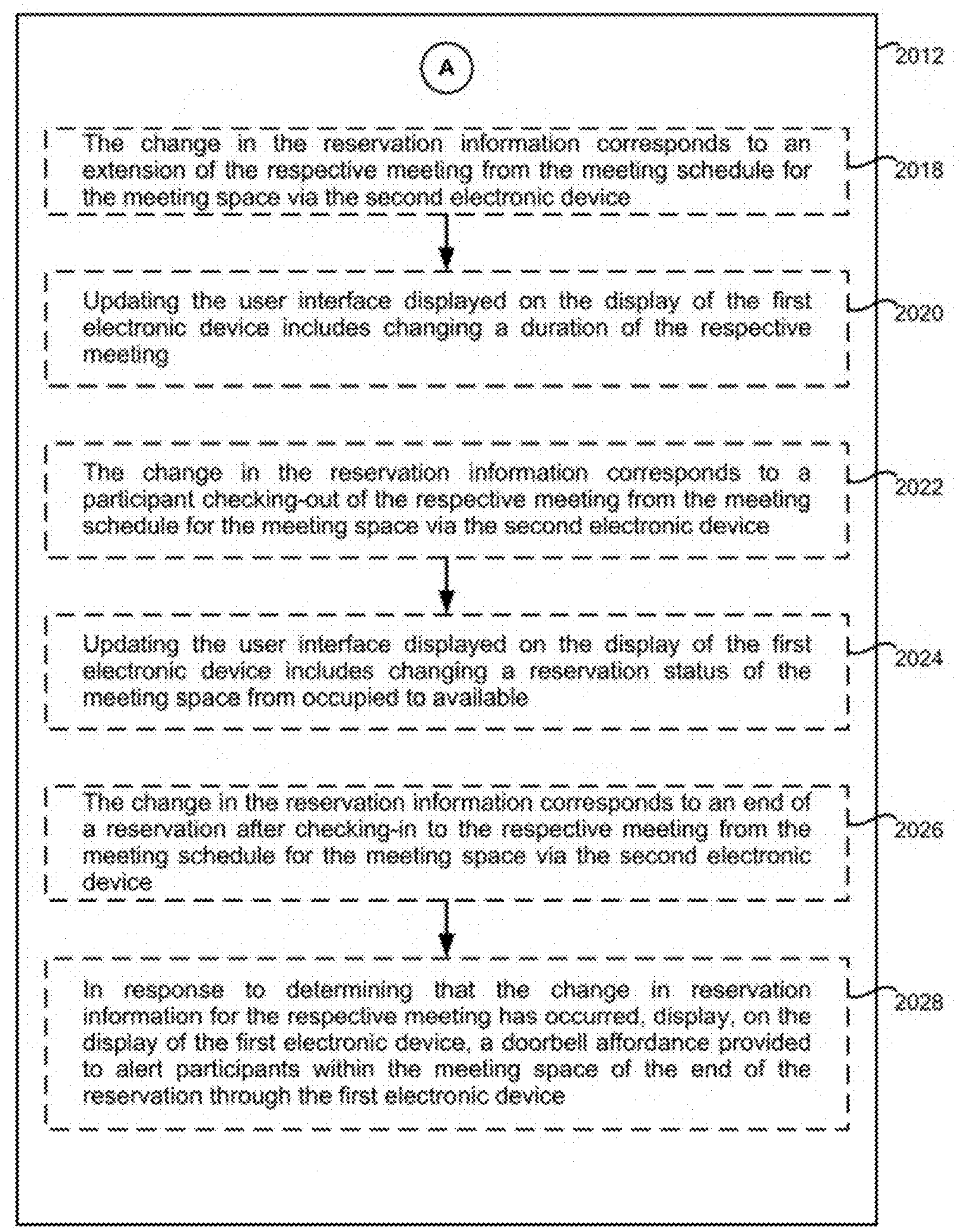
Figure 21A:
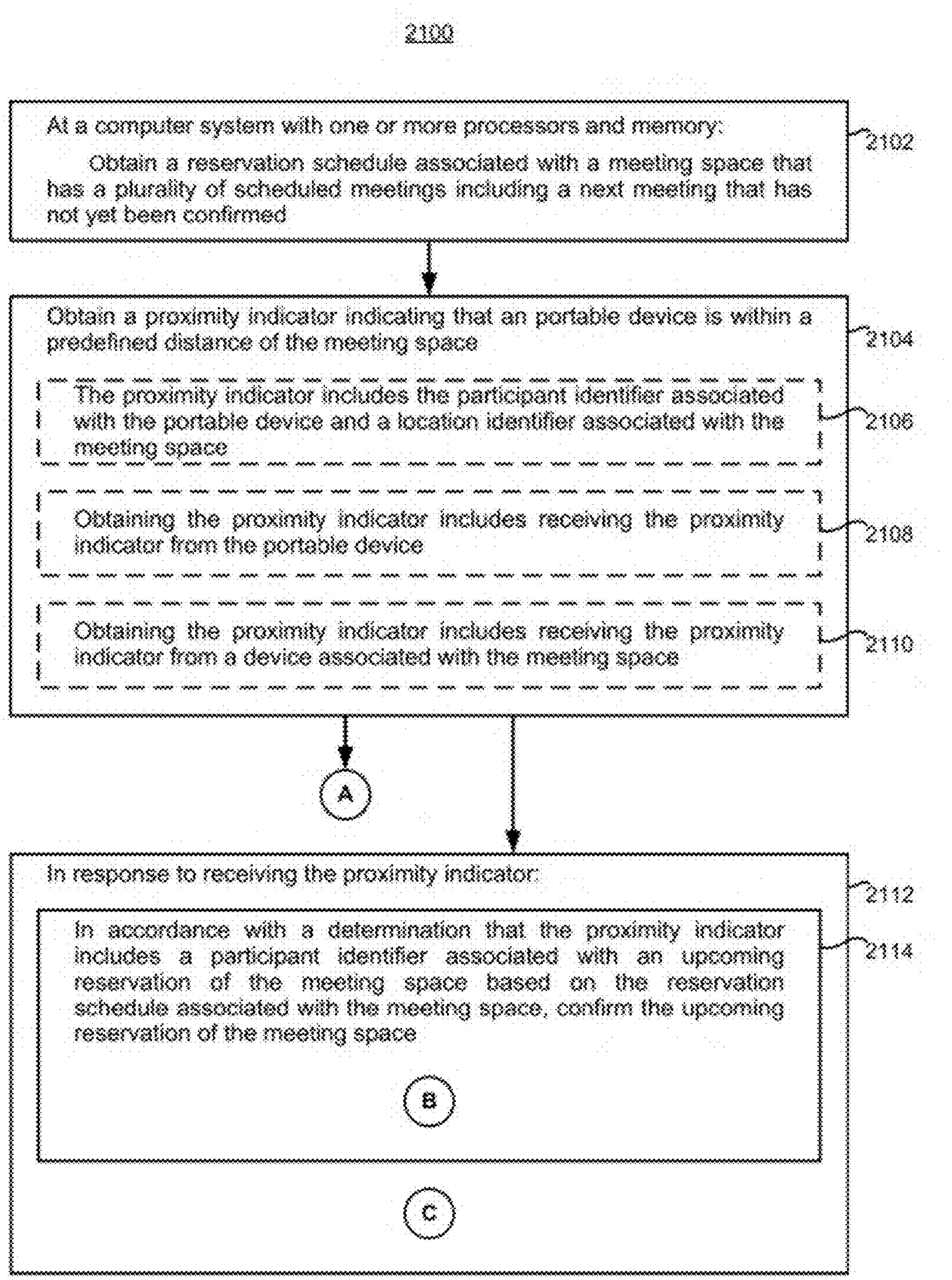
Figure 21B:
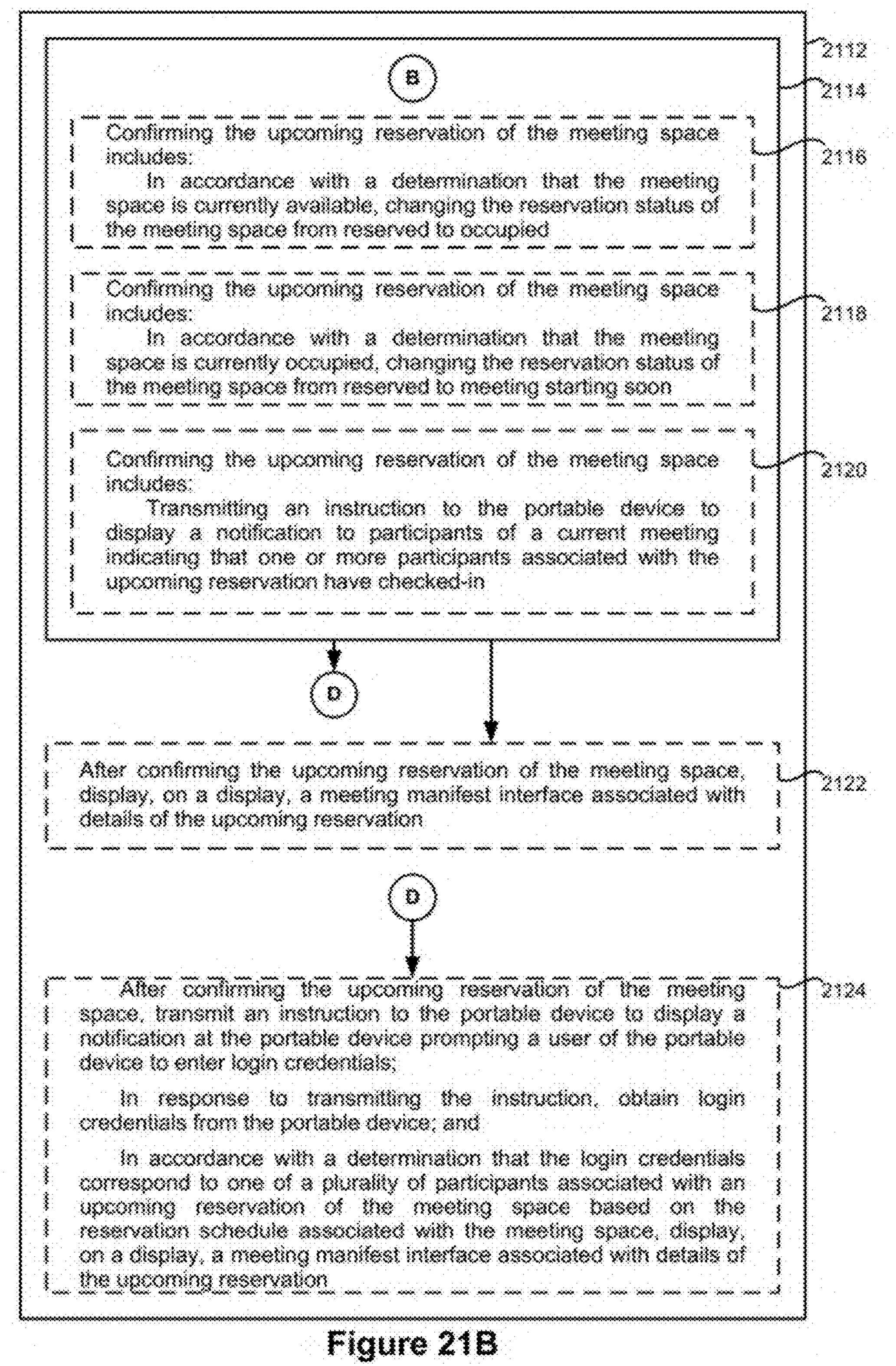
Figure 21D:
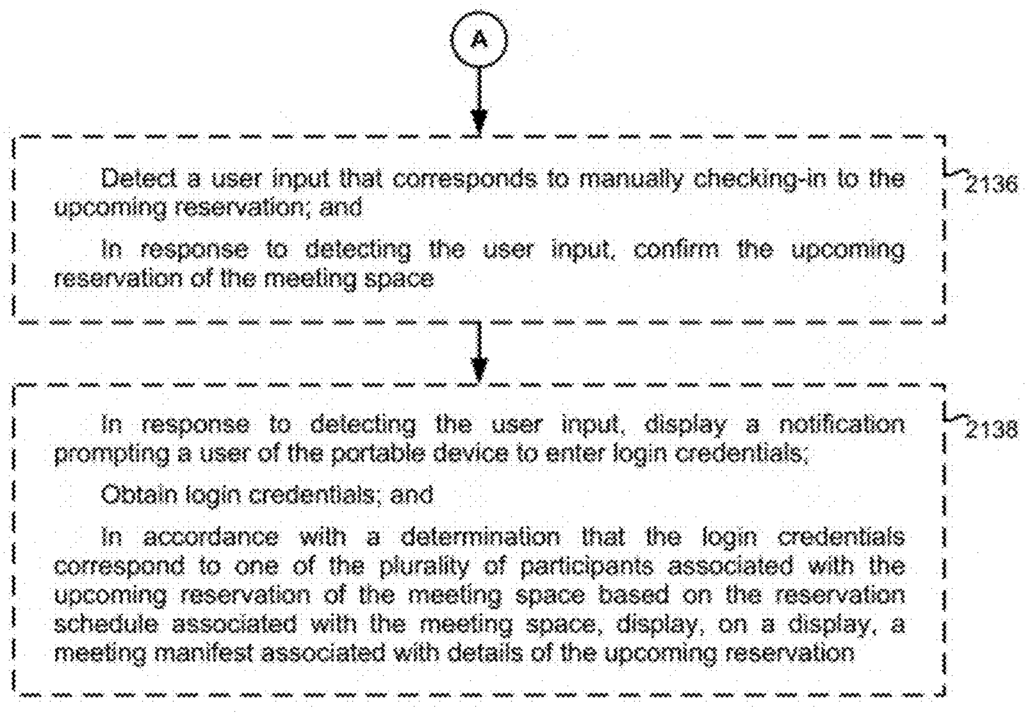
Figure 22B:
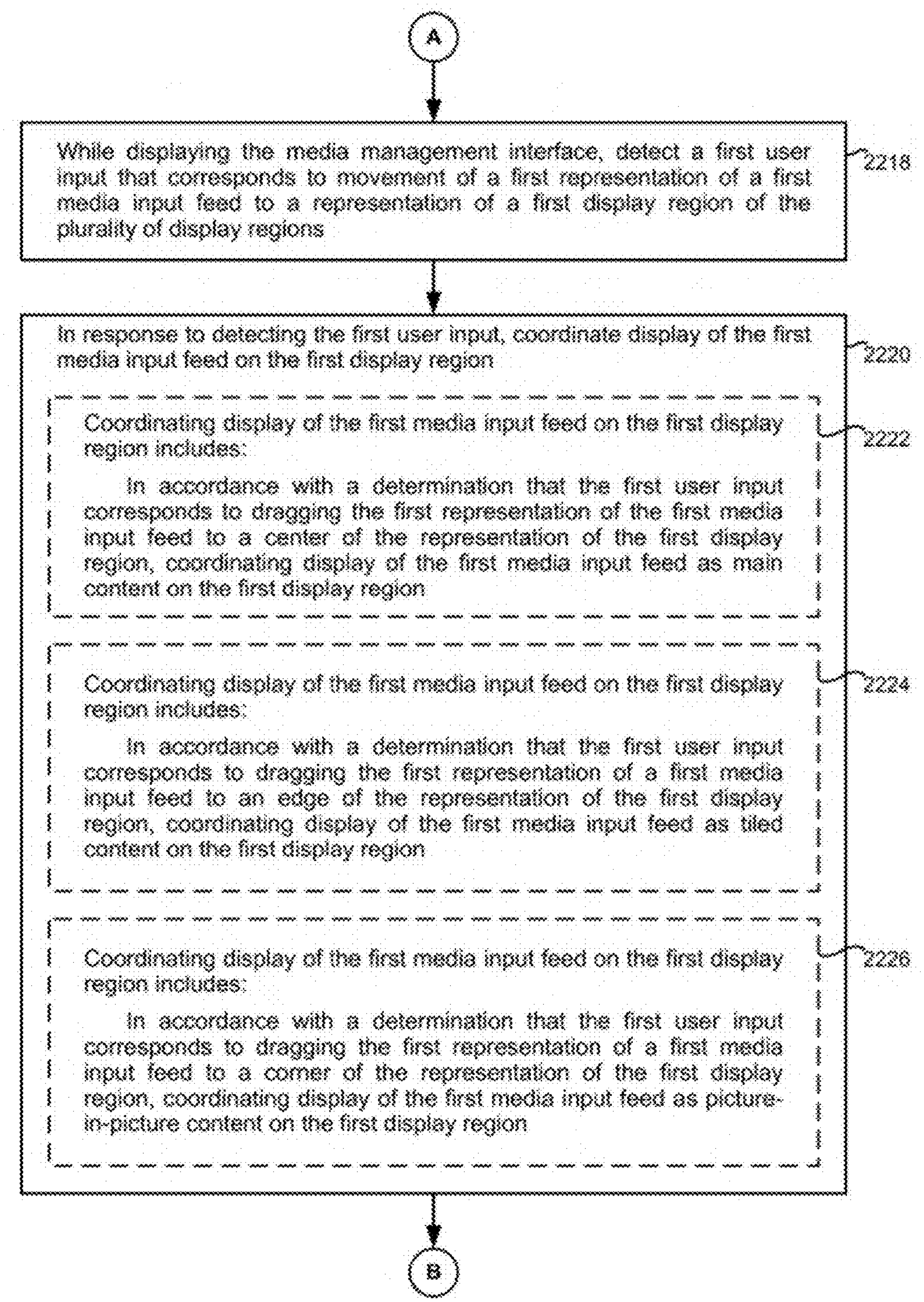
Figure 22C:
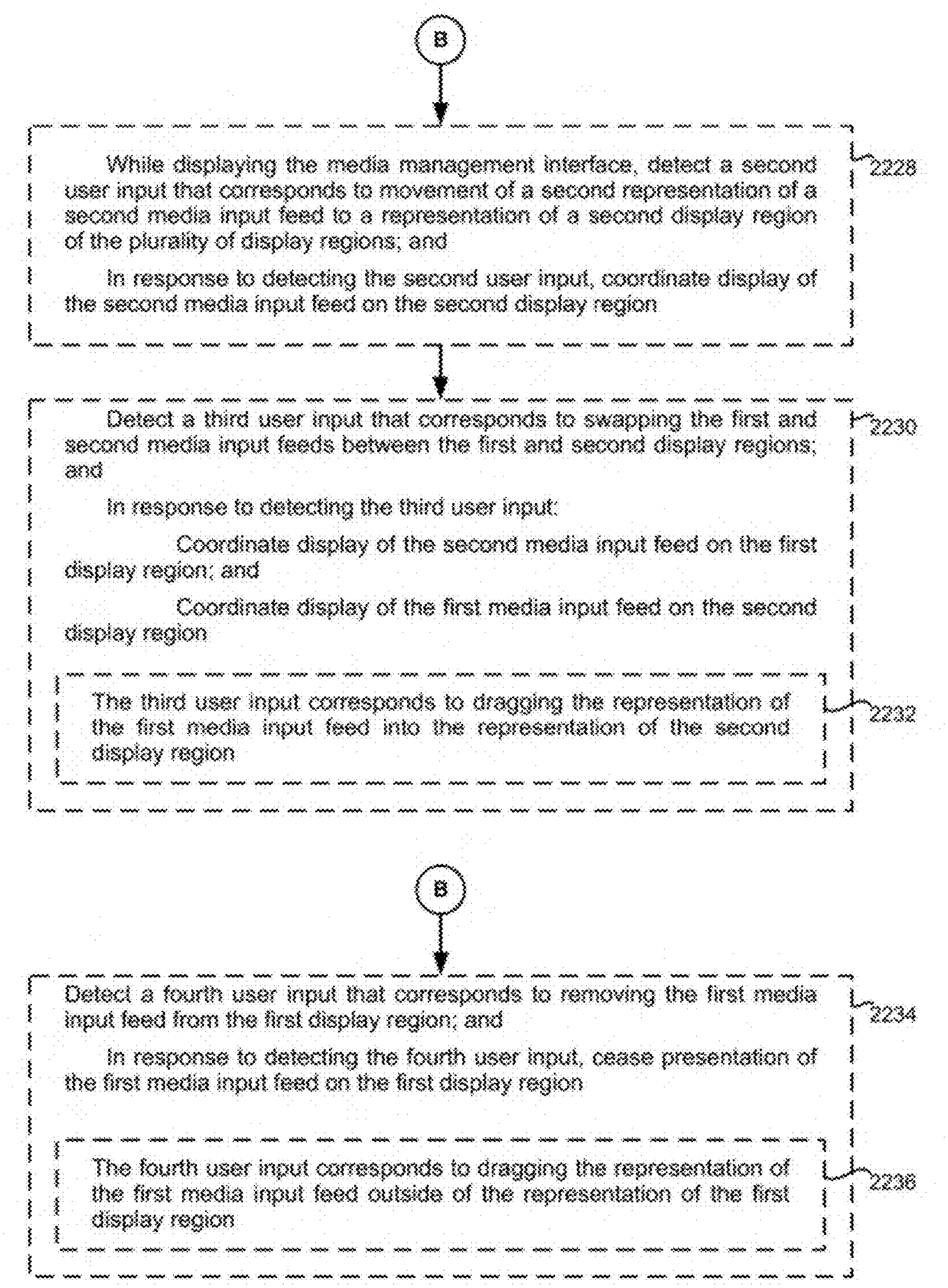
Figure 23A:
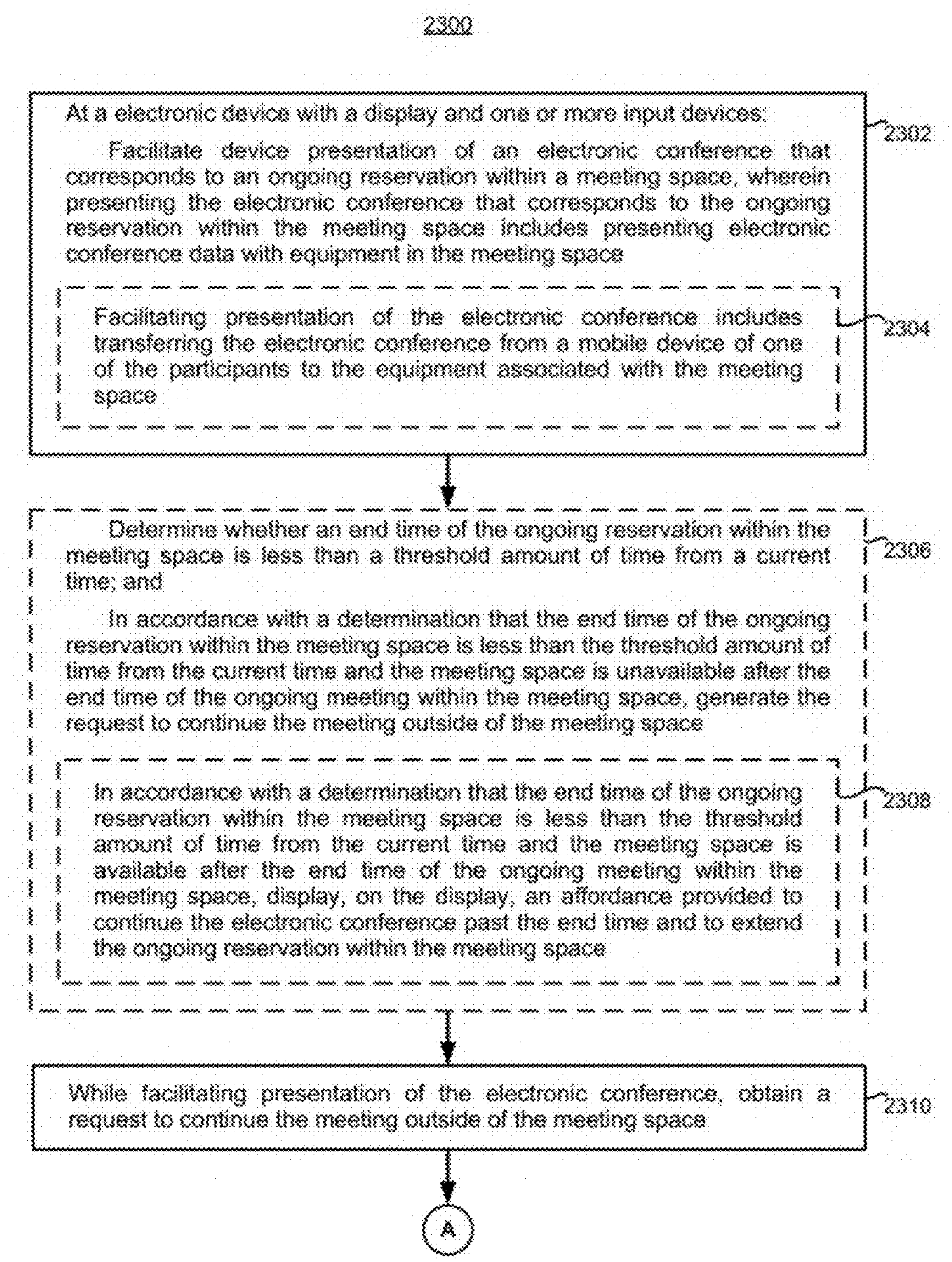
FIGS. 23A-23C illustrate a flow diagram of a method of continuing an electronic conference in accordance with some embodiments.
Figure 23B:
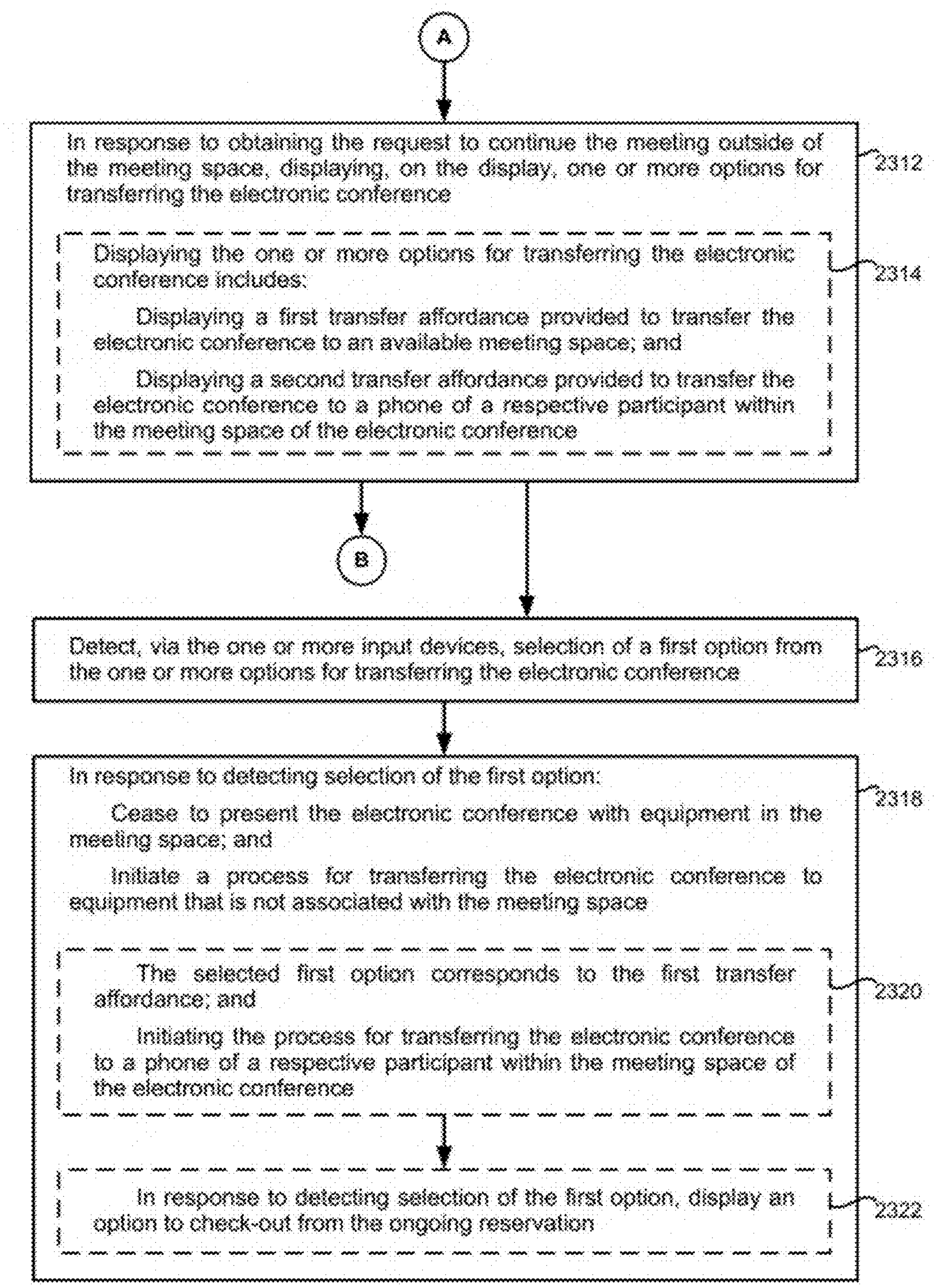
Figure 23C:
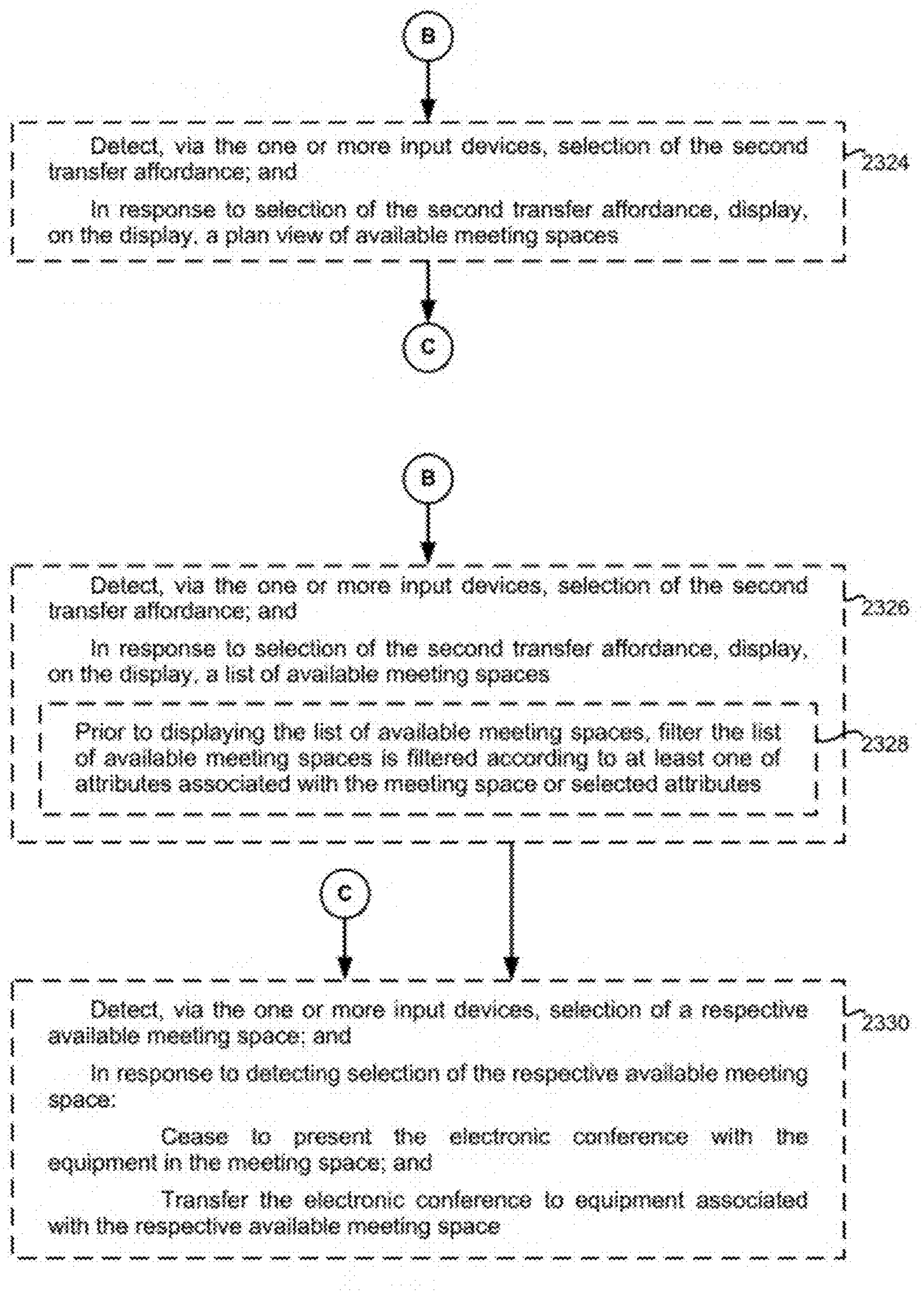

FIGS. 20A-20B illustrate a process for updating a user interface displayed on a first device based on input from a second device. FIGS. 15A-15R describe example user interfaces for updating a user interface displayed on a first device based on input from a second device as performed by a device such as the device described FIG. 24. FIGS. 21A-21D illustrate a process for confirming a reservation of a meeting space. FIGS. 16A-16C and 17A-17D illustrate flow diagrams for authenticating a user to confirm a reservation of a meeting space as performed by a device such as the device described FIG. 25. FIGS. 22A-22C illustrate a process for managing media input/output (I/O) for a meeting space. FIGS. 18A-18S describe example user interfaces for managing media I/O for a meeting space as performed by a device such as the device described FIG. 26. FIGS. 23A-23C illustrate a process for continuing an electronic conference. FIGS. 19A-19N describe example user interfaces for continuing an electronic conference as performed by a device such as the device described FIG. 27. The user interfaces in FIGS. 15A-15R, 18A-18S, and 19A-19N are used to illustrate the processes in FIGS. 20A-20B, 22A-22C, and 23A-23C, respectively.

Figure 28A:
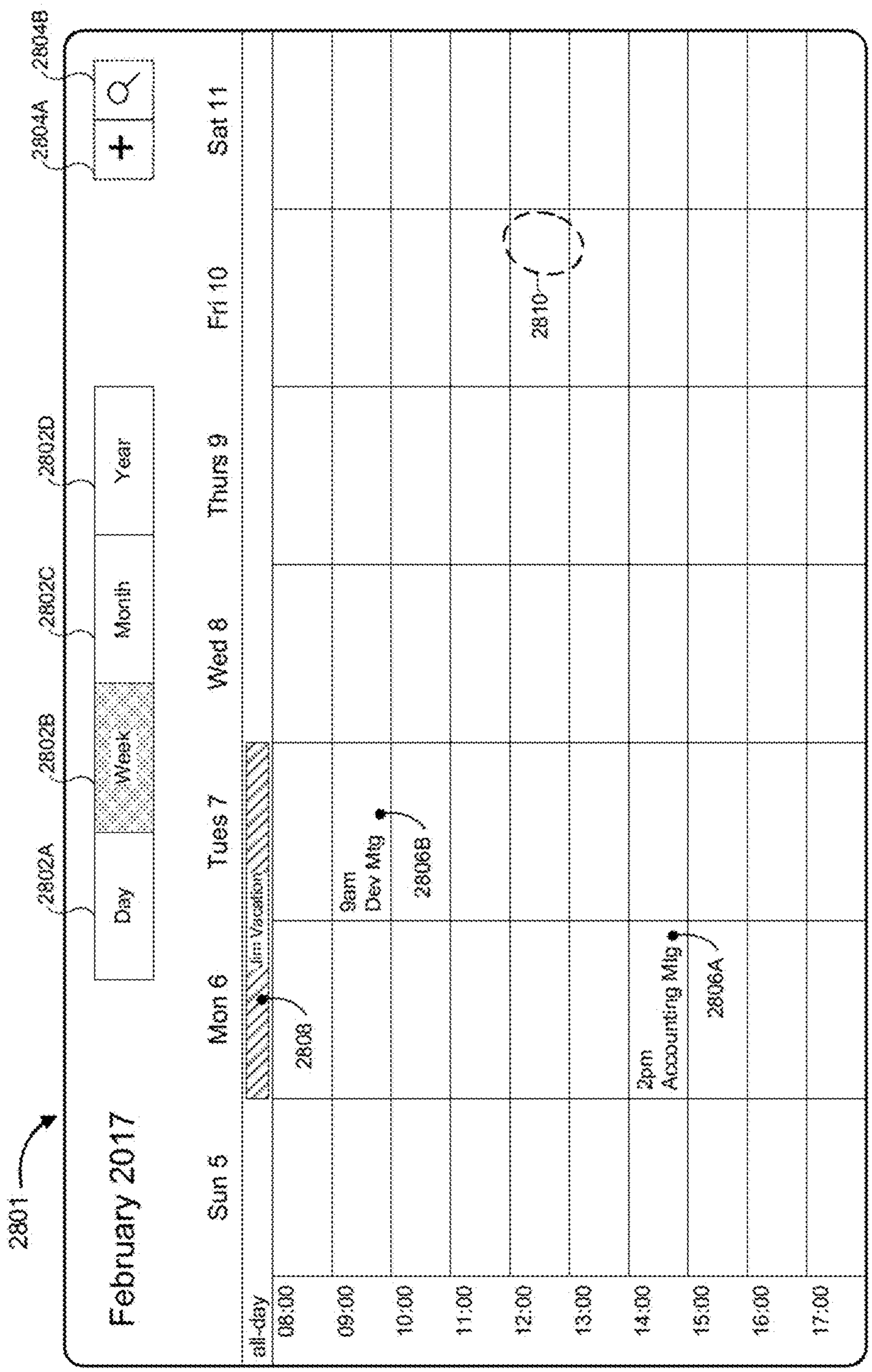
FIGS. 28A-28CC illustrate example user interfaces for creating and managing calendar events in accordance with some embodiments.
Figure 28B:
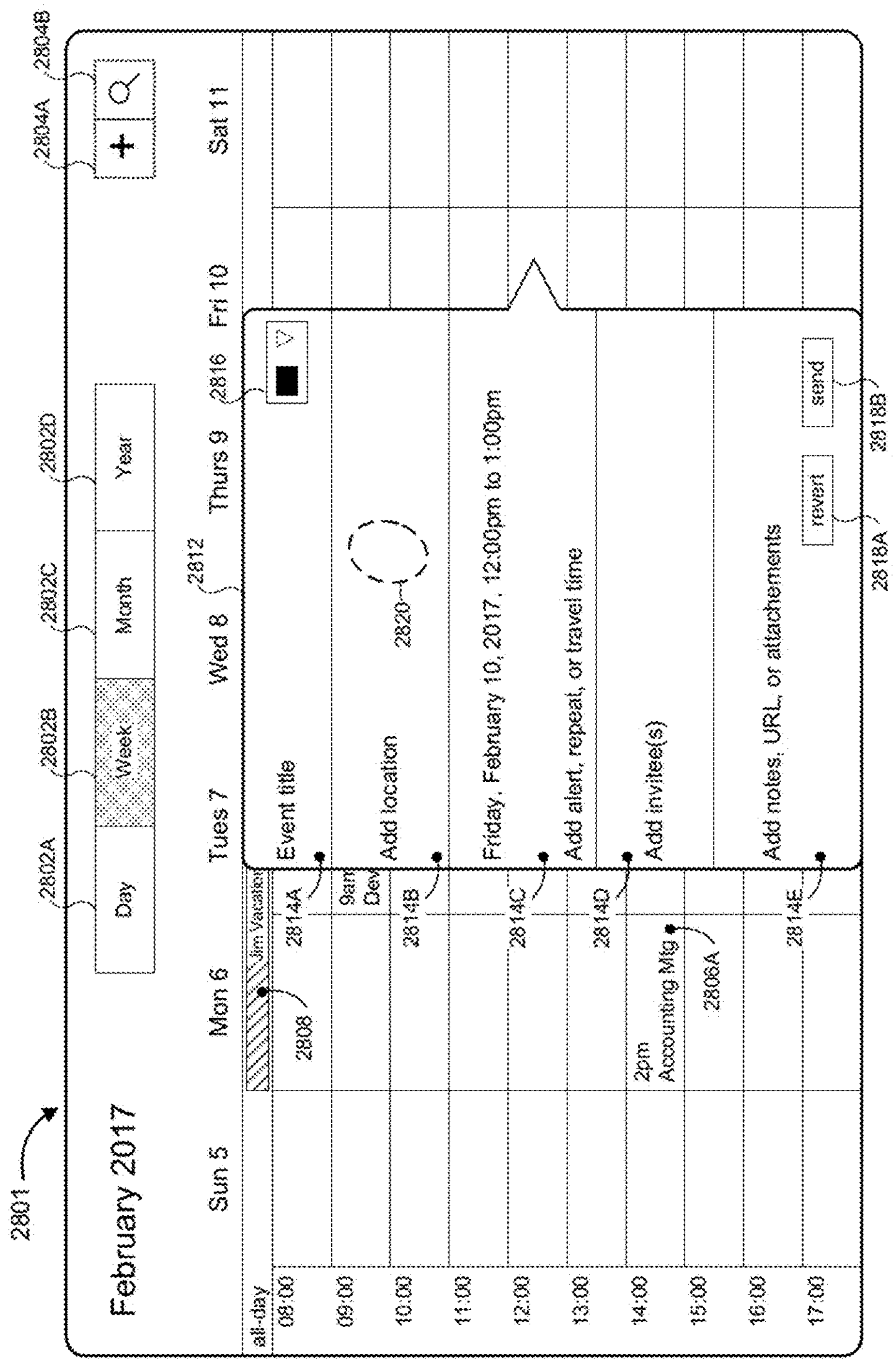
Figure 28C:
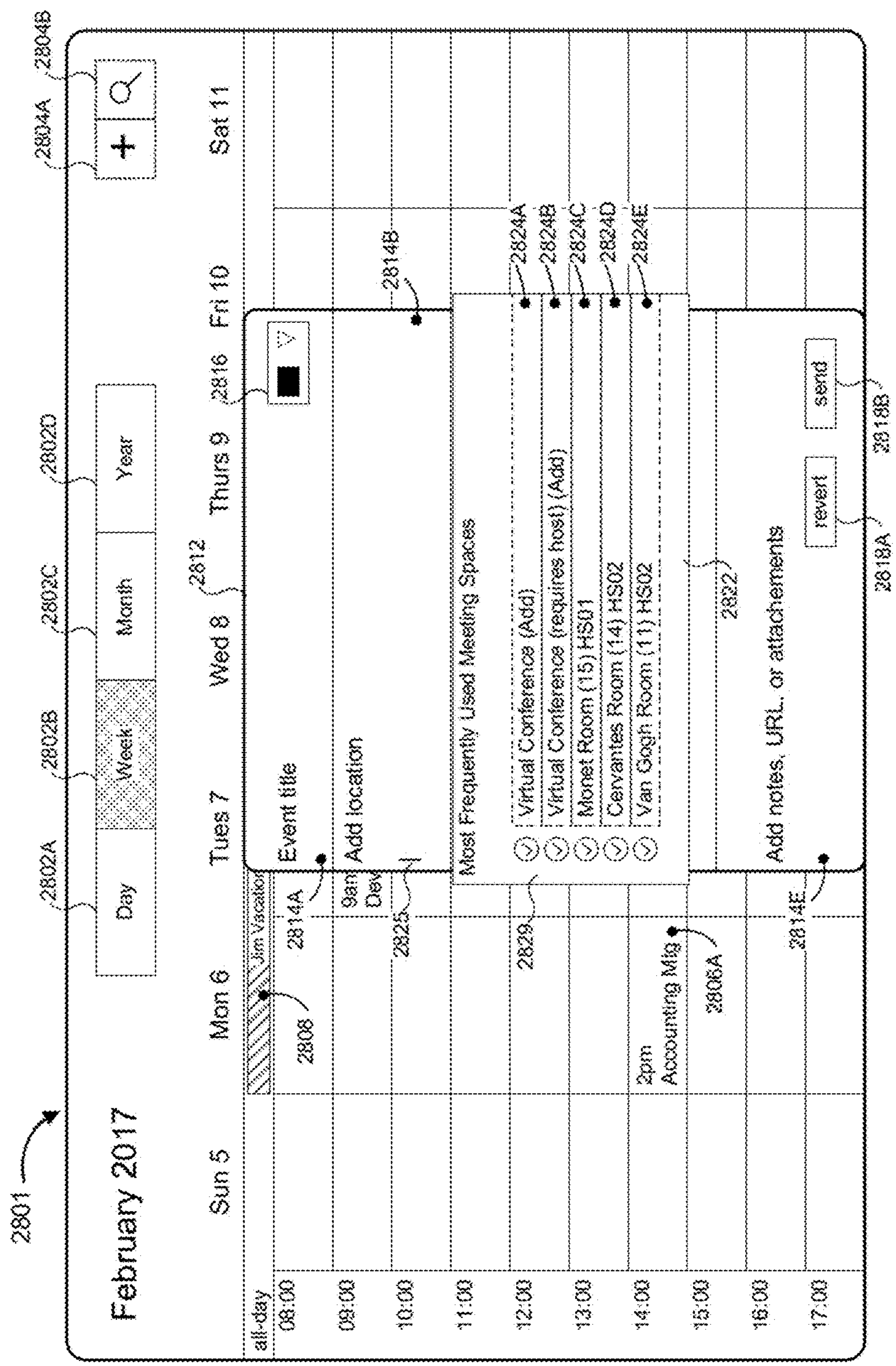
Figure 31B:
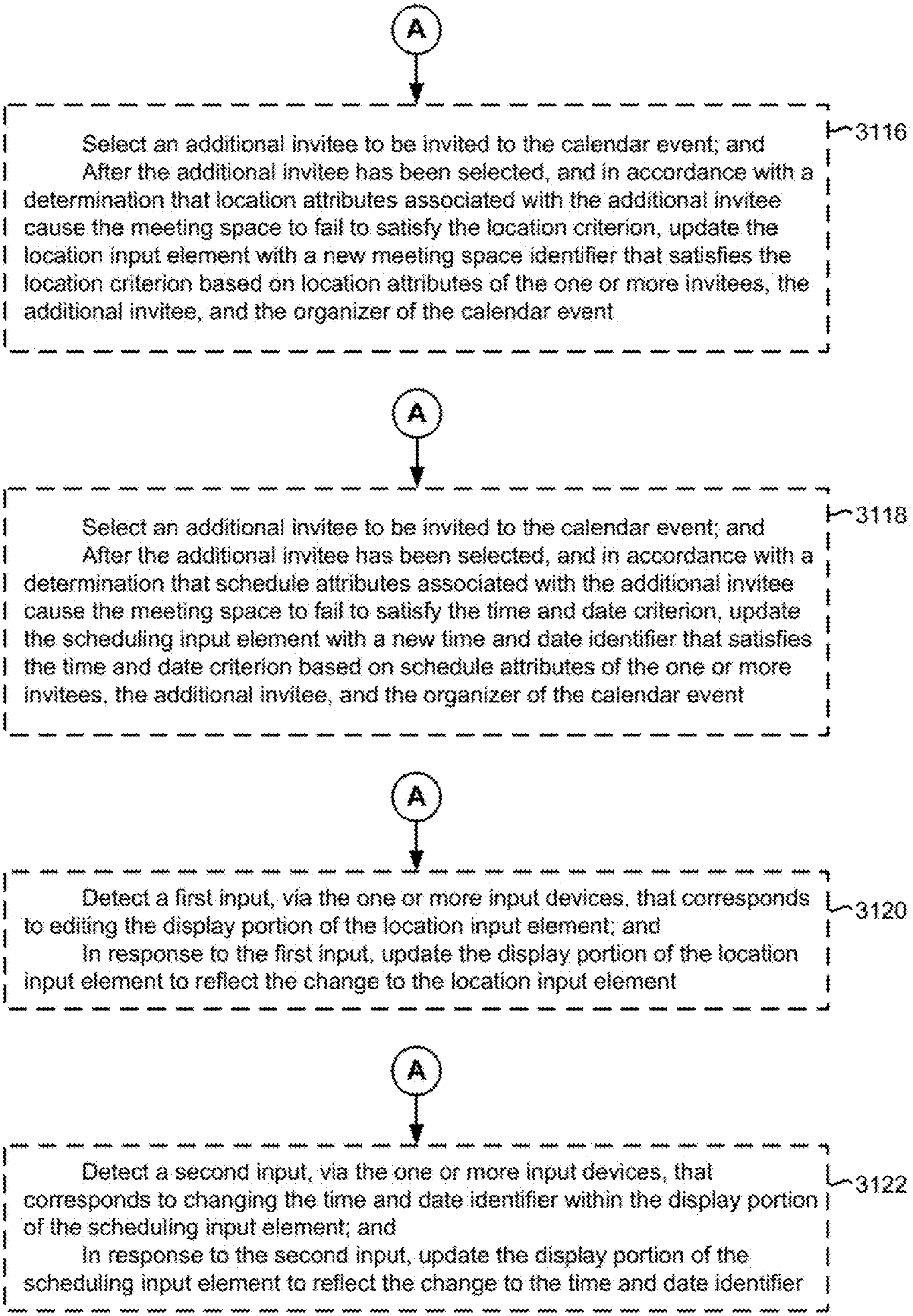
Figure 31C:
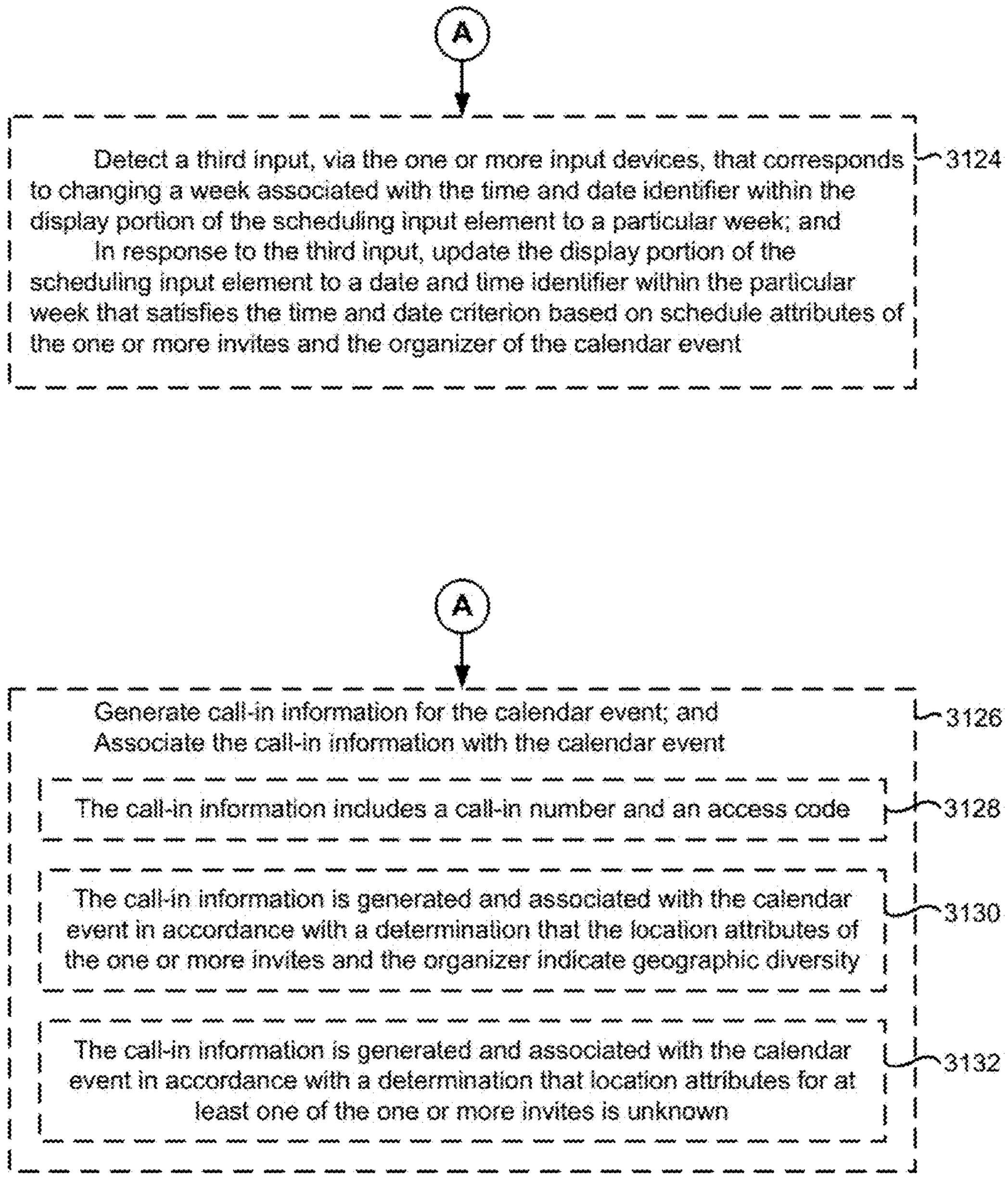
Figure 32B:
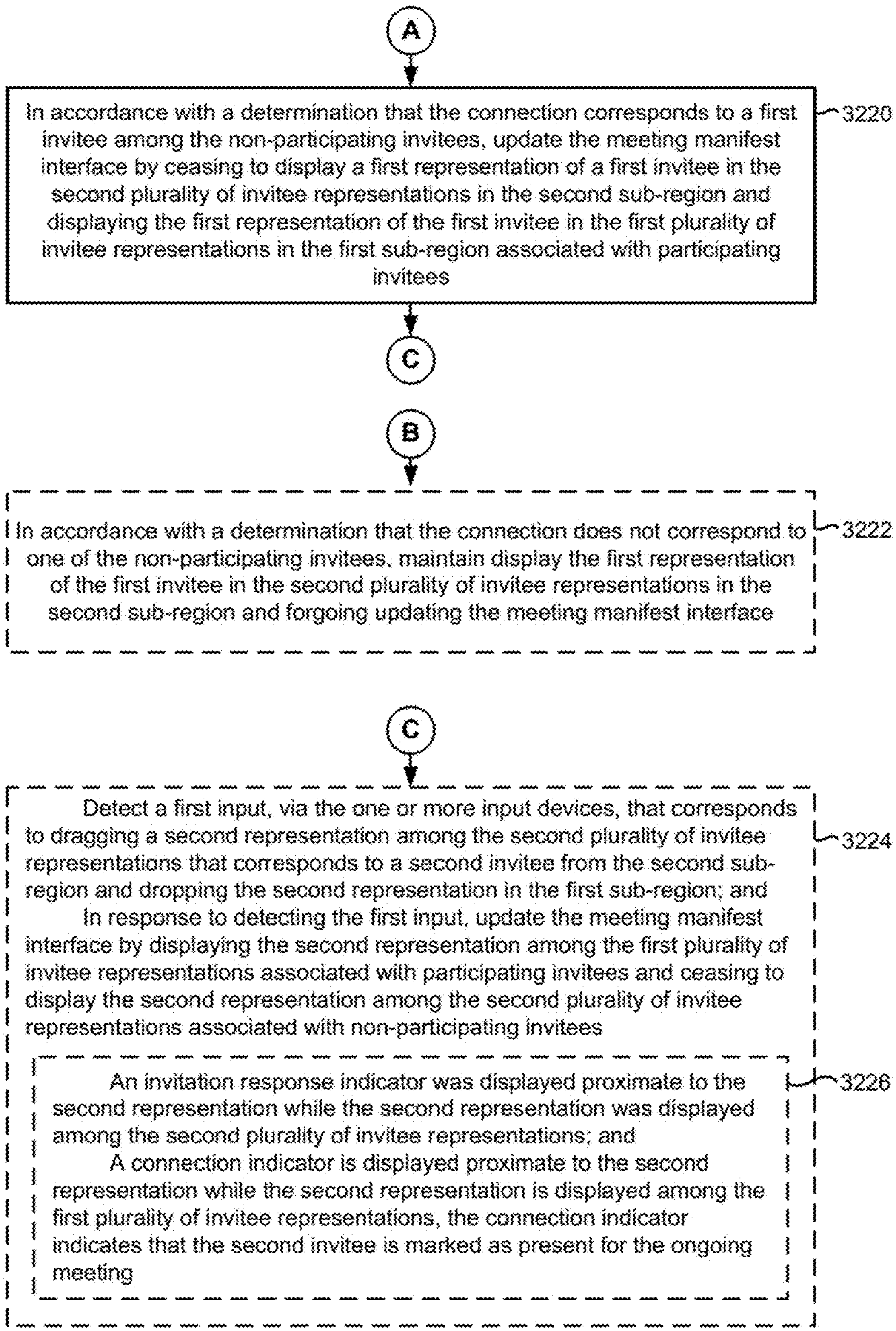
Figure 32C:
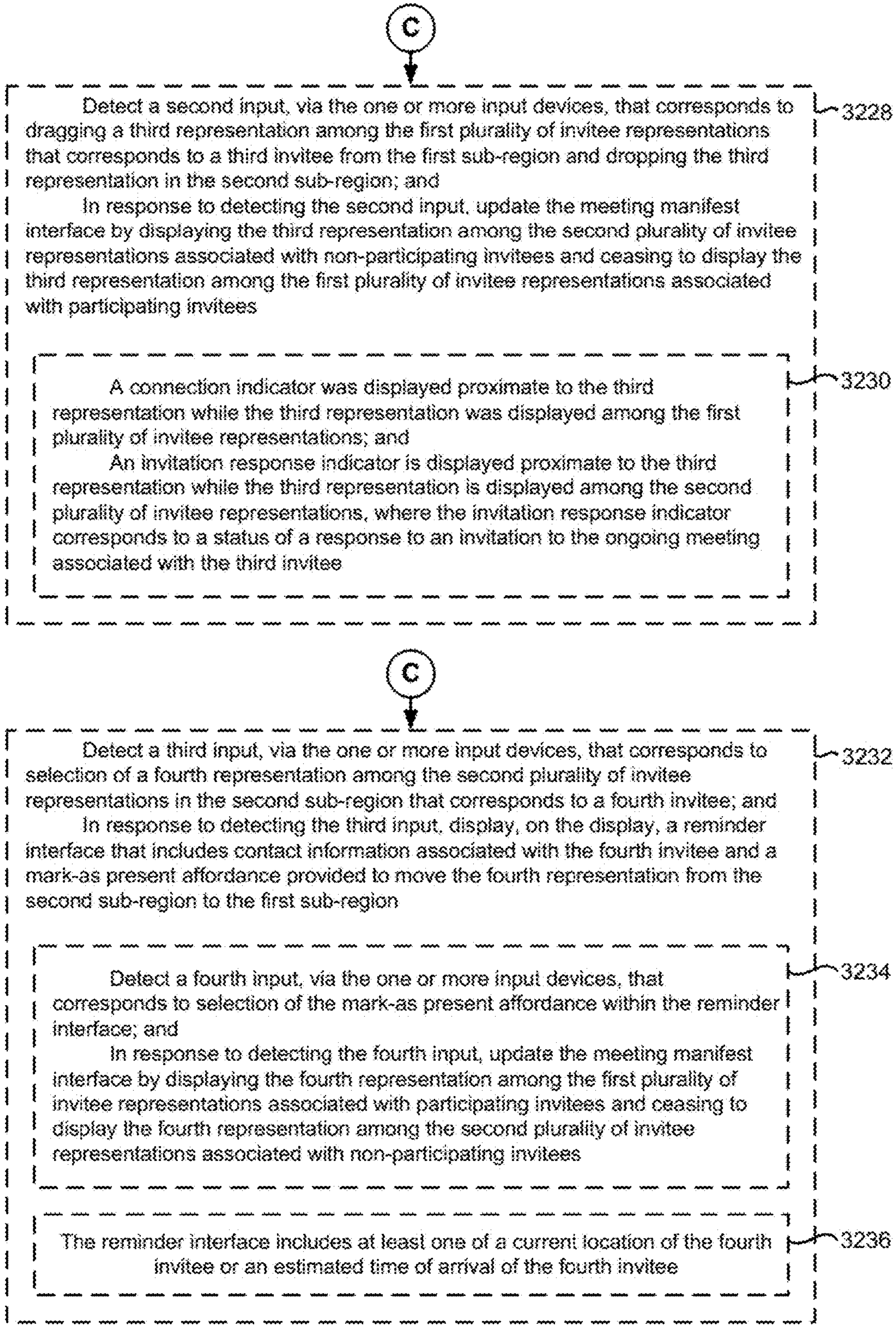
Figure 33A:
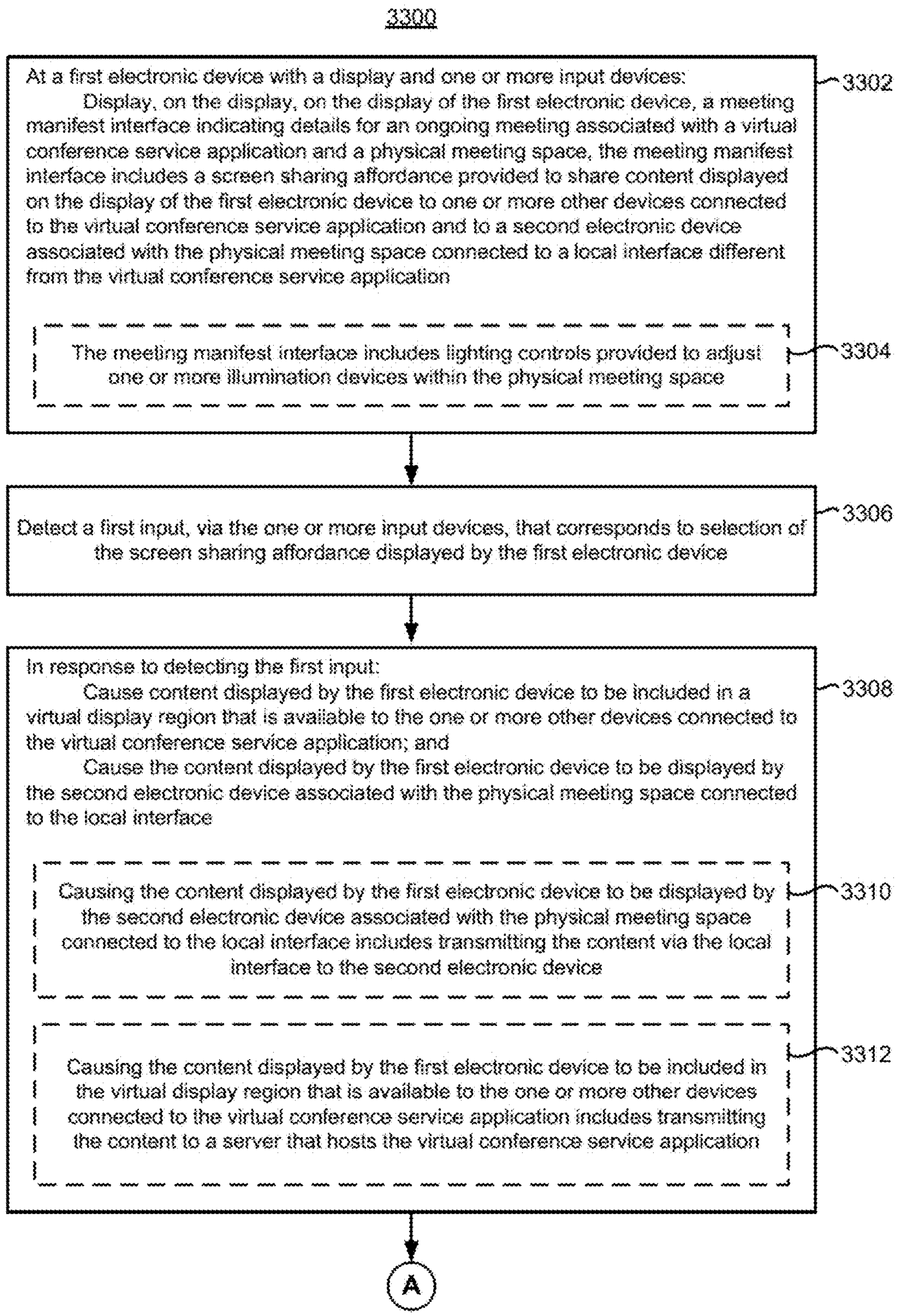

FIGS. 30A-30D illustrate a process for creating a calendar event associated with a virtual conference. FIGS. 31A-31C illustrate a process for populating scheduling and/or location portions of a new calendar event based on invitees. sharing via a remote virtual conference service application and also via a local interface. FIGS. 28A-28CC describe example user interfaces for creating and managing calendar events as performed by a device such as the devices described in FIGS. 1A, 2-3, and 4A-4B. FIGS. 32A-32C illustrate a process for managing the attendance of meeting invitees. FIGS. 33A-32C illustrate a process for screen. FIGS. 29A-29L describe example user interfaces for managing meeting attendance and screen sharing as performed by a device such as the devices described in FIGS. 1A, 2-3, and 4A-4B. The user interfaces in FIGS. 28A-28CC and 29A-29L are used to illustrate the processes in FIGS. 30A-30D, 31A-31C, 32A-32C, and 33A-32C.

EXAMPLE DEVICES

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
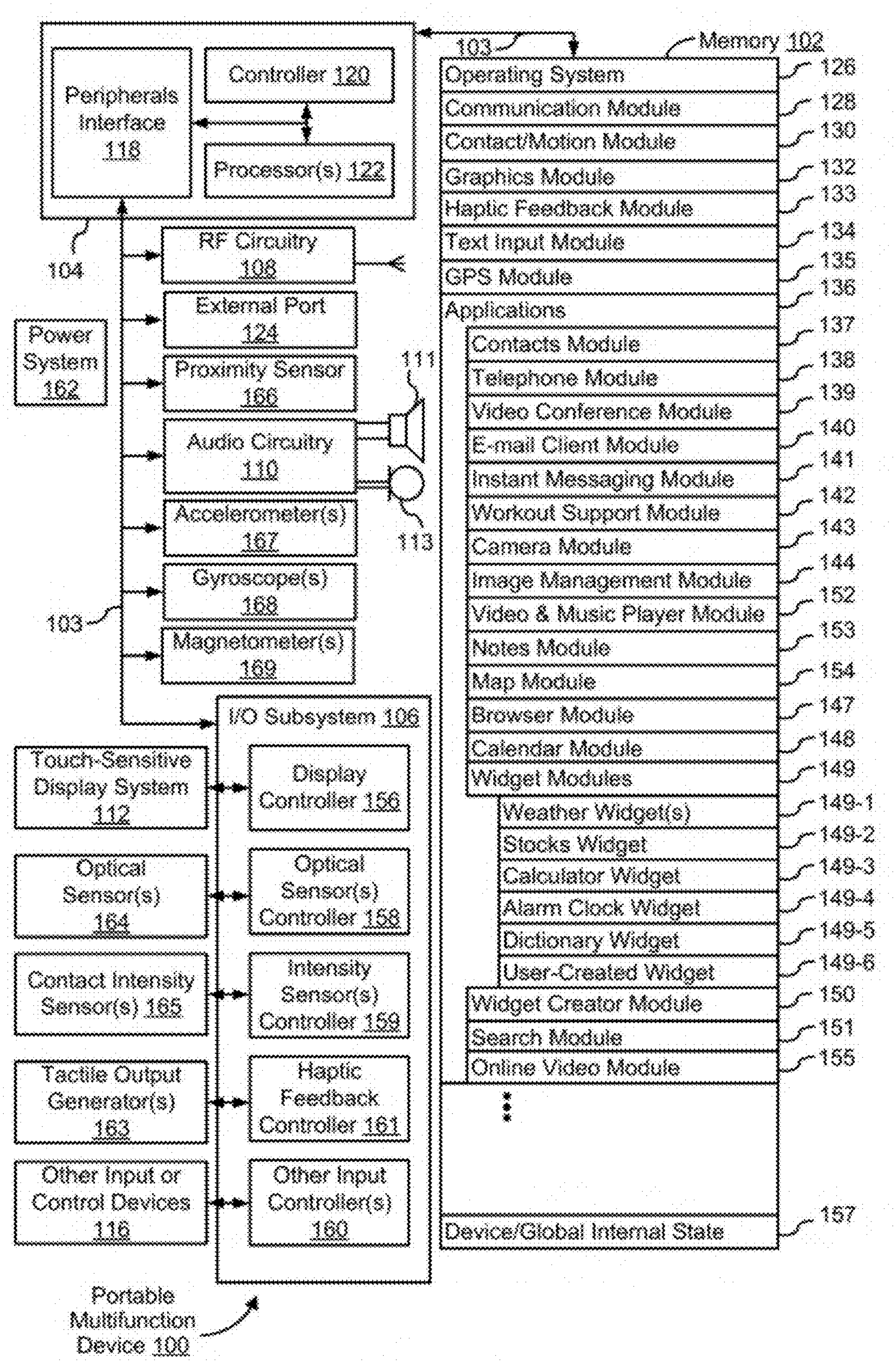
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
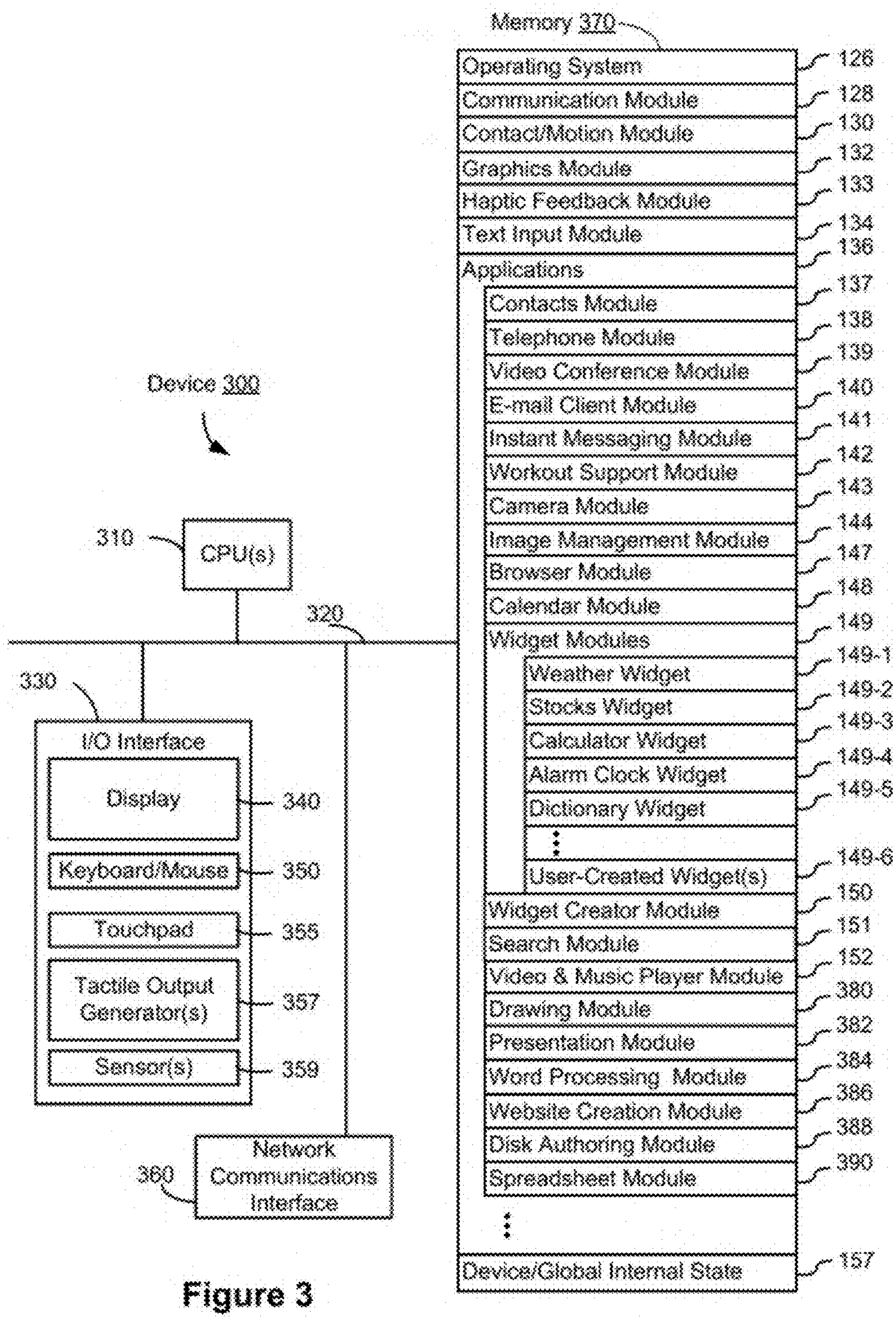
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
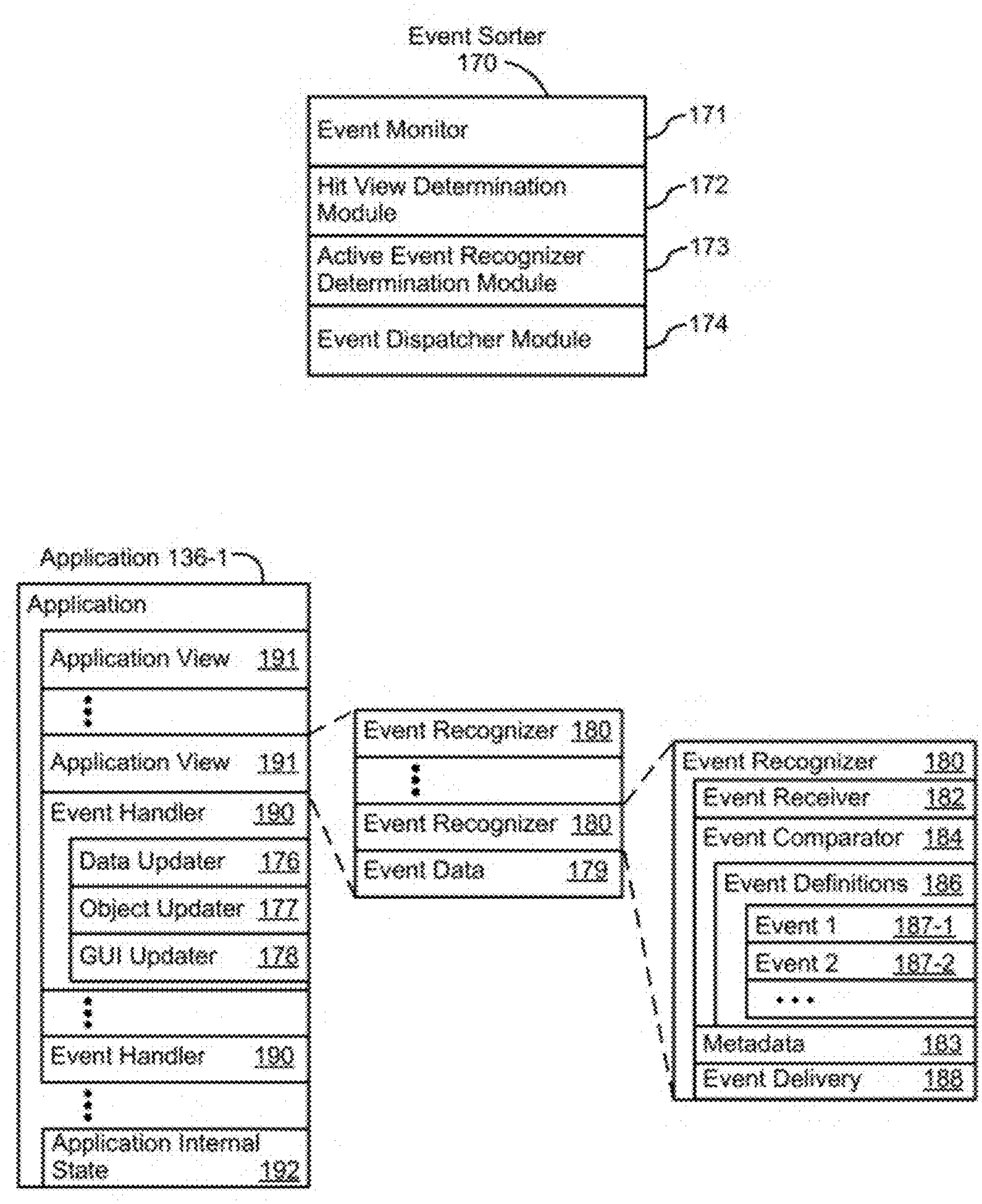
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of:

resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
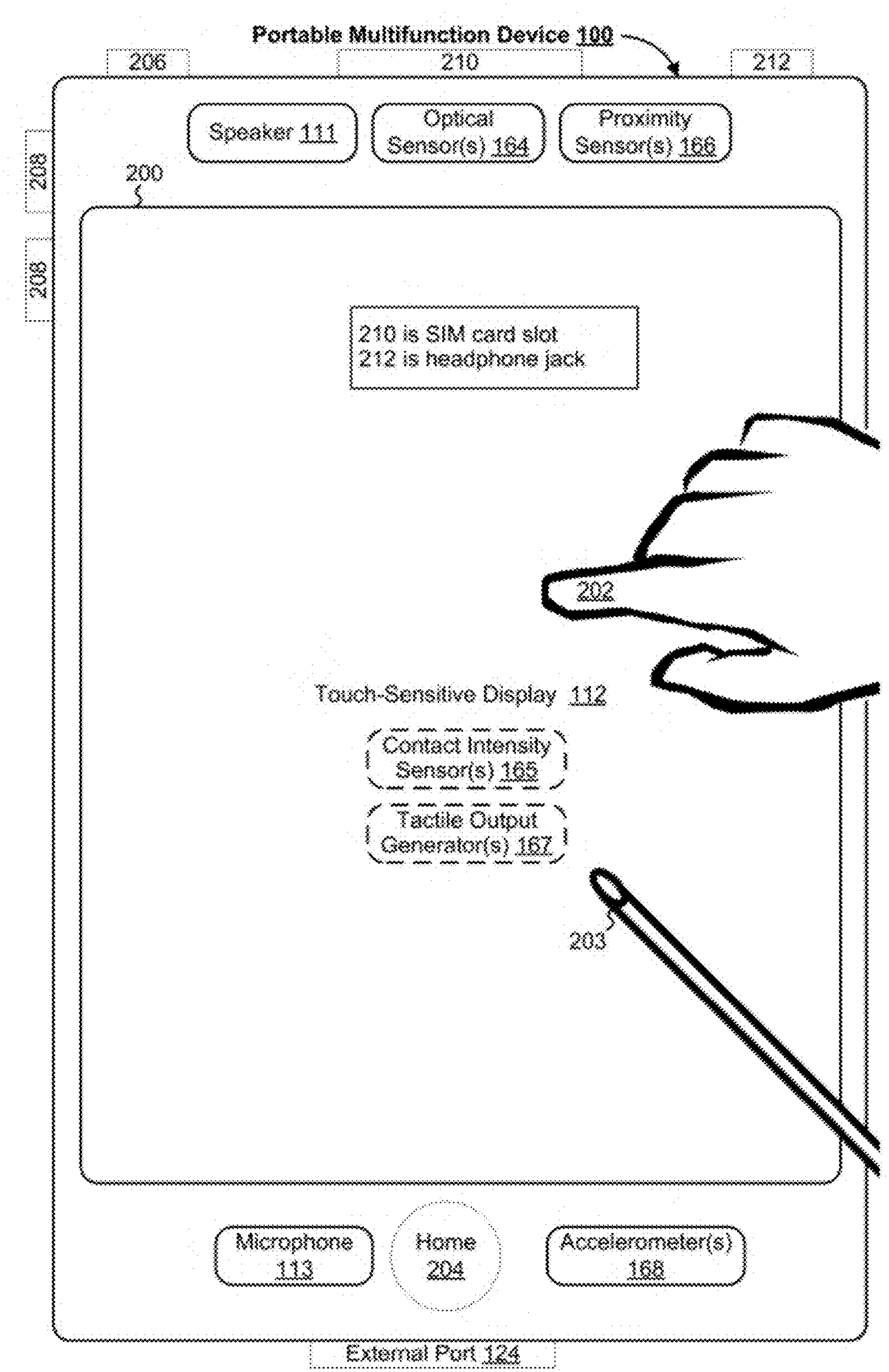
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
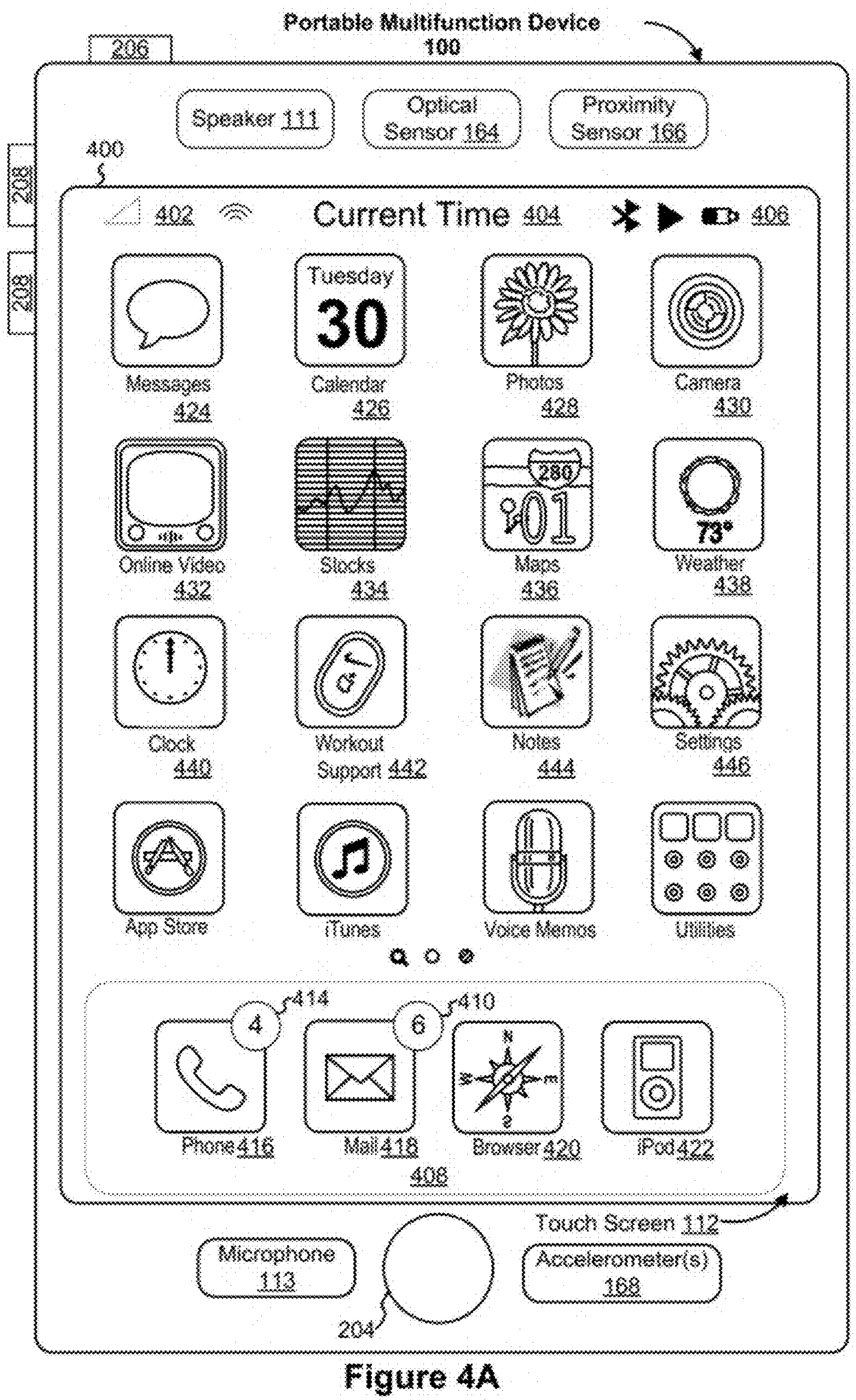
FIG. 4A illustrates an example user interface for a menu of applications on a portable multifunction device in accordance with some embodiments.
Figure 5A:
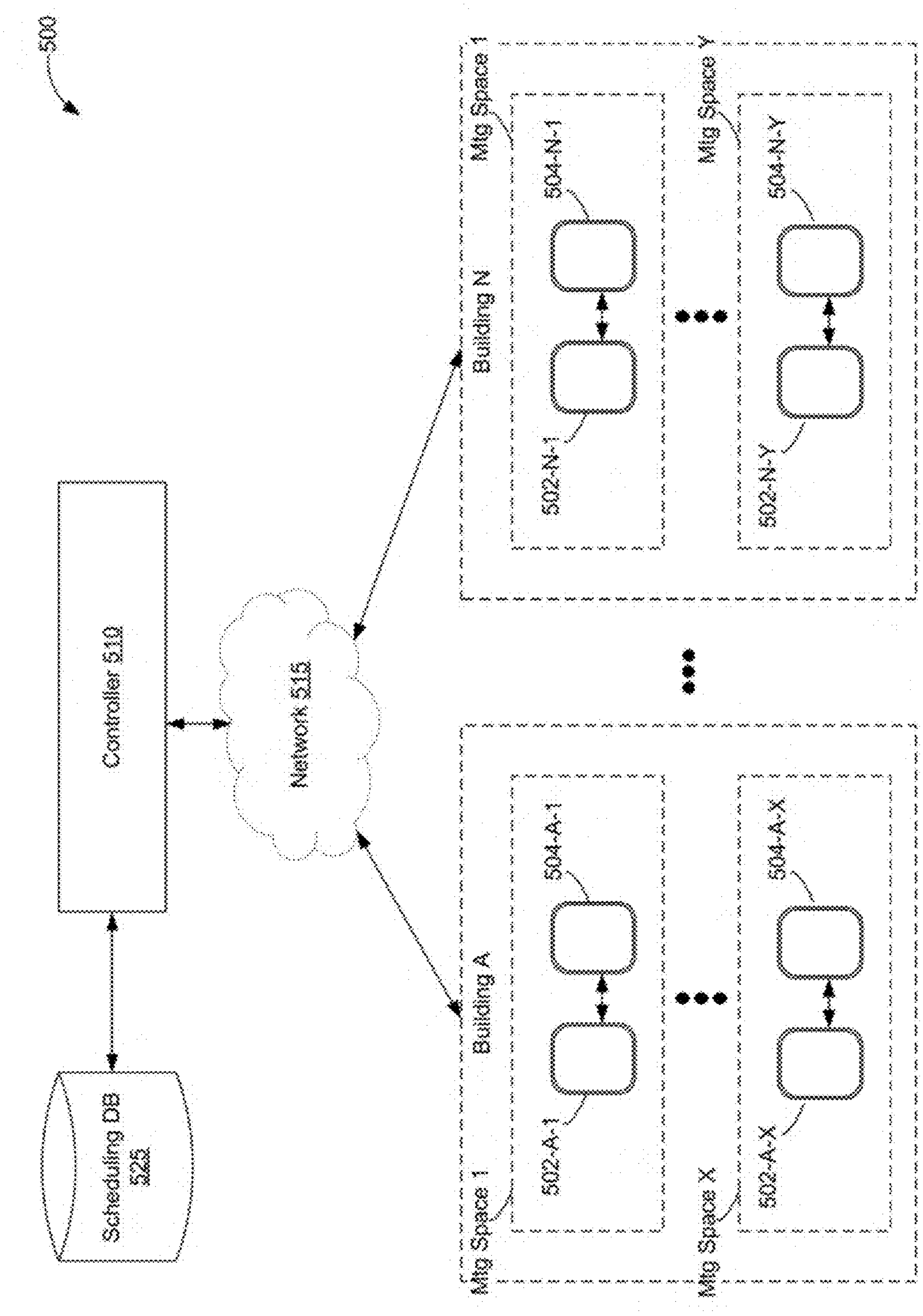
FIG. 5A illustrates an example meeting space data processing environment in accordance with some embodiments.
Figure 5B:
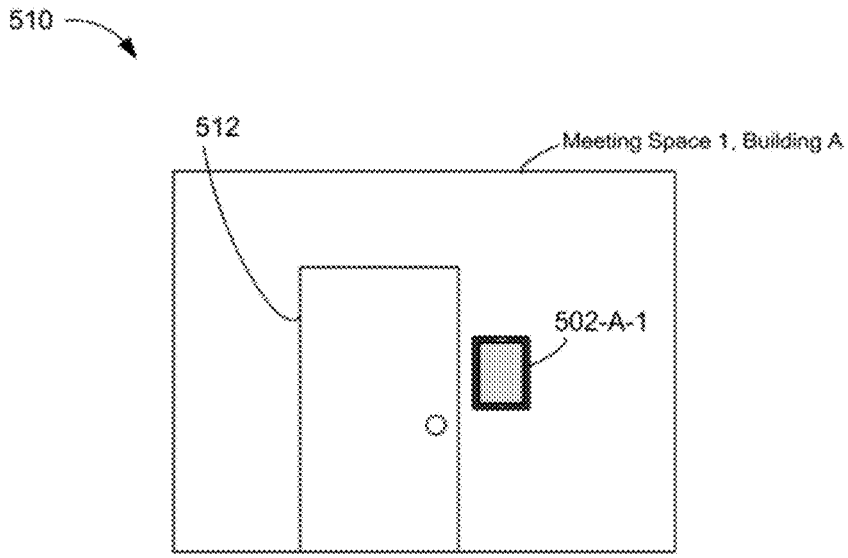
FIG. 5B illustrates an example meeting space in accordance with some embodiments.
Figure 5B:
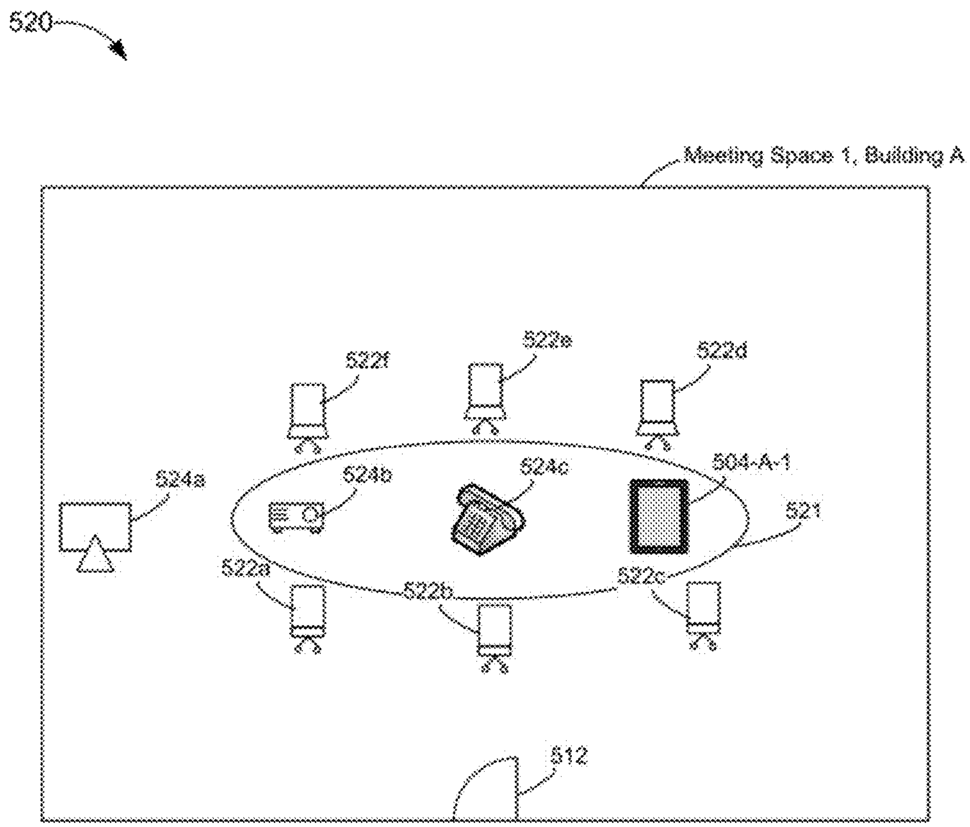

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser"; and
  - Icon 422 for video and music player module 152, also referred to as iPod (trademark of Apple Inc.) module 152, labeled "iPod"; and
- Icons for other applications, such as:
  - Icon 424 for IM module 141, labeled "Text";
  - Icon 426 for calendar module 148, labeled "Calendar";
  - Icon 428 for image management module 144, labeled "Photos";
  - Icon 430 for camera module 143, labeled "Camera";
  - Icon 432 for online video module 155, labeled "Online Video";
  - Icon 434 for stocks widget 149-2, labeled "Stocks";
  - Icon 436 for map module 154, labeled "Map";
  - Icon 438 for weather widget 149-1, labeled "Weather";
  - Icon 440 for alarm clock widget 169-6, labeled "Clock";
  - Icon 442 for workout support module 142, labeled "Workout Support";
  - Icon 444 for notes module 153, labeled "Notes"; and
  - Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
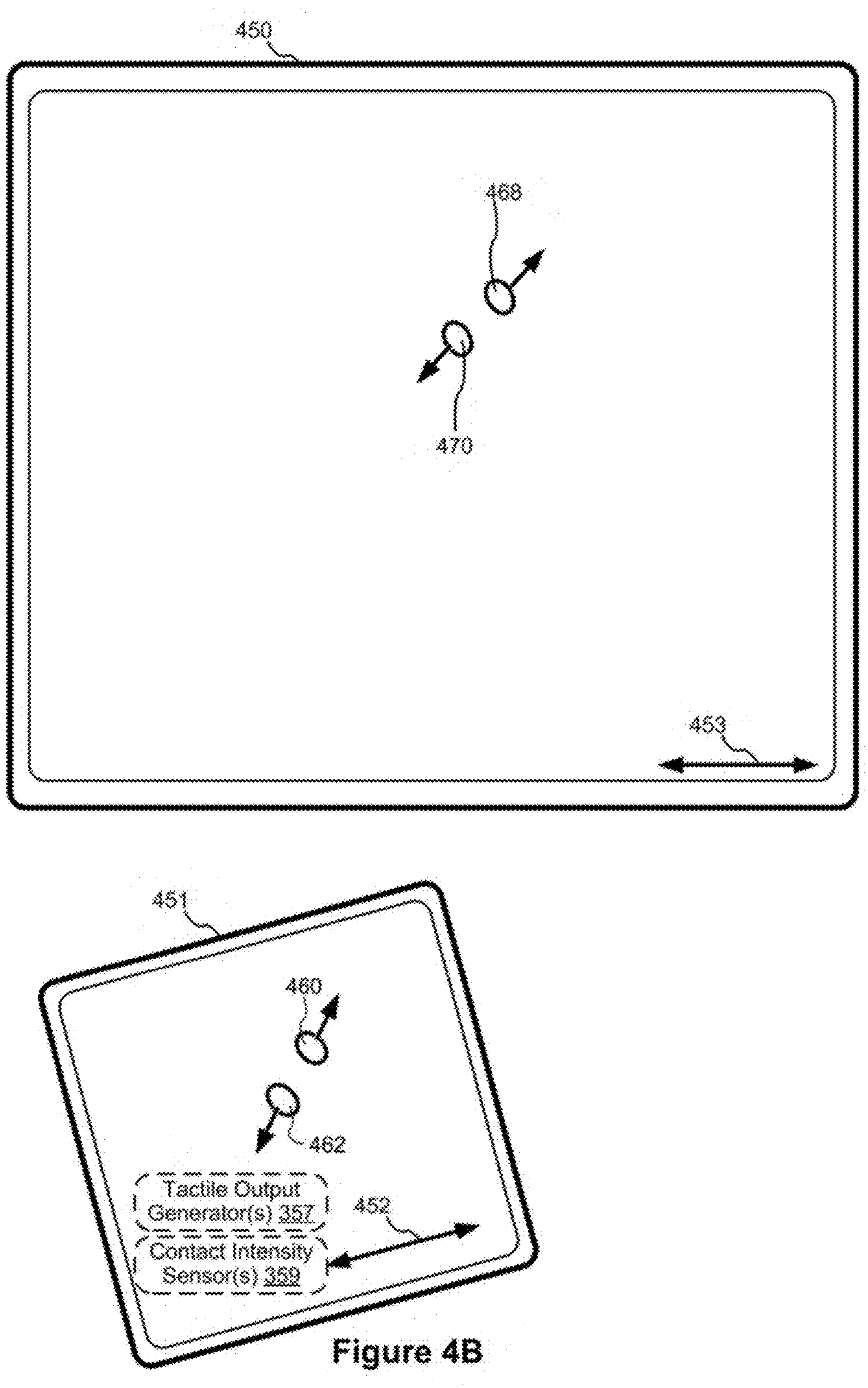
FIG. 4B illustrates an example user interface for a multifunction device with a touch-sensitive surface that is separate from the display in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

USER INTERFACES AND ASSOCIATED PROCESSES

FIG. 5A illustrates an example meeting space data processing environment 500 in accordance with some embodiments. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the meeting space data processing environment 500 includes: a controller 510; a scheduling database 525; a network 515; and buildings A, . . . , N (e.g., a corporate campus).

In some embodiments, the controller 510 includes one or more processors and non-transitory memory. According to some embodiments, the controller 510 manages and maintains a scheduling and reservation system for one or more meeting spaces (e.g., conference rooms, open air meeting spaces, and/or the like) associated with one or more buildings (e.g., a corporate campus). In some embodiments, the controller 510 maintains and manages the scheduling database 525, which includes reservation schedules for each of the one or more meeting spaces. In some embodiments, the controller 510 is operated by a scheduling administrator for a specific building or a campus of buildings. In some embodiments, the controller 510 is also communicatively coupled with a personnel directory that includes a plurality of users (e.g., employees on a corporate campus) and their corresponding login/biometric credentials.

For example, as shown in FIG. 5A, building A includes a plurality of meeting spaces 1, . . . , X. According to some embodiments, each of the meeting spaces is associated with two devices. For example, meeting space 1 of building A includes a first device 502-A-1 and a second device 504-A-1 (e.g., the portable multifunction device 100, or the device 300). Similarly, meeting space X of building A includes a first device 502-A-X and a second device 504-A-X (e.g., the portable multifunction device 100, or the device 300).

For example, as shown in FIG. 5A, building N includes a plurality of meeting spaces 1, . . . , Y. According to some embodiments, each of the meeting spaces is associated with two devices. For example, meeting space 1 of building N includes a first device 502-N-1 and a second device 504-N-1 (e.g., the portable multifunction device 100, or the device 300). Similarly, meeting space Y of building N includes a first device 502-N-Y and a second device 504-N-Y (e.g., the portable multifunction device 100, or the device 300).

For ease of reference, the first devices 502-A-1, . . . , 502-A-X and 502-N-1, . . . , 502-N-Y are collectively referred to as first devices 502. For ease of reference, the second devices 504-A-1, . . . , 504-A-X and 504-N-1, . . . , 504-N-Y are collectively referred to as second devices 504. In some embodiments, the first devices 502 are located outside of the door to the corresponding meeting spaces, and the second devices 504 are located inside of the corresponding meeting spaces. In some embodiments, a single device for a meeting space replaces the first device 502 and the second device 504.

In some embodiments, the controller 510 obtains information from and provides scheduling information to the first devices 502 and the second devices 504 through a network 515 which includes any LAN and/or WAN such as an intranet, an extranet, a virtual private network, and/or portions of the Internet.

In some embodiments, users are able to remotely schedule a reservation for a meeting space through an online portal that indicates the availability of meetings spaces on the campus of buildings. In some embodiments, users are also able to make local reservations by accessing either the first device 502 or the second device 504 associated with a meeting space. For example, meeting space 1, building A is available for use, and a user takes over meeting space 1, building A for the next hour using the first device 502-A-1 located outside the door to meeting space 1, building A. In this example, the first device 502-A-1 sends a message to the controller 510 indicating that meeting space 1, building A is unavailable for the next hour. Continuing with this example, the controller 510 updates the scheduling database 525 to reflect the unavailability of meeting space 1, building A for the next hour.

FIG. 5B illustrates an example meeting space corresponding to meeting space 1, building A in accordance with some embodiments. FIG. 5B shows an external head-on view 510 of meeting space 1, building A. As shown in FIG. 5B, a door 512 is the point of entry to meeting space 1, building A, and the first device 502-A-1 is fixed to the wall outside of meeting space 1, building A and adjacent to the door 512 to meeting space 1, building A.

FIG. 5B also shows an internal plan view 520 of meeting space 1, building A. As shown in FIG. 5B, meeting space 1, building A includes a table 521 and a plurality of chairs 522*a*, 522*b*, 522*c*, 522*d*, 522*e*, and 522*f*. The meeting space 1, building A also includes a display 524*a*, a projector 524*b*, and a telephone 524*c*. One of ordinary skill in the art will appreciate that FIG. 5B shows arbitrary equipment included in the meeting space 1, building A. As such, in some embodiments, the meeting space 1, building A includes different equipment and/or additional equipment. In one example, the meeting space 1, building A includes a first display 524*a*-1 and a second display 524*a*-2. As shown in FIG. 5B, the meeting space 1, building A further includes the second device 504-A-1 (e.g., a portable tablet or laptop).

Attention is now directed toward embodiments of user interfaces ("UI") and associated processes that may be implemented on an electronic device, such as a portable multifunction device 100 with a display, a touch-sensitive surface, and optionally one or more sensors to detect intensity of contacts with the touch-sensitive surface, or a device 300 with one or more processors, non-transitory memory, a display, and an input device.

Figure 6A:
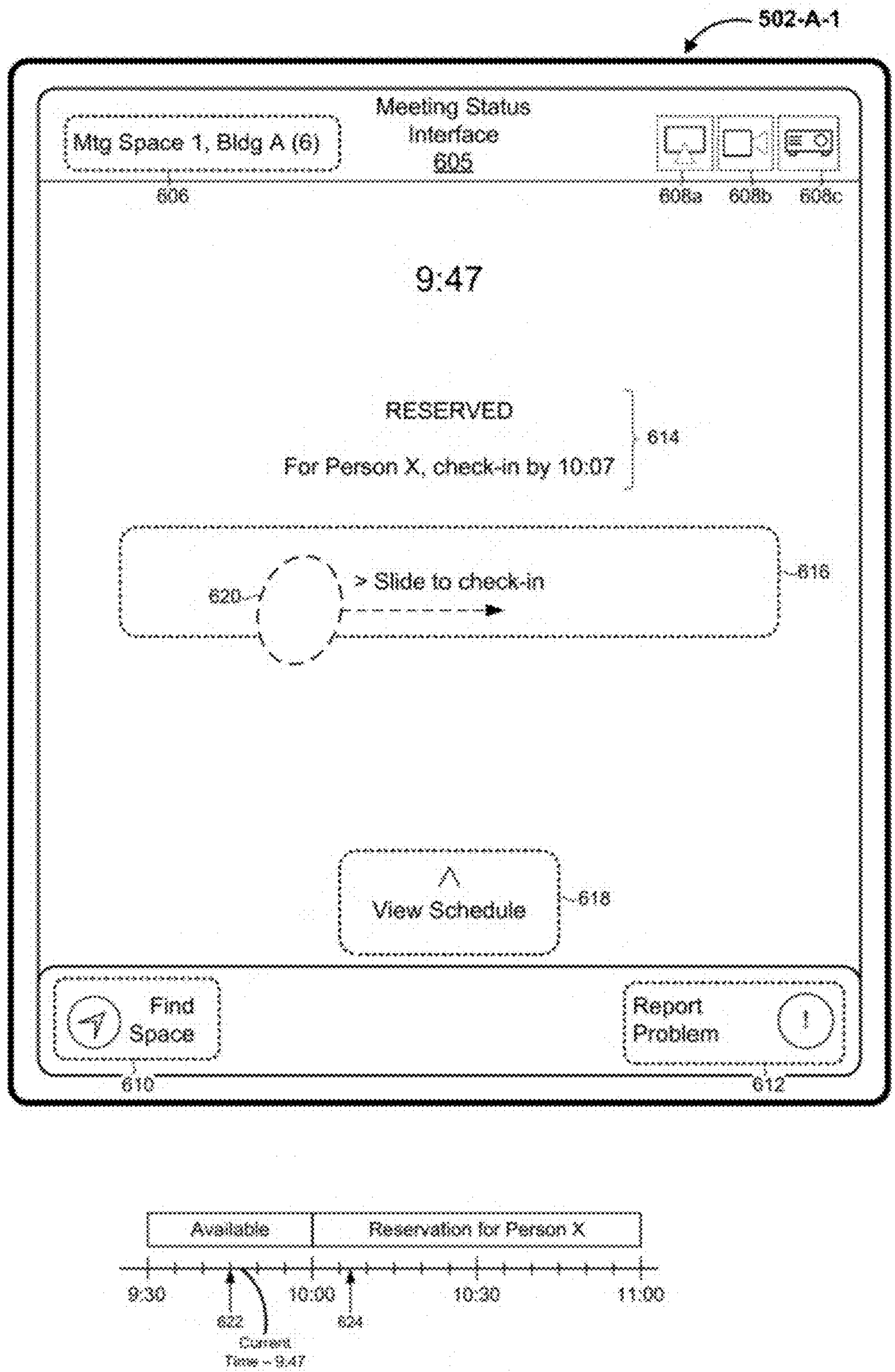
FIGS. 6A-6W illustrate example user interfaces for managing and interacting with meeting spaces in accordance with some embodiments.
Figure 6B:
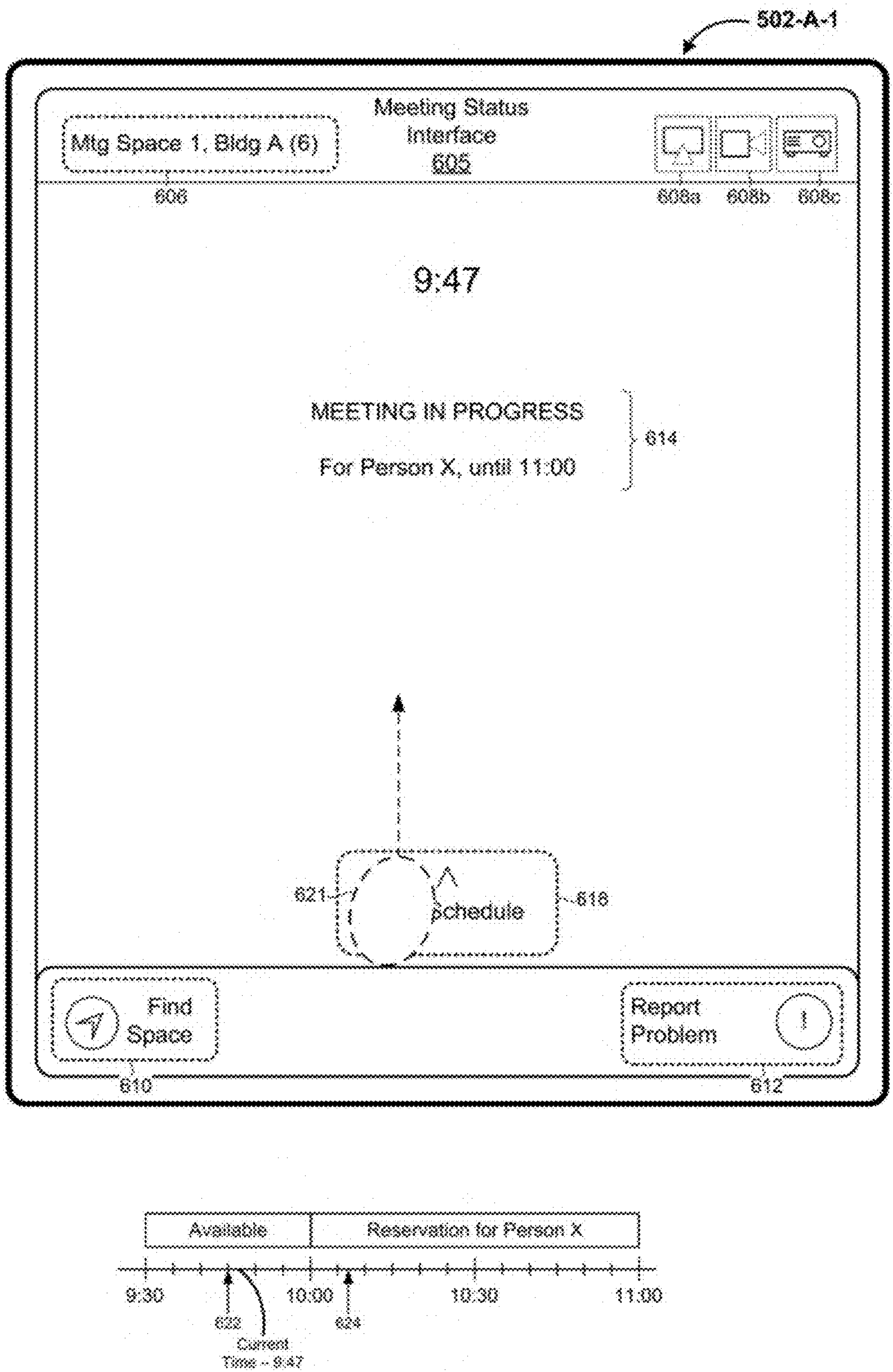
Figure 6C:
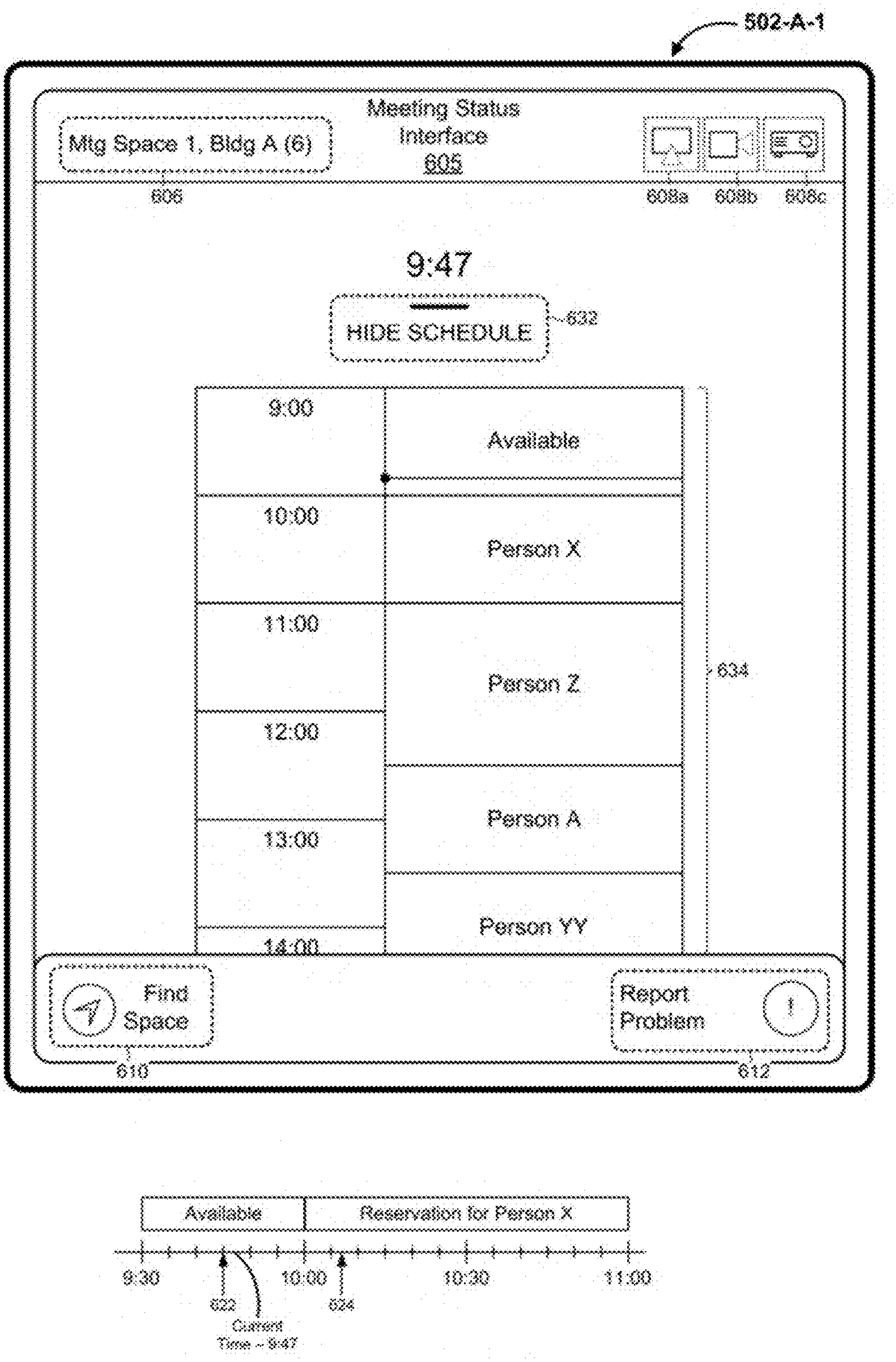
Figure 6D:
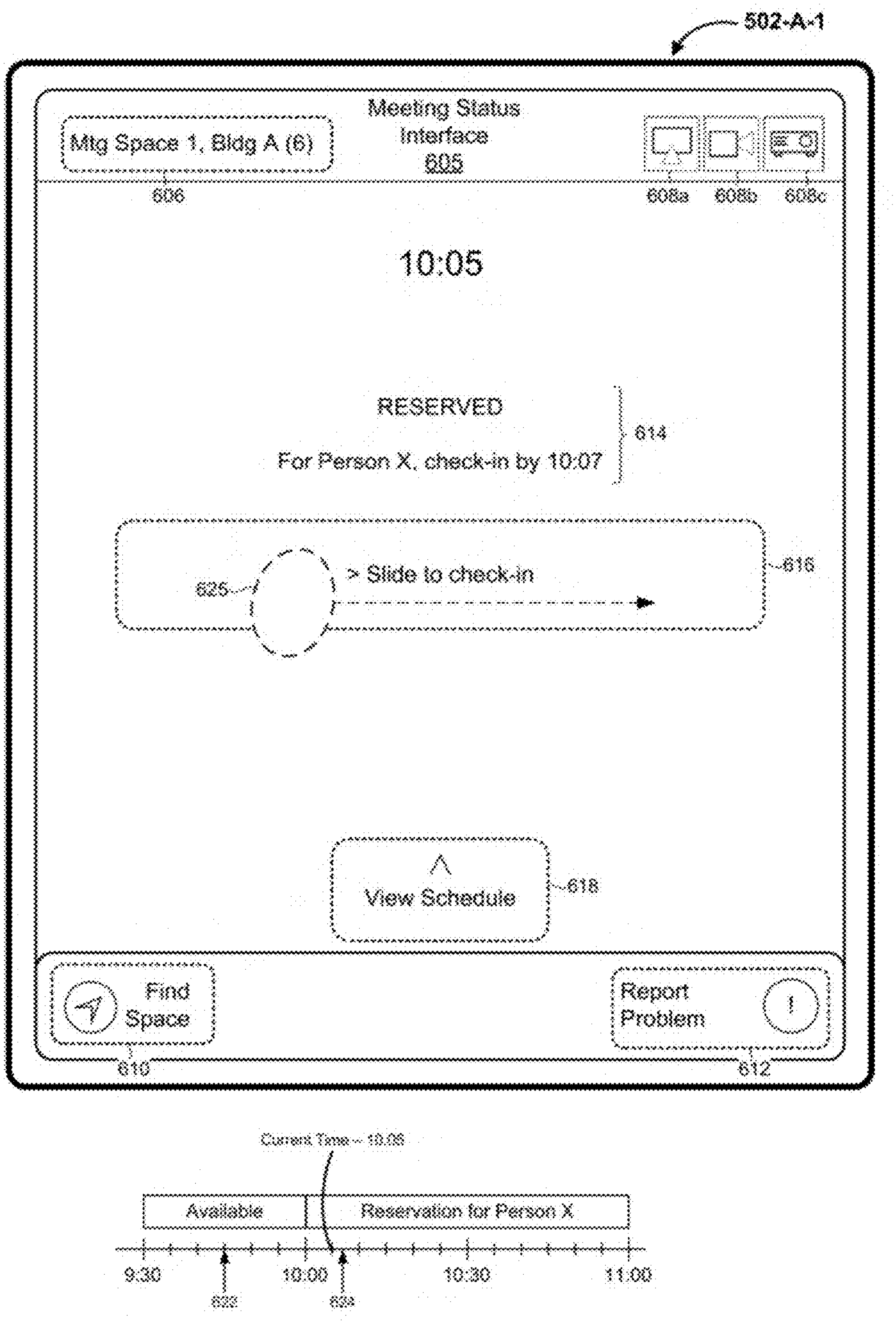
Figure 6E:
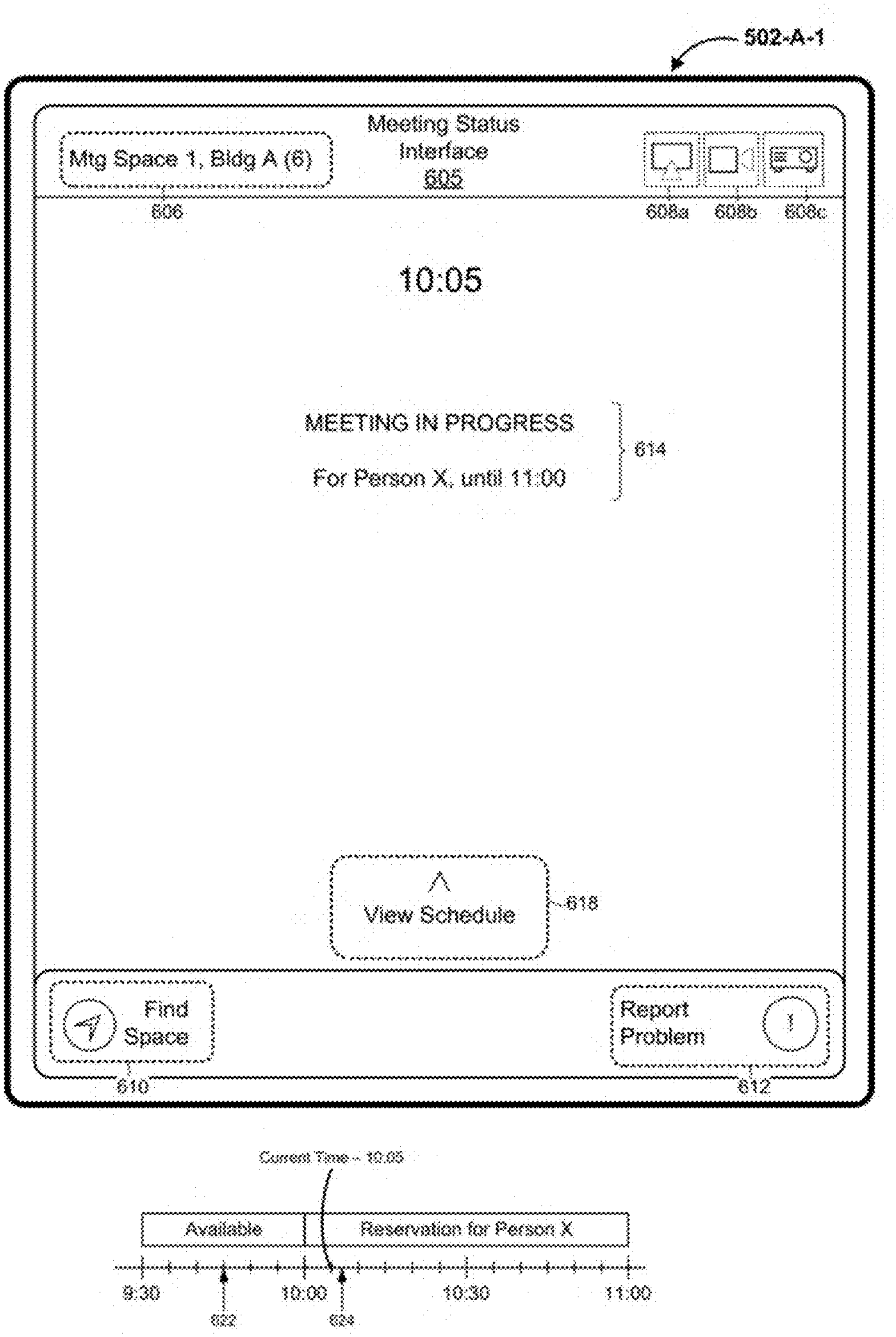
Figure 6F:
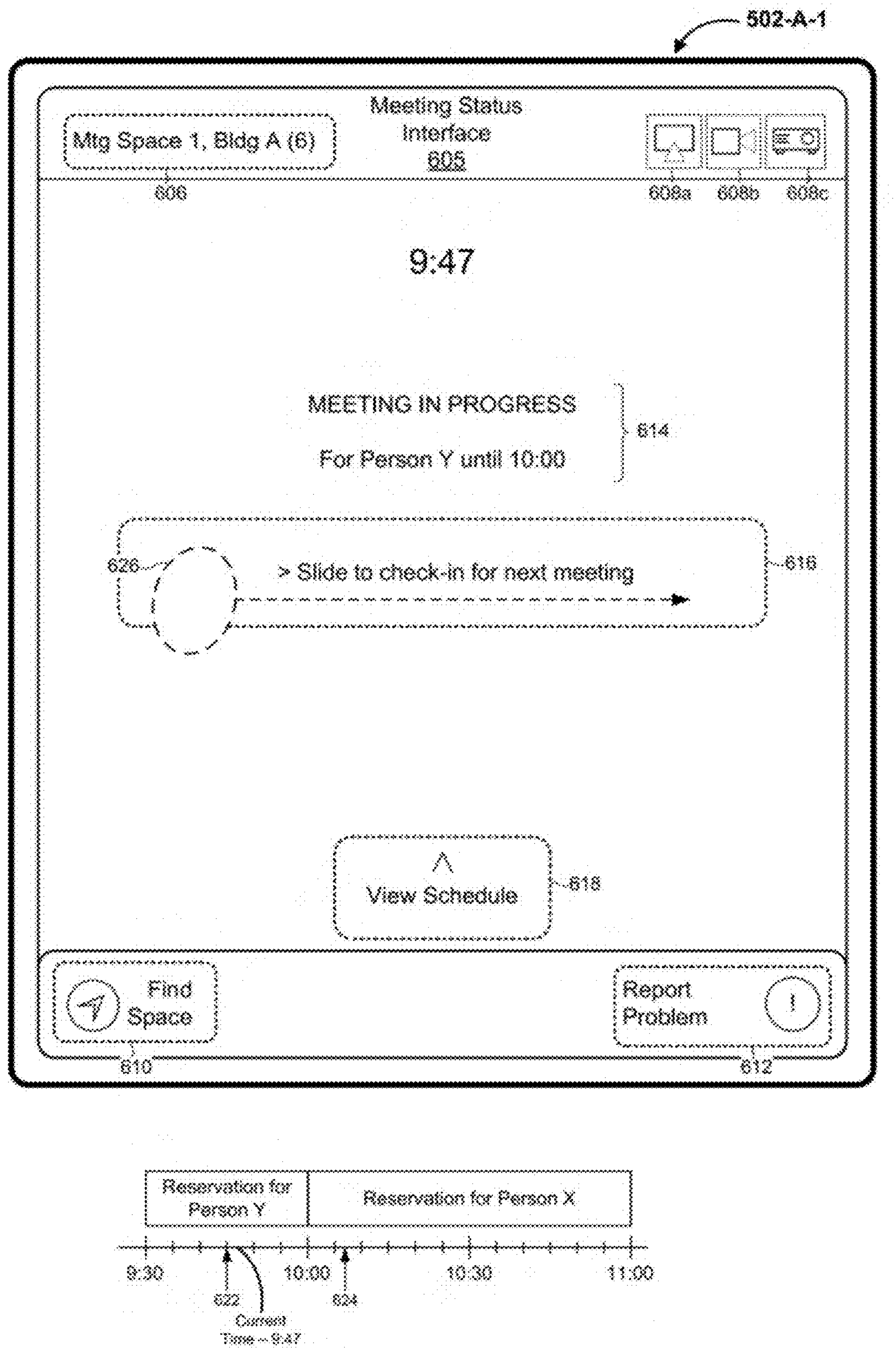
Figure 6G:
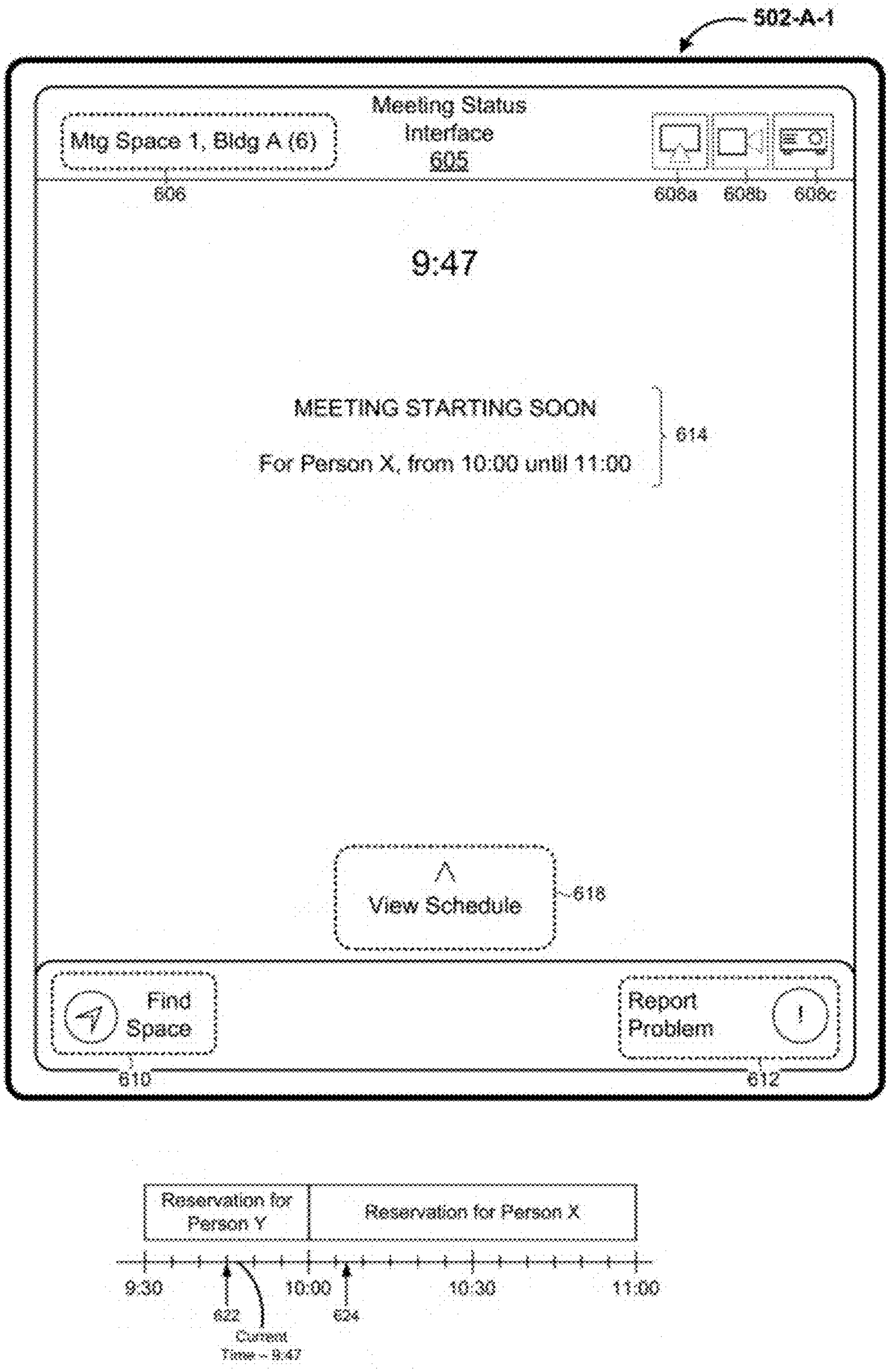
Figure 6H:
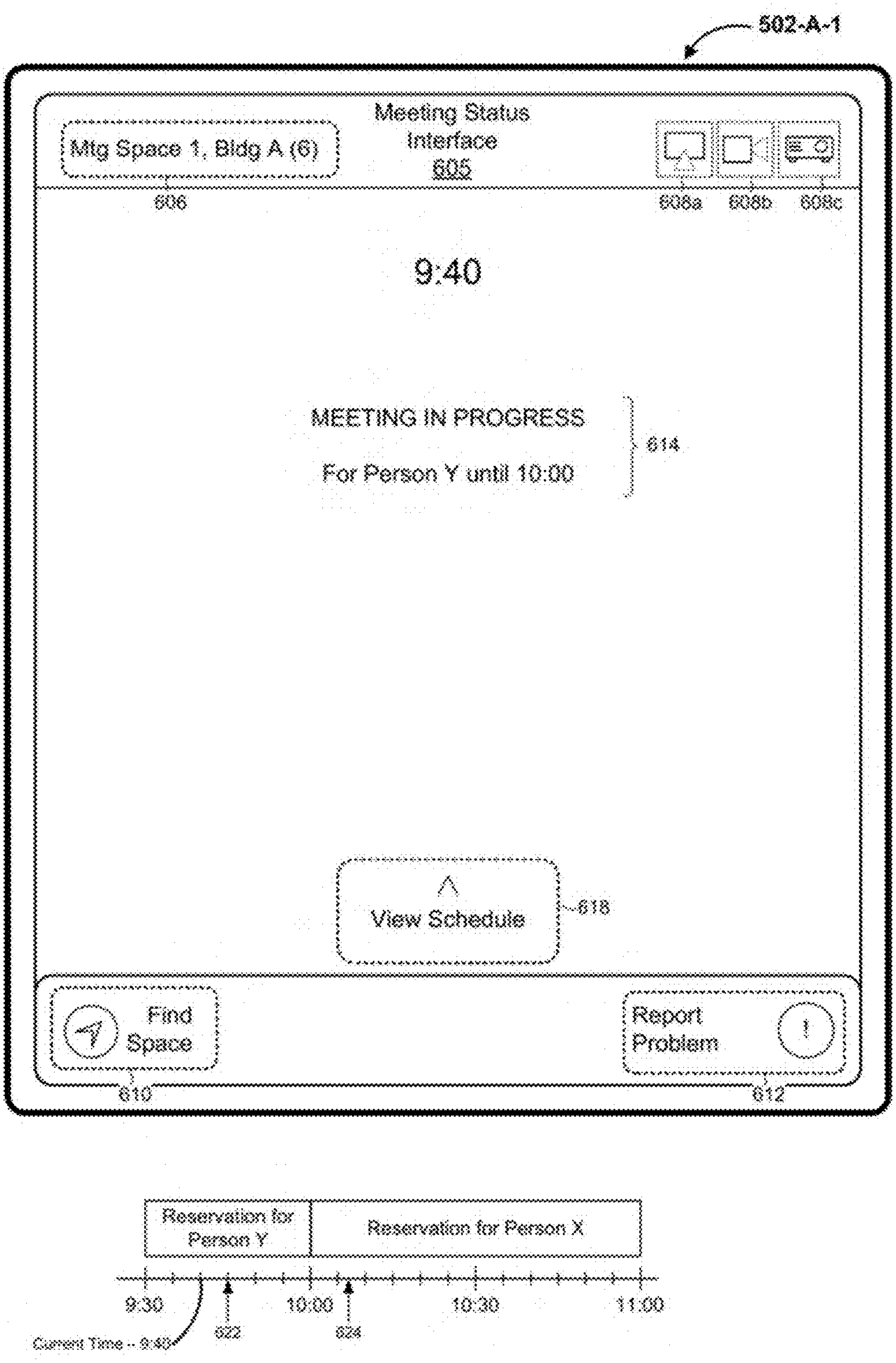
Figure 6I:
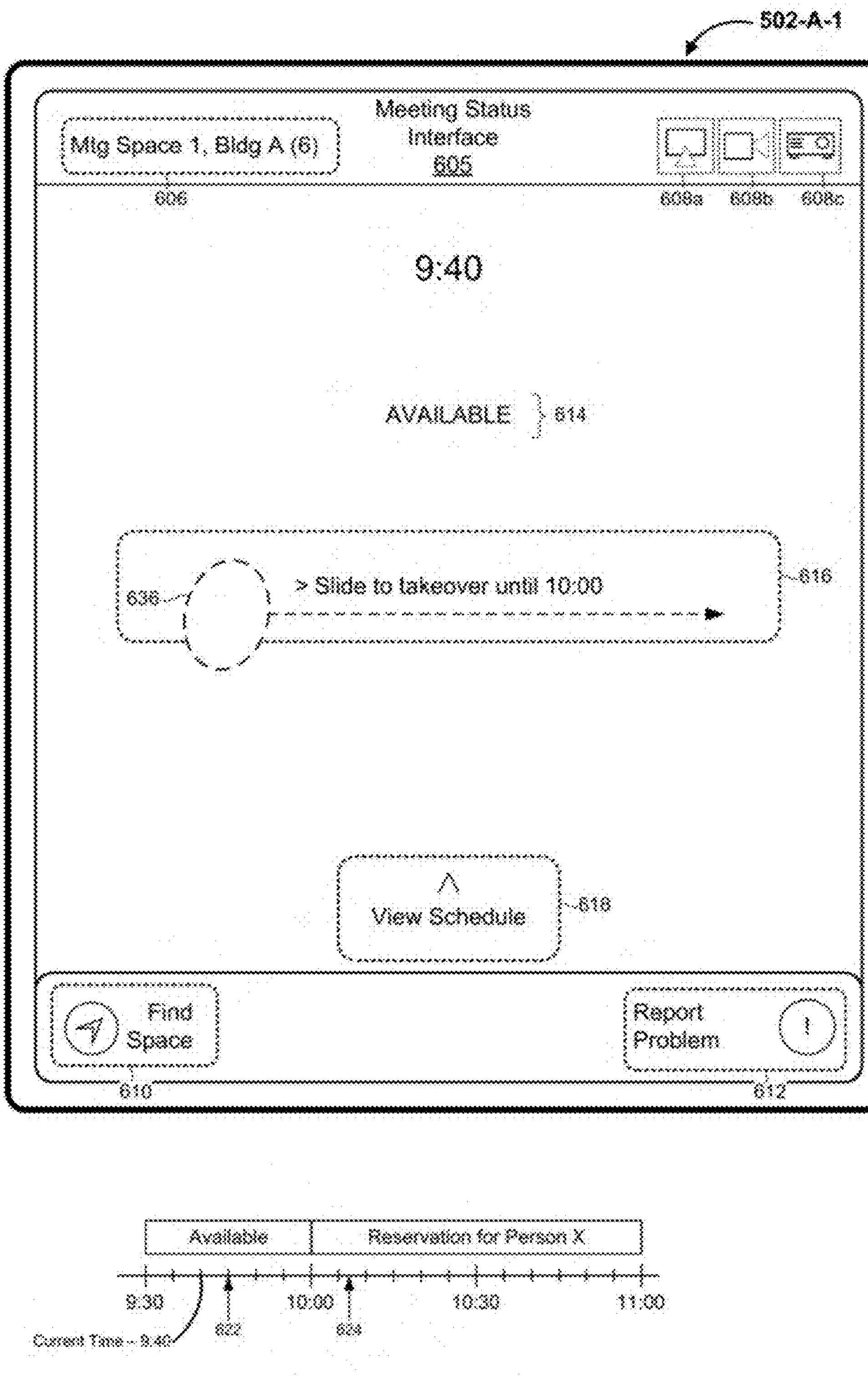
Figure 6J:
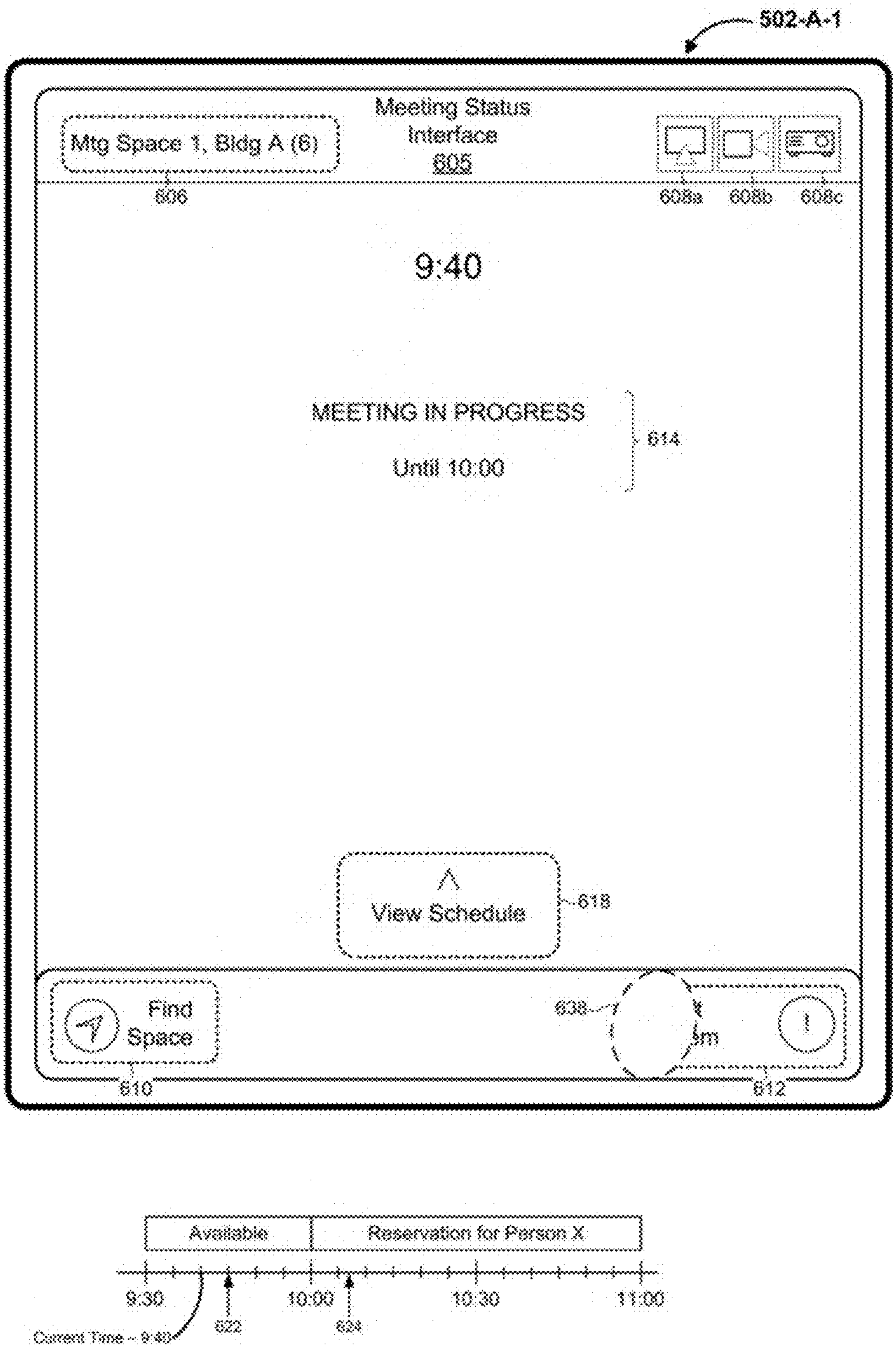
Figure 6K:
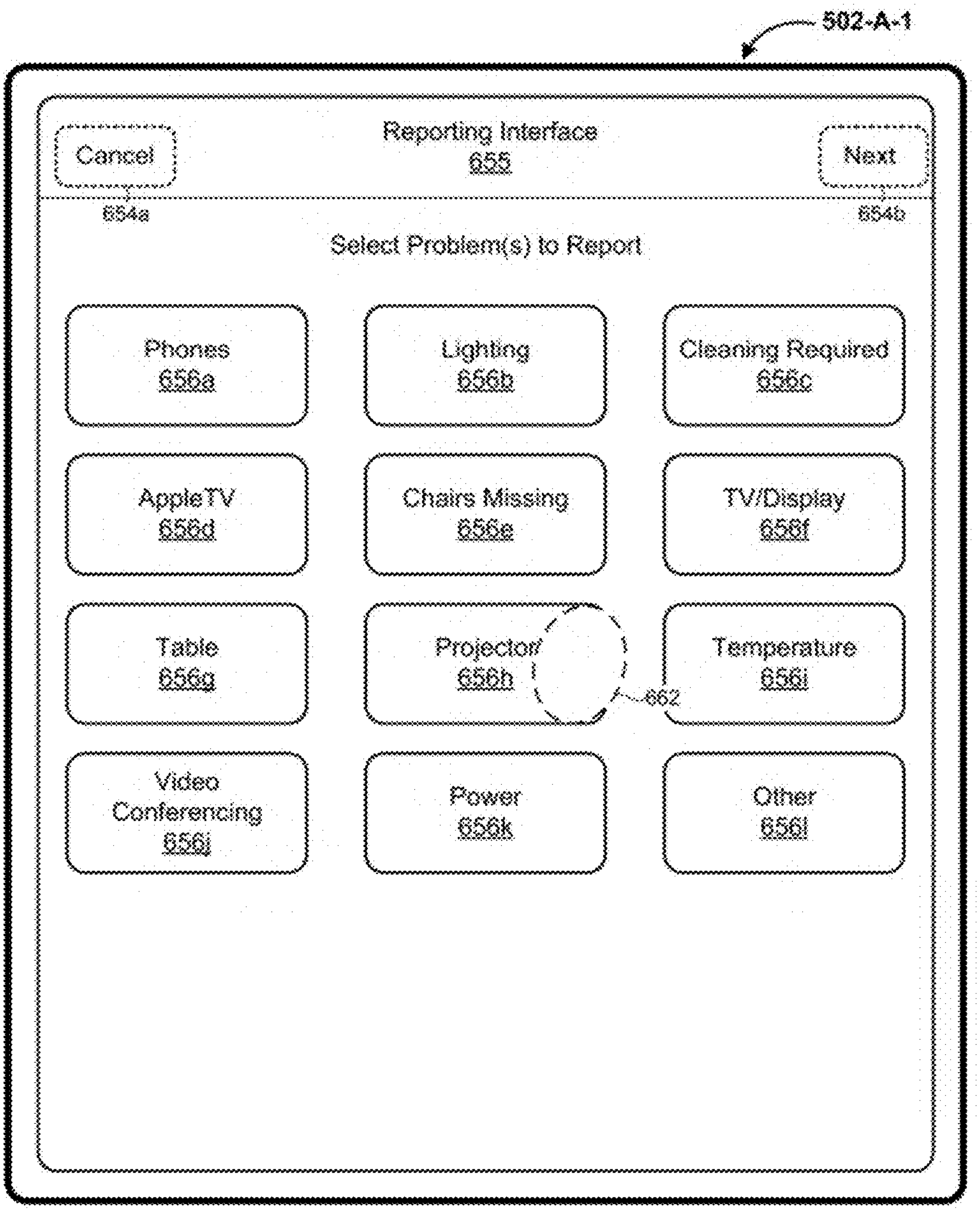
Figure 6L:
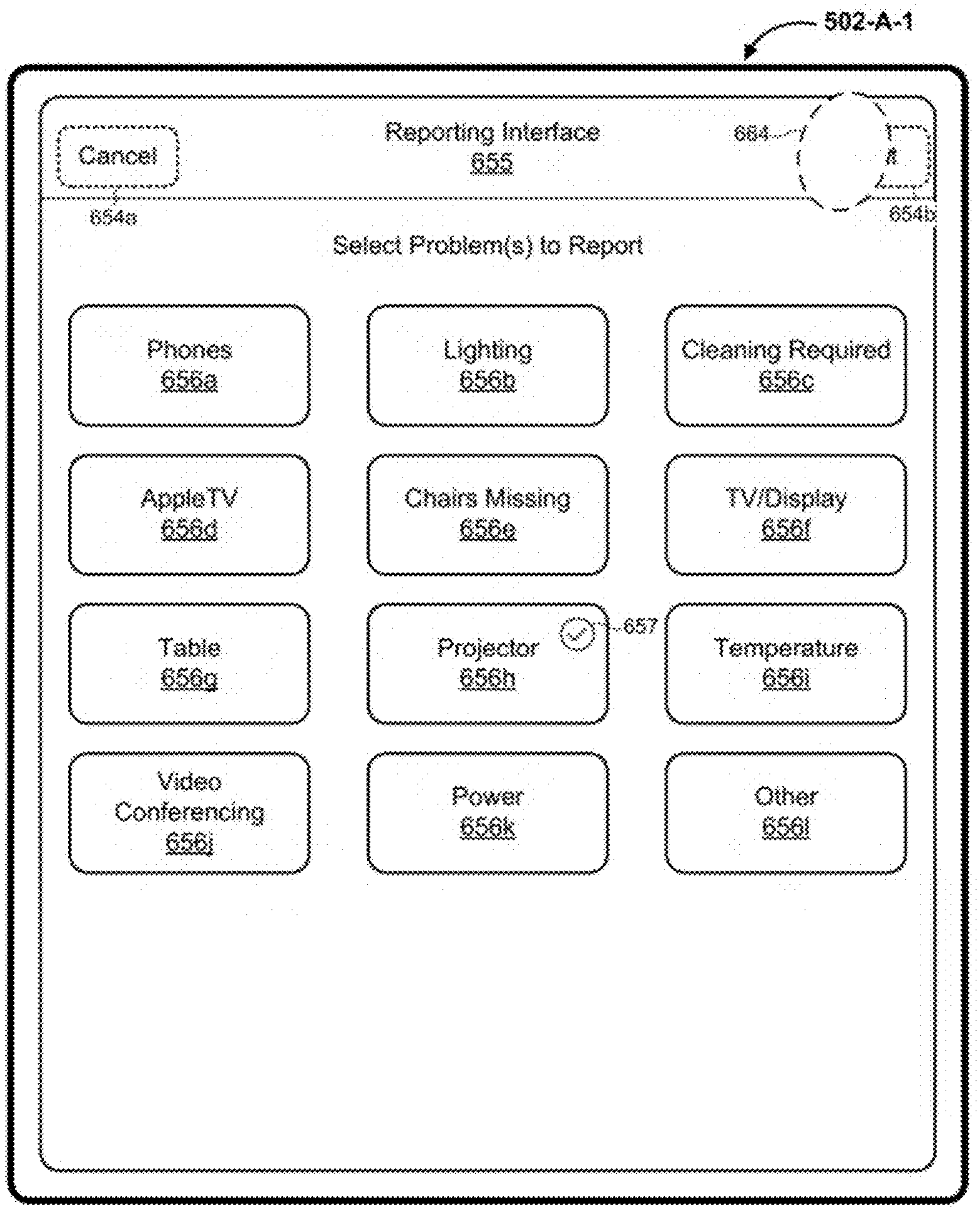
Figure 6M:
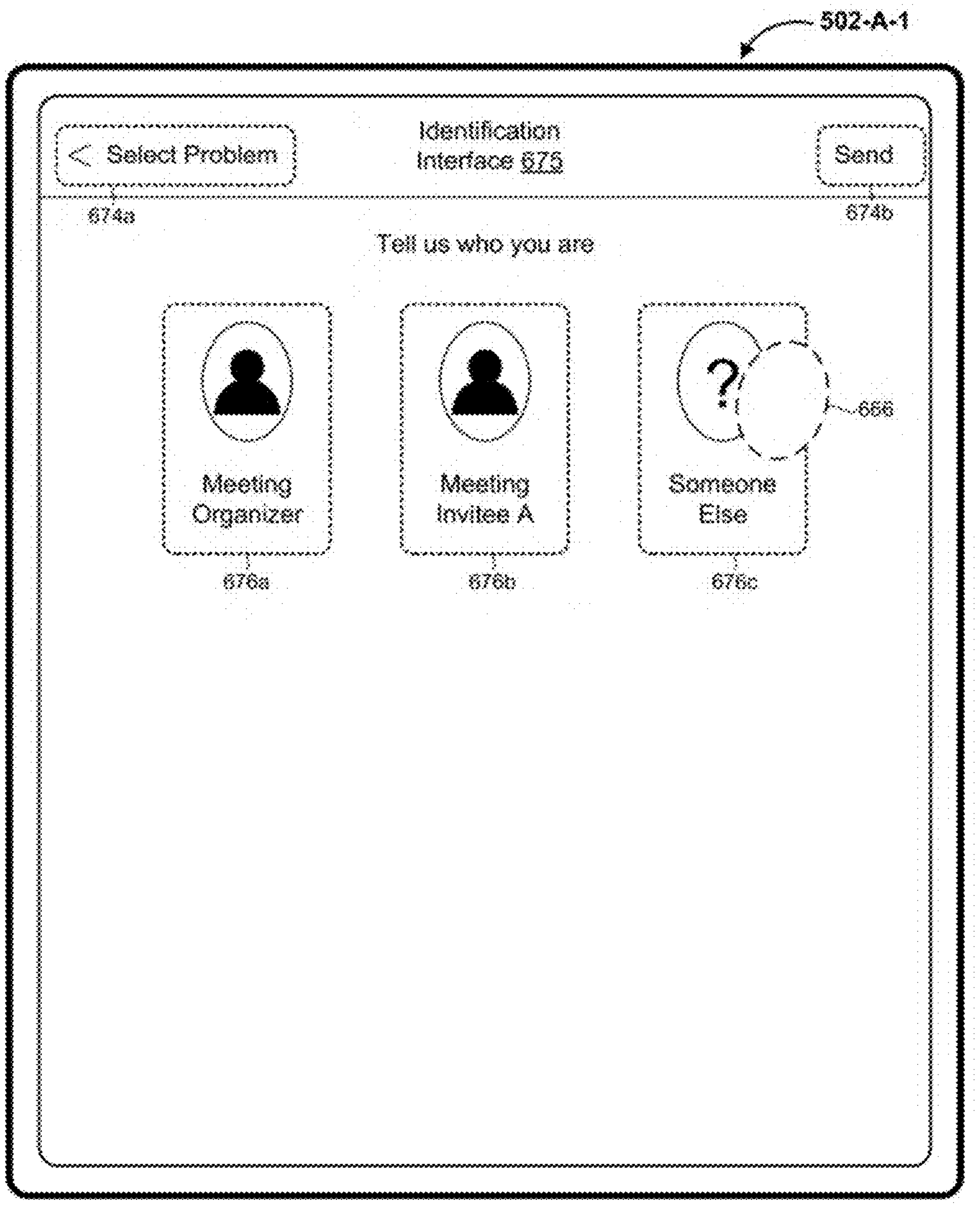
Figure 6N:
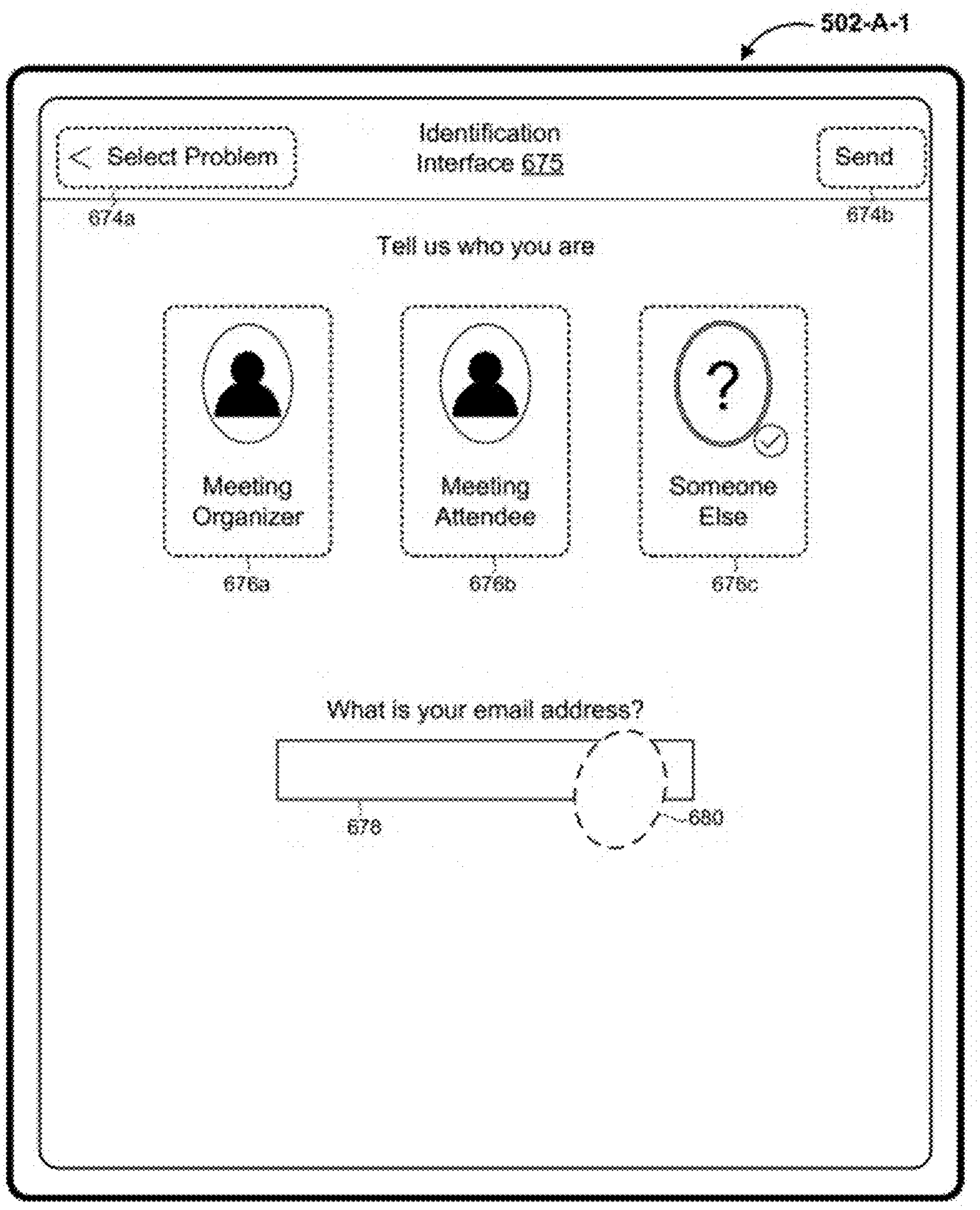
Figure 6O:
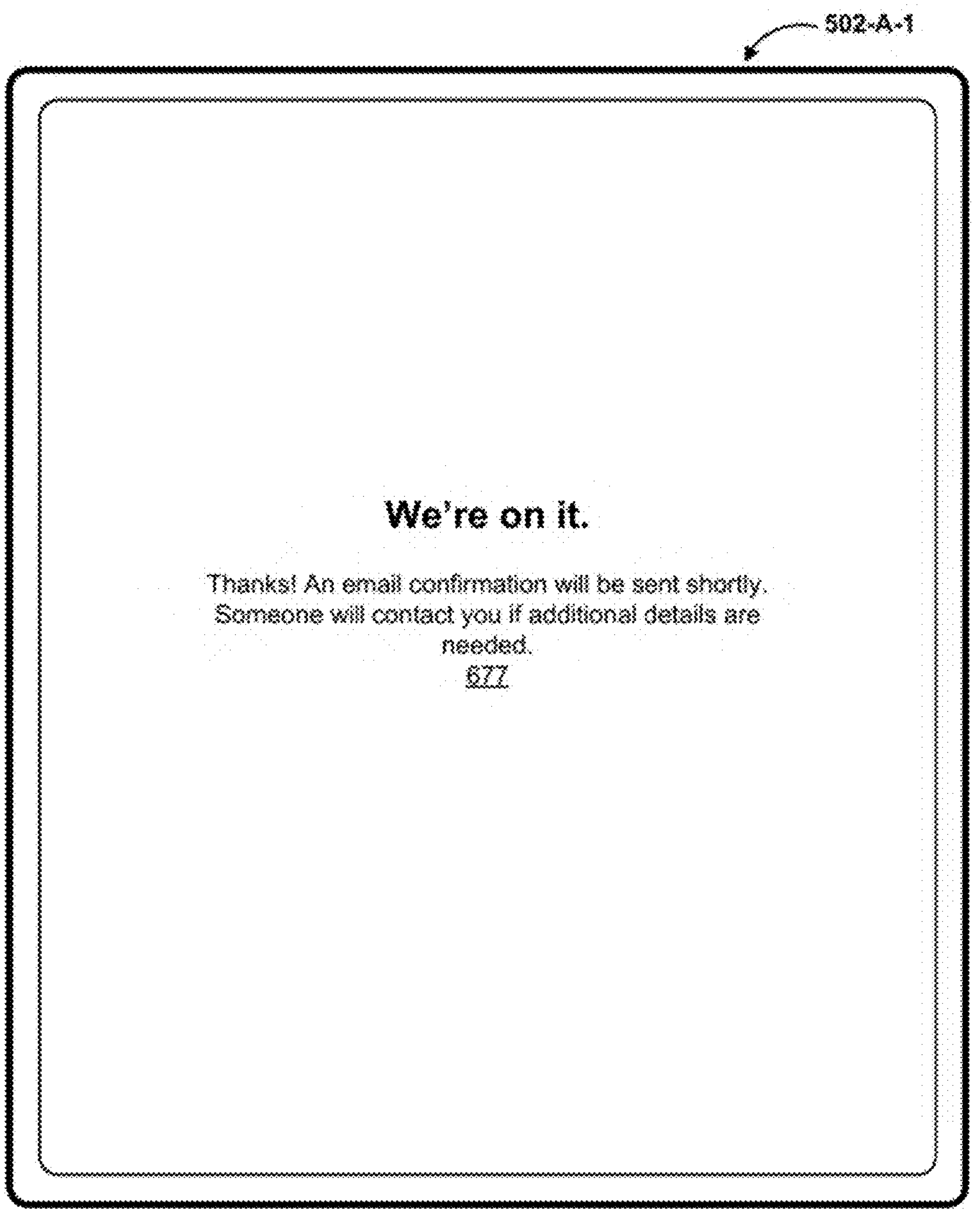
Figure 6P:
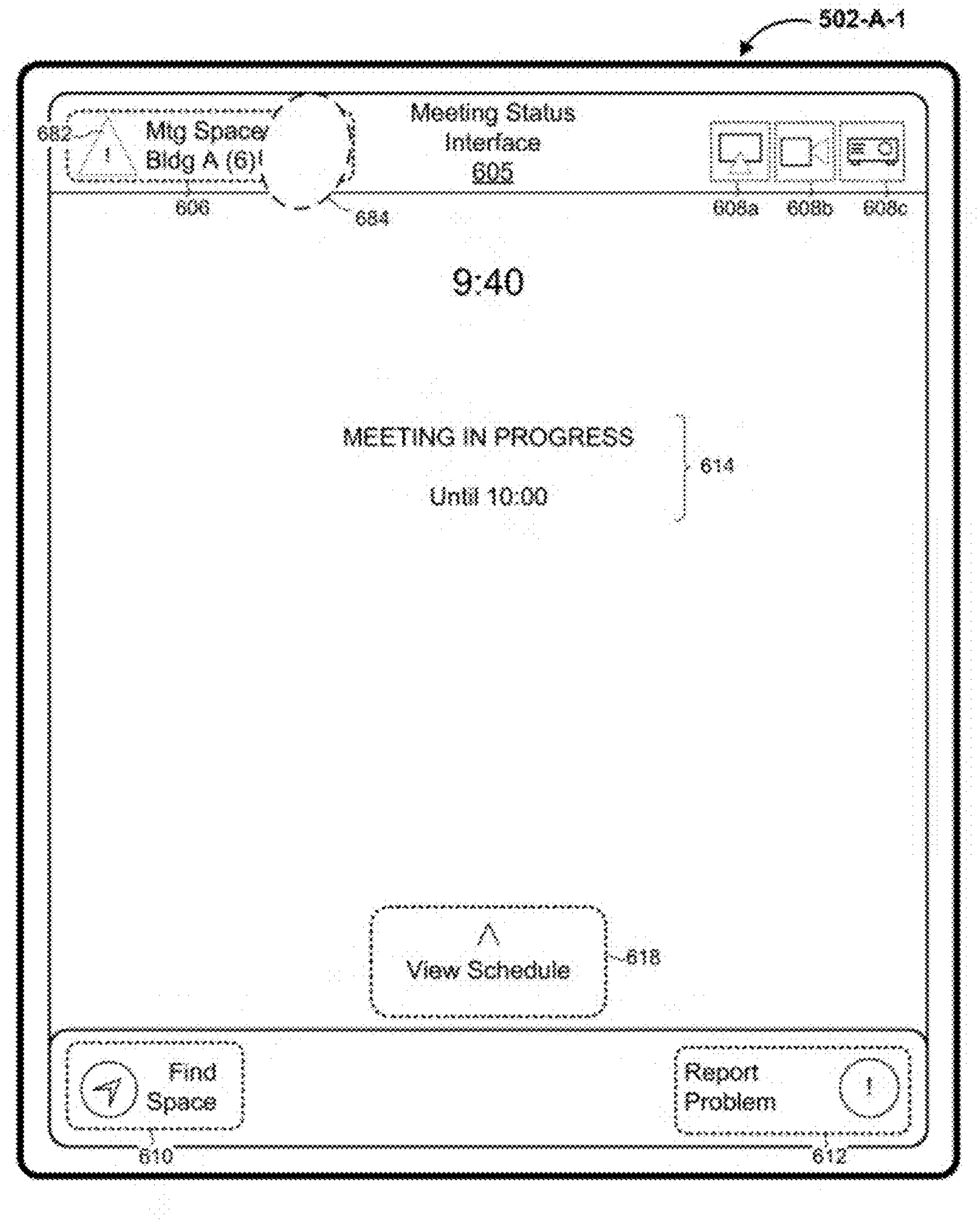
Figure 6Q:
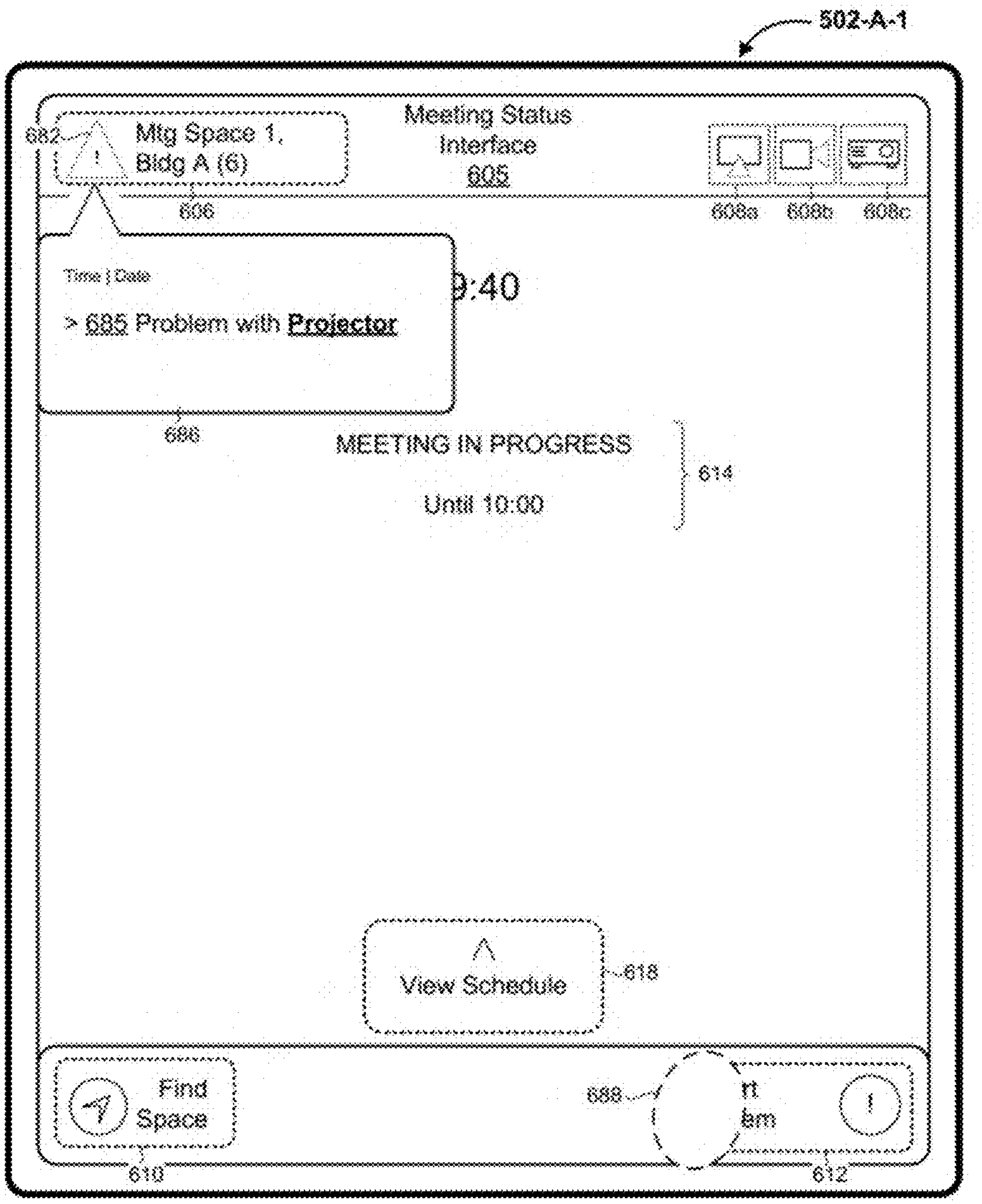
Figure 6R:
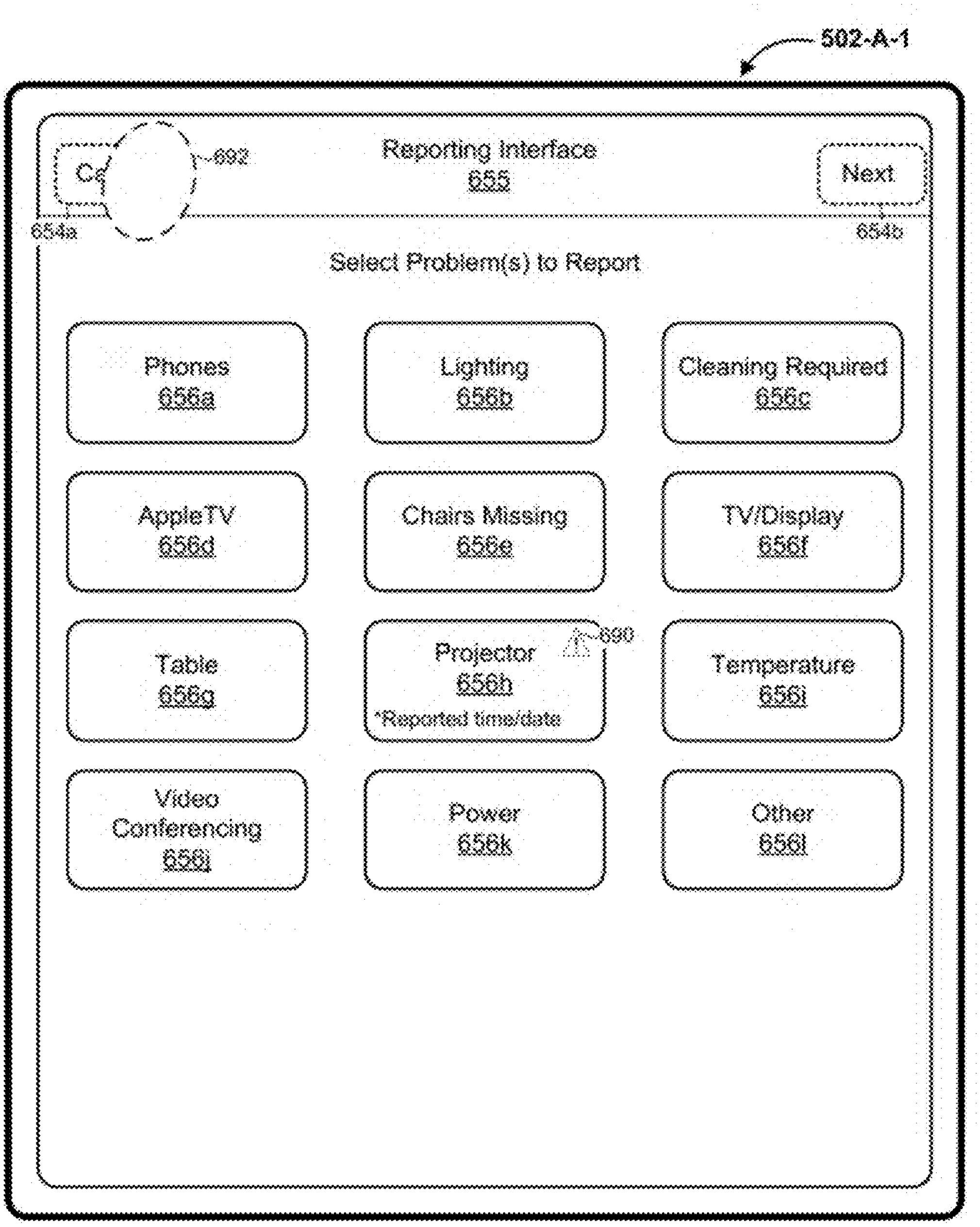
Figure 6S:
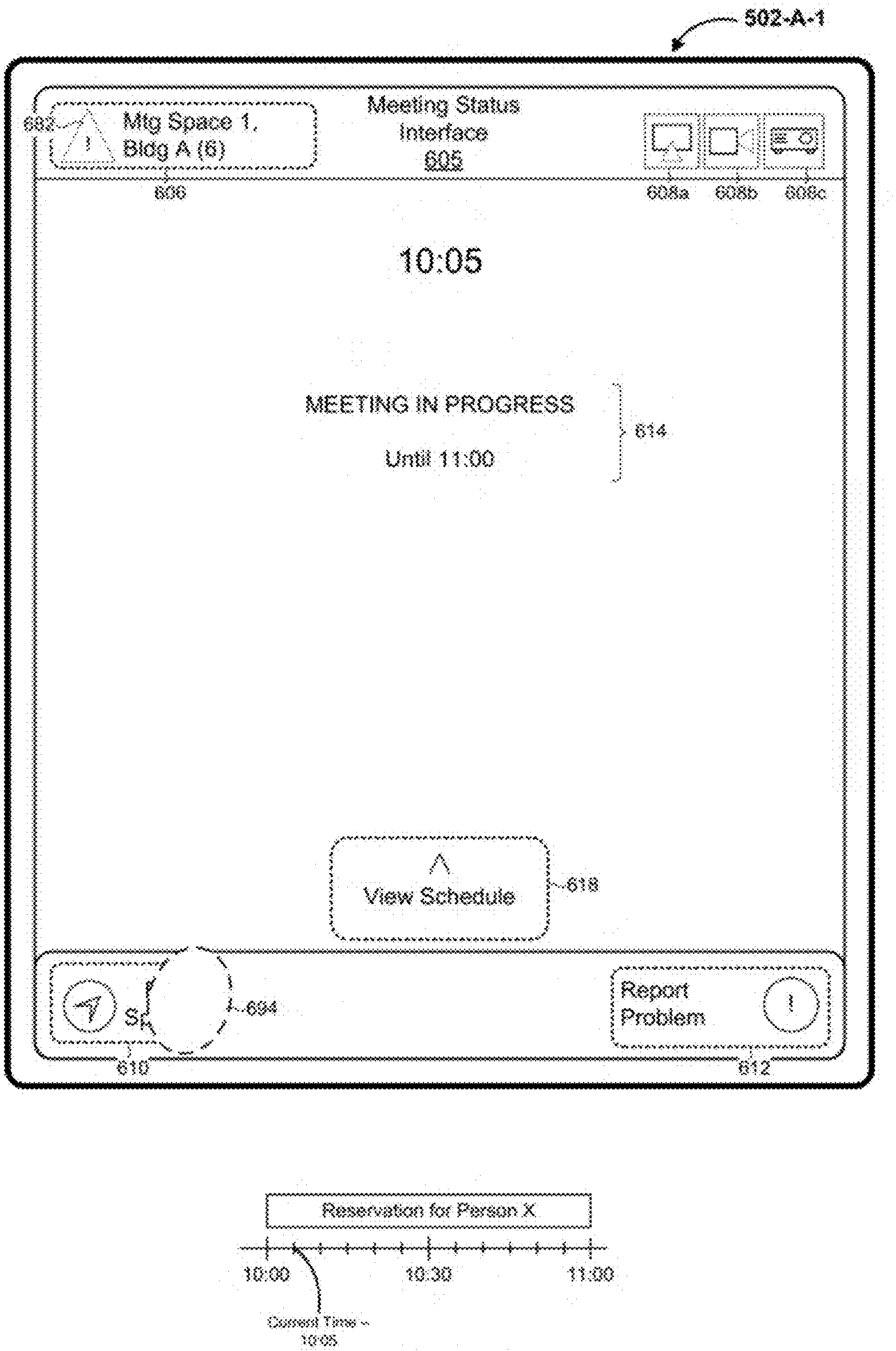
Figure 6T:
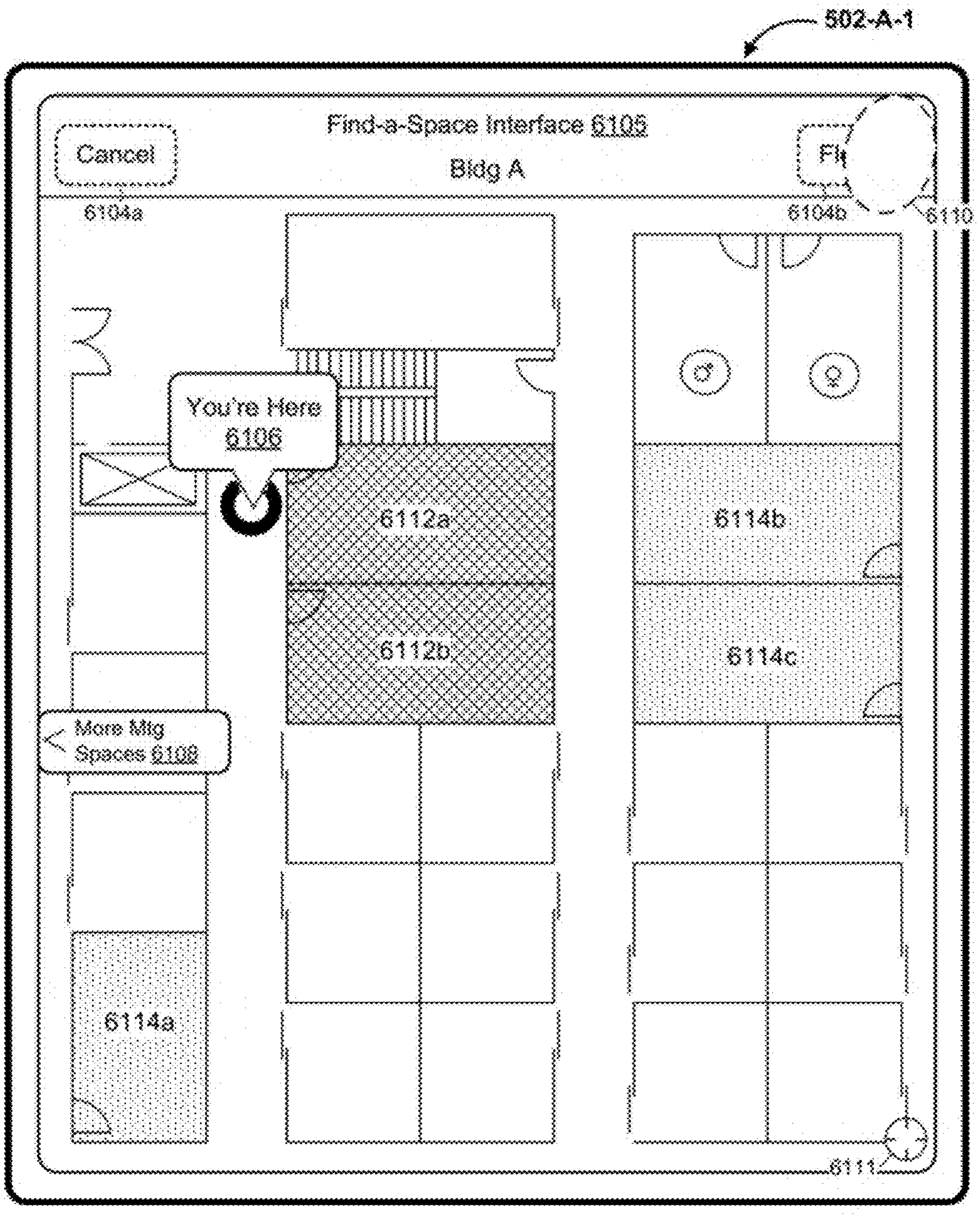
Figure 6U:
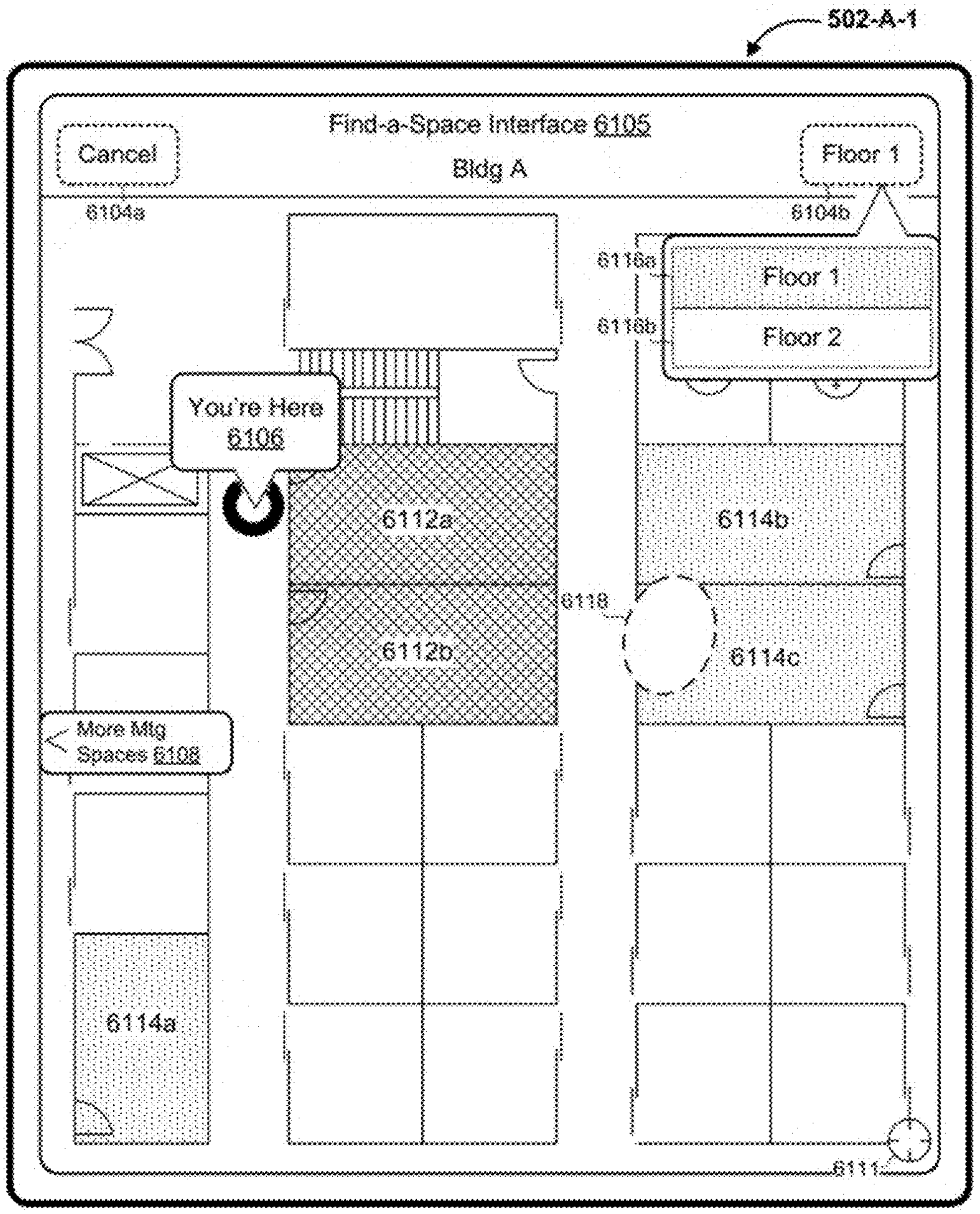
Figure 6V:
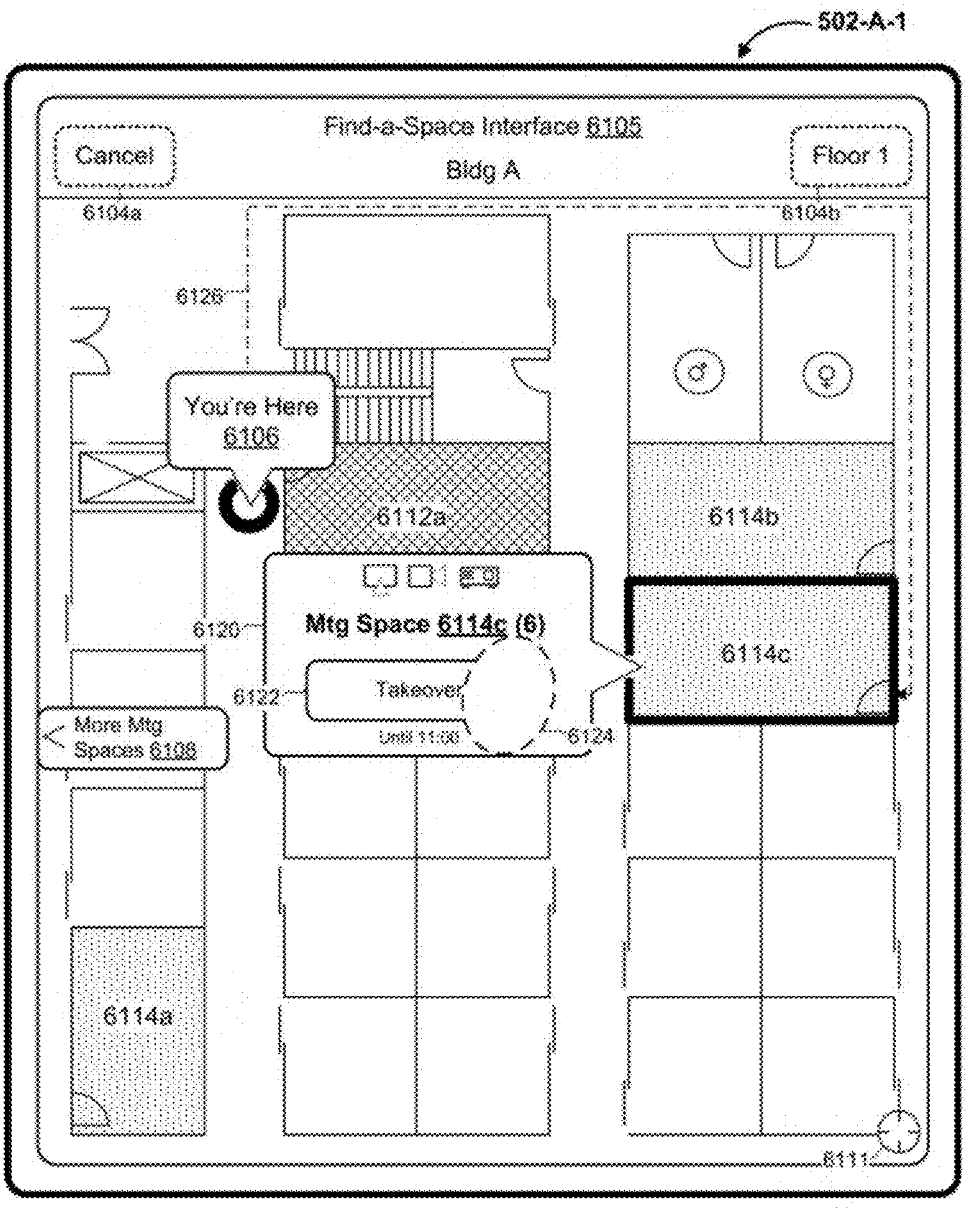
Figure 6W:
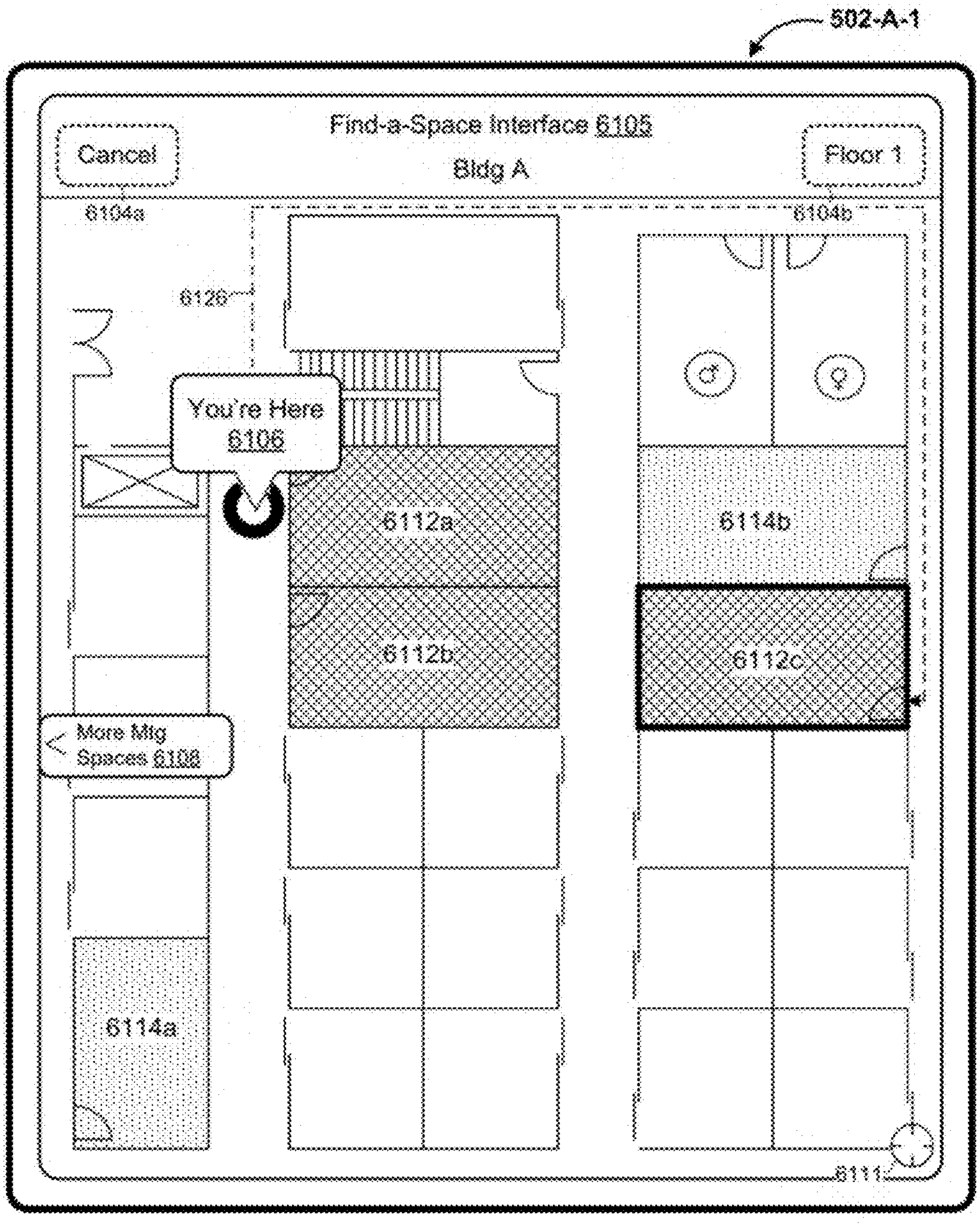

FIGS. 6A-6W illustrate example user interfaces for managing and interacting with meeting spaces in accordance with some embodiments. The user interfaces in these figures are used to illustrate the processes described below, including the processes in FIGS. 9A-9B, 10A-10B, and 11A-11C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 6A shows the first device 502-A-1 displaying a meeting status interface 605. As shown in FIG. 6A, the meeting status interface 605 includes a meeting space affordance 606, which indicates that the first device 502-A-1 corresponds to meeting space 1, building A and the occupancy limit of meeting space 1, building A (e.g., an occupancy limit of six due to the existence of six chairs in meeting space 1, building A). When activated (e.g., with a contact), the meeting space affordance 606 causes a log for meeting space 1, building A to be displayed (e.g., as shown in FIG. 6Q). For example, the log indicates: previous or outstanding problems reported for meeting space 1, building A; the cleaning record of meeting space 1, building A; the last occupants of meeting space 1, building A; and/or the like.

As shown in FIG. 6A, the meeting status interface 605 also includes a plurality of attribute icons 608*a*, 608*b*, and 608*c* (collectively referred to as "attribute icons 608") indicating the equipment or features associated with meeting space 1, building A. In FIG. 6A, the first attribute icon 608*a* indicates that meeting space 1, building A is equipped with a display, the second attribute icon 608*b* indicates that meeting space 1, building A includes video or videoconference equipment, and the third attribute icon 608*c* indicates that meeting space 1, building A includes a projector. When activated (e.g., with a contact), the attribute icons 608 cause further details regarding the equipment or features associated with meeting space 1, building A to be displayed. For example, if the first attribute icon 608*a* is selected, information or details regarding the display are displayed such as model name, size, age, and/or the like.

As shown in FIG. 6A, the meeting status interface 605 further includes: the current time (e.g., 9:47); a status indicator 614 indicating a current availability or reservation status of meeting space 1, building A; a claiming affordance 616, which, when activated (e.g., with a left-to-right swipe gesture or a predefined gesture such as a one finger tap gesture), causes the status indicator 614 to change (e.g., change from reserved to meeting in progress/meeting starting soon, or from available to meeting in progress); and a schedule affordance 618, which, when activated (e.g., with an upward swipe gesture or a predefined gesture such as a one finger tap gesture), causes a reservation schedule associated with meeting space 1, building A to be displayed (e.g., FIG. 6C). In FIG. 6A, the status indicator 614 indicates that meeting space 1, building A is currently reserved for person X and that person X has to check-in before 10:07. In FIG. 6A, the claiming affordance 616 also prompts the user to "slide to check-in."

In this example, meeting space 1, building A is available from 9:30 to 10:00 and reserved for person X from 10:00 to 11:00. According to some embodiments, the status indicator 614 indicates "RESERVED" between the early check-in threshold 622 (e.g., 15 minutes prior to the reservation start time) and the check-in deadline 624 (e.g., 7 minutes after the reservation start time). As such, in some embodiments, the status indicator 614 indicates "RESERVED" when the current time is between the early check-in threshold 622 and the check-in deadline 624. Furthermore, in some embodiments, the claiming affordance 616 is enabled to check-in to an upcoming reservation while the meeting space is available and the current time is between the early check-in threshold 622 and the check-in deadline 624.

In some embodiments, a reservation is claimed or checked into without authenticating the user as the reservation holder (e.g., person X in FIG. 6A) or an invitee (e.g., as shown in FIGS. 6A-6B). As such, any user is capable of checking in for the reservation of person X from 10:00 to 11:00. In some embodiments, prior to being able to claim or check-in to a reservation, a user is authenticated as the reservation organizer or optionally an invitee of the reservation (e.g., FIGS. 7A-7C).

As shown in FIG. 6A, the meeting status interface 605 further includes a "find space" affordance 610, which, when activated (e.g., with a contact), causes a find-a-space interface to replace display of the meeting status interface 605 (e.g., FIG. 6T). In some embodiments, when the "find space" affordance 610 is activated (e.g., with a contact), a find-a-space interface 6105 replaces display of the meeting status interface 605 (e.g., FIG. 6T). In some embodiments, when the "find space" affordance 610 is activated (e.g., with a contact), a list of available meetings spaces is overlaid on the meeting status interface 605 (e.g., FIG. 7X). As shown in FIG. 6A, the meeting status interface 605 further includes a "report problem" affordance 612, which, when activated (e.g., with a contact), causes a reporting interface to replace the meeting status interface 605 (e.g., FIG. 6K and FIG. 7I).

FIGS. 6A-6B illustrate a sequence in which a user checks-in to an existing reservation of meeting space 1, building A. FIG. 6A also illustrates detecting a left-to-right swipe gesture over the claiming affordance 616 with a contact 620. FIG. 6B shows that the status indicator 614 indicates "MEETING IN PROGRESS" in response to the left-to-right swipe gesture over the claiming affordance 616 in FIG. 6A. As such, the user checked in for the reservation starting at 10:00 and claimed meeting space 1, building A prior to the start of the reservation because meeting space 1, building A was available prior to the reservation.

According to some embodiments, the status indicator 614 indicates "MEETING IN PROGRESS" when the user checks-in to an existing reservation while the meeting space is available and the current time is between the early check-in threshold 622 and the reservation start time. In some embodiments, the status indicator 614 indicates "MEETING STARTING SOON" when the user checks-in to an existing reservation while the meeting space is available and the current time is between the early check-in threshold 622 and the reservation start time. As shown in FIG. 6B, the claiming affordance 616 is disabled (e.g., no longer displayed) in response to the left-to-right swipe gesture over the claiming affordance 616 in FIG. 6A.

FIGS. 6B-6C illustrate a sequence in which a reservation schedule for meeting space 1, building A is displayed. FIG. 6B also illustrates detecting an upward swipe gesture over the schedule affordance 618 with a contact 621. FIG. 6C shows a reservation schedule 634 associated with meeting space 1, building A overlaid on the meeting status interface 605 in response to the upward swipe gesture in FIG. 6B. For example, the reservation schedule 634 shows existing reservations of the meeting space 1, building A for the next N hours.

As shown in FIG. 6C, the meeting status interface 605 also includes a hide schedule affordance 632, which, when activated (e.g., with a downward swipe gesture or a predefined gesture such as a one finger tap gesture), causes the reservation schedule 634 to cease being displayed. For example, the reservation schedule 634 slides up from the bottom edge of the meeting status interface 605 in response to the upward swipe gesture on the schedule affordance 618 and slides down into the bottom edge of the meeting status interface 605 in response to a downward swipe gesture on the hide schedule affordance 632.

FIGS. 6D-6E illustrate another sequence in which a user checks-in to an existing reservation of meeting space 1, building A. FIG. 6D is similar to and adapted from FIG. 6A. As such, FIG. 6A and FIG. 6D include similar user interfaces and elements labeled with the same reference number in both figures have the same function, with only the differences are described herein for the sake of brevity. As shown in FIG. 6D, the current time is 10:05—after the start time of the reservation but before the check-in deadline 624. FIG. 6D illustrates detecting a left-to-right swipe gesture over the claiming affordance 616 with a contact 625. FIG. 6E shows that the status indicator 614 indicates "MEETING IN PROGRESS" in response to the left-to-right swipe gesture over the claiming affordance 616 in FIG. 6E. As such, the user checked in for the reservation and claimed meeting space 1, building A after to the start of the reservation. As shown in FIG. 6E, the claiming affordance 616 is disabled (e.g., no longer displayed) in response to the left-to-right swipe gesture over the claiming affordance 616 in FIG. 6D. According to some embodiments, if a user fails to check-in for a reservation before the check-in deadline 624, the reservation is canceled and the meeting space is made available for subsequent local takeover or remote reservation.

FIGS. 6F-6G illustrate yet another sequence in which a user checks-in to an existing reservation of meeting space 1, building A. FIG. 6F is similar to and adapted from FIG. 6A. As such, FIG. 6A and FIG. 6F include similar user interfaces and elements labeled with the same reference number in both figures have the same function, with only the differences are described herein for the sake of brevity. In this example, meeting space 1, building A is reserved by person Y from 9:30 to 10:00 and reserved for person X from 10:00 to 11:00. As shown in FIG. 6F, the status indicator 614 indicates "MEETING IN PROGRESS" because meeting space 1, building A is unavailable until 10:00 based on the current time (e.g., 9:47). In FIG. 6F, the status indicator 614 indicates that meeting space 1, building A is currently reserved for person Y unit 10:00. In FIG. 6F, the claiming affordance 616 also prompts the user to "slide to check-in for next meeting."

According to some embodiments, the status indicator 614 indicates "MEETING IN PROGRESS" when a reservation is in ongoing. Furthermore, in some embodiments, the claiming affordance 616 is enabled to check-in to an upcoming reservation while the meeting space is unavailable and the current time (e.g., 9:47) is between the early check-in threshold 622 and the reservation start time.

FIG. 6G shows the status indicator 614 indicates "MEETING STARTING SOON" in response to the left-to-right swipe gesture over the claiming affordance 616 in FIG. 6F. As such, the user checked in for the reservation starting at 10:00. As shown in FIG. 6G, the claiming affordance 616 is disabled (e.g., no longer displayed) in response to the left-to-right swipe gesture over the claiming affordance 616 in FIG. 6F.

FIG. 6H illustrates a state in which the claiming affordance 616 is disabled within the meeting status interface 605. FIG. 6H is similar to and adapted from FIG. 6A. As such, FIG. 6A and FIG. 6H include similar user interfaces and elements labeled with the same reference number in both figures have the same function, with only the differences are described herein for the sake of brevity. In this example, meeting space 1, building A is reserved by person Y from 9:30 to 10:00 and reserved by person X from 10:00 to 11:00. As shown in FIG. 6H, the status indicator 614 indicates "MEETING IN PROGRESS" because meeting space 1, building A is unavailable until 10:00 based on the current time (e.g., 9:40). In FIG. 6H, status indicator 614 indicates that meeting space 1, building A is currently reserved for person Y until 10:00, and the claiming affordance 616 is disabled (e.g., no longer displayed). According to some embodiments, the claiming affordance 616 is disabled while the meeting space is unavailable and the current time (e.g., 9:40) is before the early check-in threshold 622 for a next reservation (e.g., the reservation or person X at 10:00).

FIGS. 6I-6J illustrate a sequence in which a user takes over meeting space 1, building A while available. FIG. 6I is similar to and adapted from FIG. 6A. As such, FIG. 6A and FIG. 6I include similar user interfaces and elements labeled with the same reference number in both figures have the same function, with only the differences are described herein for the sake of brevity. In this example, meeting space 1, building A is available from 9:30 to 10:00 and reserved for person X from 10:00 to 11:00. As shown in FIG. 6I, the status indicator 614 indicates "AVAILABLE" because meeting space 1, building A is available until 10:00 based on the current time (e.g., 9:40). In FIG. 6I, the claiming affordance 616 is enabled and also prompts the user to "slide to takeover until 10:00."

According to some embodiments, the status indicator 614 indicates "AVAILABLE" while the meeting space is available and the current time (e.g., 9:40) is prior to the early check-in threshold 622 for the next reservation. According to some embodiments, the claiming affordance 616 is enabled to take over a meeting space while the meeting space is available and a threshold amount of time (e.g., 20 or 30 minutes) exists prior to the next reservation based on the current time.

FIG. 6I also illustrates detecting a left-to-right swipe gesture over the claiming affordance 616 with a contact 636. FIG. 6J shows that the status indicator 614 indicates "MEETING IN PROGRESS" in response to the left-to-right swipe gesture over the claiming affordance 616 in FIG. 6I. As such, the user took over/claimed meeting space 1, building A until the next reservation. As shown in FIG. 6J, the claiming affordance 616 is disabled (e.g., no longer displayed) in response to the left-to-right swipe gesture over the claiming affordance 616 in FIG. 6I.

FIGS. 6J-6O illustrate a sequence in which a user reports a problem with space 1, building A. FIG. 6J illustrates detecting a contact 638 at a location corresponding to the "report problem" affordance 612. FIG. 6K illustrates replacing display of the meeting status interface 605 with a reporting interface 655 in response to selection of the "report problem" affordance 612 in FIG. 6J.

As shown in FIG. 6K, the reporting interface 655 includes: a cancel affordance 654*a*, which, when activated (e.g., with a contact), causes the reporting interface 655 to be replaced with the meeting status interface 605 in FIG. 6J; and a next affordance 654*b*, which, when activated (e.g., with a contact), causes the reporting interface 655 to be replaced with an identification interface (e.g., FIG. 6M). As shown in FIG. 6K, the reporting interface 655 also includes a plurality of affordances 656*a*, 656*b*, 656*c*, 656*d*, 656*e*, 656*f*, 656*g*, 656*g*, 656*h*, 656*i*, 656*j*, 656*k*, and 656*l* (collectively referred to as "affordances 656") for reporting problems with equipment or features associated with meeting space 1, building A (e.g., phones, lighting, chairs, display, table, projector, power, etc.) and/or for requesting service options for meeting space 1, building A (e.g., cleaning, refreshments, supplies, etc.).

FIG. 6K also illustrates detecting a contact 662 at a location corresponding to the affordance 656*h* provided to report a problem with the projector of meeting space 1, building A. FIG. 6L illustrates displaying a badge 657 within the affordance 656*h*, which indicates that the affordance 656*h* has been selected, in response to selection of the affordance 656*h* in FIG. 6K.

FIG. 6L also illustrates detecting a contact 664 at a location corresponding to the next affordance 654*b*. FIG. 6M illustrates replacing display of the reporting interface 655 with an identification interface 675 in response to selection of the next affordance 654*b* in FIG. 6L.

As shown in FIG. 6M, the identification interface 675 includes: a back affordance 674*a*, which, when activated (e.g., with a contact), causes the identification interface 675 to be replaced with the reporting interface 655 in FIG. 6L; and a send affordance 674*b*, which, when activated (e.g., with a contact), initiates a process for generating a problem report or service request associated the projector of meeting space 1, building A. For example, with reference to FIG. 5B, the device 504-A-1 sends a message to the controller 510 indicating that there is a problem associated the projector of meeting space 1, building A. In this example, an administrator may then contact a service department of building A to assess the problem. Alternatively, in another example, the device 504-A-1 sends a message directly to the service department of building A indicating that there is a problem associated the projector of meeting space 1, building A.

As shown in FIG. 6M, the identification interface 675 also includes a plurality of affordances 676*a*, 676*b*, and 676*c* (collectively referred to as "affordances 676") provided to identify the user reporting the problem. According to some embodiments, the affordances 676 are determined based on the next reservation, the last reservation, and/or the current reservation of meeting space 1, building A. In FIG. 6M, the affordance 676*a* is provided to identify the user initiating the problem report as the organizer of the current reservation, the affordance 676*b* is provided to identify the user initiating the problem report as meeting invitee A of the current reservation, and the affordance 676*c* is provided to identify the user initiating the problem report as an unlisted person.

FIG. 6M also illustrates detecting a contact 666 at a location corresponding to the affordance 676*c*. FIG. 6N illustrates displaying a text entry field 678 within the identification interface 675 for entering the email address of the user initiating the problem report in response to selection of the affordance 676*c* in FIG. 6M. FIG. 6N also illustrates detecting a contact 680 at a location corresponding to the text entry field 678.

For example, the user of the device 502-A-1 enters his/her email address into the text entry field 678 via a software keyboard and selects the send affordance 674*b* (not shown). FIG. 6O illustrates displaying a message 677 indicating that the problem report associated with the projector of meeting space 1, building A was submitted successfully. In FIG. 6O, the message 677 also indicates that the initiator of the problem report will be contacted with confirmation and if extra information is needed.

FIGS. 6P-6Q illustrate a sequence in which the meeting status interface 605 indicates the reported problem with space 1, building A. FIG. 6P is similar to and adapted from FIG. 6J. As such, FIG. 6A and FIG. 6J include similar user interfaces and elements labeled with the same reference number in both figures have the same function, with only the differences are described herein for the sake of brevity. FIG. 6P illustrates displaying a badge 682 within the meeting space affordance 606, which indicates that an outstanding problem is associated with meeting space 1, building A, in response to generating and submitting the problem report in FIGS. 6J-6O. FIG. 6P also illustrates detecting a contact 684 at a location corresponding to the meeting space affordance 606. FIG. 6Q illustrates displaying a log 686 overlaid on the meeting status interface 605 in response to selection of the meeting space affordance 606 in FIG. 6P. As shown in FIG. 6Q, the log 686 lists the nature, time, and date of the outstanding problem 685 associated with meeting space 1, building A (e.g., associated with the problem report that was generated and submitted in FIGS. 6J-6O).

FIGS. 6Q-6R illustrate a sequence in which the reporting interface 655 indicates the reported problem with space 1, building A. FIG. 6Q also illustrates detecting a contact 688 at a location corresponding to the "report problem" affordance 612. FIG. 6R illustrates replacing display of the meeting status interface 605 with the reporting interface 655 in response to selection of the "report problem" affordance 612 in FIG. 6Q.

FIG. 6R is similar to and adapted from FIGS. 6K-6L. As such, FIGS. 6K-6L and FIG. 6R include similar user interfaces and elements labeled with the same reference number in both figures have the same function, with only the differences are described herein for the sake of brevity. As shown in FIG. 6R, a badge 690 is displayed within the affordance 656*h*, which indicates that a problem report associated with the projector was reported. As shown in FIG. 6R, the time and date of the problem report associated with the projector is also displayed within the affordance 656*h*. According to some embodiments, after a problem is submitted for a respective feature of meeting space 1, building A, the corresponding affordance 656 is disabled to avoid duplicitous problem reports.

FIG. 6R also illustrates detecting a contact 692 at a location corresponding to the cancel affordance 654*a*. FIG. 6S illustrates replacing display of the reporting interface 655 with the meeting status interface 605 in response to selection of the cancel affordance 654*a* in FIG. 6R. FIG. 6S is similar to and adapted from FIG. 6J. As such, FIG. 6J and FIG. 6S include similar user interfaces and elements labeled with the same reference number in both figures have the same function, with only the differences are described herein for the sake of brevity.

FIGS. 6S-6W illustrate a sequence in which a user takes over another available meeting space through the find-a-space interface 6105. FIG. 6S also illustrates detecting a contact 694 at a location corresponding to the "find space" affordance 610. FIG. 6T illustrates replacing display of the meeting status interface 605 with the find-a-space interface 6105 associated with building A in response to selection of the "find space" affordance 610 in FIG. 6S. As shown in FIG. 6T, the find-a-space interface 6105 includes: a cancel affordance 6104*a*, which, when activated (e.g., with a contact), causes the find-a-space interface 6105 to be replaced with the meeting status interface 605 in FIG. 6S; and a floor affordance 6104*b* indicating the floor associated with the plan view displayed within the find-a-space interface 6105 (e.g., the first floor of building A) and provided to display a plan view of a different floor of the building A within the find-a-space interface 6105.

In FIG. 6T, the find-a-space interface 6105 displays a plan view of the first floor of building A and an indicator 6106 of the location of the device 502-A-1. According to some embodiments, the user of the device 502-A-1 is able to navigate the plan view by pinching to zoom in or out and dragging to pan east, west, north or south. In FIG. 6T, the find-a-space interface 6105 includes a centering affordance 6111, which, when activated (e.g., with a contact), causes the plan view within the find-a-space interface 6105 to re-center on the indicator 6106.

As shown in FIG. 6T, the find-a-space interface 6105 also includes a first plurality of unavailable meeting space 6112*a* and 6112*b* (collectively referred to as "unavailable meeting spaces 6112") with a first appearance (e.g., a first shading pattern). For example, meeting space 1, building A corresponds to unavailable meeting space 6112*a*. As shown in FIG. 6T, the find-a-space interface 6105 also includes a second plurality of available meeting space 6114*a*, 6114*b*, and 6114*c* (collectively referred to as "available meeting spaces 6114") with a second appearance (e.g., a second shading pattern). According to some embodiments, when a respective available meeting space 6114 is activated (e.g., selected with a contact), a path from the indicator 6106 to the respective available meeting space 6114 is overlaid on the plan view within the find-a-space interface 6105 (e.g., as shown in FIG. 6U). According to some embodiments, when a respective available meeting space 6114 is activated (e.g., selected with a contact), a menu is overlaid on the plan view within the find-a-space interface 6105, where the menu includes details of the respective available meeting space 6114 and an affordance provided to take over or reserve the respective available meeting space 6114 (e.g., as shown in FIG. 6U).

As shown in FIG. 6T, the find-a-space interface 6105 further includes a more meeting spaces affordance 6108, which, when activated (e.g., with a contact), causes a list of available meeting spaces in building A to be displayed within the find-a-space interface 6105. According to some embodiments, the list of available meeting spaces is sorted based at least in part on proximity to the location of the device 502-A-1. According to some embodiments, the list of available meeting spaces is sorted based at least in part on a set of one or more filter criteria provided by the user of the device 502-A-1 (e.g., number of chairs, projector, videoconference equipment, and/or the like).

FIG. 6T also illustrates detecting a contact 6110 at a location corresponding to the floor affordance 6104*b*. FIG. 6U illustrates displaying: a first affordance 6116*a* associated with the first floor of building A, which is disabled due to the plan view of the first floor of building A being currently displayed within the find-a-space interface 6105; and a second affordance 6116*b* associated with the second floor of building A, which, when activated (e.g., with a contact), causes the plan view of the first floor of building A to be replaced with a plan view of the second floor of building A within the find-a-space interface 6105.

FIG. 6U also illustrates detecting a contact 6118 at a location corresponding to the available meeting space 6114*c*. FIG. 6V illustrates displaying a path 6126 from the indicator 6106 to the door of the available meeting space 6114*c* overlaid on the plan view of the first floor of building A in response to selection of the available meeting space 6114*c* in FIG. 6U. FIG. 6V also illustrates displaying a menu 6120 associated with the available meeting space 6114*c* in response to selection of the available meeting space 6114*c* in FIG. 6U. As shown in FIG. 6V, the menu 6120 includes attributes of the available meeting space 6114*c* such the occupancy limit of the available meeting space 6114*c* (e.g., six people) and icons corresponding to the equipment included in the available meeting space 6114*c* (e.g., a display, videoconferencing equipment, and a projector). As shown in FIG. 6V, the menu 6120 also includes a takeover affordance 6122, which, when activated (e.g., with a contact), causes the available meeting space 6114*c* to be taken over until 11:00 by the user of the device 502-A-1.

FIG. 6V also illustrates detecting a contact 6124 at a location corresponding to the takeover affordance 6122. FIG. 6W illustrates changing the available meeting space 6114*c* to unavailable meeting space 6112*c* in response to selection of the takeover affordance 6122 in FIG. 6V. FIG. 6W is similar to and adapted from FIG. 6T and FIG. 6V. As such, FIG. 6T, FIG. 6V, and FIG. 6W include similar user interfaces and elements labeled with the same reference number in both figures have the same function, with only the differences are described herein for the sake of brevity. As shown in FIG. 6W, the unavailable meeting space 6112*c* is displayed with the first appearance (e.g., the first shading pattern) within the find-a-space interface 6105.

Figure 7A:
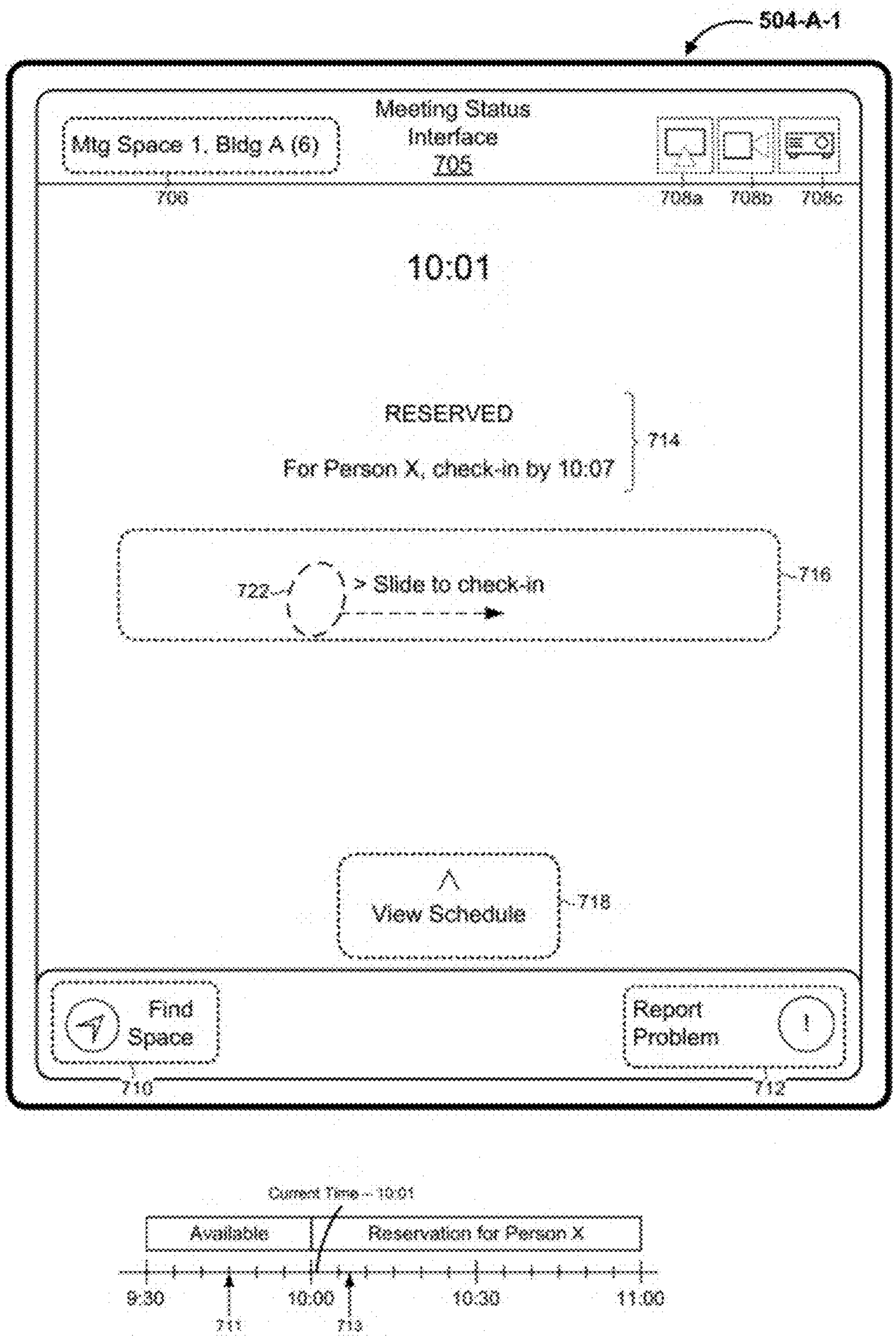
FIGS. 7A-7Z illustrate example user interfaces for managing and interacting with meeting spaces in accordance with some embodiments.
Figure 7B:
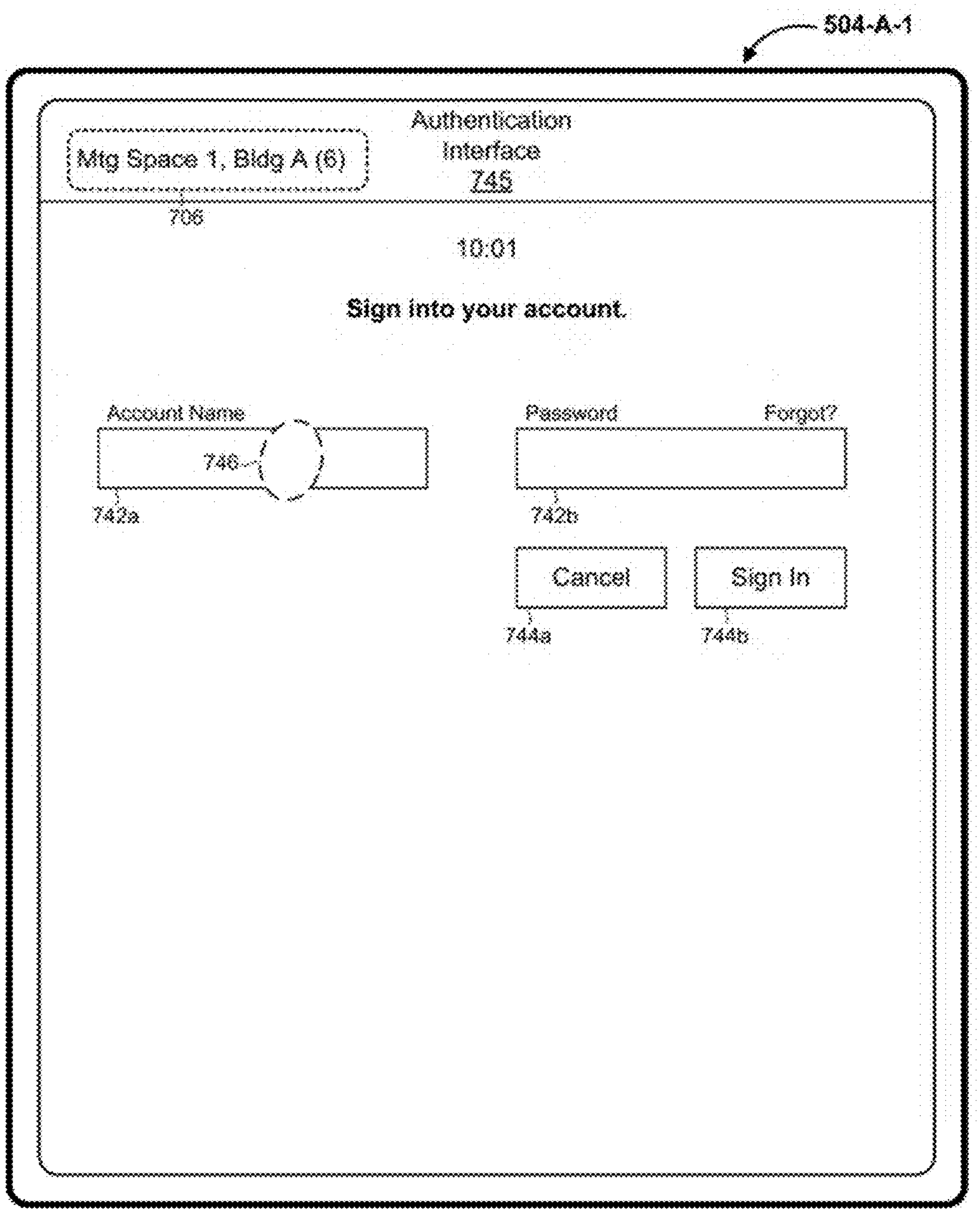
Figure 7C:
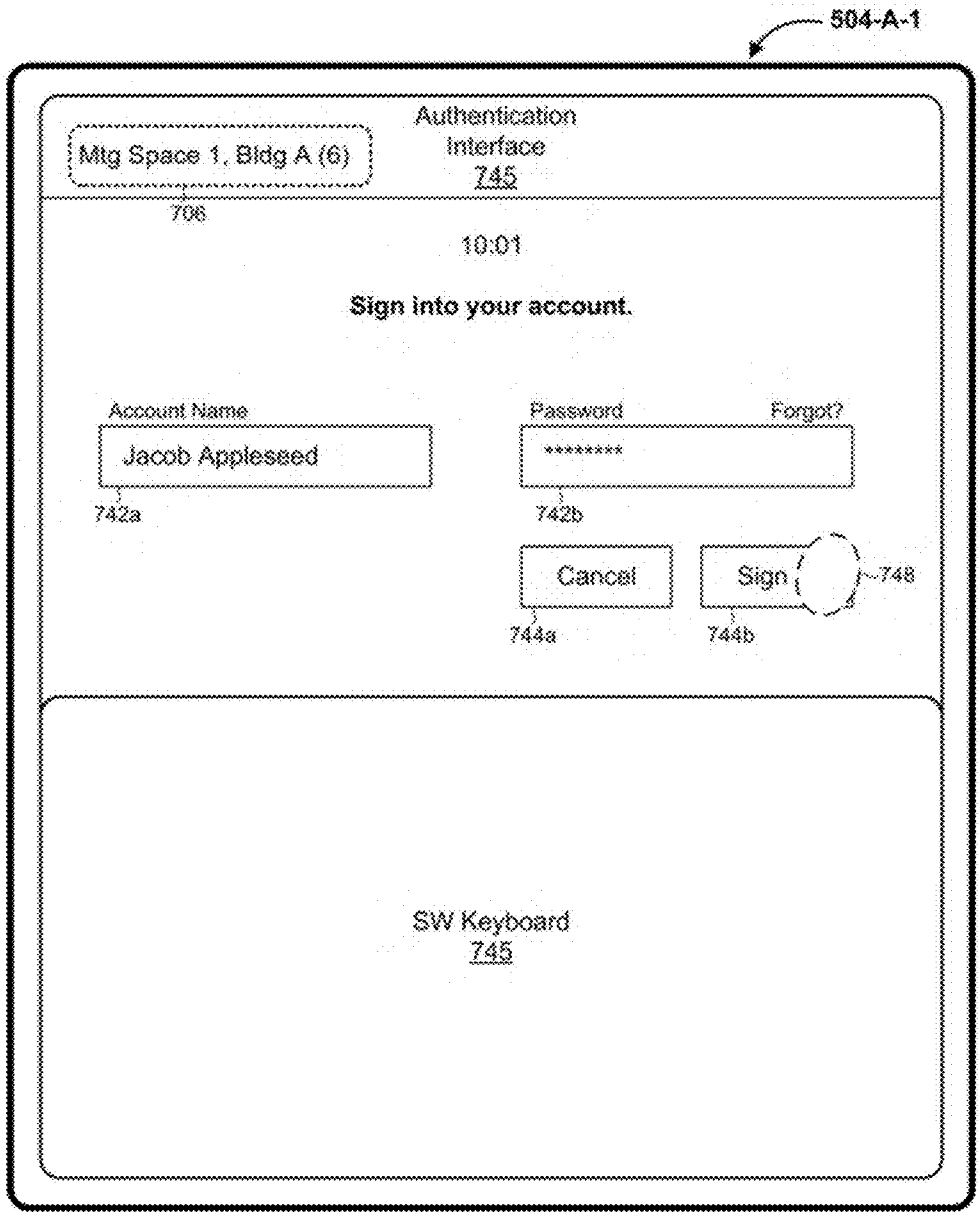
Figure 7D:
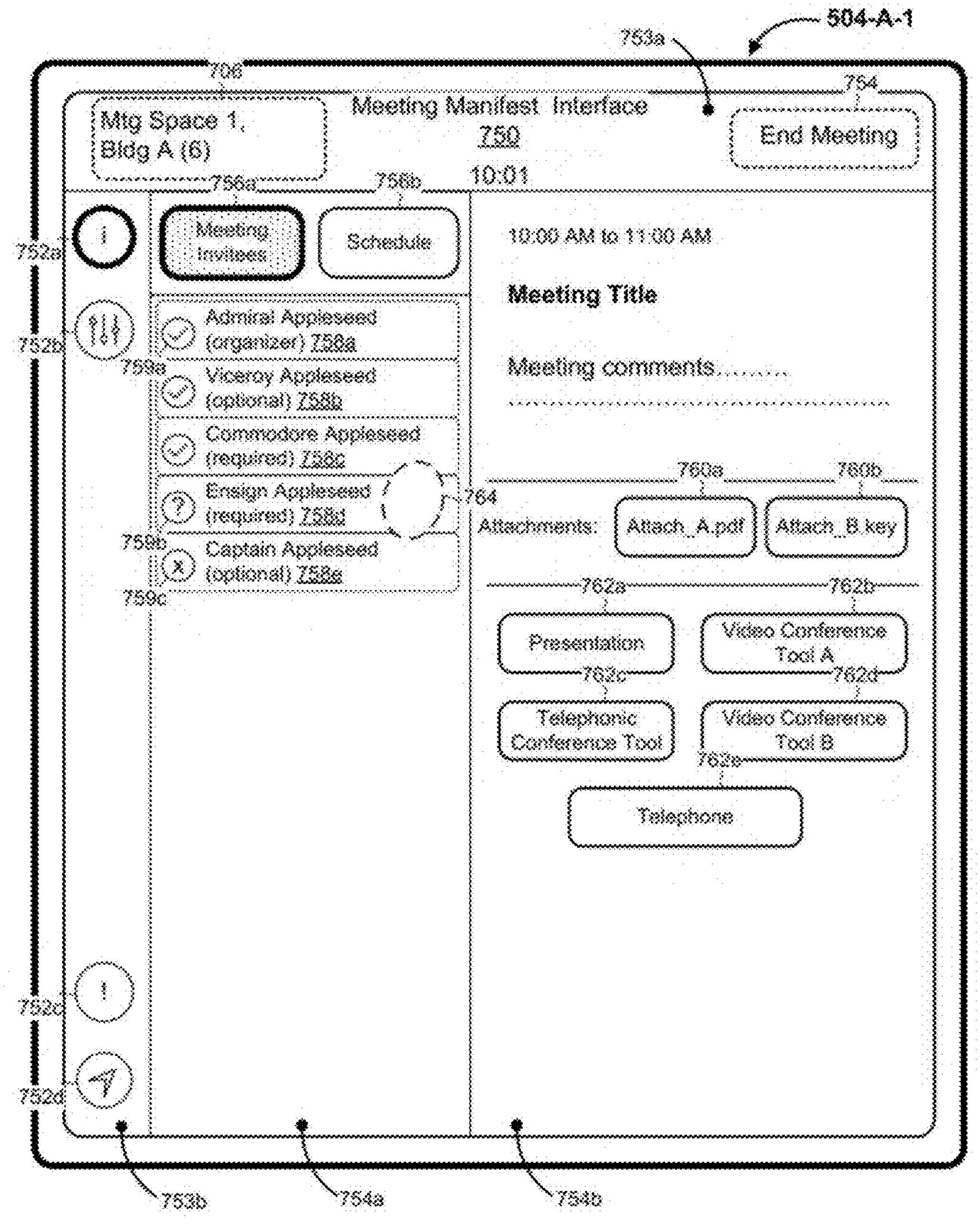
Figure 7E:
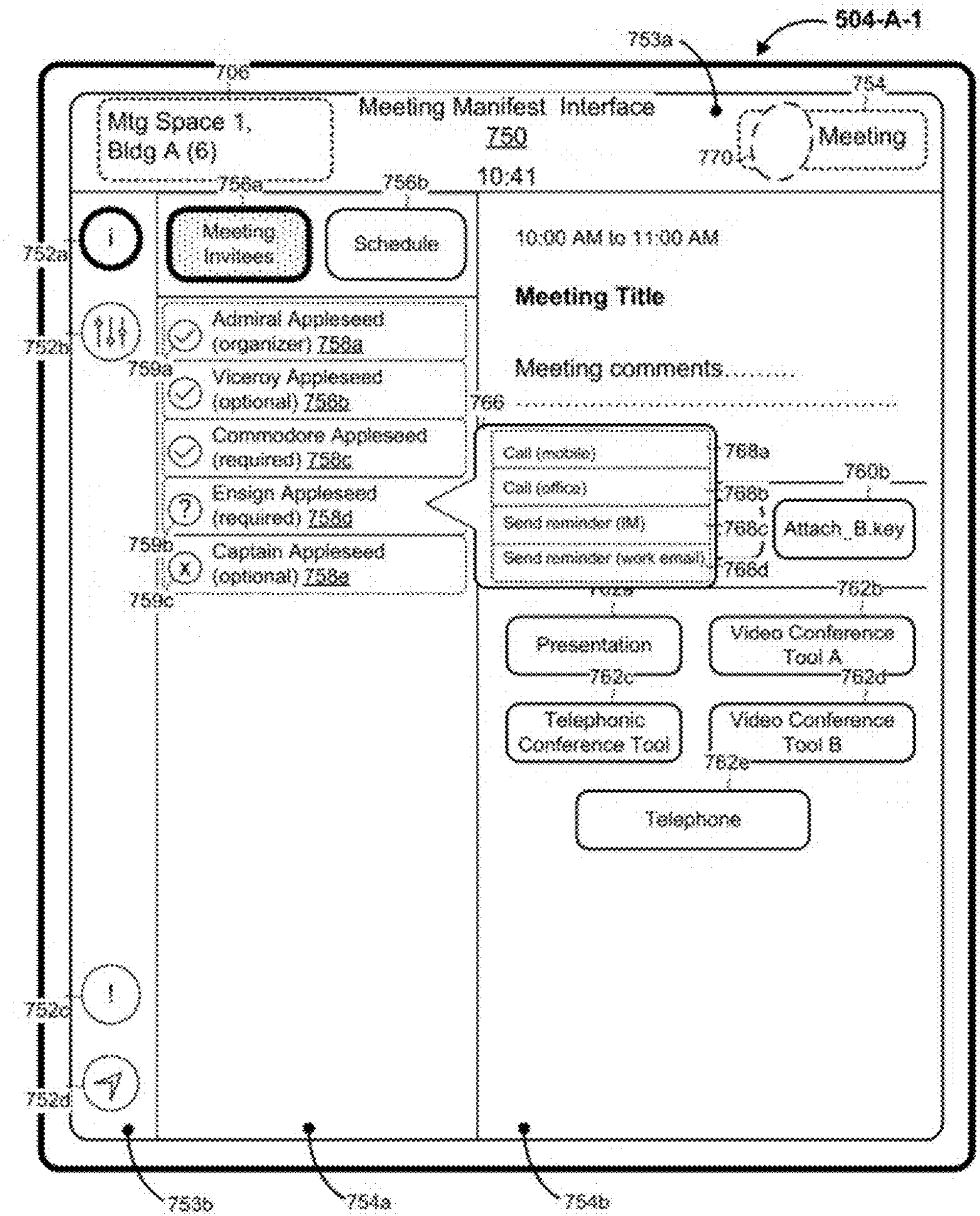
Figure 7F:
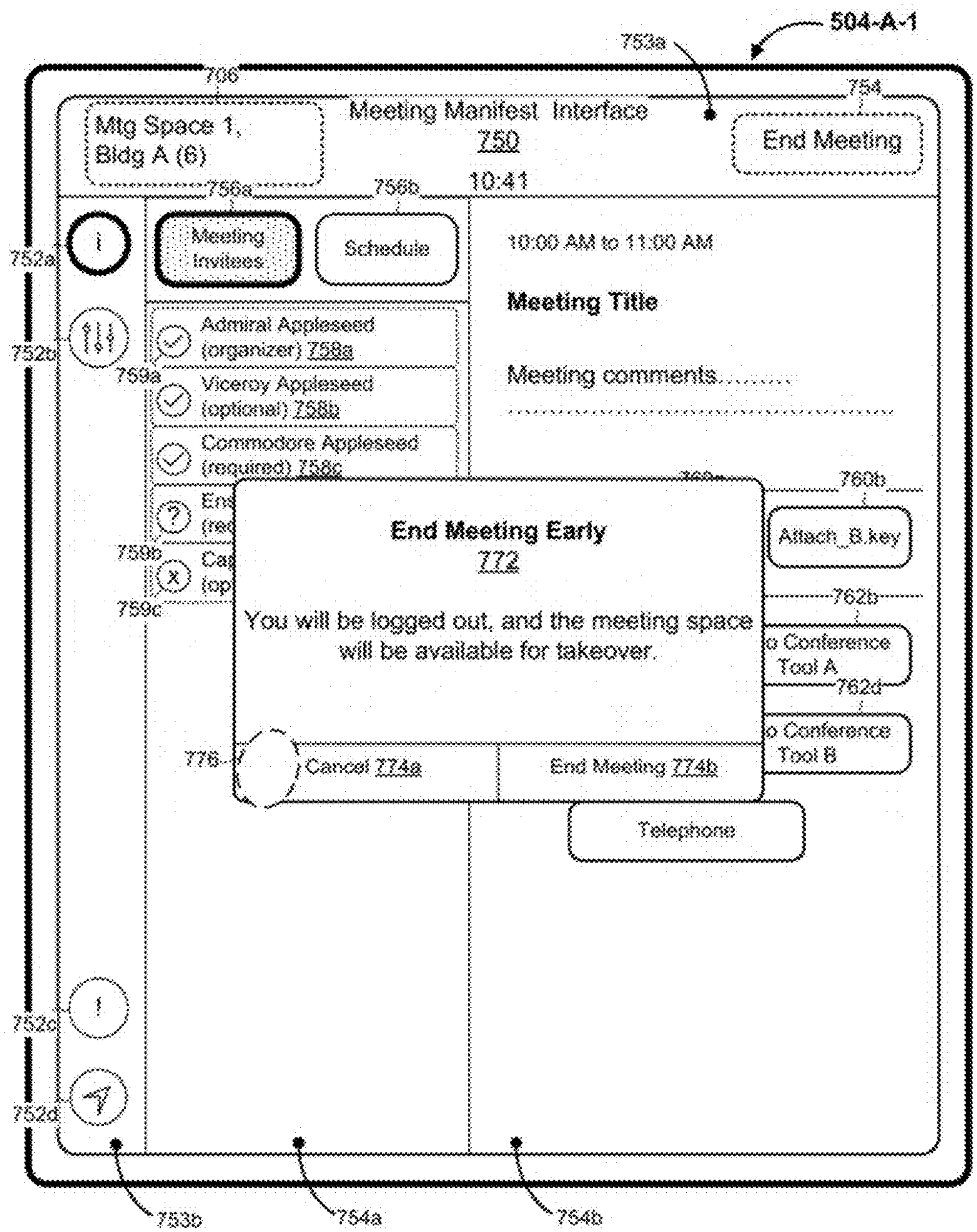
Figure 7G:
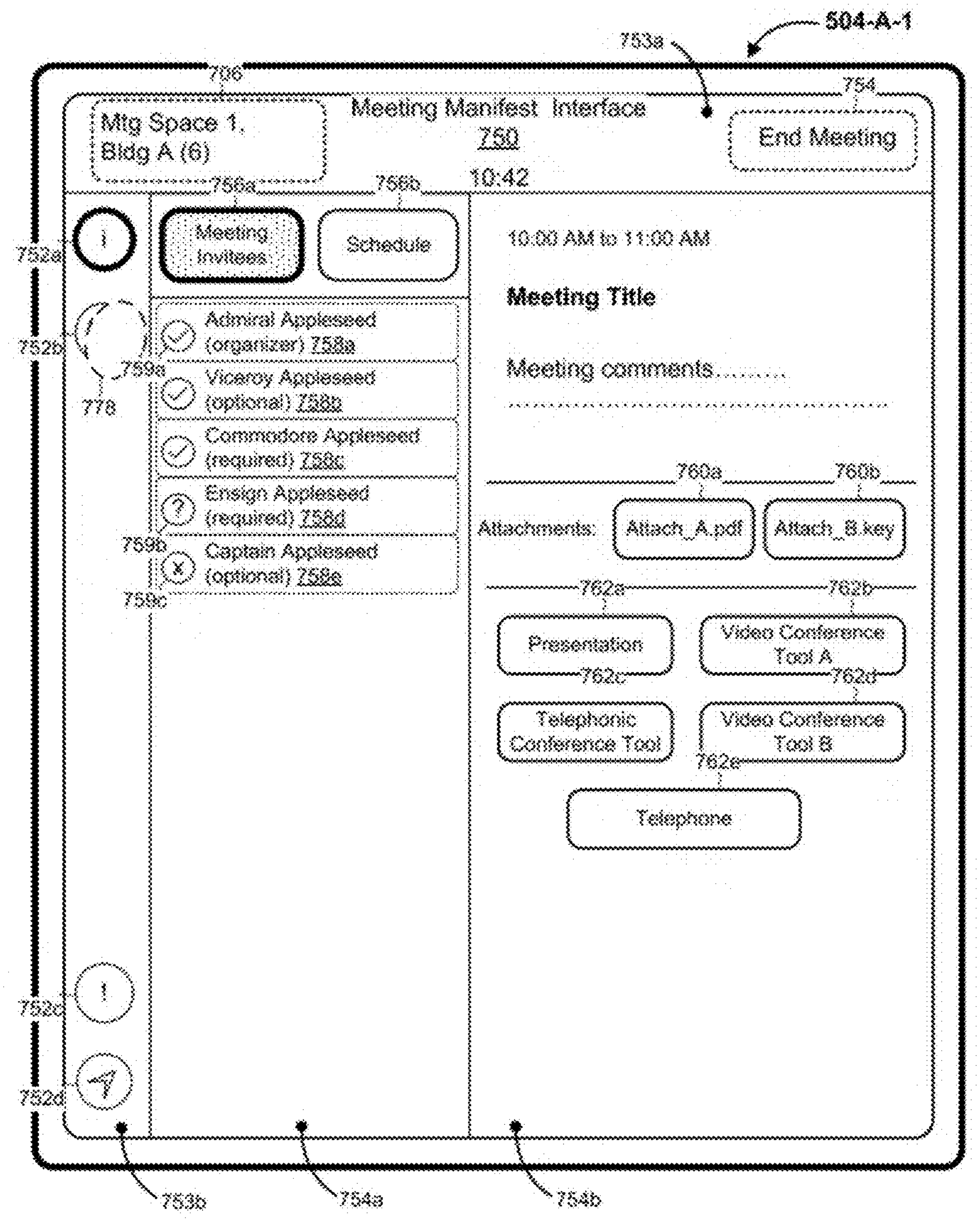
Figure 7H:
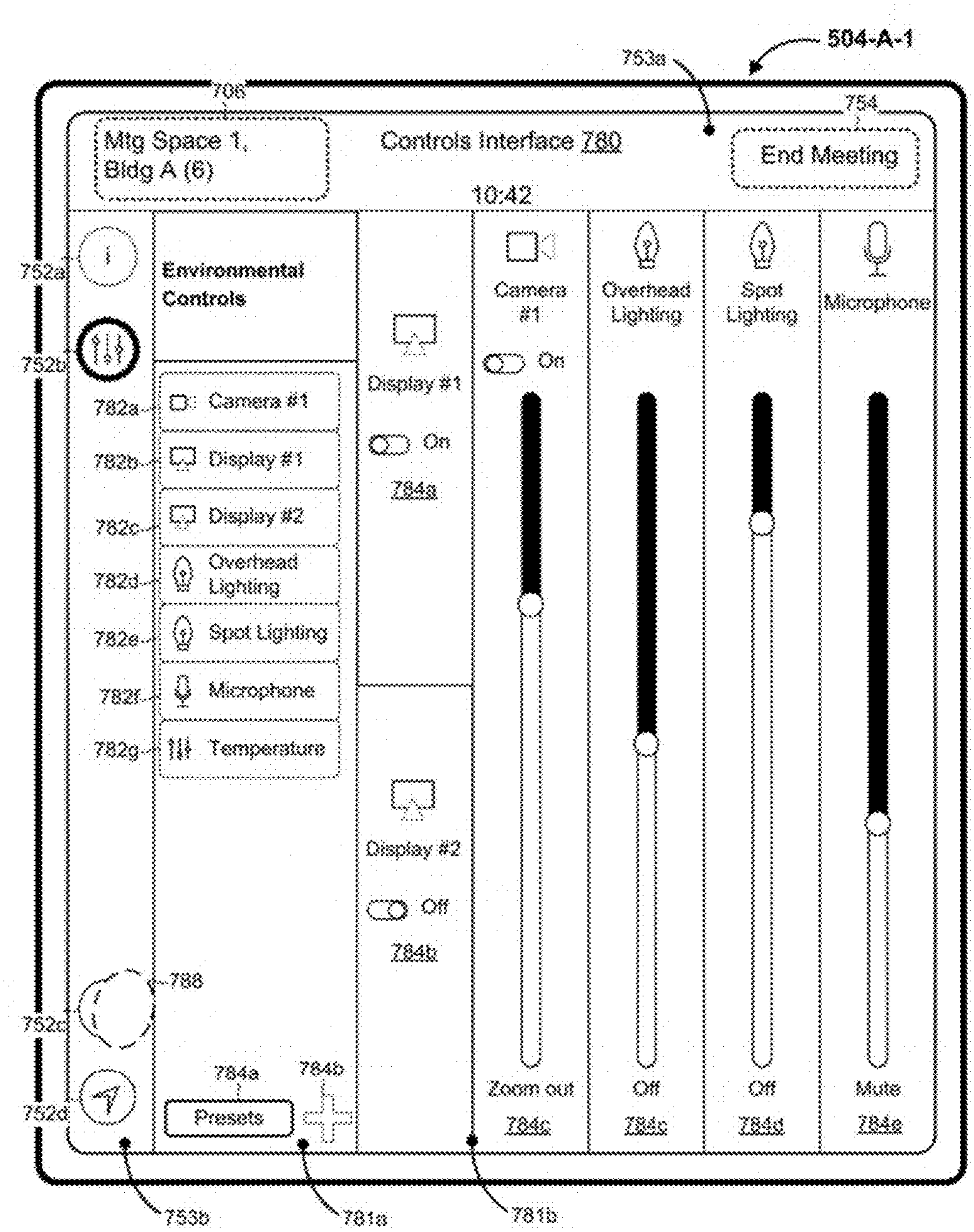
Figure 7I:
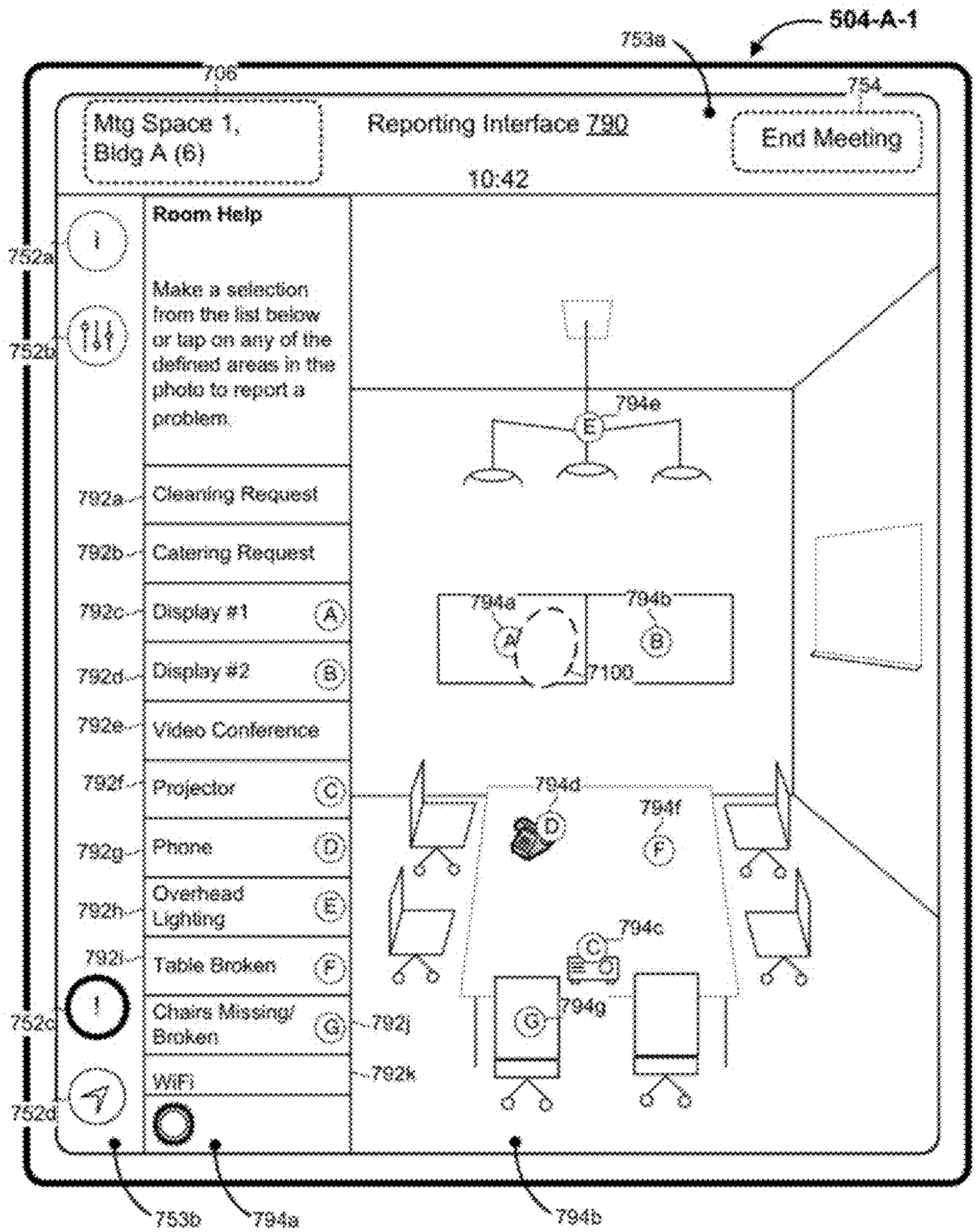
Figure 7J:
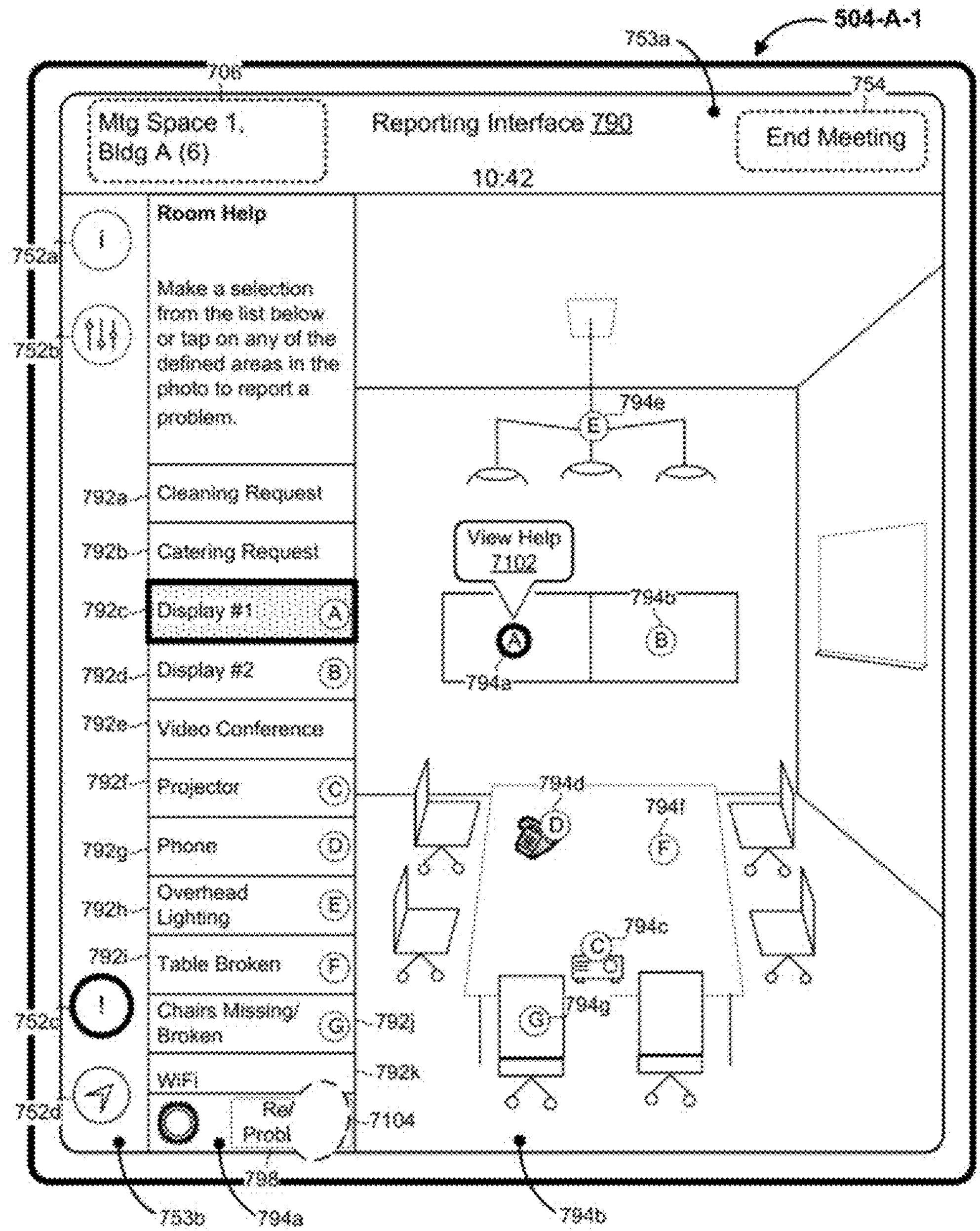
Figure 7K:
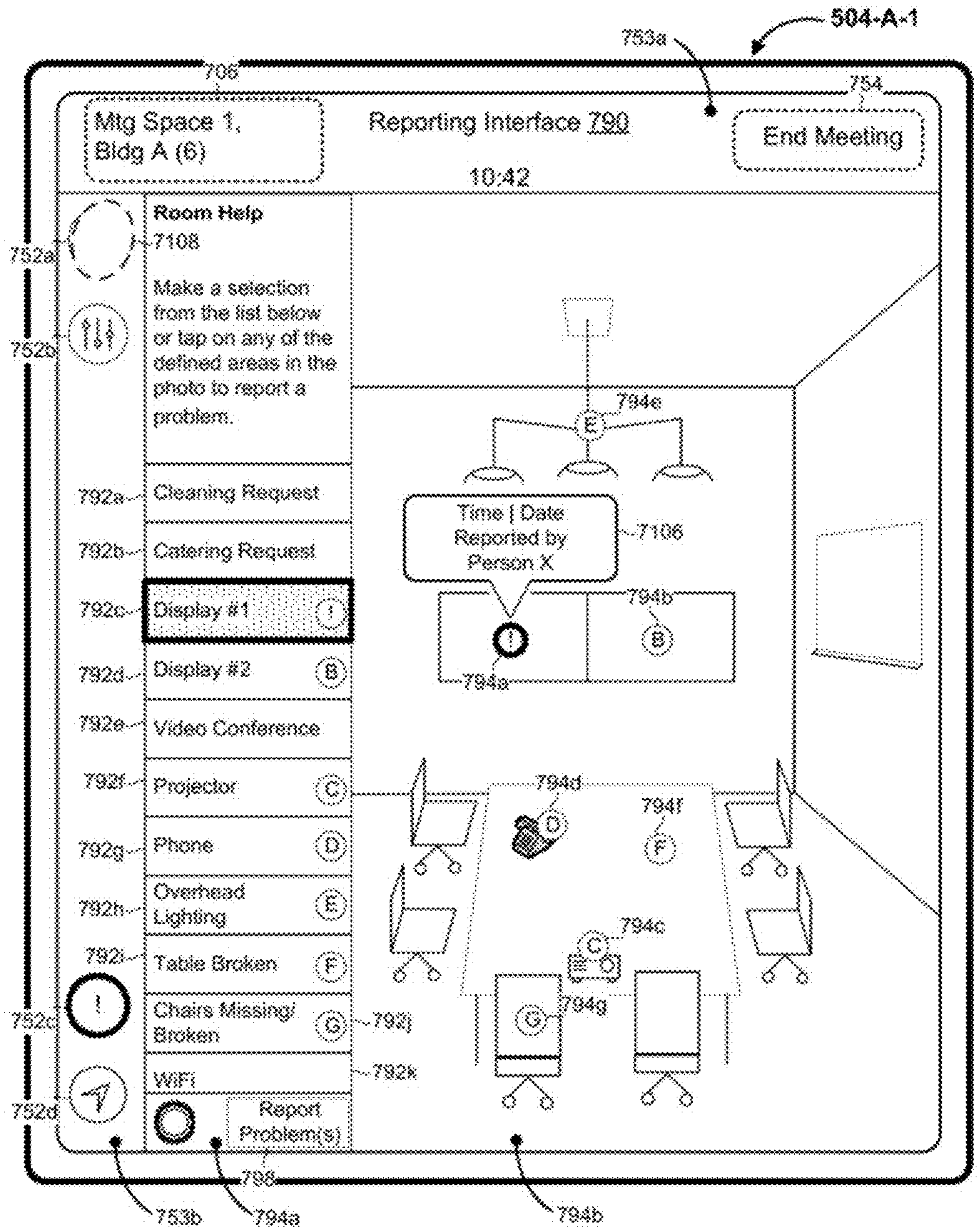
Figure 7L:
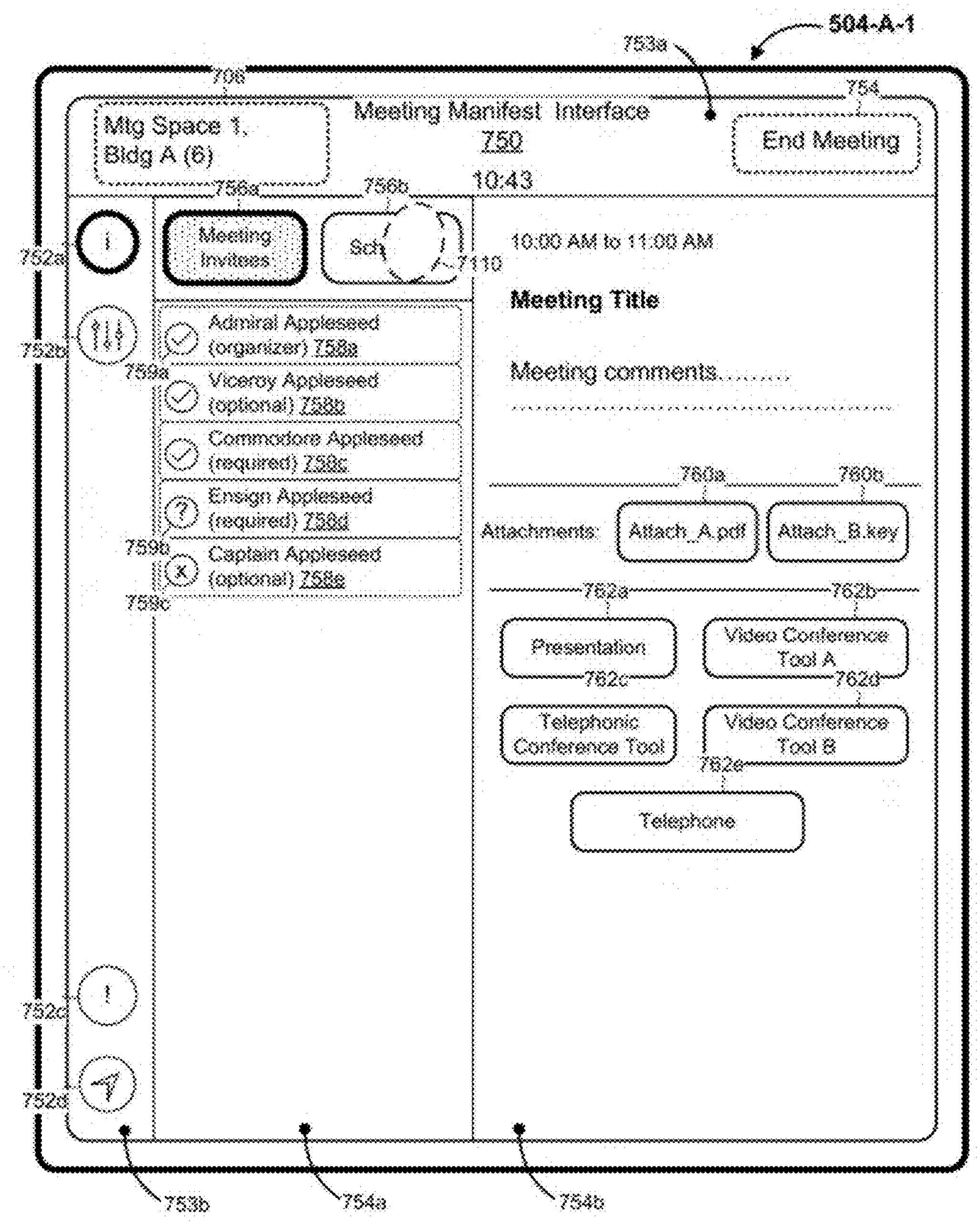
Figure 7M:
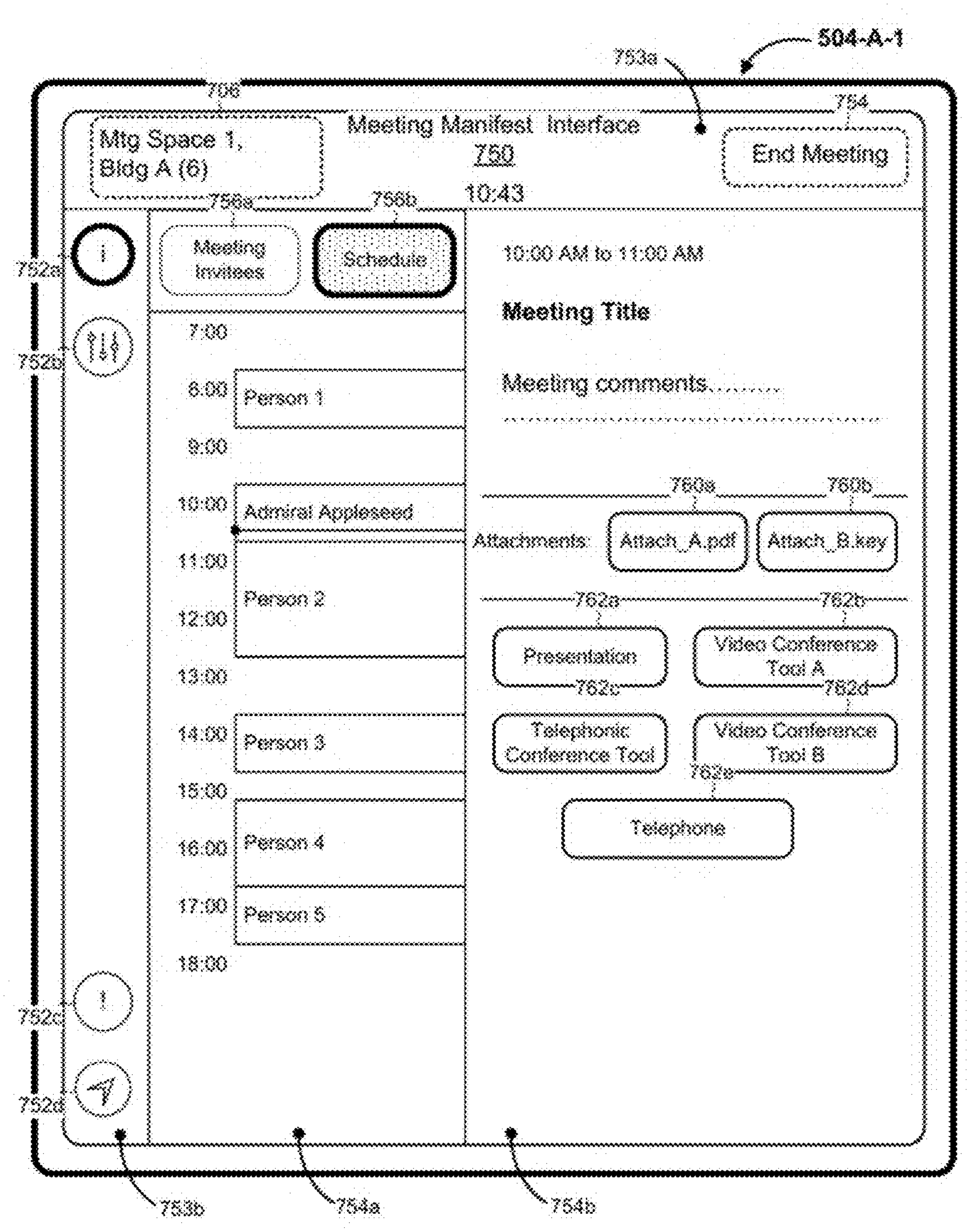
Figure 7N:
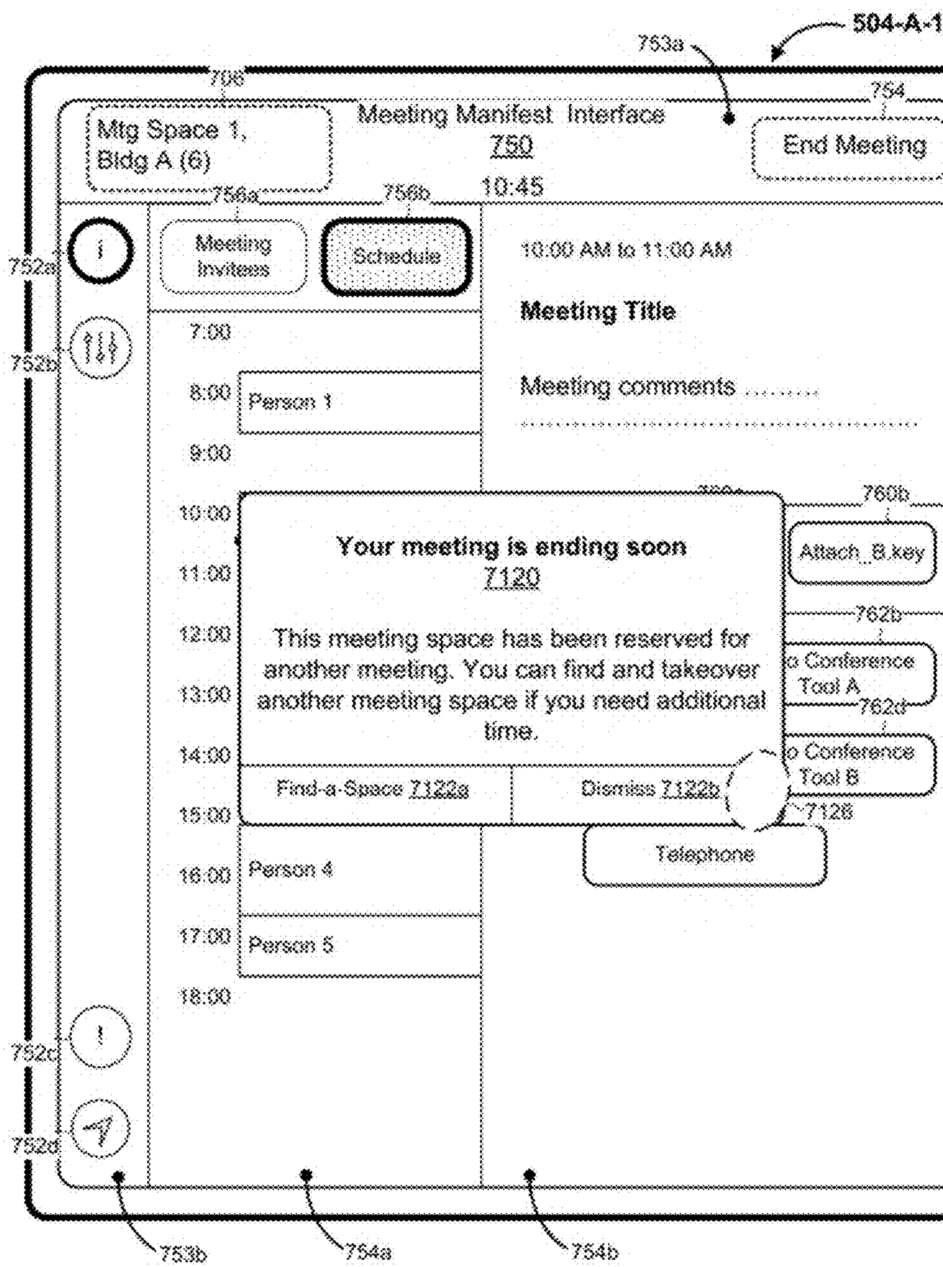
Figure 7O:
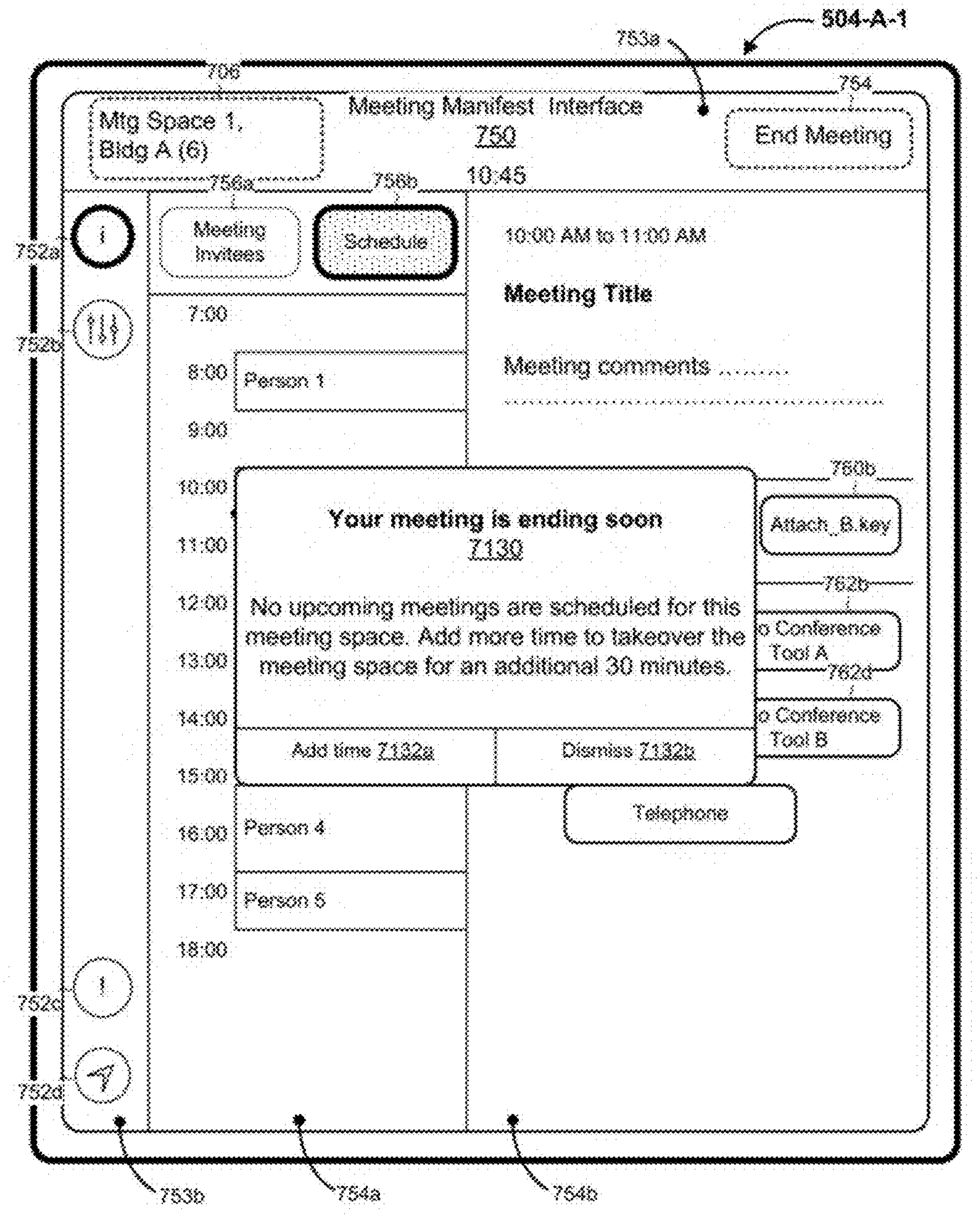
Figure 7P:
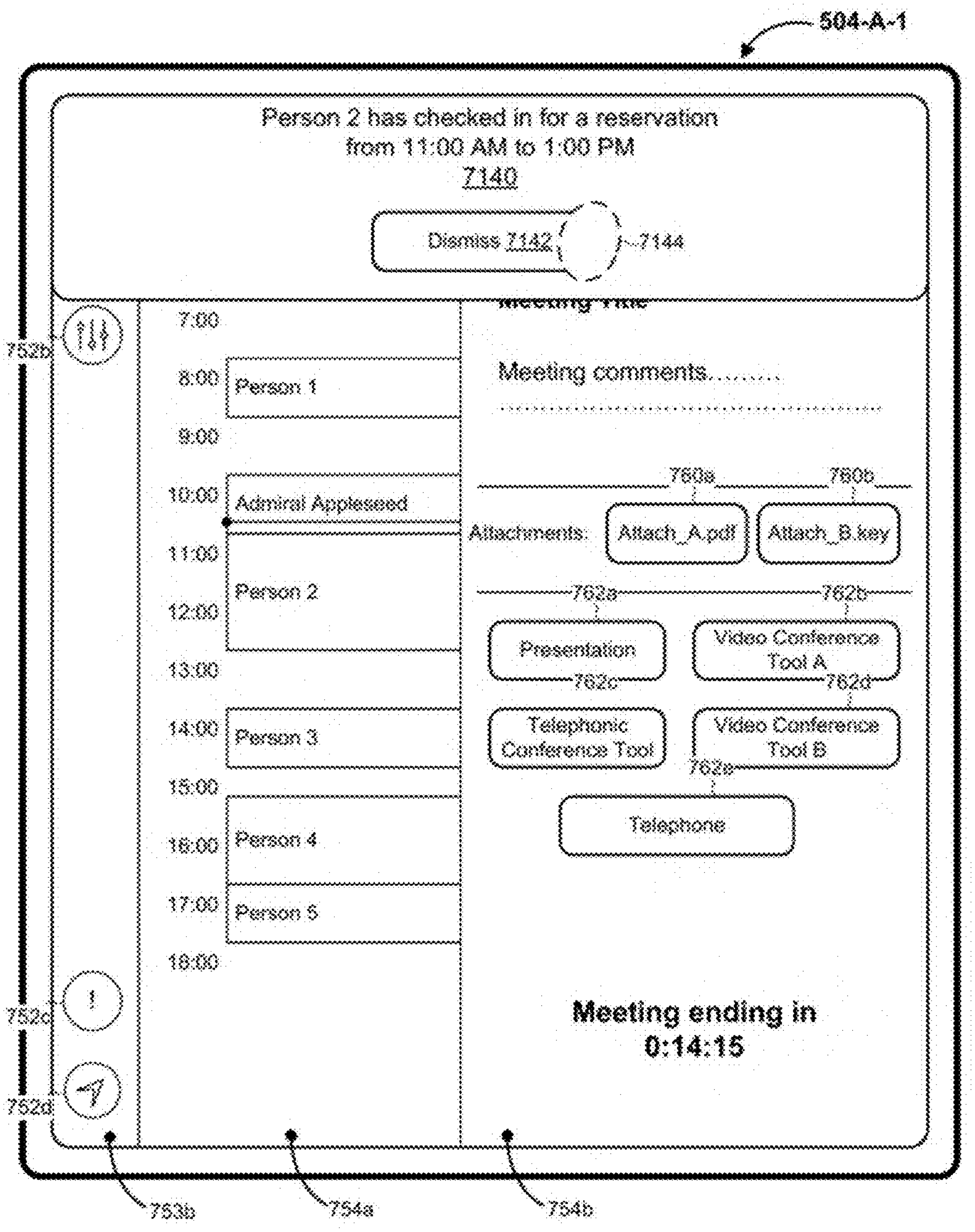
Figure 7Q:
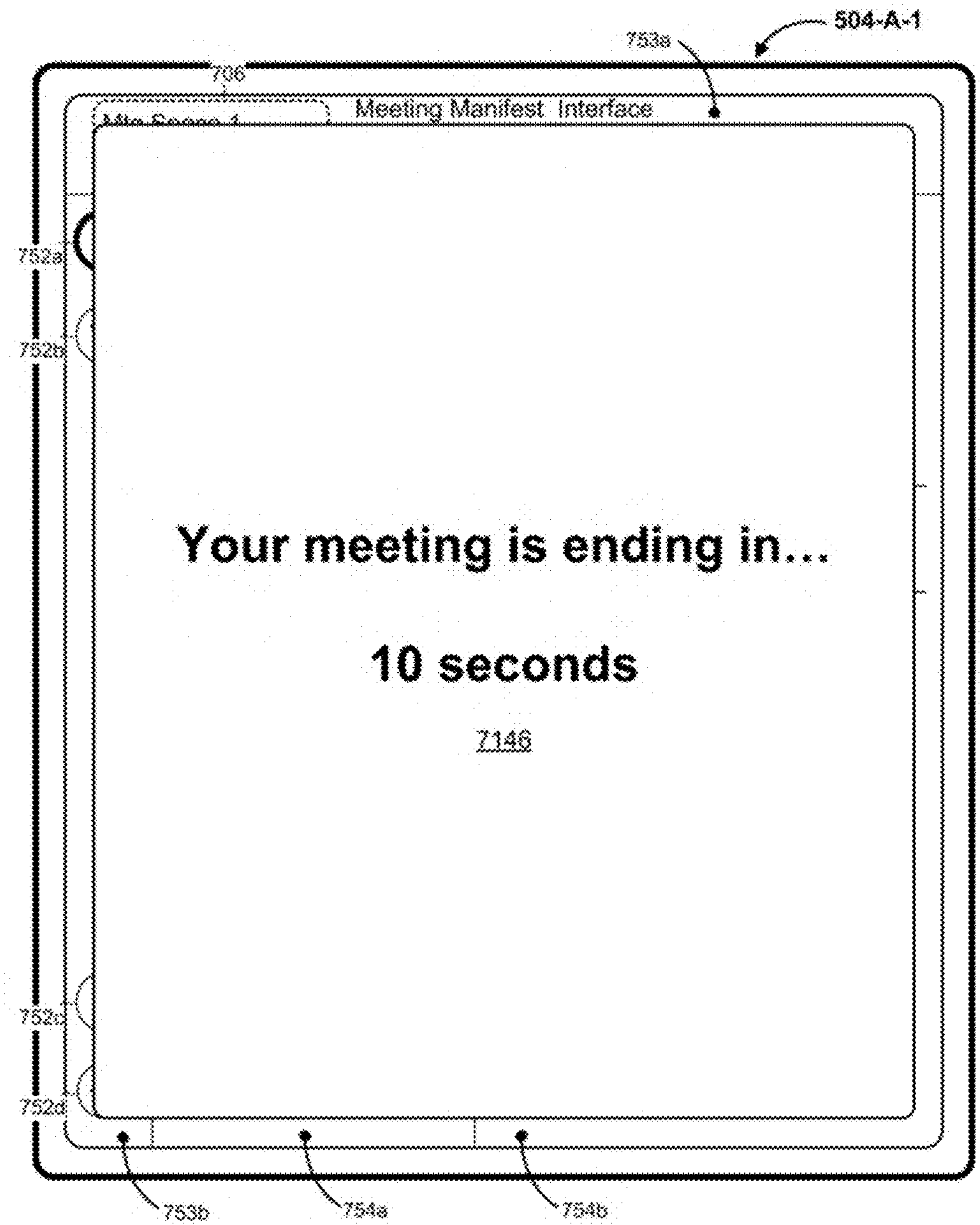
Figure 7R:
Figure 7S:
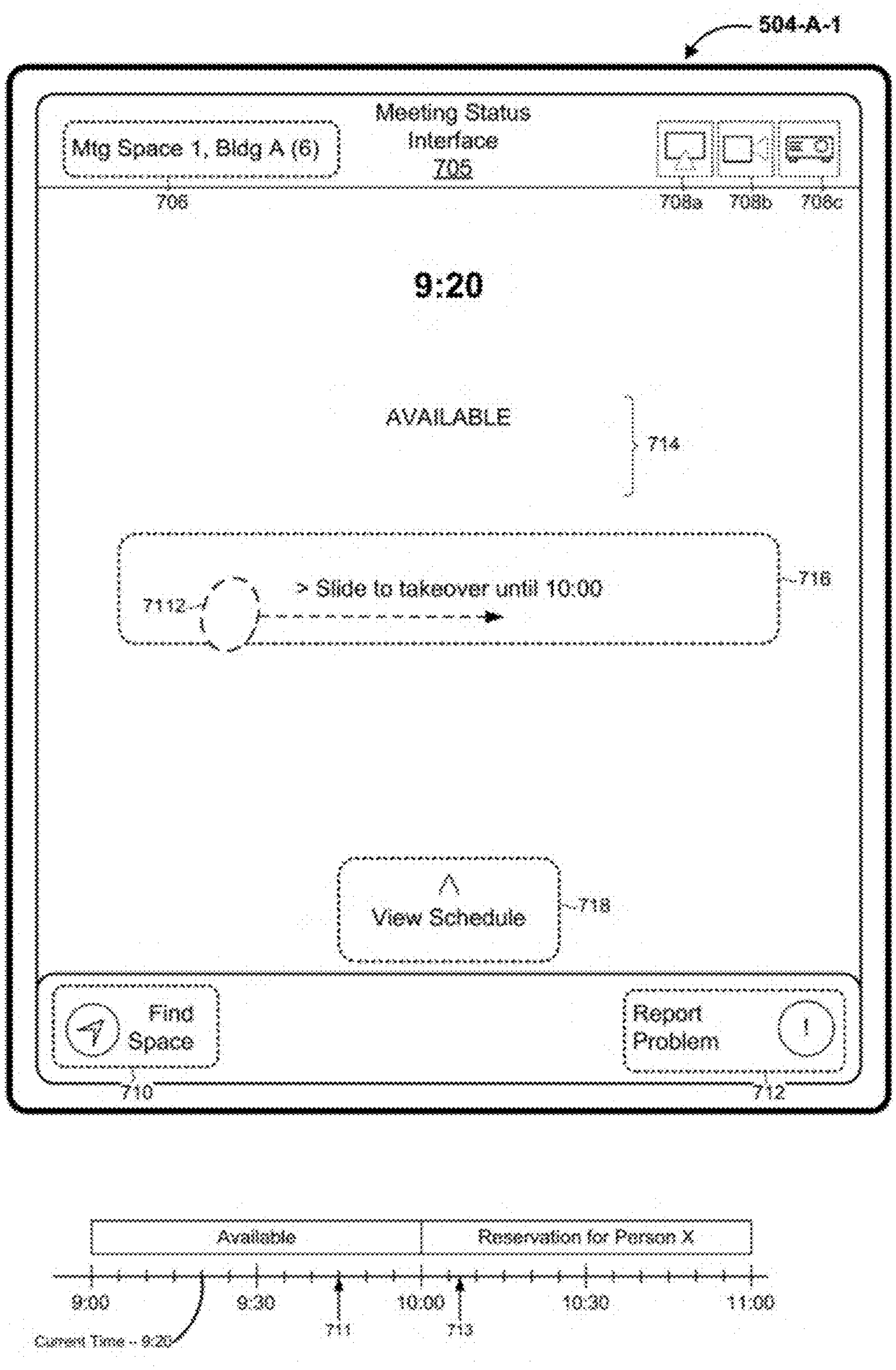
Figure 7T:
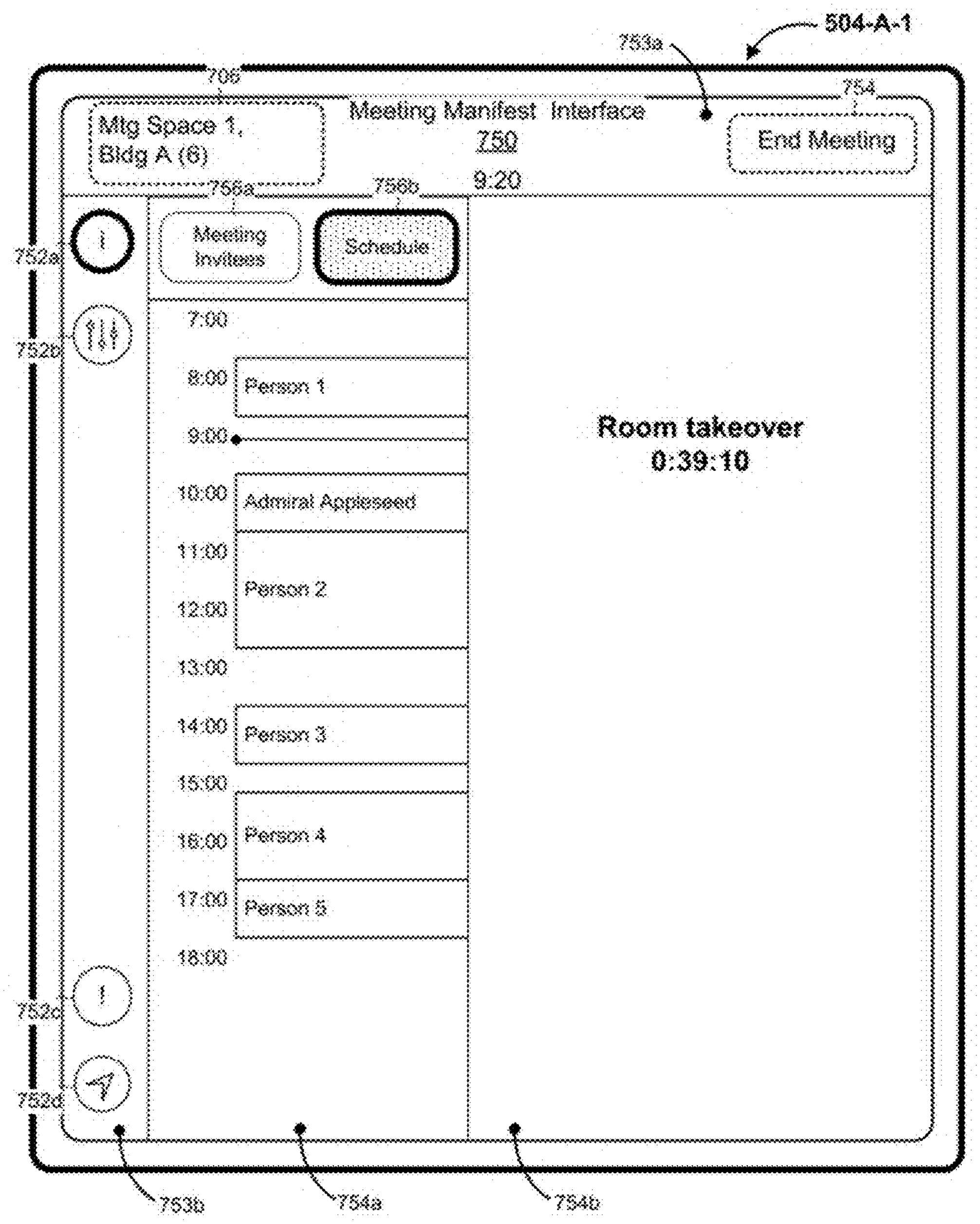
Figure 7U:
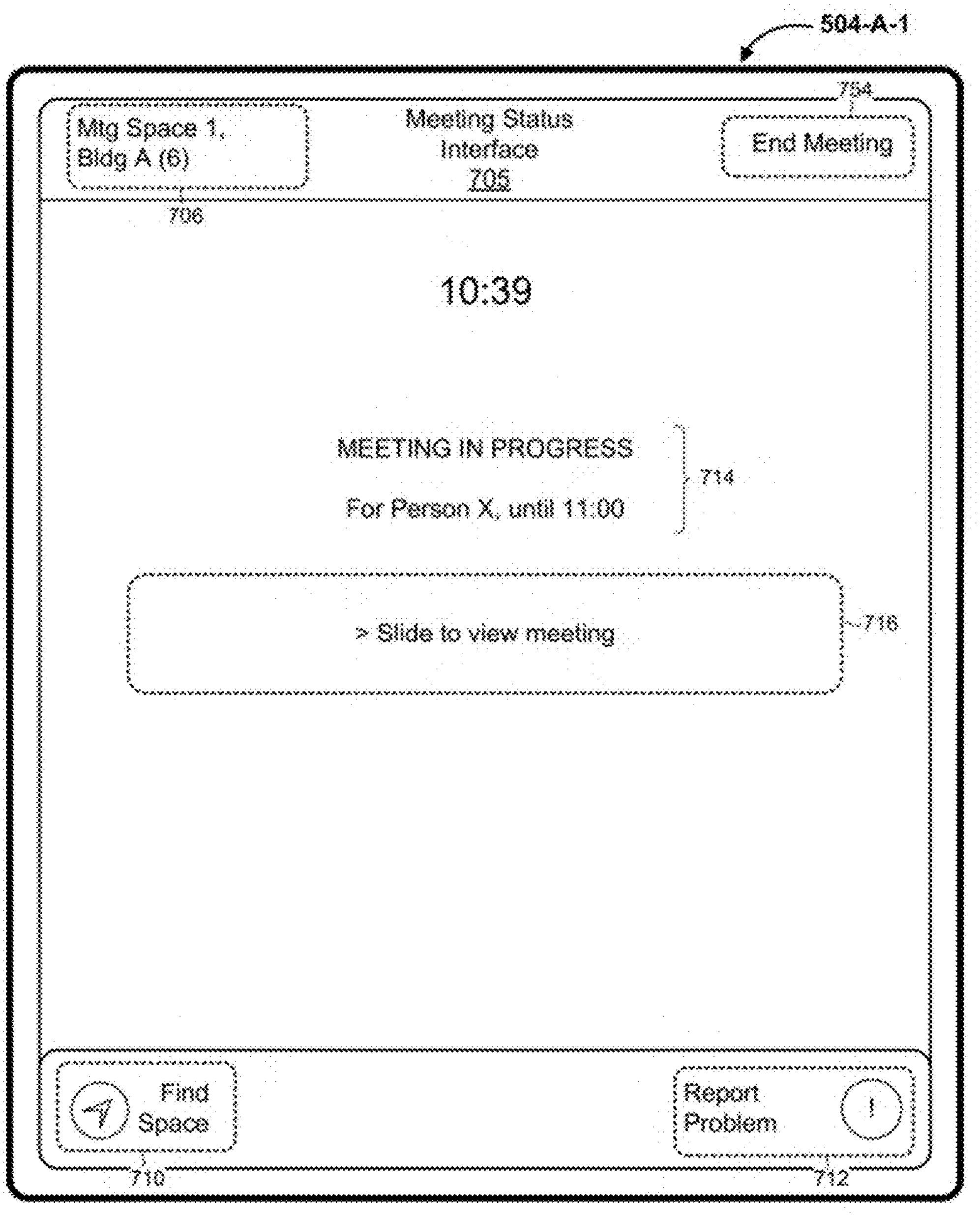
Figure 7V:
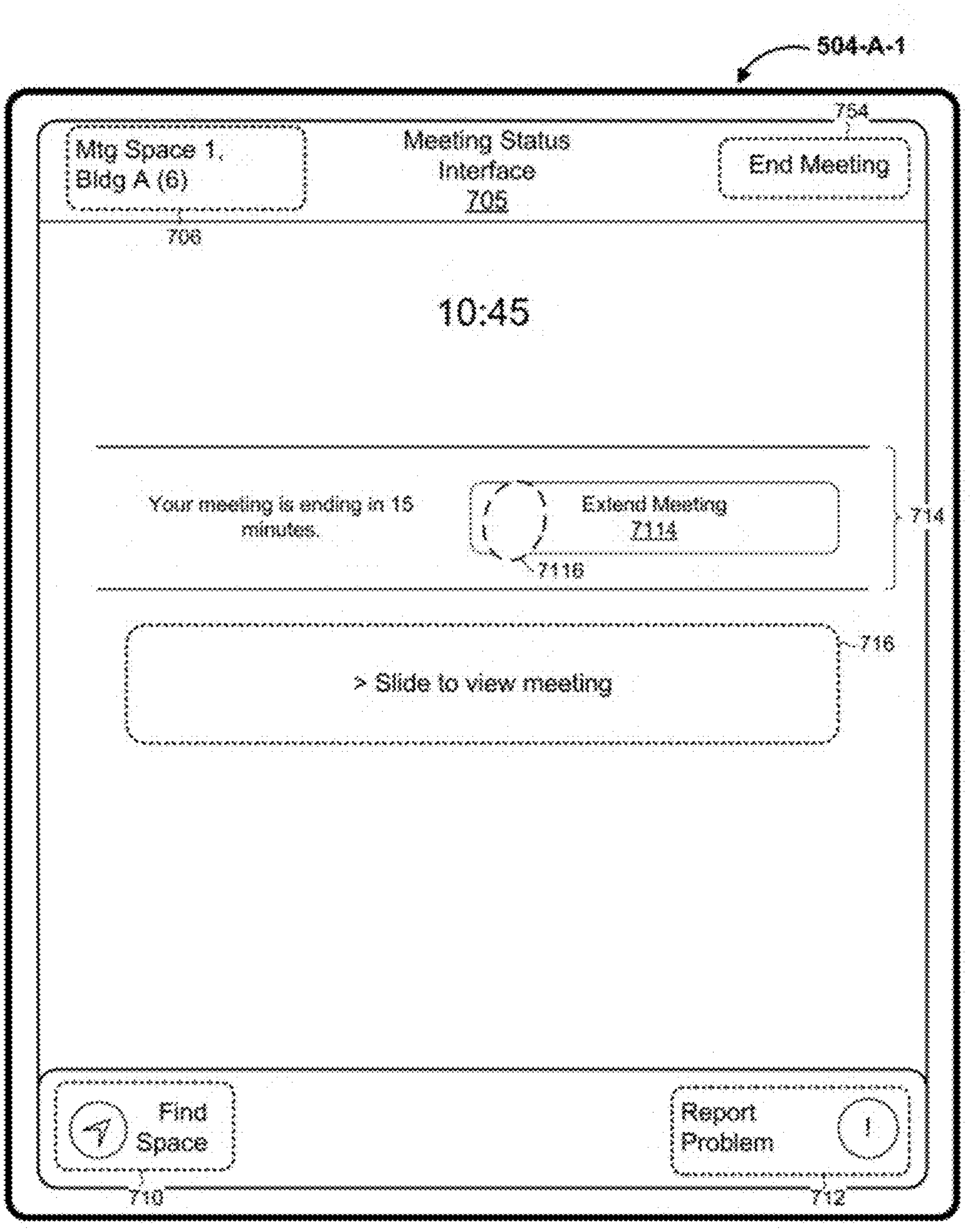
Figure 7W:
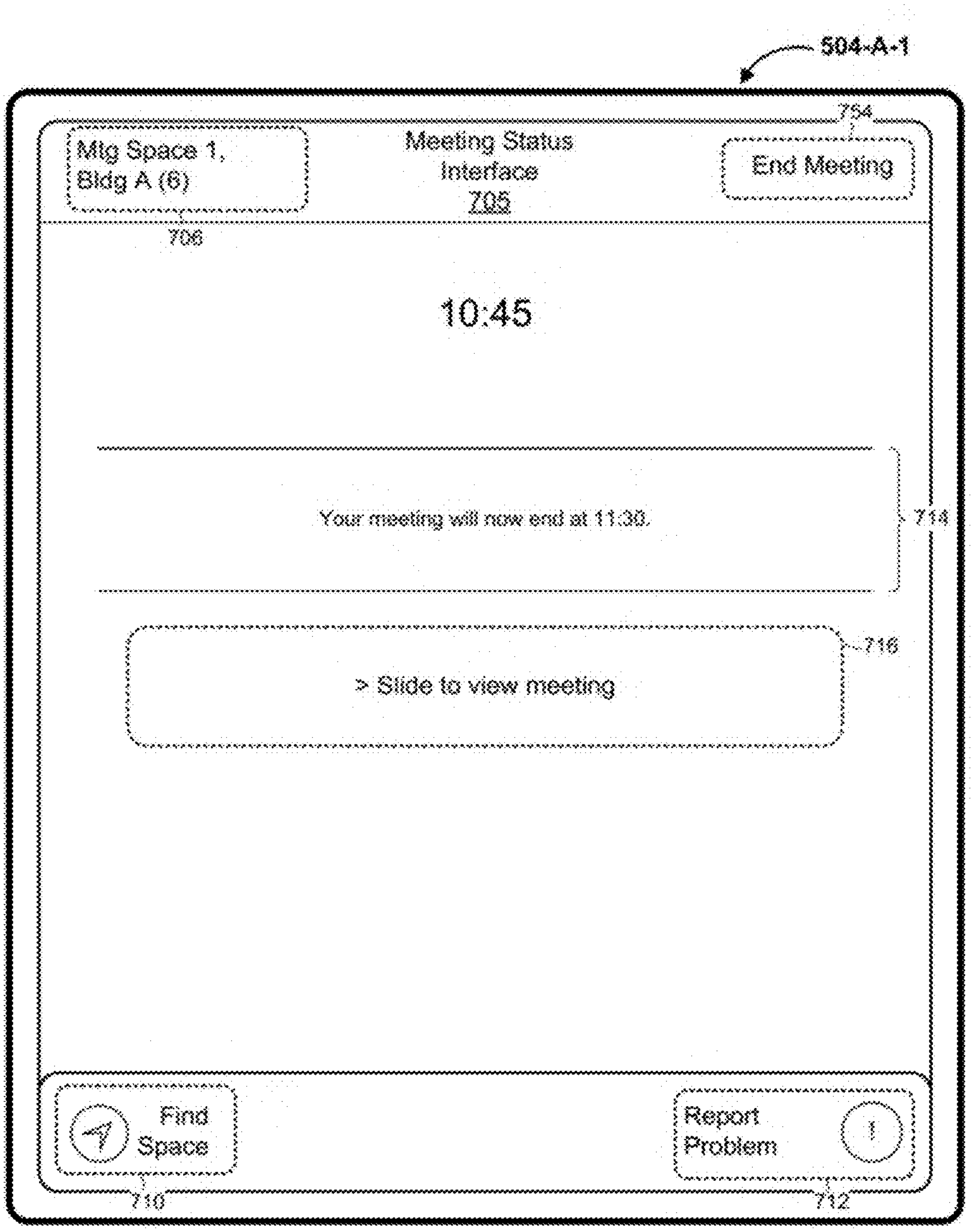
Figure 7X:
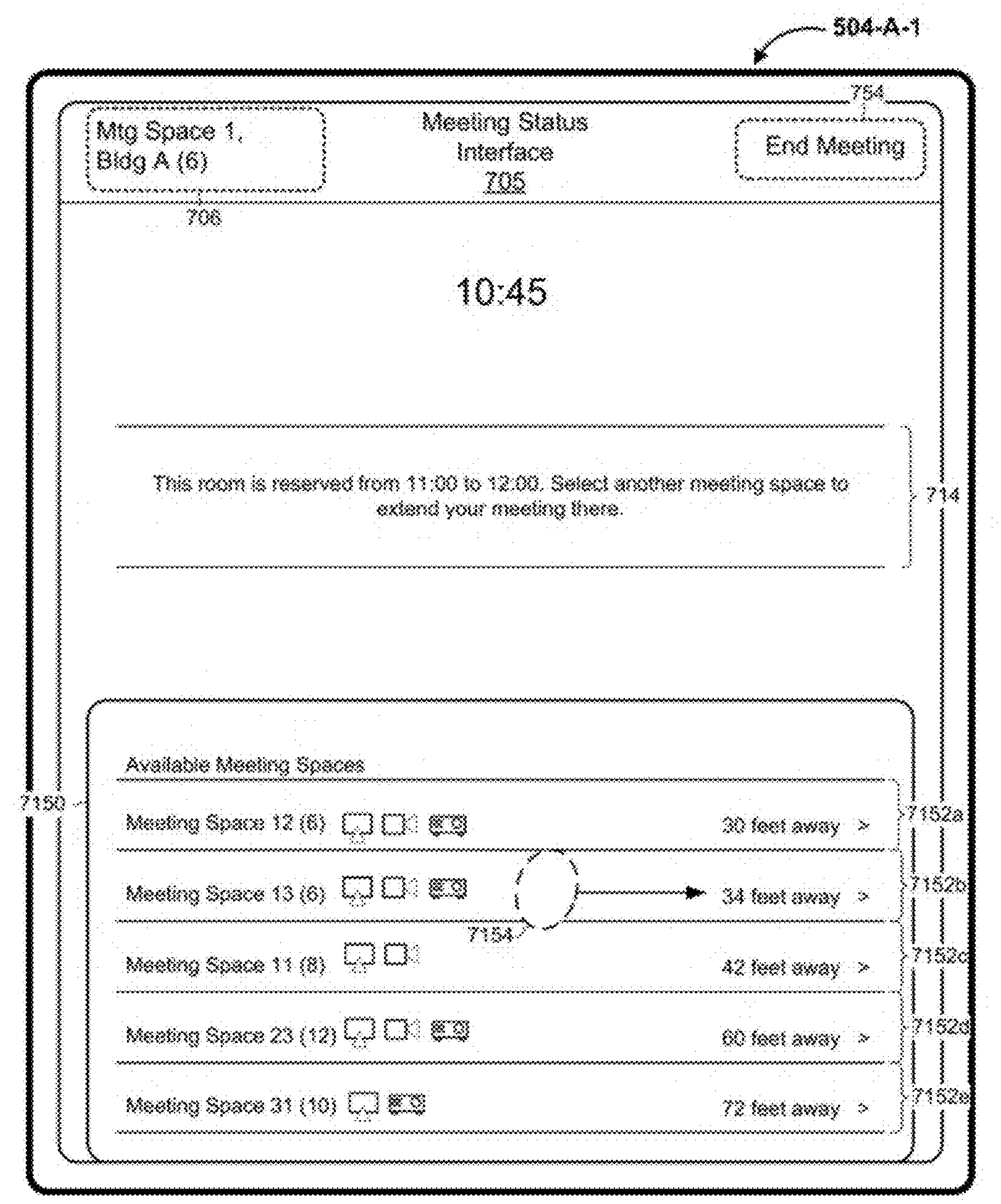
Figure 7Y:
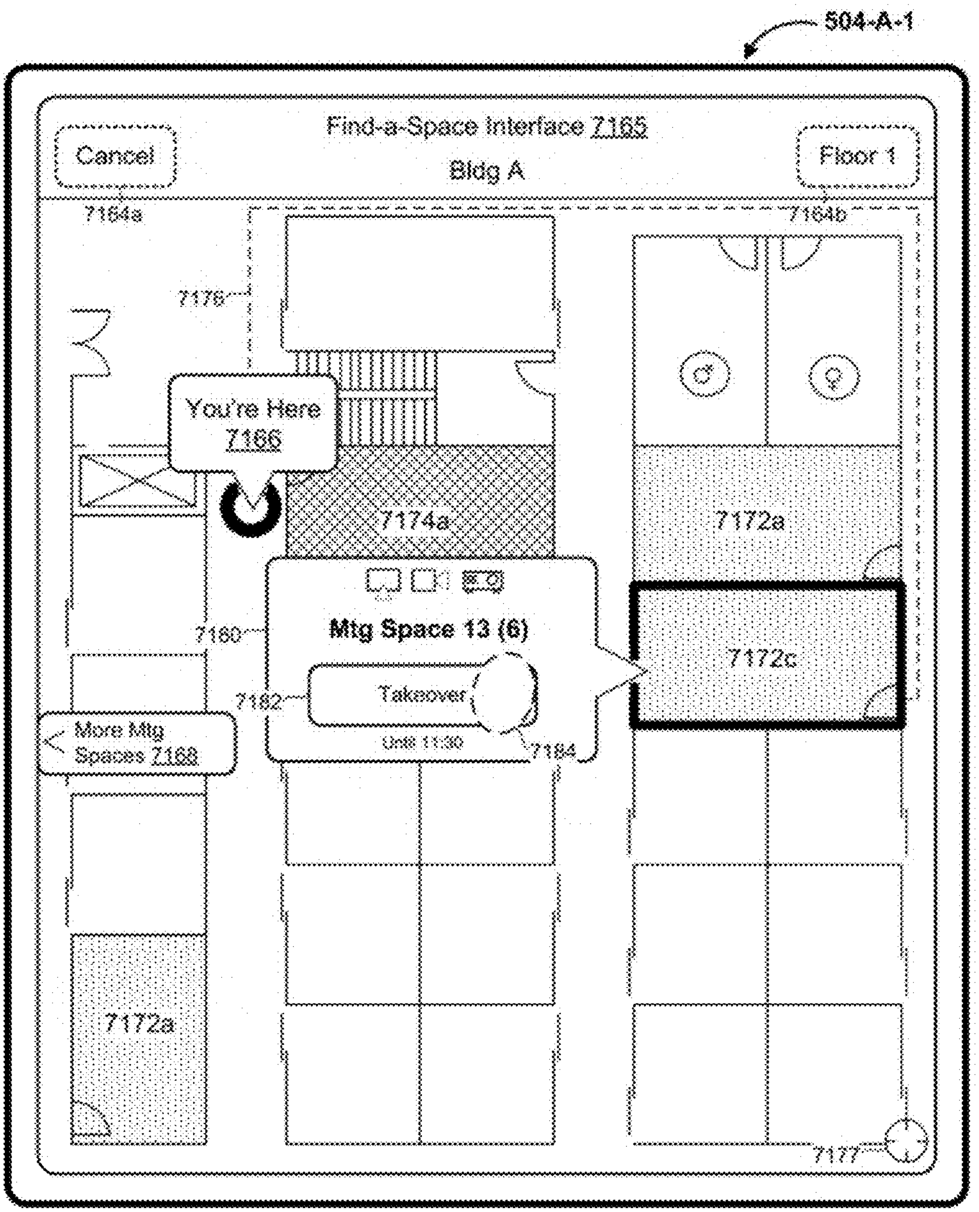
Figure 7Z:
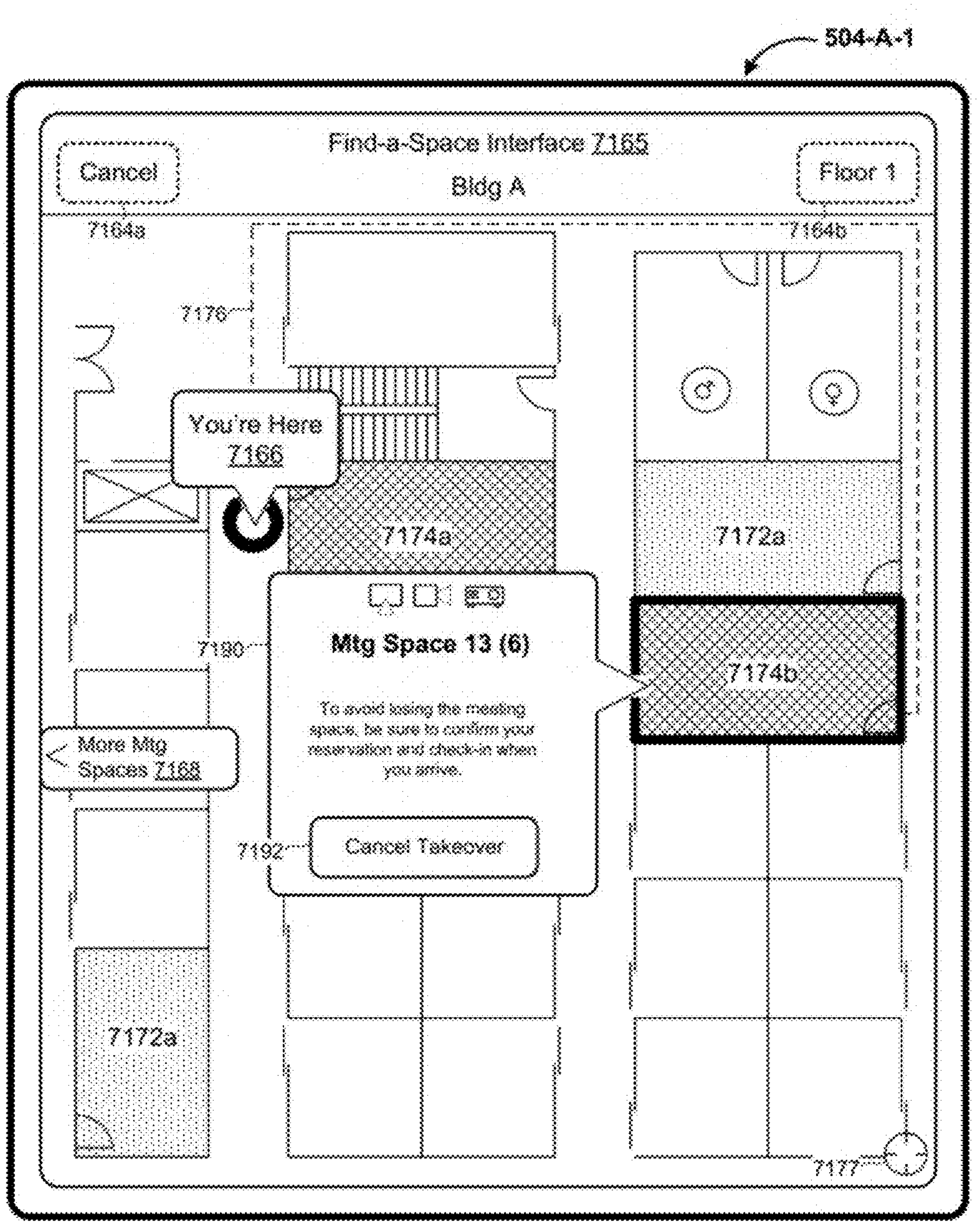

FIGS. 7A-7Z illustrate example user interfaces for managing and interacting with meeting spaces in accordance with some embodiments. The user interfaces in these figures are used to illustrate the processes described below, including the processes in FIGS. 9A-9B, 10A-10B, and 11A-11C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 7A shows the first device 504-A-1 displaying a meeting status interface 705. As shown in FIG. 7A, the meeting status interface 705 includes a meeting space affordance 706, which indicates that the first device 504-A-1 corresponds to meeting space 1, building A and the occupancy limit of meeting space 1, building A (e.g., an occupancy limit of six due to the existence of six chairs in meeting space 1, building A). When activated (e.g., with a contact), the meeting space affordance 706 causes a log for meeting space 1, building A to be displayed (e.g., as shown in FIG. 6Q). For example, the log indicates: previous or outstanding problems reported for meeting space 1, building A; the cleaning record of meeting space 1, building A; the last occupants of meeting space 1, building A; and/or the like.

As shown in FIG. 7A, the meeting status interface 705 also includes a plurality of attribute icons 708*a*, 708*b*, and 708*c* (collectively referred to as "attribute icons 708") indicating the equipment or features associated with meeting space 1, building A. In FIG. 7A, the first attribute icon 708*a* indicates that meeting space 1, building A is equipped with a display, the second attribute icon 708*b* indicates that meeting space 1, building A includes video or videoconference equipment, and the third attribute icon 708*c* indicates that meeting space 1, building A includes a projector. When activated (e.g., with a contact), the attribute icons 708 cause further details regarding the equipment or features of meeting space 1, building A to be displayed. For example, if the first attribute icon 708*a* is selected, information or details regarding the display are displayed such as model name, size, age, and/or the like.

As shown in FIG. 7A, the meeting status interface 705 further includes: the current time (e.g., 10:01); a status indicator 714 indicating a current availability or reservation status of meeting space 1, building A; a claiming affordance 716, which, when activated (e.g., with a left-to-right swipe gesture or a predefined gesture such as a one finger tap gesture), causes the status indicator 714 to change (e.g., change from reserved to meeting in progress/meeting starting soon, or from available to meeting in progress); and a schedule affordance 718, which, when activated (e.g., with an upward swipe gesture or a predefined gesture such as a one finger tap gesture), causes a reservation schedule associated with meeting space 1, building A to be displayed (e.g., FIG. 6C). In FIG. 7A, the status indicator 714 indicates that meeting space 1, building A is currently reserved for person X and that person X has to check-in before 10:07. In FIG. 7A, the claiming affordance 716 also prompts the user to "slide to check-in."

In this example, meeting space 1, building A is available from 9:30 to 10:00 and reserved for person X from 10:00 to 11:00. According to some embodiments, the status indicator 714 indicates "RESERVED" between the early check-in threshold 711 (e.g., 15 minutes prior to the reservation start time) and the check-in deadline 713 (e.g., 7 minutes after the reservation start time). As such, in some embodiments, the status indicator 714 indicates "RESERVED" when the current time is between the early check-in threshold 711 and the check-in deadline 713. Furthermore, in some embodiments, the claiming affordance 716 is enabled to check-in to an upcoming reservation while the meeting space is available and the current time is between the early check-in threshold 711 and the check-in deadline 713.

The meeting status interface 705 in FIGS. 7A-7Z is similar to an adapted from the meeting status interface 605 in FIGS. 6A-6W. Thus, according to some embodiments, the status indicator 714 and the claiming affordance 716 of the meeting status interface 705 function according to the same principles as described in FIGS. 6A-6W with reference to the meeting status interface 605.

FIGS. 7A-7C illustrate a sequence a user is authenticated prior to checking into an existing reservation. FIG. 7A also illustrates detecting a left-to-right swipe gesture over the claiming affordance 716 with a contact 722. FIG. 7B illustrates replacing display of the meeting status interface 705 with an authentication interface 745 in response to the left-to-right swipe gesture over the claiming affordance 716 in FIG. 7A.

As shown in FIG. 7B, the authentication interface 745 prompts the use to sign into his/her account. In FIG. 7B, the authentication interface 745 includes: a first text entry field 742*a* provided to enter the user's account name; a second text entry field 742*b* provided to enter user's password; a cancel affordance 744*a*, which, when activated (e.g., with a contact), causes the authentication interface 745 to be replaced with the meeting status interface 705 in FIG. 7A; and a sign in affordance 744*b*, which, when activated (e.g., with a contact), causes the credentials entered in the first text entry field 742*a* and the second text entry field 742*b* to be validated (e.g., by the controller 510 in FIG. 5A). In some embodiments, the authentication interface 745 prompts or enables entry of biometric authentication information such as a fingerprint signature, voice signature, retina signature, etc.

FIG. 7B also illustrates detecting a contact 746 at a location corresponding to the first text entry field 742. For example, in response to selection of the first text entry field 742 in FIG. 7B, the software keyboard 745 (shown in FIG. 7C) slides up from the bottom edge of the device 504-A-1. Continuing with this example, the user utilizes the software keyboard 745 to fill the first text entry field 742*a* and the second text entry field 742*b* with his/her account credentials.

FIGS. 7C-7D illustrate a sequence in which a meeting manifest interface 750 is displayed in response to validating the account credentials entered by the user of the device 504-A-1. FIG. 7C illustrates detecting a contact 748 at a location corresponding to the sign in affordance 744*b*. FIG. 7D illustrates replacing display of the authentication interface 745 with a meeting manifest interface 750 (e.g., associated with the reservation of person X from 10:00-11:00 as shown in FIG. 7A) in response to validation of the account credentials submitted in FIG. 7C.

As shown in FIG. 7D, the meeting manifest interface 750 includes a chrome region 753*a*, a sidebar region 753*b*, a first content region 752*a*, and a second content region 752*b*. The chrome region 753*a* includes: the current time (e.g. 10:01); the meeting space affordance 706; and an end meeting affordance 754, which, when activated (e.g., with a contact), causes the balance of the current reservation to be canceled and also causes the meeting manifest interface 750 to be replaced with the meeting status interface 705, where, in some cases, the status indicator 714 indicates that the room is available. According to some embodiments, with reference to FIG. 5A, in response to selection of the end meeting affordance 754, the device 504-A-1 sends a message to the controller 510 indicating that meeting space 1, building A is now available. As a result, the controller 510 updates the scheduling database 525 to release meeting space 1, building A for subsequent local takeover or remote reservation.

The sidebar region 753*b* includes: a first affordance 752*a* provided to display the meeting manifest interface 750 (currently active); a second affordance 752*b* provided to display a controls interface 780 (e.g., shown in FIG. 7H); a third affordance 752*c* provided to display a reporting interface 790 (e.g., shown in FIG. 7I); and fourth affordance 752*d* provided to display a find-a-space interface (e.g., shown in FIG. 6U and FIG. 7X).

In FIG. 7D, the first content region 752*a* includes: a first affordance 756*a* provided to display the invitees associated with the current reservation (currently active); and a second affordance 756*b* provided to display the reservation schedule for meeting space 1, building A (e.g., shown in FIG. 7M). As shown in FIG. 7D, the first content region 752*a*, which is currently in invitee mode as indicated by the shading of the first affordance 756*a*, displays a list of the invitees 758*a*, 758*b*, 758*c*, 758*d*, and 758*e* (collectively referred to as "invitees 758") associated with the current reservation of meeting space 1, building A from 10:00-11:00 (e.g., as shown in FIG. 7A). In FIG. 7D, each of the invitees 758 is associated with a name, a participation request (e.g., required or optional), and an RSVP status. For example, the invitee 758*a* is associated with a check mark icon 759*a* indicating that the invitee 758*a* accepted the reservation/meeting invitation. In another example, the invitee 758*d* is associated with a question-mark icon 759*b* indicating that the invitee 758*d* responded as tentative to the reservation/meeting invitation. In another example, the invitee 758*e* is associated with an X icon 759*c* indicating that the invitee 758*e* responded declined the reservation/meeting invitation.

In FIG. 7D, the second content region 752*b* shows details associated with the current reservation of meeting space 1, building A from 10:00-11:00 (e.g., as shown in FIG. 7A). As shown in FIG. 7D, the second content region 752*b* includes: the duration of the current meeting/reservation (e.g., 10:00 to 11:00), the meeting title, meeting comments, and attachments 760*a* and 760*b* associated with the meeting invitation, which, when activated (e.g., with a contact), cause the attachments to be downloaded and also cause options for displaying the attachments to be provided by the device 504-A-1. As shown in FIG. 7D, the second content region 752*b* also includes a plurality of affordance 762*a*, 762*b*, 762*c*, 762*d*, and 762*e* (collectively referred to as "affordances 762") provided to access and control equipment or features associated with meeting space 1, building A through the device 504-A-1.

FIG. 7D also illustrates detecting a contact 764 at a location corresponding to the invitee 758*d* who responded as tentative to the meeting/reservation invitation. FIG. 7E illustrates displaying a contact menu 766 provided to contact the invitee 758*d* in response to selection of the invitee 758*d* in FIG. 7D. As shown in FIG. 7E, the contact menu 766 includes: a first affordance 768*a* provided to call the mobile telephone of the invitee 758*d* through the device 504-A-1 or the equipment associated with meeting space 1, building A; a second affordance 768*b* provided to call the work telephone of the invitee 758*d* through the device 504-A-1 or the equipment associated with meeting space 1, building A; a third affordance 768*c* provided to send an instant message or SMS to the invitee 758*d* through the device 504-A-1 or the equipment associated with meeting space 1, building A; and a fourth affordance 768*d* provided to send an email to the work email address of the invitee 758*d* through the device 504-A-1 or the equipment associated with meeting space 1, building A.

FIG. 7E also illustrates detecting a contact 770 at a location corresponding to the end meeting affordance 754. FIG. 7F illustrates displaying an end meeting prompt 772 overlaid on the meeting manifest interface 750 in response to selection of the end meeting affordance 754 in FIG. 7E. As shown in FIG. 7F, the end meeting prompt 772 indicates that the user will be logged out of the device 504-A-1 and cancel the balance of the reservation, which will then be available for takeover by other users. As shown in FIG. 7F, the end meeting prompt 772 includes: a cancel affordance 774*a* provided to cancel the end meeting operation; and an end meeting affordance 774*b* provided to confirm the end meeting operation.

FIG. 7F also illustrates detecting a contact 776 at a location corresponding to the cancel affordance 774*a*. FIG. 7G illustrates ceasing display of the end meeting prompt 772 in response to selection of the cancel affordance 774*a* in FIG. 7F. FIG. 7G is similar to and adapted from FIG. 7D. As such, FIG. 7D and FIG. 7G include similar user interfaces and elements labeled with the same reference number in both figures have the same function, with only the differences are described herein for the sake of brevity.

FIG. 7G-7H illustrate a sequence in which the meeting manifest interface 750 is replaced with a controls interface 780. FIG. 7G also illustrates detecting a contact 778 at a location corresponding to the second affordance 752*b* in the sidebar region 753*b*. FIG. 7H illustrates replacing display of the meeting manifest interface 750 with the controls interface 780 in response to selection of the second affordance 752*b* in FIG. 7G. FIG. 7H is similar to and adapted from FIG. 7D. As such, FIG. 7D and FIG. 7H include similar user interfaces and elements labeled with the same reference number in both figures have the same function, with only the differences are described herein for the sake of brevity. As shown in FIG. 7H, the controls interface 780 includes a chrome region 753*a*, a sidebar region 753*b*, a first controls region 781*a*, and a second controls region 781*b*.

As shown in FIG. 7H, the first controls region 781*a* includes a list of control affordances 782*a*, 782*b*, 782*c*, 782*d*, 782*e*, 782*f*, and 782*g* (collectively referred to as "control affordances 782") provided to focus a corresponding control in the second controls region 781*b*. According to some embodiments, the list of control affordances 782 correspond to the equipment or features associated with meeting space 1, building A. As such, a user is able to control the equipment or features associated with meeting space 1, building A through the device 504-A-1 using the controls interface 780. In FIG. 7H, the first controls region 781*a* includes also includes: a presets affordance 784*a* provided to set the equipment or features associated with meeting space 1, building A to predefined settings (e.g., turn off the displays, set the temperature to room temperature, turn off the lights, etc.); and an addition affordance 784*b* provided to add a custom control.

As shown in FIG. 7H, the second controls region 781*b* includes a plurality of controls 784*a*, 784*b*, 784*d*, 784*d*, 784*d*, and 784*e* for adjusting corresponding equipment or features associated with meeting space 1, building A. For example, the control 784*c* is a slider provided to adjust the zoom of camera #1.

FIG. 7H-7I illustrate a sequence in which the controls interface 780 is replaced with a reporting interface 790. FIG. 7H also illustrates detecting a contact 788 at a location corresponding to the third affordance 752*c* in the sidebar region 753*b*. FIG. 7I illustrates replacing display of the controls interface 780 with the reporting interface 790 in response to selection of the third affordance 752*c* in FIG. 7H. FIG. 7I is similar to and adapted from FIG. 7D. As such, FIG. 7D and FIG. 7I include similar user interfaces and elements labeled with the same reference number in both figures have the same function, with only the differences are described herein for the sake of brevity. As shown in FIG. 7I, the reporting interface 790 includes a chrome region 753*a*, a sidebar region 753*b*, a first problem reporting region 794*a*, and a second problem reporting region 794*b*.

As shown in FIG. 7I, the first problem reporting region 794*a* includes a list of affordances 792*a*, 792*b*, 792*c*, 792*d*, 792*e*, 792*f*, 792*g*, 792*h*, 792*i*, 792*j*, and 792*k* (collectively referred to as "affordances 792") provided to generate a problem report or service request for a corresponding service or features associated with meeting space 1, building A. For example, selection of the affordance 792*a* (e.g., with a contact) causes a service request to clean meeting space 1, building A to be generated. As another example, selection of the affordance 792*g* (e.g., with a contact) causes a problem report indicating a problem with the phone of meeting space 1, building A to be generated.

As shown in FIG. 7I, the second problem reporting region 794*b* includes an image of meeting space 1, building A. In FIG. 7I, affordances 794*a*, 794*b*, 794*c*, 794*d*, 794*e*, 794*f*, and 794*g* (collectively referred to as "affordances 794") are co-located with at least some of the equipment or features of meeting space 1, building A. The affordances 794 are provided to generate a problem report or service request for a corresponding feature associated with meeting space 1, building A. For example, selection of the affordance 794*b* (e.g., with a contact) causes a problem report indicating a problem with the display #2 of meeting space 1, building A to be generated. As another example, selection of the affordance 794*g* (e.g., with a contact) causes a problem report indicating a problem with one of the chairs of meeting space 1, building A to be generated.

FIG. 7I-7K illustrate a sequence in which a problem report is generated for a feature of meeting space 1, building A using the reporting interface 790. FIG. 7I also illustrates detecting a contact 7100 at a location corresponding to the affordance 794*a* within the second problem reporting region 794*b*. FIG. 7J illustrates displaying a "report problem" affordance 798 within the first problem reporting region 794*a* in response to selection of the affordance 794*a* in FIG. 7I. FIG. 7J is similar to and adapted from FIG. 7I. As such, FIG. 7I and FIG. 7J include similar user interfaces and elements labeled with the same reference number in both figures have the same function, with only the differences are described herein for the sake of brevity. As shown in FIG. 7J, a help prompt 7102 is overlaid on the second problem reporting region 794*b* in response to selection of the affordance 794*a* in FIG. 7I. For example, when activated (e.g., with a contact), the help prompt 7102 enables the user of the device 504-A-1 to enter a description of the problem or further details associated with the problem.

FIG. 7J also illustrates detecting a contact 7104 at a location corresponding to the "report problem" affordance 798 within the first problem reporting region 794*a*. FIG. 7K illustrates displaying an alert 7106 indicating that a problem report was reported for the feature associated with affordances 792*c* and 794*a* (e.g., display #1) in response to selection of the "report problem" affordance 798 in FIG. 7J. For example, the alert 7106 indicates the time and date the problem report was submitted, and the user that initiated the problem report (e.g., the user currently signed onto the device 504-A-1).

FIG. 7K-7L illustrate a sequence in which the reporting interface 790 is replaced with the meeting manifest interface 750. FIG. 7K also illustrates detecting a contact 7108 at a location corresponding to the first affordance 752*a* within the sidebar region 753*b*. FIG. 7L illustrates replacing display of the reporting interface 790 with the meeting manifest interface 750 in response to selection of the first affordance 752*a* in FIG. 7L. FIG. 7L is similar to and adapted from FIG. 7D. As such, FIG. 7D and FIG. 7L include similar user interfaces and elements labeled with the same reference number in both figures have the same function, with only the differences are described herein for the sake of brevity.

FIG. 7L-7M illustrate a sequence in which the first content region 752*a* of the meeting manifest interface 750 is changed from invitee mode to schedule mode. FIG. 7L illustrates detecting a contact 7110 at a location corresponding to the schedule affordance 754*b* within the first content region 752*a*. FIG. 7M illustrates replacing display of the list of invitee affordances 758 with a reservation schedule associated with meeting space 1, building A within the first content region 752*a*.

FIG. 7N illustrates displaying a first alert message 7120 overlaid on the meeting manifest interface 750. According to some embodiments, the first alert message 7120 is displayed when the current time (e.g., 10:45) is less than 15 minutes prior to the end of the reservation and another reservation of the meeting space follows the current reservation. As shown in FIG. 7N, the first alert message 7120 indicates that the current meeting is ending soon and that meeting space 1, building A is reserved for another meeting. The first alert message 7120 also indicates that the user can extend the current meeting in another meeting space if additional time is needed.

As shown in FIG. 7N, the first alert message 7120 includes: a find-a-space affordance 7122*a* provided to display the find-a-space interface (e.g., shown in FIG. 6T and FIG. 7Y) to enable the user to find another meeting space to takeover if additional time is needed for the current meeting; and a dismiss affordance 7122*b* provided to cease displaying the first alert message 7120. FIG. 7N further illustrates detecting a contact 7126 at a location corresponding to the dismiss affordance 7122*b*.

FIG. 7O illustrates displaying a second alert message 7130 overlaid on the meeting manifest interface 750. According to some embodiments, the second alert message 7130 is displayed when the current time (e.g., 10:45) is less than 15 minutes prior to the end of the reservation and the meeting space is available at the end of the current reservation. As shown in FIG. 7O, the second alert message 7130 indicates that the current meeting is ending soon and that meeting space 1, building A is available at the end of the current meeting. The second alert message 7130 also indicates that the user is able to extend the current reservation in meeting space 1, building A if additional time is needed. As shown in FIG. 7O, the second alert message 7130 includes: an add time affordance 7132*a* provided to extend the current reservation in meeting space 1, building A by adding 30 minutes to the current reservation; and a dismiss affordance 7132*b* provided to cease displaying the second alert message 7130.

FIG. 7P illustrates displaying a notification 7140 overlaid on the meeting manifest interface 750. According to some embodiments, the notification 7140 is displayed when a user checks in for the next reservation using the device 502-A-1. As shown in FIG. 7P, the notification 7140 indicates that person 2 checked in for the reservation of meeting space 1, building A from 11:00 to 12:00. In FIG. 7P, the notification 7140 includes a dismiss affordance 7142 provided to cease displaying the notification 7140. As shown in FIG. 7P, a countdown is displayed within the second content region 752*b*. According to some embodiments, the countdown is displayed when the current time (e.g., 10:45) is less than 15 minutes prior to the end of the reservation. FIG. 7P also illustrates detecting a contact 7144 at a location corresponding to the dismiss affordance 7142.

FIG. 7Q illustrates displaying an alert 7146 overlaid on the meeting manifest interface 750. For example, according to some embodiments, the alert 7146 counts down the last 10 seconds of the current reservation. As shown in FIG. 7Q, the alert 7146 indicates that the current reservation ends in 10 seconds.

FIG. 7R illustrates displaying an alert 7148 overlaid on the meeting manifest interface 750. For example, according to some embodiments, the alert 7148 is displayed once the current reservation ends. As shown in FIG. 7R, the alert 7148 indicates that the current reservation has ended and that the user has been signed out of the device 504-A-1.

FIG. 7S is similar to and adapted from FIG. 7A. As such, FIG. 7A and FIG. 7S include similar user interfaces and elements labeled with the same reference number in both figures have the same function, with only the differences are described herein for the sake of brevity. FIG. 7S shows the first device 504-A-1 displaying the meeting status interface 705. In this example, meeting space 1, building A is available from 9:00 to 10:00 and reserved for person X from 10:00 to 11:00. As shown in FIG. 7S, the status indicator 714 indicates "AVAILABLE" because meeting space 1, building A is available until 10:00 based on the current time (e.g., 9:20). In FIG. 7S, the claiming affordance 716 is enabled and also prompts the user to "slide to takeover unit 10:00."

According to some embodiments, the status indicator 714 indicates "AVAILABLE" while the meeting space is available and the current time (e.g., 9:20) is prior to the early check-in threshold 711 for the next reservation. According to some embodiments, claiming affordance 716 is enabled to take over a meeting space while the meeting space is available and a threshold amount of time (e.g., 20 or 30 minutes) exists prior to the next reservation based on the current time.

FIGS. 7S-7T illustrate a sequence in which a user takes over an available room without authentication. FIG. 7S also illustrates detecting a left-to-right swipe gesture over the claiming affordance 716 with a contact 7112. FIG. 7T illustrates replacing display of the meeting status interface 705 with the meeting manifest interface 750 in response to the left-to-right swipe gesture over the claiming affordance 716 in FIG. 7S. FIG. 7T is similar to and adapted from FIG. 7M. As such, FIG. 7M and FIG. 7T include similar user interfaces and elements labeled with the same reference number in both figures have the same function, with only the differences are described herein for the sake of brevity. As shown in FIG. 7T, the second content region 752*b* does not include any meeting details because meeting space 1, building A was taken over in FIG. 7S without an existing reservation. In FIG. 7T, the second content region 752*b* includes a countdown of the takeover period of meeting space 1, building A.

FIG. 7U illustrates displaying the meeting status interface 705 in response to the device 504-A-1 entering standby mode. For example, according to some embodiments, after displaying the meeting manifest interface 750 for a predefined timeout duration (e.g., 5 minutes) without any user inputs or interaction, the meeting manifest interface 750 is replaced with the meeting status interface 705 as shown in FIG. 7U. FIG. 7U is similar to and adapted from FIG. 7A. As such, FIG. 7A and FIG. 7U include similar user interfaces and elements labeled with the same reference number in both figures have the same function, with only the differences are described herein for the sake of brevity. According to some embodiments, the status indicator 714 indicates "MEETING IN PROGRESS" when a meeting/reservation is in progress and the device 504-A-1 enters standby mode. As shown in FIG. 7U, the claiming affordance 716 is enabled and provided to replace display of the meeting status interface 705 with the meeting manifest interface 750 (e.g., as shown in FIG. 7D).

FIG. 7U-7V illustrate a sequence in which the status indicator 714 changes while the meeting status interface 705 is in standby mode and in accordance to a determination that the current time is within predefined reminder duration (e.g., 15 minutes) of the end of the current reservation. FIG. 7V is similar to and adapted from FIG. 7A. As such, FIG. 7A and FIG. 7V include similar user interfaces and elements labeled with the same reference number in both figures have the same function, with only the differences are described herein for the sake of brevity. As shown in FIG. 7V, the status indicator 714 indicates that the current reservation is ending in 15 minutes. For example, according to some embodiments, while in standby mode, the status indicator 714 changes from the state in FIG. 7U to the state in FIG. 7V in accordance to a determination that the current time (e.g., 10:45) is within the predefined reminder duration (e.g., 15 minutes) of the end of the current reservation (e.g., 11:00).

In FIG. 7V, the status indicator 714 also includes an extend meeting affordance 7114 provided to extend the current reservation. As shown in FIG. 7V, the claiming affordance 716 is enabled and provided to replace display of the meeting status interface 705 with the meeting manifest interface 750 (e.g., as shown in FIG. 7D).

FIGS. 7V-7W illustrate a sequence in which the current reservation is extended in meeting space 1, building A. FIG. 7V also illustrates detecting a contact 7116 at a location corresponding to the "extend meeting" affordance 7114. FIG. 7W illustrates the status indicator 714 indicating that the current meeting/reservation will now end at 11:30 (e.g., instead of 11:00) in response to selection of the "extend meeting" affordance 7114 in FIG. 7V. According to some embodiments, if meeting space 1, building A is available after the current reservation, selection of the "extend meeting" affordance 7114 causes 30 minutes to be added to the current reservation in meeting space 1, building A. As shown in FIG. 7W, the claiming affordance 716 is enabled and provided to replace display of the meeting status interface 705 with the meeting manifest interface 750 (e.g., as shown in FIG. 7D).

FIGS. 7V and 7X illustrate a sequence in which a list of available meeting spaces 7150 is overlaid on the meeting status interface 705. FIG. 7V also illustrates detecting a contact 7116 at a location corresponding to the "extend meeting" affordance 7114. FIG. 7X illustrates displaying a list of available meeting spaces 7150 overlaid on the meeting status interface 705 in response to selection of the "extend meeting" affordance 7114 in FIG. 7V. According to some embodiments, if meeting space 1, building A is unavailable after the current reservation, selection of the "extend meeting" affordance 7114 causes the list of available meeting spaces 7150 to be overlaid on the meeting status interface 705. According to some embodiments, if meeting space 1, building A is unavailable after the current reservation, selection of the "extend meeting" affordance 7114 causes the find-a-space interface 7165 (e.g., as shown in FIG. 7Y) to replace display of the meeting status interface 705.

As shown in FIG. 7X, the status indicator 714 indicates that meeting space 1, building A is reserved from 11:00 to 12:00. As such, the current meeting/reservation cannot be extended in meeting space 1, building A. However, the user can extend the current meeting/reservation in a different meeting space by using the list of available meeting spaces 7150.

As shown in FIG. 7X, the list of available meeting spaces 7150 includes a plurality of affordances 7152*a*, 7152*b*, 7152*c*, 7152*d*, and 7152*e* (collectively referred to as the "affordances 7152") associated with available meeting spaces. For example, as shown in FIG. 7X, the list of available meeting spaces 7150 is sorted by proximity to meeting space 1, building A. In FIG. 7X, each of the available meeting spaces 7152 is associated with a name, occupancy limit, one or more attribute icons corresponding to equipment or features associated with the meeting space, and a distance from meeting space 1, building A.

FIGS. 7X-7Y illustrate a sequence in which a find-a-space interface 7165 replaces display of the meeting status interface 705. FIG. 7X also illustrates a left-to-right swipe gesture over the affordance 7152*b* associated with meeting space 13 with a contact 7154. FIG. 7Y illustrates replacing display of the meeting status interface 705 with the find-a-space interface 7165 in response to the swipe gesture in FIG. 7X. As shown in FIG. 7Y, the find-a-space interface 7165 displays a plan view of the first floor of building A and an indicator 7166 of the location of the device 504-A-1 (e.g., inside of meeting space 1, building A which corresponds to unavailable meeting space 7174*a*).

FIG. 7Y also illustrates displaying a path 7176 from the indicator 7166 to available meeting space 7172*c* (e.g., meeting space 13 which correspond to the affordance 7152*b* in FIG. 7X) overlaid on the find-a-space interface 7165 in response to the swipe gesture in FIG. 7X. FIG. 7Y further illustrates displaying a menu 7180 associated with available meeting space 7172*c* in response to the swipe gesture in FIG. 7X.

As shown in FIG. 7Y, the menu 7180 includes attributes of the available meeting space 7172*c* such the occupancy limit of the available meeting space 7172*c* (e.g., six people) and icons corresponding to the equipment associated with the available meeting space 7172*c* (e.g., a display, videoconferencing equipment, and a projector). As shown in FIG. 7Y, the menu 7180 also includes a takeover affordance 7182, which, when activated (e.g., with a contact), causes the current meeting/reservation to be extended in the available meeting space 7172*c* until 11:30.

According to some embodiments, the user of the device 504-A-1 is able to navigate the plan view by pinching to zoom in or out and dragging to pan east, west, north or south. In FIG. 7Y, the find-a-space interface 7165 includes a centering affordance 7177, which, when activated (e.g., with a contact), causes the plan view within the find-a-space interface 7165 to re-center on the indicator 7166.

As shown in FIG. 7Y, the find-a-space interface 7165 includes: a cancel affordance 7164*a*, which, when activated (e.g., with a contact), causes the find-a-space interface 7165 to be replaced with the meeting status interface 705 in FIG. 7V; and a floor affordance 7164*b* indicating the floor associated with the plan view displayed within the find-a-space interface 7165 (e.g., the first floor of building A) and provided to display a plan view of a different floor of building A within the find-a-space interface 7165.

As shown in FIG. 7Y, the find-a-space interface 7165 also includes an unavailable meeting space 7174*a* with a first appearance (e.g., a first shading pattern). As shown in FIG. 7Y, the find-a-space interface 7165 also includes a second plurality of available meeting spaces 7172*a*, 7172*b*, and 7172*c* (collectively referred to as "available meeting spaces 7172") with a second appearance (e.g., a second shading pattern). According to some embodiments, when a respective available meeting space 7172 is activated (e.g., selected with a contact), a path from the indicator 7166 to the respective available meeting space 7172 is overlaid on the plan view within the find-a-space interface 7165 (e.g., as shown in FIG. 6U). According to some embodiments, when a respective available meeting space 7172 is activated (e.g., selected with a contact), a menu is overlaid on the plan view within the find-a-space interface 7165, where the menu includes details of the respective available meeting space 7172 and an affordance provided to take over or reserve the respective available meeting space 7172 (e.g., as shown in FIG. 7Y).

As shown in FIG. 7Y, the find-a-space interface 7165 further includes a more meeting spaces affordance 7168, which, when activated (e.g., with a contact), causes a list of available meeting spaces in building A to be displayed within the find-a-space interface 7165 overlaid on or replacing display of the plan view of the first floor of building A. According to some embodiments, the list of available meeting spaces is sorted based at least in part on proximity to the location of the device 504-A-1. According to some embodiments, the list of available meeting spaces is sorted based at least in part on a set of one or more filter criteria provided by the user of the device 504-A-1 (e.g., number of chairs, projector, videoconference equipment, and/or the like).

FIGS. 7Y-7Z illustrate a sequence in which the current meeting/reservation is extended in a different meeting space. FIG. 7Y further illustrates detecting a contact 7184 at a location corresponding to the takeover affordance 7182. FIG. 7Z is similar to and adapted from FIG. 7Y. As such, FIG. 7Y and FIG. 7Z include similar user interfaces and elements labeled with the same reference number in both figures have the same function, with only the differences are described herein for the sake of brevity. FIG. 7Z illustrates changing the available meeting space 7172*c* to unavailable meeting space 7174*b* in response to selection of the takeover affordance 7182 in FIG. 7Y. As shown in FIG. 7Z, the unavailable meeting space 7174*b* is displayed with the first appearance (e.g., the first shading pattern) within the find-a-space interface 7165.

FIG. 7Z also illustrates displaying an alert 7190 overlaid on the find-a-space interface 7165 in response to selection of the takeover affordance 7182 in FIG. 7Y. As shown in FIG. 7Z, the alert 7190 indicates that the current reservation is extended by 30 minutes in unavailable meeting space 7174*b*. In FIG. 7Z, the alert 7190 also prompts the user to check-in to the extended reservation when arriving at the unavailable meeting space 7174*b*. In FIG. 7Z, the alert 7190 also includes a cancel takeover affordance 7192, which, when activated (e.g., with a contact), causes the extended reservation of the unavailable meeting space 7174*b* to be canceled.

Figure 8:
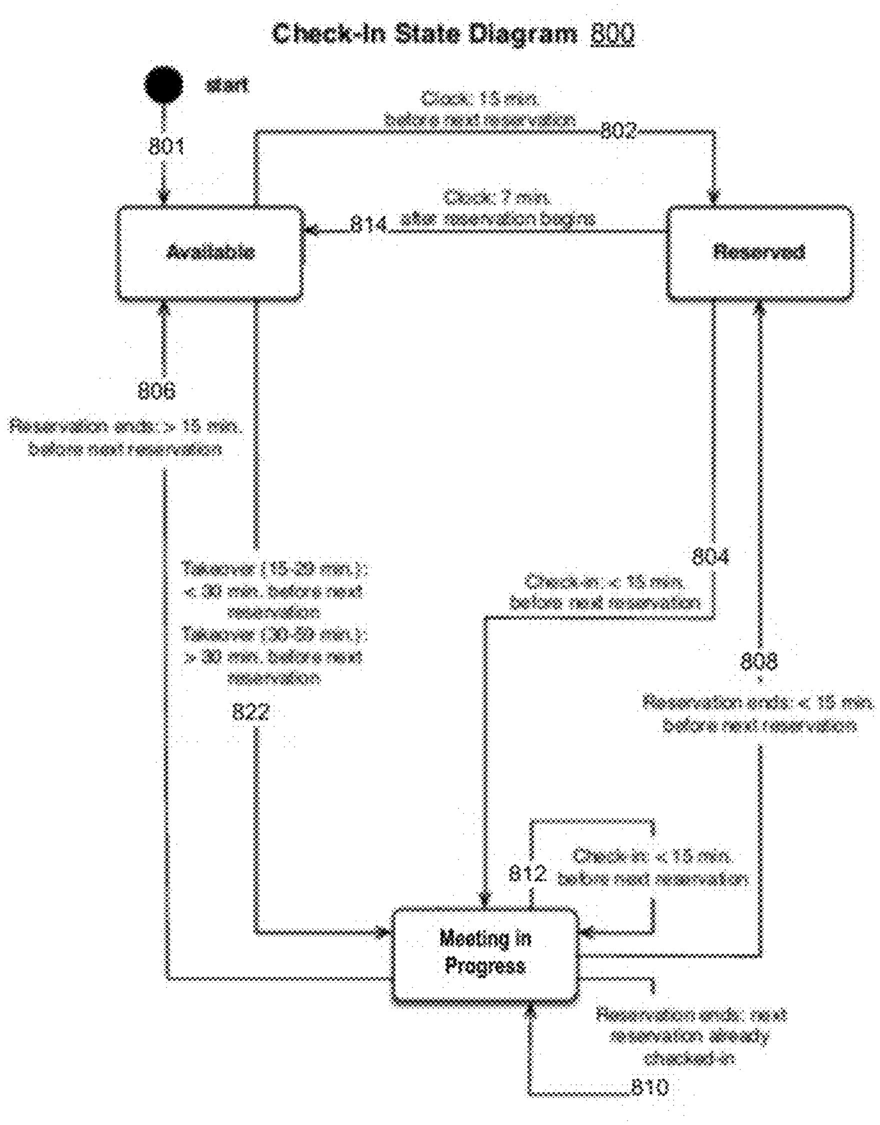
FIG. 8 illustrates an example state diagram for a status indicator associated with a meeting space in accordance with some embodiments.

FIG. 8 illustrates an example state diagram 500 for various states of the status indicator associated with a meeting space in accordance with some embodiments. While pertinent features are shown, those of ordinary skill in the art will appreciate from the present disclosure that various other features have not been illustrated for the sake of brevity and so as not to obscure more pertinent aspects of the example implementations disclosed herein. To that end, according to some embodiments, the state diagram 500 applies to the status indictor 614 within the meeting status interface 605 (e.g., shown in FIGS. 6A-6W). Similarly, according to some embodiments, the state diagram 500 applies to the status indictor 714 within the meeting status interface 705 (e.g., shown in FIGS. 7A-7Z).

As shown in FIG. 8, the status indicator starts (801) as “AVAILABLE.” While the status indicator is “AVAILABLE,” if the current time is after the early check-in threshold associated with the next reservation (e.g., 15 minutes prior to the next reservation), the status indicator changes (802) from “AVAILABLE” to “RESERVED.” While the status indicator is “RESERVED,” if a user checks-in to the reservation, the status indicator changes (804) from “RESERVED” to “MEETING IN PROGRESS.” While the status indicator is “RESERVED,” if the current time is after the check-in deadline for the (e.g., 7 minutes after the reservation start time) and a user failed to check-in for the reservation, the status indicator changes (814) from “RESERVED” to “AVAILABLE.”

While the status indicator is “MEETING IN PROGRESS,” if the reservation ends and there is at least a threshold amount of time before the next reservation (e.g., at least 15, 20, 30 minutes before the next reservation), the status indicator changes (806) from “MEETING IN PROGRESS” to “AVAILABLE.” While the status indicator is “MEETING IN PROGRESS,” if the reservation ends and there are less 15 minutes before the next reservation, the status indicator changes (808) from “MEETING IN PROGRESS” to “RESERVED.”

While the status indicator is “MEETING IN PROGRESS,” if a user checks in for a next reservation, the status indicator maintains (812) being “MEETING IN PROGRESS.” While the status indicator is “MEETING IN PROGRESS,” if the reservation ends and the next reservation is already checked in, the status indicator maintains (810) being “MEETING IN PROGRESS.”

While the status indicator is “AVAILABLE,” if there is at least a threshold amount of time before the next reservation (e.g., at least 15, 20, 30 minutes before the next reservation) and a user takes over the meeting space, the status indicator changes (822) from “AVAILABLE” to “MEETING IN PROGRESS.”

FIGS. 9A-9B illustrate a flow diagram of a method 900 of claiming meeting spaces in accordance with some embodiments. The method 900 is performed at a first electronic device (e.g., the portable multifunction device 100 in FIG. 1A, or the device 300 in FIG. 3), associated with a meeting space, with one or more processors, non-transitory memory, a display, and an input device. In some embodiments, the display is a touch-screen display and the input device is on or integrated with the display. In some embodiments, the display is separate from the input device. Some operations in method 900 are, optionally, combined and/or the order of some operations is, optionally, changed.

In some embodiments, the first device is associated with the meeting space in place of being associated with a particular user. For example, the first device does not store the entire calendar of the particular user but instead has information regarding reservations of the meeting space which optionally include a reservation of the meeting space by the particular user. In another example, the first device has access to a scheduling database (e.g., the scheduling database 525 in FIG. 5A). In some embodiments, the first device is associable with the meeting space. For example, the first device is a phone or tablet of a user. In this example, when the user walks into the meeting space with the first device, the location of the device is associated with the meeting space and meeting space functionality for the particular meeting space is enabled on the first device.

In some embodiments, the first device is located outside of the meeting space (e.g., the device 502-A-1 in FIGS. 5A-5B). In some embodiments, a second device inside of the meeting space (e.g., the device 504-A-1 in FIGS. 5A-5B) is synchronized with the first device. For example, the second device displays notifications associated with a meeting in progress such as the end time, alerts/countdown when the meeting ends (e.g., as shown in FIGS. 7Q-7R), ability to extend meeting in the current meeting space if the next time slot is available (e.g., as shown in FIG. 7O), and/or ability to extend the meeting to another meeting space (e.g., as shown in FIG. 7N). For example, the second device enables control of meeting space environmental controls and meeting space equipment (e.g., teleconference, projector, smart TV, etc.). For example, after authenticating the user, the second device enables the user of the second device to view and edit meeting details (e.g., the meeting manifest interface 750 in FIG. 7D), make calls to missing attendees (e.g., the menu 766 within the meeting manifest interface 750 in FIG. 7E), and project meeting attachments using meeting space equipment (e.g., the tools 760*a*, 760*b*, 760*c*, 760*d*, and 760*e* within the meeting manifest interface 750 in FIG. 7D).

As described below, the method 900 provides an intuitive way to claim meeting spaces. The method reduces the cognitive burden on a user when claiming meeting spaces, thereby creating a more efficient human-machine interface. For battery-operated electronic devices, enabling a user to claim meeting spaces faster and more efficiently conserves power and increases the time between battery charges.

The device displays (902), on the display, a meeting space status interface that includes a status indicator indicating a current reservation status for the meeting space (e.g., “AVAILABLE”, “RESERVED”, “MEETING IN PROGRESS”, “MEETING STARTING SOON”, or the like) and a claiming affordance provided to claim reservations of the meeting space. In one example, the claiming affordance is associated with a “slide to check-in” prompt in order to check-in to an upcoming reservation. In another example, the claiming affordance is associated with a “slide to takeover” prompt in order to commandeer an available meeting space. As such, for example, users are able to directly glean information regarding the status and availability of the meeting space through one interface.

For example, FIG. 6A shows a meeting status interface 605 associated with meeting space 1, building A displayed by the first device 502-A-1. In this example, the meeting status interface 605 includes: the current time (e.g., 9:47); a status indicator 614 indicating a current availability or reservation status of meeting space 1, building A; and a claiming affordance 616, which, when activated (e.g., with a left-to-right swipe gesture or a predefined gesture such as a one finger tap gesture), causes the status indicator 614 to change (e.g., change from reserved to meeting in progress/meeting starting soon, or from available to meeting in progress). As shown in FIG. 6A, the status indicator 614 indicates that meeting space 1, building A is currently reserved for person X and that person X has to check-in before 10:07. In FIG. 6A, the claiming affordance 616 also prompts the user to “slide to check-in.”

In some embodiments, the meeting space status interface also includes (904) a schedule affordance provided to display a reservation schedule associated with the meeting space. As such, according to some embodiments, users are able to glean scheduling information in addition to information regarding the status and availability of the meeting space through one interface. For example, if the user swipes upward from the bottom of the meeting space status interface, the reservation schedule slides up from the bottom of the meeting status interface 605 and is overlaid on at least a portion of the status indicator and/or the claiming affordance. For example, in FIG. 6A, the meeting status interface 605 also includes a schedule affordance 618, which, when activated (e.g., with an upward swipe gesture or a predefined gesture such as a one finger tap gesture), causes a reservation schedule associated with meeting space 1, building A to be displayed. FIGS. 6B-6C, for example, show a sequence in which a reservation schedule 634 for meeting space 1, building A is displayed within the meeting status interface 605 due to selection of the schedule affordance 618.

In some embodiments, the meeting space status interface also includes (906) one or more graphical representations corresponding to features associated with the meeting space. As such, according to some embodiments, users are able to glean information regarding the attributes of a meeting space in addition to information regarding the status and availability of the meeting space through one interface in order to make an informed decision about using the meeting space. For example, the features include the equipment in the meeting space such as teleconference equipment, a projector, a display, and/or the like. In some embodiments, additional details such as the equipment type, model, age, and/or the like are displayed when a user selects one of the graphical representations. For example, in FIG. 6A, the meeting status interface 605 also includes a plurality of attribute icons 608*a*, 608*b*, and 608*c* (collectively referred to as "attribute icons 608") indicating the equipment or features associated with meeting space 1, building A. In FIG. 6A, the first attribute icon 608*a* indicates that meeting space 1, building A is equipped with a display, the second attribute icon 608*b* indicates that meeting space 1, building A includes video or videoconference equipment, and the third attribute icon 608*c* indicates that meeting space 1, building A includes a projector. When activated (e.g., with a contact), the attribute icons 608 cause further details regarding the equipment or features associated with meeting space 1, building A to be displayed. For example, if the first attribute icon 608*a* is selected, information or details regarding the display are displayed such as the model name, size, age, and/or the like.

In some embodiments, the meeting space status interface also includes (908) a reporting affordance provided to report one or more problems with features of the meeting space. As such, according to some embodiments, users are able to report problems with a meeting spaces in addition to information regarding the status and availability of the meeting space through one interface. For example, as shown in FIG. 6A, the meeting status interface 605 further includes a "report problem" affordance 612, which, when activated (e.g., with a contact), causes a reporting interface to replace the meeting status interface 605. FIGS. 6J-6O, for example, show a sequence in which a reporting interface 655 replaces display of the meeting status interface 605 and the user reports a problem with the projector of meeting space 1, building A.

In some embodiments, the meeting space status interface also includes (910) a problem indicator provided to indicate one or more outstanding problems with the meeting space. As such, according to some embodiments, users are able to glean information regarding the outstanding issues with a meeting space in addition to information regarding the status and availability of the meeting space through one interface in order to make an informed decision about using the meeting space. In some embodiments, the meeting space status interface includes an indicator notifying the user of an outstanding problem with the meeting space. For example, a list of previously reported and/or outstanding problems with the meeting space and/or its features such as a dysfunctional projector, malfunctioning teleconference equipment, or a cleaning request is displayed when the indicator is selected. FIGS. 6P-6Q illustrate a sequence in which the meeting status interface 605 indicates the reported problem with space 1, building A in FIGS. 6J-6O. For example, FIG. 6P shows a badge 682 displayed within the meeting space affordance 606 in response to generating and submitting the problem report in FIGS. 6J-6O. In this example, the badge 682 indicates that an outstanding problem is associated with meeting space 1, building A. Continuing with this example, in FIG. 6Q, a log 685 is overlaid on the meeting status interface 605. The log 686 lists the nature, time, and date of the outstanding problem 685 associated with meeting space 1, building A. For example, the outstanding problem 685 is associated with the problem report that was generated and submitted in FIGS. 6J-6O.

In some embodiments, the meeting space status interface also includes (912) a find-a-room affordance provided to find available meeting spaces. As such, according to some embodiments, users are able to find available meeting spaces in addition to information regarding the status and availability of the meeting space through one interface. In some embodiments, if the user selects the find-a-room affordance, the meeting status interface 605 is replaced with a find-a-space interface 6105 (e.g., as shown in FIG. 6T). For example, the find-a-space interface 6105 includes a map with available meetings spaces shown in a different display mode than occupied meeting spaces. In some embodiments, if the user selects the find-a-room affordance, a list of available meeting spaces sorted by proximity to the current meeting space is overlaid the meeting status interface 605 (e.g., as shown in FIG. 7X).

For example, as shown in FIG. 6A, the meeting status interface 605 further includes a "find space" affordance 610, which, when activated (e.g., with a contact), causes a find-a-space interface to replace display of the meeting status interface 605. For example, FIGS. 6S-6W show a sequence in which the meeting status interface 605 is replaced with a find-a-space interface 6105 and a user takes over an available meeting space through the find-a-space interface 6105.

While displaying the meeting space status interface, the device detects (914) a change in conditions at the meeting space. According to some embodiments, the triggers for various changes in conditions at the meeting space are described with reference to the state diagram 800 in FIG. 8. As one example, a change in conditions at the meeting space occurs when a change in time relative to an upcoming reservation of the meeting space is detected. As another example, a change in conditions at the meeting space occurs when a user checks-in to an upcoming reservation. As another example, a change in conditions at the meeting space occurs when an ongoing reservation ends. As yet another example, a change in conditions at the meeting space occurs when a user commandeers an available meeting space. As yet another example, a change in conditions at the meeting space occurs when a user fails to check-in to a reservation before a check-in deadline.

In response to detecting the change in conditions at the meeting space, and in accordance with a determination, based on the change in conditions at the meeting space, that the one or more claiming criteria are satisfied, the device enables (916) (or maintaining enablement of) the claiming affordance. In some embodiments, the claiming affordance 616 is enabled within the meeting status interface 605 when a prompt is displayed. For example, the claiming affordance 616 is activated with a left-to-right swipe gesture, a right-to-left swipe gesture, a one finger tap gesture, a two finger tap gesture, or the like. As such, according to some embodiments, meeting spaces are better utilized on, for example, corporate campuses with limited meeting spaces or conference rooms. For example, the ability of users to interact with the meeting space is changed based on the conditions at the meeting space so as to release meeting spaces that have not been checked-in to or to allow available meeting spaces to be commandeered In some embodiments, the claiming criteria are satisfied and the claiming affordance is enabled to takeover an available room when the status indicator indicates that the meeting room is available and the amount of time between the current time and the next reservation is greater than a threshold meeting time (e.g., more than 15 or 30 minutes prior to the next reservation). For example, in FIGS. 6I-6J, meeting space 1, building A is available from 9:30 to 10:00 and reserved for person X from 10:00 to 11:00. As shown in FIG. 6I, the status indicator 614 indicates "AVAILABLE" because meeting space 1, building A is available until 10:00 based on the current time (e.g., 9:40). In FIG. 6I, the claiming affordance 616 is enabled and also prompts the user to "slide to takeover until 10:00." According to some embodiments, the status indicator 614 indicates "AVAILABLE" while the meeting space is available and the current time (e.g., 9:40) is prior to the early check-in threshold 622 for the next reservation. According to some embodiments, the claiming affordance 616 is enabled to take over a meeting space while the meeting space is available and a threshold amount of time (e.g., 20 or 30 minutes) exists prior to the next reservation based on the current time.

In some embodiments, the claiming criteria are satisfied and the claiming affordance is enabled between an early check-in threshold (e.g., 15 minutes prior to the start of the reservation) and a check-in deadline (e.g., 7 minutes after the start of the reservation). For example, in FIGS. 6A-6B, meeting space 1, building A is available from 9:30 to 10:00 and reserved for person X from 10:00 to 11:00. According to some embodiments, the status indicator 614 indicates "RESERVED" between the early check-in threshold 622 (e.g., 15 minutes prior to the reservation start time) and the check-in deadline 624 (e.g., 7 minutes after the reservation start time). As such, in some embodiments, the status indicator 614 indicates "RESERVED" when the current time is between the early check-in threshold 622 and the check-in deadline 624. Furthermore, in some embodiments, the claiming affordance 616 is enabled to check-in to an upcoming reservation while the meeting space is available and the current time is between the early check-in threshold 622 and the check-in deadline 624.

In some embodiments, while the claiming affordance is enabled, the device detects (918) a user input, via the input device, that corresponds to selecting the claiming affordance, and, in response to the user input selecting the claiming affordance, the device changes the status indicator to indicate that the meeting space has been claimed. In one example, FIGS. 6A-6B show a sequence in which the status indicator 614 changes from "RESERVED" to "MEETING IN PROGRESS" due to a left-to-right swipe gesture on the claiming affordance 616 to check-in to an upcoming reservation while the meeting space is available. In another example, FIGS. 6I-6J sequence in which the status indicator 614 changes from "AVAILABLE" to "MEETING IN PROGRESS" due to a left-to-right swipe gesture on the claiming affordance 616 to commandeer the meeting space while available for at least a threshold amount of time prior to an upcoming reservation. As yet another example, FIGS. 6F-6G show a sequence in which the status indicator 614 changes from "MEETING IN PROGRESS" to "MEETING STARTING SOON" due to a left-to-right swipe gesture on the claiming affordance 616 to check-in to an upcoming reservation while the meeting space is occupied.

In some embodiments, changing the status indicator includes (920) changing the display associated with the status indicator to indicate that the meeting space has been claimed without authenticating a user associated with the user input. In some embodiments, a user is able to swipe on the claiming affordance 616 to check-in to an existing reservation without authentication. Similarly, in some embodiments, a user is able to swipe on the claiming affordance 616 to commandeer an available space. As one example, FIGS. 6A-6B show a sequence in which the user checks-in to an upcoming reservation without being authenticated.

In some embodiments, in response to the user input selecting the claiming affordance, the device displays (922) an authentication interface provided to authenticate a user associated with an existing reservation, and, in accordance with a determination that the user is authenticated, the device displays a meeting manifest including details associated with the existing reservation. As such, according to some embodiments, unauthorized users are not able to check-in to existing reservation or commandeer available meeting spaces to, for example, better utilize the limited number of meeting spaces on a corporate campus. For example, the meeting manifest includes the invitee list for the reservation and attachments associated with the meeting invite corresponding to the reservation. In some embodiments, check-in is limited to users authenticated as the meeting organizer or a meeting invitee with assistant capabilities. For example, FIGS. 7A-7D show a sequence in which the user checks-in to an upcoming reservation after being authenticated. In this example, the meeting status interface 705 is replaced with an authentication interface 745 when the user swipes on the claiming affordance 716 to check-in to the upcoming existing reservation. Continuing with this example, the authentication interface 745 is replaced with the meeting manifest interface 750 with details of the reservation after the user is authenticated.

In contrast, for example, FIGS. 7S-7T show a sequence in which the user commandeers the meeting space without being authenticated. In this example, the meeting status interface 705 is replaced with the meeting manifest interface 750 when the user swipes on the claiming affordance 716 to commandeer the available meeting space. Continuing with this example, the meeting manifest interface 750 does not include meeting details due to the absence of a previously schedule reservation and includes a countdown of the takeover period.

In some embodiments, the claiming affordance is displayed (924) in combination with an indicator to check-in to an existing reservation of the meeting space. In some embodiments, the status indicator indicates that the meeting space is "RESERVED", and the claiming affordance is associated with text such as "slide to check-in" (e.g., as shown in FIG. 6A). In some embodiments, the status indicator indicates "MEETING IN PROGRESS", and the claiming affordance is associated with text such as "slide to check-in for next meeting" (e.g., as shown in FIG. 6F). In some embodiments, the status indicator indicates that the meeting space is "AVAILABLE", and the claiming affordance is associated with text such as "slide to takeover" (e.g., as shown in FIG. 6I).

In some embodiments, the indicator to check-in to an existing reservation of the meeting space is displayed (926) within the meeting space status interface between an early check-in threshold (e.g., 15 minutes prior to the start of the reservation) and a check-in deadline. (e.g., 7 minutes after the start of the reservation) For example, with reference to FIG. 6A, the claiming affordance 616 is enabled for the 10:00-11:00 reservation for Person X between the early check-in threshold 622 and the check-in deadline 624.

In some embodiments, the claiming affordance is displayed (928) in combination with an indicator to commandeer the meeting space (e.g., takeover an available meeting space as shown in FIGS. 6I-6J, or reserve the meeting space and then check-in or otherwise confirm the reservation as shown in FIGS. 7X-7Z) according to a determination that the meeting space is available and at least a predetermined amount of time exists before an upcoming reservation of the meeting space. In some embodiments, the claiming affordance is enabled to commander the available meeting space when at least 15, 20, 30, etc. minutes exist prior to an upcoming reservation. For example, with reference to FIG. 6I, if the current time were between the early check-in threshold 622 (e.g., 15 minutes prior to the 10:00 reservation for person X) and 10:00, the claiming affordance would not be enabled to takeover the room due to the reservation for person X at 10:00. Instead, continuing with this example, the claiming affordance would be enabled to check-in for the reservation for person X at 10:00.

In some embodiments, determining that the meeting space is available includes (930) determining that a check-in deadline for a previous reservation of the meeting space has lapsed. For example, with reference to FIG. 6A, if the user fails check-in to the reservation from 10:00-11:00 before the check-in deadline 624, the reservation will be canceled and the meeting space will be released for subsequent local takeover or remote reservation.

In some embodiments, in accordance with a determination that the meeting space is reserved for an existing meeting and a check-in deadline has lapsed, the device changes (932) the status indicator to indicate that the meeting space is available. In some embodiments, if a reservation is not checked into before the check-in deadline, the meeting space becomes available for local takeover and the meeting space is released to the scheduling tool for subsequent remote reservations. For example, with reference to FIG. 6D, if the 10:00-11:00 reservation is not checked into before 624, the 10:00-11:00 reservation is removed from the schedule and the meeting space is made available for takeover. In this example, the status indicator changes from "RESERVED" to "AVAILABLE", and the claiming affordance is enabled for local takeover (e.g., displaying the prompt "slide to takeover").

In response to detecting the change in conditions at the meeting space, and in accordance with a determination, based on the change in conditions at the meeting space, that the one or more claiming criteria are not satisfied, the device disables (934) the claiming affordance. In some embodiments, the claiming affordance is disabled when it is not displayed within the meeting status interface. In some embodiments, the claiming criteria are not satisfied and the claiming affordance is disabled when the status indicator indicates that the meeting room is currently occupied (e.g., "MEETING IN PROGRESS"). For example, the claiming affordance is disabled (e.g., not displayed) after the user checks-in to an upcoming reservation. In some embodiments, the claiming criteria are not satisfied and the claiming affordance is disabled when the status indicator indicates that the meeting room is currently occupied and that the next reservation for the meeting room has been checked into (e.g., "MEETING STARTING SOON"). In some embodiments, the claiming criteria are not satisfied and the claiming affordance is disabled when the status indicator indicates that the meeting room is available and the amount of time between the current time and the next reservation is less than a threshold meeting time (e.g., less than 15 or 30 minutes prior to the next reservation). As such, according to some embodiments, users currently occupying a meeting space are protected from other users commandeering the meeting space.

In some embodiments, the one or more claiming criteria are not satisfied (936) when a meeting is in progress in the meeting space and the current time is prior to an early check-in threshold for an upcoming reservation. In some embodiments, the claiming affordance is displayed but disabled. In some embodiments, the claiming affordance is not displayed when disabled. For example, in FIG. 6H, the claiming affordance 616 is not displayed within the meeting status interface 605 because to the current time is before the early check-in threshold 622 for the upcoming 10:00-11:00 reservation and the meeting space is occupied (e.g., "MEETING IN PROGRESS").

In some embodiments, the claiming affordance is also disabled after a user checks-in to a reservation. In one example, in FIG. 6B, the claiming affordance 616 is not displayed within the meeting status interface 605 because the meeting space is occupied (e.g., "MEETING IN PROGRESS"). In another example, in FIG. 6G, the claiming affordance 616 is not displayed within the meeting status interface 605 because the meeting space is occupied (e.g., "MEETING STARTING SOON").

It should be understood that the particular order in which the operations in FIGS. 9A-9B have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 2000, 2100, 2200, 2300, 3000, 3100, 3200, and 3300) are also applicable in an analogous manner to method 900 described above with respect to FIGS. 9A-9B. For example, the user interface objects and focus selectors described above with reference to method 900 optionally have one or more of the characteristics of the user interface objects and focus selectors described herein with reference to other methods described herein (e.g., methods 1000, 1100, 2000, 2100, 2200, 2300, 3000, 3100, 3200, and 3300). For brevity, these details are not repeated here.

FIGS. 10A-10B illustrate a flow diagram of a method 1000 of reporting problems with a meeting space in accordance with some embodiments. The method 1000 is performed at a first electronic device (e.g., the portable multifunction device 100 in FIG. 1A, or the device 300 in FIG. 3), associated with a meeting space, with one or more processors, non-transitory memory, a display, and an input device. In some embodiments, the display is a touch-screen display and the input device is on or integrated with the display. In some embodiments, the display is separate from the input device. Some operations in method 1000 are, optionally, combined and/or the order of some operations is, optionally, changed.

In some embodiments, the first device is associated with the meeting space in place of being associated with a particular user. For example, the first device does not store the entire calendar of the particular user but instead has information regarding reservations of the meeting space which optionally include a reservation of the meeting space by the particular user. In another example, the first device has access to a scheduling database (e.g., the scheduling database 525 in FIG. 5A). In some embodiments, the first device is associable with the meeting space. For example, the first device is a phone or tablet of a user. In this example, when the user walks into the meeting space with the first device, the location of the device is associated with the meeting space and meeting space functionality for the particular meeting space is enabled on the first device. In some embodiments, the first device is located outside of the meeting space (e.g., the device 502-A-1 in FIGS. 5A-5B). In some embodiments, a second device inside of the meeting space (e.g., the device 504-A-1 in FIGS. 5A-5B) is synchronized with the first device.

As described below, the method 1000 provides an intuitive way to report problems with a meeting space. The method reduces the cognitive burden on a user when reporting problems with a meeting space, thereby creating a more efficient human-machine interface. For battery-operated electronic devices, enabling a user to report problems with a meeting space faster and more efficiently conserves power and increases the time between battery charges.

The device displays (1002), on the display, a reporting interface with a plurality of affordances (e.g., text and or images) provided to report problems associated with corresponding features of the meeting space. For example, the features include a projector, a display, power, temperature, missing chairs, lack of whiteboard markers, and/or the like. FIG. 6K, for example, shows a reporting interface 655 with a plurality of affordances 656*a*, 656*b*, 656*c*, 656*d*, 656*e*, 656*f*, 656*g*, 656*g*, 656*h*, 656*i*, 656*j*, 656*k*, and 656*l* (collectively referred to as "affordances 656") for reporting problems with equipment or features associated with meeting space 1, building A (e.g., phones, lighting, chairs, display, table, projector, power, etc.) and/or for requesting service options for meeting space 1, building A (e.g., cleaning, refreshments, supplies, etc.). As such, according to some embodiments, users are able to quickly report problems with a meeting space.

In some embodiments, at least some of the plurality of affordances are provided (1004) to initiate a service option associated with the meeting space (e.g., cleaning needed, catering/refreshments, etc.). For example, as shown in FIG. 6K, the affordance 656*c* is provided to initiate a service option associated with meeting space 1, building A (e.g., cleaning needed).

In some embodiments, the reporting interface includes (1006) an image of the meeting space and at least some of the affordances are co-located with corresponding meeting space features within the image. FIG. 7I, for example, shows a reporting interface 790 with an image of meeting space 1, building A that includes affordances 794*a*, 794*b*, 794*c*, 794*d*, 794*e*, 794*f*, and 794*g* (collectively referred to as "affordances 794") co-located with at least some of the equipment or features of meeting space 1, building A. In one example, selection of the affordance 794*b* (e.g., with a contact) causes a problem report indicating a problem with the display #2 of meeting space 1, building A to be generated. As another example, selection of the affordance 794*g* (e.g., with a contact) causes a problem report indicating a problem with one of the chairs of meeting space 1, building A to be generated. As such, according to some embodiments, users are able to quickly report problems with a meeting space in a visual manner.

In some embodiments, the reporting interface includes (1008) at least one service request indicator provided to indicate an outstanding service request associated with the meeting space. For example, in FIG. 6R, the affordance 656*h* is associated with a badge 690, which indicates an outstanding problem report associated with the projector (e.g., associated with the problem report created and submitted in FIGS. 6K-6O).

In some embodiments, the indicator is (1010) at least one of a graphical representation (e.g., a badge and/or timestamp) or text within a respective affordance among the plurality of affordances that indicates an outstanding service request for the feature associated with the respective affordance and the respective affordance is disabled in response to the initiating the process for generating a service request. As such, according to some embodiments, the corresponding affordance is disabled to prevent duplicate problem reports. For example, the indicator is a badge within the corresponding affordance. FIG. 6R, for example, shows a badge 690 displayed within the affordance 656*h*, which indicates that a problem report associated with the projector was reported. As shown in FIG. 6R, the time and date of the problem report associated with the projector is also displayed within the affordance 656*h*.

The device detects (1012) a sequence of one or more user inputs, via the input device, that corresponds to selecting one or more affordances from among the plurality of affordances. For example, FIGS. 6K-6L show a sequence in which the user selects the affordance 656*h* in order to create a problem report associated with the projector of meeting space 1, building A.

In response to the sequence of one or more user inputs selecting the one or more affordances, the device initiates (1014) a process for generating a service request associated with one or more features of the meeting space that corresponds to the selected one or more affordances. For example, FIGS. 6K-6O show a sequence in which the user initiates a process for generating a service request associated with a problematic projector within meeting space 1, building A. As such, according to some embodiments, users are able to quickly report problems with a meeting space without making a phone call.

According to some embodiments, with reference to FIG. 5A, the service request or problem report is sent to the controller 510. In some embodiments, the controller 510 processes the service request or problem report in order to remedy the issue with the problematic projector. For example, an indication of the one or more problematic features is sent to an administrator that issues a service request to appropriate parties. For example, the administrator has a dashboard view of meeting spaces and accompanying problems and reservation schedules. As another example, FIGS. 7I-7K show a sequence in which the user initiates a process for generating a service request associated with a problematic display within meeting space 1, building A.

In some embodiments, the service request is associated with (1016) at least one of an organizer of the current meeting scheduled in the meeting space, the previous meeting scheduled in the meeting space, or the next meeting scheduled in the meeting space. In some embodiments, the service request or problem report is associated with the organizer of the current meeting, the previous meeting, or the next meeting in the meeting space. In some embodiments, the service request or problem report is associated with one or more attendees or invitees of the current meeting, the previous meeting, or the next meeting in the meeting space. As such, according to some embodiments, the problem report or service request is associated with the identity of a user to stave off false positives.

In some embodiments, in response to the sequence of one or more user inputs selecting the one or more affordances, the device displays (1018), on the display, an identification interface provided to identity of a user initiating the service request, and, in response to obtaining an identity of the user initiating the service request, the device associates the service request with the identity of the user initiating the service request. For example, FIGS. 6M-6N show an identification interface 675 provided to associate the service request or problem report with a user. As shown in FIG. 6M, the identification interface 675 includes a plurality of affordances 676*a*, 676*b*, and 676*c* (collectively referred to as "affordances 676") provided to identify the user reporting the problem. According to some embodiments, the affordances 676 are determined based on the next reservation of the meeting space, the last reservation of the meeting space, and/or the current reservation of the meeting space. In FIG. 6M, the affordance 676*a* is provided to identify the user initiating the problem report as the organizer of the current reservation, the affordance 676*b* is provided to identify the user initiating the problem report as meeting invitee A of the current reservation, and the affordance 676*c* is provided to identify the user initiating the problem report as an unlisted person. As such, according to some embodiments, the problem report or service request is associated with the identity of a user to stave off false positives.

In some embodiments, the device displays (1022), on the display, a meeting space status interface with a status indicator provided to indicate a current reservation status for the meeting space and a reporting affordance provided to report one or more problems with features of the meeting space, where the reporting interface is displayed in response to selection of the reporting affordance. As one example, FIGS. 6J-6K show a sequence in which the reporting interface 655 replaces display of the meeting status interface 605 in response to selection of a "report problem" affordance 612 within meeting status interface 605. As another example, FIGS. 7H-7I show a sequence in which the reporting interface 790 is displayed in response to selection of the third affordance 752*c* within the sidebar region 753*b*.

In some embodiments, the meeting space status interface includes (1024) a service request indicator provided to indicate one or more outstanding service requests associated with the meeting space. In some embodiments, the service request indicator is added to the meeting space status interface after a problem is reported. For example, FIG. 6P shows a badge 682 displayed within the meeting space affordance 606 in response to generating and submitting the problem report in FIGS. 6J-6O. In this example, the badge 682 indicates that an outstanding problem is associated with meeting space 1, building A. Continuing with this example, in FIG. 6Q, a log 685 is overlaid on the meeting status interface 605 in response to selecting the badge 682. In this example, the log 686 lists the nature, time, and date of the outstanding problem 685 associated with meeting space 1, building A. For example, the outstanding problem 685 is associated with the problem report that was generated and submitted in FIGS. 6J-6O. As such, according to some embodiments, users are able to glean information regarding the outstanding issues with a meeting space in addition to information regarding the status and availability of the meeting space through one interface in order to make an informed decision about using the meeting space.

It should be understood that the particular order in which the operations in FIGS. 10A-10B have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 2000, 2100, 2200, 2300, 3000, 3100, 3200, and 3300) are also applicable in an analogous manner to method 1000 described above with respect to FIGS. 10A-10B. For example, the user interface objects and focus selectors described above with reference to method 1000 optionally have one or more of the characteristics of the user interface objects and focus selectors described herein with reference to other methods described herein (e.g., methods 900, 1100, 2000, 2100, 2200, 2300, 3000, 3100, 3200, and 3300). For brevity, these details are not repeated here.

FIGS. 11A-11C illustrate a flow diagram of a method 1100 of finding available meeting spaces in accordance with some embodiments. The method 1100 is performed at a first electronic device (e.g., the portable multifunction device 100 in FIG. 1A, or the device 300 in FIG. 3), associated with a first meeting space, with one or more processors, non-transitory memory, a display, and an input device. In some embodiments, the display is a touch-screen display and the input device is on or integrated with the display. In some embodiments, the display is separate from the input device. Some operations in method 1100 are, optionally, combined and/or the order of some operations is, optionally, changed.

In some embodiments, the first device is associated with the meeting space in place of being associated with a particular user. For example, the first device does not store the entire calendar of the particular user but instead has information regarding reservations of the meeting space which optionally include a reservation of the meeting space by the particular user. In another example, the first device has access to a scheduling database (e.g., the scheduling database 525 in FIG. 5A). In some embodiments, the first device is associable with the meeting space. For example, the first device is a user phone or tablet of a user. In this example, when the user walks into the meeting space with the first device, the location of the device is associated with the meeting space and meeting space functionality for the particular meeting space is enabled on the first device. In some embodiments, the first device is located outside of the meeting space (e.g., the device 502-A-1 in FIGS. 5A-5B). In some embodiments, a second device inside of the meeting space (e.g., the device 504-A-1 in FIGS. 5A-5B) is synchronized with the first device.

As described below, the method 1100 provides an intuitive way to find available meeting spaces. The method reduces the cognitive burden on a user when finding available meeting spaces, thereby creating a more efficient human-machine interface. For battery-operated electronic devices, enabling a user to find available meeting spaces faster and more efficiently conserves power and increases the time between battery charges.

The device displays (1102), on the display, a meeting space discovery interface with a plurality affordances corresponding to a plurality of available meeting spaces different from the first meeting space. In some embodiments, the meeting space discovery interface includes a list of available meeting spaces with their corresponding attributes/amenities sorted. In some embodiments, the list of available meeting spaces is sorted according to proximity to the first device. In some embodiments, the meeting space discovery interface includes a plan view of a map of a floor including the first meeting space that shows available rooms relative to the first meeting space. As such, according to some embodiments, users are able to quickly find available meeting spaces.

As one example, FIG. 6T shows a find-a-space interface 6105 with a plan view of a first floor of building A. In FIG. 6T, the find-a-space interface 6105 includes a first plurality of unavailable meeting space 6112*a* and 6112*b* (collectively referred to as "unavailable meeting spaces 6112") with a first appearance (e.g., a first shading pattern). For example, meeting space 1, building A (e.g., the first meeting space) corresponds to unavailable meeting space 6112*a*. As shown in FIG. 6T, the find-a-space interface 6105 also includes a second plurality of available meeting space 6114*a*, 6114*b*, and 6114*c* (collectively referred to as "available meeting spaces 6114") with a second appearance (e.g., a second shading pattern). According to some embodiments, when a respective available meeting space 6114 is activated (e.g., selected with a contact), a path from the indicator 6106 to the respective available meeting space 6114 is overlaid on the plan view within the find-a-space interface 6105 (e.g., as shown in FIG. 6U). According to some embodiments, when a respective available meeting space 6114 is activated (e.g., selected with a contact), a menu is overlaid on the plan view within the find-a-space interface 6105, where the menu includes details of the respective available meeting space 6114 and an affordance provided to take over or reserve the respective available meeting space 6114 (e.g., as shown in FIG. 6U).

As another example, FIG. 7X shows a list of available meeting spaces 7150 overlaid on the meeting status interface 705. As shown in FIG. 7X, the list of available meeting spaces 7150 includes a plurality of affordances 7152*a*, 7152*b*, 7152*c*, 7152*d*, and 7152*e* (collectively referred to as the "affordances 7152") associated with available meeting spaces. For example, as shown in FIG. 7X, the list of available meeting spaces 7150 is sorted by proximity to meeting space 1, building A. According to some embodiments, when a respective available meeting space 7152 is activated (e.g., selected with one finger tap gesture, a two finger tap gesture, a left-to-right swipe gesture, a right-to-left swipe gesture, or the like), a plan view is displayed within a find-a-space interface 7165 with a path 7176 from the first meeting space to respective available meeting space (e.g., as shown in FIG. 7Y). According to some embodiments, when a respective available meeting space is activated (e.g., selected with one finger tap gesture, a two finger tap gesture, a left-to-right swipe gesture, a right-to-left swipe gesture, or the like), a menu is overlaid on the plan view within a find-a-space interface 7165, where the menu includes details of the respective available meeting space and an affordance provided to take over or reserve the respective available meeting space (e.g., as shown in FIG. 7Y).

In some embodiments, the meeting space discovery interface includes (1104) an indication of one or more attributes for each of the plurality of available meeting spaces. For example, the attributes include at least one of a name, size, provided features (e.g., equipment), and distance from the first meeting room for the one or more available meeting spaces. In some embodiments, outstanding problems with any of the attributes is also reported within the meeting space discovery interface. For example, in FIG. 7X, each of the available meeting spaces 7152 in the list of available meeting spaces 7150 is associated with a name, occupancy limit, one or more attribute icons corresponding to equipment or features associated with the meeting space, and a distance from meeting space 1, building A.

The device detects (1106) a first user input, via the input device, that corresponds to selecting a respective affordance corresponding to a second meeting space from among the plurality affordances displayed within the meeting space discovery interface. As one example, FIG. 6U shows a user input selecting the available meeting space 6114*c* within the find-a-space interface 6105. As another example, FIG. 7X shows a user input (e.g., a left-to-right swipe gesture) selecting the affordance 7152*b* associated with meeting space 13 within the list of available meeting spaces 7150.

In response to the first user input selecting the respective affordance, the device provides (1108) instructions for navigating from the first meeting space to the second meeting space. In some embodiments, the instructions include a path overlaid on a map (e.g., a plan view of a floor) from the first meeting space to the second meeting space. In some embodiments, the instructions include turn-by-turn directions from the first meeting space to the second meeting space (e.g., visual and/or auditory turn-by-turn directions). As such, according to some embodiments, the user is provided with visual and/or auditory instructions that orient and navigate the user to another available meeting space in order to avoid getting lost or disoriented when perambulating to the available meeting space. For example, FIG. 6V shows a path 6126 from the indicator 6106 to the selected available meeting space 6114*c* in response to selecting the available meeting space 6114*c* in FIG. 6U. As another example, FIG. 7Y shows a path 7176 from the indicator 7166 to the available meeting space 7172*c* (e.g., associated with meeting space 13) in response to selecting the affordance 7152*b* in FIG. 7X.

In some embodiments, the instructions are overlaid (1110) on a plan view of a floor associated with the second meeting space that corresponds to the respective affordance. As one example, in FIG. 6V, the path 6126 is overlaid on the plan view of the first floor of building A within the find-a-space interface 6105. As another example, in FIG. 7Y, the path 7176 is overlaid on the plan view of the first floor of building A within the find-a-space interface 7165.

In some embodiments, the plan view shows (1112) unavailable meetings spaces in a first graphical state (e.g., a first state, a first shading pattern, a first color, a first cross-hatch pattern, or the like) and available meetings spaces in a second graphical state (e.g., a second state, a second shading pattern, a second color, a second cross-hatch pattern, or the like). As one example, with reference to FIGS. 6T-6V, unavailable meeting spaces 6112*a* and 6112*b* are displayed with a first shading pattern (e.g., cross hatching), and available meeting spaces 6114*a*, 6114*b*, and 6114*c* are displayed with a second shading pattern (e.g., dots). As another example, with reference to FIGS. 7Y-7Z, unavailable meeting space 7174*a* is displayed with a first shading pattern (e.g., cross hatching), and available meeting spaces 7172*a*, 7172*b*, and 7172*c* are displayed with a second shading pattern (e.g., dots).

In some embodiments, the device detects (1114) a second user input, via the input device, that corresponds to selecting a third meeting space in the plan view, and, in response to detecting the second user input selecting the third meeting space, the device replaces display of the instructions for navigating from the first meeting space to the second meeting space with different instructions for navigating from the first meeting space to the third meeting space. For example, with reference to FIG. 6V, instead of selecting the takeover affordance, the user selects another available meeting space such as meeting space 6114*a* (not shown). Continuing with this example, the menu 6120 and the path 6126 cease to be displayed within the find-a-space interface 6105. Continuing with this example, another menu for taking over the available meeting space 6114*a* and a path from indicator 6106 to the available meeting space 6114*a* is displayed within the find-a-space interface 6105 (not shown).

In some embodiments, in response to the first user input selecting the respective affordance, the device displays (1116), on the display an option to reserve the second meeting space within the meeting space discovery interface. As one example, in FIG. 6V, a menu 6120 is overlaid on the plan view within the find-a-space interface 6105. As shown in FIG. 6V, the menu 6120 includes details/attributes of the available meeting space 6114*c* and an affordance 6122 provided to take over or reserve the available meeting space 6114*c*. As another example, in FIG. 7Y, a menu 7180 is overlaid on the plan view within the find-a-space interface 7165. As shown in FIG. 7Y, the menu 7180 includes details/attributes of the available meeting space 7172*c* and an affordance 7182 provided to take over or reserve the available meeting space 7172*c*. In some embodiments, in response to selecting the reservation option (e.g., the affordance 6122 in FIG. 6V, or the affordance 7182 in FIG. 7Y), the device displays an intermediate UI for entering meeting details such as meeting length, invitees, and attachments. According to some embodiment, the user still has to travel to the reserved room to check-in (meeting space is provisionally reserved).

In some embodiments, the device displays (1118), on the display, a meeting space status interface with a status indicator indicating that a current reservation for the first meeting space is ending soon and an extension affordance for extending the reservation (e.g., the meeting space status interface is displayed prior to the meeting space discovery interface), and the device detects a second user input, via the input device, that corresponds to selecting the extension affordance, where the meeting space discovery interface is displayed in response to the second user input selecting the extension affordance and in accordance with a determination that the first meeting space is not available to extend the current reservation. As such, according to some embodiments, the user is able to quickly extend his/her reservation to another available meeting space if extra time is needed to finish a meeting. For example, there is a reservation of the first meeting space for another user at the end of the current reservation. For example, FIG. 7X shows a list of available meeting spaces 7150 overlaid on the meeting status interface 705 in response to selecting the "extend meeting" affordance 7114 in FIG. 7V. FIGS. 7X-7Z show a sequence in which the user extends the current meeting in meeting space 13, building A associated with available meeting space 7172*c* in FIG. 7Y. According to some embodiments, the user still has to check-in at the other meeting space in which the reservation is extended.

In some embodiments, the device extends (1120) the current reservation in the first meeting space in response to the second user input selecting the extension affordance and in accordance with a determination that the first meeting space is available to extend the current reservation. As such, according to some embodiments, the user is able to quickly extend his/her reservation in the same meeting space if extra time is needed to finish a meeting. For example, there is not a reservation following the current reservation. For example, FIGS. 7V-7W show a sequence in which the user extends the current meeting in meeting space 1, building A (e.g., the meeting space associated with the second device 504-A-1). For example, in FIG. 7W, the status indicator 714 indicates that the meeting will now end at 11:30 (e.g., a 30-minute extension). According to some embodiments, the user does not need to check-in again when extending the reservation in the first meeting space.

In some embodiments, the device filters (1122) the plurality of available meeting spaces different from the first meeting space based on one or more attributes of the first meeting space and/or one or more parameters of the current reservation. In some embodiments, displaying the meeting space discovery interface includes displaying the meeting space discovery interface with a subset of the plurality affordances corresponding to a subset of the plurality of available meeting spaces different from the first meeting space that meet the one or more attributes of the first meeting space and/or the one or more parameters of the current reservation. In some embodiments, when the meeting is extended to another meeting space, the meeting space discovery interface filters the available meeting spaces based on attributes of the first meeting space (e.g., size, equipment, etc.) and/or the details of the current reservation such as invitee list and meeting parameters (e.g., size of room, equipment needed, badge access, etc.). As such, for example, the available meeting spaces displayed in the meeting space discovery interface are tailored to suit at least the current needs of the user. For example, in FIG. 7X, the list of available meeting spaces 7150 includes available meeting spaces with an occupancy limit of at least 6 due to the occupancy limit of meeting space 1, building A (e.g., the meeting space associated with the second device 504-A-1).

In some embodiments, the device displays (1124), on the display, a meeting space status interface including a find-a-room affordance provided to find available meeting spaces, where the meeting space discovery interface is displayed in response to detecting a second user input that corresponds to selecting the find-a-room affordance. In some embodiments, the meeting space status interface also includes a status indicator indicating a current reservation status for the meeting space. For example, in FIG. 6A, the meeting status interface includes a "find space" affordance 610, which, when activated (e.g., with a contact), causes a find-a-space interface 6105 replaces display of the meeting status interface 605. In FIG. 6T, for example, the find-a-space interface 6105 replaces display of the meeting status interface 605 in response to selecting the "find space" affordance 610 in FIG. 6S. As another example, in FIG. 7D, the sidebar region 753*b* include a fourth affordance 752*d* provided to replace display of the meeting manifest interface 750 with the display of the find-a-space interface 7165 (e.g., in FIG. 7X). As such, according to some embodiments, users are able to find available meeting spaces in addition to information regarding the status and availability of the meeting space through one interface.

In some embodiments, the plurality affordances within the meeting space discovery interface includes (1126) a list of the plurality of available meeting spaces different from the first meeting space overlaid on the meeting space status interface. FIG. 7X, for example, shows a list of available meeting spaces 7150 overlaid on the meeting status interface 705.

In some embodiments, the list of the plurality of available meeting spaces different from the first meeting space is sorted (1128) based on proximity of the plurality of available meeting spaces to the first meeting space. In FIG. 7X, for example, the list of available meeting spaces 7150 sorted by proximity to meeting space 1, building A (e.g., associated with the second device 504-A-1). In some embodiments, the list is also filtered based on the attributes (e.g., size, equipment, etc.) of the first meeting space.

In some embodiments, the device displays (1130), on the display, a plurality of filter affordances, and the device detects a sequence of one or more user inputs, via the input device, that corresponds to selecting one or more of the filter affordances. In response to the sequence of one or more user inputs selecting the one or more of the filter affordances, the device: obtains a set of filter criteria that corresponds to the one or more of the filter affordances; and replaces display of the list of the plurality of available meeting spaces different from the first meeting space with a subset of the list of the plurality of available meeting spaces different from the first meeting space that meet the set of filter criteria. For example, the user of the first device selects needed room attributes for the next meeting space such as projector and a count of chairs. For example, after a user inputs addition filter criteria for a meeting space (e.g., 6+ people, projector, smart TV, whiteboard, refreshments/catering, etc.), the list of available meeting spaces is redisplayed with meeting spaces that conform to the one or more filter criteria (not shown). As such, for example, the list of the plurality of available meeting spaces are tailored to suit the current needs of the user.

In some embodiments, in response to detecting the second user input that corresponds to selecting the find-a-room affordance, the device displays (1132), on the display, an authentication interface provided to authenticate a user of the first device, where the meeting space discovery interface is displayed in response to authentication of the user of the first device. As such, in some embodiments, the user cannot extend a meeting to a new meeting space without authentication. As such, in some embodiments, the user is not able to find an available meeting without being authenticated. In some embodiments, the authentication interface prompts the user to enter a set of login credentials. In some embodiments, the authentication interface prompts the user to swipe his/her badge. In some embodiments, the authentication interface prompts the user to provide biometric information such as a fingerprint, a voice sample, a retina scan, and/or the like. As such, according to some embodiments, only authenticated users are able to use the meeting space discovery interface to find available meeting spaces. This, for example, limits unauthorized users from tying up valuable meeting spaces.

In some embodiments, the plurality of available meeting spaces different from the first meeting space are filtered (1134) based on access credentials associated with an account that corresponds to the authenticated user of the first device. For example, with reference to FIG. 7X, the list of available meeting spaces 7150 is filtered based on the access credentials associated with the authenticated user (not shown). For example, the list of available meeting spaces shows available meeting spaces in areas of the building for which the user has access. As such, for example, the available meeting spaces displayed in the meeting space discovery interface are tailored to the user's access so as not to available display meeting spaces that he/she cannot reach.

It should be understood that the particular order in which the operations in FIGS. 11A-11C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 2000, 2100, 2200, 2300, 3000, 3100, 3200, and 3300) are also applicable in an analogous manner to method 1100 described above with respect to FIGS. 11A-11C. For example, the user interface objects and focus selectors described above with reference to method 1100 optionally have one or more of the characteristics of the user interface objects and focus selectors described herein with reference to other methods described herein (e.g., methods 900, 1000, 2000, 2100, 2200, 2300, 3000, 3100, 3200, and 3300). For brevity, these details are not repeated here.

Figure 12:
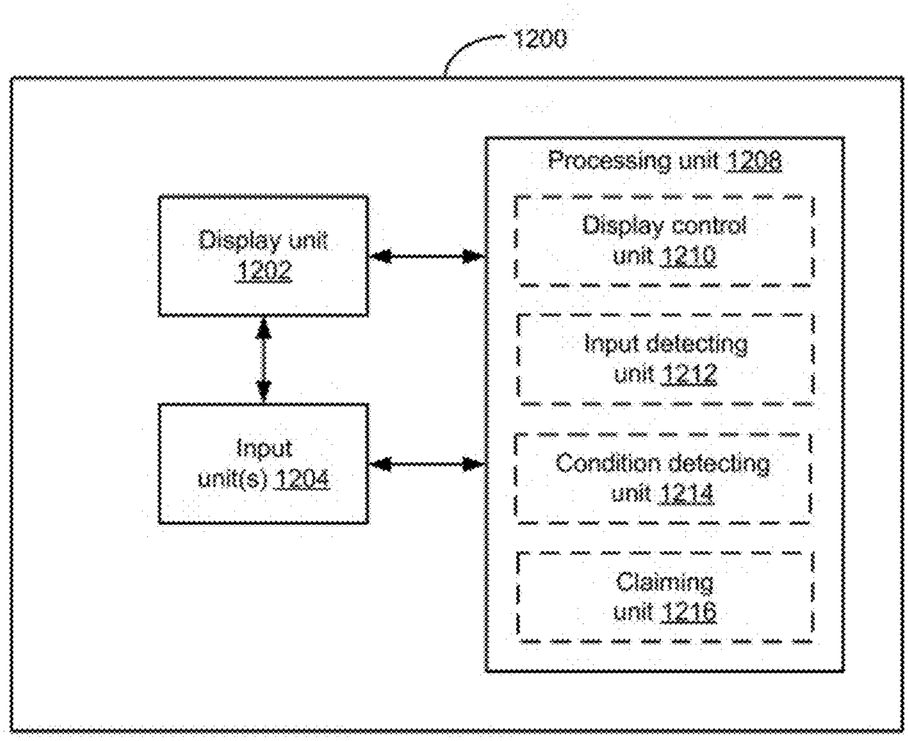
FIGS. 12-14 are functional block diagrams of an electronic device in accordance with some embodiments.

In accordance with some embodiments, FIG. 12 shows a functional block diagram of an electronic device 1200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200, associated with a meeting space, includes a display unit 1202 configured to display a user interface, one or more input units 1204 configured to receive user inputs, and a processing unit 1208 coupled to the display unit 1202 and the one or more input units 1204. In some embodiments, the processing unit 1208 includes: a display control unit 1210, an input detecting unit 1212, a condition detecting unit 1214, and a claiming unit 1216.

The processing unit 1208 is configured to: enable display of (e.g., with the display control unit 1210), on the display unit 1202, a meeting space status interface that includes a status indicator indicating a current reservation status for the meeting space and a claiming affordance provided to claim reservations of the meeting space; and, while displaying the meeting space status interface, detect (e.g., with the condition detecting unit 1214) a change in conditions at the meeting space. In response to detecting the change in conditions at the meeting space, and in accordance with a determination, based on the change in conditions at the meeting space, that the one or more claiming criteria are satisfied, the processing unit 1208 is further configured to enable (e.g., with the claiming unit 1216) the claiming affordance. In response to detecting the change in conditions at the meeting space, and in accordance with a determination, based on the change in conditions at the meeting space, that the one or more claiming criteria are not satisfied, the processing unit 1208 is further configured to disable (e.g., with the claiming unit 1216) the claiming affordance.

In some embodiments, while the claiming affordance is enabled, the processing unit 1208 is further configured to detect (e.g., with the input detecting unit 1212) a user input, via the one or more input units 1204, that corresponds to selecting the claiming affordance, and, in response the user input selecting the claiming affordance, the processing unit 1208 is further configured to change (e.g., with the claiming unit 1216) the status indicator to indicate that the meeting space has been claimed.

In some embodiments, changing the status indicator includes changing the display associated with the status indicator to indicate that the meeting space has been claimed without authenticating a user associated with the user input.

In some embodiments, in response to the user input selecting the claiming affordance, the processing unit 1208 is further configured to enable display of (e.g., with the display control unit 1210) an authentication interface provided to authenticate a user associated with an existing reservation, and, in accordance with a determination that the user is authenticated, the processing unit 1208 is further configured to enable display of (e.g., with the display control unit 1210) a meeting manifest including details associated with the existing reservation.

In some embodiments, the claiming affordance is displayed in combination with an indicator to check-in to an existing reservation of the meeting space.

In some embodiments, the indicator to check-in to an existing reservation of the meeting space is displayed within the meeting space status interface between an early check-in threshold and a check-in deadline.

In some embodiments, the claiming affordance is displayed in combination with an indicator to commandeer the meeting space according to a determination that the meeting space is available and at least a predetermined amount of time exists before an upcoming reservation of the meeting space.

In some embodiments, determining that the meeting space is available includes determining that a check-in deadline for a previous reservation of the meeting space has lapsed.

In some embodiments, in accordance with a determination that the meeting space is reserved for an existing meeting and a check-in deadline has lapsed, the processing unit 1208 is further configured to change (e.g., with the claiming unit 1216) the status indicator to indicate that the meeting space is available.

In some embodiments, the one or more claiming criteria are not satisfied when a meeting is in progress in the meeting space and the current time is prior to an early check-in threshold for an upcoming reservation.

In some embodiments, the meeting space status interface also includes a schedule affordance provided to display a reservation schedule associated with the meeting space.

In some embodiments, the meeting space status interface also includes one or more graphical representations corresponding to features associated with the meeting space.

In some embodiments, the meeting space status interface also includes a reporting affordance provided to report one or more problems with features of the meeting space.

In some embodiments, the meeting space status interface also includes a problem indicator provided to indicate one or more outstanding problems with the meeting space.

In some embodiments, the meeting space status interface also includes find-a-room affordance provided to find available meeting spaces.

Figure 13:
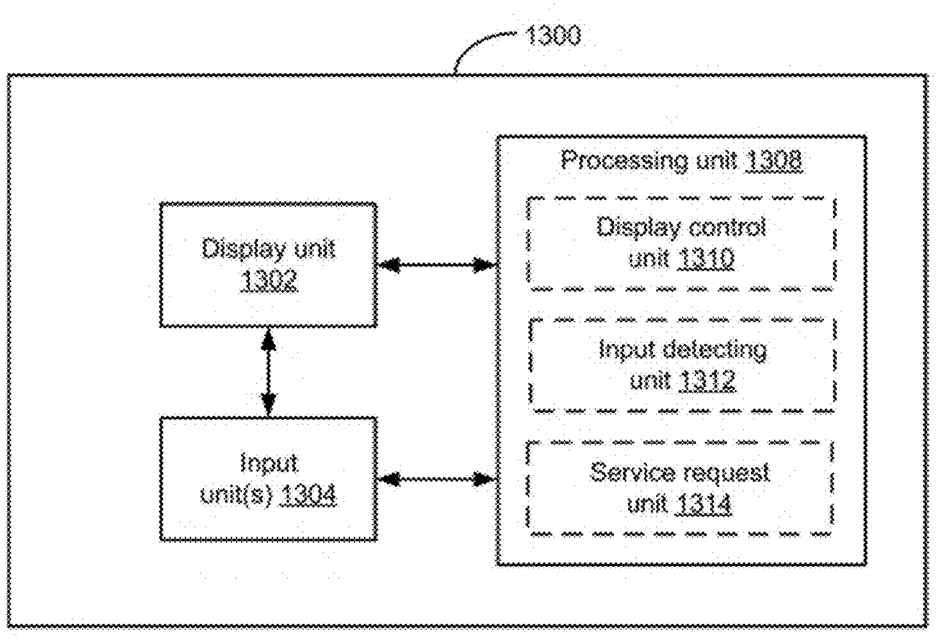

In accordance with some embodiments, FIG. 13 shows a functional block diagram of an electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300, associated with a meeting space, includes a display unit 1302 configured to display a user interface, one or more input units 1304 configured to receive user inputs, and a processing unit 1308 coupled to the display unit 1302 and the one or more input units 1304. In some embodiments, the processing unit 1308 includes: a display control unit 1310, an input detecting unit 1312, and a service request unit 1314.

The processing unit 1308 is configured to: enable display of (e.g., with the display control unit 1310), on the display unit 1302, a reporting interface with a plurality of affordances provided to report problems associated with corresponding features of the meeting space; detect (e.g., with the input detecting unit 1312) a sequence of one or more user inputs, via the one or more input units 1304, that corresponds to selecting one or more affordances from among the plurality of affordances; and, in response to the sequence of one or more user inputs selecting the one or more affordances, initiate (e.g., with the service request unit 1314) a process for generating a service request associated with one or more features of the meeting space that corresponds to the selected one or more affordances.

In some embodiments, at least some of the plurality of affordances are provided to initiate a service option associated with the meeting space.

In some embodiments, the reporting interface includes an image of the meeting space and at least some of the affordances are co-located with corresponding meeting space features within the image.

In some embodiments, the reporting interface includes at least one service request indicator provided to indicate an outstanding service request associated with the meeting space.

In some embodiments, the indicator is at least one of a graphical representation or text within a respective affordance among the plurality of affordances that indicates an outstanding service request for the feature associated with the respective affordance and the respective affordance is disabled in response to the initiating the process for generating a service request.

In some embodiments, the service request is associated with at least one of an organizer of the current meeting scheduled in the meeting space, the previous meeting scheduled in the meeting space, or the next meeting scheduled in the meeting space.

In some embodiments, in response to the sequence of one or more user inputs selecting the one or more affordances, the processing unit 1308 is further configured to enable display of (e.g., with the display control unit 1310), on the display unit 1302, an identification interface provided to identity of a user initiating the service request, and, in response to obtaining an identity of the user initiating the service request, the processing unit 1308 is further configured to associate (e.g., with the service request unit 1314) the service request with the identity of the user initiating the service request.

In some embodiments, the processing unit 1308 is further configured to enable display of (e.g., with the display control unit 1310), on the display unit 1302, a meeting space status interface with a status indicator provided to indicate a current reservation status for the meeting space and a reporting affordance provided to report one or more problems with features of the meeting space, where the reporting interface is displayed in response to selection of the reporting affordance.

In some embodiments, the meeting space status interface includes a service request indicator provided to indicate one or more outstanding service requests associated with the meeting space.

Figure 14:
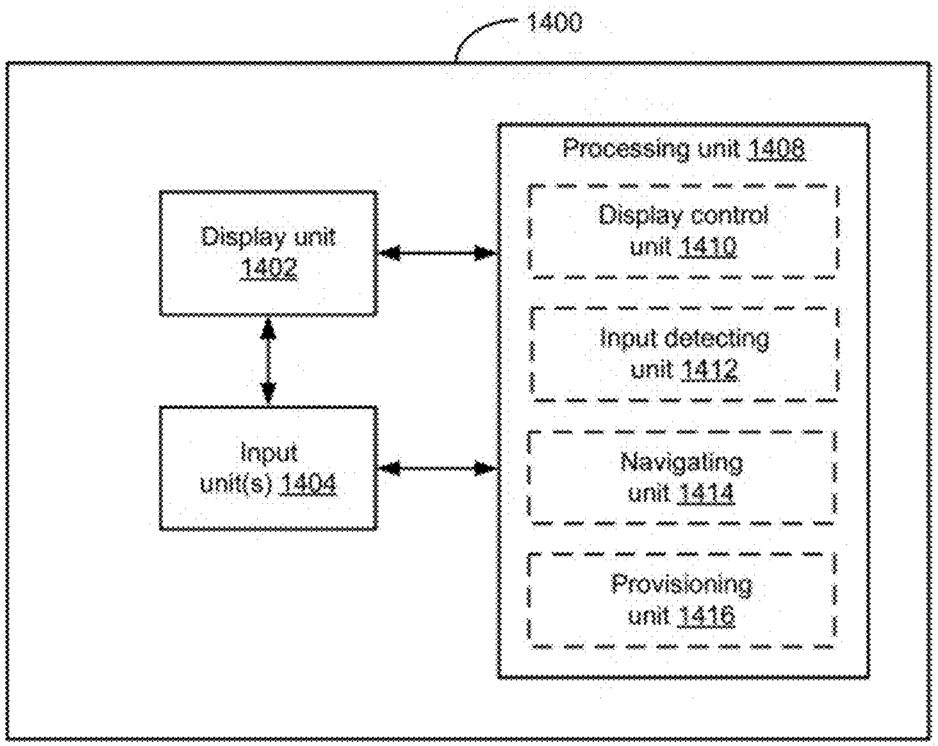

In accordance with some embodiments, FIG. 14 shows a functional block diagram of an electronic device 1400, associated with a first meeting space, configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device 1400 includes a display unit 1402 configured to display a user interface, one or more input units 1404 configured to receive user inputs, and a processing unit 1408 coupled to the display unit 1402 and the one or more input units 1404. In some embodiments, the processing unit 1408 includes: a display control unit 1410, an input detecting unit 1412, a navigating unit 1414, and a provisioning unit 1416.

The processing unit 1408 is configured to: enable display of (e.g., with the display control unit 1410), on the display unit 1402, a meeting space discovery interface with a plurality affordances corresponding to a plurality of available meeting spaces different from the first meeting space; detect (e.g., with the input detecting unit 1412) a first user input, via the one or more input units 1402, that corresponds to selecting a respective affordance corresponding to a second meeting space from among the plurality affordances displayed within the meeting space discovery interface; and, in response to the first user input selecting the respective affordance, provide (e.g., with the navigating unit 1414) instructions for navigating from the first meeting space to the second meeting space.

In some embodiments, the meeting space discovery interface includes an indication of one or more attributes for each of the plurality of available meeting spaces.

In some embodiments, in response to the first user input selecting the respective affordance, the processing unit 1408 is further configured to enable display of (e.g., with the display control unit 1410), on the display unit 1402, an option to reserve the second meeting space within the meeting space discovery interface.

In some embodiments, the processing unit 1408 is further configured to: enable display of (e.g., with the display control unit 1410), on the display unit 1402, a meeting space status interface with a status indicator indicating that a current reservation for the first meeting space is ending soon and an extension affordance for extending the reservation, and detect (e.g., with the input detecting unit 1412) a second user input, via the one or more input units 1404, that corresponds to selecting the extension affordance, where the meeting space discovery interface is displayed in response to the second user input selecting the extension affordance and in accordance with a determination that the first meeting space is not available to extend the current reservation.

In some embodiments, the processing unit 1408 is further configured to extend (e.g., with the provisioning unit 1416) the current reservation in the first meeting space in response to the second user input selecting the extension affordance and in accordance with a determination that the first meeting space is available to extend the current reservation.

In some embodiments, the processing unit 1408 is further configured to filter (e.g., with the provisioning unit 1416) the plurality of available meeting spaces different from the first meeting space based on one or more attributes of the first meeting space and/or one or more parameters of the current reservation, where displaying the meeting space discovery interface includes displaying the meeting space discovery interface with a subset of the plurality affordances corresponding to a subset of the plurality of available meeting spaces different from the first meeting space that meet the one or more attributes of the first meeting space and/or the one or more parameters of the current reservation.

In some embodiments, the processing unit 1408 is further configured to: enable display of (e.g., with the display control unit 1410), on the display unit 1402, a meeting space status interface including a find-a-room affordance provided to find available meeting spaces, where the meeting space discovery interface is displayed in response to detecting a second user input that corresponds to selecting the find-a-room affordance.

In some embodiments, the plurality affordances within the meeting space discovery interface includes a list of the plurality of available meeting spaces different from the first meeting space overlaid on the meeting space status interface.

In some embodiments, the list of the plurality of available meeting spaces different from the first meeting space is sorted based on proximity of the plurality of available meeting spaces to the first meeting space.

In some embodiments, the processing unit 1408 is further configured to: enable display of (e.g., with the display control unit 1410), on the display unit 1402, a plurality of filter affordances; detect (e.g., with the input detecting unit 1412) a sequence of one or more user inputs, via the one or more input units 1404, that corresponds to selecting one or more of the filter affordances; and, in response to the sequence of one or more user inputs selecting the one or more of the filter affordances: obtain (e.g., with the provisioning unit 1416) a set of filter criteria that corresponds to the one or more of the filter affordances; and replace display of (e.g., with the display control unit 1410) the list of the plurality of available meeting spaces different from the first meeting space with a subset of the list of the plurality of available meeting spaces different from the first meeting space that meet the set of filter criteria.

In some embodiments, in response to detecting the second user input that corresponds to selecting the find-a-room affordance, the processing unit 1408 is further configured to: enable display of (e.g., with the display control unit 1410), on the display unit 1402, an authentication interface provided to authenticate a user of the device 1400, where the meeting space discovery interface is displayed in response to authentication of the user of the device 1400.

In some embodiments, the plurality of available meeting spaces different from the first meeting space are filtered based on access credentials associated with an account that corresponds to the authenticated user of the device 1400.

In some embodiments, the plan view shows unavailable meetings spaces in a first graphical state and available meetings spaces in a second graphical state.

In some embodiments, the processing unit 1408 is further configured to detect (e.g., with the input detecting unit 1412) a second user input, via the one or more input units 1404, that corresponds to selecting a third meeting space in the plan view, and, in response to detecting the second user input selecting the third meeting space, the processing unit 1408 is further configured to replace display of (e.g., with the display control unit 1410) the instructions for navigating from the first meeting space to the second meeting space with different instructions for navigating from the first meeting space to the third meeting space.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9B, 10A-10B, and 11A-11C are, optionally, implemented by components depicted in FIGS. 1A-1B or FIGS. 12-14. For example, detection operation 914, detection operation 1012, and detection operation 1106 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Attention is now directed toward embodiments of user interfaces ("UI") and associated processes that may be implemented on an electronic device, such as a portable multifunction device 100 with a display, a touch-sensitive surface, and optionally one or more sensors to detect intensity of contacts with the touch-sensitive surface, or a device 300 with one or more processors, non-transitory memory, a display, and an input device.

FIGS. 15A-15R illustrate example user interfaces for updating a user interface displayed on a first device based on input from a second device in accordance with some embodiments. The user interfaces in these figures are used to illustrate the processes described below, including the processes in FIGS. 20A-20C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

In some embodiments, the first device is located outside of the meeting space (e.g., the first device 502-A-1 in FIGS. 5A-5B). For example, the first device is associated with the meeting space such as being fixed to a wall outside of the meeting space. In some embodiments, the first device is associable with the meeting space. For example, the first device is a personal device associated with a user such as a phone, tablet, laptop, or the like. In this example, when the user walks into the meeting space with the first device, the location of the device is associated with the meeting space and meeting space functionality for the particular meeting space is enabled on the first device. In some embodiments, a second device inside of the meeting space (e.g., the second device 504-A-1 in FIGS. 5A-5B) is synchronized with the first device. For example, the second device is associated with the meeting space such as being fixed to a wall inside of the meeting space, fixed to furniture or equipment within the meeting space, or portably located within the meeting space.

FIG. 15A shows the first device 502-A-1 displaying a meeting status interface 1518 (e.g., the exterior device associated with meeting space 1, building A in FIGS. 5A-5B). FIG. 15A also shows the second device 504-A-1 displaying a meeting status interface 1520 (e.g., the interior device associated with meeting space 1, building A in FIGS. 5A-5B). The meeting status interface 1520 is similar to and adapted from the meeting status interface 1518. As such, the meeting status interface 1518 and the meeting status interface 1520 include similar elements labeled with the same reference number, which both have the same function. Only the differences are described herein for the sake of brevity.

As shown in FIG. 15A, the meeting status interface 1518 includes a meeting space affordance 1506, which indicates that the first device 502-A-1 corresponds to the Ganymede meeting space meeting space and the occupancy limit of the Ganymede meeting space (e.g., an occupancy limit of eight due to the existence of eight chairs within the Ganymede meeting space). When activated (e.g., with a contact), the meeting space affordance 1506 causes a log for the Ganymede meeting space to be displayed. For example, the log indicates: previous or outstanding problems reported for the Ganymede meeting space; the cleaning record of the Ganymede meeting space; the last occupants of the Ganymede meeting space; and/or the like. For example, see 6P-6Q, and the description thereof.

As shown in FIG. 15A, the meeting status interface 1518 also includes a plurality of attribute icons 1508*a* and 1508*b* collectively referred to as "attribute icons 1508") indicating the equipment or features associated with the Ganymede meeting space. In FIG. 15A, the first attribute icon 1508*a* indicates that the Ganymede meeting space is equipped with at least one display. The second attribute icon 1508*b* indicates that the Ganymede meeting space includes video and/or videoconference equipment. When activated (e.g., with a contact), the attribute icons 1508 cause further details regarding the equipment or features associated with the Ganymede meeting space to be displayed. For example, if the first attribute icon 1508*a* is selected, information or details regarding the display(s) is displayed such as model name, size, resolution, aspect ratio, inputs, age, and/or the like.

As shown in FIG. 15A, the meeting status interface 1518 further includes a calendar affordance 1510, which, when activated (e.g., with a contact), causes a reservation schedule associated with the Ganymede meeting space. For example, see 6B-6C, and the description thereof. As shown in FIG. 15A, the meeting status interface 1518 further includes a "Room Help" affordance 1516, which, when activated (e.g., with a contact), causes a problem reporting interface to replace the meeting status interface 1518. For example, see 6J-6P, and the description thereof.

As shown in FIG. 15A, the meeting status interface 1518 further includes: the current time (e.g., 9:41); a status indicator 1512 indicating a current availability or reservation status of the Ganymede meeting space; and a claiming affordance 1514, which, when activated (e.g., with a left-to-right swipe gesture or a predefined gesture such as a one finger tap gesture), causes the status indicator 1512 to change (e.g., from "RESERVED" to "MEETING IN PROGRESS," or from "AVAILABLE" to "MEETING IN PROGRESS"). In this example, the Ganymede meeting space is available from 9:30 to 10:00 and reserved for A. Broccoli from 10:00 to 11:00. As shown in FIG. 15A, the status indicator 1512 indicates "AVAILABLE" because the Ganymede meeting space is available until 10:00 based on the current time (e.g., 9:41). In FIG. 15A, the claiming affordance 1514 is enabled and also prompts the user to "slide to takeover until 10:00."

According to some embodiments, while the meeting space is unoccupied, the status indicator 1512 indicates "AVAILABLE" until the early check-in threshold 1522 associated with the next reservation (e.g., 15 minutes prior to the start time of the upcoming reservation). In some embodiments, the claiming affordance 1514 is enabled to takeover/commandeer the meeting space while the meeting is unoccupied and the current time is prior to the early check-in threshold 1522 associated with the next reservation. In some embodiments, the claiming affordance 1514 is enabled to takeover/commandeer the meeting space while the meeting is unoccupied, the current time is prior to the early check-in threshold 1522 associated with the next reservation, and a predefined amount of time exists before the next reservation (e.g., 20, 25, or 30 minutes). For example, also see FIGS. 6I-6J, and the description thereof.

Figure 15B:
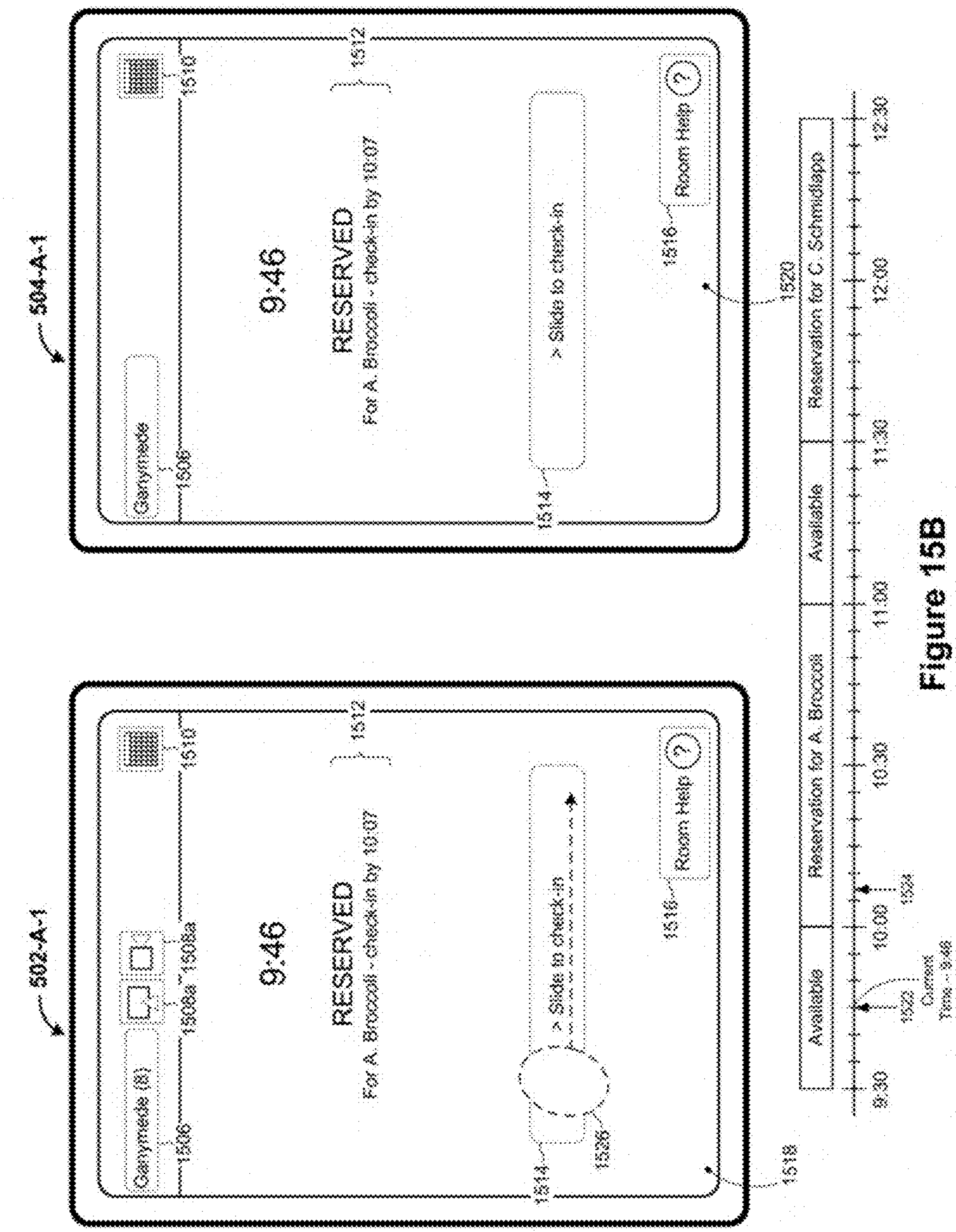

FIGS. 15A-15B illustrate a sequence in which the status indicator changes from "AVAILABLE" to "RESERVED." In FIG. 15B, the status indicator 1512 indicates that the Ganymede meeting space is "RESERVED" for A. Broccoli and that A. Broccoli has until 10:07 to check-in. In FIG. 15B, the claiming affordance 1514 also prompts the user to "slide to check-in." In this example, the Ganymede meeting space is available from 9:30 to 10:00 and reserved for A. Broccoli from 10:00 to 11:00.

According to some embodiments, the status indicator 1512 indicates "RESERVED" between the early check-in threshold 1522 and the check-in deadline 1524 (e.g., 7 minutes after the start time of the upcoming reservation). As such, in some embodiments, the status indicator 1512 indicates "RESERVED" when the current time (e.g., 9:46) is between the early check-in threshold 1522 and the check-in deadline 1524. Furthermore, in some embodiments, the claiming affordance 1514 is enabled to check-in to an upcoming reservation while the meeting space is available and the current time is between the early check-in threshold 1522 and the check-in deadline 1524.

In some embodiments, a reservation is claimed or checked-in to without authenticating the user as the reservation holder or an invitee. As such, any user is capable of checking-in to the reservation from 10:00 to 11:00. In some embodiments, prior to being able to claim or check-in to a reservation, a user is authenticated as the reservation organizer or optionally an invitee of the reservation.

Figure 15C:
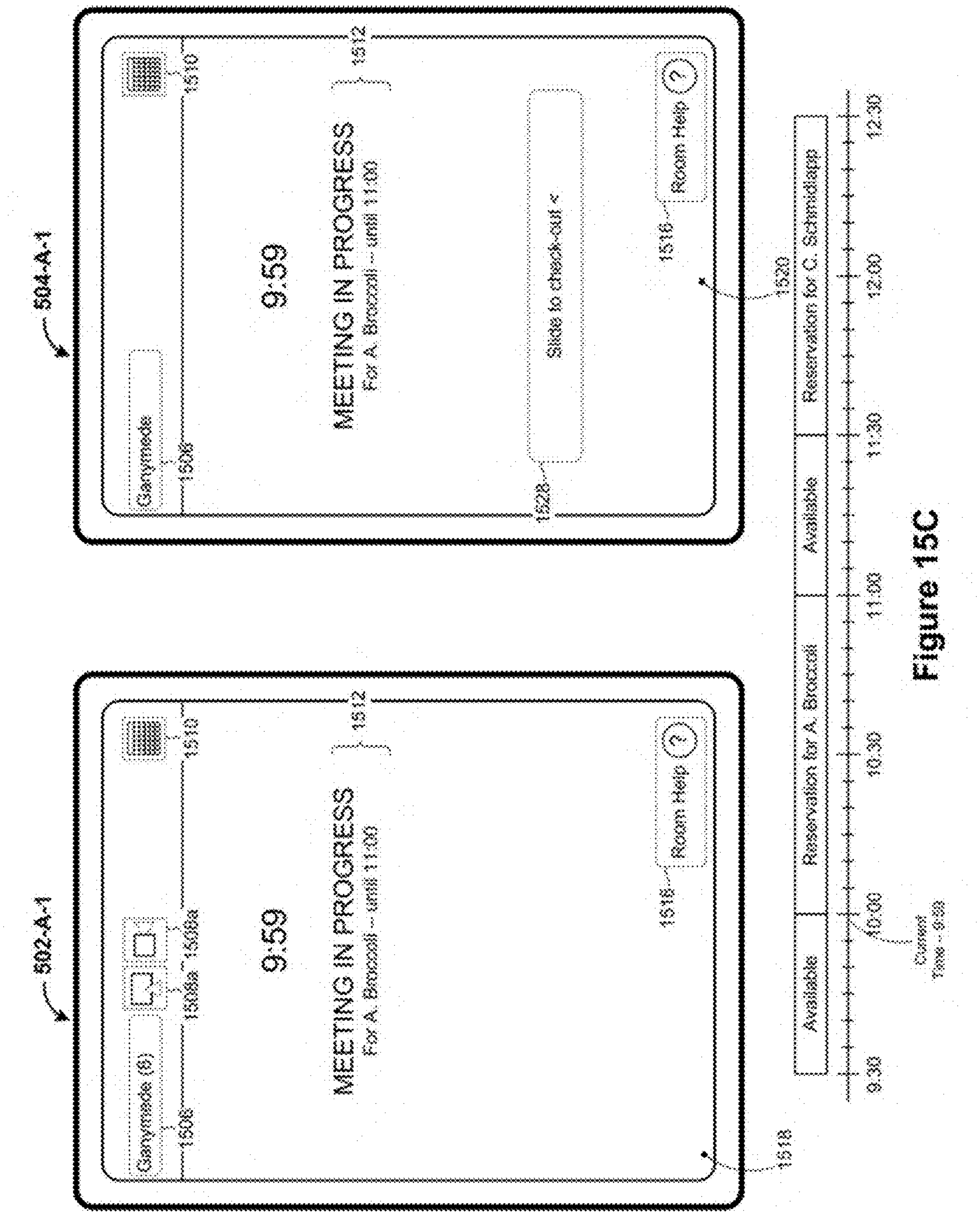

FIGS. 15B-15C illustrate a sequence in which a user checks-in to an upcoming reservation of the meeting space while the meeting space is unoccupied. FIG. 15B also illustrates the first electronic device 502-A-1 detecting a left-to-right swipe gesture over the claiming affordance 1514 with a contact 1526. FIG. 15C shows that the status indicator 1512 displayed by the first electronic device 502-A-1 and the second electronic device 504-A-1 indicates "MEETING IN PROGRESS" in response to the left-to-right swipe gesture over the claiming affordance 1514 in FIG. 15C. FIG. 15C illustrates the second electronic device 504-A-1 displaying a check-out affordance 1528 in response to the left-to-right swipe gesture over the claiming affordance 1514 in FIG. 15B. As such, the user checked-in to the reservation starting at 10:00, and the user claimed the Ganymede meeting space prior to the start of the reservation because the Ganymede meeting space was available prior to the reservation start time.

In some embodiments, the second electronic device 504-A-1 displays a meeting manifest interface response to the left-to-right swipe gesture over the claiming affordance 1514 in FIG. 15C. For example, also see FIGS. 7A-7D, and the description thereof. For example, the meeting manifest interface corresponds to the unauthorized meeting manifest interface 1856 in FIG. 18D if the user has not been confirmed as a participant of the upcoming reservation. In another example, the meeting manifest interface corresponds to the authorized meeting manifest interface 1858 in FIG. 18D if the user has been confirmed as a participant of the upcoming reservation. According to some embodiments, the confirmation process is described in more detail with reference to FIGS. 16A-16C and 17A-17D.

Figure 15D:
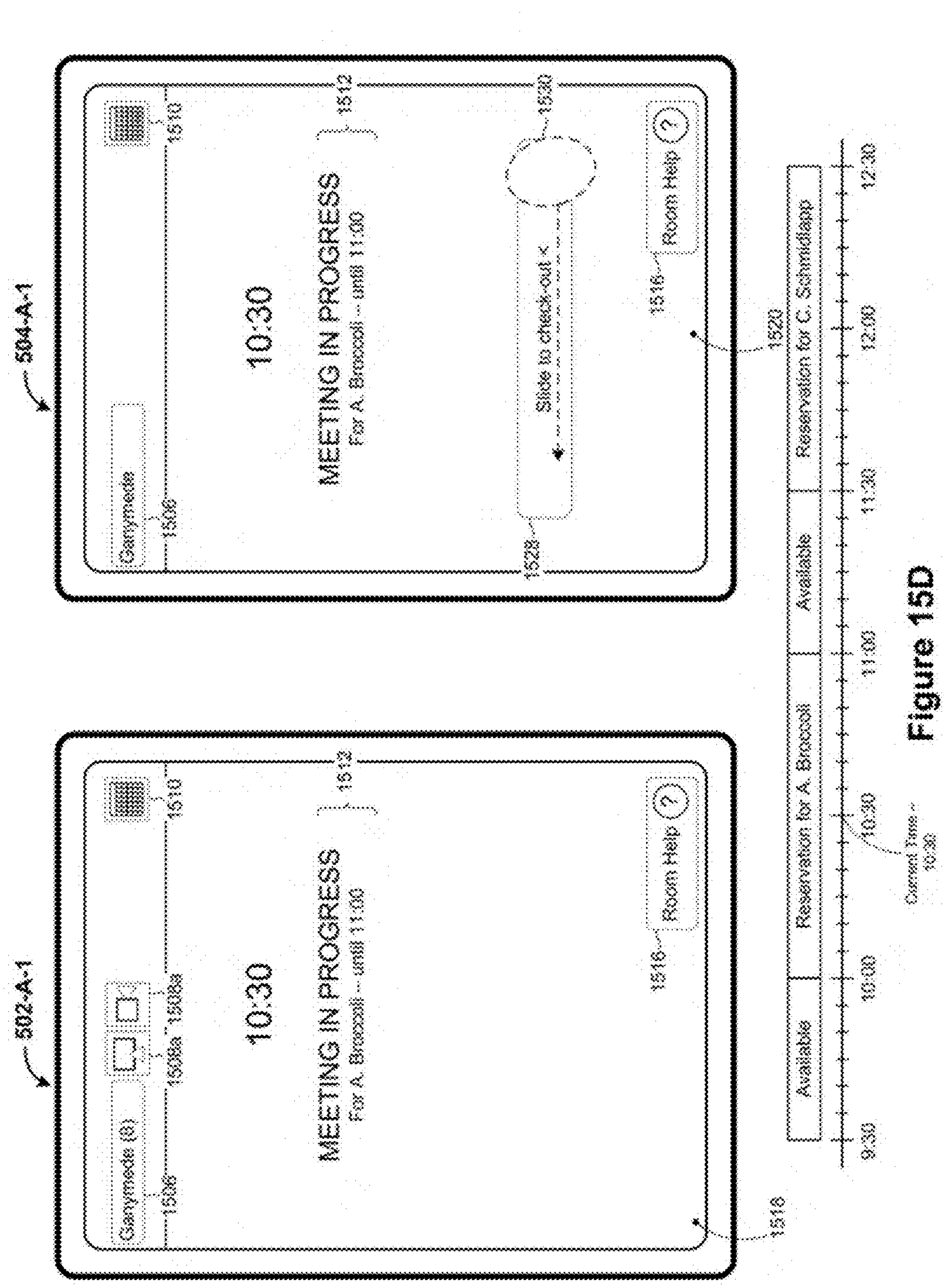
Figure 15E:
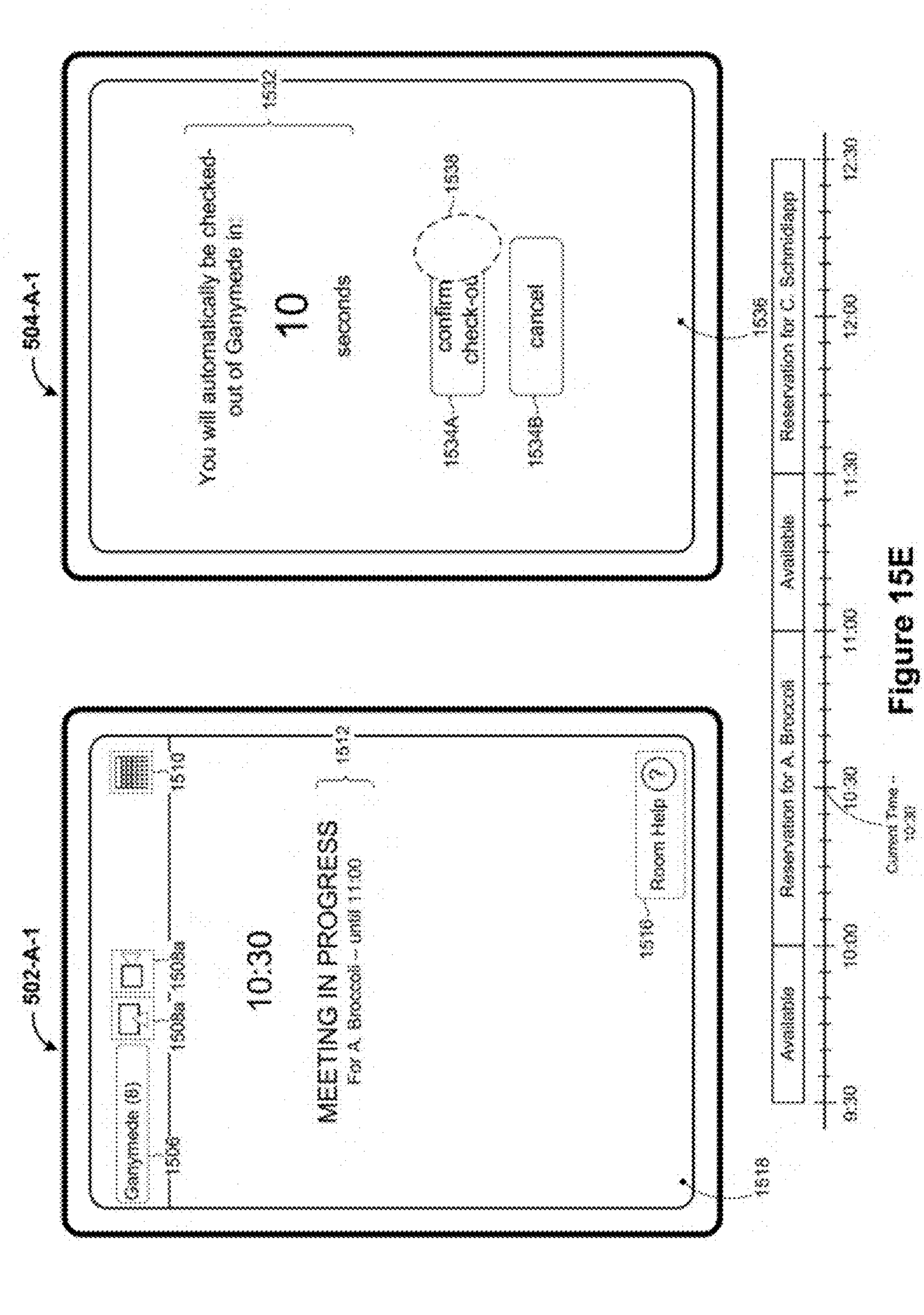
Figure 15F:
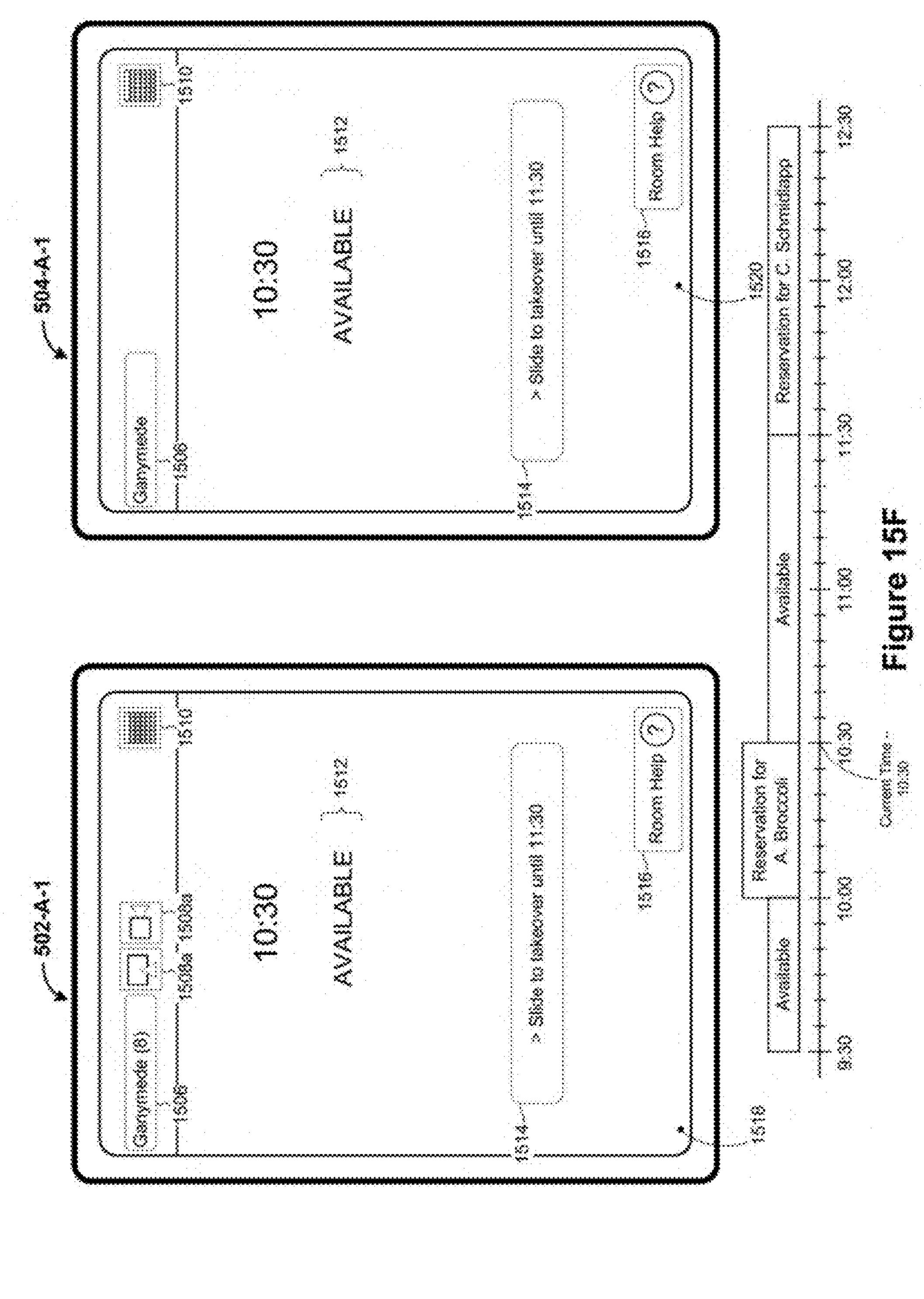

FIGS. 15D-15F illustrate a sequence in which checks-out from the current meeting. FIG. 15D illustrates the second electronic device 504-A-1 detecting a right-to-left swipe gesture over the check-out affordance 1528 with a contact 1530. FIG. 15E illustrates the second device 504-A-1 displaying a check-out confirmation interface 1536 in response to the right-to-left swipe gesture over the check-out affordance 1528 in FIG. 15D. As shown in FIG. 15E, the check-out confirmation interface 1536 includes a prompt 1532 indicating that the user will be automatically checked-out of the Ganymede meeting space in ten seconds. The check-out confirmation interface 1536 also includes: a check-out confirmation affordance 1534A, which, when activated (e.g., with a contact), causes cancellation of the remainder of the ongoing meeting and releases the Ganymede meeting space for subsequent local takeover or remote reservation; and a cancel affordance 1534B, which, when activated (e.g., with a contact), causes the check-out process to be aborted.

FIG. 15E also illustrates the second electronic device 504-A-1 detecting a contact 1538 at a location corresponding to the check-out confirmation affordance 1534A. FIG. 15F shows the second electronic device 504-A-1 replacing display of the check-out confirmation interface 1536 with the meeting status interface 1520 in response to selection of the check-out confirmation affordance 1534A in FIG. 15E. As shown in FIG. 15F, the status indicator 1512 displayed on both the meeting status interface 1518 and the meeting status interface 1520 indicates "AVAILABLE" in response to selection of the check-out confirmation affordance 1534A in FIG. 15E. According to some embodiments, after checking-out from a meeting, the meeting space is released for local takeover and/or remote reservation.

Figure 15G:
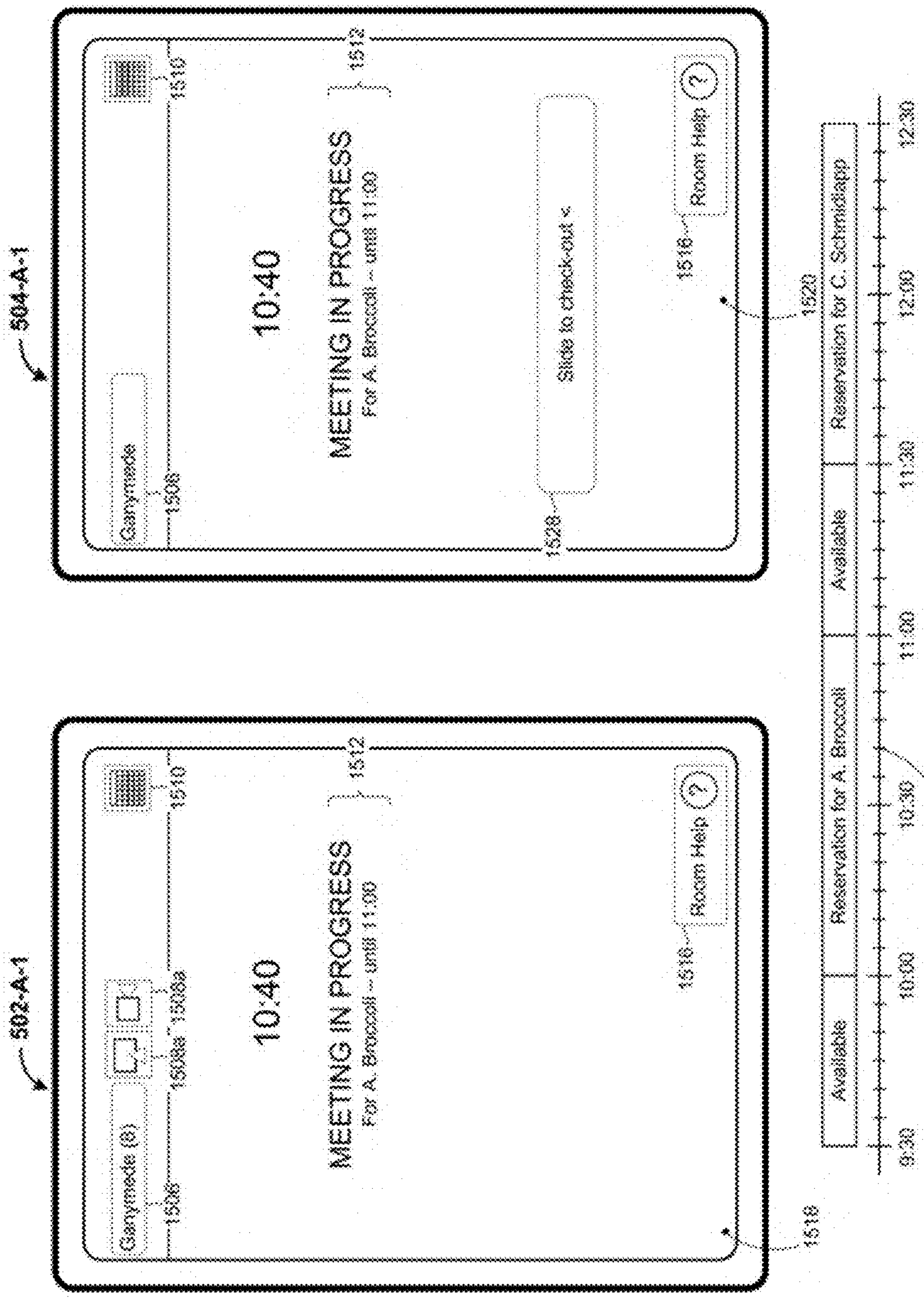

FIG. 15G illustrates the first device 502-A-1 displaying the meeting status interface 1518 and the second electronic device 504-A-1 displaying the meeting status interface 1520 assuming the user had aborted the check-out process shown in FIGS. 15D-15F (e.g., by selecting the cancel affordance 1534B) or assuming that the user did not perform the check-out process shown in FIGS. 15D-15F. As shown in FIG. 15G, the status indicator 1512 displayed on both the meeting status interface 1518 and the meeting status interface 1520 indicates "MEETING IN PROGRESS" due to A. Broccoli's reservation of the Ganymede meeting space until 11:00 for the ongoing meeting.

Figure 15H:
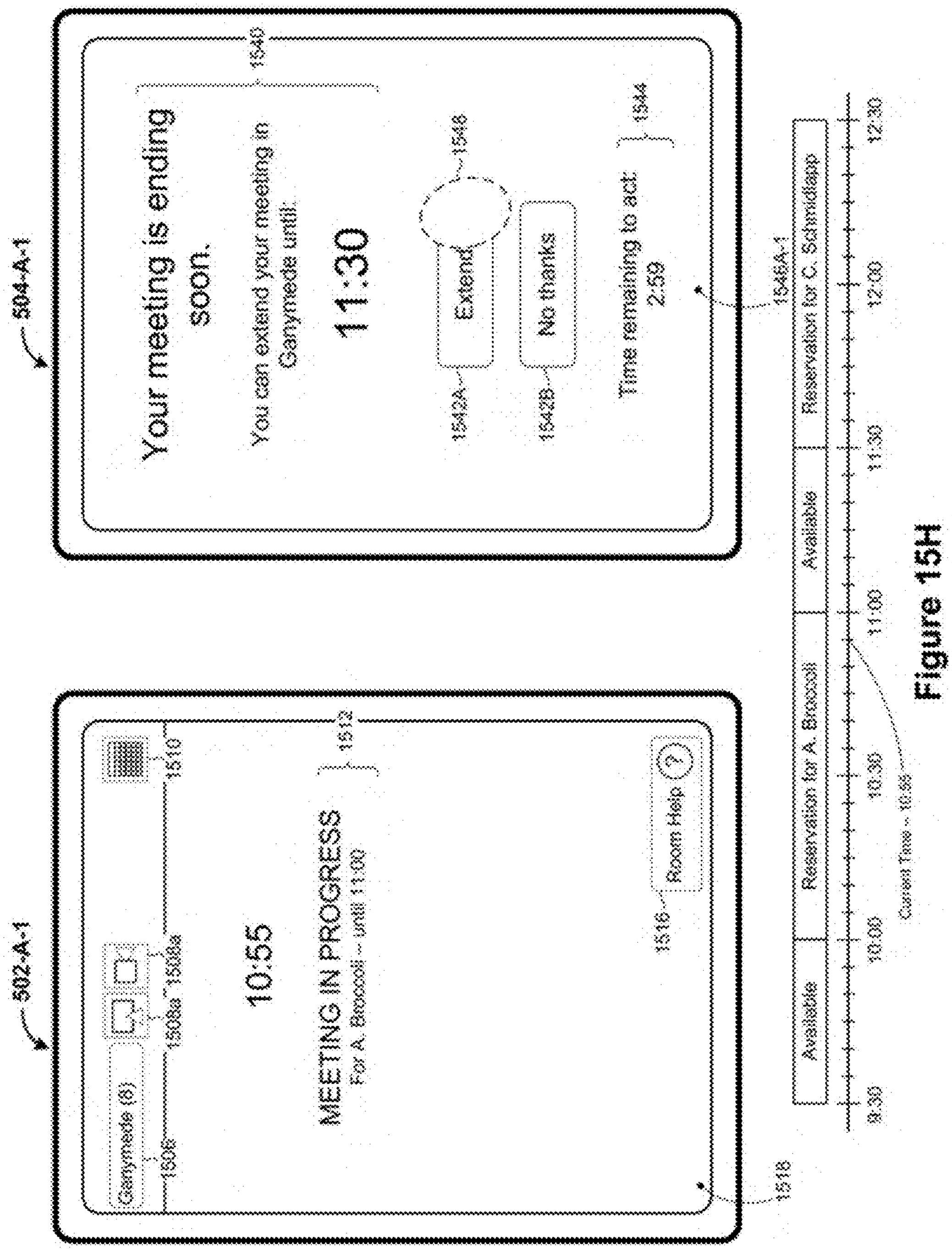
Figure 15I:
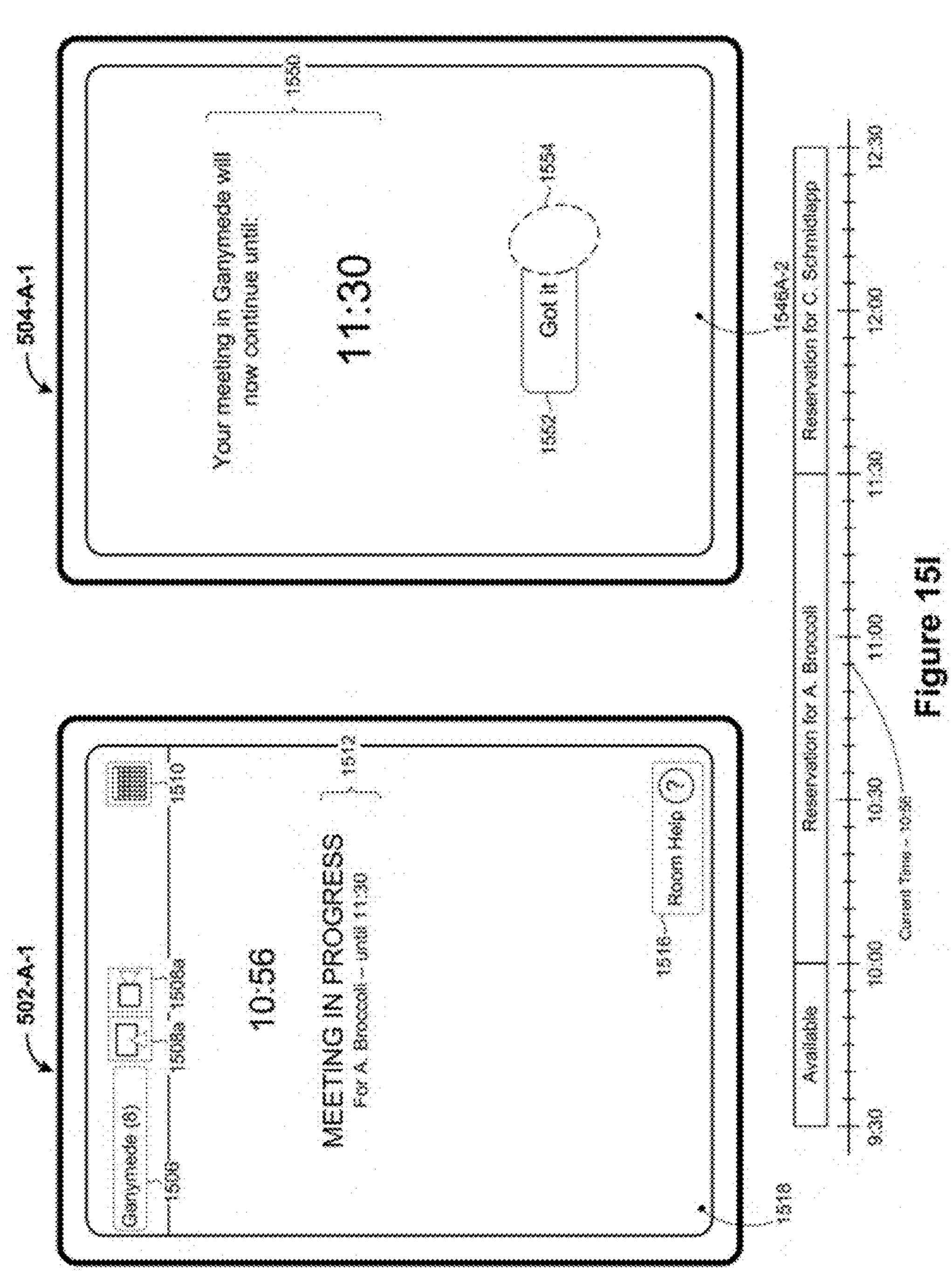
Figure 15J:
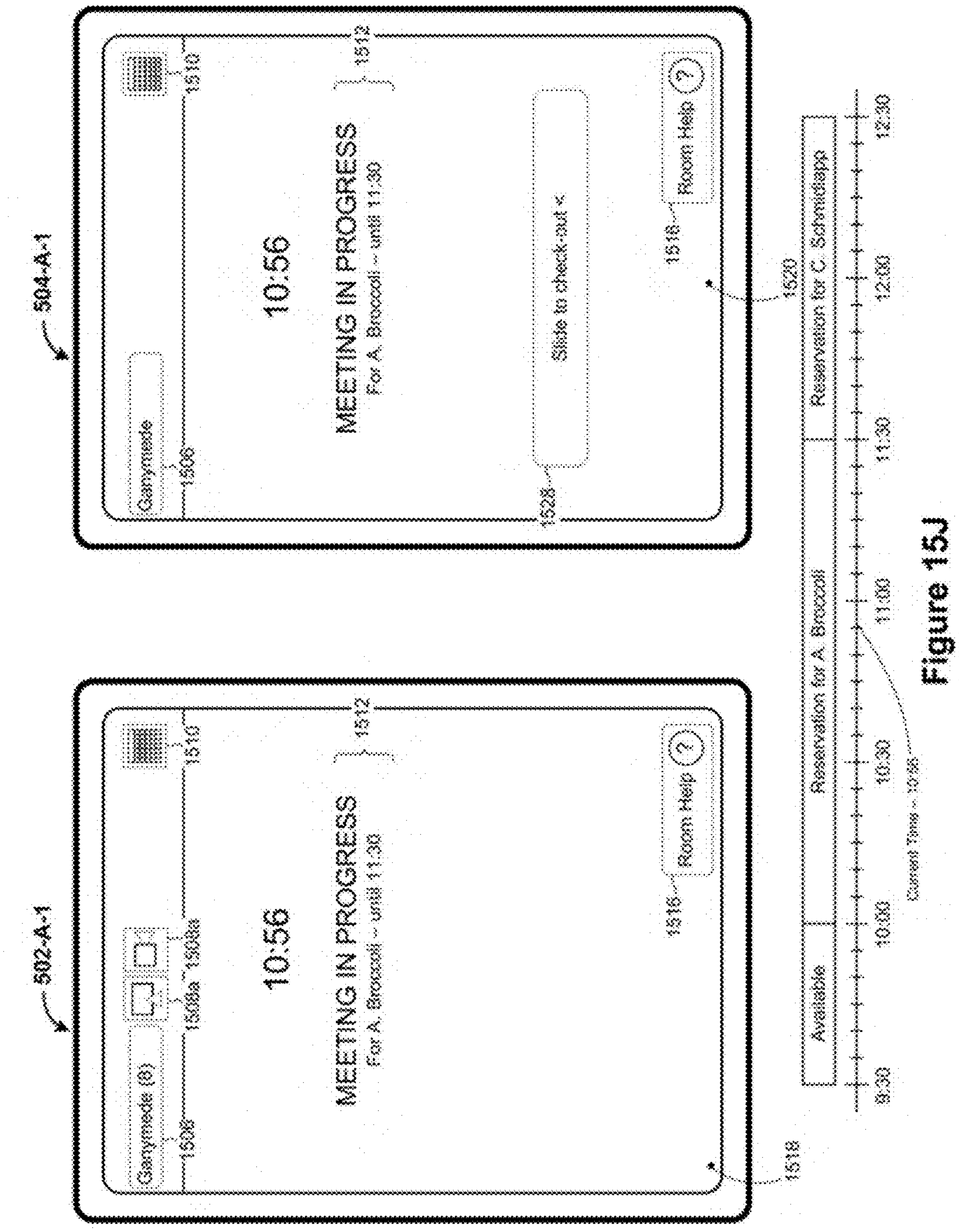

FIGS. 15H-15J illustrate a sequence in which a user extends the meeting in the current meeting space. FIG. 15H illustrates the second device 504-A-1 displaying a first state of a first extension interface 1546A-1. According to some embodiments, the second device 504-A-1 displays the first state of the first extension interface 1546A-1 a predefined time before the end of the current meeting (e.g., 5 minutes before the end time) when the meeting space is available after the current meeting.

As shown in FIG. 15H, the first state of the first extension interface 1546A-1 includes a prompt 1540 indicating that the meeting is ending soon (e.g., at 11:00) and that the participants of the current meeting are able to extend the meeting within the Ganymede meeting space from 11:00 to 11:30. The first state of the first extension interface 1546A-1 also includes: an extension affordance 1542A, which, when activated (e.g., with a contact), causes the current meeting to be extended and the first state of the first extension interface 1546A-1 to be replaced with the second state of the first extension interface 1546A-2 (e.g., as shown in FIG. 15G); and a "No thanks" affordance 1542B, which, when activated (e.g., with a contact), causes the first state of the first extension interface 1546A-1 to be replaced with the meeting status interface 1520 (e.g., as shown in FIG. 15E). As shown in FIG. 15H, the first state of the first extension interface 1546A-1 further includes a timer 1544 indicating that the user has two minutes and fifty-nine seconds to extend the current meeting within the Ganymede meeting space before the meeting is automatically checked out of the meeting space at which point the user will no longer be able to extend the current meeting and will have to schedule a new meeting to occupy the Ganymede meeting space.

FIG. 15H also illustrates the second electronic device 504-A-1 detecting a contact 1548 at a location corresponding to the extension affordance 1542A. FIG. 15I shows the second electronic device 504-A-1 replacing display of the first state of the first extension interface 1546A-1 with the second state of the first extension interface 1546A-2 in response to selection of the extension affordance 1542A in FIG. 15H. As shown in FIG. 15I, the second state of the first extension interface 1546A-2 includes: a prompt 1550 indicating that the current meeting within the Ganymede meeting space will now end at 11:30; and a confirmation affordance 1552, which, when activated (e.g., with a contact), causes the second state of the first extension interface 1546A-2 to be replaced with the meeting status interface 1520 (e.g., as shown in FIG. 15J).

FIG. 15I also illustrates the second electronic device 504-A-1 detecting a contact 1554 at a location corresponding to the confirmation affordance 1552. FIG. 15J shows the second electronic device 504-A-1 replacing display of the second state of the first extension interface 1546A-2 with the meeting status interface 1520 in response to selection of the confirmation affordance 1552 in FIG. 15I.

Figure 15K:
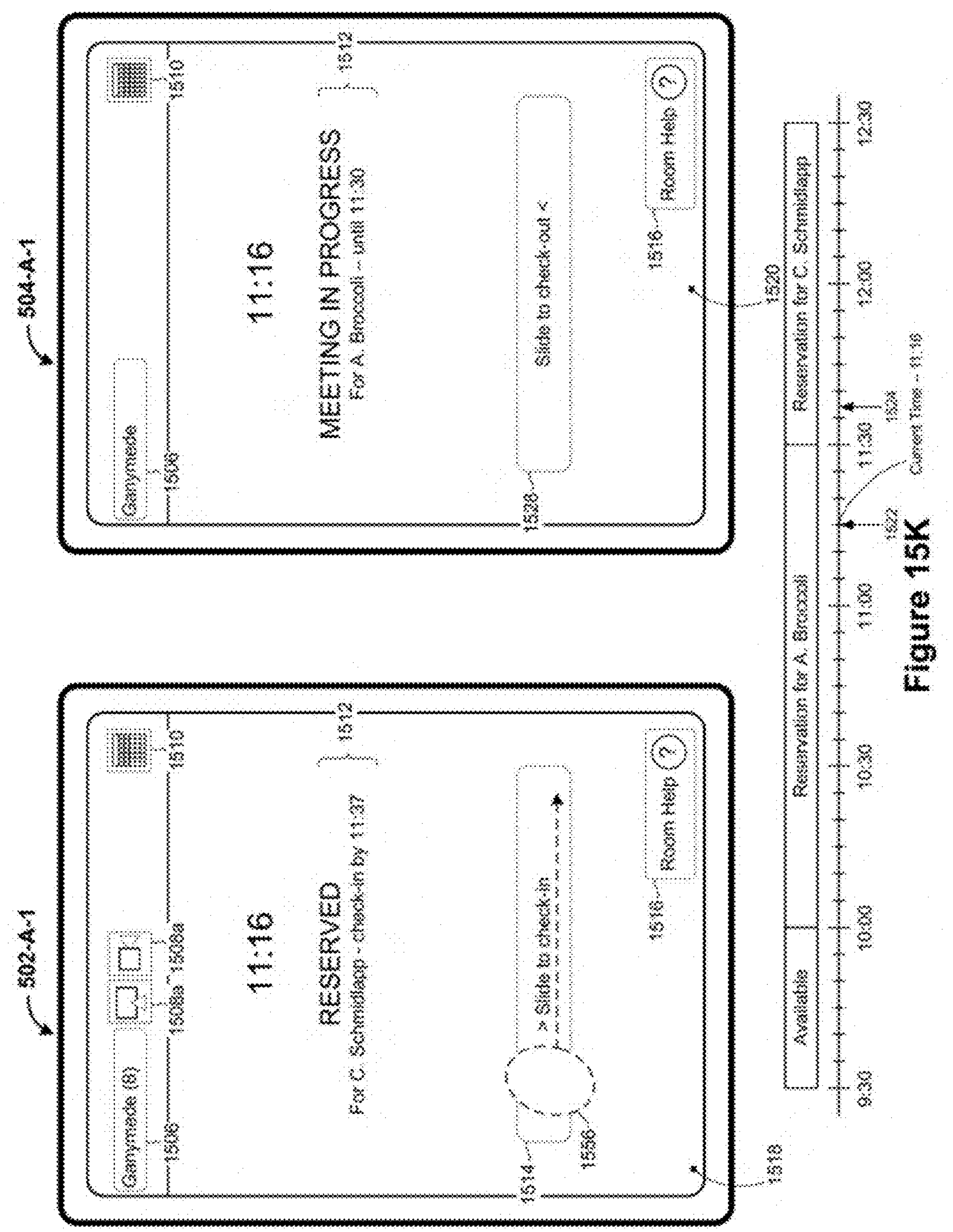
Figure 15L:
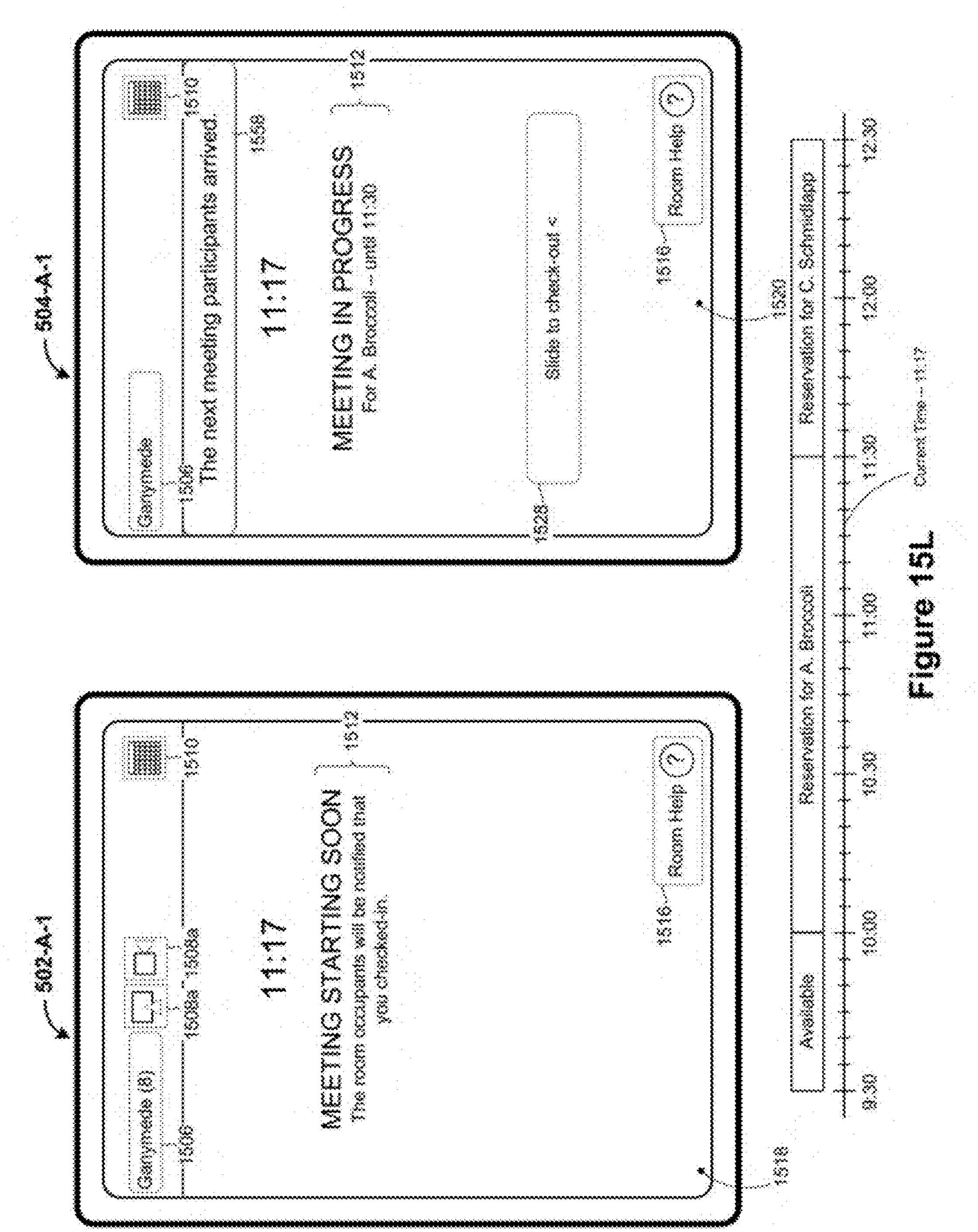

FIGS. 15K-15L illustrate a sequence in which a user checks-in to an upcoming reservation of the meeting space while the meeting space is occupied. The meeting status interfaces 1518 and 1520 shown in FIG. 15K are similar to and adapted from the meeting status interfaces 1518 and 1520 in FIG. 15B and FIG. 15J. As such, FIG. 15B, FIG. 15J, and FIG. 15K include similar user interfaces and elements labeled with the same reference number in both figures have the same function, with only the differences are described herein for the sake of brevity.

In this example, the Ganymede meeting space is reserved for A. Broccoli from 10:00 to 11:30 (e.g., the ongoing meeting), and the Ganymede meeting space is reserved for C. Schmidlapp from 11:30 to 12:30 (e.g., the next meeting). As shown in FIG. 15K, the first electronic device 502-A-1 displays the meeting status interface 1518 with the status indicator 1512 indicating that the Ganymede meeting space is "RESERVED" for C. Schmidlapp and that C. Schmidlapp has until 11:37 to check-in. The claiming affordance 1514 displayed by the first electronic device 502-A-1 also prompts the user to "slide to check-in" to the upcoming reservation. Furthermore, in FIG. 15K, the second electronic device 504-A-1 displays the meeting status interface 1520 with the status indicator 1512 indicating "MEETING IN PROGRESS" for A. Broccoli until 11:30. The check-out affordance 1528 displayed by the second electronic device 504-A-1 also prompts the user to "slide to check-out" from the ongoing meeting.

FIG. 15K also illustrates the first electronic device 502-A-1 detecting a left-to-right swipe gesture with a contact 1556 over the claiming affordance 1514. FIG. 15L illustrates the first electronic device 502-A-1 updating the status indicator 1512 to indicate "MEETING STARTING SOON" in response to the swipe gesture over the claiming affordance 1514 in FIG. 15K. FIG. 15L also illustrates the second electronic device 504-A-1 displaying a notification 1558 indicating that participants of the next meeting checked-in in response to the swipe gesture over the claiming affordance 1514 in FIG. 15K.

Figure 15M:
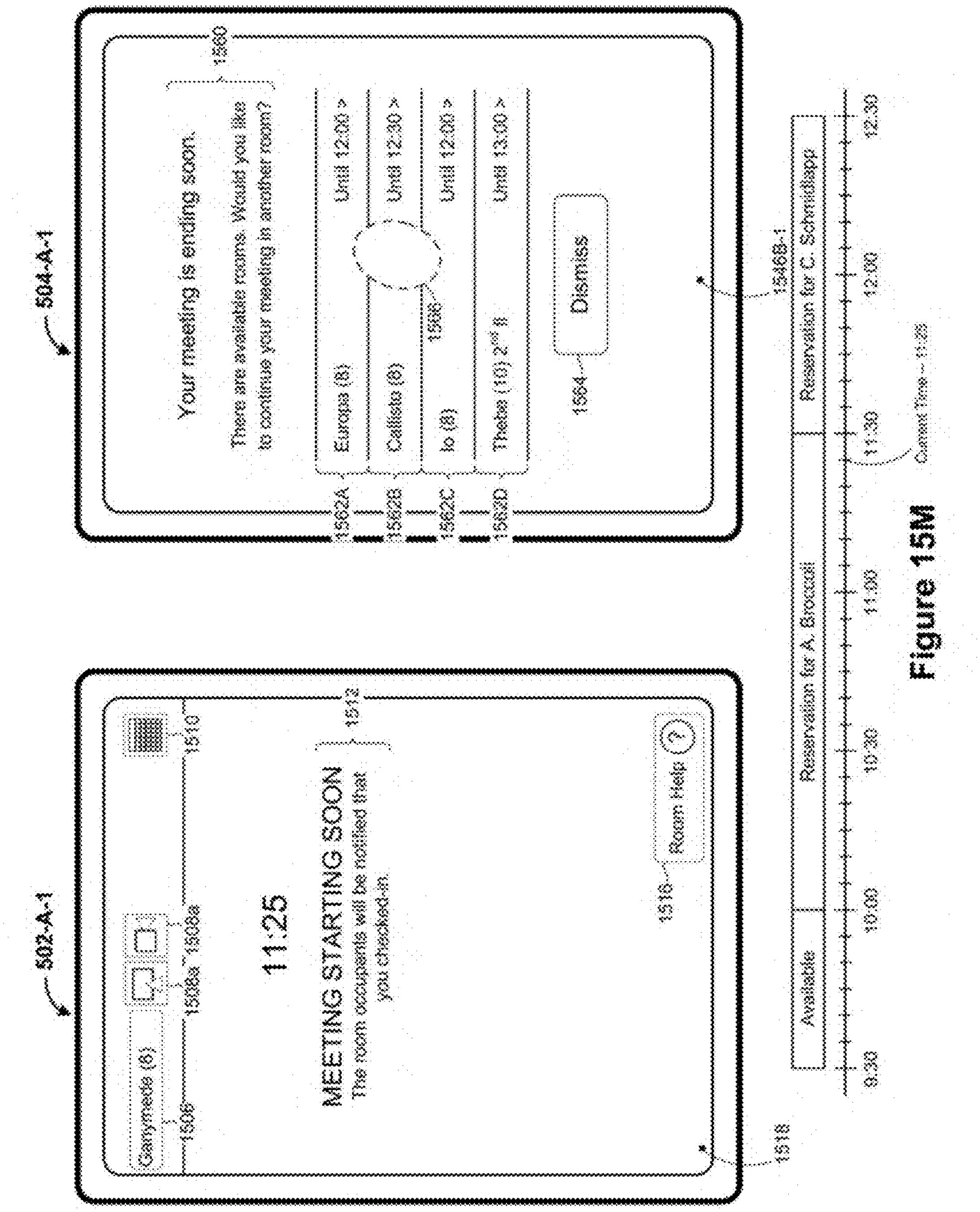
Figure 15N:
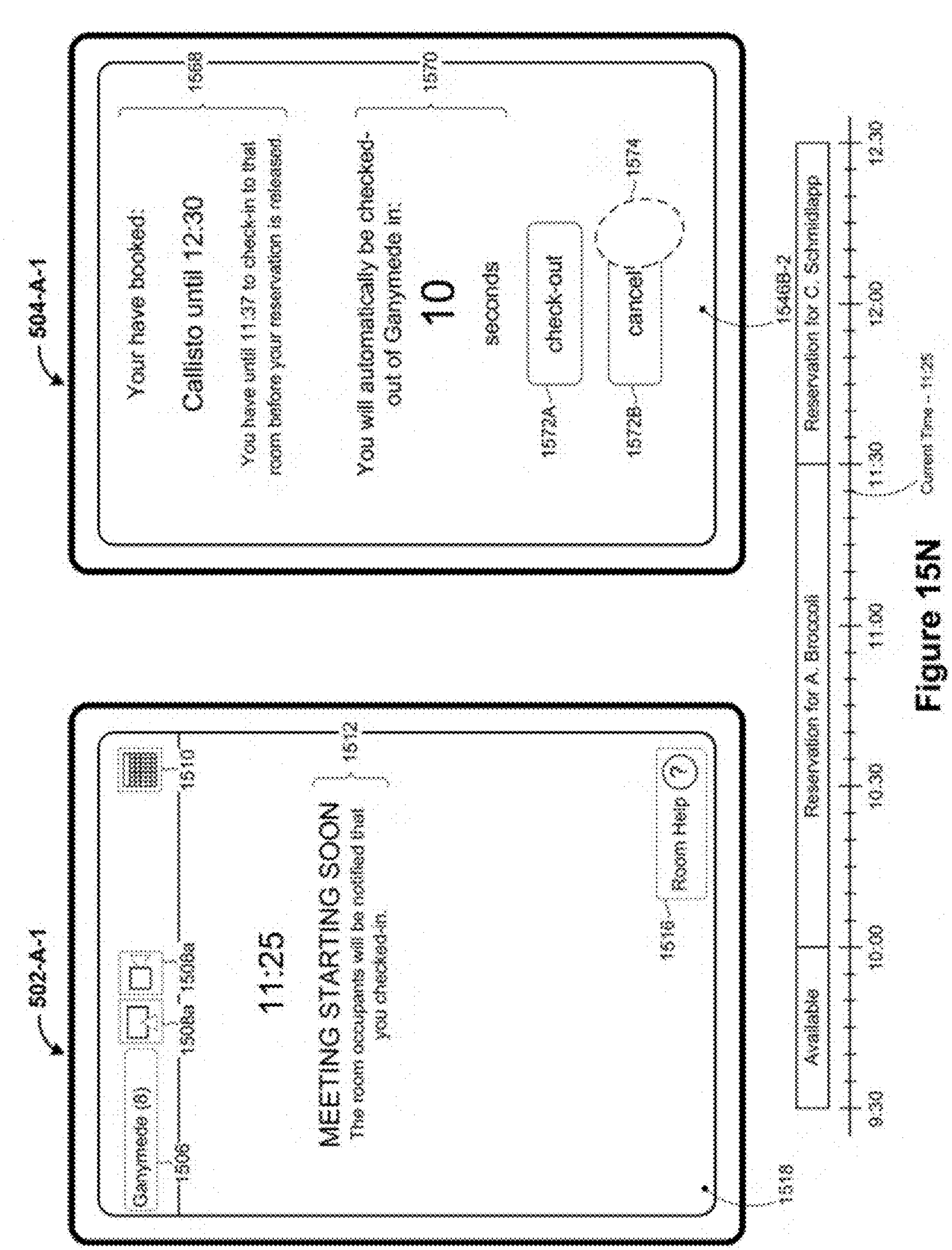

FIGS. 15M-15N illustrate a sequence in which a user extends the meeting in a different meeting space. FIG. 15M illustrates the second device 504-A-1 displaying a first state of a second extension interface 1546B-1. According to some embodiments, the second device 504-A-1 displays the first state of the second extension interface 1546B-1 a predefined time before the end of the current meeting (e.g., 5 minutes before the end time) when the meeting space is unavailable after the current meeting.

As shown in FIG. 15M, the first state of the second extension interface 1546B-1 includes a prompt 1560 indicating that the meeting is ending soon (e.g., at 11:30) and that the participants of the current meeting are able to extend the meeting in one of a plurality of available meeting spaces different from the Ganymede meeting space. The first state of the second extension interface 1546B-1 also includes a plurality of affordances 1562A, 1562B, 1562C, and 1562D (sometimes collectively referred to as the "affordances 1562") associated with available meeting spaces. Each of the affordances 1562 is associated with a meeting space name, occupancy limit, and length of availability. When activated (e.g., with a contact), the affordances 1562 cause the first state of the second extension interface 1546B-1 to be replaced with the second state of the second extension interface 1546B-2 (e.g., as shown in FIG. 15N). As shown in FIG. 15M, the first state of the second extension interface 1546B-1 further includes a dismiss affordance 1564, which, when activated (e.g., with a contact), causes the first state of the second extension interface 1546B-1 to be replaced with the meeting status interface 1520 (e.g., as shown in FIG. 15J).

FIG. 15M also illustrates the second electronic device 504-A-1 detecting a contact 1566 at a location corresponding to the affordance 1562B associated with the Callisto meeting space. FIG. 15N shows the second electronic device 504-A-1 replacing display of the first state of the second extension interface 1546B-1 with the second state of the second extension interface 1546B-2 in response to selection of the affordance 1562B in FIG. 15M.

Figure 15O:
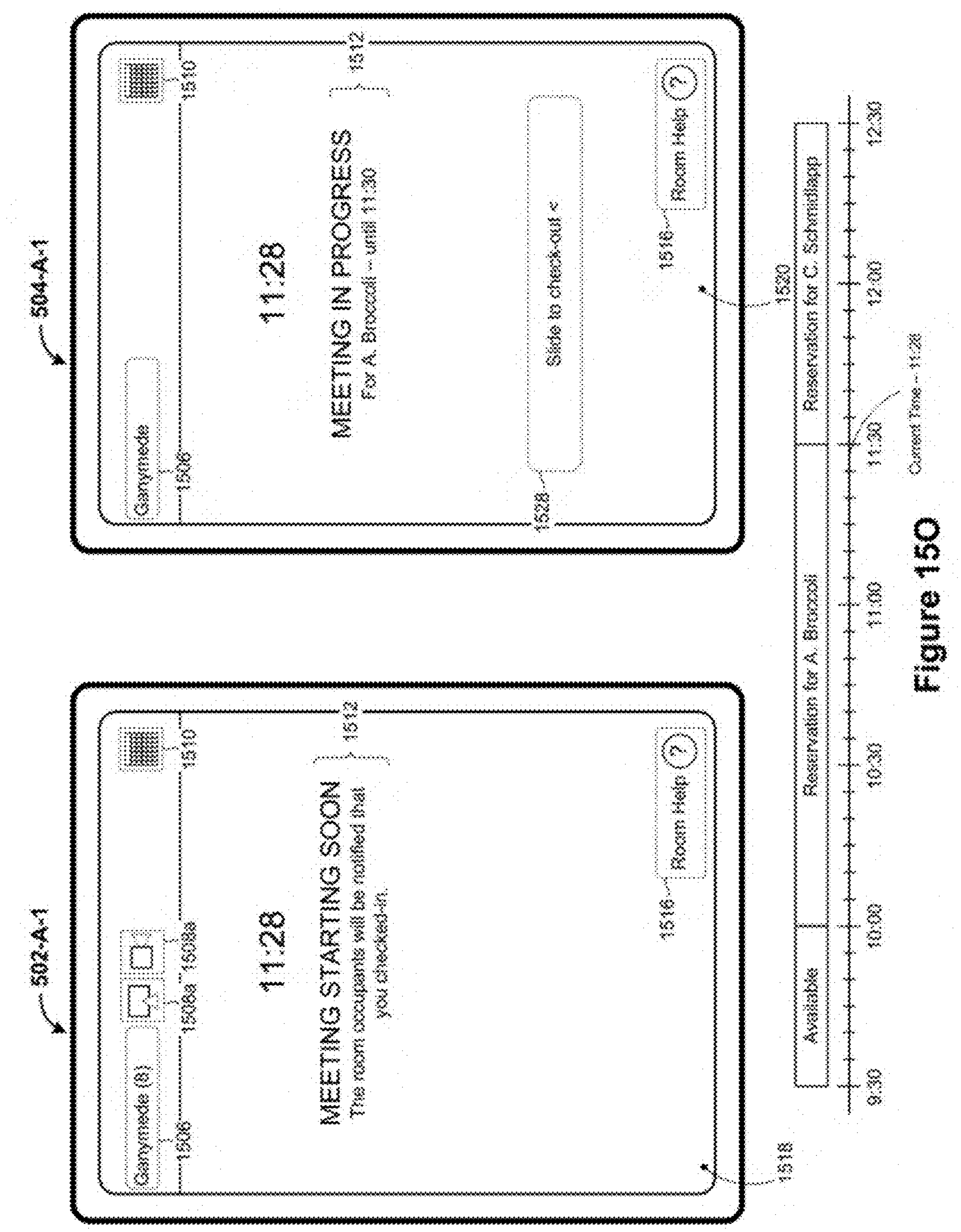

As shown in FIG. 15N, the second state of the second extension interface 1546B-2 includes: a first prompt 1568 indicating that the current meeting has been extended within the Callisto meeting space until 12:30; and a second prompt 1570 indicating that the user will be automatically checked-out of the Ganymede meeting space in ten seconds. The second state of the second extension interface 1546B-2 also includes: a check-out affordance 1572A, which, when activated (e.g., with a contact), causes the user to be check-out of the Ganymede meeting space; and a cancel affordance 1572B, which, when activated (e.g., with a contact), causes the second state of the second extension interface 1546B-2 to be replaced with the meeting status interface 1520 (e.g., as shown in FIG. 15O).

FIG. 15N also illustrates the second electronic device 504-A-1 detecting a contact 1574 at a location corresponding to the cancel affordance 1572B. FIG. 15O shows the second electronic device 504-A-1 replacing display of the second state of the second extension interface 1546B-2 with the meeting status interface 1520 in response to selection of the cancel affordance 1572B in FIG. 15N. According to some embodiments, the second electronic device 504-A-1 also displays options for transferring an electronic conference (e.g., a teleconference or videoconference) to the Callisto meeting space (e.g., as shown in FIGS. 19H-19K). In one example, the electronic conference is placed on hold until the participants check-in at the Callisto meeting space at which time the electronic conference is presented via the equipment within the Callisto meeting space. In another example, the electronic conference is transferred to the personal devices of the participants (e.g., mobile phones, tablets, or the like) until the participants check-in at the Callisto meeting space at which time the electronic conference is presented via the equipment within the Callisto meeting space. According to some embodiments, the second electronic device 504-A-1 also displays a plan view with directions to the Callisto meeting space (e.g., as shown in FIGS. 7Y and 19K).

Figure 15P:
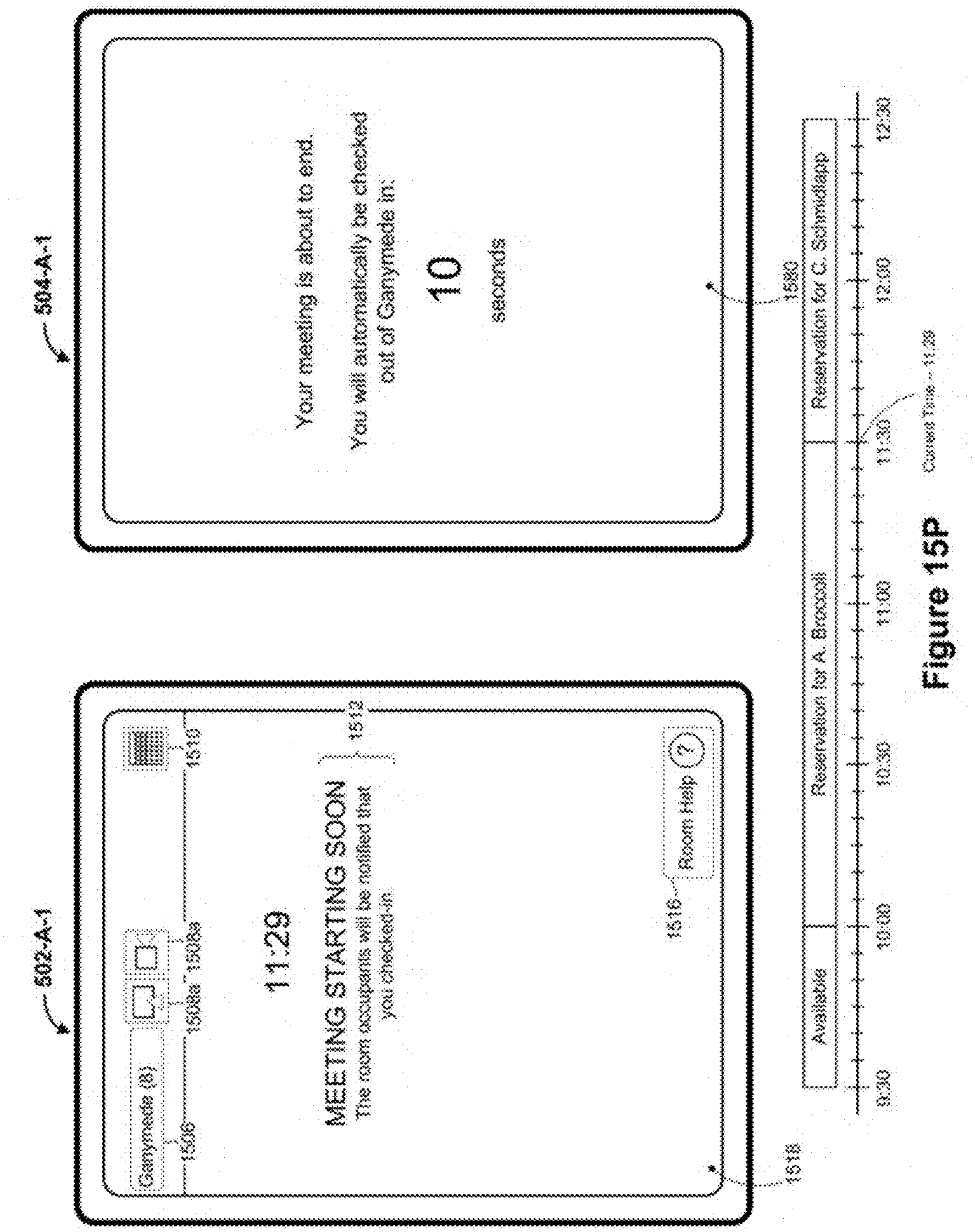
Figure 15Q:
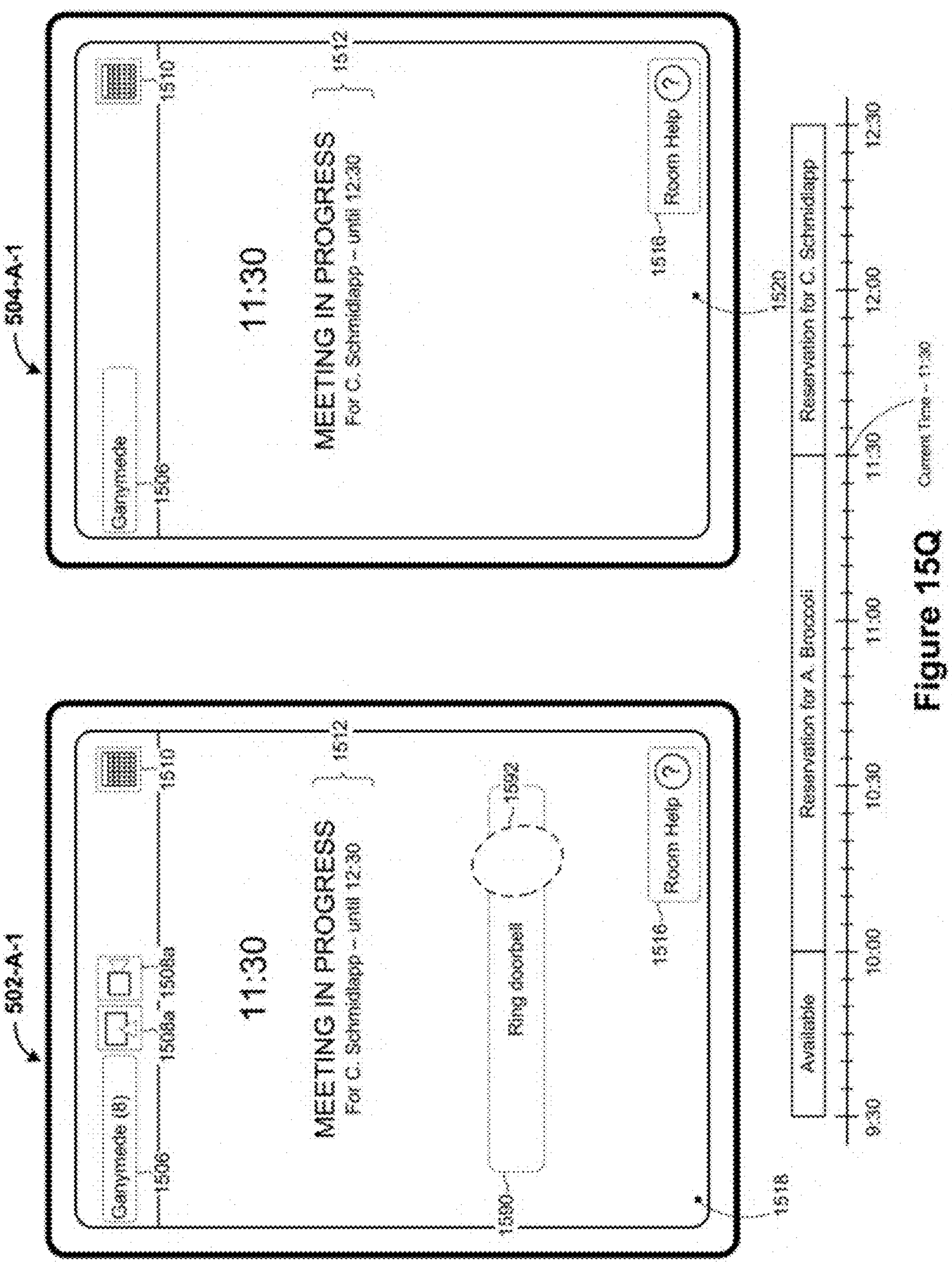
Figure 15R:
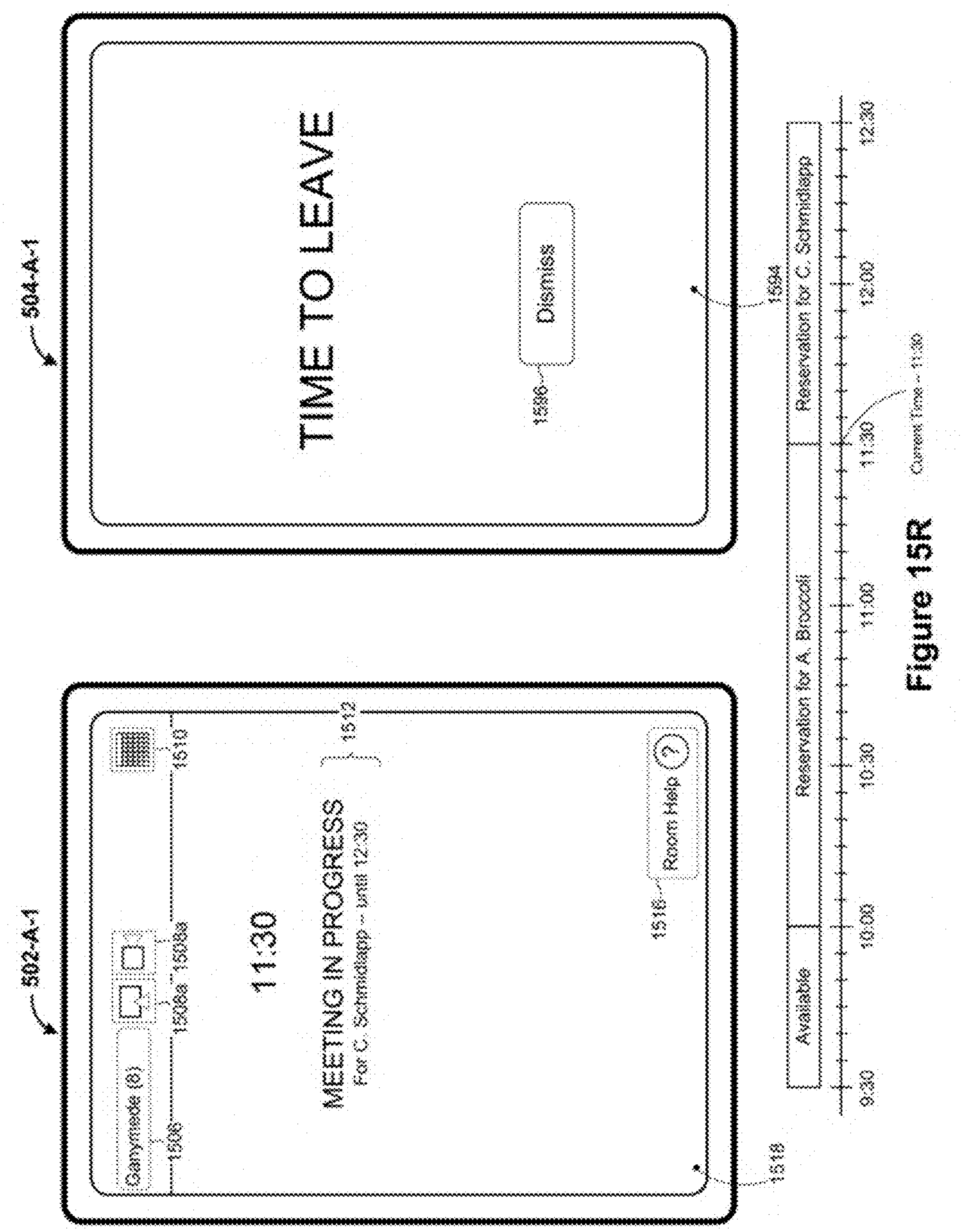

FIGS. 15P-15R illustrate a sequence in which participants of an expired meeting are reminded of a next reservation of the meeting space. FIG. 15P illustrates the first electronic device 502-A-1 displaying the meeting status interface 1518 with the status indicator 1512 indicating “MEETING STARTING SOON” (e.g., as shown in FIG. 15O). FIG. 15P also illustrates the second electronic device 504-A-1 displaying a meeting expiration interface 1580 indicating that the current meeting is able to end and that the user will automatically be checked-out in ten seconds. In this example, the reservation for A. Broccoli expires at 11:30, and the reservation for C. Schmidlapp starts at 11:30.

FIG. 15Q illustrates the first electronic device 502-A-1 updating the status indicator 1512 from “MEETING STARTING SOON” to “MEETING IN PROGRESS” in response to the start of the reservation for C. Schmidlapp. In FIG. 15Q, the meeting status interface 1518 includes a doorbell affordance 1590 in response to the participants of the previous meeting within the Ganymede meeting space failing to leave after the expiration of their reservation. When activated (e.g., with a contact), the doorbell affordance 1590 causes an alert to be presented to the participants of the previous meeting within the Ganymede meeting space (e.g., as shown in FIG. 15R). FIG. 15Q also illustrates the second electronic device 504-A-1 replacing display of the meeting expiration interface 1580 with the meeting status interface 1520 with the status indicator 1512 indicating “MEETING IN PROGRESS” in response to the start of the reservation for C. Schmidlapp.

FIG. 15Q further illustrates the first electronic device 504-2-1 detecting a contact 1592 at a location corresponding to the doorbell affordance 1590. FIG. 15R shows the second electronic device 504-A-1 replacing display of the meeting status interface 1520 with the expiration alert interface 1594 in response to selection of the doorbell affordance 1590 in FIG. 15Q. According to some embodiments, the expiration alert interface 1594 is accompanied by an audible alert or message provided by the second electronic device 504-A-1 and/or the audio/video equipment within the Ganymede meeting space. As shown in FIG. 15R, the expiration alert interface 1594 includes a dismiss affordance 1596, which, when activated (e.g., with a contact), causes the expiration alert interface 1594 to be replaced with the meeting status interface 1520 (e.g., as shown in FIG. 15Q).

Figure 16A:
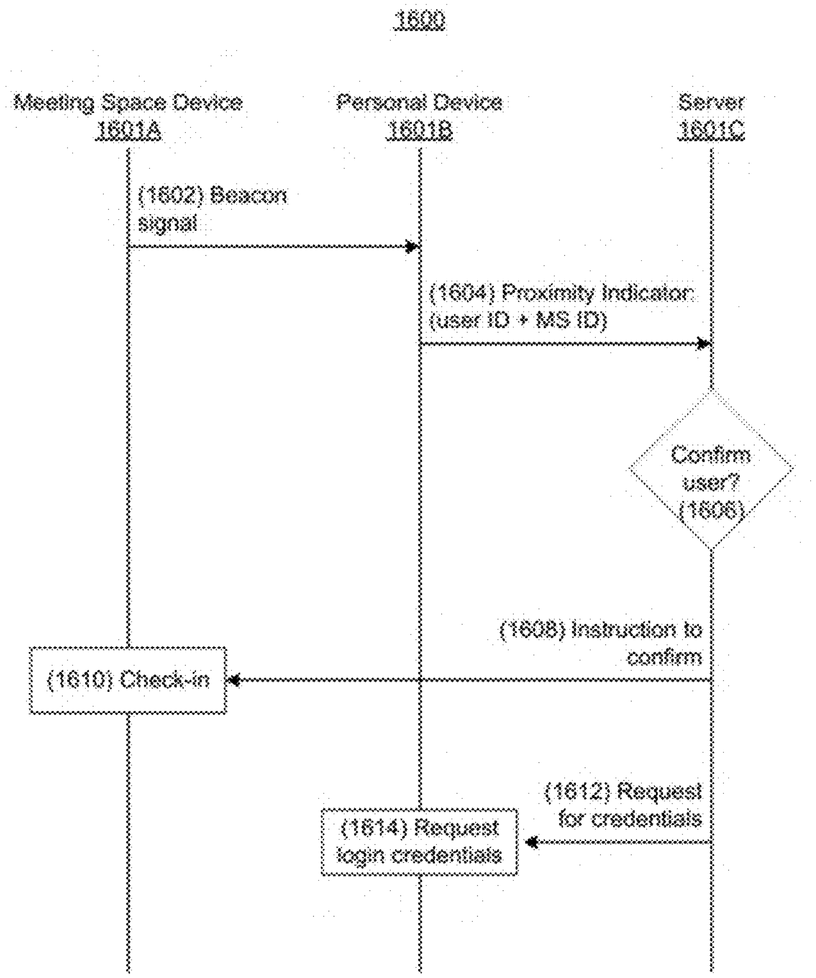
FIGS. 16A-16C illustrate example flow diagrams for authenticating a user to confirm a reservation of a meeting space in accordance with some embodiments.

FIG. 16A illustrates a flow diagram of a method 1600 of authenticating a user to confirm a reservation of a meeting space in accordance with some embodiments. As shown in FIG. 16A, the method 1600 is associated with a particular meeting space (e.g., meeting space 1, building A as shown in FIGS. 5A-5B, which is sometimes referred to as the Ganymede meeting space). According to some embodiment, the method 1600 is performed at least in part by: a meeting space device 1601A (e.g., the first device 502-A-1 or the second device 504-A-1 associated with the meeting space); a personal device 1601B (e.g., a mobile device associated with a user such as a mobile phone, tablet, or laptop); and a server 1601C (e.g., the controller 510 in FIG. 5A).

In some embodiments, the meeting space device 1601A broadcasts (1602) a beacon signal that at least includes a meeting space (MS) identifier (ID) associated with meeting space or the meeting space device 1601A. For example, the MS ID is the name of the meeting space, a unique number associated with the meeting space, a unique number associated with the meeting space device 1601A, the MAC address of the meeting space device 1601A, or the like. According to some embodiments, a beacon application is executed on the meeting space device 1601A. In some embodiments, the beacon signal is broadcast via BLUETOOTH, a near-field communication (NFC) protocol, WLAN, or the like.

In some embodiments, the personal device 1601B obtains the beacon signal from the meeting space device 1601A, and transmits (1604) a proximity indicator to the server 1601C. According to some embodiments, the proximity indicator at least includes the MS ID and a user ID associated with the personal device 1601B or the user of the personal device 1601B. For example, the user ID is the name of the user associated with the personal device 1601B, a unique number associated with the personal device 1601B, the MAC address of the personal device 1601B, or the like.

According to some embodiments, a beacon discovery application is executed on the personal device 1601B. In some embodiments, the personal device 1601B transmits the proximity indicator when beacon discovery application is active. In some embodiments, the personal device 1601B transmits the proximity indicator when beacon discovery application is active and the personal device 1601B is unlocked. According to some embodiments, the personal device 1601B obtains the beacon signal from the meeting space device 1601A when the personal device 1601B within range of the meeting space device 1601A. In some embodiments, the proximity indicator is transmitted to the server 1601C via a WLAN, VLAN, LAN, or the like.

In some embodiments, after obtaining the proximity indicator, the server 1601C performs (1606) a confirmation process to determine whether to allow the user to confirm (e.g., claim or check-in to) the upcoming reservation of the meeting space. According to some embodiments, in response to obtaining the proximity indicator, the server 1601C obtains a reservation schedule for the meeting space based on the MS ID to identify candidate user IDs associated with the participants of the upcoming reservation of the meeting space. After identifying the candidate user IDs, the server 1601C confirms the user if the user ID associated with the proximity indicator matches one of the identified candidate user IDs.

According to some embodiments, in response to obtaining the proximity indicator, the server 1601C obtains a reservation schedule for the meeting space based on the MS ID to identify a candidate user ID associated with the organizer of the upcoming reservation of the meeting space. After identifying the candidate user ID associated with the organizer, the server 1601C confirms the user if the user ID associated with the proximity indicator matches the candidate user ID associated with the organizer of the upcoming reservation of the meeting space.

In some embodiments, if the user is confirmed, the server 1601C transmits (1608) an instruction to the meeting space device 1601A to confirm the upcoming reservation. According to some embodiments, in response to obtaining the instruction, the meeting space device 1601A passively claims or checks-in to (1610) the upcoming reservation. For example, in response to obtaining the instruction, the meeting space device 1601A checks-in the upcoming reservation without the user interacting with the claiming affordance and updates the status from "RESERVED" to "MEETING IN PROGRESS" if the meeting space is unoccupied or "MEETING STARTING SOON" if the meeting space is still occupied. In some embodiments, in response to obtaining the instruction, the meeting space device 1601A displays a meeting manifest interface (e.g., as shown in FIG. 7D or 19C).

In some embodiments, if the user is not confirmed, the server 1601C transmits (1612) a request to the personal device 1601B to obtain login credentials. According to some embodiments, in response to obtaining the request, the personal device 1601B presents (1614) a prompt (e.g., as shown in FIG. 7B) requesting that the user manually enter his/her login credentials (e.g., user name and password, or the like), which may be transmitted to the server 1601C to attempt to complete the confirmation process. In some embodiments, the login credential prompt is replaced or supplemented with a prompt for biometric information (e.g., a voice sample, retina scan, fingerprint scan, or the like).

Figure 16B:
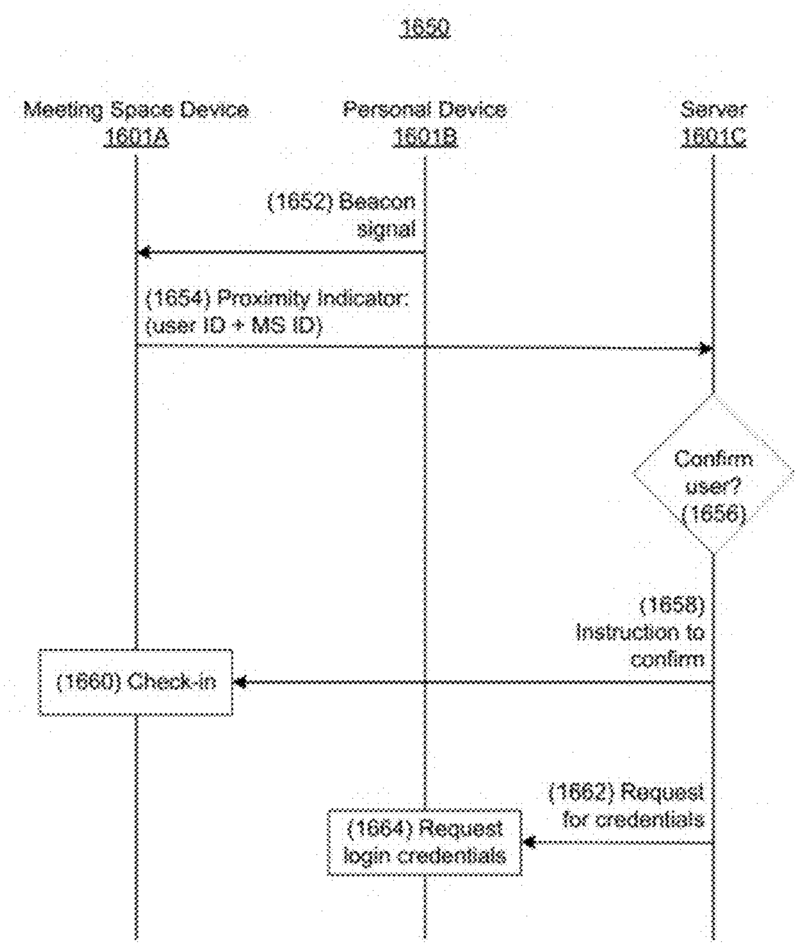

FIG. 16B illustrates a flow diagram of a method 1650 of authenticating a user to confirm a reservation of a meeting space in accordance with some embodiments. As shown in FIG. 16B, the method 1650 is associated with a particular meeting space (e.g., meeting space 1, building A as shown in FIGS. 5A-5B, which is sometimes referred to as the Ganymede meeting space). According to some embodiment, the method 1650 is performed at least in part by: a meeting space device 1601A (e.g., the first device 502-A-1 or the second device 504-A-1 associated with the meeting space); a personal device 1601B (e.g., a mobile device associated with a user such as a mobile phone, tablet, or laptop); and a server 1601C (e.g., the controller 510 in FIG. 5A).

In some embodiments, the personal device 1601B broadcasts (1652) a beacon signal that at least includes a user identifier (ID) associated with the personal device 1601B or the user of the personal device 1601B. For example, the user ID is the name of the user associated with the personal device 1601B, a unique number associated with the personal device 1601B, the MAC address of the personal device 1601B, or the like. According to some embodiments, a beacon application is executed on the personal device 1601B. In some embodiments, the beacon signal is broadcast via BLUETOOTH, a near-field communication (NFC) protocol, WLAN, or the like.

In some embodiments, the meeting space device 1601A obtains the beacon signal from the personal device 1601B, and transmits (1654) a proximity indicator to the server 1601C. According to some embodiments, the proximity indicator at least includes the user ID and a meeting space (MS) ID associated with meeting space or the meeting space device 1601A. For example, the MS ID is the name of the meeting space, a unique number associated with the meeting space, a unique number associated with the meeting space device 1601A, the MAC address of the meeting space device 1601A, or the like. According to some embodiments, a beacon discovery application is executed on the meeting space device 1601A. According to some embodiments, the meeting space device 1601A obtains the beacon signal from the personal device 1601B when within range of the personal device 1601B. In some embodiments, the proximity indicator is transmitted to the server 1601C via a WLAN, VLAN, LAN, or the like.

According to some embodiments, step 1656 is similar to and adapted step 1606 described above with respect to FIG. 16A. As such, step 1656 will not be described again for the sake of brevity. According to some embodiments, steps 1658 and 1660 are similar to and adapted steps 1608 and 1610 described above with respect to FIG. 16A, respectively. As such, steps 1658 and 1660 will not be described again for the sake of brevity. According to some embodiments, steps 1662 and 1664 are similar to and adapted steps 1612 and 1614 described above with respect to FIG. 16A, respectively. As such, steps 1662 and 1664 will not be described again for the sake of brevity.

Figure 16C:
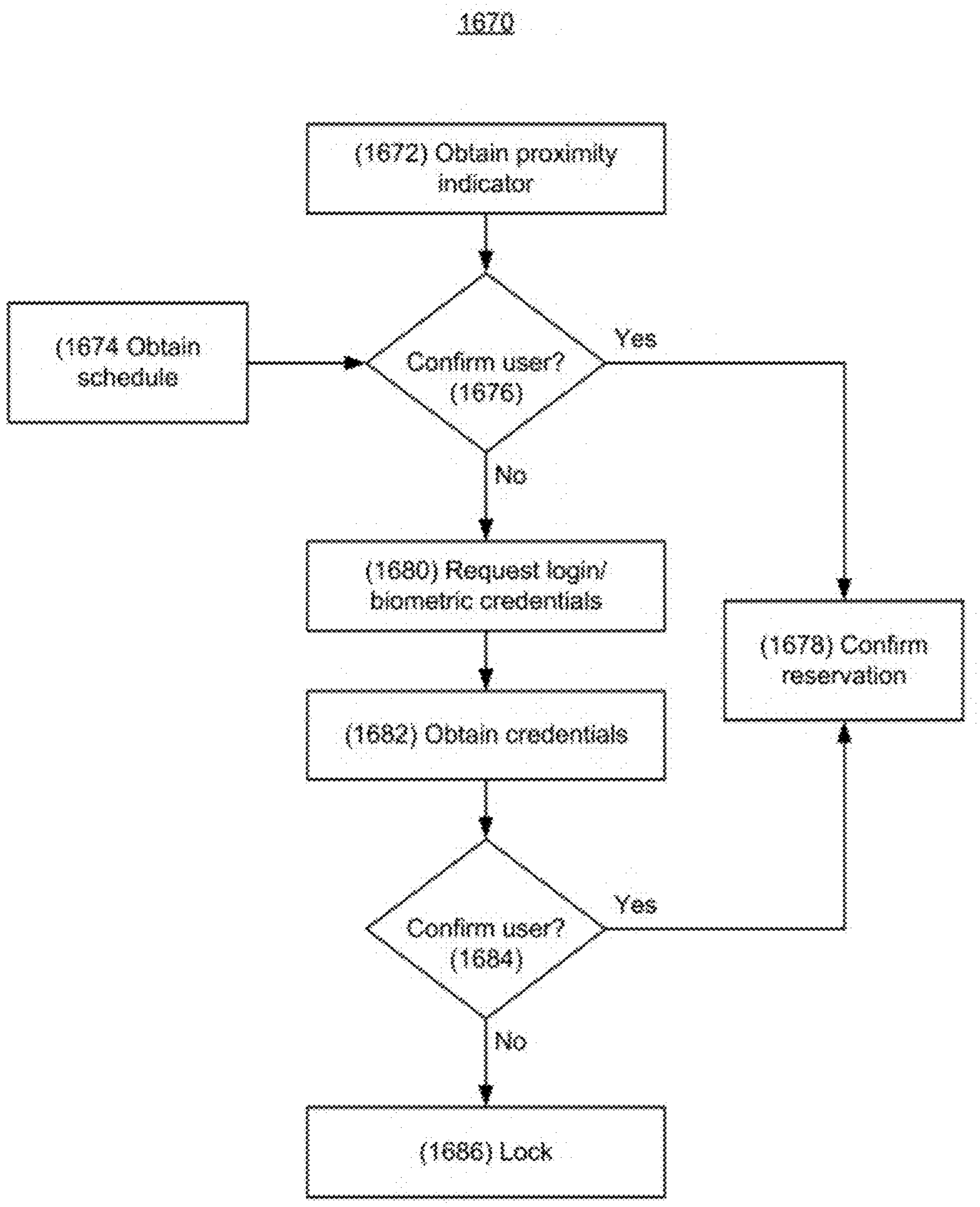

FIG. 16C illustrates a flow diagram of a method 1670 of authenticating a user to confirm a reservation of a meeting space in accordance with some embodiments. As shown in FIG. 16C, the method 1670 is associated with a particular meeting space (e.g., meeting space 1, building A as shown in FIGS. 5A-5B, which is sometimes referred to as the Ganymede meeting space). According to some embodiment, the method 1670 is performed by a meeting space device with a display and one or more input devices (e.g., the first device 502-A-1 or the second device 504-A-1 associated with the meeting space.

At block 1672, the meeting space device obtains a proximity indicator from a personal device. For example, as described above in step 1652 with respect to FIG. 16B, the personal device broadcasts a beacon signal that at least includes a user identifier (ID) associated with the personal device or the user of the personal device. For example, the user ID is the name of the user associated with the personal device, a unique number associated with the personal device, the MAC address of the personal device, or the like.

At block 1674, the meeting space device obtains a reservation schedule associated with the meeting space to which the meeting space device is associated. In some embodiments, the meeting space device corresponds to a meeting space (MS) ID. For example, the MS ID is the name of the meeting space, a unique number associated with the meeting space, a unique number associated with the meeting space device, the MAC address of the meeting space device, or the like. In some embodiments, the meeting space device is communicatively coupled with a schedule database (e.g., the scheduling database 525 in FIG. 5A), and the meeting space device obtains the reservation schedule for the meeting space based on its MS ID.

At block 1676, after obtaining the proximity indicator and the reservation schedule, the meeting space device performs a confirmation process to determine whether to allow the user to confirm (e.g., claim or check-in to) the upcoming reservation of the meeting space. According to some embodiments, the meeting space device identifies candidate user IDs associated with the participants of the upcoming reservation of the meeting space based on the reservation schedule. After identifying the candidate user IDs, the meeting space device confirms the user if the user ID associated with the proximity indicator matches one of the identified candidate user IDs.

According to some embodiments, the meeting space device identifies a candidate user ID associated with the organizer of the upcoming reservation of the meeting space based on the reservation schedule. After identifying the candidate user ID associated with the organizer, the meeting space device confirms the user if the user ID associated with the proximity indicator matches the candidate user ID associated with the organizer of the upcoming reservation of the meeting space.

If the user is confirmed, the method 1670 continues to block 1678. If the user is not confirmed, the method 1670 continues to block 1680.

At block 1678, the meeting space device to confirms the upcoming reservation. According to some embodiments, the meeting space device passively claims or checks-in to the upcoming reservation. For example, the meeting space device checks-in the upcoming reservation without the user interacting with the claiming affordance and updates the status from "RESERVED" to "MEETING IN PROGRESS" if the meeting space is unoccupied or "MEETING STARTING SOON" if the meeting space is still occupied. In some embodiments, in the meeting space device also displays a meeting manifest interface (e.g., as shown in FIG. 7D or 19C).

At block 1680, the meeting space device transmits a request to the personal device 1601B to obtain login/biometric credentials. For example, the personal device presents a prompt (e.g., as shown in FIG. 7B) requesting that the user manually enter his/her login credentials (e.g., user name and password, or the like). In some embodiments, the login credential prompt is replaced or supplemented with a prompt for biometric information (e.g., a voice sample, retina scan, fingerprint scan, or the like).

At block 1682, the meeting space device obtains the requested login/biometric credentials from the personal device. At block 1684, after obtaining the login/biometric credentials, the meeting space device performs a confirmation process to determine whether to allow the user to confirm (e.g., claim or check-in to) the upcoming reservation of the meeting space. According to some embodiments, the meeting space device identifies candidate user IDs associated with the participants of the upcoming reservation of the meeting space based on the reservation schedule. After identifying the candidate user IDs, the meeting space device confirms the user if the login/biometric credentials match login credentials for one of the identified candidate user IDs based on a personnel directory. In some embodiments, the meeting space device is communicatively coupled with a personnel directory that includes a plurality of users (e.g., employees on a corporate campus) and their corresponding login/biometric credentials.

According to some embodiments, the meeting space device identifies a candidate user ID associated with the organizer of the upcoming reservation of the meeting space based on the reservation schedule. After identifying the candidate user ID associated with the organizer, the meeting space device confirms the user if the login/biometric credentials match login credentials for the candidate user ID associated with the organizer of the upcoming reservation of the meeting space based on a personnel directory.

If the user is confirmed, the method 1670 continues to block 1678. If the user is not confirmed, the method 1670 continues to block 1686. At block 1686, the meeting space device disables the ability to check-in to the upcoming reservation for a predefined time period or locks itself for the predefined time period.

Figure 17A:
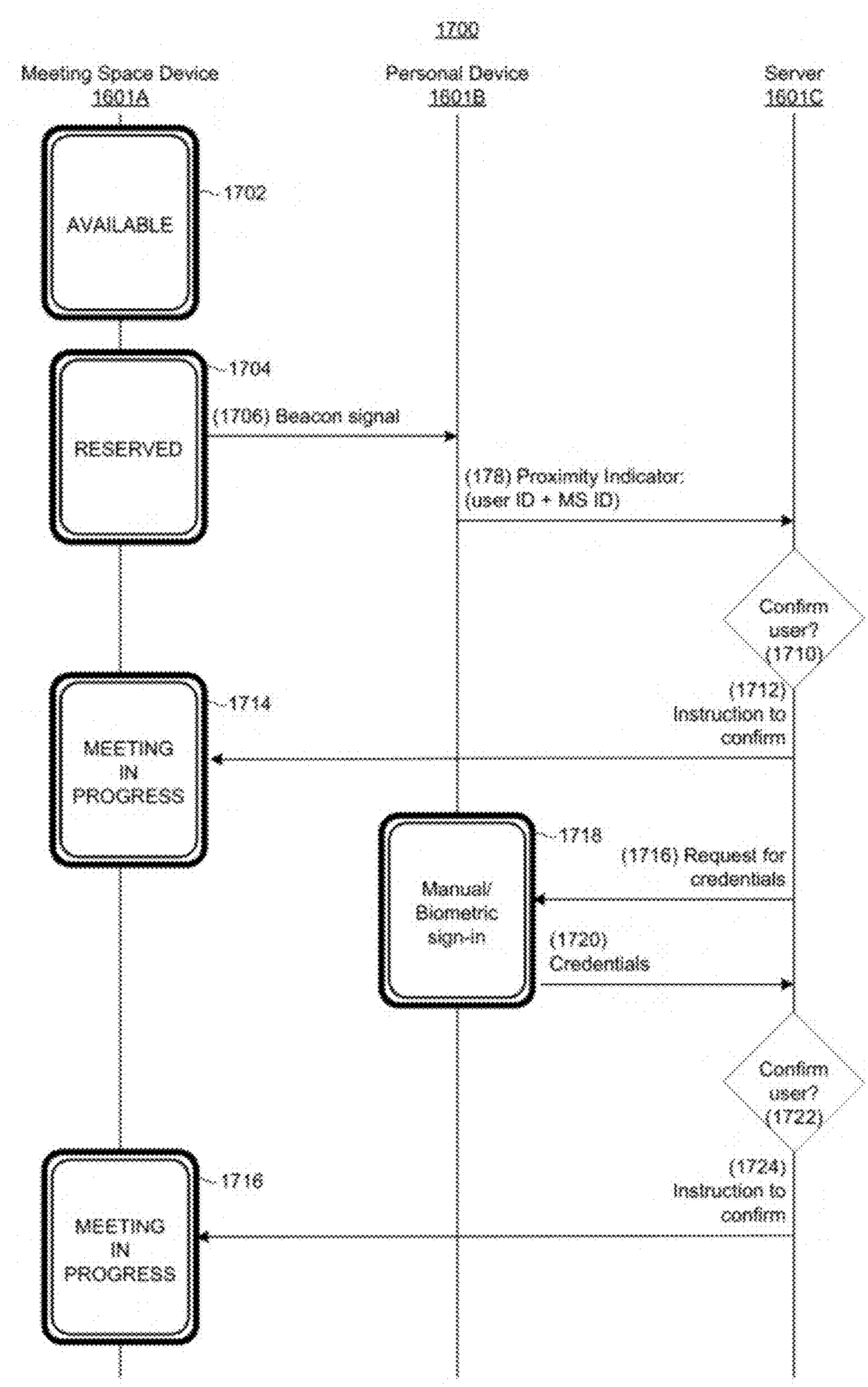
FIGS. 17A-17D illustrate example flow diagrams for authenticating a user to confirm a reservation of a meeting space in accordance with some embodiments.

FIG. 17A illustrates a flow diagram of a method 1700 of authenticating a user to confirm a reservation of a meeting space in accordance with some embodiments. As shown in FIG. 17A, the method 1700 is associated with a particular meeting space (e.g., meeting space 1, building A as shown in FIGS. 5A-5B, which is sometimes referred to as the Ganymede meeting space). According to some embodiment, the method 1700 is performed at least in part by: a meeting space device 1601A (e.g., the first device 502-A-1 or the second device 504-A-1 associated with the meeting space); a personal device 1601B (e.g., a mobile device associated with a user such as a mobile phone, tablet, or laptop); and a server 1601C (e.g., the controller 510 in FIG. 5A).

According to some embodiments, the meeting space device 1601A status corresponds (1702) to the "AVAILABLE" state. For example, the meeting space is unoccupied, and a claiming affordance for taking over the meeting space is enabled. As one example, see FIG. 15A.

According to some embodiments, the meeting space device 1601A status changes (1704) from "AVAILABLE" to "RESERVED." According to some embodiments, the status changes from "AVAILABLE" to "RESERVED" when the current corresponds to early check-in threshold for an upcoming reservation of the meeting space. For example, the meeting space remains unoccupied, and a claiming affordance for claiming the upcoming reservation is enabled. As one example, see FIG. 15B.

In some embodiments, while the meeting space device 1601A status corresponds to the "RESERVED" state, the meeting space device 1601A broadcasts (1706) a beacon signal that at least includes a meeting space (MS) identifier (ID) associated with meeting space or the meeting space device 1601A. For example, the MS ID is the name of the meeting space, a unique number associated with the meeting space, a unique number associated with the meeting space device 1601A, the MAC address of the meeting space device 1601A, or the like. According to some embodiments, a beacon application is executed on the meeting space device 1601A. In some embodiments, the beacon signal is broadcast via BLUETOOTH, a near-field communication (NFC) protocol, WLAN, or the like. One of ordinary skill in the art will appreciate from the description of FIG. 16B that, in some embodiments, the personal device 1601B broadcasts the beacon signal with the user ID, which is obtained by the meeting space device 1601A.

In some embodiments, the personal device 1601B obtains the beacon signal from the meeting space device 1601A, and transmits (1708) a proximity indicator to the server 1601C. According to some embodiments, the proximity indicator at least includes the MS ID and a user ID associated with the personal device 1601B or the user of the personal device 1601B. For example, the user ID is the name of the user associated with the personal device 1601B, a unique number associated with the personal device 1601B, the MAC address of the personal device 1601B, or the like. According to some embodiments, a beacon discovery application is executed on the personal device 1601B. According to some embodiments, the personal device 1601B obtains the beacon signal from the meeting space device 1601A when within range of the meeting space device 1601A. In some embodiments, the proximity indicator is transmitted to the server 1601C via a WLAN, VLAN, LAN, or the like.

In some embodiments, after obtaining the proximity indicator, the server 1601C performs (1710) a confirmation process to determine whether to allow the user to confirm (e.g., claim or check-in to) the upcoming reservation of the meeting space. According to some embodiments, in response to obtaining the proximity indicator, the server 1601C obtains a reservation schedule for the meeting space based on the MS ID to identify candidate user IDs associated with the participants of the upcoming reservation of the meeting space. After identifying the candidate user IDs, the server 1601C confirms the user if the user ID associated with the proximity indicator matches one of the identified candidate user IDs.

According to some embodiments, in response to obtaining the proximity indicator, the server 1601C obtains a reservation schedule for the meeting space based on the MS ID to identify a candidate user ID associated with the organizer of the upcoming reservation of the meeting space. After identifying the candidate user ID associated with the organizer, the server 1601C confirms the user if the user ID associated with the proximity indicator matches the candidate user ID associated with the organizer of the upcoming reservation of the meeting space.

In some embodiments, if the user is confirmed, the server 1601C transmits (1712) an instruction to the meeting space device 1601A to confirm the upcoming reservation. According to some embodiments, in response to obtaining the instruction, the meeting space device 1601A changes (1714) the status from "RESERVED" to "MEETING IN PROGRESS." In this example, the confirmation process allows the user to passively claim or check-in to the upcoming reservation.

In some embodiments, if the user is not confirmed, the server 1601C transmits (1716) a request to the personal device 1601B to obtain login credentials. According to some embodiments, in response to obtaining the request, the personal device 1601B presents (1718) a prompt requesting that the user manually enter his/her login credentials (e.g., user name and password, or the like). In some embodiments, the login credential prompt is replaced or supplemented with a prompt for biometric information (e.g., a voice sample, retina scan, fingerprint scan, or the like). According to some embodiments, after obtaining the login credentials, the personal device 1601B transmits (1720) the login credentials to the server 1601C.

In some embodiments, after obtaining the login credentials, the server 1601C performs (1722) a confirmation process to determine whether to allow the user to confirm (e.g., claim or check-in to) the upcoming reservation of the meeting space. According to some embodiments, in response to obtaining the login credentials, the server 1601C obtains a reservation schedule for the meeting space based on the MS ID (e.g., obtained previously from the proximity indicator) to identify candidate user IDs associated with the participants of the upcoming reservation of the meeting space. According to some embodiments, in response to obtaining the login credentials, the server 1601C identifies a user ID in a personnel directory that matches the login credentials. After identifying the candidate user IDs and the user ID, the server 1601C confirms the user if the identified user ID matches one of the identified candidate user IDs. In some embodiments, the server 1601C is communicatively coupled with a personnel directory that includes a plurality of users (e.g., employees on a corporate campus) and their corresponding login/biometric credentials.

According to some embodiments, in response to obtaining the login credentials, the server 1601C obtains a reservation schedule for the meeting space based on the MS ID (e.g., obtained previously from the proximity indicator) to identify a candidate user ID associated with the organizer of the upcoming reservation of the meeting space. According to some embodiments, in response to obtaining the login credentials, the server 1601C identifies a user ID in a personnel directory that matches the login credentials. After identifying the candidate user ID associated with the organizer and the user ID, the server 1601C confirms the user if the identified user ID matches the candidate user ID associated with the organizer of the upcoming reservation of the meeting space.

In some embodiments, if the user is confirmed, the server 1601C transmits (1724) an instruction to the meeting space device 1601A to confirm the upcoming reservation. According to some embodiments, in response to obtaining the instruction, the meeting space device 1601A changes (826) the status from "RESERVED" to "MEETING IN PROGRESS." In this example, the confirmation process allows the user to passively claim or check-in to the upcoming reservation.

Figure 17B:
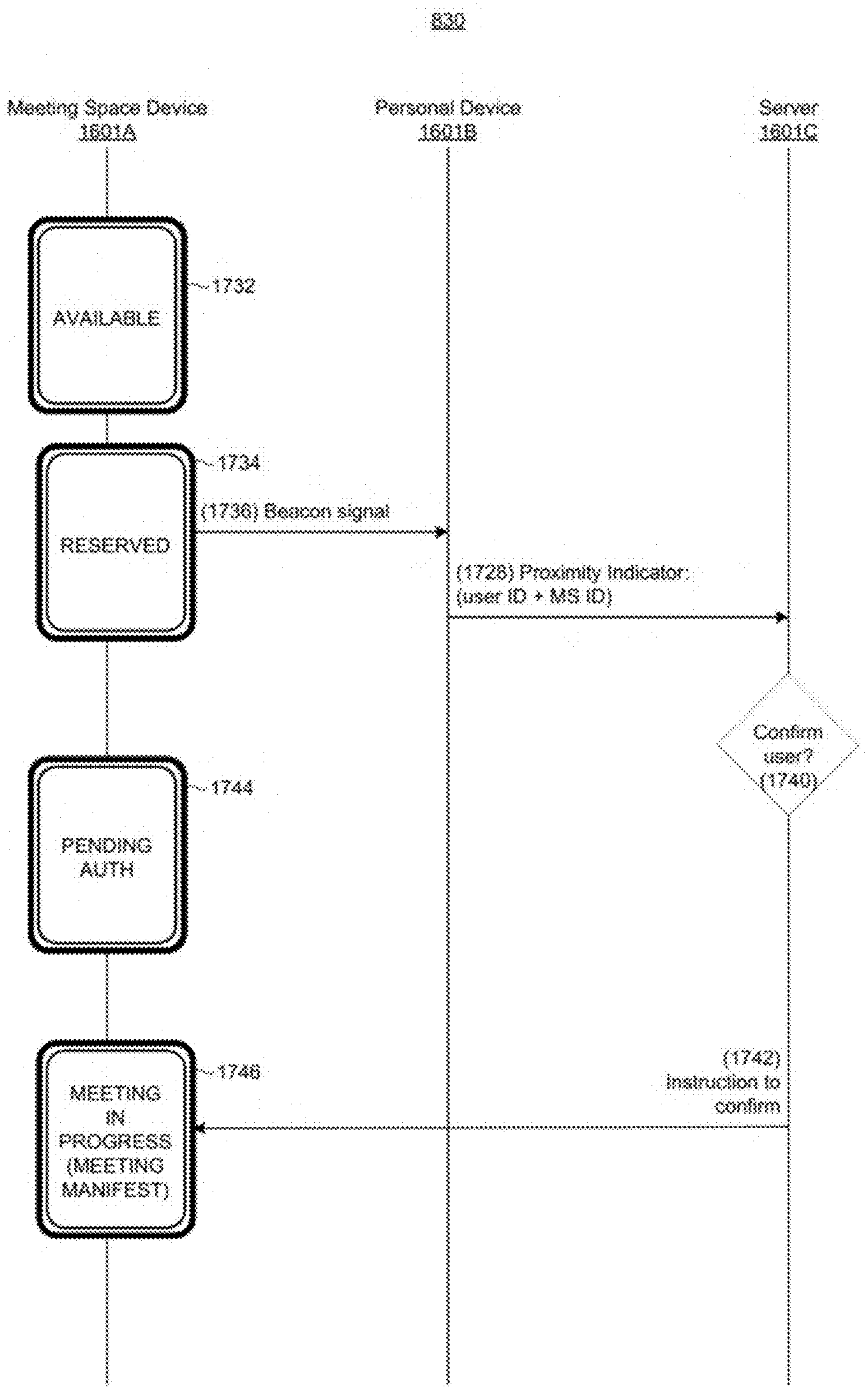

FIG. 17B illustrates a flow diagram of a method 1730 of authenticating a user to confirm a reservation of a meeting space in accordance with some embodiments. As shown in FIG. 17B, the method 1730 is associated with a particular meeting space (e.g., meeting space 1, building A as shown in FIGS. 5A-5B, which is sometimes referred to as the Ganymede meeting space). According to some embodiment, the method 1730 is performed at least in part by: a meeting space device 1601A (e.g., the first device 502-A-1 or the second device 504-A-1 associated with the meeting space); a personal device 1601B (e.g., a mobile device associated with a user such as a mobile phone, tablet, or laptop); and a server 1601C (e.g., the controller 510 in FIG. 5A).

The method 1730 is similar to and adapted from the method 1700. As such, the method 1700 in FIG. 17A and method 1730 in FIG. 17B include similar steps labeled with the same reference number, which both have the same function. Only the differences are described herein for the sake of brevity.

According to some embodiments, the meeting space device 1601A status changes (1734) from "RESERVED" to "PENDING AUTH." According to some embodiments, the status changes from "RESERVED" to "PENDING AUTH" when the user interacts with the meeting space device 1601A by selecting the claiming affordance to claim or check-in to the upcoming reservation.

According to some embodiments, if the user is confirmed and in response to detecting selection of the claiming affordance, the meeting space device 1601A changes (1714) the status from "RESERVED" to "MEETING IN PROGRESS." In this example, the meeting space device 1601A also displays a meeting manifest with details associated with the reservation such as meeting details, a list of participants, attachments, and/or the like. As one example, see the meeting manifest interface 1858 in FIG. 18D.

Figure 17C:
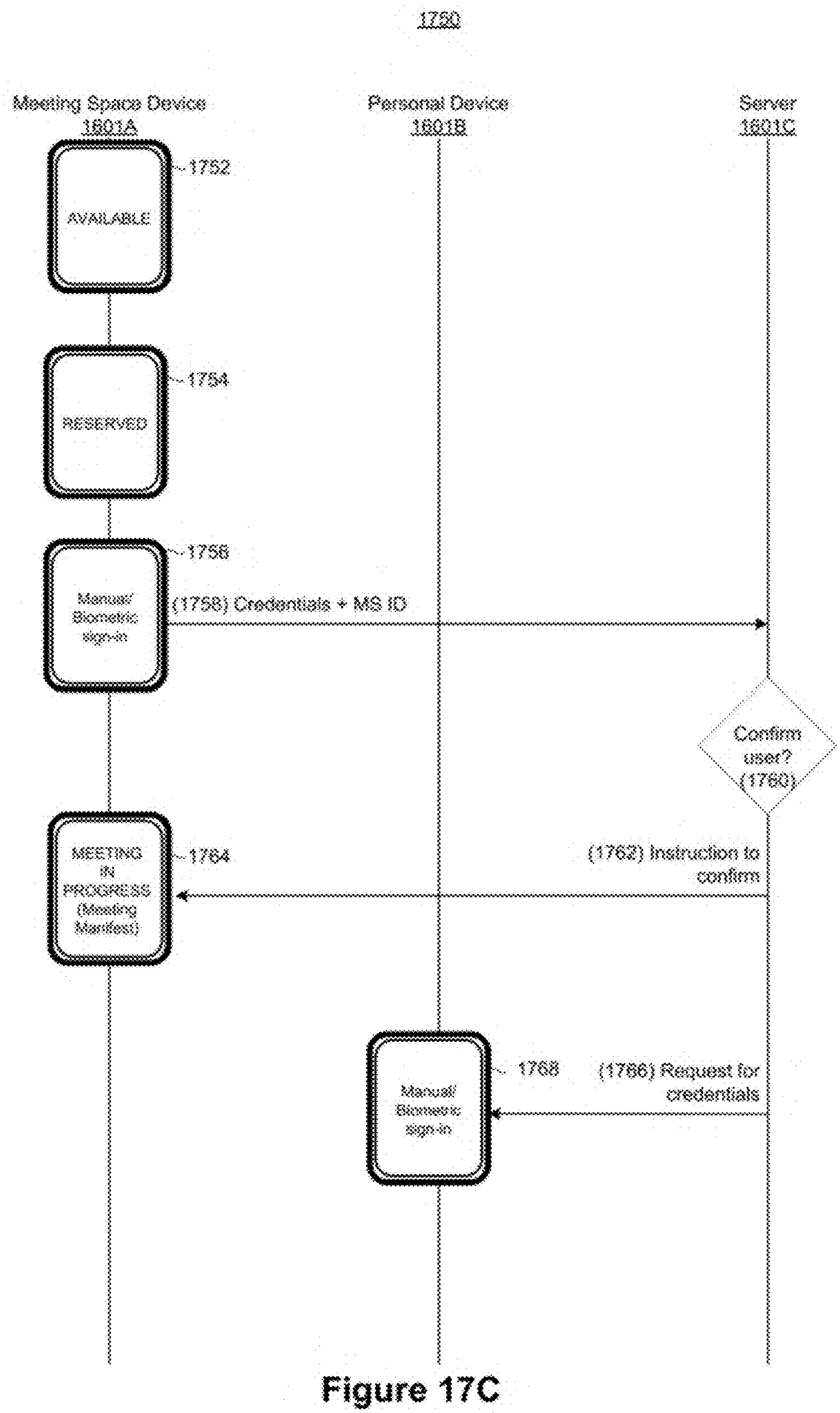

FIG. 17C illustrates a flow diagram of a method 1750 of authenticating a user to confirm a reservation of a meeting space in accordance with some embodiments. As shown in FIG. 17C, the method 1750 is associated with a particular meeting space (e.g., meeting space 1, building A as shown in FIGS. 5A-5B, which is sometimes referred to as the Ganymede meeting space). According to some embodiment, the method 1750 is performed at least in part by: a meeting space device 1601A (e.g., the first device 502-A-1 or the second device 504-A-1 associated with the meeting space); a personal device 1601B (e.g., a mobile device associated with a user such as a mobile phone, tablet, or laptop); and a server 1601C (e.g., the controller 510 in FIG. 5A).

According to some embodiments, the meeting space device 1601A status corresponds (1752) to the "AVAILABLE" state. For example, the meeting space is unoccupied, and a claiming affordance for taking over the meeting space is enabled. As one example, see FIG. 15A.

According to some embodiments, the meeting space device 1601A status changes (1754) from "AVAILABLE" to "RESERVED." According to some embodiments, the status changes from "AVAILABLE" to "RESERVED" when the current corresponds to early check-in threshold for an upcoming reservation of the meeting space. For example, the meeting space remains unoccupied, and a claiming affordance for claiming the upcoming reservation is enabled. As one example, see FIG. 15B.

For example, the user interacts with the meeting space device 1601A by selecting the claiming affordance to claim or check-in to the upcoming reservation. According to some embodiments, the meeting space device 1601A displays (1756) a prompt requesting that the user manually enter his/her login credentials in response to selection of the claiming affordance. In some embodiments, the login credential prompt is replaced or supplemented with a prompt for biometric information (e.g., a voice sample, retina scan, fingerprint scan, or the like). According to some embodiments, after obtaining the login credentials, the personal device 1601B transmits (1758) the login credentials to the server 1601C along with a meeting space (MS) ID associated with meeting space or the meeting space device 1601A.

In this example, according to some embodiments, the meeting space device 1601A and/or the personal device 1601B is not running the beacon application. In this example, according to some embodiments, the beacon application run by the meeting space device 1601A and/or the personal device 1601B is not functioning properly.

In some embodiments, after obtaining the login credentials and the MS ID, the server 1601C performs (1760) a confirmation process to determine whether to allow the user to confirm (e.g., claim or check-in to) the upcoming reservation of the meeting space. According to some embodiments, in response to obtaining the MS ID, the server 1601C obtains a reservation schedule for the meeting space based on the MS ID to identify candidate user IDs associated with the participants of the upcoming reservation of the meeting space. According to some embodiments, in response to obtaining the login credentials, the server 1601C identifies a user ID in a personnel directory that matches the login credentials. After identifying the candidate user IDs and the user ID, the server 1601C confirms the user if the identified user ID matches one of the identified candidate user IDs. confirms the user if the identified user ID matches one of the identified candidate user IDs. In some embodiments, the server 1601C is communicatively coupled with a personnel directory that includes a plurality of users (e.g., employees on a corporate campus) and their corresponding login/biometric credentials.

According to some embodiments, in response to obtaining the login credentials, the server 1601C obtains a reservation schedule for the meeting space based on the MS ID (e.g., obtained previously from the proximity indicator) to identify a candidate user ID associated with the organizer of the upcoming reservation of the meeting space. According to some embodiments, in response to obtaining the login credentials, the server 1601C identifies a user ID in a personnel directory that matches the login credentials. After identifying the candidate user ID associated with the organizer and the user ID, the server 1601C confirms the user if the identified user ID matches the candidate user ID associated with the organizer of the upcoming reservation of the meeting space.

In some embodiments, if the user is confirmed, the server 1601C transmits (1762) an instruction to the meeting space device 1601A to confirm the upcoming reservation. According to some embodiments, in response to obtaining the instruction, the meeting space device 1601A changes (1764) the status to "MEETING IN PROGRESS." In this example, the meeting space device 1601A also displays a meeting manifest with details associated with the reservation such as meeting details, a list of participants, attachments, and/or the like. As one example, see the meeting manifest interface 958 in FIG. 9D.

In some embodiments, if the user is not confirmed, the server 1601C transmits (1766) a request to the personal device 1601B to obtain login credentials. According to some embodiments, in response to obtaining the request non-acknowledgement, the personal device 1601B presents (1768) a prompt requesting that the user manually enter his/her login credentials, which may be transmitted to the server 1601C to attempt to complete the confirmation process. In some embodiments, the login credential prompt is replaced or supplemented with a prompt for biometric information (e.g., a voice sample, retina scan, fingerprint scan, or the like).

Figure 17D:
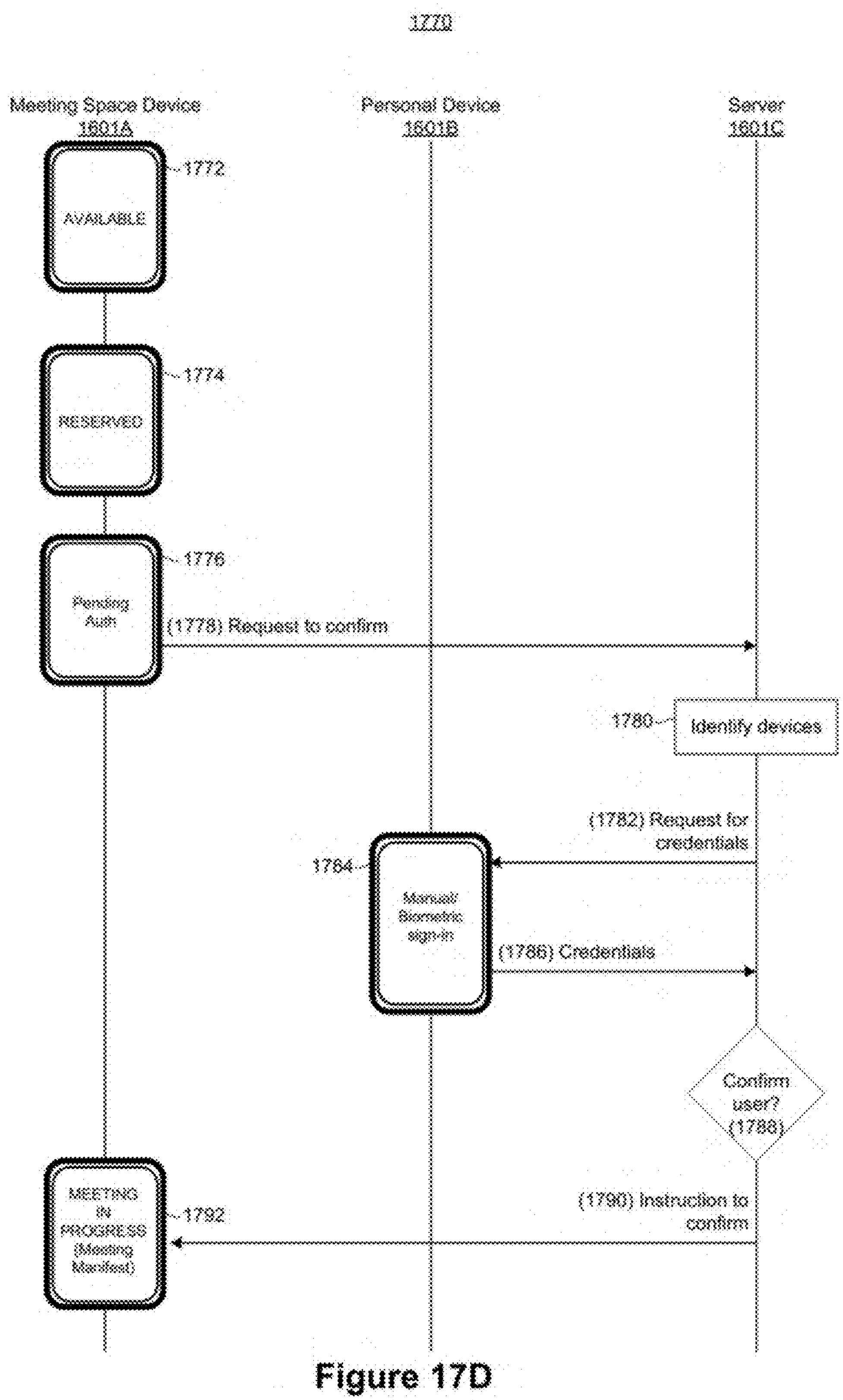

FIG. 17D illustrates a flow diagram of a method 1770 of authenticating a user to confirm a reservation of a meeting space in accordance with some embodiments. As shown in FIG. 17D, the method 1770 is associated with a particular meeting space (e.g., meeting space 1, building A as shown in FIGS. 5A-5B, which is sometimes referred to as the Ganymede meeting space). According to some embodiment, the method 1770 is performed at least in part by: a meeting space device 1601A (e.g., the first device 502-A-1 or the second device 504-A-1 associated with the meeting space); a personal device 1601B (e.g., a mobile device associated with a user such as a mobile phone, tablet, or laptop); and a server 1601C (e.g., the controller 510 in FIG. 5A).

According to some embodiments, the meeting space device 1601A status corresponds (1772) to the "AVAILABLE" state. For example, the meeting space is unoccupied, and a claiming affordance for taking over the meeting space is enabled. As one example, see FIG. 15A.

According to some embodiments, the meeting space device 1601A status changes (1774) from "AVAILABLE" to "RESERVED." According to some embodiments, the status changes from "AVAILABLE" to "RESERVED" when the current corresponds to early check-in threshold for an upcoming reservation of the meeting space. For example, the meeting space remains unoccupied, and a claiming affordance for claiming the upcoming reservation is enabled. As one example, see FIG. 15B.

According to some embodiments, the meeting space device 1601A status changes (1776) from "RESERVED" to "PENDING AUTH." According to some embodiments, the status changes from "RESERVED" to "PENDING AUTH" when the user interacts with the meeting space device 1601A by selecting the claiming affordance to claim or check-in to the upcoming reservation.

In some embodiments, in response to selection of the claiming affordance, the meeting space device 1601A transmits (1778) a request to the server 1601C to push manual login requests to devices associated with participants of the upcoming reservation. In some embodiments, the request includes a meeting space (MS) ID associated with meeting space or the meeting space device 1601A. In this example, according to some embodiments, the meeting space device 1601A and/or the personal device 1601B is not running the beacon application. In this example, according to some embodiments, the beacon application run by the meeting space device 1601A and/or the personal device 1601B is not functioning properly.

In some embodiments, in response to obtaining the request, the server 1601C identifies (1780) one or more devices based on the MS ID. For example, the server 1601C identifies one or more devices connected to an access point associated with the meeting space based on the MS ID. In another example, the server 1601C identifies one or more devices associated with the participants of the upcoming reservation in the meeting space based on the MS ID. In some embodiments, the server 1601C transmits (1782) requests to the one or more identified devices to obtain login credentials (e.g., including the personal device 1601B).

According to some embodiments, in response to obtaining the manual login request, the personal device 1601B presents (1784) a prompt requesting that the user manually enter his/her login credentials. In some embodiments, the login credential prompt is replaced or supplemented with a prompt for biometric information (e.g., a voice sample, retina scan, fingerprint scan, or the like). According to some embodiments, after obtaining the login credentials, the personal device 1601B transmits (1786) the login credentials to the server 1601C.

In some embodiments, after obtaining the login credentials, the server 1601C performs (1788) a confirmation process to determine whether to allow the user to confirm (e.g., claim or check-in to) the upcoming reservation of the meeting space. According to some embodiments, in response to obtaining the login credentials, the server 1601C obtains a reservation schedule for the meeting space based on the MS ID (e.g., obtained previously) to identify candidate user IDs associated with the participants of the upcoming reservation of the meeting space. According to some embodiments, in response to obtaining the login credentials, the server 1601C identifies a user ID in a personnel directory that matches the login credentials. After identifying the candidate user IDs and the user ID, the server 1601C confirms the user if the identified user ID matches one of the identified candidate user IDs. confirms the user if the identified user ID matches one of the identified candidate user IDs. In some embodiments, the server 1601C is communicatively coupled with a personnel directory that includes a plurality of users (e.g., employees on a corporate campus) and their corresponding login/biometric credentials.

According to some embodiments, in response to obtaining the login credentials, the server 1601C obtains a reservation schedule for the meeting space based on the MS ID (e.g., obtained previously) to identify a candidate user ID associated with the organizer of the upcoming reservation of the meeting space. According to some embodiments, in response to obtaining the login credentials, the server 1601C identifies a user ID in a personnel directory that matches the login credentials. After identifying the candidate user ID associated with the organizer and the user ID, the server 1601C confirms the user if the identified user ID matches the candidate user ID associated with the organizer of the upcoming reservation of the meeting space.

In some embodiments, if the user is confirmed, the server 1601C transmits (1790) an instruction to the meeting space device 1601A to confirm the upcoming reservation. According to some embodiments, in response to obtaining the instruction, the meeting space device 1601A changes (1792) the status to "MEETING IN PROGRESS." In this example, the meeting space device 1601A also displays a meeting manifest with details associated with the reservation such as meeting details, a list of participants, attachments, and/or the like. As one example, see the meeting manifest interface 1858 in FIG. 18D.

FIGS. 18A-18S illustrate example user interfaces for managing media input/output (I/O) for a meeting space in accordance with some embodiments. The user interfaces in these figures are used to illustrate the processes described below, including the processes in FIGS. 22A-22C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

In some embodiments, the first device is located outside of the meeting space (e.g., the first device 502-A-1 in FIGS. 5A-5B). For example, the first device is associated with the meeting space such as being fixed to a wall outside of the meeting space. In some embodiments, the first device is associable with the meeting space. For example, the first device is a personal device associated with a user such as a phone, tablet, laptop, or the like. In this example, when the user walks into the meeting space with the first device, the location of the device is associated with the meeting space and meeting space functionality for the particular meeting space is enabled on the first device. In some embodiments, a second device inside of the meeting space (e.g., the second device 504-A-1 in FIGS. 5A-5B) is synchronized with the first device. For example, the second device is associated with the meeting space such as being fixed to a wall inside of the meeting space, fixed to furniture or equipment within the meeting space, or portably located within the meeting space.

FIG. 18A shows the second device 504-A-1 displaying a meeting status interface 1818 (e.g., the interior device associated with meeting space 1, building A in FIGS. 5A-5B). As shown in FIG. 18A, the meeting status interface 1818 includes a meeting space affordance 1806, which indicates that the second device 504-A-1 corresponds to the Ganymede meeting space. When activated (e.g., with a contact), the meeting space affordance 1806 causes a log for the Ganymede meeting space to be displayed. For example, the log indicates: previous or outstanding problems reported for the Ganymede meeting space; the cleaning record of the Ganymede meeting space; the last occupants of the Ganymede meeting space; and/or the like. For example, see 6P-6Q, and the description thereof.

As shown in FIG. 18A, the meeting status interface 1818 further includes a calendar affordance 1810, which, when activated (e.g., with a contact), causes a reservation schedule associated with the Ganymede meeting space. For example, see 6B-6C, and the description thereof. As shown in FIG. 18A, the meeting status interface 1818 further includes a "Room Help" affordance 1816, which, when activated (e.g., with a contact), causes a problem reporting interface to replace the meeting status interface 1818. For example, see 6J-6P, and the description thereof.

As shown in FIG. 18A, the meeting status interface 1818 further includes: the current time (e.g., 9:58); a status indicator 1812 indicating a current availability or reservation status of the Ganymede meeting space; and a claiming affordance 1814, which, when activated (e.g., with a left-to-right swipe gesture or a predefined gesture such as a one finger tap gesture), causes the status indicator 1812 to change (e.g., from "RESERVED" to "MEETING IN PROGRESS," or from "AVAILABLE" to "MEETING IN PROGRESS").

As shown in FIG. 18A, the status indicator 1812 indicates that the Ganymede meeting space is "RESERVED" for A. Broccoli and that A. Broccoli has until 10:07 to check-in. In FIG. 18A, the claiming affordance 1814 also prompts the user to "slide to check-in." According to some embodiments, the status indicator 1812 indicates "RESERVED" between an early check-in threshold and a check-in deadline (e.g., 7 minutes after the start time of the upcoming reservation). As such, in some embodiments, the status indicator 1812 indicates "RESERVED" when the current time (e.g., 9:58) is between the early check-in threshold and the check-in deadline. Furthermore, in some embodiments, the claiming affordance 1814 is enabled to check-in to an upcoming reservation while the meeting space is available and the current time is between the early check-in threshold and the check-in deadline. For example, also see FIGS. 6D and 6F, and the description thereof.

FIG. 18A also illustrates detecting a left-to-right swipe gesture with contact 1820 over the claiming affordance 1814. According to some embodiments, in response to detecting the swipe gesture in FIG. 18A, the second device 504-A-1 displays a login interface prompting the user to manually enter his/her login credentials. In some embodiments, the login interface is replaced or supplemented with a prompt for biometric information (e.g., a voice sample, retina scan, fingerprint scan, or the like). Continuing with this example, the second device 504-A-1 enters an authenticated usage mode (e.g., the interfaces 1832, 1846, and 1858 in FIGS. 18B-18D, respectively) when the login credentials and/or biometric information matches user information associated with an organizer or participant of the upcoming reservation. In this example, the second device 504-A-1 enters an un-authenticated usage mode (e.g., the interfaces 1830, 1844, and 1856 in FIGS. 18B-18D, respectively) when the login credentials and/or biometric information do not match user information associated with an organizer or participant of the upcoming reservation.

In another example, in response to detecting the swipe gesture in FIG. 18A, the second device 504-A-1, the second device 504-A-1 enters an authenticated usage mode (e.g., the interfaces 1832, 1846, and 1858 in FIGS. 18B-18D, respectively) when the proximity indicator transmitted by a mobile device associated with user that interacted with the claiming affordance 1814 or another mobile device within range of the meeting space corresponds to an organizer or one of the participants of the upcoming reservation (e.g., as described with reference to FIGS. 16A and 17B). In this example, the second device 504-A-1 enters an un-authenticated usage mode (e.g., the interfaces 1830, 1844, and 1856 in FIGS. 18B-18D, respectively) when the proximity indicator transmitted by the mobile device associated with user that interacted with the claiming affordance 1814 or another mobile device within range of the meeting space does not correspond to the organizer or one of the participants of the upcoming reservation.

Figure 18B:
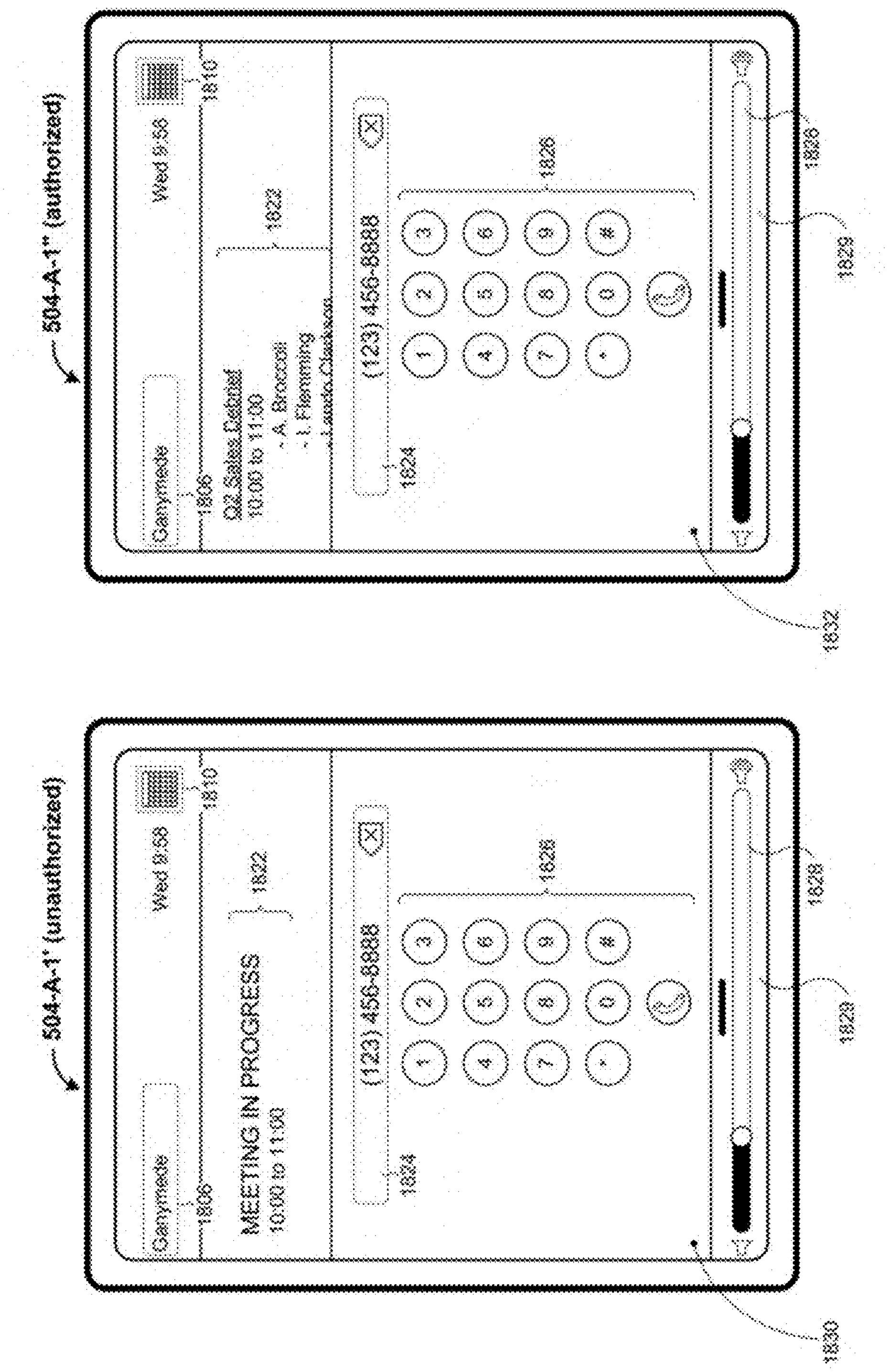

FIGS. 18B-18E show user interfaces displayed by the second device 504-A-1 in unauthorized and authorized modes. FIG. 18B illustrates unauthorized second device 504-A-1' displaying an unauthorized conference instantiation interface 1830. As shown in FIG. 18B, the unauthorized conference instantiation 1830 includes meeting information 1822 with the reservation status (e.g., "MEETING IN PROGRESS") and the reservation length (e.g., 10:00 to 11:00). As shown in FIG. 18B, the unauthorized conference instantiation interface 1830 also includes a dial pad 1826 and a dial entry field 1824 (e.g., the telephone number (123) 456-8888 entered by the user using the dial pad 1826). As shown in FIG. 18B, the unauthorized conference instantiation interface 1830 further includes a control panel 1829 with a volume control bar 1828 provided to control the audio output volume of the second device 504-A-1 and/or other speakers associated with the meeting space. According to some embodiments, a plurality of other controls associated with the control panel 1829 are accessible by performing an upward swipe gesture within the control panel 1829 (e.g., as shown in FIGS. 19C-19D).

FIG. 18B also illustrates authorized second device 504-A-1" displaying an authorized conference instantiation interface 1832. The authorized conference instantiation interface 1832 is similar to and adapted from the unauthorized conference instantiation interface 1830. As such, the unauthorized conference instantiation interface 1830 and the authorized conference instantiation interface 1832 include similar elements labeled with the same reference number, which both have the same function. Only the differences are described herein for the sake of brevity.

As shown in FIG. 18B, the authorized conference instantiation interface 1832 includes the meeting information 1822 with the meeting title (e.g., Q2 Sales Debrief), the reservation length (e.g., 10:00 to 11:00), and a portion of the list of participants for the reservation. For example, the balance of the list of participants is viewed by tapping on the meeting information 1822 or swiping downward on the meeting information 1822. For example, the meeting information 1822 may also include the call-in number, attachments, notes, and/or the like for the reservation. In this example, the telephone number (123) 456-8888 is automatically entered into the dial entry field 1824 in the authorized conference instantiation interface 1832 based on the meeting details associated with the reservation.

Figure 18C:
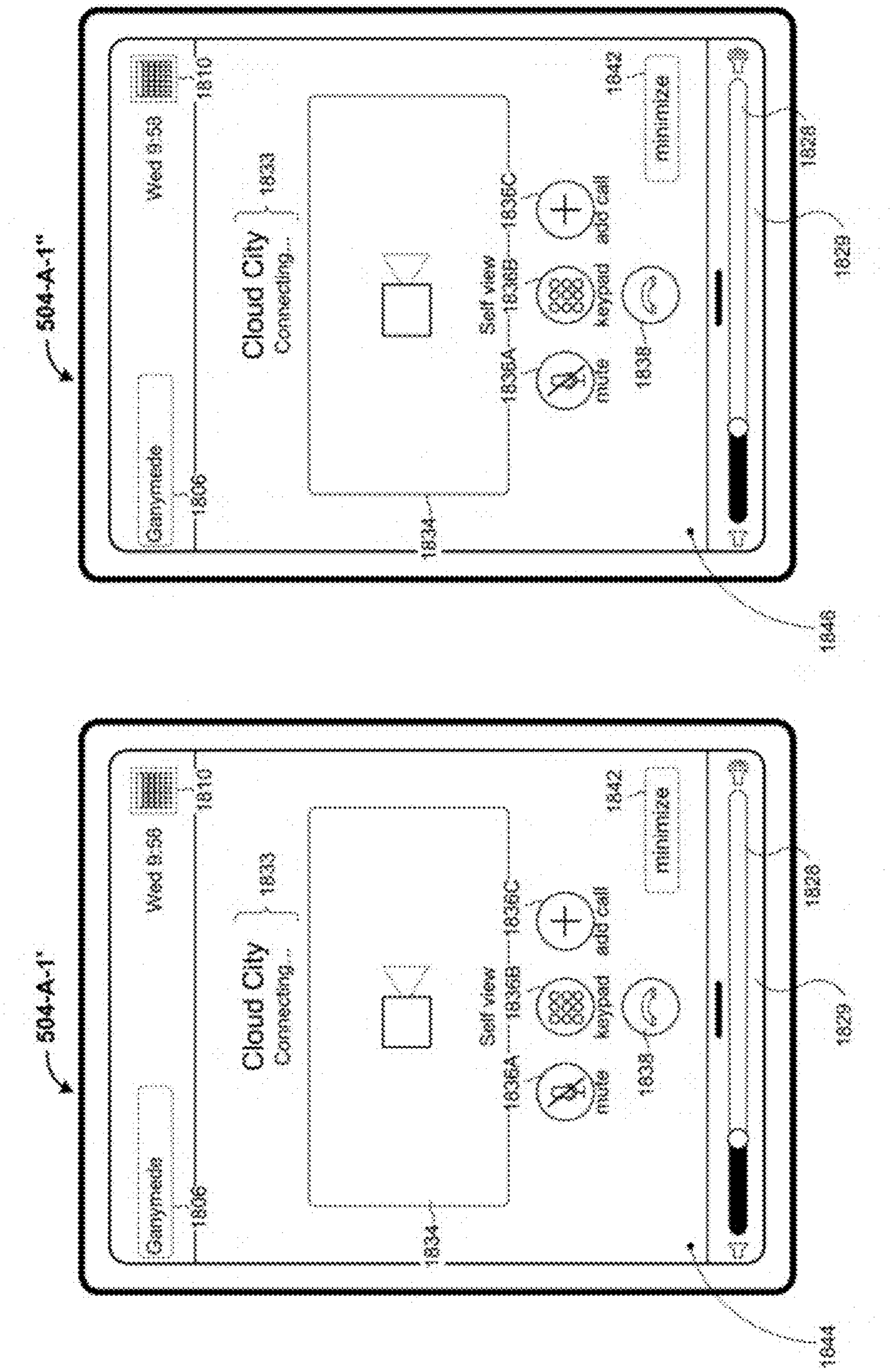

FIG. 18C illustrates unauthorized second device 504-A-1' displaying an unauthorized conference connection interface 1844. As shown in FIG. 18C, the unauthorized conference connection interface 1844 includes: an indication 1833 of the location or meeting space (e.g., Cloud City) associated with the other video conference participant; and a display region 1834 corresponding to a self-view of the meeting space (e.g., the video feed from the Ganymede meeting space). As shown in FIG. 18C, the unauthorized conference connection interface 1844 also includes: a mute affordance 1836A, which, when activated (e.g., with a contact), causes the audio input of the second device 504-A-1 and/or other microphones associated with the meeting space to be muted; a keypad affordance 1836B, which, when activated (e.g., with a contact), causes the unauthorized conference connection interface 1844 to be replaced with a keypad; and an "add call" affordance 1836C, which, when activated (e.g., with a contact), causes the unauthorized conference connection interface 1844 to be replaced with a contact list for adding an additional caller to the conference. As shown in FIG. 18C, the unauthorized conference connection interface 1844 further includes: an end call affordance 1838, which, when activated (e.g., with a contact), causes the user to leave the conference; and a minimize affordance 1842, which, when activated (e.g., with a contact), causes the unauthorized conference connection interface 1844 to be replaced with a meeting manifest interface (e.g., the unauthorized meeting manifest interface 1856 in FIG. 18D).

FIG. 18C also illustrates authorized second device 504-A-1" displaying an authorized conference connection interface 1846. The authorized conference connection interface 1846 is similar to and adapted from the unauthorized conference connection interface 1844. As such, the unauthorized conference connection interface 1844 and the authorized conference connection interface 1846 include similar elements labeled with the same reference number, which both have the same function. Only the differences are described herein for the sake of brevity.

Figure 18D:
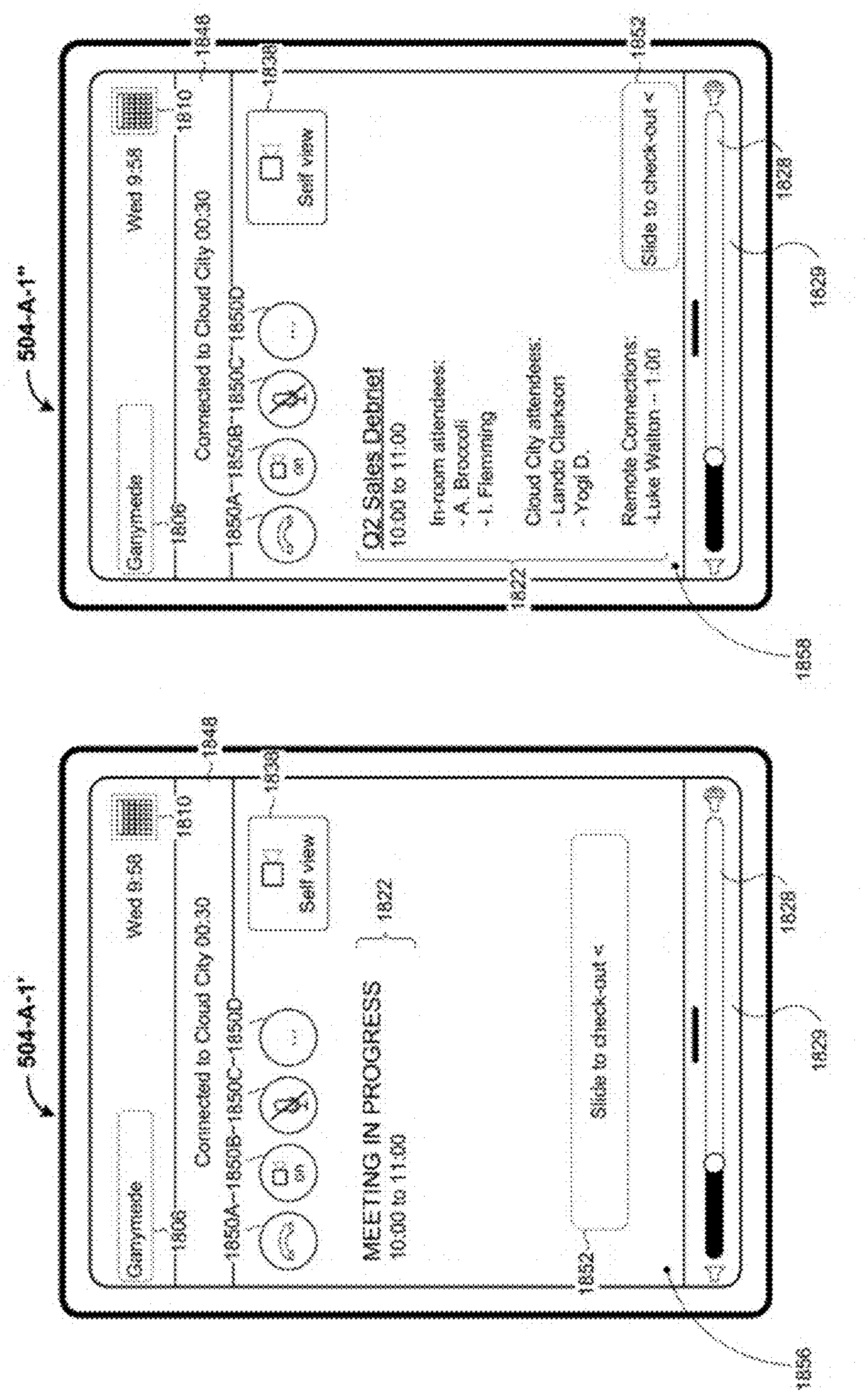

FIG. 18D illustrates unauthorized second device 504-A-1' displaying an unauthorized meeting manifest interface 1856 associated with a video conference. As shown in FIG. 18D, the unauthorized meeting manifest interface 1856 includes: an indication 1848 that the user is connected to the video conference and the length of the connection (e.g., 00:30 minutes); and meeting information 1822 with the reservation status (e.g., "MEETING IN PROGRESS") and the reservation length (e.g., 10:00 to 11:00). As shown in FIG. 18D, the unauthorized meeting manifest interface 1856 also includes: an end call affordance 1850A, which, when activated (e.g., with a contact), causes the user to leave the conference; a video affordance 1850B, which, when activated (e.g., with a contact), causes the current state of the video equipment to be toggled (e.g., from ON to OFF); a mute affordance 1850C, which, when activated (e.g., with a contact), causes the audio input of the second device 504-A-1 and/or other microphones associated with the meeting space to be disabled; and an additional controls affordance 1850D, which, when activated (e.g., with a contact), causes one or more other controls to be displayed. As shown in FIG. 18D, the unauthorized meeting manifest interface 1856 further includes: a self-view affordance 1838, which, when activated (e.g., with a contact), causes the video feed from the meeting space to be displayed within the unauthorized meeting manifest interface 1856; and a check-out affordance 1852, which, when activated (e.g., with a contact or a right-to-left swipe gesture), causes the user to check-out of the current reservation of the Ganymede meeting space.

FIG. 18D also illustrates authorized second device 504-A-1" displaying an authorized meeting manifest interface 1858 associated with a video conference. The authorized meeting manifest interface 1858 is similar to and adapted from the unauthorized meeting manifest interface 1856. As such, the unauthorized meeting manifest interface 1856 and the authorized meeting manifest interface 1858 include similar elements labeled with the same reference number, which both have the same function. Only the differences are described herein for the sake of brevity. As shown in FIG. 18D, the authorized meeting manifest interface 1858 includes meeting information 1822 with the meeting title (e.g., Q2 Sales Debrief), the reservation length (e.g., 10:00 to 11:00), and a list of participants of the reservation.

Figure 18E:
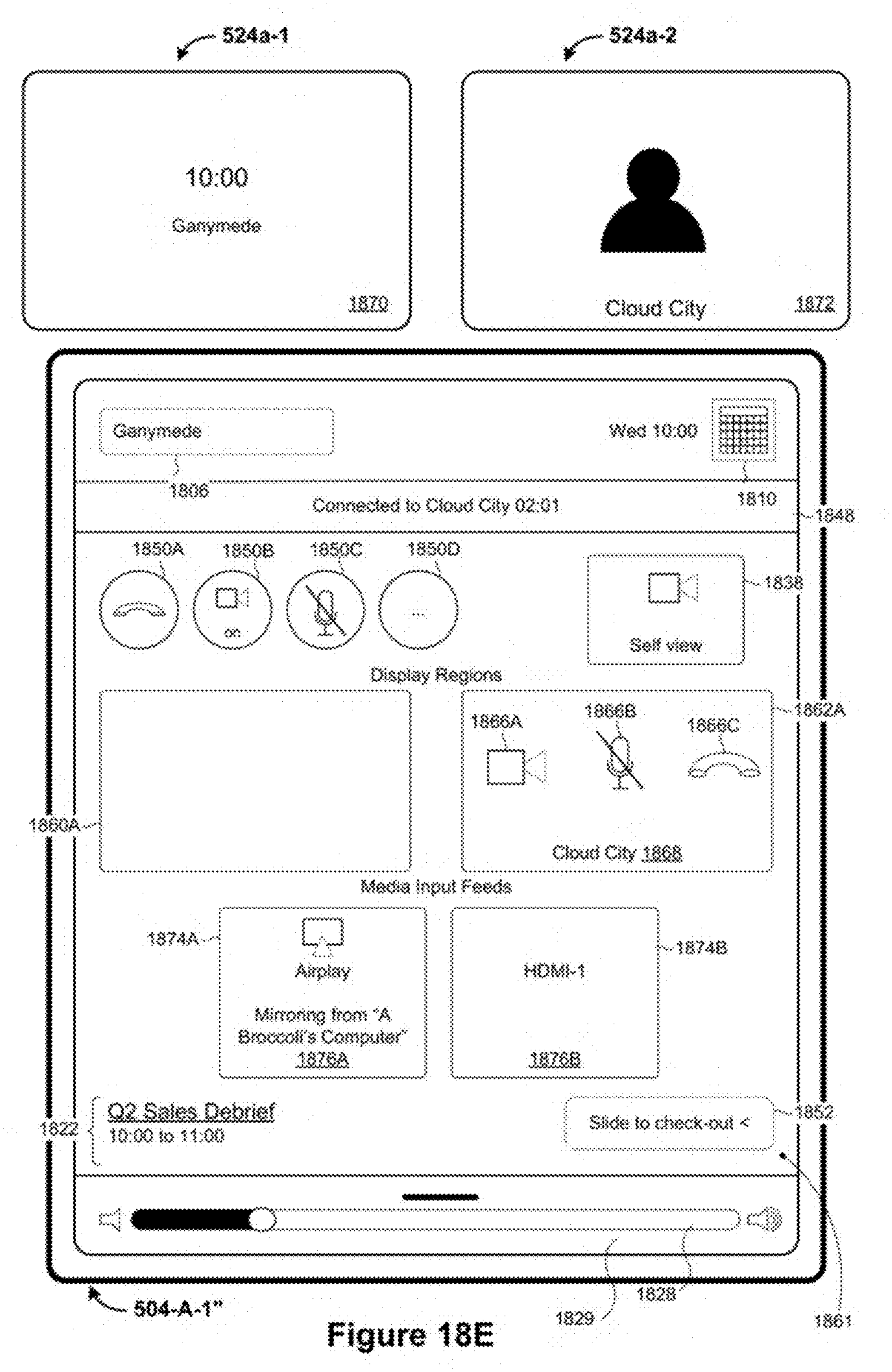

FIG. 18E illustrates authorized second device 504-A-1" displaying a media management interface 1861. The media management interface 1861 is similar to and adapted from the authorized meeting manifest interface 1858 in FIG. 18D. As such, the authorized meeting manifest interface 1858 and the media management interface 1861 include similar elements labeled with the same reference number, which both have the same function. For example, as shown in FIG. 5B, the meeting space (e.g., meeting space 1, building A, which is also sometimes referred to herein as the Ganymede meeting space) includes a first display 524*a*-1 and a second display 524*a*-2. FIG. 18E also illustrates the first display 524*a*-1 displaying content 1870 (e.g., an idle screen with the time and meeting space name), and the second display 524*a*-2 displaying content 1872 associated with the video conference feed from Cloud City.

As shown in FIG. 18E, the media management interface 1861 includes representations of display regions, including: a representation of a main display region 1860A (e.g., full screen) associated with the first display 524*a*-1; and a representation of a main display region 1862A associated with the second display 524*a*-2. The second representation of the main display region 1862A associated with the second display 524*a*-2. In this example, the representation of the main display region 1860A associated with the first display 524*a*-1 is empty because the first display 524*a*-1 is not currently presenting a media input feed. Continuing with this example, the representation of the main display region 1862A associated with the second display 524*a*-2 includes a text description 1868 associated with the video conference feed from Cloud City and control affordances 1866A, 1866B, and 1866C (collectively referred to as "control affordances 1866") provided to control the media input feed currently presented by the second display 524*a*-2.

In some embodiments, when activated (e.g., with a contact), the control affordance 1866A causes the current state of the video equipment within the Ganymede meeting space to be toggled (e.g., from ON to OFF). In some embodiments, when activated (e.g., with a contact), the control affordance 1866B causes the audio input of the second device 504-A-1 and/or other microphones associated with the meeting space to be disabled. In some embodiments, when activated (e.g., with a contact), the control affordance 1866C causes the user to leave the video conference.

As shown in FIG. 18E, the media management interface 1861 also includes representations of available media input feeds, including: a first representation of a media input feed 1874A with a text description 1876A (e.g., a feed from A. Broccoli's shared computer); and a second representation of a media input feed 1874B with a text description 1876B (e.g., a local HDMI feed associated with port HDMI-1). According to some embodiments, the user of the second device 504-A-1 is able to drag one of the media input feed representations into one of the display region representations to coordinate display of one of the media input feeds by one of the displays.

Figure 18F:
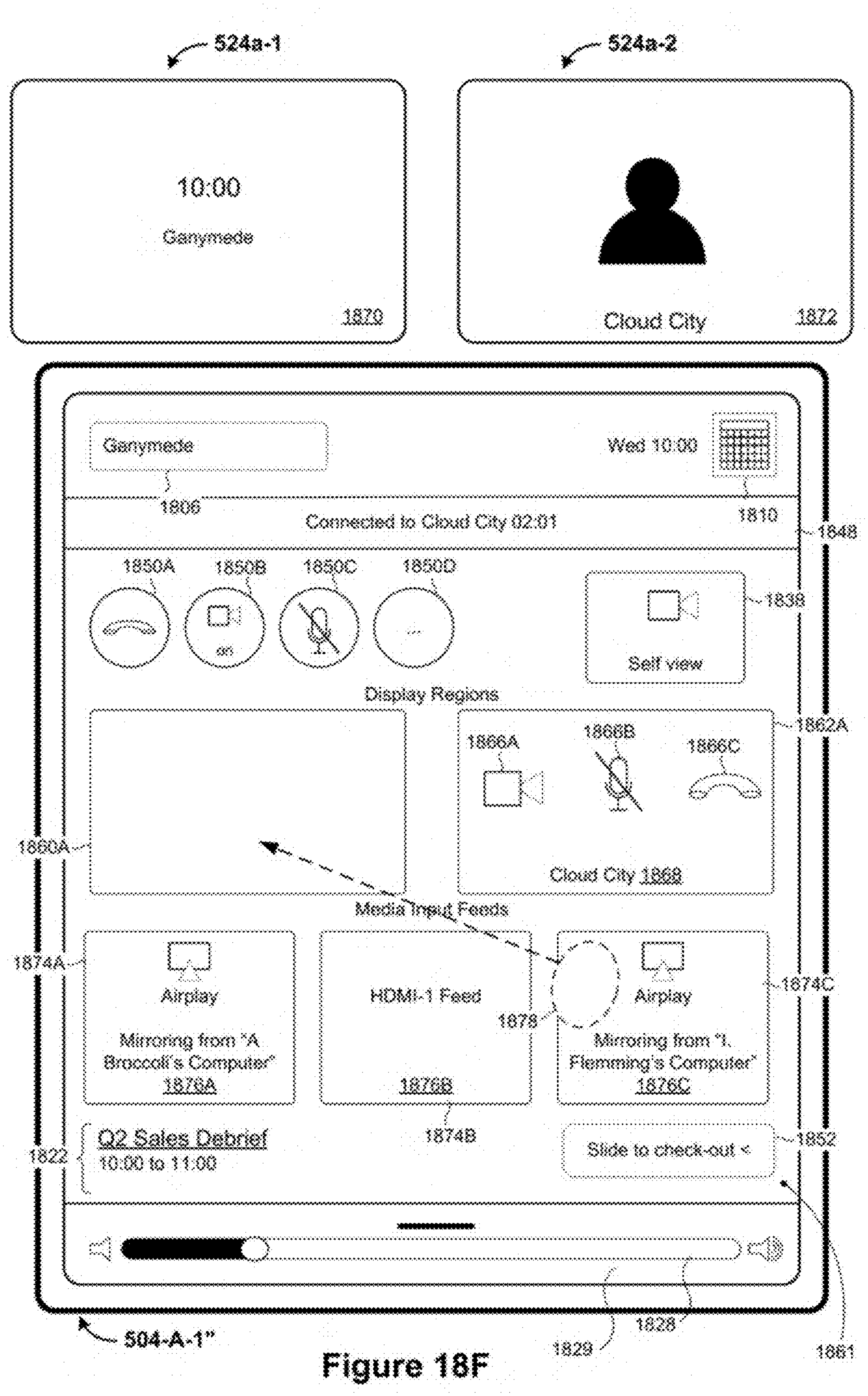
Figure 18G:
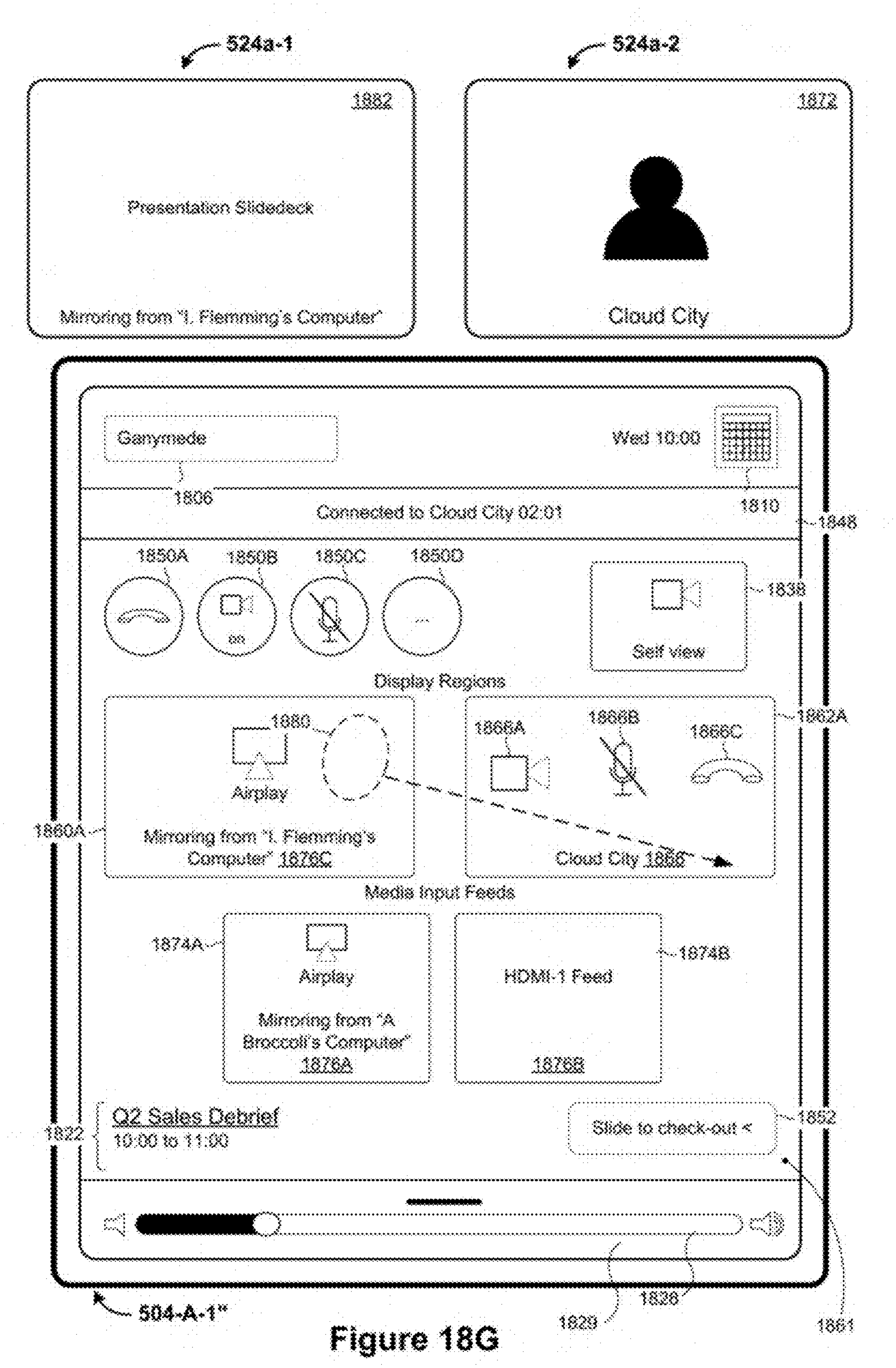

FIGS. 18F-18G show a sequence in which a respective media input feed is associated with a main display region of a first display. As shown in FIG. 18F, the media management interface 1861 includes a third representation of a media input feed 1874C with a text description 1876C (e.g., a feed from I. Flemming's shared computer). For example, the third representation of the media input feed 1874C is displayed within the media management interface 1861 once I. Flemming shares his computer (e.g., via Airplay or another screen sharing application).

FIG. 18F illustrates a dragging gesture with contact 1878, where the third representation of the media input feed 1874C is dragged and dropped into the representation of the main display region 1860A associated with the first display 524*a*-1. In FIG. 18G, the representation of the main display region 1860A associated with the first display 524*a*-1 includes the text description 1876C associated with the feed from I. Flemming's shared computer in response to the dragging gesture in FIG. 18F. As a result of the dragging gesture in FIG. 18F, FIG. 18G illustrates the first display 524*a*-1 displaying content 1882 associated with the feed from I.

Flemming's shared computer. In FIG. 18G, the second display 524*a*-2 maintains display of the content 1872 associated with the video conference feed from Cloud City.

Figure 18H:
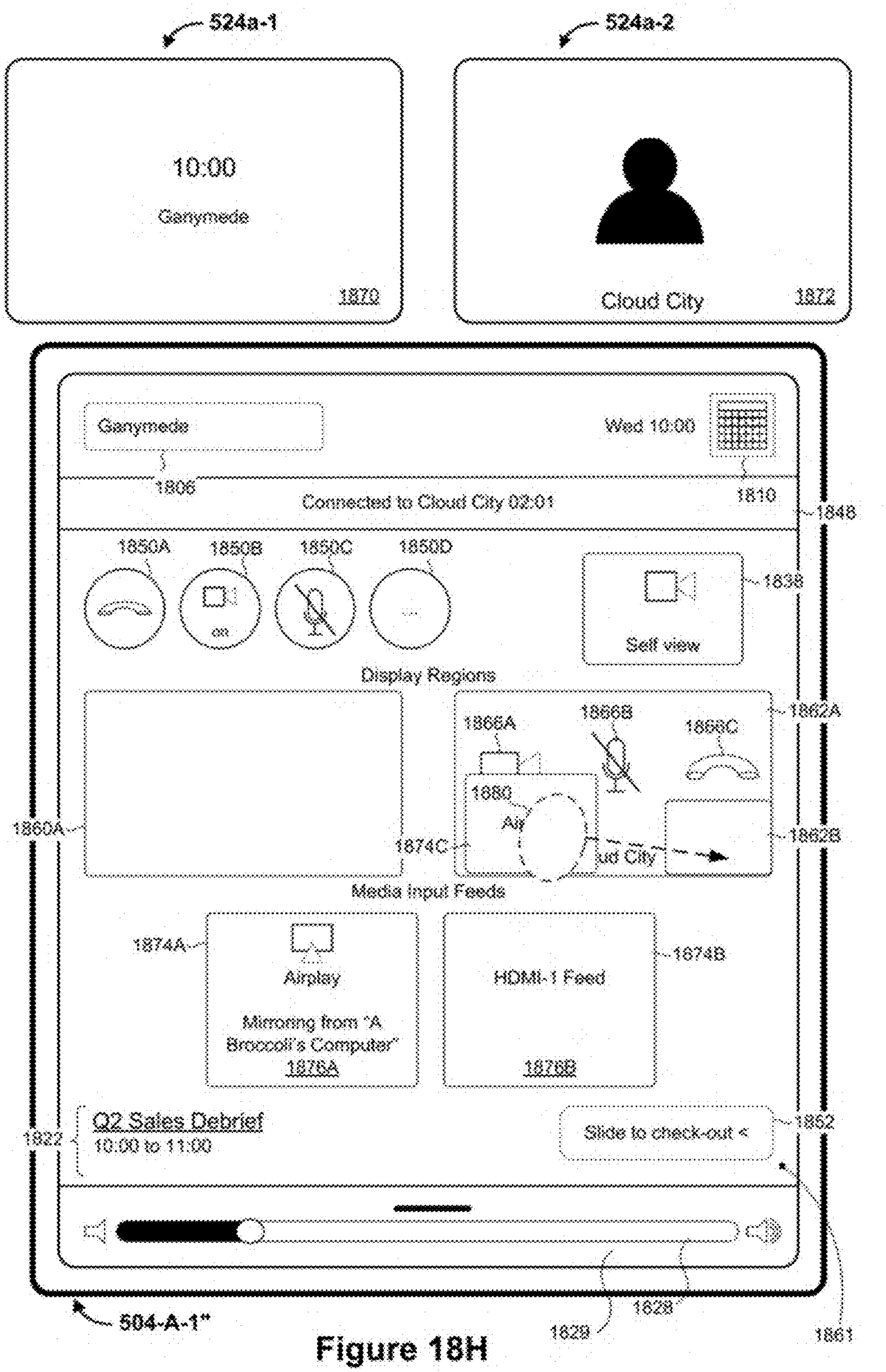
Figure 18I:
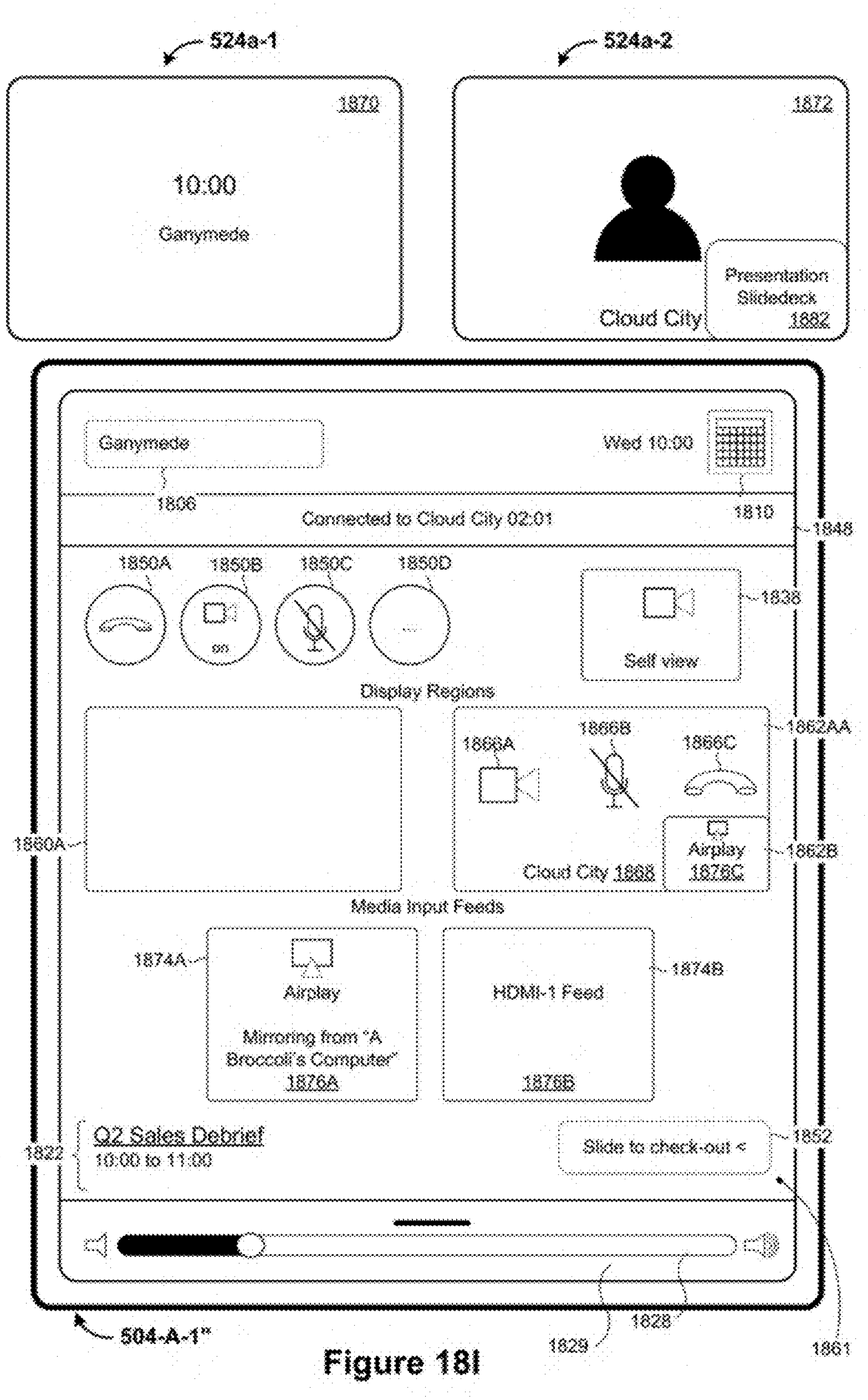

FIGS. 18G-18I show a sequence in which the respective media input feed is associated with a picture-in-picture display region of the second display. FIGS. 18F-18H illustrates a dragging gesture with contact 1880, where the third representation of the media input feed 1874C is dragged and dropped into the representation of the picture-in-picture display region 1862B associated with the second display 524*a*-2.

In FIG. 18I, the representation of the main display region 1860A associated with the first display 524*a*-1 is empty in response to the dragging gesture in FIGS. 18G-18H. In FIG. 18I, the representation of the main display region 1862A associated with the second display 524*a*-2 includes the text description 1868 associated with the video conference feed from Cloud City, and the representation of the picture-in-picture display region 1862B associated with the second display 524*a*-2 includes the text description 1876C associated with the feed from I. Flemming's shared computer in response to the dragging gesture in FIGS. 18G-18H.

As a result of the dragging gesture in FIGS. 18G-18H, FIG. 18I illustrates the first display 524*a*-1 displaying content 1870 (e.g., as shown in FIG. 18E-18F). Also, as a result of the dragging gesture in FIGS. 18G-18H, FIG. 18I illustrates the second display 524*a*-2 displaying content 1872 associated with the video conference feed from Cloud City in the main display area and the content 1882 associated with the feed from I. Flemming's shared computer in the picture-in-picture area.

Figure 18J:
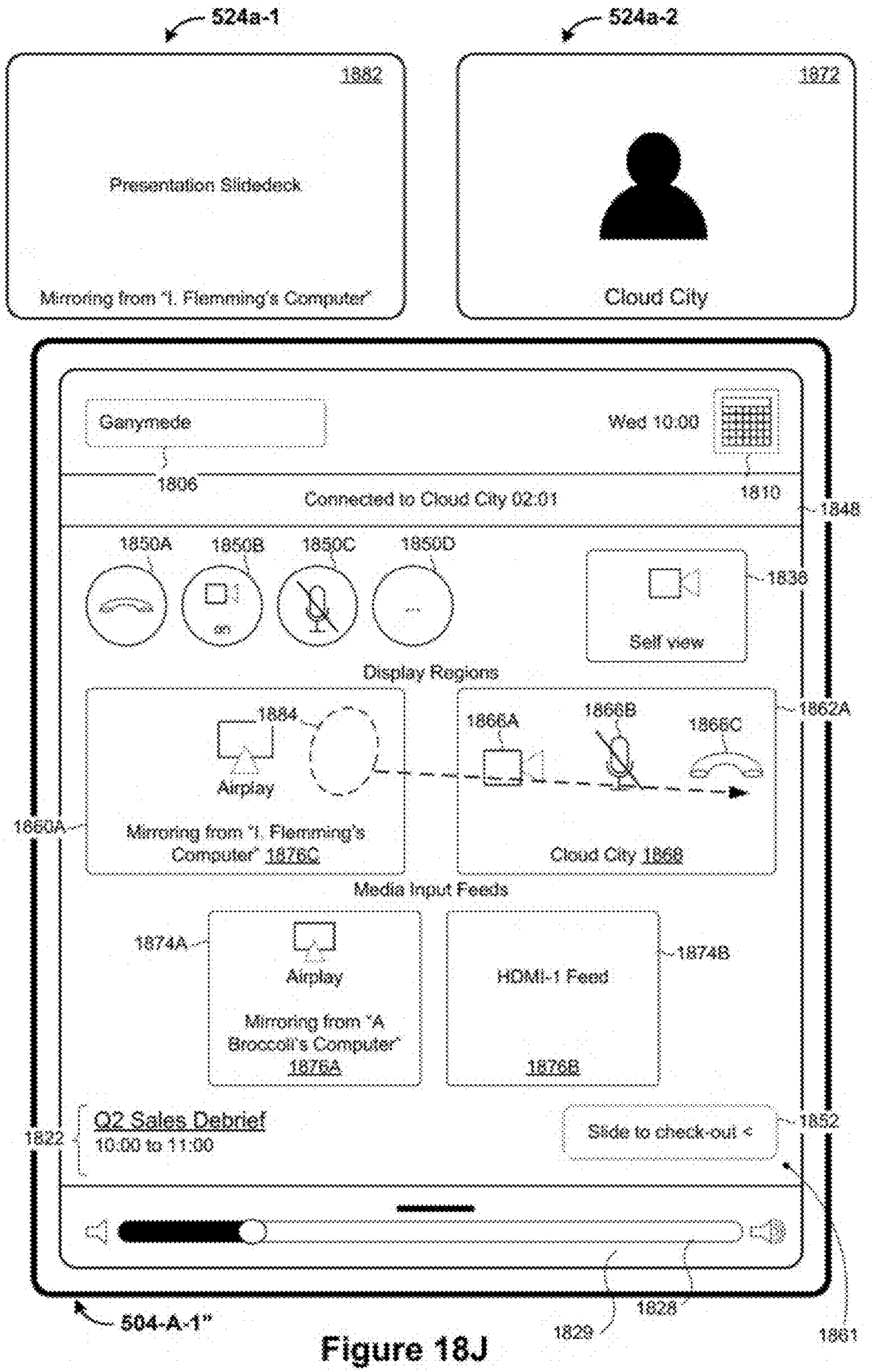
Figure 18K:
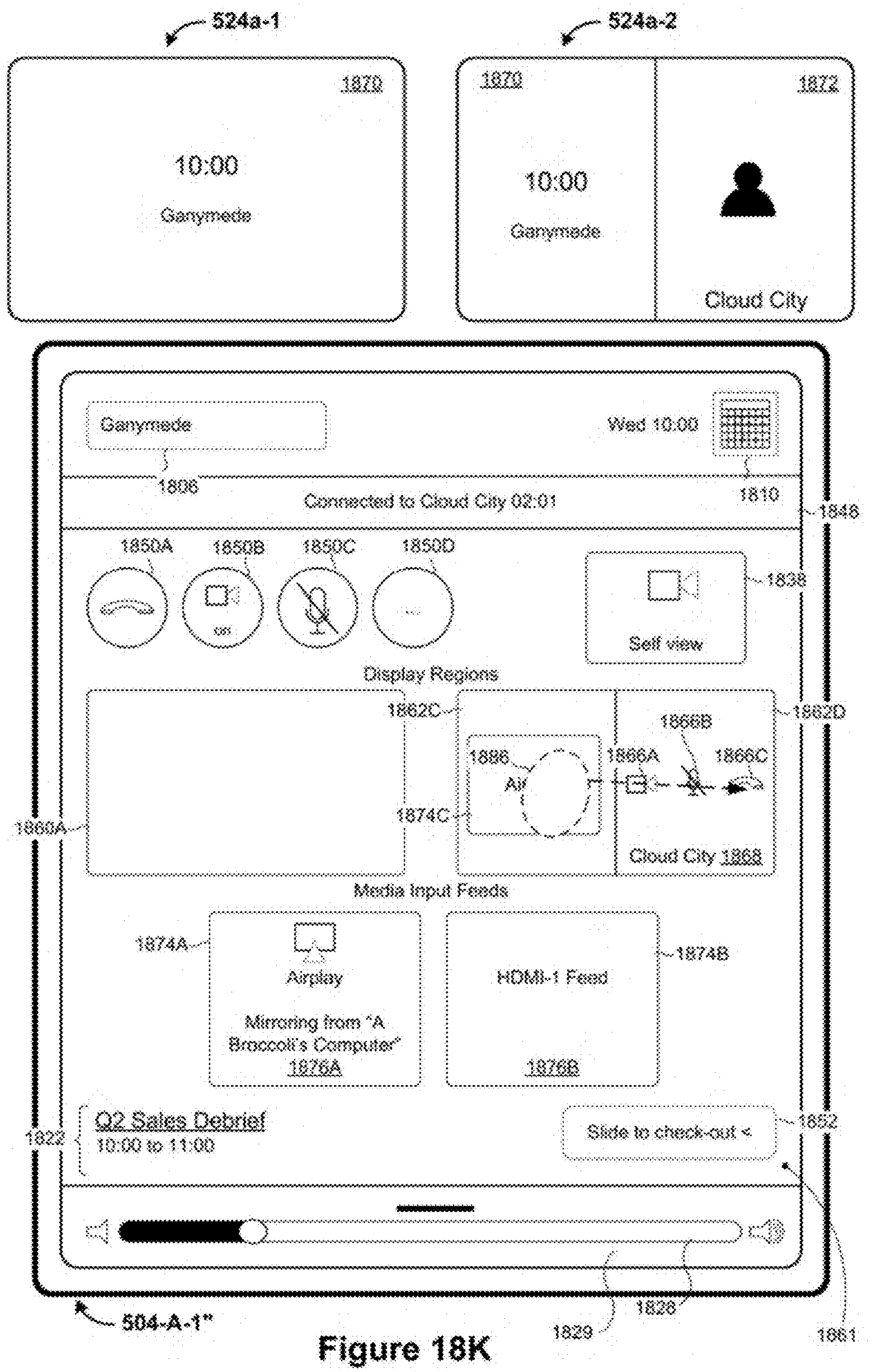
Figure 18L:
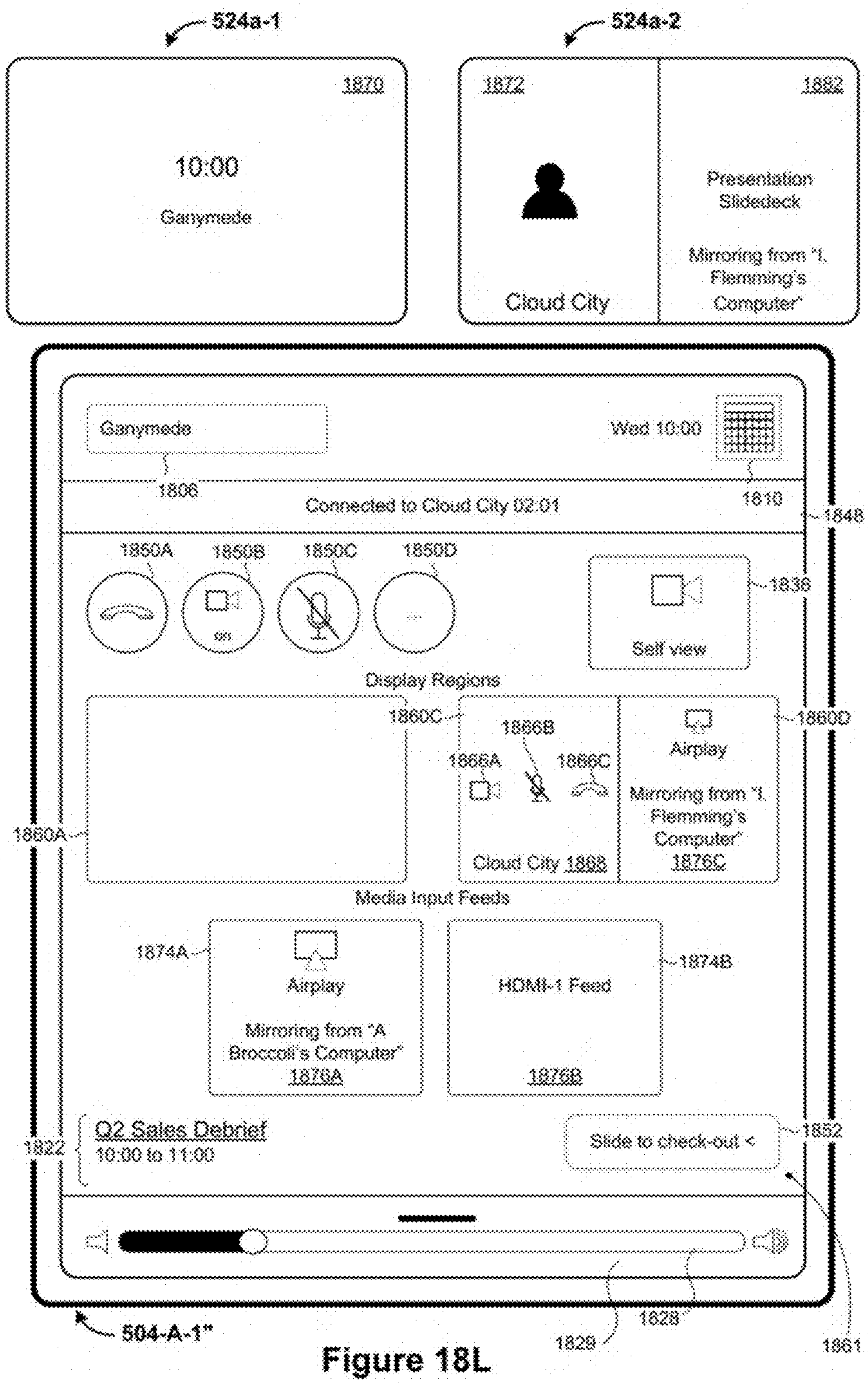

FIGS. 18J-18L show a sequence in which the respective media input feed is associated with a split-screen display region of the second display. FIGS. 18J-18K illustrates a dragging gesture with contact 1884, where the third representation of the media input feed 1874C is dragged and dropped into the representation of the second split-screen display region 1862D associated with the second display 524*a*-2.

In FIG. 18L, the representation of the main display region 1860A associated with the first display 524*a*-1 is empty in response to the dragging gesture in FIGS. 18J-18K. In FIG. 18L, the representation of the first split-screen display region 1862C associated with the second display 524*a*-2 includes the text description 1868 associated with the video conference feed from Cloud City, and the representation of the second split-screen display region 1862D associated with the second display 524*a*-2 includes the text description 1876C associated with the feed from I. Flemming's shared computer in response to the dragging gesture in FIGS. 18J-18K.

As a result of the dragging gesture in FIGS. 18J-18K, FIG. 18L illustrates the first display 524*a*-1 displaying content 1870 (e.g., as shown in FIG. 18E-18F). Also as a result of the dragging gesture in FIGS. 18J-18K, FIG. 18L illustrates the second display 524*a*-2 displaying content 1872 associated with the video conference feed from Cloud City in the first split screen display area and the content 1882 associated with the feed from I. Flemming's shared computer in the second split screen display area.

Figure 18M:
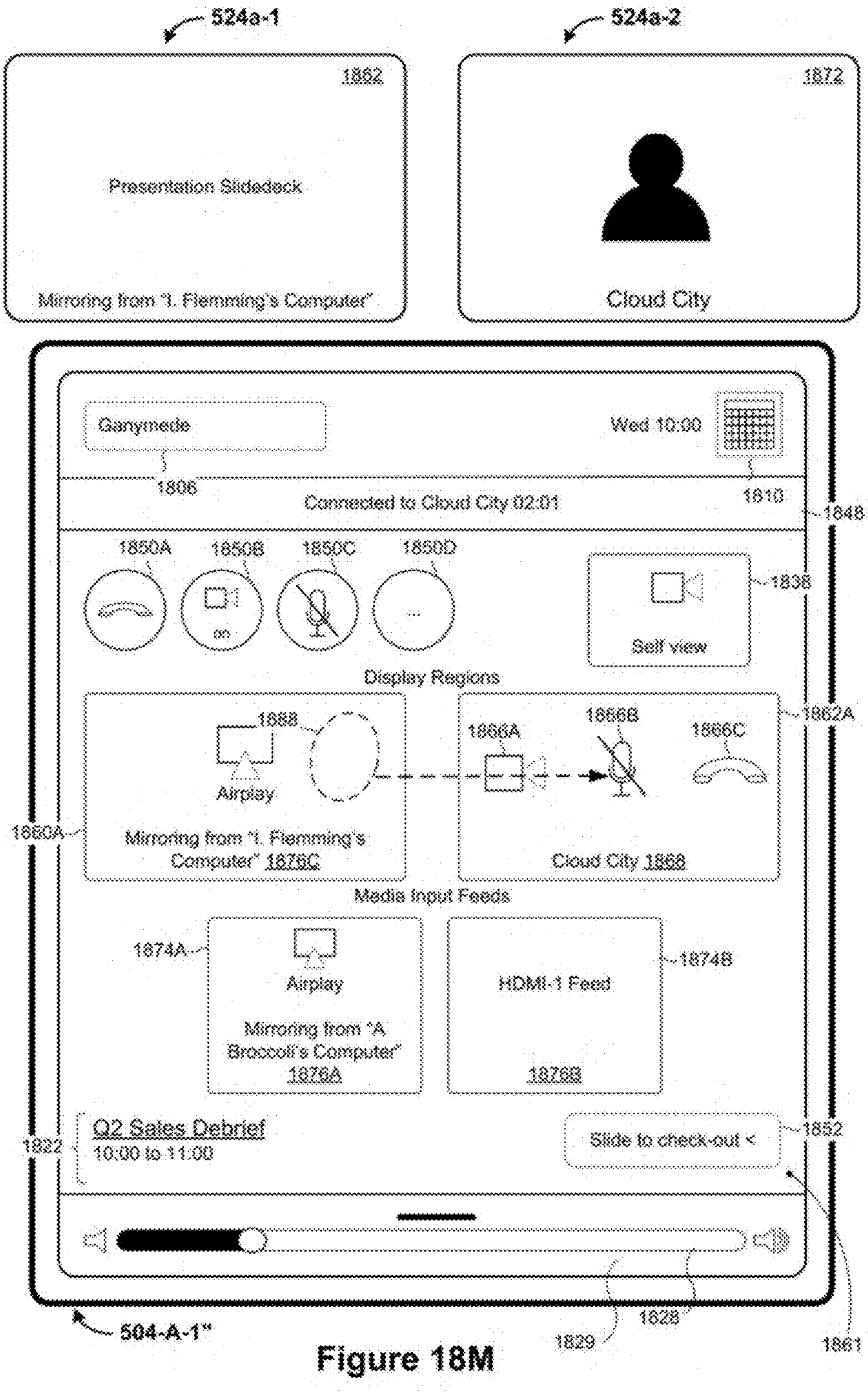
Figure 18N:
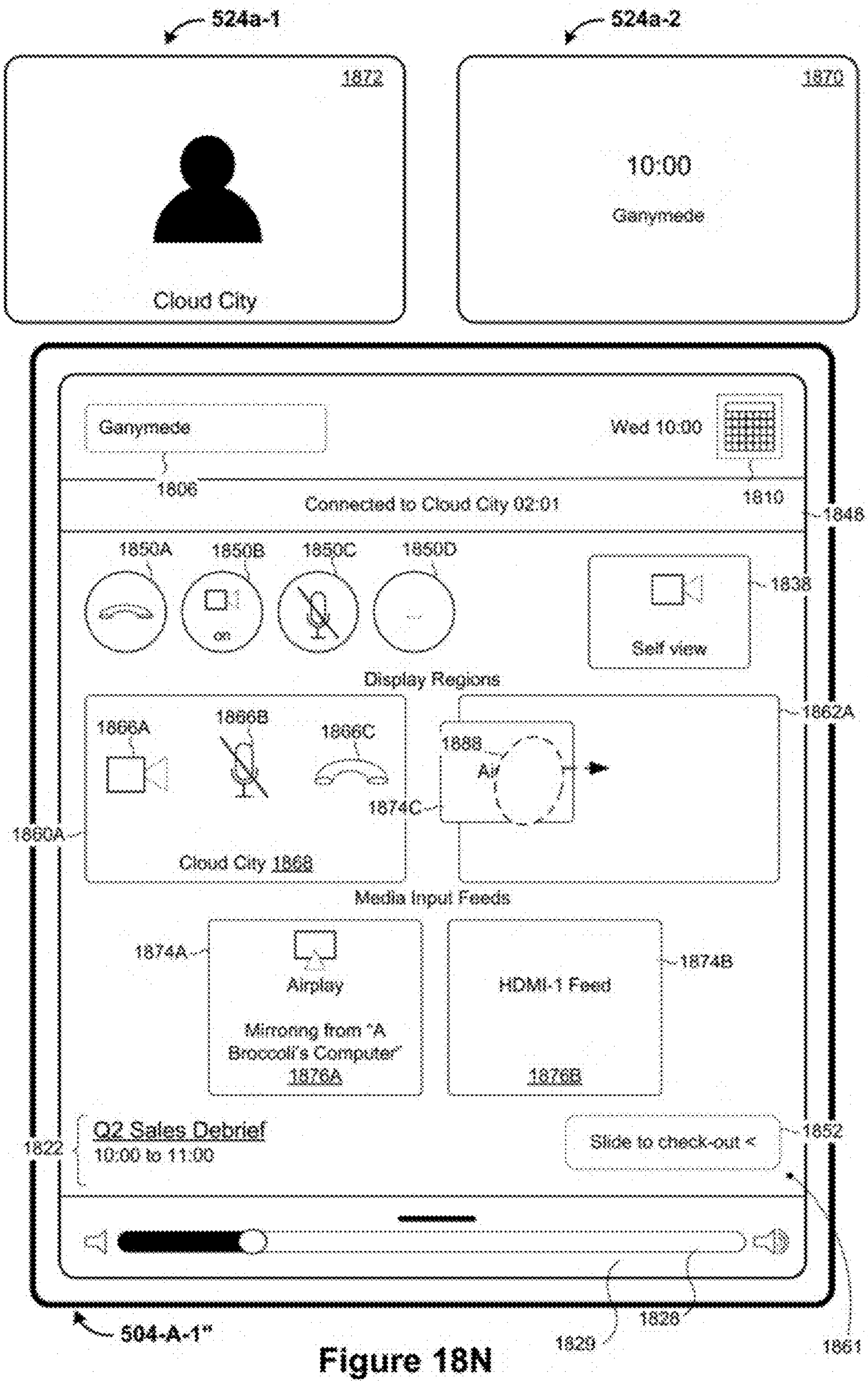
Figure 18O:
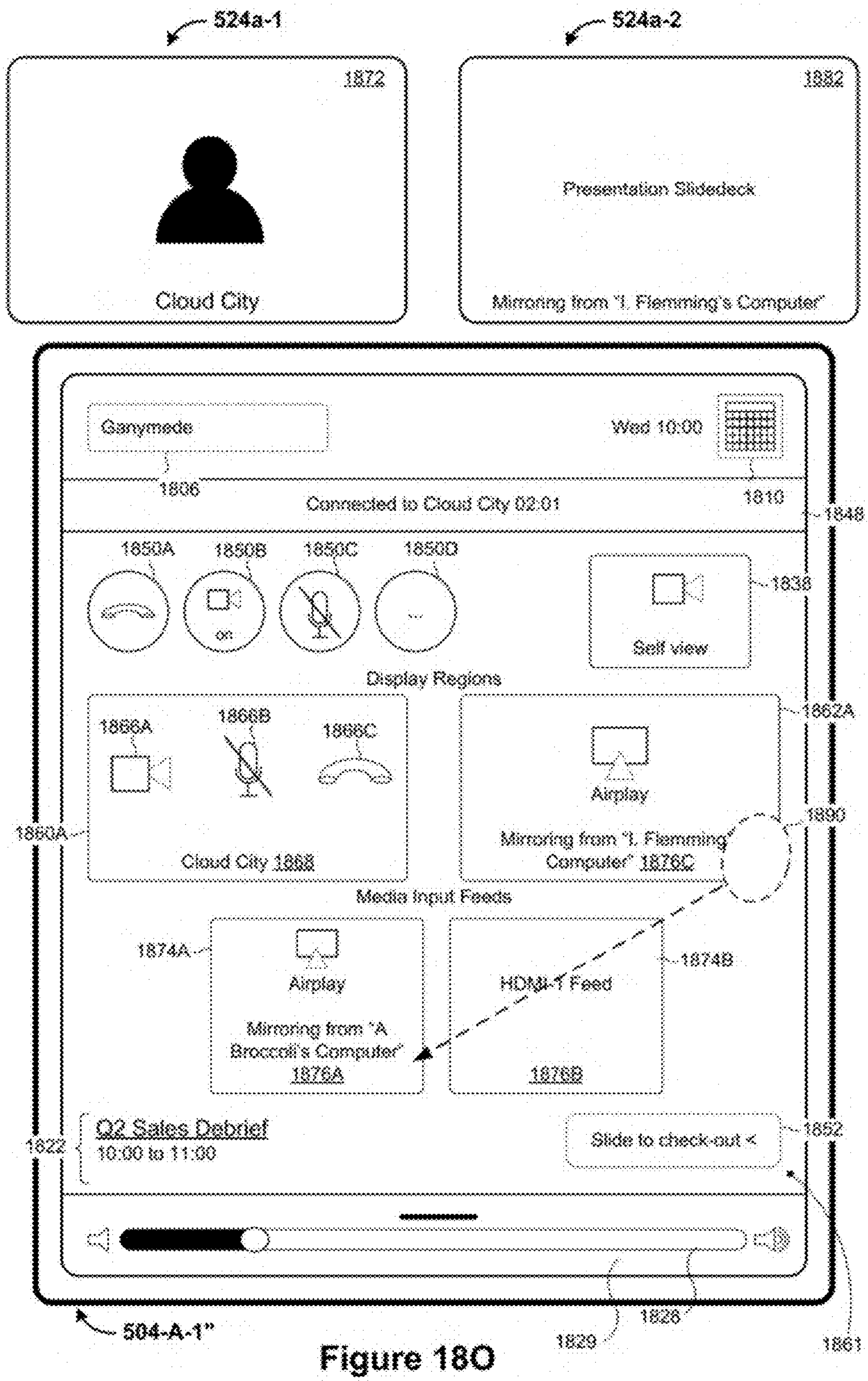

FIGS. 18M-18O show a sequence in which the respective media input feed is associated with a main display region of the second display. FIGS. 18M-18N illustrates a dragging gesture with contact 1888, where the third representation of the media input feed 1874C is dragged and dropped into the representation of the main display region 1862A associated with the second display 524*a*-2.

In FIG. 18O, the representation of the main display region 1860A associated with the first display 524*a*-1 includes the text description 1868 associated with the video conference feed from Cloud City in response to the dragging gesture in FIGS. 18M-18N. In FIG. 18O, the representation of the main display region 1862A associated with the second display 524*a*-2 includes the text description 1876C associated with the feed from I. Flemming's shared computer in response to the dragging gesture in FIGS. 18M-18N.

As a result of the dragging gesture in FIGS. 18M-18N, FIG. 18O illustrates the first display 524*a*-1 displaying content 1872 associated with the video conference feed from Cloud City. Also as a result of the dragging gesture in FIGS. 18M-18N, FIG. 18O illustrates the second display 524*a*-2 displaying content 1882 associated with the feed from I. Flemming's shared computer.

Figure 18P:
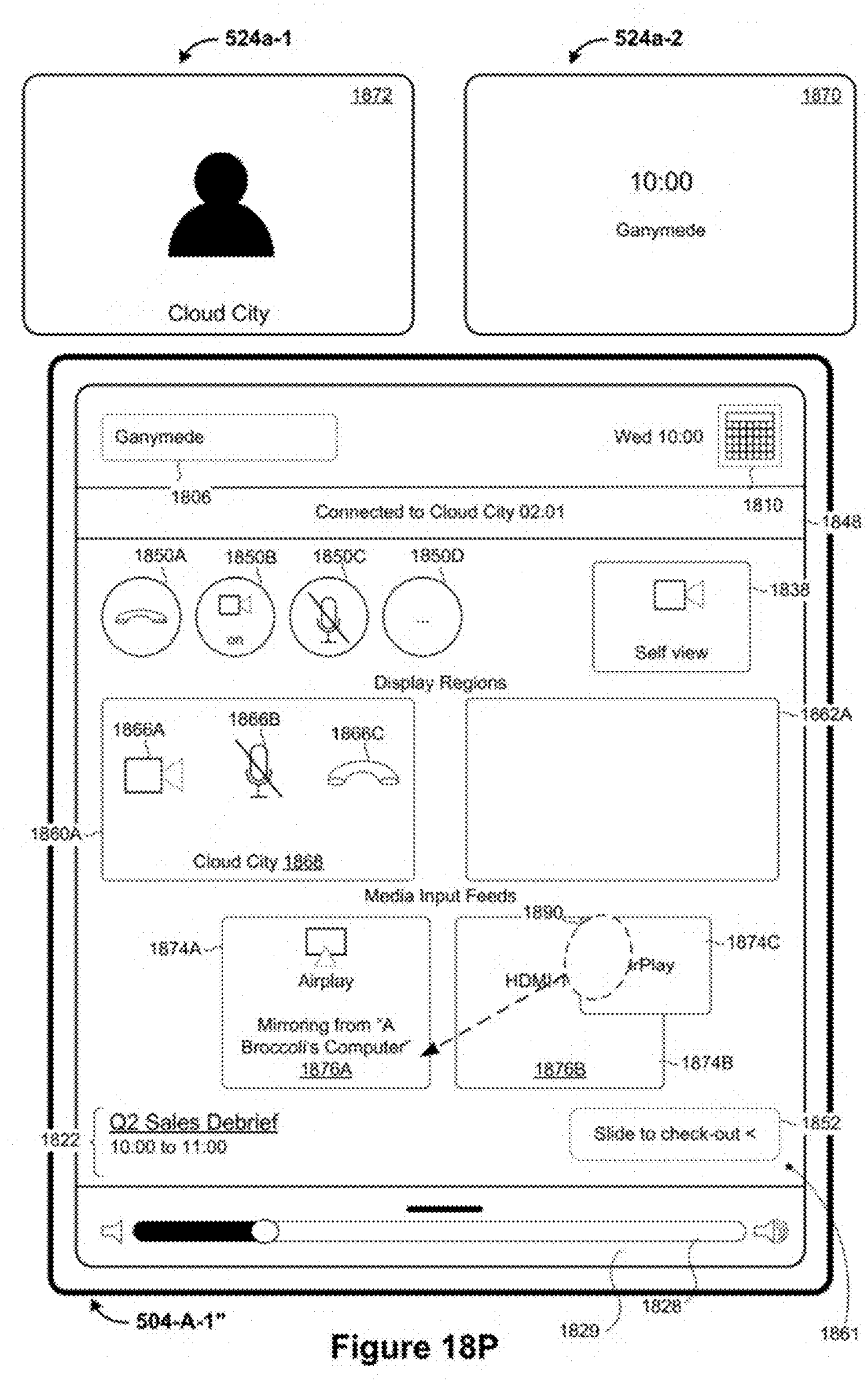
Figure 18Q:
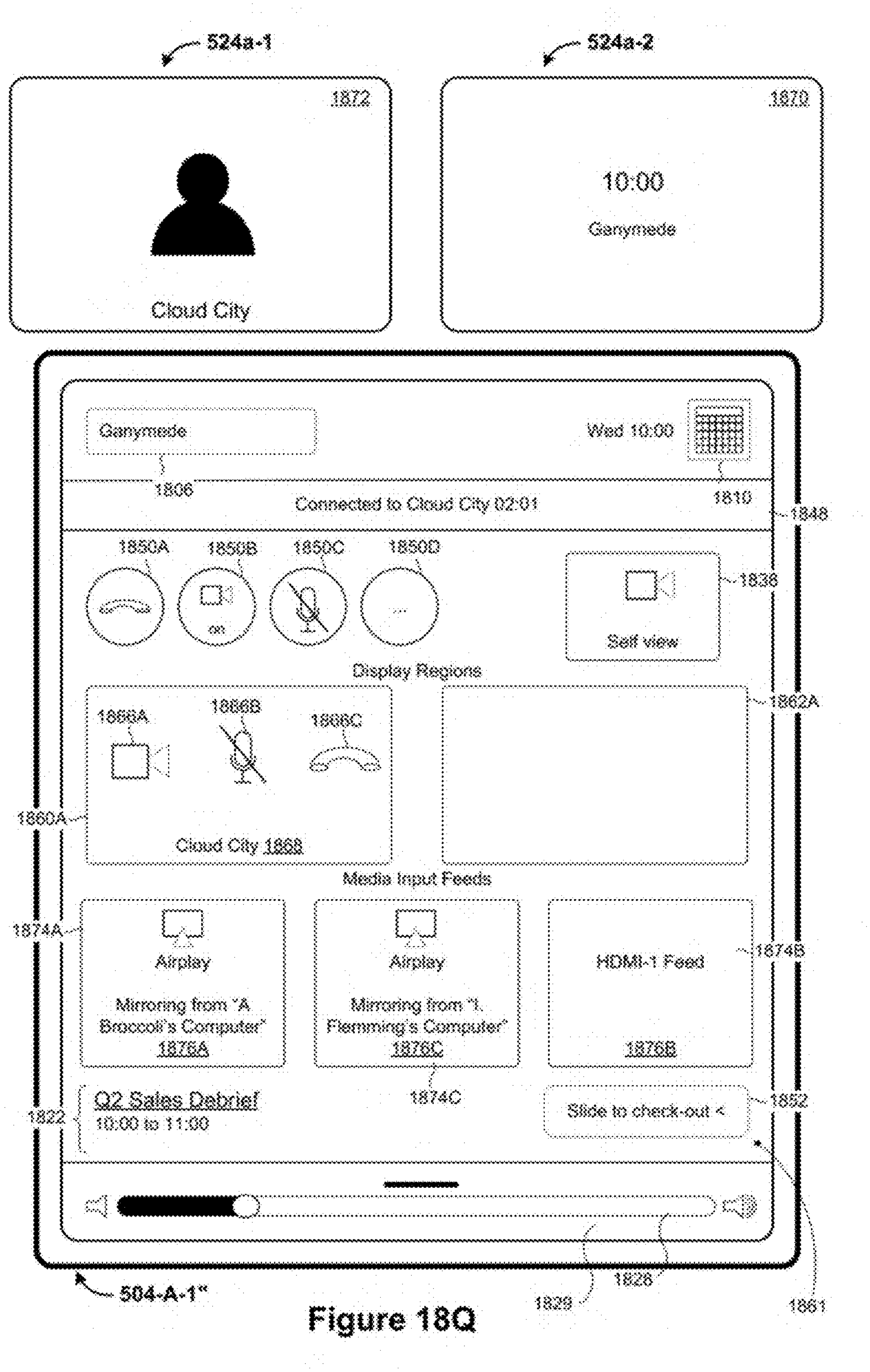

FIGS. 18O-18Q show a sequence in which the respective media input feed is removed from the second display. FIGS. 18O-18P illustrates a dragging gesture with contact 1890, where the third representation of the media input feed 1874C is dragged out of the main display region 1862A associated with the second display 524*a*-2.

In FIG. 18Q, the representation of the main display region 1862A associated with the second display 524*a*-2 is empty in response to the dragging gesture in FIGS. 18O-18P. In FIG. 18Q, the representation of the main display region 1860A associated with the first display 524*a*-1 maintains the text description 1868 associated with the video conference feed from Cloud City.

As a result of the dragging gesture in FIGS. 18O-18P, FIG. 18Q illustrates the second display 524*a*-2 displaying content 1870. FIG. 18Q illustrates the first display 524*a*-1 maintaining display of the content 1872 associated with the video conference feed from Cloud City.

Figure 18R:
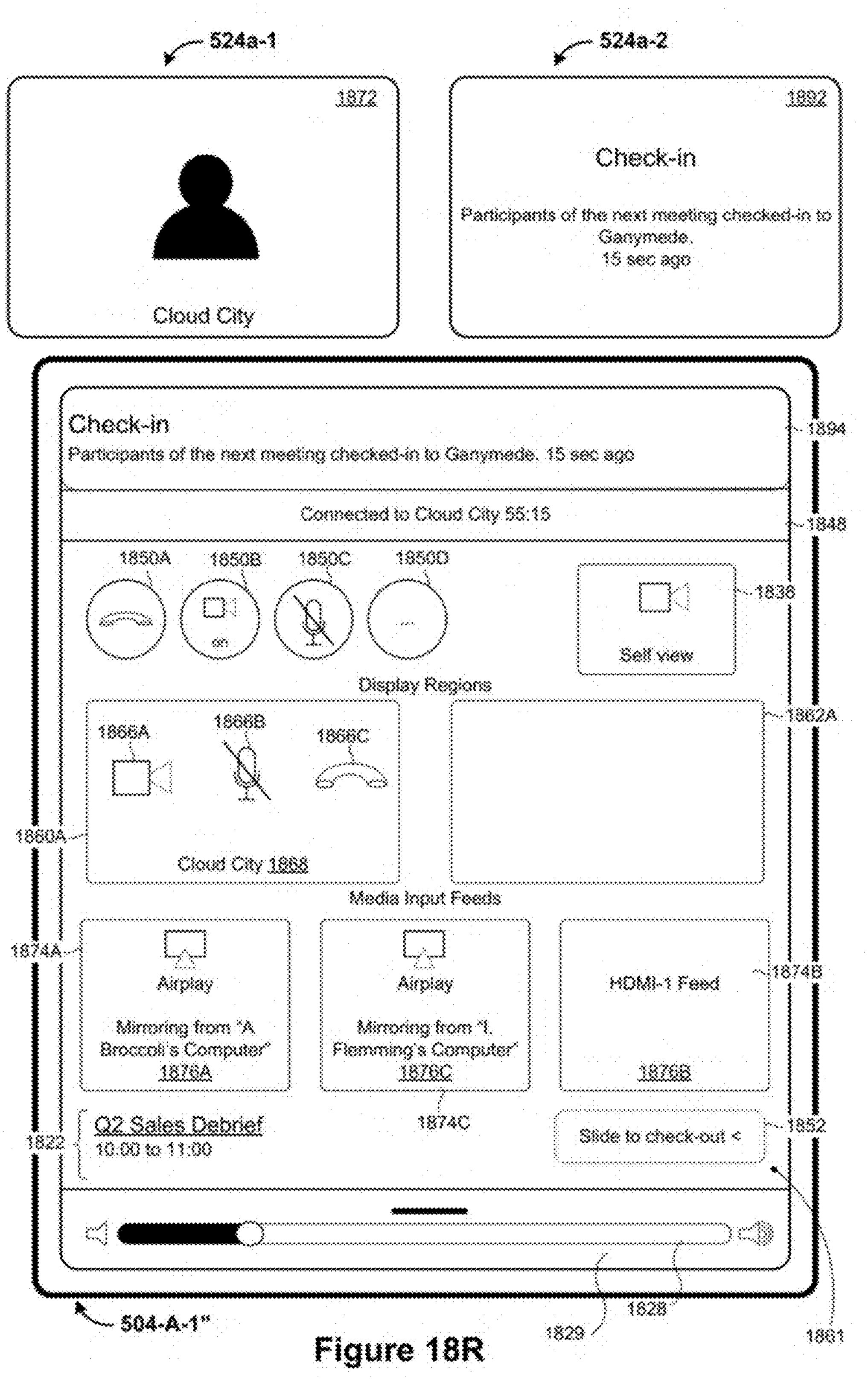

FIG. 18R illustrates the authenticated second device 504-A-1" displaying a notification 1894 within the media management interface 1861. As shown in FIG. 18R, the notification 1894 indicates that the participants of the next meeting in the Ganymede meeting space checked-in. For example, the notification 1894 is displayed in response to a participant of the upcoming reservation checking-in using the first device 502-A-1 outside the meeting space (e.g., as shown in FIGS. 15K-15L). FIG. 18R also illustrates the second display 524*a*-2 displaying content 1892 associated with the notification 1894 in response to the check-in of the upcoming reservation. FIG. 18R further illustrates the first display 524*a*-1 maintaining display of the content 1872 associated with the video conference feed from Cloud City.

FIG. 18S illustrates the authenticated second device 504-A-1" replacing display of the media management interface 1861 with a check-out interface 1898 in response to the current reservation ending. As shown in FIG. 18S, the check-out interface 1898 indicates that the is ending and that the user will be automatically checked-out of the Ganymede meeting space in ten seconds. The check-out interface 1898 also includes a check-out affordance 18100, which, when activated (e.g., with a contact), causes the user to be checked-out of the Ganymede meeting space. FIG. 18S also illustrates the second display 524*a*-2 displaying content 1896 associated with a countdown to the end of the current reservation in response to the current reservation ending. FIG. 18S further illustrates the first display 524*a*-1 maintaining display of the content 1872 associated with the video conference feed from Cloud City. In some embodiments, the authenticated second device 504-A-1" displays options for extending the reservation (e.g., as shown in FIGS. 15H and 15M).

FIGS. 19A-19N illustrate example user interfaces for continuing an electronic conference in accordance with some embodiments. The user interfaces in these figures are used to illustrate the processes described below, including the processes in FIGS. 23A-23C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

In some embodiments, the first device is located outside of the meeting space (e.g., the first device 502-A-1 in FIGS. 5A-5B). For example, the first device is associated with the meeting space such as being fixed to a wall outside of the meeting space. In some embodiments, the first device is associable with the meeting space. For example, the first device is a personal device associated with a user such as a phone, tablet, laptop, or the like. In this example, when the user walks into the meeting space with the first device, the location of the device is associated with the meeting space and meeting space functionality for the particular meeting space is enabled on the first device. In some embodiments, a second device inside of the meeting space (e.g., the second device 504-A-1 in FIGS. 5A-5B) is synchronized with the first device. For example, the second device is associated with the meeting space such as being fixed to a wall inside of the meeting space, fixed to furniture or equipment within the meeting space, or portably located within the meeting space.

FIG. 19A shows the second device 504-A-1 displaying a meeting status interface 1918 (e.g., the interior device associated with meeting space 1, building A in FIGS. 5A-5B, which is sometimes referred to as the Ganymede meeting space). As shown in FIG. 19A, the meeting status interface 1918 includes a meeting space affordance 1906, which indicates that the second device 504-A-1 corresponds to the Ganymede meeting space. When activated (e.g., with a contact), the meeting space affordance 1906 causes a log for the Ganymede meeting space to be displayed. For example, the log indicates: previous or outstanding problems reported for the Ganymede meeting space; the cleaning record of the Ganymede meeting space; the last occupants of the Ganymede meeting space; and/or the like. For example, see 6P-6Q, and the description thereof.

As shown in FIG. 19A, the meeting status interface 1918 further includes a calendar affordance 1910, which, when activated (e.g., with a contact), causes a reservation schedule associated with the Ganymede meeting space. For example, see 6B-6C, and the description thereof. As shown in FIG. 19A, the meeting status interface 1918 further includes a "Room Help" affordance 1916, which, when activated (e.g., with a contact), causes a problem reporting interface to replace the meeting status interface 1918. For example, see 6J-6P, and the description thereof.

As shown in FIG. 19A, the meeting status interface 1918 further includes: the current time (e.g., 14:01); a status indicator 1912 indicating a current availability or reservation status of the Ganymede meeting space; and a claiming affordance 1914, which, when activated (e.g., with a left-to-right swipe gesture or a predefined gesture such as a one finger tap gesture), causes the status indicator 1912 to change (e.g., from "RESERVED" to "MEETING IN PROGRESS," or from "AVAILABLE" to "MEETING IN PROGRESS").

As shown in FIG. 19A, the status indicator 1912 indicates that the Ganymede meeting space is "RESERVED" for Ulysses S. Grant and that Ulysses S. Grant has until 14:07 to check-in. In FIG. 19A, the claiming affordance 1914 also prompts the user to "slide to check-in." According to some embodiments, the status indicator 1912 indicates "RESERVED" between an early check-in threshold and a check-in deadline (e.g., 7 minutes after the start time of the upcoming reservation). As such, in some embodiments, the status indicator 1912 indicates "RESERVED" when the current time (e.g., 14:01) is between the early check-in threshold and the check-in deadline. Furthermore, in some embodiments, the claiming affordance 1914 is enabled to check-in to an upcoming reservation while the meeting space is available and the current time is between the early check-in threshold and the check-in deadline.

FIG. 19A also illustrates detecting a left-to-right swipe gesture with contact 1920 over the claiming affordance 1914. According to some embodiments, in response to detecting the swipe gesture in FIG. 19A, the second device 504-A-1 displays a login interface prompting the user to manually enter his/her login credentials. In some embodiments, the login interface is replaced or supplemented with a prompt for biometric information (e.g., a voice sample, retina scan, fingerprint scan, or the like). Continuing with this example, the second device 504-A-1 enters an authenticated usage mode (e.g., the interfaces 1832, 1846, and 1858 in FIGS. 18B-18D, respectively) when the login credentials and/or biometric information matches user information associated with an organizer or participant of the upcoming reservation. In this example, the second device 504-A-1 enters an un-authenticated usage mode (e.g., the interfaces 1830, 1844, and 1856 in FIGS. 18B-18D, respectively) when the login credentials and/or biometric information do not match user information associated with an organizer or participant of the upcoming reservation.

In another example, in response to detecting the swipe gesture in FIG. 19A, the second device 504-A-1, the second device 504-A-1 enters an authenticated usage mode (e.g., the interfaces 1832, 1846, and 1858 in FIGS. 18B-18D, respectively) when the proximity indicator transmitted by a mobile device associated with user that interacted with the claiming affordance 1814 or another mobile device within range of the meeting space corresponds to an organizer or one of the participants of the upcoming reservation (e.g., as described with reference to FIGS. 16A and 17B). In this example, the second device 504-A-1 enters an un-authenticated usage mode (e.g., the interfaces 1830, 1844, and 1856 in FIGS. 18B-18D, respectively) when the proximity indicator transmitted by the mobile device associated with user that interacted with the claiming affordance 1814 or another mobile device within range of the meeting space does not correspond to the organizer or one of the participants of the upcoming reservation.

Figure 19B:
Figure 19C:
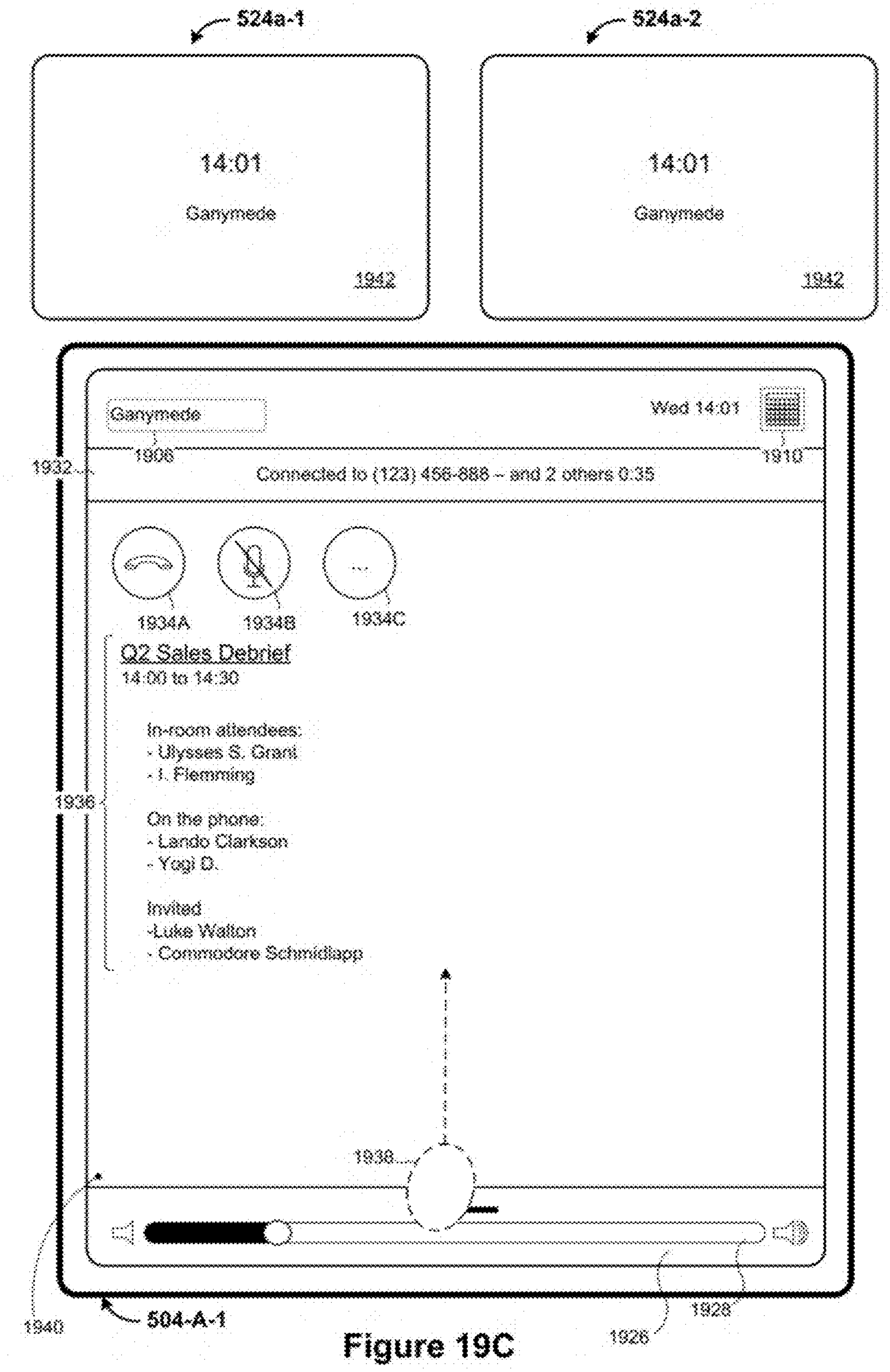
Figure 19D:
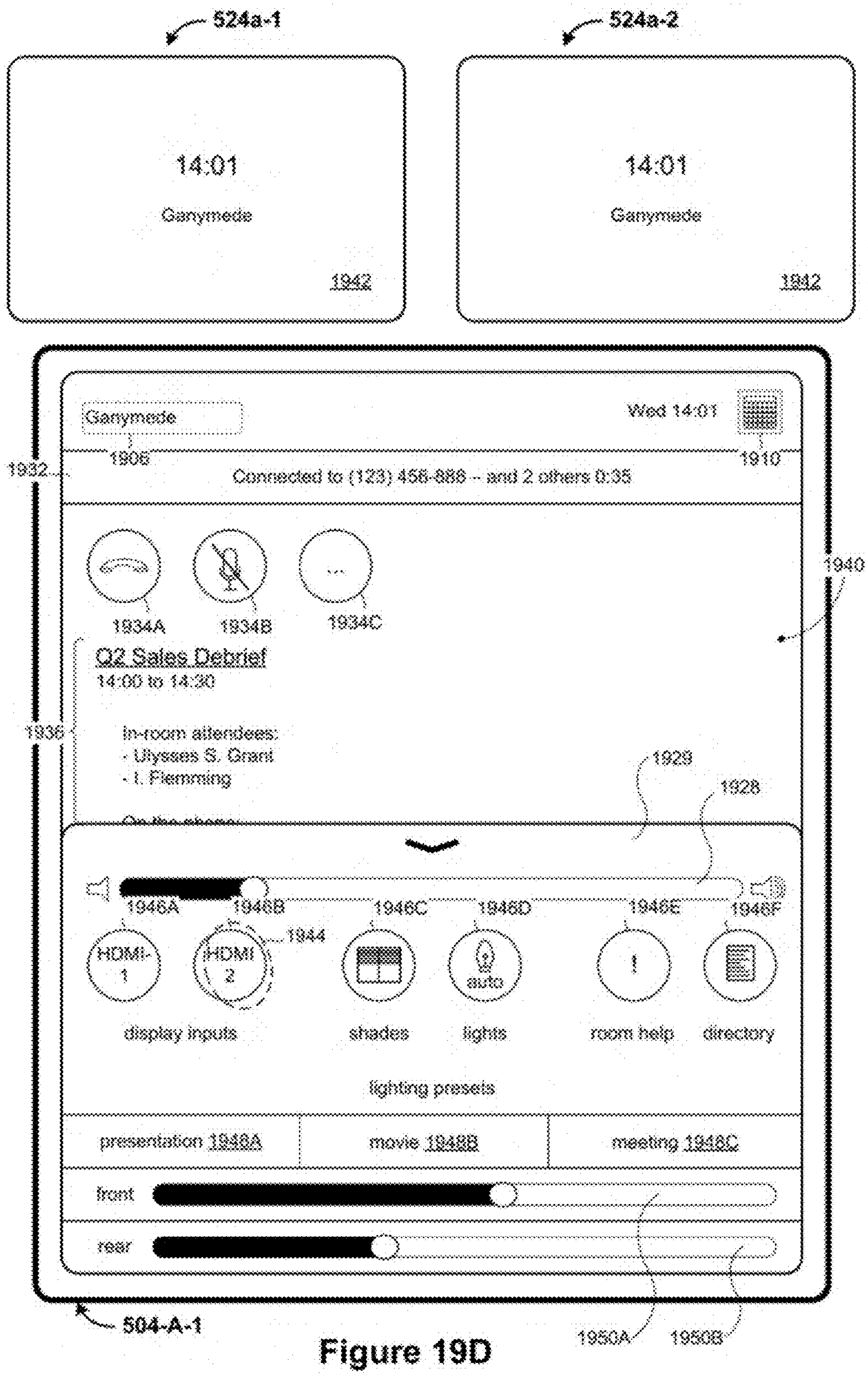

FIG. 19B illustrates the second device 504-A-1 associated with the Ganymede meeting space displaying a teleconference interface 1930. As shown in FIG. 19B, the teleconference interface 1930 includes: a mute affordance 1922A, which, when activated (e.g., with a contact), causes the audio input of the second device 504-A-1 and/or other microphones associated with the meeting space to be muted; a keypad affordance 1922B, which, when activated (e.g., with a contact), causes the teleconference interface 1930 to be replaced with a keypad; a speaker affordance 1922C, which, when activated (e.g., with a contact), causes the audio output associated with the teleconference to be amplified; an "add call" affordance 1922D, which, when activated (e.g., with a contact), causes the teleconference interface 1930 to be replaced with a contact list for adding an additional caller to the teleconference; a facetime affordance 1922E, which, when activated (e.g., with a contact), causes initiation of a videoconference; a contacts affordance 1922F, which, when activated (e.g., with a contact), causes the teleconference interface 1930 to be replaced with a contact list; and an end call affordance 1922G, which, when activated (e.g., with a contact), causes the user to leave the teleconference.

As shown in FIG. 19B, the teleconference interface 1930 also includes a minimize affordance 1942, which, when activated (e.g., with a contact), causes the teleconference interface 1930 to be replaced with a meeting manifest interface (e.g., the meeting manifest interface 1940 in FIG. 19C). The teleconference interface 1930 further includes a condensed control panel 1926 with a volume control bar 1928 provided to control the audio output volume of the second device 504-A-1 and/or other speakers associated with the Ganymede meeting space. According to some embodiments, a plurality of other controls associated with the control panel are accessible by performing an upward swipe gesture within the condensed control panel 1926 (e.g., the extended control panel 1929 in FIGS. 19D-19E).

FIG. 19C illustrates the second device 504-A-1 displaying a meeting manifest interface 1940 associated with the teleconference. As shown in FIG. 19, the meeting manifest interface 1940 includes an indication 1932 that the user is connected to the teleconference, other callers participating in the teleconference, and the length of the connection (e.g., 00:35 minutes). The meeting manifest interface 1940 also includes meeting information 1936 with the meeting title (e.g., Q2 Sales Debrief), the reservation length (e.g., 14:00 to 14:30), and a list of participants of the reservation (e.g., attendees in the Ganymede meeting space, call-in participants, and other invitees).

As shown in FIG. 19C, the manifest interface 1940 further includes: an end call affordance 1934A, which, when activated (e.g., with a contact), causes the user to leave the teleconference; a mute affordance 1934B, which, when activated (e.g., with a contact), causes the audio input of the second device 504-A-1 and/or other microphones associated with the meeting space to be muted; and an additional controls affordance 1934C, which, when activated (e.g., with a contact), causes one or more other controls to be displayed.

For example, as shown in FIG. 5B, the meeting space (e.g., meeting space 1, building A, which is also sometimes referred to herein as the Ganymede meeting space) includes a first display 524*a*-1 and a second display 524*a*-2. FIG. 19C also illustrates the first display 524*a*-1 displaying content 1942 (e.g., an idle screen with the time and meeting space name), and the second display 524*a*-2 displaying the content 1942.

FIG. 19C-19F show a sequence in which a user interacts with the control panel. FIG. 19C further illustrates an upward swipe gesture with a contact 1938 within the condensed control panel 1926. FIG. 19D illustrates extended control panel 1929 overlaid on the manifest interface 1940 in response to the upward swipe gesture in FIG. 19C. For example, the extended control panel 1929 slides up from the bottom edge of the second device 504-A-1.

As shown in FIG. 19D, the extended control panel 1929 includes: the volume control bar 1928 provided to control the audio output volume of the second device 504-A-1 and/or other speakers associated with the Ganymede meeting space; a first display input affordance 1946A provided to coordinate display of a first media input feed (e.g., HDMI-1) via the first display 524*a*-1 and/or the second display 524*a*-2; a second display input affordance 1946B provided to coordinate display of a second media input feed (e.g., HDMI 2) via the first display 524*a*-1 and/or the second display 524*a*-2; a shades affordance 1946C provided to display controls for controlling the window shades associated with the Ganymede meeting space; a lights affordance 1946D provided to display controls for controlling the lights associated with the Ganymede meeting space; a "room help" affordance 1946E provided display a problem reporting interface (e.g., as shown in FIGS. 6J-6P); and a directory affordance 1946F provided to display a directory (e.g., associated with employees of the corporate campus).

As shown in FIG. 19D, the extended control panel 1929 also includes: affordances 1948A, 1948B, and 1948C associated with lighting presets (e.g., a presentation preset, a movie preset, and a meeting preset, respectively). As shown in FIG. 19D, the extended control panel 1929 further includes: a front lighting control bar 1950A provided to control lights associated with the front area of the Ganymede meeting space; and a rear lighting control bar 1950B provided to control lights associated with the back area of the Ganymede meeting space.

Figure 19E:
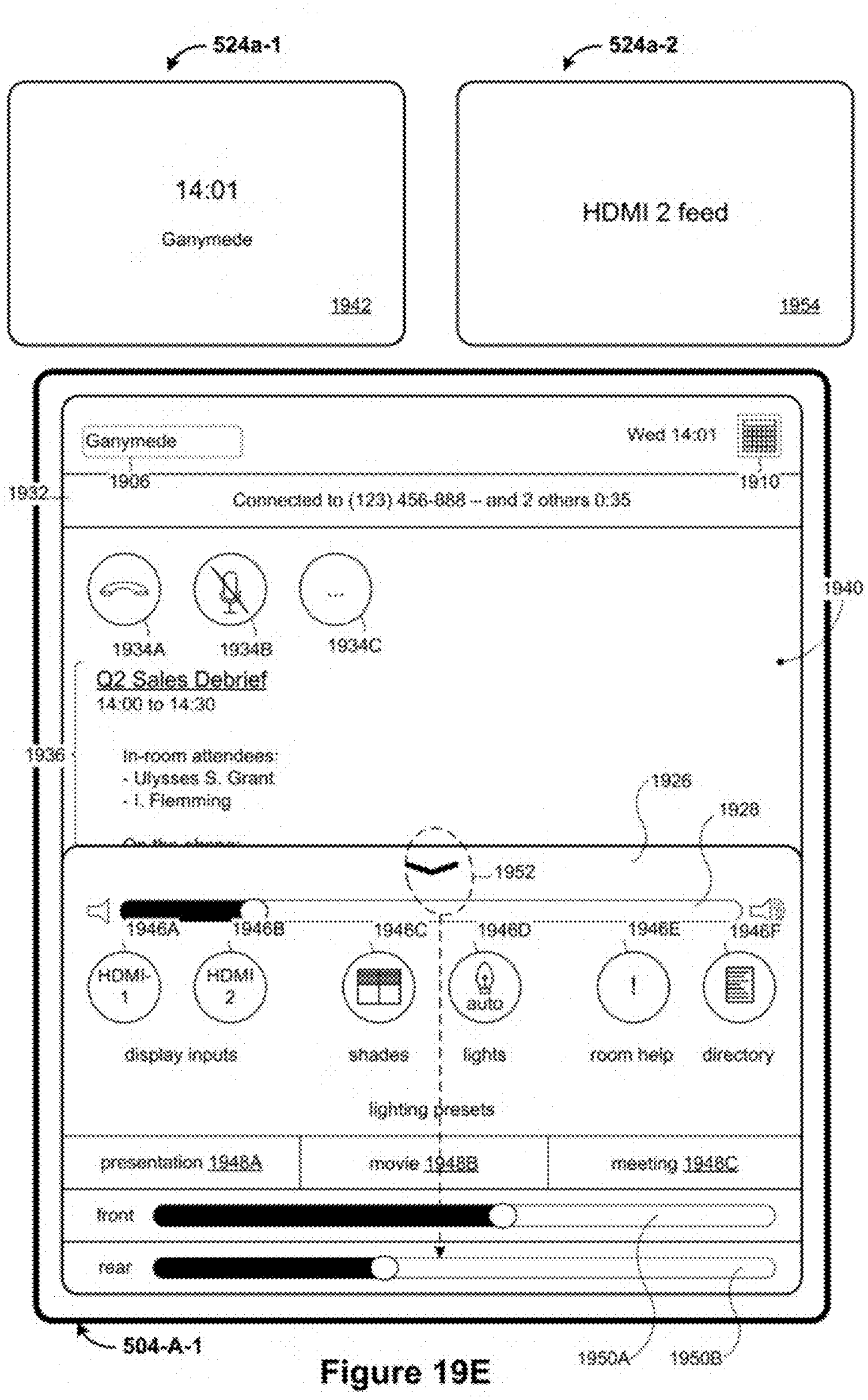

FIG. 19D also illustrates detecting a contact 1944 at a location corresponding to the second display input affordance 1946B. FIG. 19E illustrates the second display 524*a*-2 displaying the content 1954 associated with the first media input feed (e.g., HDMI 2) in response to selection of the second display input affordance 1946B in FIG. 19D. In some embodiments, the content 1954 is instead displayed by the first display 524*a*-1. In some embodiments, the content 1954 is displayed by both the first display 524*a*-1 and the second display 524*a*-2. FIG. 19E also illustrates the first display 524*a*-1 maintaining display of the content 1942 (e.g., an idle screen with the time and meeting space name).

Figure 19F:
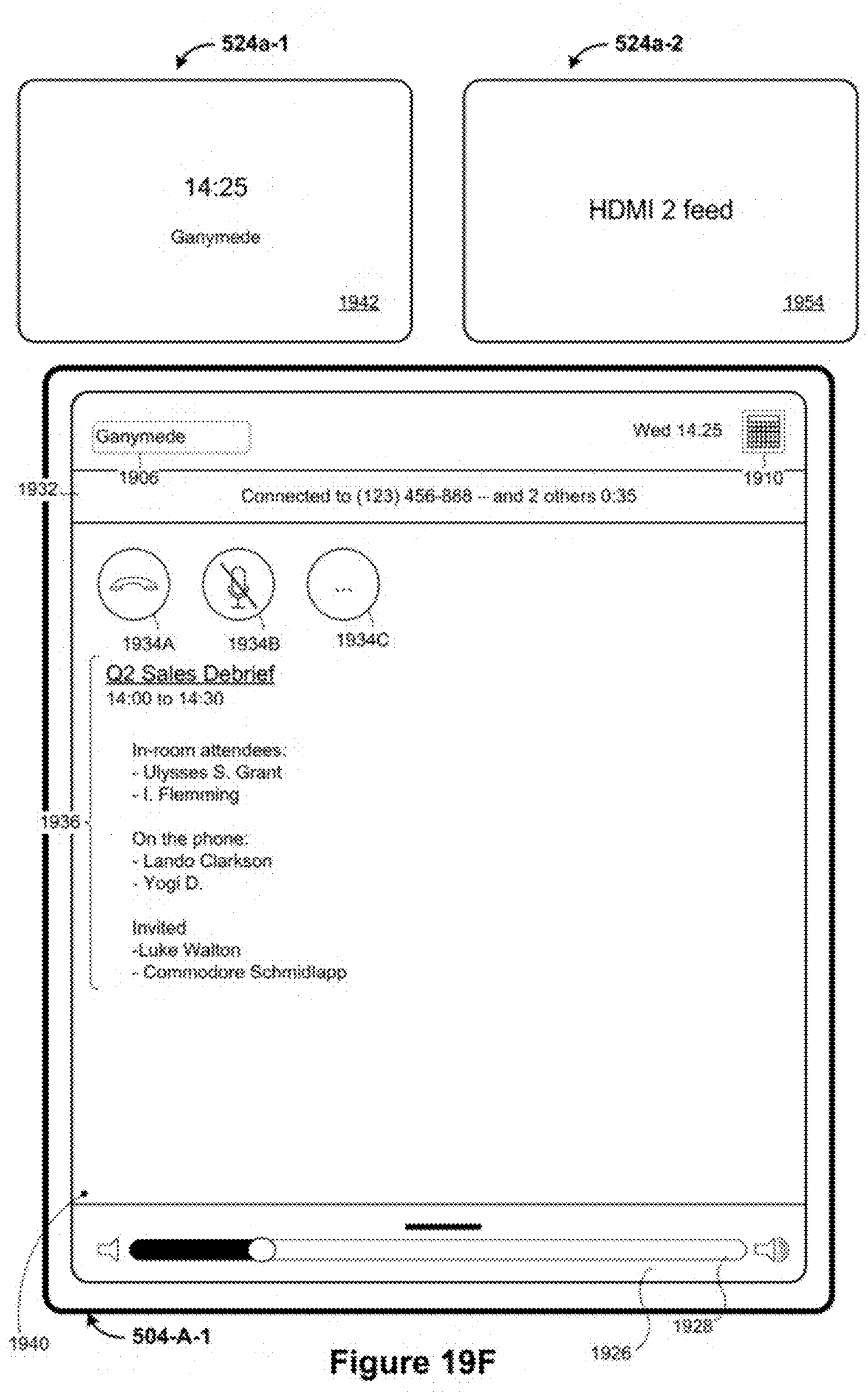

FIG. 19E further illustrates a downward swipe gesture with a contact 1952 within the extended control panel 1929. FIG. 19F illustrates displaying the condensed control panel 1926 in response to the downward swipe gesture in FIG. 19E. For example, the extended control panel 1929 slides down into the bottom edge of the second device 504-A-1. The manifest interface 1940 in FIG. 19F is similar to and adapted from the manifest interface 1940 in FIG. 19C. As such, the manifest interface 1940 in FIG. 19C and the manifest interface 1940 in FIG. 19F include similar elements labeled with the same reference number, which both have the same function. Only the differences are described herein for the sake of brevity.

Figure 19G:
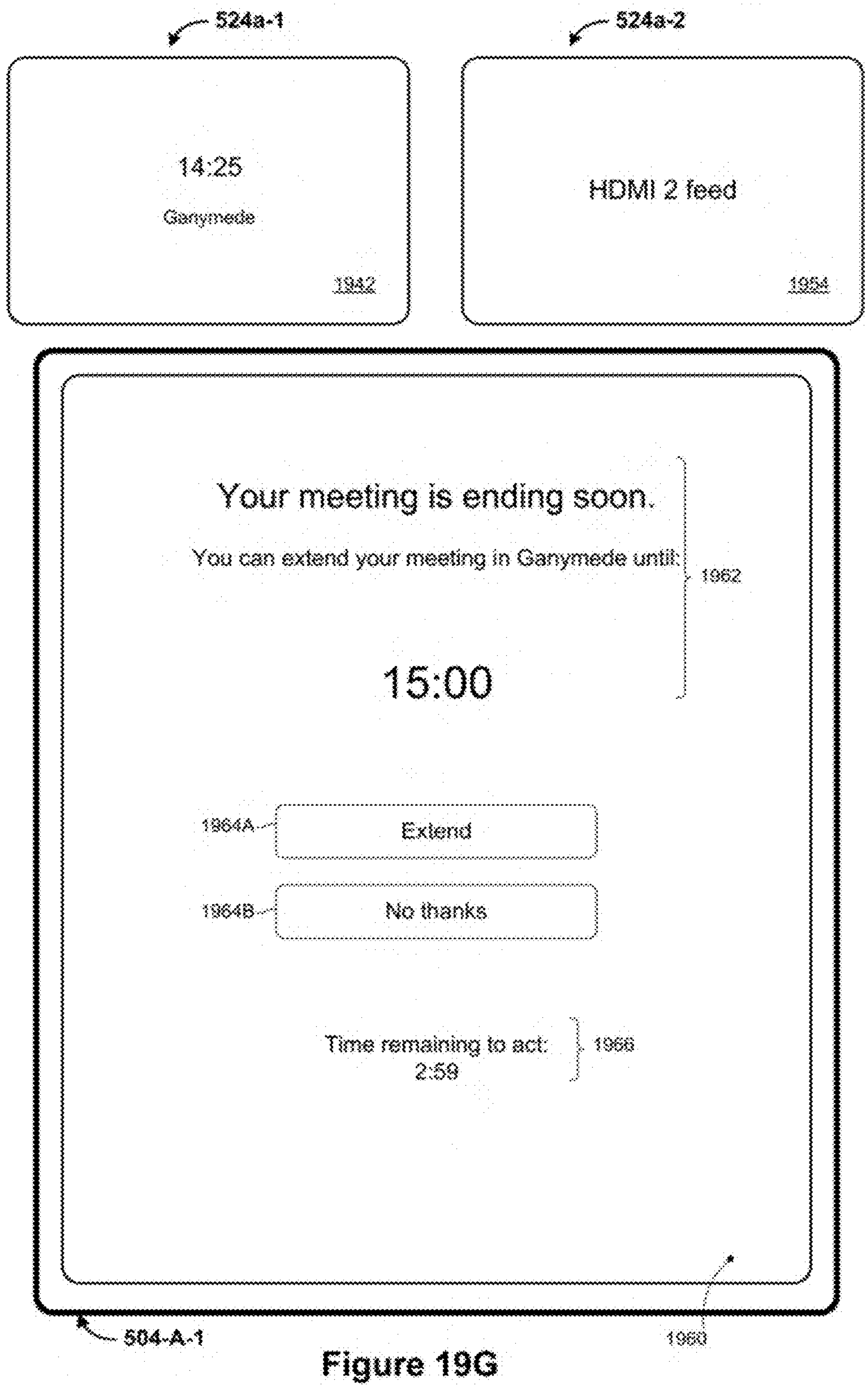

FIG. 19G illustrates the second device 504-A-1 displaying a first extension interface 1960 provided to continue the teleconference within the Ganymede meeting space. According to some embodiments, the first meeting extension interface 1960 is displayed when the current is a predetermined amount of time from the end time of the current reservation/meeting (e.g., 2, 3, 5, etc. minutes prior to the end of the reservation/meeting) and the meeting space is available after the end of the current reservation/meeting.

As shown in FIG. 19G, the first extension interface 1960 includes a prompt 1962 indicating that the meeting is ending soon and that the participants of the current meeting are able to continue the teleconference within the Ganymede meeting space by extending the reservation/meeting until 15:00. The first extension interface 1960 also includes: an extension affordance 1964A, which, when activated (e.g., with a contact), causes the current meeting to be extended until 15:00 and the first extension interface 1960 to be replaced with the meeting manifest interface 1940 (e.g., as shown in FIG. 19F); and a "No thanks" affordance 1964B, which, when activated (e.g., with a contact), causes the first extension interface 1960 to be replaced with the meeting manifest interface 1940 (e.g., as shown in FIG. 19F). As shown in FIG. 19G, the first extension interface 1960 further includes a timer 1966 indicating that the user has two minutes and fifty-nine seconds to extend the current meeting within the Ganymede meeting space.

Figure 19H:
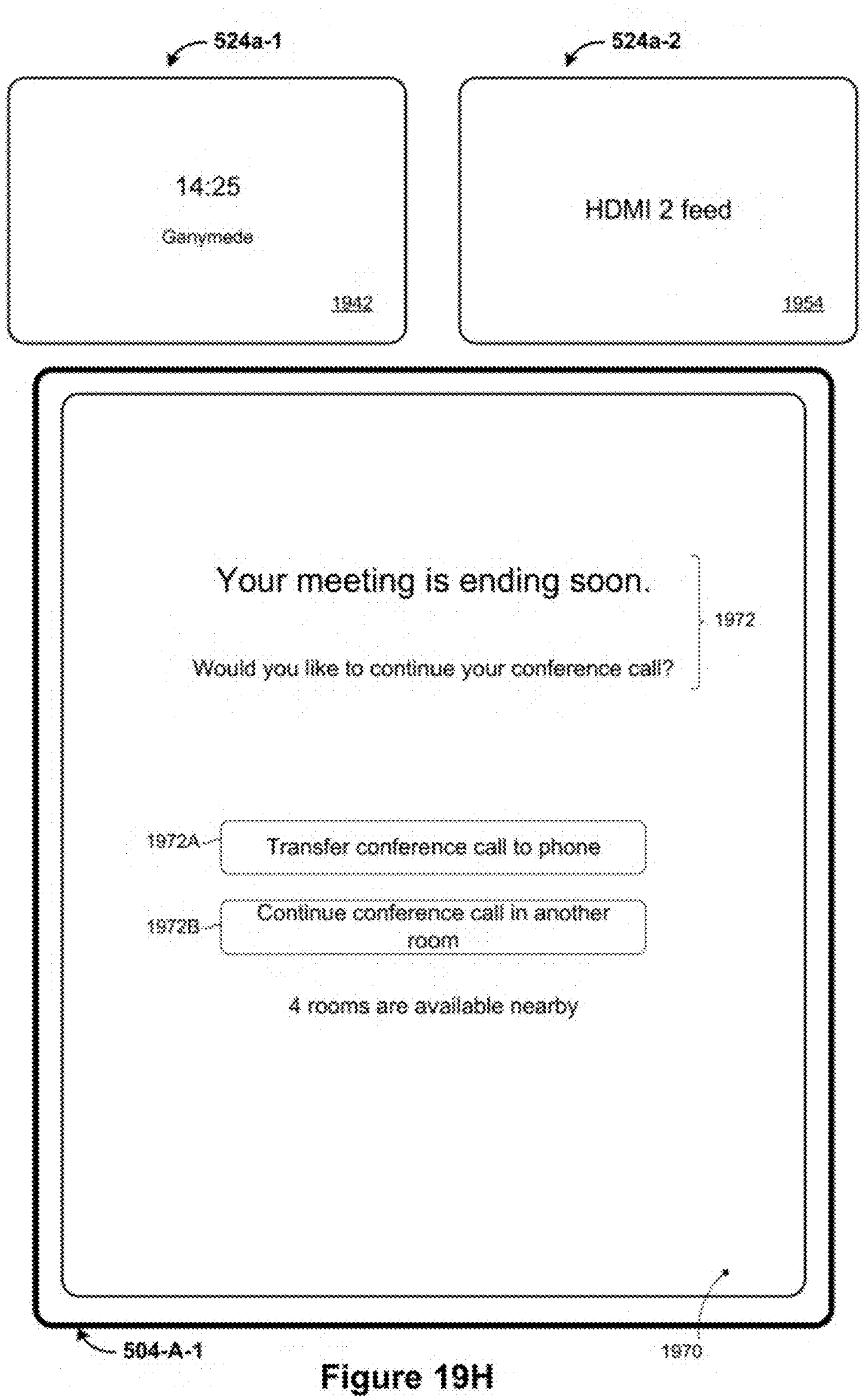

FIG. 19H illustrates the second device 504-A-1 displaying a second extension interface 1970 provided to continue the teleconference outside of the Ganymede meeting space. According to some embodiments, the second extension interface 1970 is displayed when the current is a predetermined amount of time from the end time of the current reservation/meeting (e.g., 2, 3, 5, etc. minutes prior to the end of the reservation/meeting) and the meeting space is unavailable after the end of the current reservation/meeting.

As shown in FIG. 19H, the second extension interface 1970 includes a prompt 1972 indicating that the meeting is ending soon and that the participants of the current meeting are able to continue the teleconference outside of the Ganymede meeting space by transferring the teleconference call to the phones of the meeting participants or by extending the reservation/meeting to an available meeting space. The second extension interface 1970 also includes: a first transfer affordance 1972A, which, when activated (e.g., with a contact), causes the teleconference to be transferred to the phones of the meeting participants (e.g., mobile phones, work phones, or the like) and the second extension interface 1970 to be replaced with the confirmation interface 1980 in FIG. 19I; and a second transfer affordance 1972B, which, when activated (e.g., with a contact), causes the second extension interface 1970 to be replaced with the available room interface 1990 in FIG. 19J.

Figure 19I:
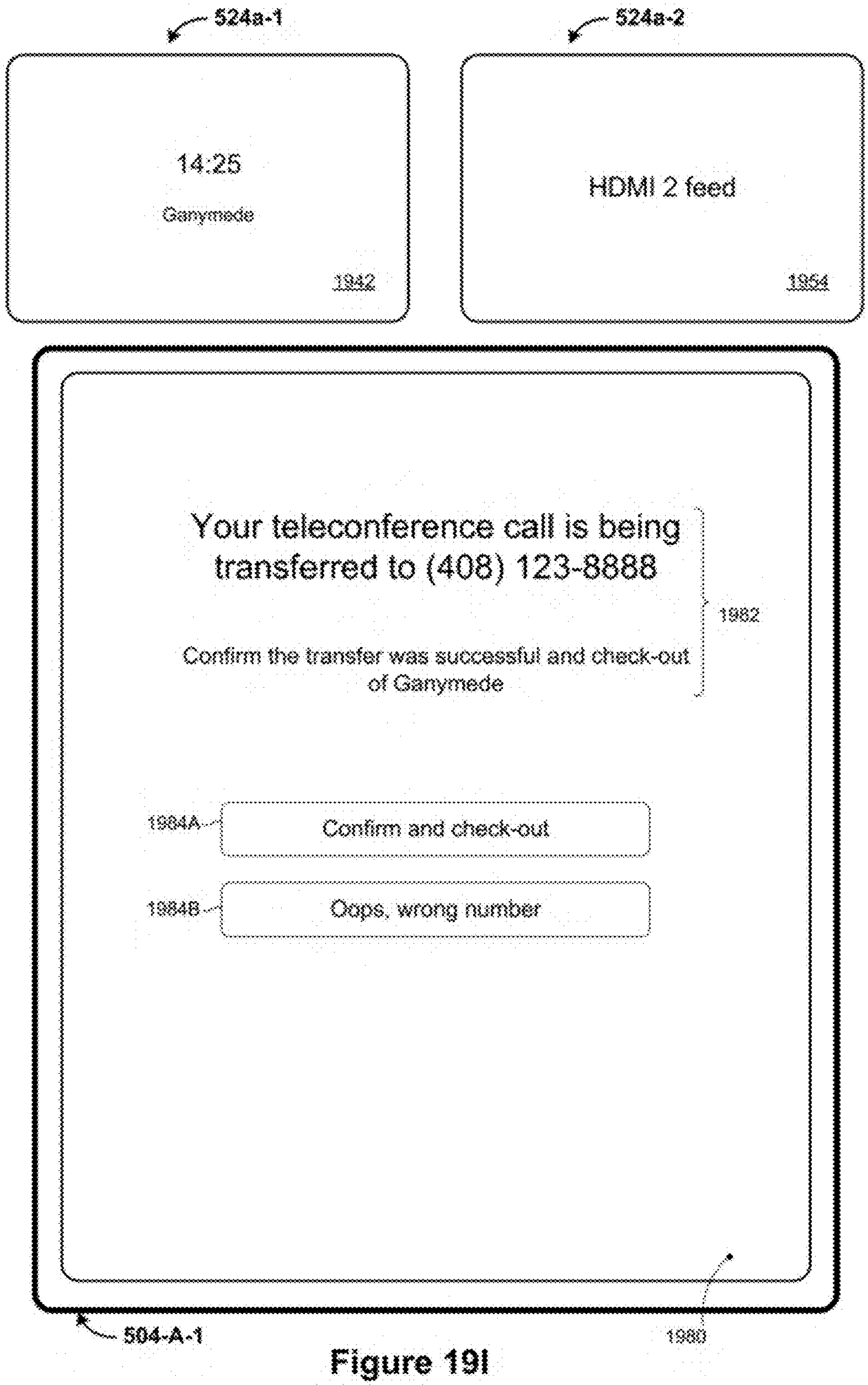

FIG. 19I illustrates the second device 504-A-1 displaying the confirmation interface 1980 in response to selection of the first transfer affordance 1972A in FIG. 19H (not shown). As shown in FIG. 19I, the confirmation interface 1980 includes a prompt 1982 notifying the user that the teleconference call is being transferred to (408) 123-8888 (e.g., the mobile or work number of the user). The confirmation interface 1980 also includes: a first affordance 1984A provided to confirm that the teleconference call transferred to the phone of the user and to check-out from the Ganymede meeting space; and a second affordance 1984B provided to enable the user to enter another phone number if the transfer was unsuccessful.

Figure 19J:
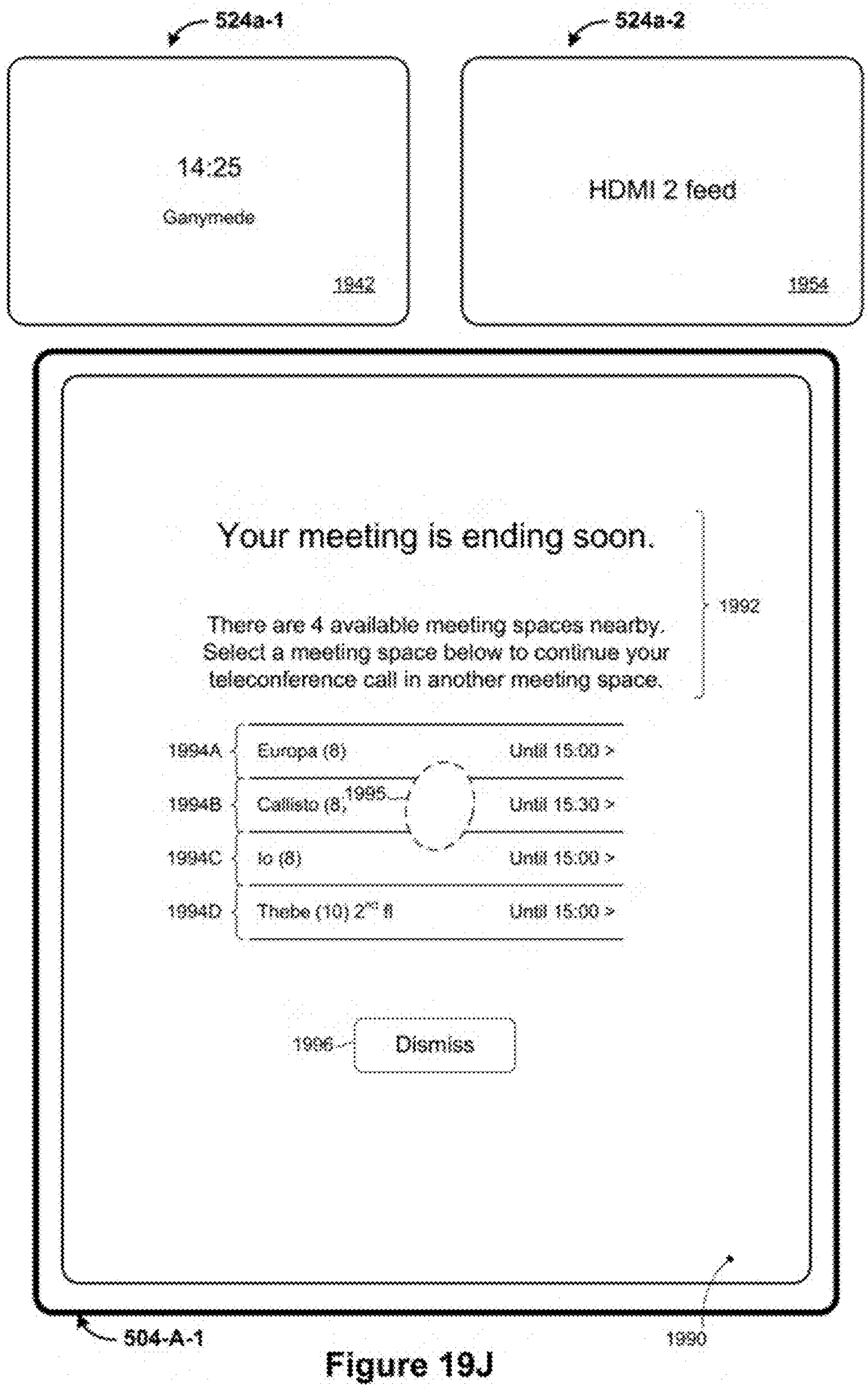
Figure 19K:
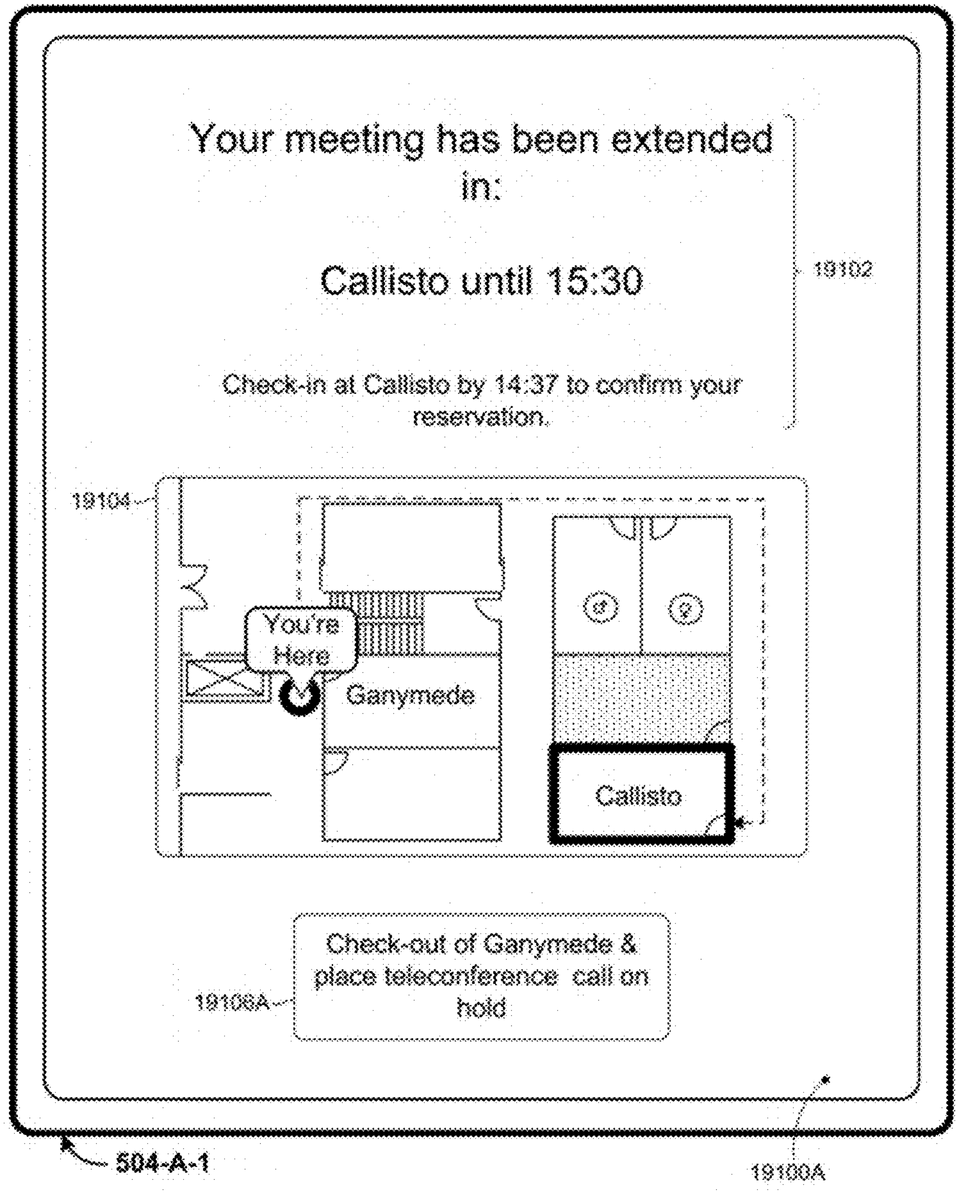

FIG. 19J illustrates the second device 504-A-1 displaying the available room interface 1990 in response to selection of the second transfer affordance 1972B in FIG. 19H (not shown). As shown in FIG. 19J, the available room interface 1990 includes a prompt 1992 notifying the user that there are available meeting spaces nearby in which the user can continue the teleconference call.

The available room interface 1990 also includes a plurality of affordances 1994A, 1994B, 1994C, and 1994D (sometimes collectively referred to as the "affordances 1994") associated with available meeting spaces. Each of the affordances 1994 is associated with a meeting space name, occupancy limit, and length of availability. When activated (e.g., with a contact), the affordances 1994 cause the available room interface 1990 to be replaced with the first extension confirmation interface 19100A in FIG. 19K or the second extension confirmation interface 19100B in FIG. 19L. As shown in FIG. 19J, the available room interface 1990 further includes a dismiss affordance 1996, which, when activated (e.g., with a contact), causes the available room interface 1990 to be replaced with the meeting manifest interface 1940 (e.g., as shown in FIG. 19F). FIG. 19J also illustrates the second device 504-A-1 detecting a contact 1995 at a location corresponding to the affordance 1994B (e.g., associated with the available Callisto meeting space).

FIG. 19K illustrates the second device 504-A-1 displaying the first extension confirmation interface 19100A in response to selection of the affordance 1994B in FIG. 19J. As shown in FIG. 19K, the first extension confirmation interface 19100A includes a prompt 19102 indicating that the current meeting has been extended within the Callisto meeting space until 15:30 and that the user should check-in at the Callisto meeting space before 14:37 to confirm the reservation. The first extension confirmation interface 19100A also includes a plan view 19104 showing directions from the user's current location at the Ganymede meeting space to the Callisto meeting space. As shown in FIG. 19K, the first extension confirmation interface 19100A further includes a first affordance 19106A provided to check-out of the Ganymede meeting space and place the teleconference call on hold until the user checks in at the Callisto meeting space at which time the teleconference equipment associated with the Callisto meeting space will ring to complete the transfer of the teleconference call to the Callisto meeting space.

Figure 19L:
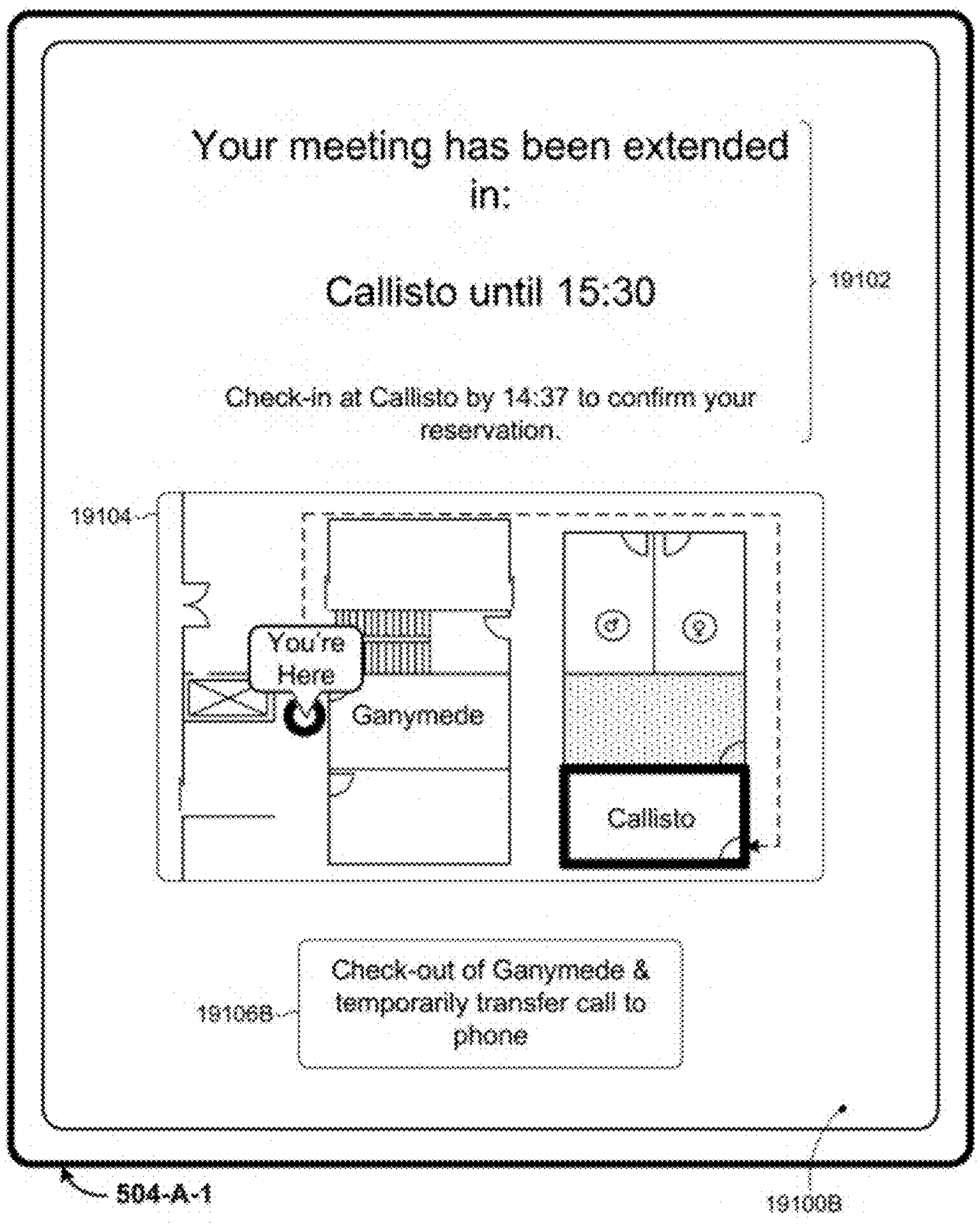

FIG. 19L illustrates the second device 504-A-1 displaying the second extension confirmation interface 19100B in response to selection of the affordance 1994B in FIG. 19J. The second extension confirmation interface 19100B in FIG. 19L is similar to and adapted from the first extension confirmation interface 19100A in FIG. 19K. As such, the first extension confirmation interface 19100A in FIG. 19K and the extension confirmation interface 19100B in FIG. 19L include similar elements labeled with the same reference number, which both have the same function. Only the differences are described herein for the sake of brevity. As shown in FIG. 19L, the second extension confirmation interface 19100B includes a second affordance 19106B provided to check-out of the Ganymede meeting space and temporarily transfer the teleconference call to the phone of the user until the user check-in at the Callisto meeting space. In this example, after the user checks in at the Callisto meeting space, the teleconference equipment associated with the Callisto meeting space will ring to complete the transfer of the teleconference call to the Callisto meeting space.

Figure 19M:
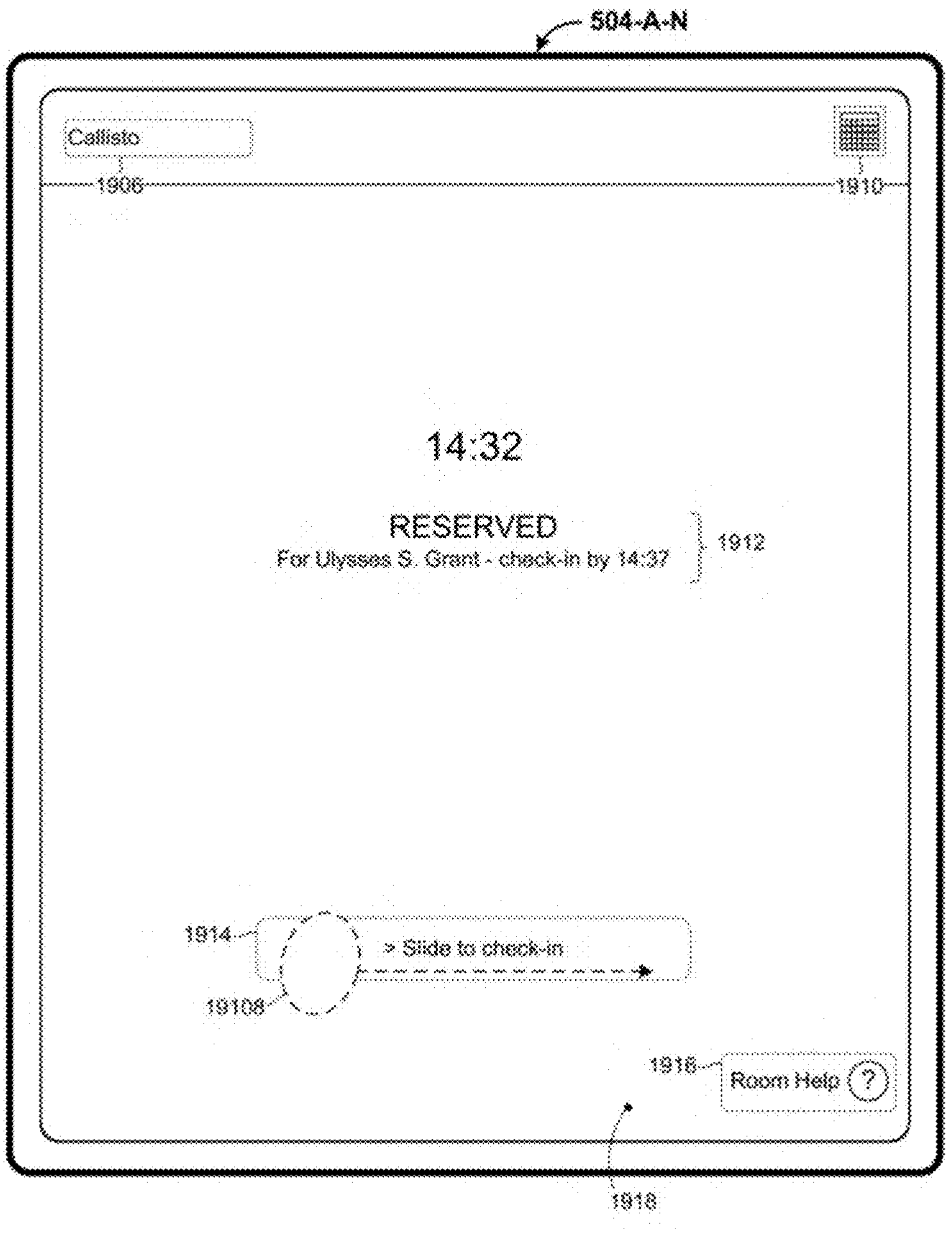

FIGS. 19M-19N show a sequence in which the teleconference call is transferred from the Ganymede meeting space to the Callisto meeting space. FIG. 19M shows the second device 504-A-N associated with the Callisto meeting space displaying a meeting status interface 1918 (e.g., the interior device associated with meeting space N, building A in FIGS. 5A-5B). In this example, the second device 504-A-N is located inside of the Callisto meeting space. The meeting status interface 1918 displayed by the second device 504-A-N in FIG. 19M is similar to and adapted from the meeting status interface 1918 displayed by the second device 504-A-1 in FIG. 19A. As such, the meeting status interface 1918 in FIG. 19A and the meeting status interface 1918 in FIG. 19M include similar elements labeled with the same reference number, which both have the same function. Only the differences are described herein for the sake of brevity. In FIG. 19M, the meeting space affordance 1906 indicates that the second device 504-A-N corresponds to the Callisto meeting space.

FIG. 19M also illustrates detecting a left-to-right swipe gesture with contact 19108 over the claiming affordance 1914. According to some embodiments, in response to detecting the swipe gesture in FIG. 19M, the second device 504-A-N displays a login interface prompting the user to manually enter his/her login credentials. In some embodiments, the login interface is replaced or supplemented with a prompt for biometric information (e.g., a voice sample, retina scan, fingerprint scan, or the like).

FIG. 19N illustrates the second device 504-A-N associated with the Callisto meeting space displaying the teleconference interface 1930. The teleconference interface 1930 displayed by the second device 504-A-N in FIG. 19N is similar to and adapted from the teleconference interface 1930 displayed by the second device 504-A-1 in FIG. 19C. As such, the teleconference interface 1930 in FIG. 19C and the teleconference interface 1930 in FIG. 19N include similar elements labeled with the same reference number, which both have the same function. Only the differences are described herein for the sake of brevity. In this example, the transfer of the teleconference call from the Ganymede meeting space to the Callisto meeting space is complete and the meeting has been extended in the Callisto meeting space until 15:30.

FIGS. 20A-20B illustrate a flow diagram of a method 2000 of updating a user interface displayed on a first device based on input from a second device in accordance with some embodiments. In some embodiments, the method 2000 is performed at a first electronic device (e.g., the portable multifunction device 100 in FIG. 1A, or the device 300 in FIG. 3) with one or more processors, non-transitory memory, a display, and one or more input devices. In some embodiments, the display is a touch-screen display and the input device is on or integrated with the display. In some embodiments, the display is separate from the input device. Some operations in method 2000 are, optionally, combined and/or the order of some operations is, optionally, changed.

As described below, the method 2000 provides an intuitive way to update the user interface based on a change in reservation information. The method reduces the cognitive burden on a user when updating the user interface based on a change in reservation information, thereby creating a more efficient human-machine interface. For battery-operated electronic devices, updating the user interface based on a change in reservation information faster and more efficiently conserves power and increases the time between battery charges.

For example, the first electronic device corresponds to the device 502-A-1 located outside of a meeting space in FIGS. 5A-5B, and the second electronic device corresponds to the device 504-A-1 located inside of the meeting space in FIGS. 5A-5B. In another example, the first electronic device corresponds to the device 504-A-1 located inside of the meeting space in FIGS. 5A-5B, and the second electronic device corresponds to the device 502-A-1 located outside of a meeting space in FIGS. 5A-5B.

The first electronic device displays (2002), on the display, a user interface that includes information about a schedule of meetings in a meeting space. In some embodiments, the information about the schedule of meetings in the meeting space includes a current reservation status of the meeting space (e.g., "MEETING IN PROGRESS," "MEETING STARTING SOON," "AVAILABLE," or "RESERVED"). In some embodiments, the information about the schedule of meetings in the meeting space includes a claiming affordance for claiming a "RESERVED" meeting space (e.g., the claiming affordance 1514 in FIG. 15B) or commandeering an "AVAILABLE" meeting space (e.g., the claiming affordance 1514 in FIG. 15A). In some embodiments, the information about the schedule of meetings in the meeting space includes a reservation schedule associated with the meeting space (e.g., accessible by selecting the affordance 1510 in FIG. 15A). In some embodiments, the information about the schedule of meetings in the meeting space includes outstanding problem reports associated with the meeting space (e.g., as shown by the badge 682 in FIG. 6S).

As one example, FIG. 15A shows the device 502-A-1 (e.g., a device located outside of the meeting space as shown in FIG. 5B) displaying meeting status interface 1518 with a status indicator 1512 indicating that the meeting space (e.g., named Ganymede) is "AVAILABLE" (e.g., the meeting space is unoccupied) and a claiming affordance 1514 enabled to commandeer the meeting space. Similarly, continuing with this example, FIG. 15A shows the device 504-A-1 (e.g., a device located inside of the meeting space as shown in FIG. 5B) displaying a meeting status interface 1520 with a status indicator 1512 indicating that the meeting space is "AVAILABLE" (e.g., the meeting space is unoccupied) and a claiming affordance 1514 enabled to commandeer the meeting space.

As another example, FIG. 15B shows the device 502-A-displaying meeting status interface 1518 with a status indicator 1512 indicating that the meeting space (e.g., named Ganymede) is "RESERVED" for an upcoming reservation for A. Broccoli and a claiming affordance 1514 enabled to claim the reservation. Similarly, continuing with this example, FIG. 15B shows the device 504-A-1 displaying a meeting status interface 1520 with a status indicator 1512 indicating that the meeting space is "RESERVED" for an upcoming reservation for A. Broccoli and a claiming affordance 1514 enabled to claim the reservation.

While displaying the user interface, the first electronic device determines (2004) that a change in reservation information for a respective meeting from the schedule of meetings in the meeting space has occurred based on input from a second electronic device that is associated with the meeting space. As one example, FIG. 15B shows the device 502-A-1 detecting a left-to-right swipe gesture over the claiming affordance 1514. As another example, FIG. 15D shows the device 502-A-1 detecting a right-to-left swipe gesture over the check-out affordance 1528. As yet another example, FIGS. 15H-15I show a sequence in the device 504-A-1 detects selection of an extension affordance 1542A and confirmation thereof. As yet another example, FIG. 15K shows the device 502-A-1 detecting a left-to-right swipe gesture over the claiming affordance 1514. As yet another example, FIG. 15Q shows the device 502-A-1 detecting selection of a doorbell affordance 1590. In some embodiments, the first and second electronic devices are communicatively coupled via a wired or wireless network. For example, the first and second electronic devices are communicatively coupled via a WLAN, a LAN, the Internet, a near-field communication (NFC) protocol, BLUETOOTH, or the like.

In some embodiments, the first electronic device is located (2006) inside the meeting space, and the second electronic device is located outside the meeting space. In some embodiments, the first electronic device corresponds to the device 504-A-1, and the second electronic device corresponds to the device 502-A-1. For example, the first electronic device is fixed to furniture in the meeting space (e.g., built into a desk or table). In another example, the first electronic device is fixed to an interior wall of the meeting space. In another example, the first electronic device is a portable device that is associated with the meeting space (e.g., not fixed to a wall or furniture, but locked/chained to furniture or movable).

In some embodiments, the first electronic device is (2008) a mobile device associated with a participant of the respective meeting, and the second electronic device is located outside the meeting space. In some embodiments, the first electronic device corresponds to a mobile device associated with a user (e.g., a mobile phone, laptop, or tablet), and the second electronic device corresponds to the device 502-A-1. For example, the mobile device displays a user interface for controlling the features/functions of the meeting space after entering the meeting space (e.g., after matching the location of the mobile device with the meeting space location). In another example, the mobile device displays the user interface for controlling the features/functions of the meeting space if the mobile device and the second electronic device are serviced by the same access point or are connected to the same WiFi network.

In another example, the mobile device displays the user interface for controlling the features/functions of the meeting space after the mobile device or the user thereof is authenticated as the organizer or a participant of a reservation of the meeting space. In this example, the mobile device or the user thereof is authenticated if login credentials manually entered by the user via the mobile device or the second electronic device match login credentials for the organizer or a participant of a reservation of the meeting space (e.g., as described with reference to FIGS. 17A-17D). In this example, the mobile device or the user thereof is authenticated if a participant ID associated with the mobile device matches a participant ID for the organizer or a participant of a reservation of the meeting space (e.g., as described with reference to FIGS. 16A-16C).

In some embodiments, the first electronic device is located (2010) outside the meeting space, and the second electronic device is located inside the meeting space. In some embodiments, the first electronic device corresponds to the device 502-A-1, and the second electronic device corresponds to the device 504-A-1. In some embodiments, the second electronic device is fixed to furniture in the meeting space (e.g., built into a desk or table). For example, the second electronic device is fixed to furniture in the meeting space (e.g., built into a desk or table). In another example, the second electronic device is fixed to an interior wall of the meeting space. In another example, the second electronic device is a portable device that is associated with the meeting space (e.g., not fixed to a wall or furniture, but locked/chained to furniture or movable).

In response to determining that the change in reservation information for the respective meeting has occurred, the first electronic device updates (2012) the user interface displayed on the display of the first electronic device to show the change in the reservation information. As one example, a user checks-in to an upcoming meeting using the exterior device (e.g., the change in reservation information), and, in response, the interior device displays a notification of the check-in. In another example, a user extends an ongoing meeting using the interior device (e.g., the change in reservation information), and, in response, the duration of the current meeting changes on the exterior device. In yet another example, a user check-out of an ongoing meeting using the interior device (e.g., the change in reservation information), and, in response, the exterior device indicates that the meeting space is available. In yet another example, a user uses a doorbell function of an exterior device, and, in response, the interior device displays a warning message.

Dynamically updating the user interface of the first electronic device based on input detected at the second electronic device provides the user of the first electronic device with visibility as to changes in in reservation information or actions performed outside/inside of the meeting space. Providing improved visibility as to changes in reservation information or actions performed outside/inside of the meeting space enhances the information available when making decisions concerning the current meeting to better utilize the limited number of meeting spaces on a corporate campus.

In some embodiments, the change in the reservation information corresponds to (2014) a participant checking-in to the respective meeting. In this example, the first electronic device corresponds to the interior device (e.g., the device 504-A-1), and the second electronic device corresponds to the exterior device (e.g., the device 502-A-1). In some embodiments, a user checks-in to an upcoming reservation by interacting with a claiming affordance displayed by the exterior device while the meeting space is unoccupied (e.g., the change in reservation information), and, in response, the status of the exterior and interior devices changes from "RESERVED" to "MEETING IN PROGRESS." In some embodiments, a user checks-in to an upcoming reservation by interacting with a claiming affordance displayed by the exterior device while the meeting space is occupied (e.g., the change in reservation information), and, in response, the status of the exterior device changes from "RESERVED" to "MEETING STARTING SOON" and the interior device displays a notification associated with the check-in.

As one example, FIGS. 15B-15C show a sequence in which a user input detected by the device 502-A-1 (e.g., the left-to-right swipe gesture over the claiming affordance 1514 in FIG. 15B) causes the status indicator 1512 displayed by the device 502-A-1 and the device 504-A-1 to change from "RESERVED" to "MEETING IN PROGRESS." In this example, a user checks-in to the upcoming reservation of the Ganymede meeting space via the device 502-A-1 while the meeting space is unoccupied. In some embodiments, the user instead checks-in to the upcoming reservation/meeting of the Ganymede meeting space via the device 504-A-1.

As another example, FIGS. 15K-15L show a sequence in which a user input detected by the device 502-A-1 (e.g., the left-to-right swipe gesture over the claiming affordance 1514 in FIG. 15K) causes the status indicator 1512 displayed by the device 502-A-1 to change from "RESERVED" to "MEETING STARTING SOON" and the device 504-A-1 to display a notification 1558. In this example, a user checks-in to the upcoming reservation of the Ganymede meeting space via the device 502-A-1 while the meeting space is occupied. For example, the notification 1558 notifies the participants of the ongoing meeting that the participants of the next meeting have arrived.

Dynamically updating the user interface of the interior device based on a check-in detected at the exterior device provides the user of the interior device with visibility as to changes in in reservation information or actions performed outside of the meeting space. Providing improved visibility as to changes in reservation information or actions performed outside of the meeting space enhances the information available to users of the interior device when making decisions concerning the current meeting to better utilize the limited number of meeting spaces on a corporate campus.

In some embodiments, the claiming affordance is enabled to claim a reservation between the early check-in threshold and the check-in deadline (e.g., a check-in window starting 15 minutes prior to the reservation start time and ending 7 minutes after the reservation start time). In some embodiments, the claiming affordance is enabled to commandeer an available room when the meeting space is available for at least a predefined amount of time before a next reservation (e.g., 30 minutes). For example, see FIGS. 6D, 6F, and 6I, and the description thereof. In some embodiments, the claiming affordance is disabled after checking-in to a reservation or commandeering an available meeting space. For example, see FIGS. 6E, 6G-6H, and 6J, and the description thereof.

In some embodiments, in response to determining that the change in reservation information for the respective meeting has occurred, the first electronic device displays (2016), on the display of the first electronic device, a notification indicating to the participants of a current meeting from the meeting schedule for the meeting space that one or more participants associated with the respective meeting have checked-in. As described above, if a user checks-in to an upcoming meeting via the device 502-A-1 while the meeting space is occupied, the device 504-A-1 displays a notification to the participants of the ongoing meeting within the meeting space indicating that the participants of the next meeting have arrived (e.g., as shown in FIGS. 15K-15L). Dynamically updating the user interface of the interior device based on a check-in detected at the exterior device provides the user of the interior device with visibility as to changes in reservation information or actions performed outside of the meeting space. Providing improved visibility as to changes in reservation information or actions performed outside of the meeting space enhances the information available to the user of the interior device when making decisions concerning the current meeting to better utilize the limited number of meeting spaces on a corporate campus.

In some embodiments, the change in the reservation information corresponds to (2018) an extension of the respective meeting from the meeting schedule for the meeting space via the second electronic device. In this example, the first electronic device corresponds to the exterior device (e.g., the device 502-A-1), and the second electronic device corresponds to the interior device (e.g., the device 504-A-1). In some embodiments, a user extends an ongoing reservation by interacting with an extension affordance displayed by the interior device (e.g., the change in reservation information), and, in response, the length of the reservation displayed by the exterior and interior devices changes. Dynamically updating the user interface of the exterior device based on extension of the meeting at the interior device provides the user of the exterior device with visibility as to changes in in reservation information or actions performed inside of the meeting space. Providing improved visibility as to changes in reservation information or actions performed inside of the meeting space enhances the information available to the user of the exterior device the when making decisions concerning the meeting space to better utilize the limited number of meeting spaces on a corporate campus.

As one example, FIGS. 15H-15J show a sequence in which a user input detected by the device 504-A-1 (e.g., selection of the extension affordance 1542A in FIG. 15H and confirmation thereof in FIG. 15I) causes the meeting status interfaces 1518 and 1520 displayed by the device 502-A-1 and the device 504-A-1, respectively, to be updated with a new reservation end time (e.g., 11:30 instead of 11:00). In this example, a user extends the ongoing reservation/meeting within the Ganymede meeting space via the device 504-A-1.

In some embodiments, the interior and exterior devices show different information near end of the current meeting. In one example, the exterior device shows check-in options, and the interior device shows the details associated with the current meeting. In another example the exterior device shows check-in options, and the interior device shows meeting extension options. In some embodiments, the interior device displays an extension menu a predefined time before the end of the meeting (e.g., 2, 3, 5, etc. minutes prior to the end of the meeting). In some embodiments, if current participant has not checked-out at end of current meeting, the interior device displays an extension menu. In some embodiments, if the meeting space is available after the end of the current meeting, the extension menu includes an option to extend the current meeting in the meeting space by X minutes (e.g., as shown in FIG. 15H). In some embodiments, if the meeting space is unavailable after the end of the current meeting, the extension menu includes available meeting spaces (e.g., with room attributes and length of availability) for extending the current meeting outside of the current meeting space (e.g., as shown in FIG. 15M).

In some embodiments, updating the user interface displayed on the display of the first electronic device includes (2020) changing a duration of the respective meeting. As described above, if a user extends the current meeting within the meeting space via the device 504-A-1, the device 504-A-1 and the device 502-A-1 display the changed length of the reservation (e.g., as shown in FIGS. 15H-15J).

In some embodiments, the change in the reservation information corresponds to (2022) a participant checking-out of the respective meeting from the meeting schedule for the meeting space via the second electronic device. In this example, the first electronic device corresponds to the exterior device (e.g., the device 502-A-1), and the second electronic device corresponds to the interior device (e.g., the device 504-A-1). In some embodiments, a user checks-out of an ongoing reservation by interacting with the interior device (e.g., the change in reservation information), and, in response, the status of the exterior and interior devices changes from "MEETING IN PROGRESS" to "AVAILABLE." In this example, the user interface displayed by the interior device includes a check-out affordance provided to end a meeting early (e.g., the check-out affordance 1528 in FIG. 15D). In some embodiments, after check-out, the meeting space is released for local takeover or remote reservation. Dynamically updating the user interface of the exterior device based on check-out of the meeting at the interior device provides the user of the exterior device with visibility as to changes in reservation information or actions performed inside of the meeting space. Providing improved visibility as to changes in reservation information or actions performed inside of the meeting space enhances the information available to the user of the exterior device the when making decisions concerning the meeting space such as local takeover to better utilize the limited number of meeting spaces on a corporate campus.

For example, FIGS. 15D-15F show a sequence in which a user input detected by the device 504-A-1 (e.g., the right-to-left swipe gesture over the check-out affordance 1528 in FIG. 15D) causes the status indicator 1512 displayed by the device 502-A-1 and the device 504-A-1 to change from "MEETING IN PROGRESS" to "AVAILABLE." In this example, a user checks-out from an ongoing reservation/meeting via the device 504-A-1 to release the meeting space.

In some embodiments, updating the user interface displayed on the display of the first electronic device includes (2024) changing a reservation status of the meeting space from occupied to available. As described above, if a user check-out from current meeting via the device 504-A-1, the status displayed by the device 504-A-1 and the device 502-A-1 changes from "MEETING IN PROGRESS" to "AVAILABLE" (e.g., as shown in FIGS. 15D-15F).

In some embodiments, the change in the reservation information corresponds to (2026) an end of a reservation after checking-in to the respective meeting from the meeting schedule for the meeting space via the second electronic device. In this example, the first electronic device corresponds to the exterior device (e.g., the device 502-A-1), and the second electronic device corresponds to the interior device (e.g., the device 504-A-1). For example, a user checks-in to an upcoming meeting using the exterior device and the participants in the meeting space ignore alerts from interior device indicating that their meeting has ended (e.g., the change in reservation information). In this example, if the participants of the previous meeting do not leave the meeting space, the exterior device displays a doorbell affordance provided to alert the participants in the meeting space that their meeting has ended.

As one example, FIGS. 15P-15R show a sequence in which the failure of the participants of an expired meeting/reservation (e.g., the reservation for A. Broccoli from 10:00 to 11:30) to leave a meeting space causes the device 502-A-1 to display a doorbell affordance 1590, and selection of the doorbell affordance 1590 (e.g., with the contact in FIG. 15Q) causes the device 504-A-1 to present an alert to the participants of an expired meeting/reservation to vacate the meeting space.

In some embodiments, in response to determining that the change in reservation information for the respective meeting has occurred, the first electronic device displays (2028), on the display of the first electronic device, a doorbell affordance provided to alert participants within the meeting space of the end of the reservation through the second electronic device. In some embodiments, the doorbell affordance is displayed for a limited time (e.g., 1-120 seconds after next meeting starts). In some embodiments, the doorbell affordance is displayed after authentication of a participant of the next reservation.

Dynamically updating the user interface of the exterior device to include a doorbell affordance based on the failure of the participants of the expired meeting to leave the meeting space provides the participants of the current reservation with non-invasive means to alert the participants of the expired meeting to vacate the meeting space. Providing non-invasive means of alerting the participants of the expired meeting to vacate the meeting space improves the utilization of the limited number of meeting spaces on a corporate campus and maintains the integrity of the reservation schedule.

For example, FIG. 15Q shows the device 502-A-1 displaying the doorbell affordance 1590. Continuing with this example, FIG. 15R shows the device 504-A-1 displaying expiration alert interface 1594 notifying the participants of the expired meeting/reservation to vacate the meeting space. In some embodiments, the notification is accompanied by an audible alert or message provided by the device 504-A-1 and/or the audio/video equipment within the meeting space.

It should be understood that the particular order in which the operations in FIGS. 20A-20B have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 2100, 2200, 2300, 3000, 3100, 3200, and 3300) are also applicable in an analogous manner to method 2000 described above with respect to FIGS. 20A-20B. For example, the user interface objects and focus selectors described above with reference to method 2000 optionally have one or more of the characteristics of the user interface objects and focus selectors described herein with reference to other methods described herein (e.g., methods 900, 1000, 1100, 2100, 2200, 2300, 3000, 3100, 3200, and 3300). For brevity, these details are not repeated here.

FIGS. 21A-21D illustrate a flow diagram of a method 2100 of confirming a reservation of a meeting space in accordance with some embodiments. In some embodiments, the method 2100 is performed at a computer system (e.g., the controller 510 in FIG. 5A) with one or more processors and non-transitory memory. some embodiments, the method 2100 is performed at a computer system (e.g., one of the first electronic device 502-A-1 in FIGS. 5A-5B or the second electronic device 504-A-1 in FIGS. 5A-5B that corresponds to the portable multifunction device 100 in FIG. 1A or the device 300 in FIG. 3) with one or more processors, non-transitory memory, a display, and one or more input devices. In some embodiments, the display is a touch-screen display and the input device is on or integrated with the display. In some embodiments, the display is separate from the input device. Some operations in method 2100 are, optionally, combined and/or the order of some operations is, optionally, changed.

As described below, the method 2100 provides an intuitive way to confirm a reservation of a meeting space. The method reduces the cognitive burden on a user when confirming a reservation of a meeting space, thereby creating a more efficient human-machine interface. For battery-operated electronic devices, enabling a user to confirm a reservation of a meeting space faster and more efficiently conserves power and increases the time between battery charges.

In some embodiments, the computer system corresponds to a controller (e.g., the controller 510 in FIG. 5A) that manages meeting spaces on a corporate campus (e.g., as shown in FIGS. 16A-16B). In some embodiments, the controller is communicatively coupled to a first electronic device located outside of the meeting space (e.g., the device 502-A-1 in FIG. 5B) and a second electronic device located inside of the meeting space (e.g., the device 504-A-1 in FIG. 5B). For example, the first and second electronic devices are connected to the controller through a LAN, WLAN, VLAN, WAN, the Internet, or the like. In some embodiments, the computer system corresponds to a meeting space device (e.g., the device 502-A-1, or the device 504-A-1 in FIG. 5B) with a display and one or more input devices such as one of the first or second electronic devices associated with the meeting space (e.g., as shown in FIG. 16C).

The computer system obtains (2102) a reservation schedule associated with a meeting space that has a plurality of scheduled meetings including a next meeting that has not yet been confirmed. In some embodiments, the computer system has access to a master scheduling database for meeting spaces within a building or corporate campus (e.g., the scheduling database 525 in FIG. 5A). In this example, the master scheduling includes reservation times and participant lists for each reservation. In some embodiments, the computer system has access to a portion of a scheduling database (e.g., the scheduling database 525 in FIG. 5A) associated with a particular meeting space that corresponds to the computer system. In some embodiments, obtaining the reservation schedule includes obtaining the scheduling database for a particular time period (e.g., 24 hours, or the next 6 hours). In some embodiments, obtaining the reservation schedule includes obtaining a portion of the scheduling database that corresponds to the meeting space. In some embodiments, obtaining the reservation schedule includes retrieving the reservation schedule from a scheduling database (e.g., the scheduling database 525 in FIG. 5A). In some embodiments, obtaining the reservation schedule includes receiving the reservation schedule from a scheduling database (e.g., the scheduling database 525 in FIG. 5A) after a request therefor.

The computer system obtains (2104) a proximity indicator indicating that a portable device (e.g., a user device such as an iPhone, iPad, or MacBook associated with a user) is within a predefined distance of the meeting space. In some embodiments, the proximity indicator includes a participant ID associated with the portable device or the user thereof and/or a location ID associated with the meeting space.

In some embodiments, the meeting space device (e.g., that corresponds to the computer system, or is communicatively coupled to the computer system) detects a beacon signal broadcast by the portable device as shown in FIGS. 16B-16C. For example, the computer system detects the beacon signal when the portable device comes within X meters of the meeting space and has a signal strength of −Y dB. In some embodiments, the portable device detects a beacon signal broadcast by the meeting space device (e.g., that corresponds to the computer system, or is communicatively coupled to the computer system) as shown in FIG. 16A. For example, the portable device detects the beacon signal when the portable device comes within X meters of the meeting space and has a signal strength of −Y dB. In yet another example, both the portable device and the meeting space device are serviced by the same access point associated with a meeting space.

In some embodiments, the proximity indicator includes (2106) the participant identifier associated with the portable device and a location identifier associated with the meeting space. In some embodiments, the proximity indicator includes a participant identifier (ID) (sometimes also herein called a "user ID") that corresponds to the name of the user associated with the portable device, a unique number associated with the user of the portable device, a unique number associated with the portable device, the MAC address of the portable device, or the like. In some embodiments, the proximity indicator includes a location ID (sometimes also herein called a "meeting space (MS) ID") that corresponds to the name of the meeting space, a location associated with the meeting space, a unique number associated with the meeting space, a unique number associated with the meeting space device (e.g., associated with the exterior device 502-A-1, or the interior device 504-A-1 in FIG. 5B), the MAC address of the meeting space device, or the like. In some embodiments, the proximity indicator also includes a timestamp, signal strength value, model name associated with the portable device and/or the meeting space device, version number of the beacon application associated with the portable device and/or the meeting space device, and/or the like.

In some embodiments, obtaining the proximity indicator includes (2108) receiving the proximity indicator from the portable device. For example, the portable device is a mobile phone associated with a participant of a next meeting. In some embodiments, the portable device of the user detects a beacon signal broadcast by the meeting space device (e.g., associated with the exterior device 502-A-1 or the interior device 504-A-1 in FIG. 5B) when it comes within X meters of the meeting space and/or has a signal strength of −Y dB. According to some embodiments, this example assumes that a beacon application executed by the portable device searches for a beacon signal, and that the meeting space device also executes a beacon application that advertises its location ID.

In some embodiments, obtaining the proximity indicator includes (2110) receiving the proximity indicator from a device associated with the meeting space. For example, the portable device is a mobile phone associated with a participant of a next meeting. In some embodiments, the meeting space device (e.g., associated with the exterior device 502-A-1 or the interior device 504-A-1 in FIG. 5B) detects a beacon signal broadcast by the portable device of the user when it comes within X meters of the meeting space and/or has a signal strength of −Y dB. According to some embodiments, this example assumes that a beacon application executed by the meeting space searches for a beacon signal, and that the portable device also executes a beacon application that advertises its participant ID.

In response to obtaining the proximity indicator (2112), and in accordance with a determination that the proximity indicator includes a participant identifier (e.g., a value or user ID that corresponds to a respective participant of a plurality of participants) associated with an upcoming reservation (e.g., an organizer and/or participant in the next reservation) of the meeting space based on the reservation schedule associated with the meeting space, the computer system confirms (2114) the upcoming reservation of the meeting space. In some embodiments, the computer system performs a confirmation process to determine whether to allow the user to confirm (e.g., claim or check-in to) the upcoming reservation of the meeting space. According to some embodiments, in response to obtaining the proximity indicator, the computer system obtains a reservation schedule for the meeting space based on the location ID to identify candidate participant IDs associated with the participants of the upcoming reservation of the meeting space (e.g., pre-cached after performing step 2102 or triggering step 2102). After identifying the candidate participant IDs, the computer system confirms the user if the participant ID associated with the proximity indicator matches one of the identified candidate participant IDs. In some embodiments, the computer system also has access to a directory of employees working within the building or corporate campus.

According to some embodiments, in response to obtaining the proximity indicator, the computer system obtains a reservation schedule for the meeting space based on the location ID to identify a candidate participant ID associated with the organizer of the upcoming reservation of the meeting space (e.g., pre-cached after performing step 2102 or triggering step 2102). After identifying the candidate participant ID associated with the organizer, the computer system confirms the user if the participant ID associated with the proximity indicator matches the candidate participant ID associated with the organizer of the upcoming reservation of the meeting space. Confirming upcoming reservations by way of a proximity indicator reduces the burden on users to manually check-in to reservations and manually authenticate his/her identity by entering login credentials. This passive confirmation process provides a seamless user experience that requires less time and user inputs, which, additionally, reduces power usage and improves battery life of the device by enabling the user to use the device more quickly and efficiently.

In some embodiments, the confirmation process is performed by the server as shown in FIG. 16A-16B, and the meeting space device receives an instruction to confirm the user from the server. In some embodiments, a pending authorization interface is displayed by the meeting space device as shown in FIG. 16C (e.g., associated with the exterior device 502-A-1 or the interior device 504-A-1 in FIG. 5B). In some embodiments, if the user is confirmed, the computer system transmits an instruction to the meeting space device to confirm the upcoming reservation. According to some embodiments, in response to obtaining the instruction, the meeting space device passively claims or checks-in to the upcoming reservation. For example, in response to obtaining the instruction, the meeting space device checks-in the upcoming reservation without the user interacting with the claiming affordance and updates the status from "RESERVED" to "MEETING IN PROGRESS" if the meeting space is unoccupied or "MEETING STARTING SOON" if the meeting space is still occupied. In some embodiments, in response to obtaining the instruction, the meeting space device displays a meeting manifest interface (e.g., as shown in FIG. 7D or 19C).

In some embodiments, confirming the upcoming reservation of the meeting space includes (2116): in accordance with a determination that the meeting space is currently available, changing the reservation status of the meeting space from reserved to occupied. For example, if the confirmation process confirms the user to claim an upcoming reservation (e.g., as described in step 2114) while the meeting space is unoccupied, the meeting space device (e.g., the exterior device 502-A-1, and the interior device 504-A-1) changes its status from "RESERVED" to "MEETING IN PROGRESS" (e.g., as shown in FIGS. 17A and 15A-15B). Dynamically updating the reservation status of the meeting space provides feedback to the users as to the availability of the meeting space. This helps to better utilize the limited number of meeting spaces on a corporate campus.

In some embodiments, confirming the upcoming reservation of the meeting space includes (2118): in accordance with a determination that the meeting space is currently occupied, changing the reservation status of the meeting space from reserved to meeting starting soon. For example, if the confirmation process confirms the user to claim an upcoming reservation (e.g., as described in step 2114) while the meeting space is occupied, the meeting space device (e.g., the exterior device 502-A-1) changes its status from "RESERVED" to "MEETING STARTING SOON" (e.g., as shown in 15K-15L). Dynamically updating the reservation status of the meeting space provides feedback to the users as to the availability of the meeting space. This helps to better utilize the limited number of meeting spaces on a corporate campus.

In some embodiments, confirming the upcoming reservation of the meeting space includes (2120): transmitting an instruction to the portable device to display a notification to participants of a current meeting indicating that one or more participants associated with the upcoming reservation have checked-in. For example, if the confirmation process confirms the user to claim the upcoming reservation (e.g., as described in step 2114) while the meeting space is occupied, the meeting space device (e.g., the interior device 504-A-1) notifies the participants of the ongoing reservation that the participants of the next reservation have checked-in (e.g., as shown in 15K-15L). Dynamically updating the user interface of the interior device based on check-in detected at the exterior device provides the user of the interior device with visibility as to changes in in reservation information or actions performed outside of the meeting space. Providing improved visibility as to changes in reservation information or actions performed outside of the meeting space enhances the information available to users of the interior device when making decisions concerning the current meeting to better utilize the limited number of meeting spaces on a corporate campus.

In some embodiments, after confirming the upcoming reservation of the meeting space, the computer system displays (2122), on a display, a meeting manifest interface associated with details of the upcoming reservation. For example, if the confirmation process confirms the user to claim an upcoming reservation (e.g., as described in step 2114), the meeting space device (e.g., the interior device 504-A-1) displays a meeting manifest interface (e.g., as shown in FIGS. 7D and 19C) that includes details associated with the confirmed reservation. For example, the meeting manifest includes a list of attendees and invitees, meeting details, meeting attachments, meeting notes, and/or the like. As such, the user is able to access the meeting manifest after passive confirmation by way of the proximity indicator. This stops non-participants of the meeting from viewing potentially confidential meeting details and also reduces the number of inputs needed to access the meeting manifest.

In some embodiments, the computer system (2124): after confirming the upcoming reservation of the meeting space, transmits an instruction to the portable device to display a notification at the portable device prompting a user of the portable device to enter login credentials; in response to transmitting the instructing, obtains login credentials from the portable device; and, in accordance with a determination that the login credentials correspond to one of a plurality of participants associated with an upcoming reservation of the meeting space based on the reservation schedule associated with the meeting space, displays, on a display, a meeting manifest interface associated with details of the upcoming reservation. In some embodiments, even if the confirmation process confirms the user to claim the upcoming reservation, the meeting space device (e.g., the interior device 504-A-1) displays meeting manifest interface after login credentials are validated.

In some embodiments, the meeting space device displays an interface requesting that the user input his/her login credentials via the meeting space device, and the meeting space device (or a server) confirms the login credentials. In some embodiments, the portable device displays an interface requesting that the user input his/her login credentials via the portable device, and the meeting space device (or a server) confirms the login credentials. In some embodiments, the interface requesting the login credentials is replaced or supplemented with a prompt for biometric information (e.g., a voice sample, retina scan, fingerprint scan, or the like).

In some embodiments, after obtaining the login/biometric credentials, the meeting space device performs a confirmation process to determine whether to allow the user to enter authenticated usage mode (e.g., as described with reference to interfaces 1832, 1846, and 1858 in FIGS. 18B-18D, respectively) in order to view the meeting manifest interface. According to some embodiments, the meeting space device identifies candidate participant IDs associated with the participants of the upcoming reservation of the meeting space based on the reservation schedule. After identifying the candidate participant IDs, the meeting space device confirms the user if the login/biometric credentials match login credentials for one of the identified participant user IDs based on a personnel directory. In some embodiments, the meeting space device is communicatively coupled with a personnel directory that includes a plurality of users (e.g., employees on a corporate campus) and their corresponding login/biometric credentials.

According to some embodiments, the meeting space device identifies a candidate participant ID associated with the organizer of the upcoming reservation of the meeting space based on the reservation schedule. After identifying the candidate participant ID associated with the organizer, the meeting space device confirms the user if the login/biometric credentials match login credentials for the candidate user ID associated with the organizer of the upcoming reservation of the meeting space based on the personnel directory. As such, an added level of security is required before the user is able to access the meeting manifest (e.g., login credentials after passive confirmation by way of the proximity indicator). This stops non-participants of the meeting from viewing potentially confidential meeting details.

In some embodiments, in response to obtaining the proximity indicator (2112), and in accordance with the determination that the proximity indicator includes the participant identifier associated with the upcoming reservation based on the reservation schedule associated with the meeting space, the computer system changes (2126) a participant status indicator value associated with a respective participant associated with the participant identifier to indicate that the respective participant is in attendance at a meeting associated with the upcoming reservation. For example, if the confirmation process confirms the user to claim an upcoming reservation (e.g., as described in step 2114), the computer system also marks the participant associated with the participant ID included in the proximity indicator as in attendance at the meeting. In some embodiments, after the meeting has been confirmed, other participants are also marked as in attendance based on proximity indicators from their portable devices that include their participant IDs. As such, in addition to confirming upcoming reservations, the proximity indicator provides a mechanism by which to take attendance for the reservation/meeting. This provides valuable information for managerial or HR purposes and also for determining usage metrics concerning the utilization of meeting spaces on a corporate campus.

In some embodiments, in response to obtaining the proximity indicator (2112), and in accordance with a determination that the proximity indicator does not include an identifier that corresponds to one of the plurality of participants associated with the upcoming reservation of the meeting space based on the reservation schedule associated with the meeting space, the computer system forgoes (2128) confirming the upcoming reservation of the meeting space. In some embodiments, the computer system performs a confirmation process to determine whether to allow the user to confirm (e.g., claim or check-in to) the upcoming reservation of the meeting space. According to some embodiments, in response to obtaining the proximity indicator, the computer system obtains a reservation schedule for the meeting space based on the location ID to identify candidate participant IDs associated with the participants of the upcoming reservation of the meeting space. After identifying the candidate participant IDs, the computer system does not confirm the user if the participant ID associated with the proximity indicator does not match one of the identified candidate participant IDs.

According to some embodiments, in response to obtaining the proximity indicator, the computer system obtains a reservation schedule for the meeting space based on the location ID to identify a candidate participant ID associated with the organizer of the upcoming reservation of the meeting space. After identifying the candidate participant ID associated with the organizer, the computer system does not confirm the user if the participant ID associated with the proximity indicator does not match the candidate participant ID associated with the organizer of the upcoming reservation of the meeting space. Forgoing the confirmation of the upcoming reservation when the proximity indicator does not correspond with a participant of the upcoming reservation promotes the security and maintains the integrity of the reservation schedule.

In some embodiments, forgoing confirmation of the upcoming reservation includes locking the ability to confirm/claim the reservation (e.g., at least temporarily). In some embodiments, forgoing confirmation of the upcoming reservation includes neither confirming the reservation nor performing other steps and waiting until the presence of a device with an identifier associated with a participant associated with the upcoming reservation of the meeting space is detected. In some embodiments, forgoing confirmation of the upcoming reservation includes transmitting a request to the meeting space device (e.g., the exterior device 502-A-1) to obtain login credentials. In this example, in response to obtaining the request, the meeting space device presents a prompt (e.g., as shown in FIG. 7B) requesting that the user manually enter his/her login credentials (e.g., user name and password, or the like), which may be transmitted to the computer system to attempt to complete the confirmation process. In some embodiments, the login credential prompt is replaced or supplemented with a prompt for biometric information (e.g., a voice sample, retina scan, fingerprint scan, or the like).

In some embodiments, forgoing confirmation of the upcoming reservation includes transmitting a request to the portable to obtain login credentials. (e.g., as shown in FIGS. 16A-16B and 17A). In this example, in response to obtaining the request, the portable device presents a prompt requesting that the user manually enter his/her login credentials (e.g., user name and password, or the like), which may be transmitted to the computer system to attempt to complete the confirmation process. In some embodiments, the login credential prompt is replaced or supplemented with a prompt for biometric information (e.g., a voice sample, retina scan, fingerprint scan, or the like).

In some embodiments, in response to obtaining the proximity indicator (2112), and in accordance with a determination that the proximity indicator does not include an identifier that corresponds to one of the plurality of participants associated with the upcoming reservation of the meeting space based on the reservation schedule associated with the meeting space, the computer system transmits (2130) an instruction to the portable device to display a notification prompting a user of the portable device to enter login credentials. In some embodiments, if the user cannot be confirmed based on the proximity indicator, the computer system transmits a request to the portable to obtain login credentials. (e.g., as shown in FIGS. 16A-16B and 17A). In this example, in response to obtaining the request, the portable device presents a prompt requesting that the user manually enter his/her login credentials (e.g., user name and password, or the like), which may be transmitted to the computer system to attempt to complete the confirmation process. In some embodiments, the login credential prompt is replaced or supplemented with a prompt for biometric information (e.g., a voice sample, retina scan, fingerprint scan, or the like).

Providing an alternative means by which to check-in to meetings (e.g., manual entry of login credentials as opposed to the passive confirmation process) provides a failsafe check-in mechanism when problems occur with the passive confirmation process (e.g., the beacon application is not functioning properly on the user's portable device). This failsafe mechanism maintains the utilization of the limited number of meeting spaces on a corporate campus and maintains the integrity of the reservation schedule.

In some embodiments, the computer system (2132): obtains login credentials from the portable device; and, in accordance with a determination that the login credentials correspond to one of the plurality of participants associated with an upcoming reservation of the meeting space based on the reservation schedule associated with the meeting space, confirms the upcoming reservation of the meeting space. In some embodiments, the meeting space device or the portable device displays the meeting manifest interface is displayed after the login credentials are validated. In some embodiments, the computer system retrieves the login credentials from the portable device. In some embodiments, the computer system receives the login credentials from the portable device.

In some embodiments, after obtaining the login/biometric credentials, the computer system performs a confirmation process to determine whether to confirm the user. According to some embodiments, the computer system identifies candidate participant IDs associated with the participants of the upcoming reservation of the meeting space based on the reservation schedule. After identifying the candidate participant IDs, the computer system confirms the user if the login/biometric credentials match login credentials for one of the identified participant user IDs based on a personnel directory. In some embodiments, the computer system is communicatively coupled with a personnel directory that includes a plurality of users (e.g., employees on a corporate campus) and their corresponding login/biometric credentials.

According to some embodiments, the computer system identifies a candidate participant ID associated with the organizer of the upcoming reservation of the meeting space based on the reservation schedule. After identifying the candidate participant ID associated with the organizer, the computer system confirms the user if the login/biometric credentials match login credentials for the candidate user ID associated with the organizer of the upcoming reservation of the meeting space based on the personnel directory.

Providing an alternative means by which to check-in to meetings (e.g., manual entry of login credentials as opposed to the passive confirmation process) provides a failsafe check-in mechanism when problems occur with the passive confirmation process (e.g., the beacon application is not functioning properly on the user's portable device). This failsafe mechanism maintains the utilization of the limited number of meeting spaces on a corporate campus and maintains the integrity of the reservation schedule.

In some embodiments, determining whether the participant identifier corresponds to the upcoming reservation includes (2134): in accordance with a determination that the proximity indicator is associated with a timestamp between an early check-in threshold (e.g., 15 minutes prior to the start of the reservation) and a check-in deadline (e.g., 7 minutes after the start of the reservation), determining whether the participant identifier corresponds to one of a plurality of participants associated with the upcoming reservation of the meeting space based on the reservation schedule associated with the meeting space. In some embodiments, the passive confirmation process based on the proximity indicator is only available during the check-in window. As such, the computer system does not obtain proximity indicators (and consequently does not perform the confirmation process) outside of the check-in window. Forgoing performance of the confirmation process outside of the check-in window saves reduces bandwidth and power consumption.

In some embodiments, the computer system (2136): detects, via one or more input devices, a user input that corresponds to manually checking-in to the upcoming reservation; and, in response to detecting the user input, confirming the upcoming reservation of the meeting space. For example, if the portable device is not running the beacon application, the user is able to manually check-in to the upcoming reservation by interacting with the claiming affordance displayed by the exterior device 502-A-1 or the interior device 502-A-1 associated with the meeting space (e.g., as shown in FIGS. 15B-15C). In another example, if the meeting space device is not running the beacon application, the user is able to manually check-in to the upcoming reservation by interacting with the claiming affordance displayed by the exterior device 502-A-1 or the interior device 502-A-1 associated with the meeting space. In yet another example, if the passive confirmation process is otherwise unavailable (e.g., due to the scheduling database being down, connectivity issues, data corruption, or the like), the user is able to manually check-in to the upcoming reservation by interacting with the claiming affordance displayed by the exterior device 502-A-1 or the interior device 502-A-1 associated with the meeting space.

Providing an alternative means by which to check-in to meetings (e.g., manual check-in as opposed to the passive confirmation process) provides a failsafe check-in mechanism when problems occur with the passive confirmation process (e.g., connectivity issues or the user lacks a portable device running the beacon application). This failsafe mechanism maintains the utilization of the limited number of meeting spaces on a corporate campus and maintains the integrity of the reservation schedule.

In some embodiments, if the user manually checks-in without being confirmed by the passive confirmation process, the meeting space device enters the un-authenticated usage mode where the (e.g., the interfaces 1830, 1844, and 1856 in FIGS. 18B-18D, respectively). In some embodiments, if the user manually checks-in without entering his/her login credentials, the meeting space device enters the un-authenticated usage mode where the (e.g., the interfaces 1830, 1844, and 1856 in FIGS. 18B-18D, respectively).

In some embodiments, the computer system (2138): in response to detecting the user input, displays, on a display, a notification prompting a user of the portable device to enter login credentials; obtain login credentials (e.g., input by the user of the portable device); and, in accordance with a determination that the login credentials correspond to one of the plurality of participants associated with the upcoming reservation of the meeting space based on the reservation schedule associated with the meeting space, displays, on a display, a meeting manifest associated with details of the upcoming reservation. In some embodiments, after the user manually checks-in without being confirmed by the passive confirmation process, the computer system transmits a request to the portable to obtain login credentials. (e.g., as shown in FIGS. 16A-16B and 17A). In this example, in response to obtaining the request, the portable device presents a prompt requesting that the user manually enter his/her login credentials (e.g., user name and password, or the like), which may be transmitted to the computer system to attempt to complete the confirmation process (e.g., as discussed above with reference to step 2132). In some embodiments, the login credential prompt is replaced or supplemented with a prompt for biometric information (e.g., a voice sample, retina scan, fingerprint scan, or the like). As such, an added level of security is required before the user is able to access the meeting manifest (e.g., login credentials after passive confirmation by way of the proximity indicator). This stops non-participants from viewing potentially confidential meeting details.

In some embodiments, after the user manually checks-in without being confirmed by the passive confirmation process, the meeting space device displays an interface prompting the user to provide login credentials (e.g., as shown in FIGS. 7B and 17C). In this example, upon receiving login credentials from the user, the meeting space device transmits the login credentials to the computer system to attempt to complete the confirmation process (e.g., as discussed above with reference to step 2132). In some embodiments, the login credential prompt is replaced or supplemented with a prompt for biometric information (e.g., a voice sample, retina scan, fingerprint scan, or the like).

It should be understood that the particular order in which the operations in FIGS. 21A-21D have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 2000, 2200, 2300, 3000, 3100, 3200, and 3300) are also applicable in an analogous manner to method 2100 described above with respect to FIGS. 21A-21D. For example, the user interface objects and focus selectors described above with reference to method 2100 optionally have one or more of the characteristics of the user interface objects and focus selectors described herein with reference to other methods described herein (e.g., methods 900, 1000, 1100, 2000, 2200, 2300, 3000, 3100, 3200, and 3300). For brevity, these details are not repeated here.

FIGS. 22A-22C illustrate a flow diagram of a method 2200 of managing media input/output (I/O) for a meeting space in accordance with some embodiments. In some embodiments, the method 2200 is performed at an electronic device (e.g., the portable multifunction device 100 in FIG. 1A, or the device 300 in FIG. 3) with one or more processors, non-transitory memory, a display, and one or more input devices. In some embodiments, the display is a touch-screen display and the input device is on or integrated with the display. In some embodiments, the display is separate from the input device. Some operations in method 2200 are, optionally, combined and/or the order of some operations is, optionally, changed.

As described below, the method 2200 provides an intuitive way to manage media input/output (I/O) for a meeting space. The method reduces the cognitive burden on a user when managing media I/O for a meeting space, thereby creating a more efficient human-machine interface. For battery-operated electronic devices, enabling a user to manage media I/O for a meeting space faster and more efficiently conserves power and increases the time between battery charges.

In some embodiments, the electronic device corresponds to a meeting space device that is associated with the meeting space (e.g., the interior device 504-A-1 in FIG. 5B). For example, the meeting space device is fixed to furniture in the meeting space (e.g., built into a desk or table). In another example, the meeting space device is fixed to an interior wall of the meeting space. In another example, the meeting space device is a portable device that is associated with the room (e.g., not fixed to a wall or furniture, but locked/chained to furniture or movable.

In some embodiments, the electronic device is associable with the meeting space. For example, the electronic device is a personal device associated with a user such as a phone, tablet, laptop, or the like. In this example, when the user walks into the meeting space with the electronic device, the location of the electronic device is associated with the meeting space, and meeting space control functionality (e.g., including the media management interface described below) for the particular meeting space is enabled on the electronic device.

The device displays (2202), on the display, a media management interface that includes: displaying representations of a plurality of media input feeds including at least one media input feed from a source device that is different from the electronic device; and displaying representations of a plurality of display regions of one or more media output devices. In some embodiments, the media input feeds correspond to audio and/or video (AV) input feeds such as a local or remote presentation, a video or telephone conference call, a self-view, a shared device (e.g., via AirPlay), video-on-demand (VOD), live video content, high-definition multimedia interface (HDMI), video graphics array (VGA), digital visual interface (DVI), THUNDERBOLT, and/or DisplayPort input feeds, or the like.

For example, in FIG. 18E, the device 504-A-1 displays a media management interface 1861 that includes representations of display regions, including: a representation of a main display region 1860A (e.g., full screen) associated with the first display 524*a*-1; and a representation of a main display region 1862A associated with the second display 524*a*-2. Continuing with this example, in FIG. 18E, the media management interface 1861 also includes representations of available media input feeds, including: a first representation of a media input feed 1874A with a text description 1876A (e.g., a feed from A. Broccoli's shared computer); and a second representation of a media input feed 1874B with a text description 1876B (e.g., a local HDMI feed associated with port HDMI-1). According to some embodiments, the user of the second device 504-A-1 is able to drag one of the media input feed representations into one of the display region representations to coordinate display of one of the media input feeds by one of the displays.

Providing representations with the media management interface of media input feeds that are not currently being presented by the media output devices of the meeting space provides the user with easy access to potential media input feeds. As such, the user is able to easily coordinate the presentation of media input feeds with less time and user inputs, which, additionally, reduces power usage and improves battery life of the device by enabling the user to use the device more quickly and efficiently.

In some embodiments, the plurality of display regions includes (2204) a plurality of display regions of a single media output device. In some embodiments, each display output device may include a plurality of display regions such as a main display region, a picture-in-picture (PIP) display region, a picture-by-picture (PBP) display region (e.g., split-screen tiled regions), and/or the like. In some embodiments, the user is able to adjust, modify, or remove the display regions associated with the individual displays. For example, the user can switch between PIP and PBP modes using the media management interface.

For example, in FIG. 18E, the representation of a main display region 1860A is associated with the main display region of the first display 524*a*-1 (e.g., full screen), and the representation of a main display region 1862A is associated with the main display region of the second display 524*a*-2. In another example, in FIG. 18I, the representation of a main display region 1862A is associated with the main display region of the second display 524*a*-2, and the representation of the picture-in-picture display region 1862B is associated with the picture-in-picture display region of the second display 524*a*-2. In yet another example, in FIG. 18L, the representation of the first split-screen display region 1862C is associated with a first split-screen region of the second display 524*a*-2, and the representation of the second split-screen display region 1862D is associated with a second split-screen region of the second display 524*a*-2.

In some embodiments, the plurality of display regions includes (2206) a plurality of display regions on different media output device s. For example, in FIG. 18E, the representation of a main display region 1860A is associated with the main display region of the first display 524*a*-1 (e.g., full screen), and the representation of a main display region 1862A is associated with the main display region of the second display 524*a*-2.

In some embodiments, the representations of the plurality of media input feeds include (2208) media input feeds from a plurality of different source devices. In some embodiments, the representations of the plurality of media input feeds correspond to stream from different participants' devices, a video conference, VOD, and/or the like. For example, in FIG. 18E, the media management interface 1861 also includes representations of available media input feeds, including: a first representation of a media input feed 1874A with a text description 1876A (e.g., a feed from A. Broccoli's shared computer); and a second representation of a media input feed 1874B with a text description 1876B (e.g., a local HDMI feed associated with port HDMI-1).

In some embodiments, the representations of the plurality of media input feeds include (2210) a representation of a media input feed that is not currently being presented. In some embodiments, some of the representations of the plurality of media input feeds are not currently presented by the audio and/or video equipment of the meeting space. As such, the representations of the plurality of media input feeds indicate candidate media input feeds for presentation. For example, some of the representations are placeholders when there are more candidate media input feeds than potential display regions. Providing representations with the media management interface of media input feeds that are not currently being presented by the media output devices of the meeting space provides the user with easy access to potential media input feeds. As such, the user is able to easily coordinate the presentation of media input feeds with less time and user inputs, which, additionally, reduces power usage and improves battery life of the device by enabling the user to use the device more quickly and efficiently.

In some embodiments, the representations of the plurality of media input feeds correspond to (2212) active media input feeds and exclude one or more input options that do not have an associated active media input feed. In some embodiments, instead of displaying all potential media input options, the media management interface display media input options that are active (e.g., some available content). For example, the media management interface does not list out all potential media input options, such as HDMI-1, HDMI-2, HDMI-3, VGA, AUX, and the like, but only the active ones. Providing representations of media input feeds within the media management interface that currently have available content de-clutters the user interface. As such, the user is able to easily coordinate the presentation of media input feeds with less time and user inputs, which, additionally, reduces power usage and improves battery life of the device by enabling the user to use the device more quickly and efficiently.

In some embodiments, the arrangement of representations of the plurality of display regions within the media management interface corresponds to (2214) a physical arrangement of the one or more media output devices within a meeting space. For example, in FIG. 18E, the first display 524*a*-1 and the second display 524*a*-2 are physically located side-by side within the meeting space. As such, within the media management interface 1861, the representation of a main display region 1860A associated the first display 524*a*-1 is located adjacent to the representation of a main display region 1862A associated the second display 524*a*-2 in a side-by-side arrangement. Providing representations of the plurality of display regions in an arrangement within the media management interface that corresponds to their physical arrangement in the meeting space provides a more intuitive user interface that mirrors the real-life meeting space environment. As such, the user is able to easily coordinate the presentation of media input feeds with less time and user inputs, which, additionally, reduces power usage and improves battery life of the device by enabling the user to use the device more quickly and efficiently.

In some embodiments, displaying the representations of the plurality of display regions of the one or more media output devices includes (2216): providing one or more affordances provided to control features of the corresponding media output devices. In some embodiments, the control affordances are displayed after a representation of a media input feed to dragged-and-dropped into the representation of the display region. For example, in FIG. 18E, the second display 524*a*-2 displays content 1872 that corresponds to a video conference feed from Cloud City. Continuing with this example, within the media management interface 1861, the representation of the main display region 1862A associated with the second display 524*a*-2 includes control affordances 1866A, 1866B, and 1866C (collectively referred to as "control affordances 1866") provided to control the media input feed currently presented by the second display 524*a*-2. In some embodiments, when activated (e.g., with a contact), the control affordance 1866A causes the current state of the video equipment within the Ganymede meeting space to be toggled (e.g., from ON to OFF). In some embodiments, when activated (e.g., with a contact), the control affordance 1866B causes the audio input of the second device 504-A-1 and/or other microphones associated with the meeting space to be disabled. In some embodiments, when activated (e.g., with a contact), the control affordance 1866C causes the user to leave the video conference.

In some embodiments, displaying the representations of the plurality of display regions of the one or more media output devices includes: displaying a text description of the corresponding media output devices. In some embodiments, each of the plurality of display regions is associated with a text description (e.g., display X and display Y). In some embodiments, the text description includes the display resolution, aspect ratio, model name, dimensions, age, etc.

In some embodiments, displaying the representations of the plurality of media input feeds includes: displaying a text description of the corresponding media input feeds. For example, the text description of the media input feed indicates the device providing the feed, the user providing the feed, or location from which the feed is being provided. In some embodiments, the text descriptions are displayed after a representation of a media input feed is to dragged-and-dropped into the representation of the display region. For example, in FIG. 18E, the second display 524*a*-2 displays content 1872 that corresponds to a video conference feed from Cloud City. Continuing with this example, within the media management interface 1861, the representation of the main display region 1862A associated with the second display 524*a*-2 includes a text description 1868 associated with the video conference feed from Cloud City.

While displaying the media management interface, the device detects (2218) a first user input, via the one or more input devices, that corresponds to movement of a first representation of a first media input feed to a representation of a first display region of the plurality of display regions. In some embodiments, the first user input is a drag-and-drop gesture, a keystroke combination, a voice command, or the like. As one example, FIGS. 18F-18G show a sequence in which the third representation of the media input feed 1874C is dragged and dropped into the representation of the main display region 1860A associated with the first display 524*a*-1.

In response to detecting the first user input, the device coordinates (2220) display of the first media input feed on the first display region. In some embodiments, coordinating display of the first media input feed on the first display region includes routing the first feed to the media output device associated with the first display region (e.g., first display 524*a*-1). For example, the electronic device controls the wired/wireless interfaces between the media input feeds and media output devices. In some embodiments, coordinating display of the media input feed on the first display region includes instructing the media output device associated with the first display region (e.g., first display 524*a*-1) to present the media input feed. In some embodiments, coordinating display of the media input feed on the first display region includes: transmitting an instruction to a first device associated with first media input feed to transmit the first media input feed to the media output device associated with the first display region (e.g., first display 524*a*-1), transmitting an instruction to the media output device associated with the first display region to display the first media input feed, and instructing devices associated with the other media input feeds to not transmit corresponding feeds to the media output device associated with the first display region.

Providing representations of the plurality of media inputs feeds and representations of the display regions within the media management interface provides the user with visibility as to available feeds and I/O devices in one interface. As such, the user is able to easily coordinate the presentation of media input feeds with less time and user inputs, which, additionally, reduces power usage and improves battery life of the device by enabling the user to use the device more quickly and efficiently. Furthermore, coordination of the feeds and I/O devices by the electronic device saves the user time and provides a more seamless media I/O experience.

In some embodiments, the electronic device handles the discovery of media input feeds and media output devices (e.g., display, projectors, etc.). In some embodiments, the electronic device coordinates the presentation of feeds on displays based on user interaction with the media management interface. For example, as a result of the dragging gesture in FIG. 18F, FIG. 18G illustrates the first display 524*a*-1 displaying content 1882 associated with the feed from I. Flemming's shared computer.

In some embodiments, coordinating display of the first media input feed on the first display region includes (2222): in accordance with a determination that the first user input corresponds to dragging the first representation of the first media input feed to a center of the representation of the first display region, coordinating display of the first media input feed as main content on the first display region. For example, FIGS. 18M-18O show a sequence in which a representation of the media input feed 1874C is dragged from the representation of the main display region 1860A associated with the first display 524*a*-1 and dropped near the center of the representation of the main display region 1862A associated with the second display 524*a*-2. As a result of the dragging gesture in FIGS. 18M-18N, FIG. 18O illustrates the first display 524*a*-1 displaying content 1872 associated with the video conference feed from Cloud City. Also as a result of the dragging gesture in FIGS. 18M-18N, FIG. 18O illustrates the second display 524*a*-2 displaying content 1882 associated with the feed from I. Flemming's shared computer.

Providing representations of the plurality of media inputs feeds and representations of the display regions within the media management interface provides the user with visibility as to available feeds and I/O devices in one interface and also the ability to change currently presented feeds on-the-fly. As such, the user is able to easily coordinate the presentation of media input feeds in a main display area with less time and user inputs, which, additionally, reduces power usage and improves battery life of the device by enabling the user to use the device more quickly and efficiently.

In some embodiments, coordinating display of the first media input feed on the first display region includes (2224): in accordance with a determination that the first user input corresponds to dragging the first representation of a first media input feed to an edge of the representation of the first display region, coordinating display of the first media input feed as tiled content on the first display region. For example, the first display region is separated into two vertical tiles with equal dimensions, two vertical tiles with unequal dimensions, two horizontal tiles with equal dimensions, two horizontal tiles with unequal dimensions, four tile quadrants with equal dimension, or the like. For example, FIGS. 18J-18L show a sequence in which a representation of the media input feed 1874C is dragged from the representation of the main display region 1860A associated with the first display 524*a*-1 and dropped near the edge of the representation of the main display region 1862A associated with the second display 524*a*-2. As a result of the dragging gesture in FIGS. 18J-18K, FIG. 18L illustrates the first display 524*a*-1 displaying content 1870 (e.g., as shown in FIG. 18E-18F). Also as a result of the dragging gesture in FIGS. 18J-18K, FIG. 18L illustrates the second display 524*a*-2 displaying content 1872 associated with the video conference feed from Cloud City in the first split screen display area and the content 1882 associated with the feed from I. Flemming's shared computer in the second split screen display area.

Providing representations of the plurality of media inputs feeds and representations of the display regions within the media management interface provides the user with visibility as to available feeds and I/O devices in one interface and also the ability to change currently presented feeds on-the-fly. As such, the user is able to easily coordinate the presentation of media input feeds in a split-screen display area with less time and user inputs, which, additionally, reduces power usage and improves battery life of the device by enabling the user to use the device more quickly and efficiently.

In some embodiments, coordinating display of the first media input feed on the first display region includes (2226): in accordance with a determination that the first user input corresponds to dragging the first representation of a first media input feed to a corner of the representation of the first display region, coordinating display of the first media input feed as picture-in-picture content on the first display region. For example, FIGS. 18G-18I show a sequence in which a representation of the media input feed 1874C is dragged from the representation of the main display region 1860A associated with the first display 524*a*-1 and dropped near a corner of the representation of the main display region 1862A associated with the second display 524*a*-2. As a result of the dragging gesture in FIGS. 18G-18H, FIG. 18I illustrates the second display 524*a*-2 displaying content 1872 associated with the video conference feed from Cloud City in the main display area and the content 1882 associated with the feed from I. Flemming's shared computer in the picture-in-picture display area.

Providing representations of the plurality of media inputs feeds and representations of the display regions within the media management interface provides the user with visibility as to available feeds and I/O devices in one interface and also the ability to change currently presented feeds on-the-fly. As such, the user is able to easily coordinate the presentation of media input feeds in a picture-in-picture display area with less time and user inputs, which, additionally, reduces power usage and improves battery life of the device by enabling the user to use the device more quickly and efficiently.

In some embodiments, the device (2228): while displaying the media management interface, detects a second user input, via the one or more input devices, that corresponds to movement of a second representation of a second media input feed to a representation of a second display region of the plurality of display regions; and, in response to detecting the second user input, coordinates display of the second media input feed on the second display region. For example, with reference to FIG. 18N, assuming the electronic device detected a first input that dragged a representation of the video conference feed from Cloud City into the representation of the main display region 1862A associated with the second display 524*a*-2 (not shown), the electronic device detects a second input dragging the representation 1874B of the HDMI-1 feed into the representation of the main display region 1860A associated with the first display 524*a*-1 (not shown). Thus, in this example, the electronic device coordinates presentation of the content associated with the HDMI-1 feed on the first display 524*a*-1 and presentation of the content 1872 associated with the video conference feed from Cloud City on the second display 524*a*-2.

In some embodiments, the device (2230): detects a third user input, via the one or more input devices, that corresponds to swapping the first and second media input feeds between the first and second display regions; and, in response to detecting the third user input: coordinates display of the second media input feed on the first display region; and coordinates display of the first media input feed on the second display region. Continuing with the example in step 2228, the electronic device detects a third input that corresponds to swapping the display locations of the media input feeds (e.g., a dragging gesture as shown in FIGS. 18M-18O or selection of a swap affordance). In response to detecting the third input, the electronic device coordinates presentation of the content associated with the HDMI-1 feed on the second display 524*a*-2 and presentation of the content 1872 associated with the video conference feed from Cloud City on the first display 524*a*-1. Providing representations of the plurality of media inputs feeds and representations of the display regions within the media management interface provides the user with visibility as to available feeds and I/O devices in one interface and also the ability to change or swap currently presented feeds on-the-fly. As such, the user is able to easily coordinate the presentation of media input feeds with less time and user inputs, which, additionally, reduces power usage and improves battery life of the device by enabling the user to use the device more quickly and efficiently.

In some embodiments, the third user input corresponds to (2232) dragging the representation of the first media input feed into the representation of the second display region. In some embodiments, the third user input corresponds to dragging the representation of the second media input feed into the representation of the first display region (e.g., as shown in FIGS. 18M-18O).

In some embodiments, the device (2234): detects a fourth user input, via the one or more input devices, that corresponds to removing the first media input feed from the first display region; and, in response to detecting the fourth user input, ceases presentation of the first media input feed on the first display region. For example, FIGS. 18O-18Q show a sequence in which the representation of the media input feed 1874C is dragged out of the main display region 1862A associated with the second display 524*a*-2. As a result of the dragging gesture in FIGS. 18O-18P, FIG. 18Q illustrates the second display 524*a*-2 displaying content 1870. FIG. 18Q illustrates the first display 524*a*-1 maintaining display of the content 1872 associated with the video conference feed from Cloud City.

Providing representations of the plurality of media inputs feeds and representations of the display regions within the media management interface provides the user with visibility as to available feeds and I/O devices in one interface and also the ability to change or remove currently presented feeds on-the-fly. As such, the user is able to easily coordinate the presentation of media input feeds with less time and user inputs, which, additionally, reduces power usage and improves battery life of the device by enabling the user to use the device more quickly and efficiently.

In some embodiments, the fourth user input corresponds to (2236) dragging the representation of the first media input feed outside of the representation of the first display region. example, FIGS. 18O-18Q show a sequence in which the representation of the media input feed 1874C is dragged out of the main display region 1862A associated with the second display 524*a*-2.

It should be understood that the particular order in which the operations in FIGS. 22A-22C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 2000, 2100, an2300, 3000, 3100, 3200, and 3300) are also applicable in an analogous manner to method 2200 described above with respect to FIGS. 22A-22C. For example, the user interface objects and focus selectors described above with reference to method 2200 optionally have one or more of the characteristics of the user interface objects and focus selectors described herein with reference to other methods described herein (e.g., methods 900, 1000, 1100, 2000, 2100, 2300, 3000, 3100, 3200, and 3300). For brevity, these details are not repeated here.

FIGS. 23A-23C illustrate a flow diagram of a method 2300 of continuing an electronic conference in accordance with some embodiments. In some embodiments, the method 2300 is performed at an electronic device (e.g., the portable multifunction device 100 in FIG. 1A, or the device 300 in FIG. 3) with one or more processors, non-transitory memory, a display, and one or more input devices. In some embodiments, the display is a touch-screen display and the input device is on or integrated with the display. In some embodiments, the display is separate from the input device. Some operations in method 2300 are, optionally, combined and/or the order of some operations is, optionally, changed.

As described below, the method 2300 provides an intuitive way to continue an electronic conference. The method reduces the cognitive burden on a user when continuing an electronic conference, thereby creating a more efficient human-machine interface. For battery-operated electronic devices, enabling a user to continue an electronic conference faster and more efficiently conserves power and increases the time between battery charges.

In some embodiments, the electronic device corresponds to a meeting space device that is associated with the meeting space (e.g., the interior device 504-A-1 in FIG. 5B). For example, the meeting space device is fixed to furniture in the meeting space (e.g., built into a desk or table). In another example, the meeting space device is fixed to an interior wall of the meeting space. In another example, the meeting space device is a portable device that is associated with the room (e.g., not fixed to a wall or furniture, but locked/chained to furniture or movable.

In some embodiments, the electronic device is associable with the meeting space. For example, the electronic device is a personal device associated with a user such as a phone, tablet, laptop, or the like. In this example, when the user walks into the meeting space with the electronic device, the location of the electronic device is associated with the meeting space, and meeting space control functionality (e.g., including the media management interface described below) for the particular meeting space is enabled on the electronic device.

The device facilitates (2302) presentation of an electronic conference (e.g., a teleconference or video conference) that corresponds to an ongoing reservation within a meeting space, where presenting the electronic conference that corresponds to the ongoing reservation within the meeting space includes presenting electronic conference data (e.g., audio and/or video feeds) with equipment in the meeting space. For example, the equipment in the meeting space corresponds to audio and/or video (AV) input/output (I/O) equipment (e.g., displays, speakers, microphones, teleconference equipment, telephones, and/or the like). In some embodiments, some combination of one or more I/O devices and/or an electronic device associated with the meeting space (e.g., the interior device 504-A-1) presents the electronic conference. In some embodiments, a mobile device associated with a participant of the electronic conference provides the connection for the electronic conference, and the I/O devices associated with the meeting space present the one or more data streams associated with the electronic conference. In some embodiments, the electronic device associated with the meeting space provides the connection for the electronic conference, and the I/O devices associated with the meeting space present the one or more data streams associated with the electronic conference.

In some embodiments, the electronic device associated with the meeting space controls the one or more I/O devices. In some embodiments, the electronic device associated with the meeting space receives the one or more data streams associated with the electronic conference. In some embodiments, the electronic device controls the wired/wireless interfaces between the one or more data streams associated with the electronic conference and the one or more I/O devices. In some embodiments, the electronic device associated with the meeting space routes one or more data streams associated with the electronic conference to/from the one or more I/O devices in order to facilitate presentation of the electronic conference within the meeting space.

In some embodiments, facilitating presentation of the electronic conference includes (2304) transferring the electronic conference from a mobile device of one of the participants to the equipment associated with the meeting space. For example, the electronic conference starts before participant(s) enter the meeting space. As such, before a participant enters the meeting space, his/her mobile device provides the connection to the electronic conference and also I/O functionality. Continuing with this example, once the participant enters the meeting space, the connection to the electronic conference and also the I/O functionality is transferred to a combination of the electronic device associated with the meeting space and the I/O devices associated with the meeting space.

In some embodiments, the device (2306): determines whether an end time of the ongoing reservation within the meeting space is less than a threshold amount of time from a current time (e.g., <=120 seconds prior to end of the current meeting); and, in accordance with a determination that the end time of the ongoing reservation within the meeting space is less than the threshold amount of time from the current time and the meeting space is unavailable after the end time of the ongoing meeting within the meeting space, generates the request to continue the meeting outside of the meeting space. In some embodiments, when the current time is less than a threshold amount of time prior to the end of the current meeting, the electronic device determines whether meeting space is available after the current meeting. If the meeting space is available after the end of the meeting, the electronic device displays a first extension interface as shown in FIG. 19G for continuing the electronic conference within the current meeting space. If the meeting space is unavailable after the end of the meeting, the electronic device display generates a request to continue the meeting outside of the current meeting space, which causes the electronic device to display a second extension interface as shown in FIG. 19H for continuing the electronic conference outside the current meeting space In some embodiments, in accordance with a determination that the end time of the ongoing reservation within the meeting space is less than the threshold amount of time from the current time and the meeting space is available after the end time of the ongoing meeting within the meeting space, the device displays (2308), on the display, an affordance provided to continue the electronic conference past the end time and to extend the ongoing reservation within the meeting space. For example, FIG. 19G illustrates the device 504-A-1 displaying a first extension interface 1960 provided to continue the teleconference within the Ganymede meeting space. In this example, the first extension interface 1960 also includes an extension affordance 1964A, which, when activated (e.g., with a contact), causes the current meeting to be extended until 15:00 and the first extension interface 1960 to be replaced with the meeting manifest interface 1940 (e.g., as shown in FIG. 19F) According to some embodiments, the first meeting extension interface 1960 is displayed when the current is a predetermined amount of time from the end time of the current reservation/meeting (e.g., 2, 3, 5, etc. minutes prior to the end of the reservation/meeting) and the meeting space is available after the end of the current reservation/meeting.

Providing options for extending the reservation within the current meeting space provides the meeting participants with the ability to continue an unfinished electronic conference. As such, participants are provided with means to continue the electronic conference in an uninterrupted and time efficient manner (e.g., no need to schedule a follow-up meeting).

While facilitating presentation of the electronic conference, the device obtains (2310) a request to continue the meeting outside of the meeting space. In some embodiments, the request is generated due to the impeding end of the ongoing reservation (e.g., 90, 120, 180, etc. seconds prior to the end of the reservation) and the unavailability of the meeting space after the meeting (e.g., as referenced in stop 2306). In some embodiments, the request is provided by the user due to selection of an affordance provided to proactively extend the meeting outside of the meeting space.

In response to obtaining the request to continue the meeting outside of the meeting space, the device displays (2312), on the display, one or more options for transferring the electronic conference. For example, FIG. 19H illustrates the device 504-A-1 displaying a second extension interface 1970 provided to continue the teleconference outside of the Ganymede meeting space. In this example, the second extension interface 1970 includes a prompt 1972 indicating that the meeting is ending soon and that the participants of the current meeting are able to continue the teleconference outside of the Ganymede meeting space by transferring the teleconference call to the phones of the meeting participants or by extending the reservation/meeting to an available meeting space. The second extension interface 1970 also includes: a first transfer affordance 1972A, which, when activated (e.g., with a contact), causes the teleconference to be transferred to the phones of the meeting participants (e.g., mobile phones, work phones, or the like) and the second extension interface 1970 to be replaced with the confirmation interface 1980 in FIG. 19I; and a second transfer affordance 1972B, which, when activated (e.g., with a contact), causes the second extension interface 1970 to be replaced with the available room interface 1990 in FIG. 19J.

According to some embodiments, the second extension interface 1970 is displayed when the current is a predetermined amount of time from the end time of the current reservation/meeting (e.g., 2, 3, 5, etc. minutes prior to the end of the reservation/meeting) and the meeting space is unavailable after the end of the current reservation/meeting. Providing options for transferring the electronic conference at the end of a meeting reservation provides the meeting participants with the ability to continue an unfinished electronic conference. As such, participants are provided with means to continue the electronic conference in an uninterrupted and time efficient manner (e.g., no need to schedule a follow-up meeting).

In some embodiments, the one or more options for transferring the electronic conference are not displayed to participants of the electronic conference that are not present in the meeting space. For example, participants of the electronic conference that are not present in the meeting space may not need to find a new meeting space or may have reserved their meeting spaces for a longer time period.

In some embodiments, displaying the one or more options for transferring the electronic conference includes (2314): displaying a first transfer affordance provided to transfer the electronic conference to an available meeting space; and displaying a second transfer affordance provided to transfer the electronic conference to a phone of a respective participant within the meeting space of the electronic conference. As one example, in FIG. 19H, the second extension interface 1970 includes: a first transfer affordance 1972A provided to transfer the electronic conference to a phone of a respective participant within the meeting space of the electronic conference; and a second transfer affordance 1972B provided to transfer the electronic conference to an available meeting space. Providing an option to transfer the electronic conference to another meeting space at the end of a meeting reservation enables the participants to continue an unfinished electronic conference. As such, participants are provided with means to continue the electronic conference in an uninterrupted and time efficient manner (e.g., no need to schedule a follow-up meeting).

In some embodiments, the device detects selection of the first transfer affordance, and, in response to selection of the first transfer affordance, the device initiates a process for transferring the electronic conference to a different meeting space as shown in FIGS. 19J-19K. For example, a meeting space is selected by a participant in of the meeting from a plurality of available meeting spaces and/or a meeting space is automatically selected by the device based on predefined selection criteria.

In some embodiments, the device detects selection of the second transfer affordance, and, in response to detecting selection of the second transfer affordance, the device initiates a process for transferring the electronic conference to one or more phones as shown in FIG. 19I. For example, the device calls a mobile phone of an organizer of the meeting and/or some or all of the other participants of the meeting as well. Providing an option to transfer the electronic conference to a phone of a respective participant within the meeting space enables the participant to continue an unfinished electronic conference. As such, the participant is provided with means to continue the electronic conference in an uninterrupted and time efficient manner (e.g., no need to schedule a follow-up meeting).

The device detecting (2316), via the one or more input devices, selection of a first option from the one or more options for transferring the electronic conference. For example, with reference to FIG. 19H, the electronic device detects selection of the first transfer affordance 1972A within the second extension interface 1970.

In response to detecting selection of the first option, the device (2318): ceases to present the electronic conference with equipment in the meeting space; and initiates a process for transferring the electronic conference to equipment that is not associated with the meeting space. For example, in response to selection of the first transfer affordance 1972A in FIG. 19H, the electronic device ceases to present the electronic conference with equipment in the meeting space, and initiates a process for transferring the electronic conference to equipment that is not associated with the meeting space by transferring the electronic conference to a phone of a respective participant within the meeting space of the electronic conference. For example, in response to selection of the first transfer affordance 1972A in FIG. 19H, the electronic device also displays the confirmation interface 1980 as shown in FIG. 19I. Transferring the electronic conference to equipment that is not associated with the meeting space enables the participant to continue an unfinished electronic conference. As such, the participant is provided with means to continue the electronic conference in an uninterrupted and time efficient manner (e.g., no need to schedule a follow-up meeting).

In some embodiments, the selected first option corresponds to (2320) the first transfer affordance, and initiating the process for transferring the electronic conference to equipment that is not associated with the meeting space includes transferring the electronic conference to a phone of a respective participant within the meeting space of the electronic conference. In some embodiments, in response to selection of the first option (e.g., first transfer affordance 1972A in FIG. 19H), the electronic device transfers the electronic conference to the personal devices of participants marked as attending the electronic conference in the meeting space. In some embodiments, in response to selection of the first option (e.g., first transfer affordance 1972A in FIG. 19H), the meeting is automatically discontinued. For example, the electronic device checks-out the participants from the ongoing reservation within the meeting space after causing the electronic conference to be transferred to the personal phones of the attendees. Providing an option to transfer the electronic conference to a phone of a respective participant within the meeting space enables the participant to continue an unfinished electronic conference. As such, the participant is provided with means to continue the electronic conference in an uninterrupted and time efficient manner (e.g., no need to schedule a follow-up meeting).

In some embodiments, in response to detecting selection of the first option, the device displays (2322), on the display, an option to check-out from the ongoing reservation. For example, in response to selection of the first transfer affordance 1972A in FIG. 19H, the electronic device also displays the confirmation interface 1980 with fa first affordance 1984A provided to confirm that the teleconference call transferred to the phone of the user and to check-out from the Ganymede meeting space as shown in FIG. 19I. For example, the "confirm and check out" option enables the user to check-out from the ongoing reservation within the meeting space once transfer of the electronic conference is successful. Providing check-out means improves the utilization of the limited number of meeting spaces on a corporate campus and maintains the integrity of the reservation schedule.

In some embodiments, the device (2324): detects, via the one or more input devices, selection of the second transfer affordance; and, in response to selection of the second transfer affordance, displays, on the display, a plan view of available meeting spaces. For example, in response to selection of the second transfer affordance 1972B in FIG. 19H, the electronic device displays a plan view with unavailable meeting spaces displayed with a first appearance (e.g., a first shading pattern) and available meeting spaces displayed with a second appearance (e.g., a second shading pattern) as shown in FIGS. 6T and 7Y. Displaying the plan view of available meeting space provides the user with a visually intuitive interface that enables the user to select an available meeting space that is close by. As such, the user is able to easily select an available meeting space to transfer the electronic conference to with less time and user inputs.

In some embodiments, the device (2326): detects, via the one or more input devices, selection of the second transfer affordance; and, in response to selection of the second transfer affordance, displays, on the display, a list of available meeting spaces. For example, in response to selection of the second transfer affordance 1972B in FIG. 19H, the electronic device also displays the available room interface 1990 as shown in FIG. 19J. In this example, the available room interface 1990 also includes a plurality of affordances 1994A, 1994B, 1994C, and 1994D (sometimes collectively referred to as the "affordances 1994") associated with available meeting spaces. Each of the affordances 1994 is associated with a meeting space name, occupancy limit, and length of availability. Displaying the list of available meeting space provides the user with a compact interface that enables the user to select an available meeting space. As such, the user is able to easily select an available meeting space to transfer the electronic conference to with less time and user inputs.

In some embodiments, prior to displaying the list of available meeting spaces, the device filters (2328) the list of available meeting spaces is filtered according to at least one of attributes associated with the meeting space or selected attributes. In some embodiments, the list is sorted based on proximity to the current meeting space. In some embodiments, the list of available meeting spaces excludes one or more available meeting spaces that are not compatible with the attributes associated with the current meeting space or the meeting in the current meeting space (e.g., a number of participants, a level of security access required to access the meeting space, available amenities such as video conferencing capabilities). Filtering the list of available meeting space provides the user with a tailored list of available meeting spaces that suits the needs of the user in a compact interface. As such, the user is able to easily select a suitable available meeting space to transfer the electronic conference to with less time and user inputs.

In some embodiments, the device (2330): detects, via the one or more input devices, selection of a respective available meeting space; and, in response to detecting selection of the respective available meeting space: ceases to present the electronic conference with the equipment in the meeting space; and transfers the electronic conference to equipment associated with the respective available meeting space. Providing an option to transfer the electronic conference to another meeting space at the end of a meeting reservation enables the participants to continue an unfinished electronic conference. As such, participants are provided with means to continue the electronic conference in an uninterrupted and time efficient manner (e.g., no need to schedule a follow-up meeting).

In some embodiments, the electronic conference is transferred to the participants' personal phones until a participant checks-in at the respective available meeting space, at which time the teleconference equipment of the available meeting space rings to complete the transfer of the electronic conference to the equipment of the available meeting space. In some embodiments, the electronic conference is placed on hold until a participant checks-in at the available meeting space, at which time the teleconference equipment of the respective available meeting space rings to complete the transfer of the electronic conference to the equipment of the available meeting space. In some embodiments, there is an option to cancel (and transfer electronic conference to cell phone) until checked-in at available meeting space.

For example, in response to selection of the affordance 1994B in FIG. 19J, the electronic device ceases to present the electronic conference with equipment in the meeting space, and initiates a process for transferring the electronic conference to equipment that is not associated with the meeting space by transferring the electronic conference to the equipment of the meeting space that corresponds to the affordance 1994B. In this example, in response to selection of the affordance 1994B in FIG. 19J, the electronic device also displays the first extension confirmation interface 19100A (e.g., as shown in FIG. 19K) or the second extension confirmation interface 19100B (e.g., as shown in FIG. 19L). With reference to FIG. 19K, the first extension confirmation interface 19100A includes a first affordance 19106A provided to check-out of the Ganymede meeting space and place the teleconference call on hold until the user checks in at the Callisto meeting space at which time the teleconference equipment associated with the Callisto meeting space will ring to complete the transfer of the teleconference call to the Callisto meeting space. With reference to FIG. 19L, the second extension confirmation interface 19100B includes a second affordance 19106B provided to check-out of the Ganymede meeting space and temporarily transfer the teleconference call to the phone of the user until the user check-in at the Callisto meeting space. In this example, after the user checks in at the Callisto meeting space, the teleconference equipment associated with the Callisto meeting space will ring to complete the transfer of the teleconference call to the Callisto meeting space.

It should be understood that the particular order in which the operations in FIGS. 23A-23C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 2000, 2100, 2200, 3000, 3100, 3200, and 3300) are also applicable in an analogous manner to method 2300 described above with respect to FIGS. 23A-23C. For example, the user interface objects and focus selectors described above with reference to method 2300 optionally have one or more of the characteristics of the user interface objects and focus selectors described herein with reference to other methods described herein (e.g., methods 900, 1000, 1100, 2000, 2100, 2200, 3000, 3100, 3200, and 3300). For brevity, these details are not repeated here.

Figure 24:
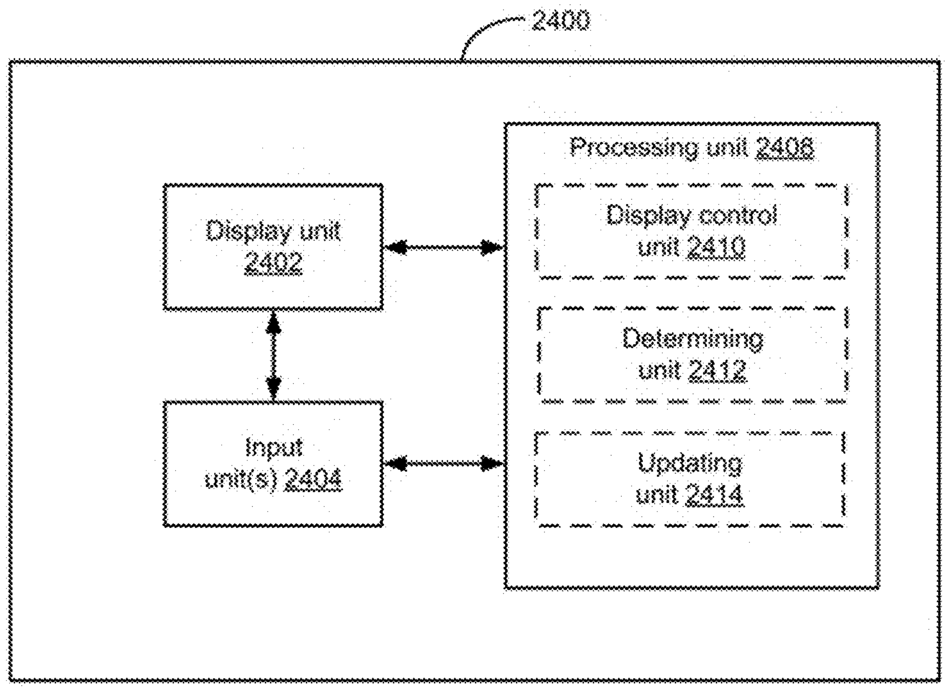
FIGS. 24-27 are functional block diagrams of an electronic device in accordance with some embodiments.

In accordance with some embodiments, FIG. 24 shows a functional block diagram of an electronic device 2400 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 24 are, optionally, combined or separated into sub-blocks to implement the principles of the various described embodiments. Therefore, the description herein optionally supports any possible combination or separation or further definition of the functional blocks described herein.

As shown in FIG. 24, an electronic device 2400 includes a display unit 2402 configured to display a user interface, one or more input units 2404 configured to receive user inputs, and a processing unit 2408 coupled to the display unit 2402 and the one or more input units 2404. In some embodiments, the processing unit 2408 includes: a display control unit 2410, a determining unit 2412, and an updating unit 2414.

The processing unit 2408 is configured to: enable display of (e.g., with the display control unit 2410), on the display unit 2402 of the of the electronic device 2400, a user interface that includes information about a schedule of meeting in a meeting space; while displaying the user interface, determine (e.g., with the determining unit 2412) that a change in reservation information for a respective meeting from the schedule of meetings in the meeting space has occurred based on input from another electronic device that is associated with the meeting space; and, in response to determining that the change in reservation information for the respective meeting has occurred, update (e.g., with the updating unit 2414) the user interface displayed on the display 2402 of the electronic device 2400 to show the change in the reservation information.

In some embodiments, the electronic device 2400 is located inside the meeting space, and the other electronic device is located outside the meeting space.

In some embodiments, the electronic device 2400 is a mobile device associated with a participant of the respective meeting, and the other electronic device is located outside the meeting space.

In some embodiments, the electronic device 2400 is located outside the meeting space, and the other electronic device is located inside the meeting space.

In some embodiments, the change in the reservation information corresponds to a participant checking-in to the respective meeting.

In some embodiments, in response to determining that the change in reservation information for the respective meeting has occurred, the processing unit 2408 is further configured to enable display of (e.g., with the display control unit 2410), on the display unit 2402 of the electronic device 2400, a notification indicating to the participants of a current meeting from the meeting schedule for the meeting space that one or more participants associated with the respective meeting have checked-in.

In some embodiments, the change in the reservation information corresponds to an extension of the respective meeting from the meeting schedule for the meeting space via the other electronic device.

In some embodiments, updating the user interface displayed on the display unit 2402 of the electronic device 2400 includes changing a duration of the respective meeting.

In some embodiments, the change in the reservation information corresponds to a participant checking-out of the respective meeting from the meeting schedule for the meeting space via the other electronic device.

In some embodiments, updating the user interface displayed on the display unit 2402 of the electronic device 2400 includes changing a reservation status of the meeting space from occupied to available.

In some embodiments, the change in the reservation information corresponds to an end of a reservation after checking-in to the respective meeting from the meeting schedule for the meeting space via the other electronic device.

In some embodiments, in response to determining that the change in reservation information for the respective meeting has occurred, the processing unit 2408 is further configured to enable display of (e.g., with the display control unit 2410), on the display unit 2402 of the electronic device 2400, a doorbell affordance provided to alert participants within the meeting space of the end of the reservation through the other electronic device.

Figure 25:
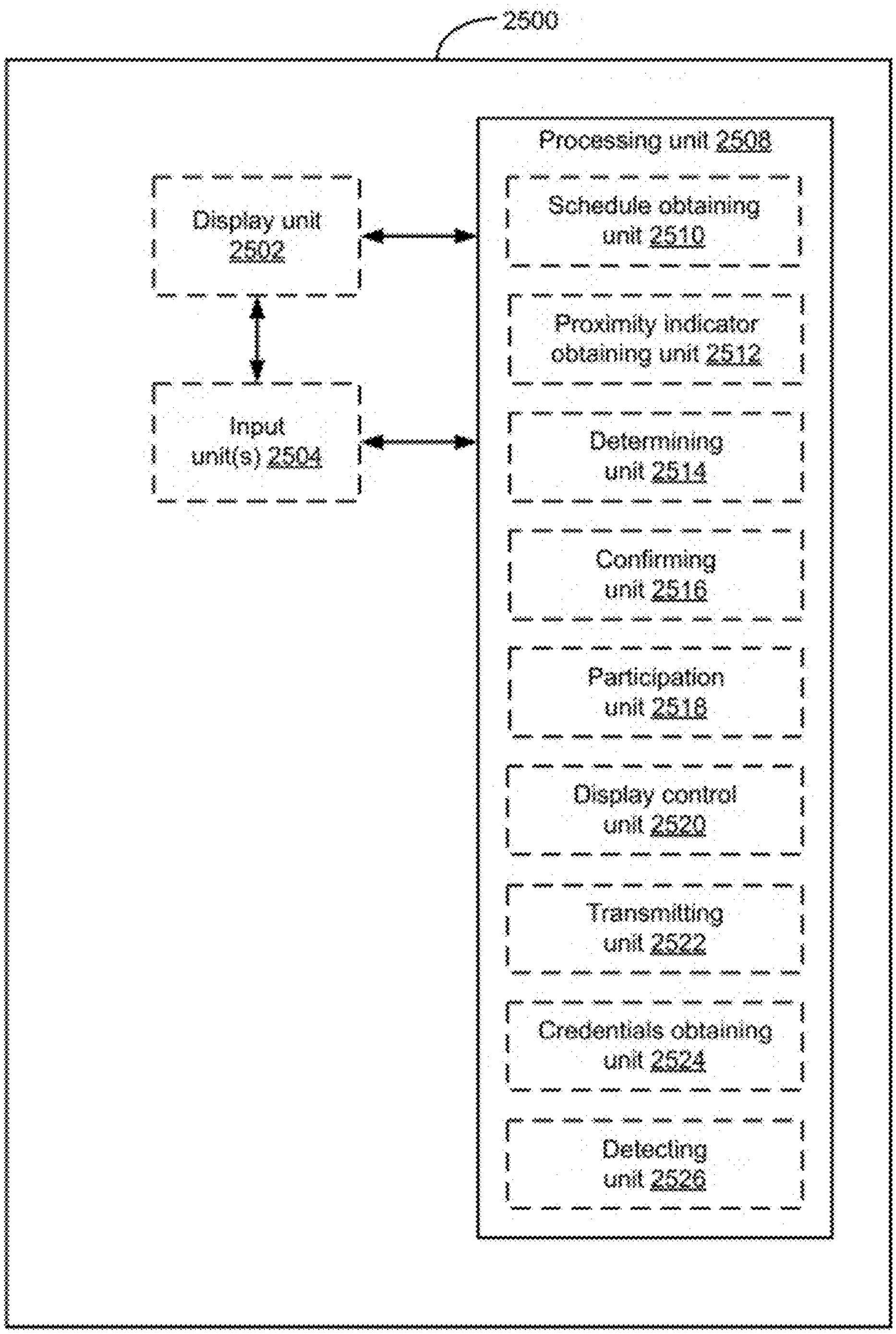

In accordance with some embodiments, FIG. 25 shows a functional block diagram of an electronic device 2500 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 25 are, optionally, combined or separated into sub-blocks to implement the principles of the various described embodiments. Therefore, the description herein optionally supports any possible combination or separation or further definition of the functional blocks described herein.

As shown in FIG. 25, an electronic device 2500 includes an optional display unit 2502 configured to display a user interface, one or more optional input units 2504 configured to receive user inputs, and a processing unit 2508 coupled to the display unit 2502 and the one or more input units 2504. In some embodiments, the processing unit 2508 includes: a schedule obtaining unit 2510, a proximity indicator obtaining unit 2512, a determining unit 2514, a confirming unit 2516, a participation unit 2518, a display control unit 2520, a transmitting unit 2522, a credentials obtaining unit 2524; and a detecting unit 2526.

The processing unit 2508 is configured to: obtain (e.g., with the schedule obtaining unit 2510) a reservation schedule associated with a meeting space that has a plurality of scheduled meetings including a next meeting that has not yet been confirmed; and obtain (e.g., with the proximity indicator obtaining unit 2512) a proximity indicator indicating that a portable device is within a predefined distance of the meeting space. In response to obtaining the proximity indicator, and in accordance with a determination (e.g., with the determining unit 2514) that the proximity indicator includes a participant identifier associated with an upcoming reservation of the meeting space based on the reservation schedule associated with the meeting space, the processing unit 2508 is further configured to confirm (e.g., with the confirming unit 2516) the upcoming reservation of the meeting space.

In some embodiments, in response to obtaining the proximity indicator, and in accordance with a determination (e.g., with the determining unit 2514) that the proximity indicator does not include an identifier that corresponds to one of the plurality of participants associated with the upcoming reservation of the meeting space based on the reservation schedule associated with the meeting space, the processing unit 2508 is further configured to forgo confirming the upcoming reservation of the meeting space.

In some embodiments, in response to obtaining the proximity indicator, and in accordance with a determination (e.g., with the determining unit 2514) that the proximity indicator does not include an identifier that corresponds to one of the plurality of participants associated with the upcoming reservation of the meeting space based on the reservation schedule associated with the meeting space, the processing unit 2508 is further configured to transmit (e.g., with the transmitting unit 2522) an instruction to the portable device to display a notification prompting a user of the portable device to enter login credentials.

In some embodiments, the processing unit 2508 is further configured to obtain (e.g., with the credentials obtaining unit 2524) login credentials from the portable device; and, in accordance with a determination (e.g., with the determining unit 2514) that the login credentials correspond to one of the plurality of participants associated with an upcoming reservation of the meeting space based on the reservation schedule associated with the meeting space, confirm (e.g., with the confirming unit 2516) the upcoming reservation of the meeting space.

In some embodiments, in response to obtaining the proximity indicator, and in accordance with the determination (e.g., with the determining unit 2514) that the proximity indicator includes the participant identifier associated with the upcoming reservation based on the reservation schedule associated with the meeting space, the processing unit 2508 is further configured to change (e.g., with the participation unit 2518) a participant status indicator value associated with a respective participant associated with the participant identifier to indicate that the respective participant is in attendance at a meeting associated with the upcoming reservation.

In some embodiments, determining (e.g., with the determining unit 2514) whether the login credentials correspond to one of the plurality of participants associated with an upcoming reservation of the meeting space based on the reservation schedule associated with the meeting space includes: in accordance with a determination that the proximity indicator is associated with a timestamp between an early check-in threshold, determining (e.g., with the determining unit 2514) whether the login credentials correspond to one of the plurality of participants associated with an upcoming reservation of the meeting space based on the reservation schedule associated with the meeting space.

In some embodiments, the proximity indicator includes the participant identifier associated with the portable device and a location identifier associated with the meeting space.

In some embodiments, obtaining the proximity indicator includes receiving (e.g., with the proximity indicator obtaining unit 2512) the proximity indicator from the portable device.

In some embodiments, obtaining the proximity indicator includes receiving (e.g., with the proximity indicator obtaining unit 2512) the proximity indicator from a device associated with the meeting space.

In some embodiments, after confirming the upcoming reservation of the meeting space, the processing unit 2508 is further configured to enable display of (e.g., with the display control unit 2520), on the display unit 2402, a meeting manifest associated with details of the upcoming reservation.

In some embodiments, the processing unit 2508 is further configured to: after confirming the upcoming reservation of the meeting space, transmit (e.g., with the transmitting unit 2522) an instruction to the portable device to display a notification at the portable device prompting a user of the portable device to enter login credentials; in response to transmitting the instructing, obtaining (e.g., with the credentials obtaining unit 2524) login credentials from the portable device; and, in accordance with a determination (e.g., with the determining unit 2514) that the login credentials correspond to one of the plurality of participants associated with an upcoming reservation of the meeting space based on the reservation schedule associated with the meeting space, enable display of (e.g., with the display control unit 2520), on the display unit 2402, a meeting manifest associated with details of the upcoming reservation In some embodiments, confirming the upcoming reservation of the meeting space includes: in accordance with a determination that the meeting space is currently available, changing (e.g., with the display control unit 2520) the reservation status of the meeting space from reserved to occupied.

In some embodiments, confirming the upcoming reservation of the meeting space includes: in accordance with a determination that the meeting space is currently occupied, changing (e.g., with the display control unit 2520) the reservation status of the meeting space from reserved to meeting starting soon.

In some embodiments, confirming the upcoming reservation of the meeting space includes: transmitting (e.g., with the transmitting unit 2522) an instruction to the portable device to display a notification to participants of a current meeting indicating that one or more participants associated with the upcoming reservation have checked-in.

In some embodiments, the processing unit 2508 is further configured to: detect (e.g., with the detecting unit 2526) a user input, via one or more input units 2504, that corresponds to manually checking-in to the upcoming reservation; and, in response to detecting the user input, confirming (e.g., with the confirming unit 2516) the upcoming reservation of the meeting space.

In some embodiments, the processing unit 2508 is further configured to: in response to detecting the user input, enable display of (e.g., with the display control unit 2520), on the display unit 2402, a notification prompting a user of the portable device to enter login credentials; obtain (e.g., with the credentials obtaining unit 2524) login credentials; and, in accordance with a determination (e.g., with the determining unit 2514) that the login credentials correspond to one of the plurality of participants associated with the upcoming reservation of the meeting space based on the reservation schedule associated with the meeting space, enable display of (e.g., with the display control unit 2520), on the display unit 2402, a meeting manifest associated with details of the upcoming reservation.

Figure 26:
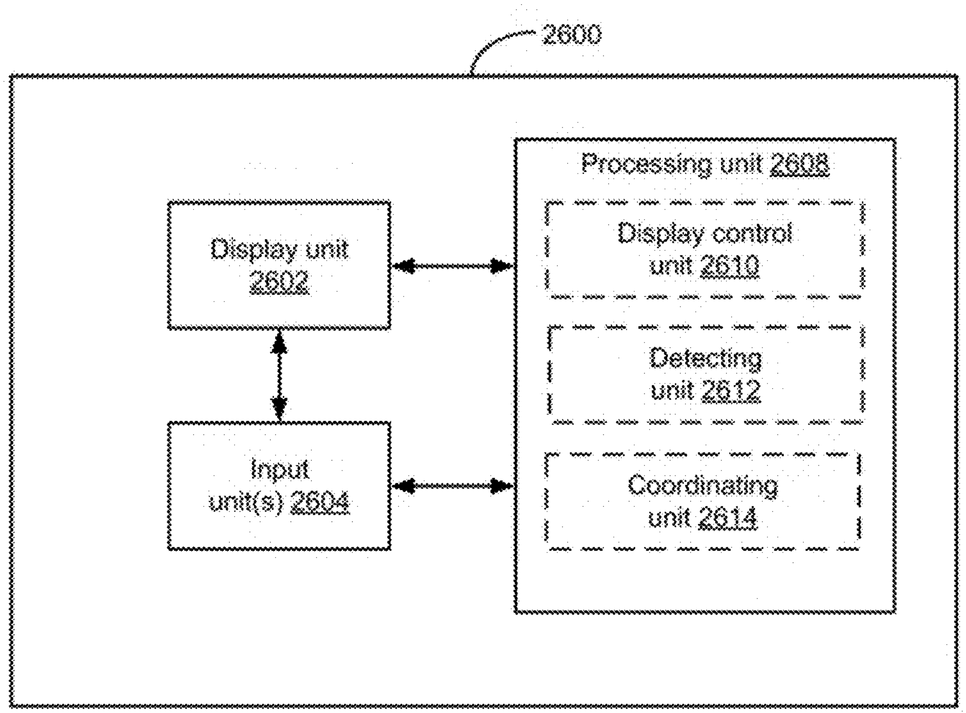

In accordance with some embodiments, FIG. 26 shows a functional block diagram of an electronic device 2600 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 26 are, optionally, combined or separated into sub-blocks to implement the principles of the various described embodiments. Therefore, the description herein optionally supports any possible combination or separation or further definition of the functional blocks described herein.

As shown in FIG. 26, an electronic device 2600 includes a display unit 2602 configured to display a user interface, one or more input units 2604 configured to receive user inputs, and a processing unit 2608 coupled to the display unit 2602 and the one or more input units 2604. In some embodiments, the processing unit 2608 includes: a display control unit 2610, a detecting unit 2612, and a coordinating unit 2614.

The processing unit 2608 is configured to: enable display of (e.g., with the display control unit 2610), on the display unit 2602, a media management interface that includes: displaying representations of a plurality of media input feeds including at least one media input feed from a source device that is different from the electronic device; and displaying representations of a plurality of display regions of one or more media output devices; while displaying the media management interface, detect (e.g., with the detecting unit 2612) a first user input, via the one or more input units 2604, that corresponds to movement of a first representation of a first media input feed to a representation of a first display region of the plurality of display regions; and, in response to detecting the first user input, coordinate display of (e.g., with the coordinating unit 2614) the first media input feed on the first display region.

In some embodiments, the plurality of display regions includes a plurality of display regions of a single media output device.

In some embodiments, the plurality of display regions includes a plurality of display regions on different media output devices.

In some embodiments, the representations of the plurality of media input feeds include media input feeds from a plurality of different source devices.

In some embodiments, the representations of the plurality of media input feeds include a representation of a media input feed that is not currently being presented.

In some embodiments, the representations of the plurality of media input feeds correspond to active media input feeds and exclude one or more input options that do not have an associated active media input feed.

In some embodiments, coordinating display of the first media input feed on the first display region includes: in accordance with a determination that the first user input corresponds to dragging the first representation of the first media input feed to a center of the representation of the first display region, coordinating display of (e.g., with the coordinating unit 2614) the first media input feed as main content on the first display region.

In some embodiments, coordinating display of the first media input feed on the first display region includes: in accordance with a determination that the first user input corresponds to dragging the first representation of a first media input feed to an edge of the representation of the first display region, coordinating display of (e.g., with the coordinating unit 2614) the first media input feed as tiled content on the first display region.

In some embodiments, coordinating display of the first media input feed on the first display region includes: in accordance with a determination that the first user input corresponds to dragging the first representation of a first media input feed to a corner of the representation of the first display region, coordinating display of (e.g., with the coordinating unit 2614) the first media input feed as picture-in-picture content on the first display region.

In some embodiments, the processing unit 2608 is further configured to: while displaying the media management interface, detect (e.g., with the detecting unit 2612) a second user input, via the one or more input unit 2604, that corresponds to movement of a second representation of a second media input feed to a representation of a second display region of the plurality of display regions; and, in response to detecting the second user input, coordinate display of (e.g., with the coordinating unit 2614) the second media input feed on the second display region.

In some embodiments, the processing unit 2608 is further configured to: detect (e.g., with the detecting unit 2612) a third user input, via the one or more input unit 2604, that corresponds to swapping the first and second media input feeds between the first and second display regions; and, in response to detecting the third user input: coordinate display of (e.g., with the coordinating unit 2614) the second media input feed on the first display region; and coordinate display of (e.g., with the coordinating unit 2614) the first media input feed on the second display region.

In some embodiments, the third user input corresponds to dragging the representation of the first media input feed into the representation of the second display region.

In some embodiments, the processing unit 2608 is further configured to: detect (e.g., with the detecting unit 2612) a fourth user input, via the one or more input unit 2604, that corresponds to removing the first media input feed from the first display region; and, in response to detecting the fourth user input, cease presentation of (e.g., with the display control unit 2610) the first media input feed on the first display region.

In some embodiments, the fourth user input corresponds to dragging the representation of the first media input feed outside of the representation of the first display region.

In some embodiments, the arrangement of representations of the plurality of display regions within the media management interface corresponds to a physical arrangement of the one or more media output devices within a meeting space.

In some embodiments, displaying the representations of the plurality of display regions of the one or more media output devices includes: providing (e.g., with the display control unit 2610) one or more affordances provided to control features of the corresponding media output devices.

Figure 27:
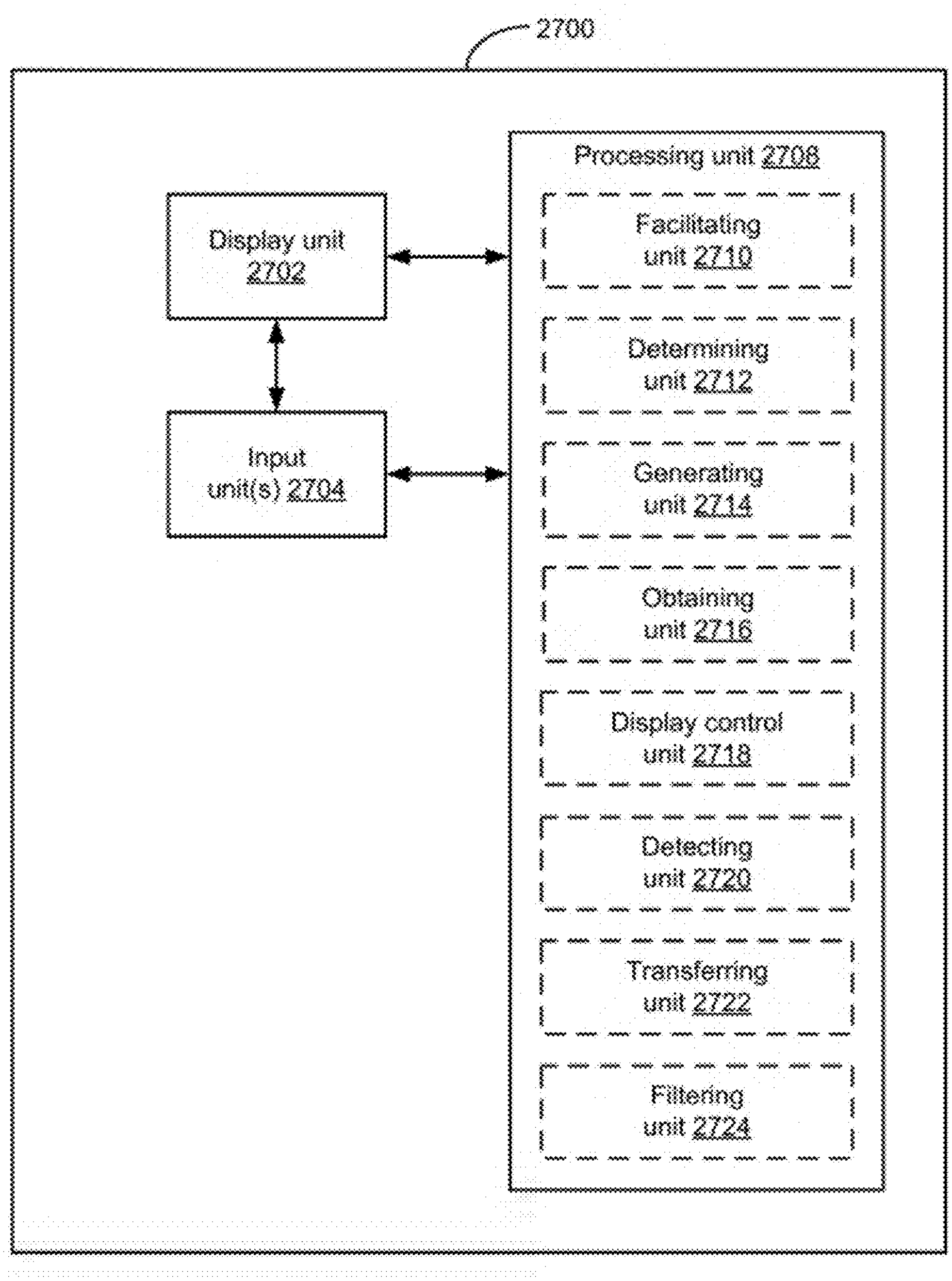

In accordance with some embodiments, FIG. 27 shows a functional block diagram of an electronic device 2700 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 27 are, optionally, combined or separated into sub-blocks to implement the principles of the various described embodiments. Therefore, the description herein optionally supports any possible combination or separation or further definition of the functional blocks described herein.

As shown in FIG. 27, an electronic device 2700 includes a display unit 2702 configured to display a user interface, one or more input units 2704 configured to receive user inputs, and a processing unit 2708 coupled to the display unit 2702 and the one or more input units 2704. In some embodiments, the processing unit 2708 includes: a facilitating unit 2710, a determining unit 2712, a generating unit 2714, an obtaining unit 2716, a display control unit 2718, a detecting unit 2720, a transferring unit 2722; and a filtering unit 2726.

The processing unit 2708 is configured to: facilitate (e.g., with the facilitating unit 2710) presentation of an electronic conference that corresponds to an ongoing reservation within a meeting space, where presenting the electronic conference that corresponds to the ongoing reservation within the meeting space includes presenting electronic conference data with equipment in the meeting space; while facilitating presentation of the electronic conference, obtain (e.g., with the obtaining unit 2716) a request to continue the meeting outside of the meeting space; in response to obtaining the request to continue the meeting outside of the meeting space, enable display of (e.g., with the display control unit 2718), on the display unit 2702, one or more options for transferring the electronic conference; and detect (e.g., with the detecting unit 2720), via the one or more input units 2704, selection of a first option from the one or more options for transferring the electronic conference. In response to detecting selection of the first option, the processing unit 2708 is further configured to: cease to present (e.g., with the facilitating unit 2710) the electronic conference via the equipment in the meeting space; and initiate (e.g., with the transferring unit 2722) a process for transferring the electronic conference to equipment that is not associated with the meeting space.

In some embodiments, the processing unit 2708 is further configured to: determine (e.g., with the determining unit 2712) whether an end time of the ongoing reservation within the meeting space is less than a threshold amount of time from a current time; and, in accordance with a determination (e.g., with the determining unit 2712) that the end time of the ongoing reservation within the meeting space is less than the threshold amount of time from the current time and the meeting space is unavailable after the end time of the ongoing meeting within the meeting space, generate (e.g., with the generating unit 2714) the request to continue the meeting outside of the meeting space.

In some embodiments, the in accordance with a determination (e.g., with the determining unit 2712) that the end time of the ongoing reservation within the meeting space is less than the threshold amount of time from the current time and the meeting space is available after the end time of the ongoing meeting within the meeting space, processing unit 2708 is further configured to enable display of (e.g., with the display control unit 2718), on the display unit 2702, an affordance provided to continue the electronic conference past the end time and to extend the ongoing reservation within the meeting space.

In some embodiments, displaying the one or more options for transferring the electronic conference includes: displaying (e.g., with the display control unit 2718) a first transfer affordance provided to transfer the electronic conference to an available meeting space; and displaying (e.g., with the display control unit 2718) a second transfer affordance provided to transfer the electronic conference to a phone of a respective participant within the meeting space of the electronic conference.

In some embodiments, the selected first option corresponds to the first transfer affordance, and initiating the process for transferring the electronic conference to equipment that is not associated with the meeting space includes transferring (e.g., with the transferring unit 2722) the electronic conference to a phone of a respective participant within the meeting space of the electronic conference.

In some embodiments, in response to detecting selection of the first option, the processing unit 2708 is further configured to enable display of (e.g., with the display control unit 2718), on the display unit 2702, an option to check-out from the ongoing reservation.

In some embodiments, the processing unit 2708 is further configured to: detect (e.g., with the detecting unit 2720), via the one or more input units 2704, selection of the second transfer affordance; and, in response to selection of the second transfer affordance, enable display of (e.g., with the display control unit 2718), on the display unit 2702, a plan view of available meeting spaces.

In some embodiments, the processing unit 2708 is further configured to: detect (e.g., with the detecting unit 2720), via the one or more input units 2704, selection of the second transfer affordance; and, in response to selection of the second transfer affordance, enable display of (e.g., with the display control unit 2718), on the display unit 2702, a list of available meeting spaces.

In some embodiments, prior to displaying the list of available meeting spaces, the processing unit 2708 is further configured to filter (e.g., with the filtering unit 2726) the list of available meeting spaces is filtered according to at least one of attributes associated with the meeting space or selected attributes.

In some embodiments, the processing unit 2708 is further configured to: detect (e.g., with the detecting unit 2720), via the one or more input units 2704, selection of a respective available meeting space; and, in response to detecting selection of the respective available meeting space: cease to present (e.g., with the facilitating unit 2710) the electronic conference with the equipment in the meeting space; and transfer (e.g., with the transferring unit 2722) the electronic conference to equipment associated with the respective available meeting space.

In some embodiments, facilitating presentation of the electronic conference includes transferring (e.g., with the transferring unit 2722) the electronic conference from a mobile device of one of the participants to the equipment associated with the meeting space.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 20A-20B, 21A-21D, 22A-22C, and 23A-23C are, optionally, implemented by components depicted in FIGS. 1A-1B or FIGS. 24-27. For example, determining operation 2004, obtaining operation 2104, detecting operation 2218, obtaining operation 2310, detecting operation 2316 and are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 28A-28CC illustrate example user interfaces for creating and managing calendar events in accordance with some embodiments. The user interfaces in these figures are used to illustrate the processes described below, including the processes in FIGS. 30A-30D and 31A-31C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 28A illustrates displaying a calendar interface 2801 (e.g., associated with a calendar creation and management application). For example, the calendar interface 2801 is displayed by a portable multifunction device 100 such as a phone, wearable computing device, tablet, laptop, or the like.

According to some embodiments, the calendar interface 2801 shows previously scheduled calendar events for a particular user. In some embodiments, the calendar interface 2801 also enables the user of the device to create new calendar events. As shown in FIG. 28A, the calendar interface 2801 includes timespan affordances 2802A, 2802B, 2802C, and 2802D (sometimes collectively referred to herein as the "timespan affordances 2802") provided to update the calendar interface 2801 to show previously scheduled calendar events for a corresponding timespan—day, week, month, and year, respectively.

For example, the "week" timespan affordance 2802B is selected in FIG. 28A to show calendar events for a particular week (e.g., the week of Feb. 5, 2017 to Feb. 11, 2017). In this example, the calendar interface 2801 shows timeslots for working hours of the particular week (e.g., one hour timeslots from 8 am-5 pm). In some embodiments, timeslots prior to 8 am or after 5 pm are shown in response to detecting a gesture that vertically scrolls the calendar interface 2801. In some embodiments, calendar events for a previous or next week are shown in response to detecting a gesture that horizontally scrolls the calendar interface 2801.

Figure 28D:
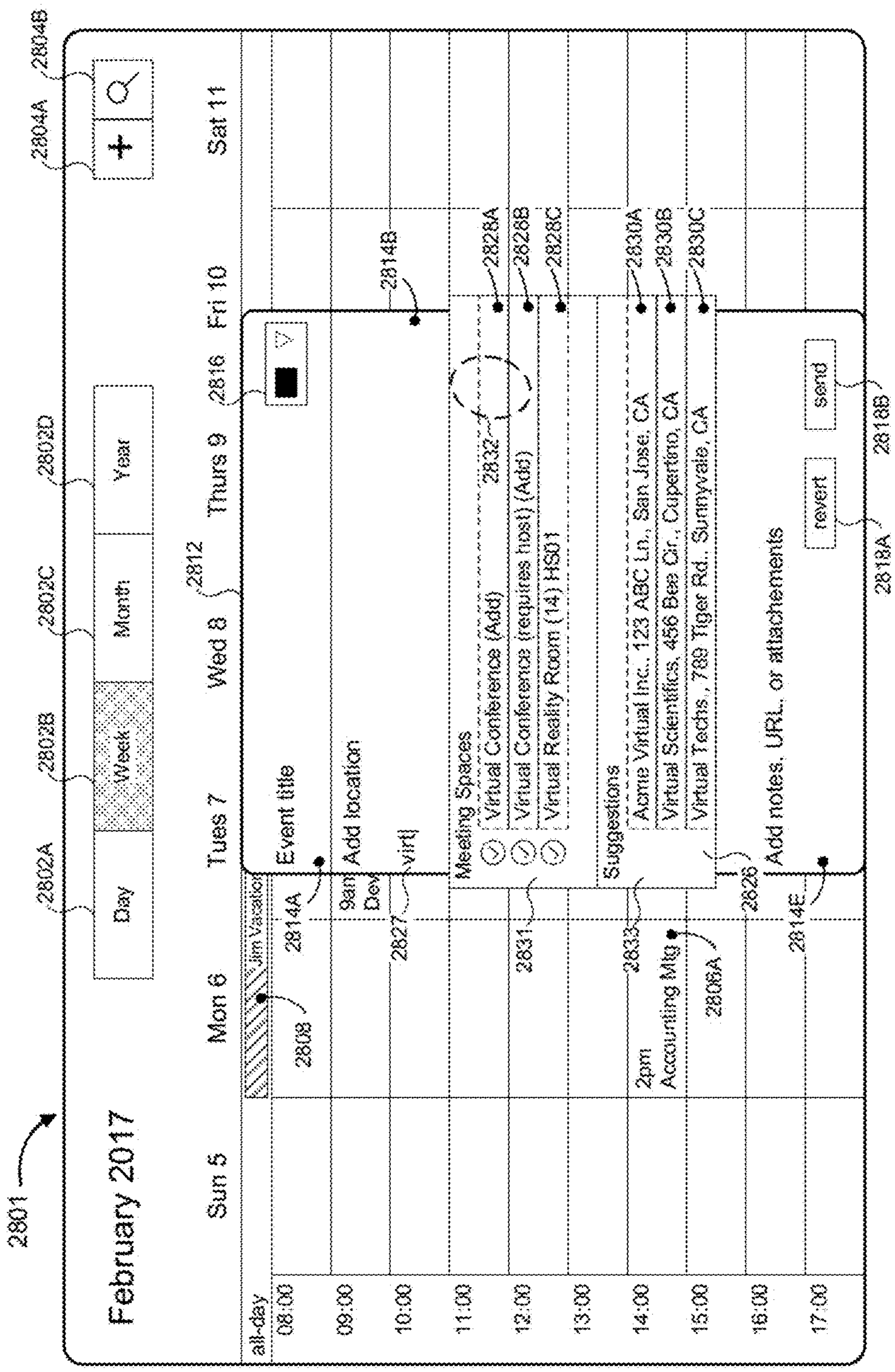
Figure 28E:
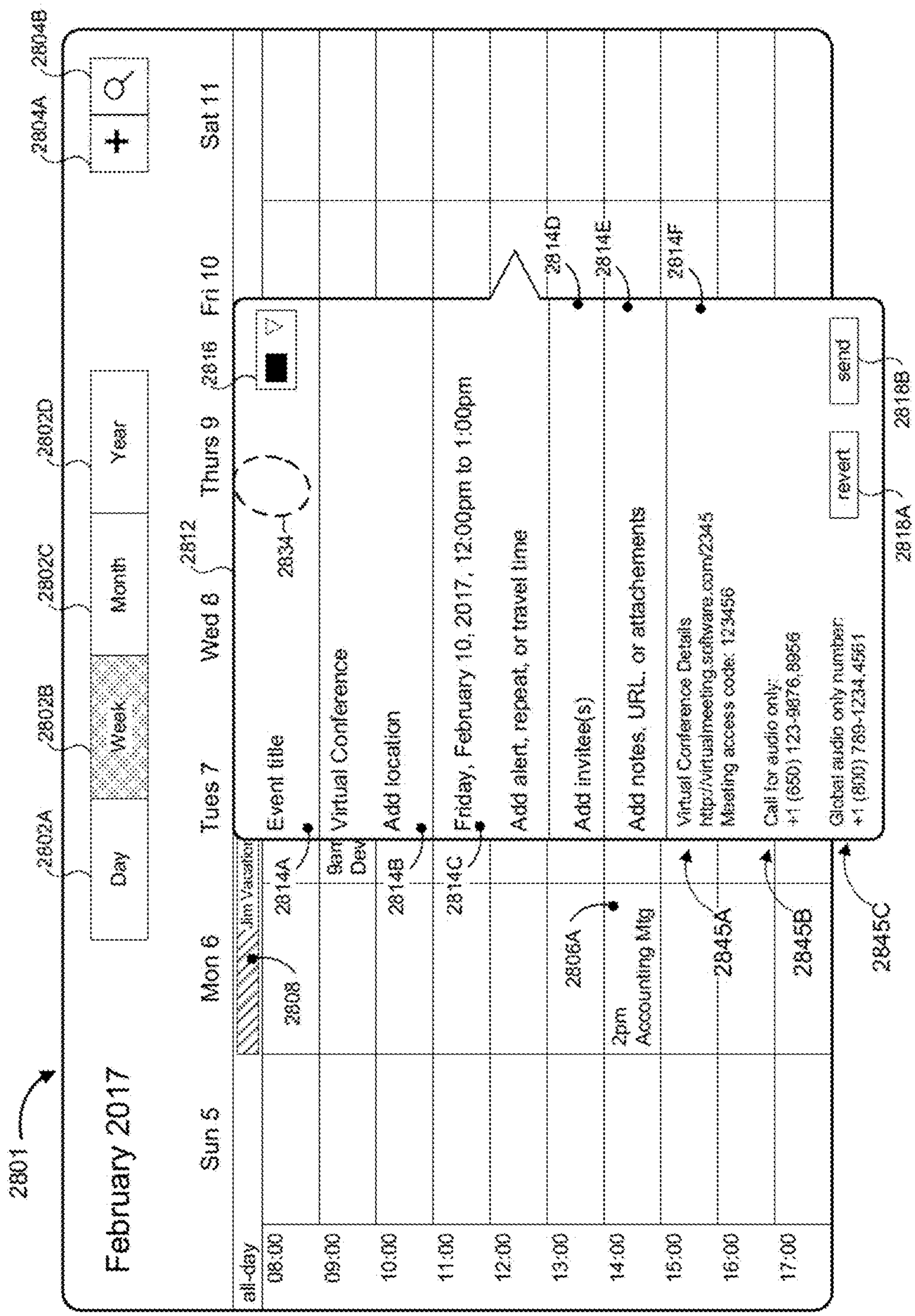
Figure 28F:
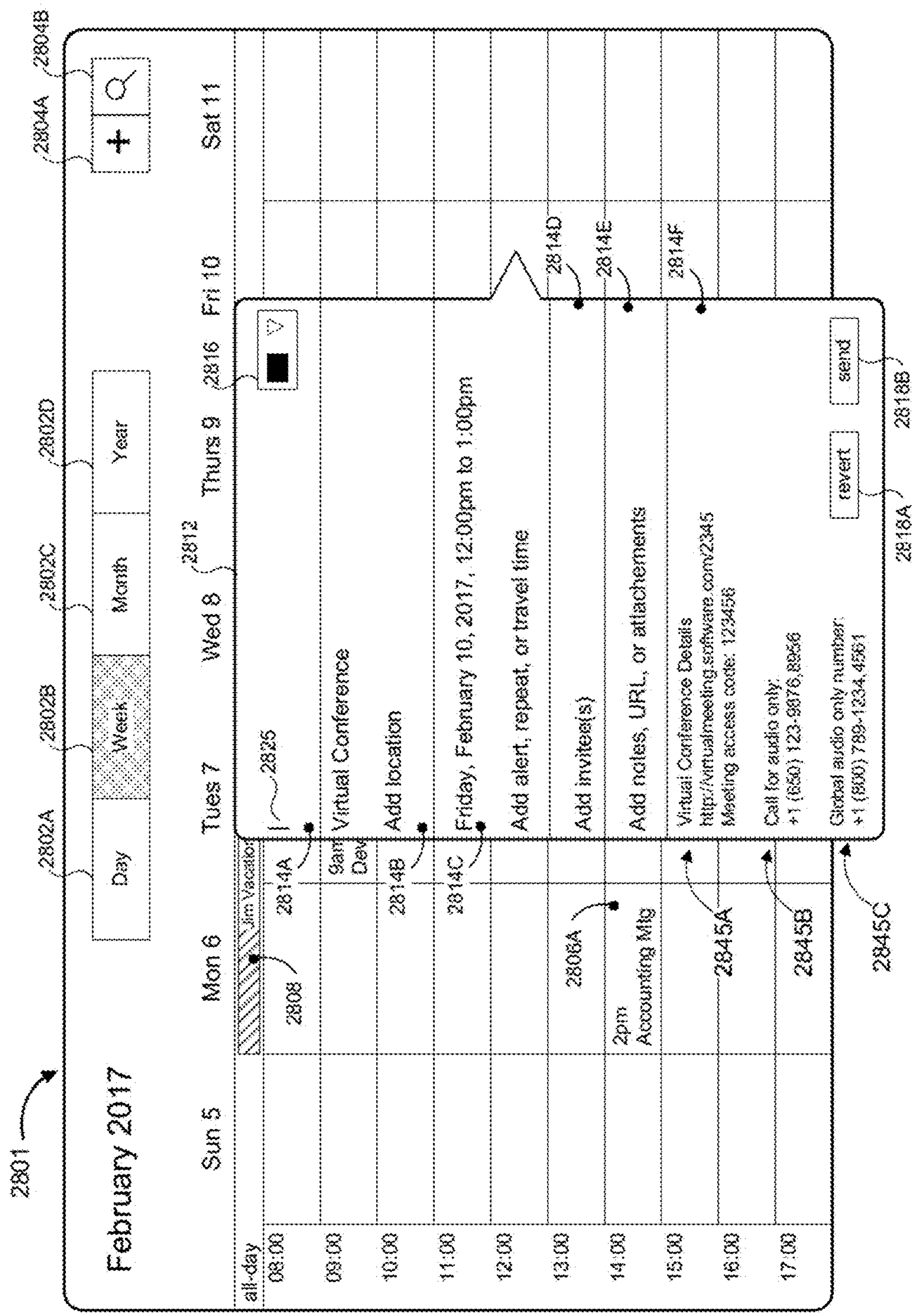
Figure 28G:
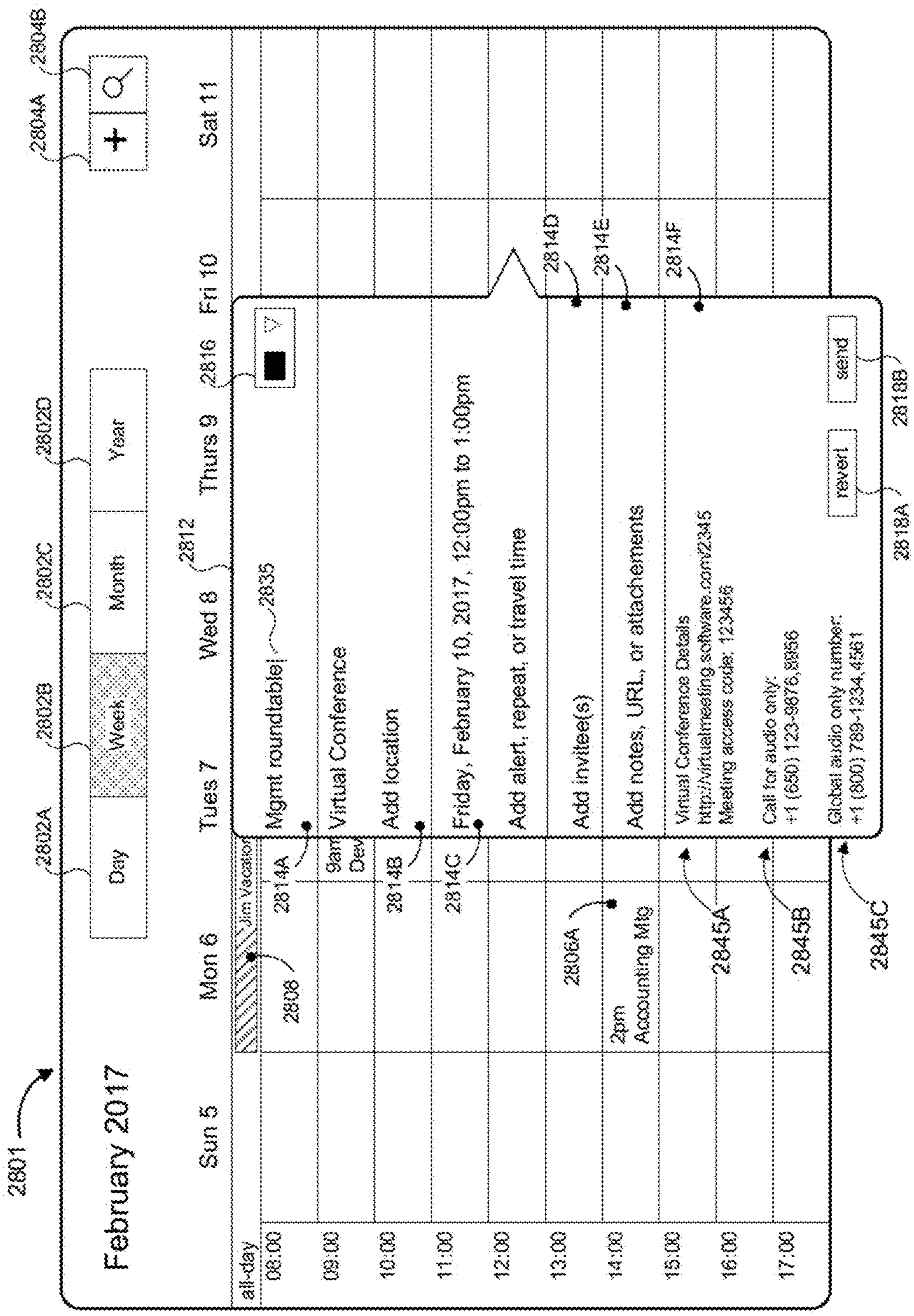
Figure 28H:
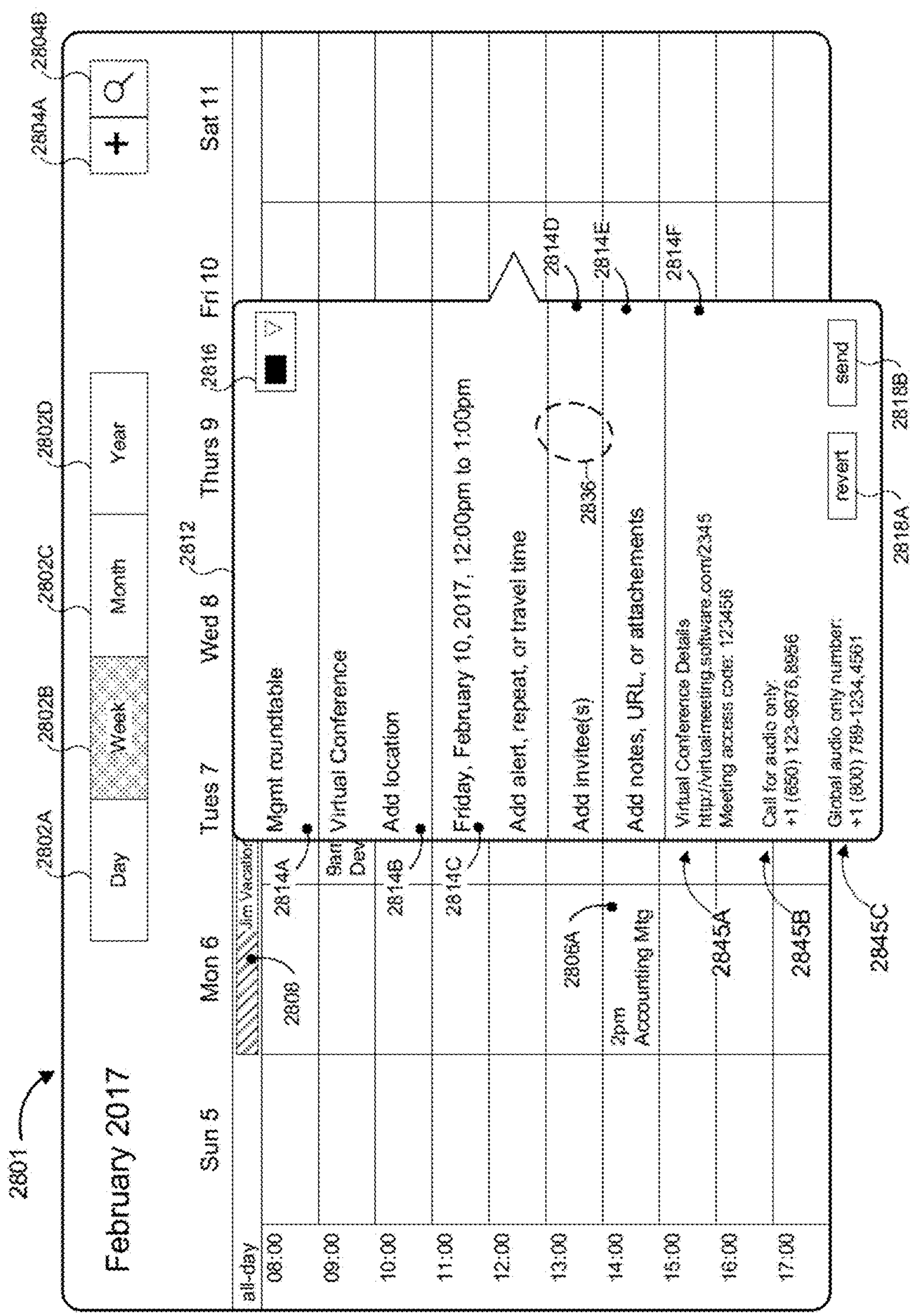
Figure 28I:
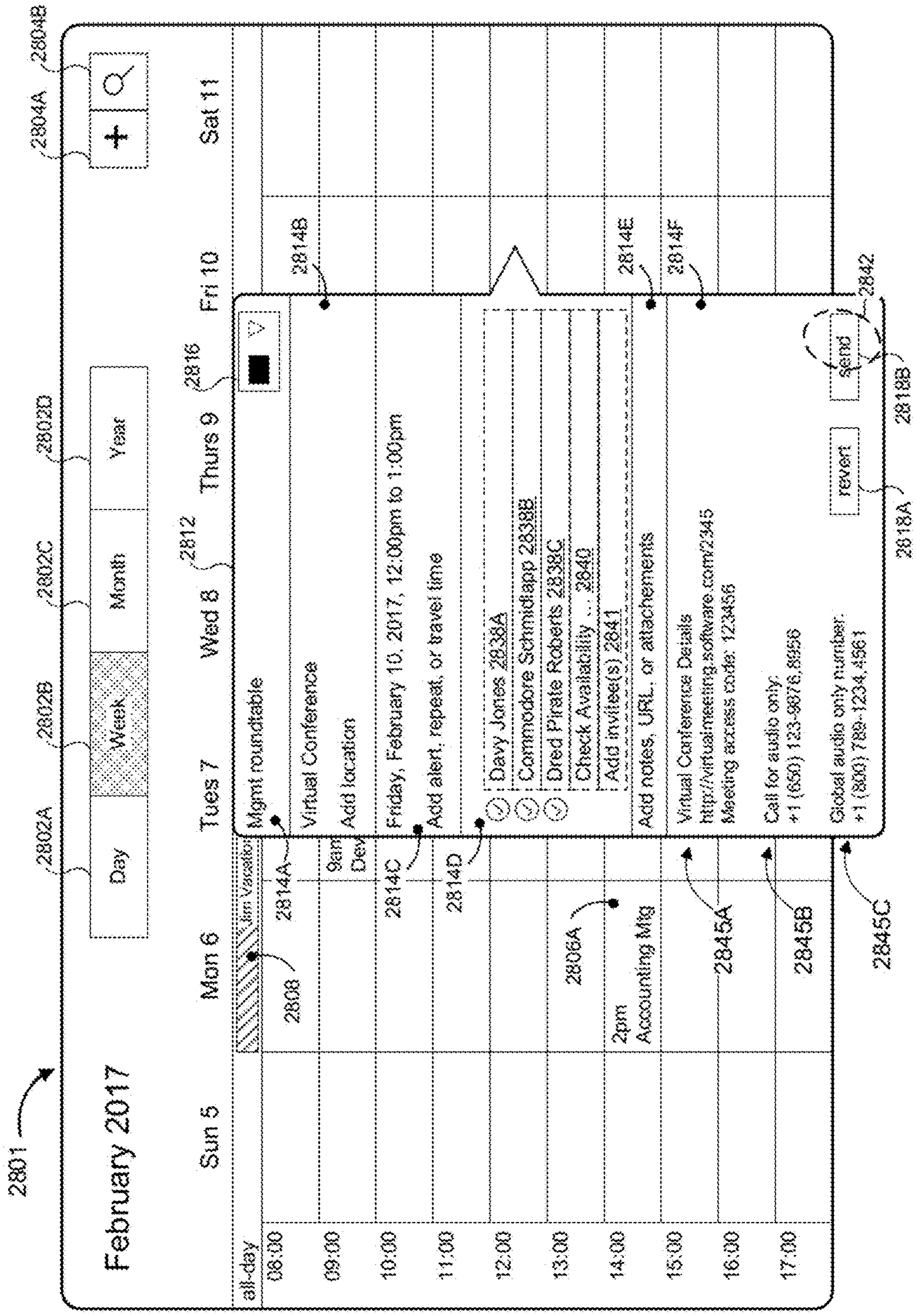
Figure 28J:
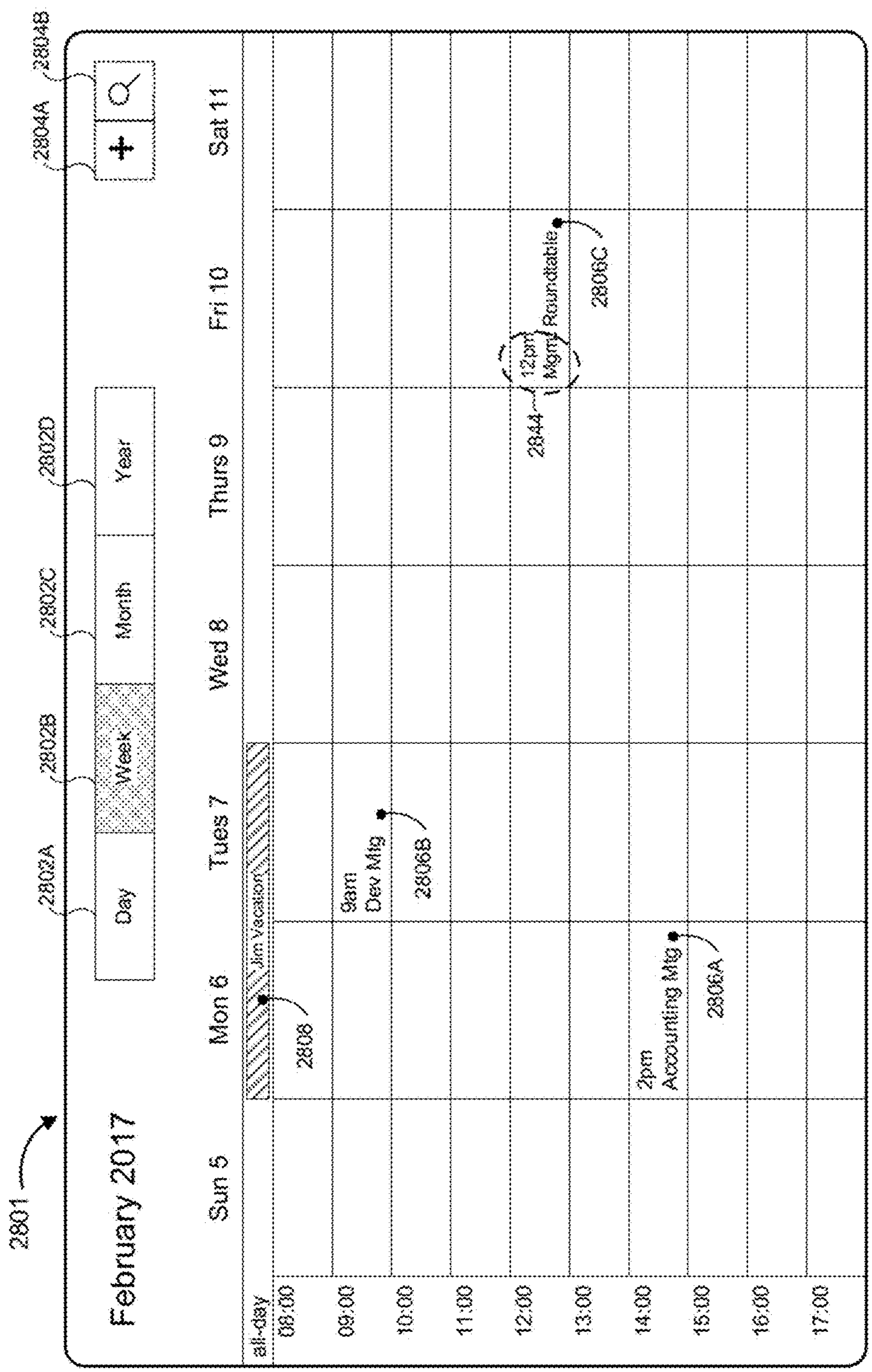
Figure 28K:
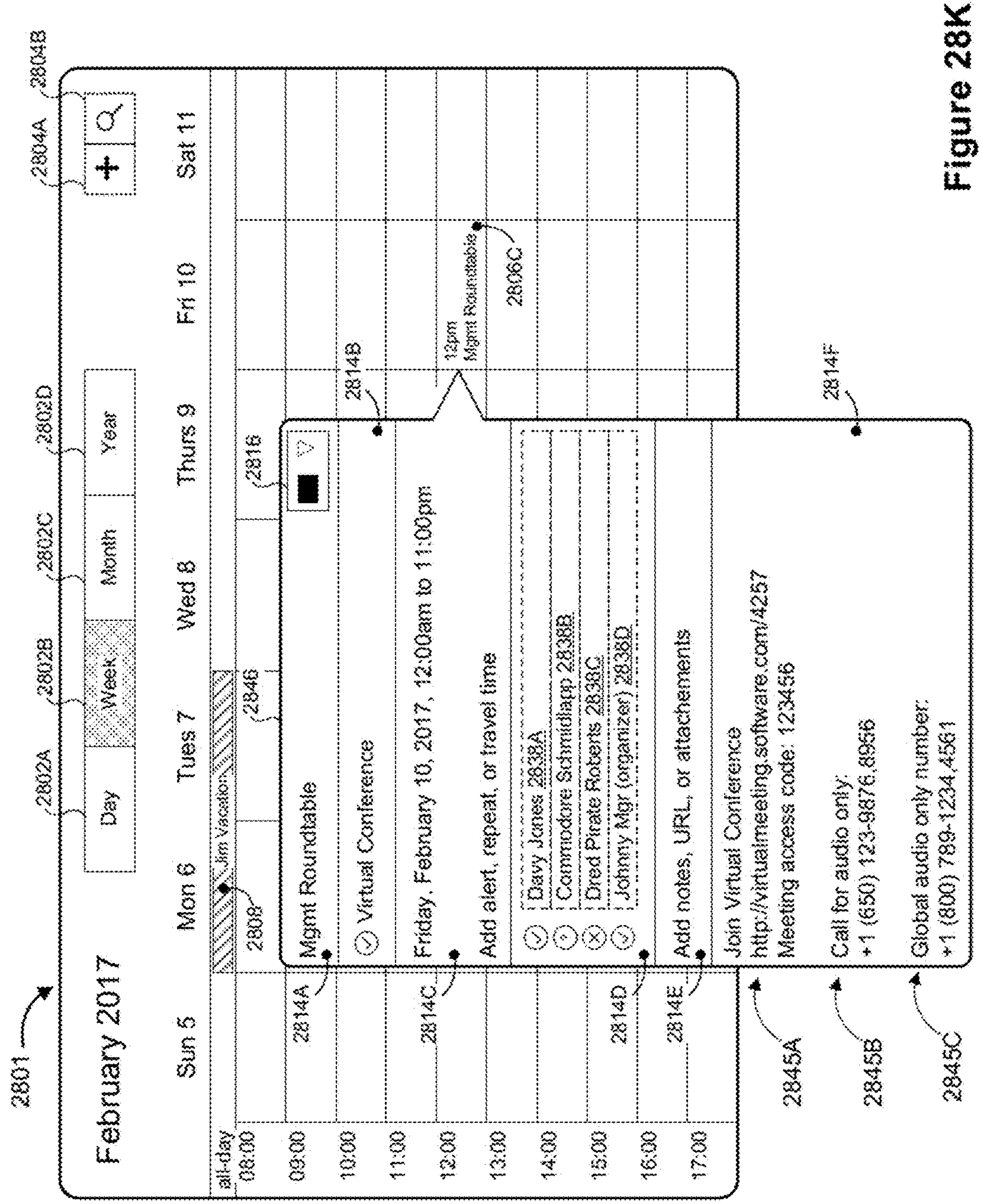

As shown in FIG. 28A, the calendar interface 2801 also includes a first calendar event indicator 2806A for a first calendar event scheduled from 2-3 pm on Monday, Feb. 6, 2017 entitled "Accounting Mtg" and a second calendar event indicator 2806B for a second calendar event scheduled from 9-10 am on Tuesday, Feb. 7, 2017 entitled "Dev Mtg." For example, when activated (e.g., selected with a contact), the first calendar event indicator 2806A causes an event details interface associated with the first calendar event to be displayed (e.g., similar to the event details interface 2846 in FIG. 28K). As shown in FIG. 28A, the calendar interface 2801 also includes a reminder indicator 2808 entitled "Jim Vacation" that spans from Monday, Feb. 6, 2017 to Tuesday, Feb. 7, 2017. For example, reminder indicators, such as the reminder indicator 2808, notify the user of events that span one or more days. As shown in FIG. 28A, the calendar interface 2801 further includes: an event creation affordance 2804A, which, when activated (e.g., selected with a contact), causes an event creation interface to be displayed (e.g., similar to the sequence in FIGS. 28L-28M); and a search affordance 2804B, which, when activated (e.g., selected with a contact), causes a search interface to be displayed for searching calendar events.

FIGS. 28A-28J show a sequence in which a calendar event is created with a virtual conference. FIG. 28A also illustrates detecting a contact 2810 at a location corresponding to the 12-1 pm timeslot on Friday, Feb. 10, 2017. FIG. 28B illustrates displaying an event creation interface 2812 provided to create a new calendar event overlaid on the calendar interface 2801 in response to selection of the 12-1 pm timeslot on Friday, Feb. 10, 2017 in FIG. 28A.

As shown in FIG. 28B, the event creation interface 2812 (e.g., the first user interface element) includes: a title input element 2814A (e.g., a user-modifiable field) provided to receive and subsequently display a title for the new event; a location input element 2814B (e.g., a user-modifiable field) provided to receive and subsequently display one or more locations for the new event; a scheduling input element 2814C (e.g., a user-modifiable field) provided to receive and subsequently display a time and date for the new event; an invitees input element 2814D (e.g., a user-modifiable field) provided to receive and subsequently display one or more invitees to be invited to the new event; and a notes input element 2814E (e.g., a user-modifiable field) provided to receive and (optionally) subsequently display notes, links (e.g., URLs), attachments, and/or the like for the new event (sometimes collectively referred to herein as the "input elements 2814").

According to some embodiments, the scheduling input element 2814C is also provided to receive and (optionally) subsequently display an alert, repeating sequence, travel time, and/or the like for the new event. As shown in FIG. 28B, the event creation interface 2812 also includes a categorization affordance 2816 provided to select a tag, color, category, and/or the like to be associated with the new event (e.g., a drop-down menu of selectable colors or categories). As shown in FIG. 28B, the event creation interface 2812 further includes: a revert affordance 2818A, which, when activated (e.g., selected with a contact), causes the last modification to the input elements 2814 in the event creation interface 2812 to be reverted (or causes all modifications to the input elements 2814 in the event creation interface 2812 to be reverted); and a send affordance 2818B, which, when activated (e.g., selected with a contact), causes invitations to the new event to be sent to the invitees and also causes the new event to be added to the creator's calendar.

FIG. 28B also illustrates displaying "Friday, Feb. 10, 2017, 12:00 pm to 1:00 pm" within the display portion of the scheduling input element 2814C in response to selection of the 12-1 pm timeslot on Friday, Feb. 10, 2017 in FIG. 28A. FIG. 28B further illustrates detecting a contact 2820 at a location corresponding to the location input element 2814B. FIG. 28C illustrates displaying a cursor-indicator 2825 within the location input element 2814B in response to selection of the location input element 2814B in FIG. 28B. According to some embodiments, the cursor-indicator 2825 indicates that the user is able to input a location via one or more input means. In one example, the user of the device speaks one or more characters that are recognized by a speech-to-text application. In another example, the user of the device types one or more characters using a software keyboard, integrated keyboard, or peripheral keyboard.

FIG. 28C also illustrates displaying a first list 2829 of frequently used meeting spaces proximate to the location input element 2814B in response to selection of the location input element 2814B in FIG. 28B. As shown in FIG. 28C, the first list 2829 of frequently used meeting spaces includes a virtual conference room indicator 2824A that is not associated with a host code (e.g., unsecure), a virtual conference room indicator 2824B that is associated with a host code (e.g., secure), a first physical meeting space indicator 2824C (e.g., the "Monet Room" with a 15 person occupancy limit in building HS01), a second physical meeting space indicator 2824D (e.g., the "Cervantes Room" with a 14 person occupancy limit in building HS02), and a third physical meeting space indicator 2824E (e.g., the "Van Gough Room" with a 11 person occupancy limit in building HS02) (sometimes collectively referred to herein as the "meeting space indicators 2824"). According to some embodiments, when one of the meeting space indicators 2824 is selected (e.g., selected with a contact), the selected one of the meeting space indicators 2824 is added to the new event and displayed within the display portion of the location input element 2814B.

For example, the user of the device inputs a string of characters (e.g., "virt") into the location input element 2814B via a software keyboard. FIG. 28D illustrates displaying a string of characters 2827 (e.g., "virt") within the location input element 2814B. FIG. 28D also illustrates replacing display of the first list 2829 of frequently used meeting spaces with a second list 2831 of meeting spaces that match the string of characters 2827 and a third list 2833 of suggested addresses that match the string of characters 2827 proximate to the location input element 2814B.

As shown in FIG. 28D, the second list 2831 of meeting spaces that match the string of characters 2827 includes a virtual conference room indicator 2828A that is not associated a host code (e.g., unsecure or non-password protected room), a virtual conference room indicator 2828B associated with a host code (e.g., secure or password protected room), and a physical meeting space indicator 2828C (e.g., the "Virtual Reality Room" with a 14 person occupancy limit in building HS01) (sometimes collectively referred to herein as the "meeting space indicators 2828"). According to some embodiments, when one of the meeting space indicators 2828 is selected (e.g., selected with a contact), the selected one of the meeting space indicators 2828 is added to the new event and displayed within the display portion of the location input element 2814B.

As shown in FIG. 28D, the third list 2833 of suggested addresses that match the string of characters 2827 includes a first address indicator 2830A (e.g., Acme Virtual Inc., 123 ABC Ln., San Jose, Calif.), a second address indicator 2830B (e.g., Virtual Scientifics, 456 Bee Cir., Cupertino, Calif.), and a third address indicator 2830C (e.g., Virtual Techs., 789 Tiger Rd., Sunnyvale, Calif.) (sometimes collectively referred to herein as the "address indicators 2830"). According to some embodiments, when one of the address indicators 2830 is selected (e.g., selected with a contact), the selected one of the address indicators 2830 is added to the new event and displayed within the display portion of the location input element 2814B.

FIG. 28D also illustrates detecting a contact 2832 at a location corresponding to the virtual conference room indicator 2828A. FIG. 28E illustrates displaying "Virtual Conference" within the display portion of the location input element 2814B in response to selection of the virtual conference room indicator 2828A in FIG. 28D. FIG. 28E also illustrates displaying a virtual conference details interface element 2814F within the event creation interface 2812 in response to selection of the virtual conference room indicator 2828A in FIG. 28D.

As shown in FIG. 28E, the virtual conference details interface element 2814F includes a first sub-region 2845A that includes a URL to the virtual conference and a meeting access code for the virtual conference. As shown in FIG. 28E, the virtual conference details interface element 2814F also includes a second sub-region 2845B that includes a domestic (e.g., US) call-in number for the virtual conference. As shown in FIG. 28E, the virtual conference details interface element 2814F further includes a third sub-region 2845C that includes a foreign (e.g., non-US) call-in number for the virtual conference.

FIG. 28E also illustrates detecting a contact 2834 at a location corresponding to the title input element 2814A. FIG. 28F illustrates displaying a cursor-indicator 2825 within the title input element 2814A in response to selection of the title input element 2814A in FIG. 28E. For example, the user of the device inputs a string of characters (e.g., "Mgmt roundtable") into the title input element 2814A via a software keyboard. FIG. 28G illustrates displaying a string of characters 2835 (e.g., "Mgmt roundtable") within the title input element 2814A. For example, the user of the device completes entry of the string of characters (e.g., "Mgmt roundtable") within the title input element 2814A.

FIG. 28H illustrates detecting a contact 2836 at a location corresponding to the invitees input element 2814D. For example, the user of the device selects invitees from a list of contacts. In another example, the user of the device enters the names of the invitees using a software keyboard. In yet another example, in response to selection of the invitees input element 2814D, a directory/contacts interface is displayed that enables the user of the device to search for and select invitees. FIG. 28I illustrates displaying a first invitee indicator 2838A associated with a first invitee (e.g., Davy Jones), a second invitee indicator 2838B associated with a second invitee (e.g., Commodore Schmidlapp), and a third invitee indicator 2838C associated with a third invitee (e.g., Dred Pirate Roberts) (sometimes collectively referred to herein as the "invitee indicators 2838") within the display portion of the invitees input element 2814D in response to selection or entry of the associated invitees. According to some embodiments, selection of one of the invitee indicators 2838 causes a contact card (e.g., phone number, address, location, title, etc.) to be displayed for the person associated with the selected one of the invitee indicators 2838.

FIG. 28I also illustrates displaying a check availability affordance 2840 within the invitees input element 2814D provided to display an availability interface for the invitees. In one example, the availability interface shows the current availability of the invitees. In another example, the availability interface shows the availability of the invitees on the time and date of the new event based on the calendars of the invitees). FIG. 28I further illustrates displaying an add invitee(s) affordance 2841 within the invitees input element 2814D provided to add additional invitees to the new event.

FIG. 28I further illustrates detecting a contact 2842 at a location corresponding to the send affordance 2818B. For example, in response to selection of the send affordance 2818B, invitations to the event created in FIGS. 28B-28I are sent to the invitees selected in FIGS. 28H-28I (e.g., Davy Jones, Commodore Schmidlapp, and Dred Pirate Roberts) via one or more communication means (e.g., email, SMS, and/or the like). FIG. 28J illustrates ceasing to display the event creation interface 2812 in response to selection of the send affordance 2818B in FIG. 28I. FIG. 28J also illustrates displaying a third calendar event indicator 2806C within the calendar interface 2801 in response to the sequence of event creation operations in FIGS. 28B-28I. As shown in FIG. 28J, the third calendar event indicator 2806C correspond to the newly created scheduled from 12-1 pm on Friday, Feb. 10, 2017 entitled "Mgmt Roundtable."

FIGS. 28J-28K show a sequence in which an event details interface is shown for the previously created calendar event with a virtual conference. FIG. 28J further illustrates detecting a contact 2844 at a location corresponding to the third calendar event indicator 2806C. FIG. 28K illustrates displaying an event details interface 2846 for the event created in FIGS. 28B-28I in response to selection of the third calendar event indicator 2806C in FIG. 28J.

The event details interface 2846 in FIG. 28K is similar to and adapted the event creation interface 2812 in FIG. 28I. As such, the event details interface 2846 in FIG. 28K and the event creation interface 2812 in FIG. 28I include similar user interfaces and elements labeled with the same reference number in both figures have the same function, with only the differences are described herein for the sake of brevity. As shown in FIG. 28K, the display portion of the invitees input element 2814D includes a fourth invitee indicator 2838D associated with the organizer of the event created in FIGS. 28B-28I (e.g., Johnny Mgr—the user of the device).

According to some embodiments, response status indicator icons are displayed proximate to the invitee indicator 2838 in the event details interface 2846. For example, a respective response status indicator icon indicates the corresponding invitee's response status to the event invitation. As shown in FIG. 28K, the response status indicator icon proximate to the invitee indicator 2838A for Davy Jones indicates that Davy Jones responded that he would attend the event (e.g., check-mark icon). In FIG. 28K, the response status indicator icon proximate to the invitee indicator 2838B for Commodore Schmidlapp indicates that Commodore Schmidlapp responded that he might attend the event (e.g., question-mark icon). In FIG. 28K, the response status indicator icon proximate to the invitee indicator 2838C for Dred Pirate Roberts indicates that Dred Pirate Roberts responded that he would not attend the event (e.g., ex icon).

According to some embodiments, some of the input elements 2814 are user-modifiable in the event details interface 2846. In one example, the organizer is able to modify the input elements 2814 in the event details interface 2846 but not the other invitees. In another example, the organizer is able to modify the input elements 2814 in the event details interface 2846 but the other invitees are allowed to suggest changes. In yet another example, the organizer and the other invitees are able to modify the input elements 2814 in the event details interface 2846.

Figure 28L:
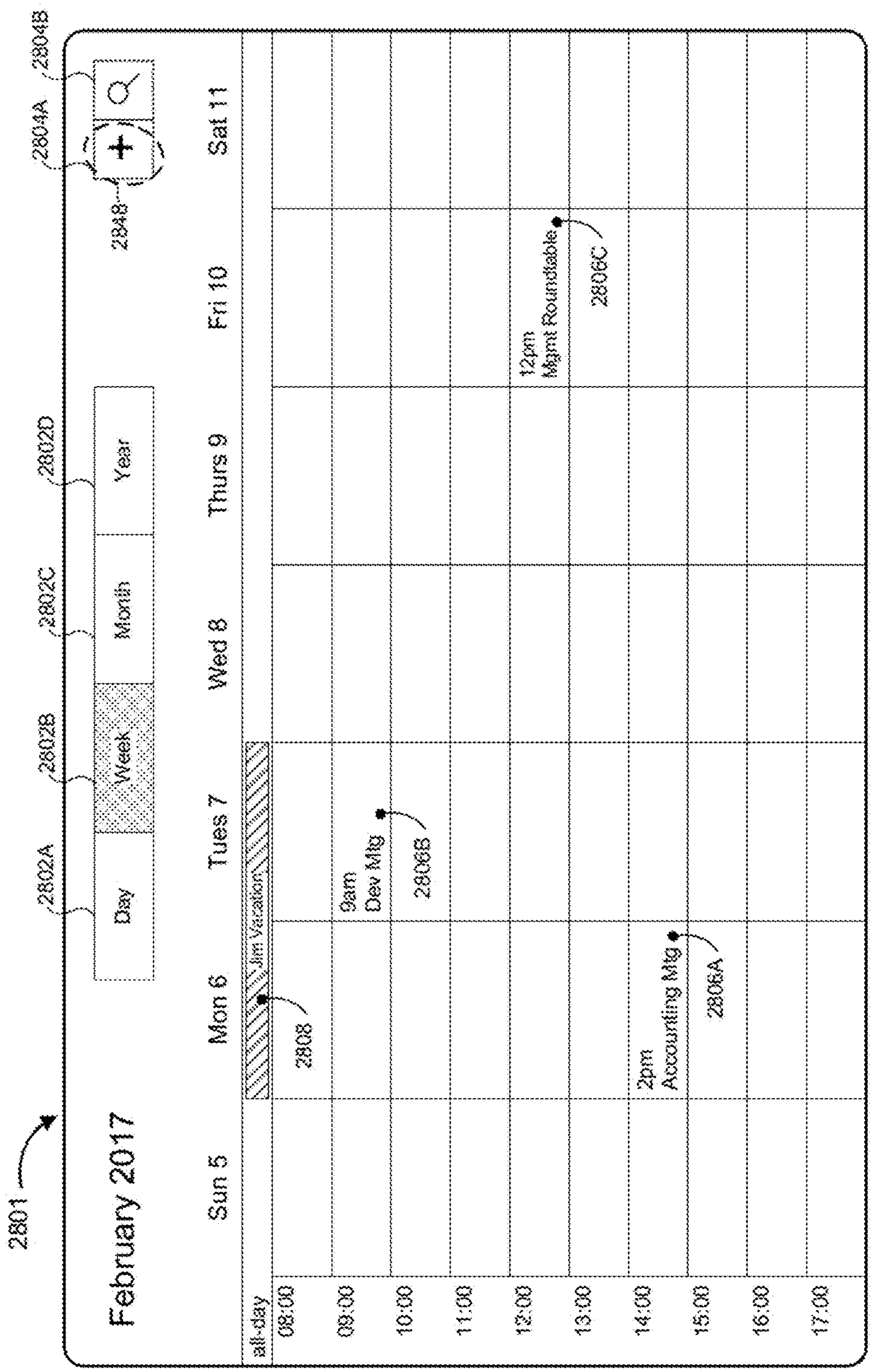
Figure 28M:
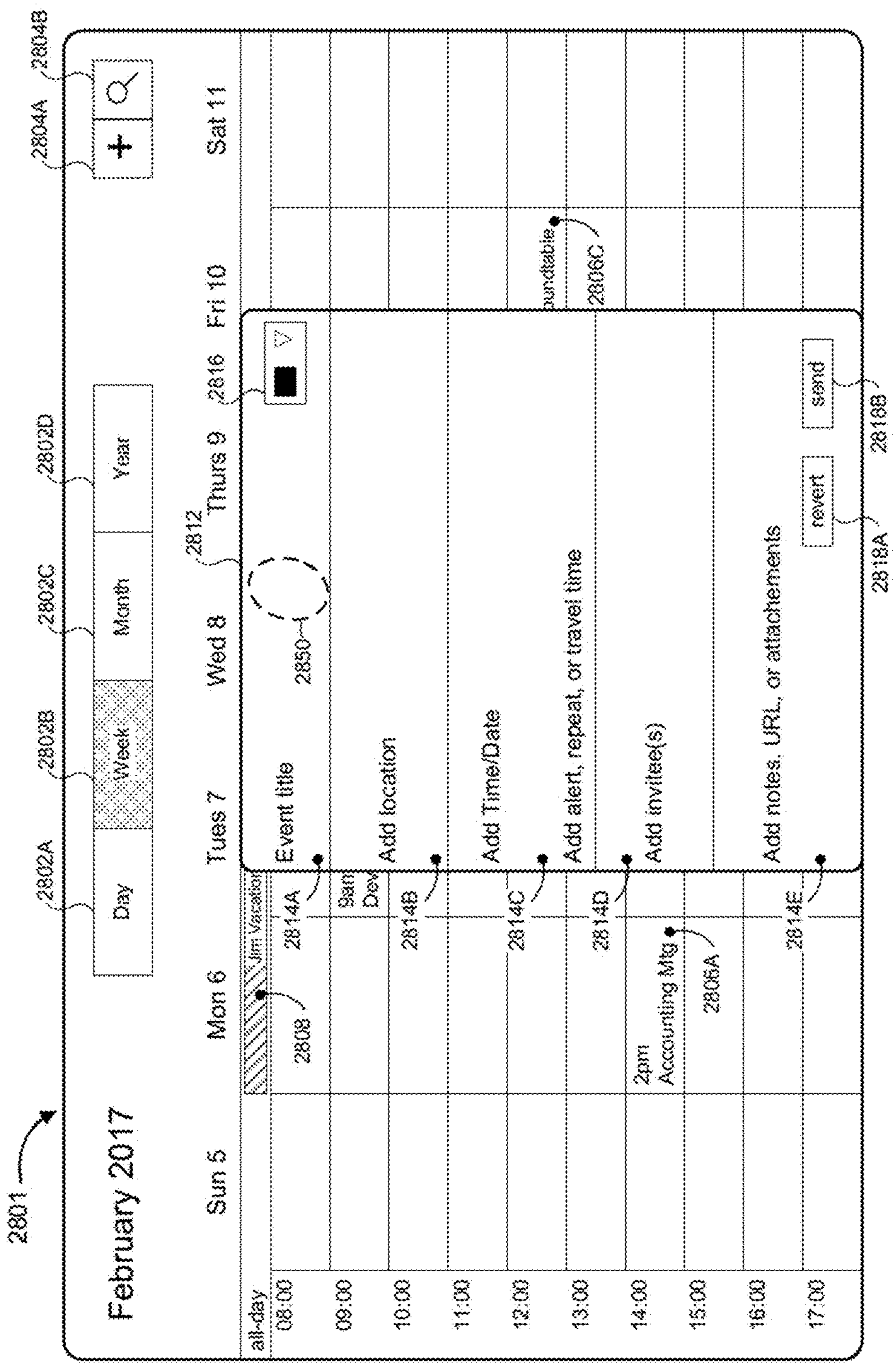

FIGS. 28L-28U show a sequence in which a subsequent calendar event is created with a physical meeting space location and a virtual conference. FIG. 28L illustrates detecting a contact 2848 at a location corresponding to the event creation affordance 2804A. FIG. 28M illustrates displaying the event creation interface 2812 overlaid on the calendar interface 2801 in response to selection of the event creation affordance 2804A in FIG. 28L.

The event creation interface 2812 in FIG. 28M is similar to and adapted the event creation interface 2812 in FIG. 28B. As such, the event creation interface 2812 in FIG. 28M and the event creation interface 2812 in FIG. 28B include similar user interfaces and elements labeled with the same reference number in both figures have the same function, with only the differences are described herein for the sake of brevity. As shown in FIG. 28M, the display portion of the scheduling input element 2814C is empty as compared to FIG. 28B due to selection of the event creation affordance 2804A instead of a timeslot within the calendar interface 2801.

Figure 28N:
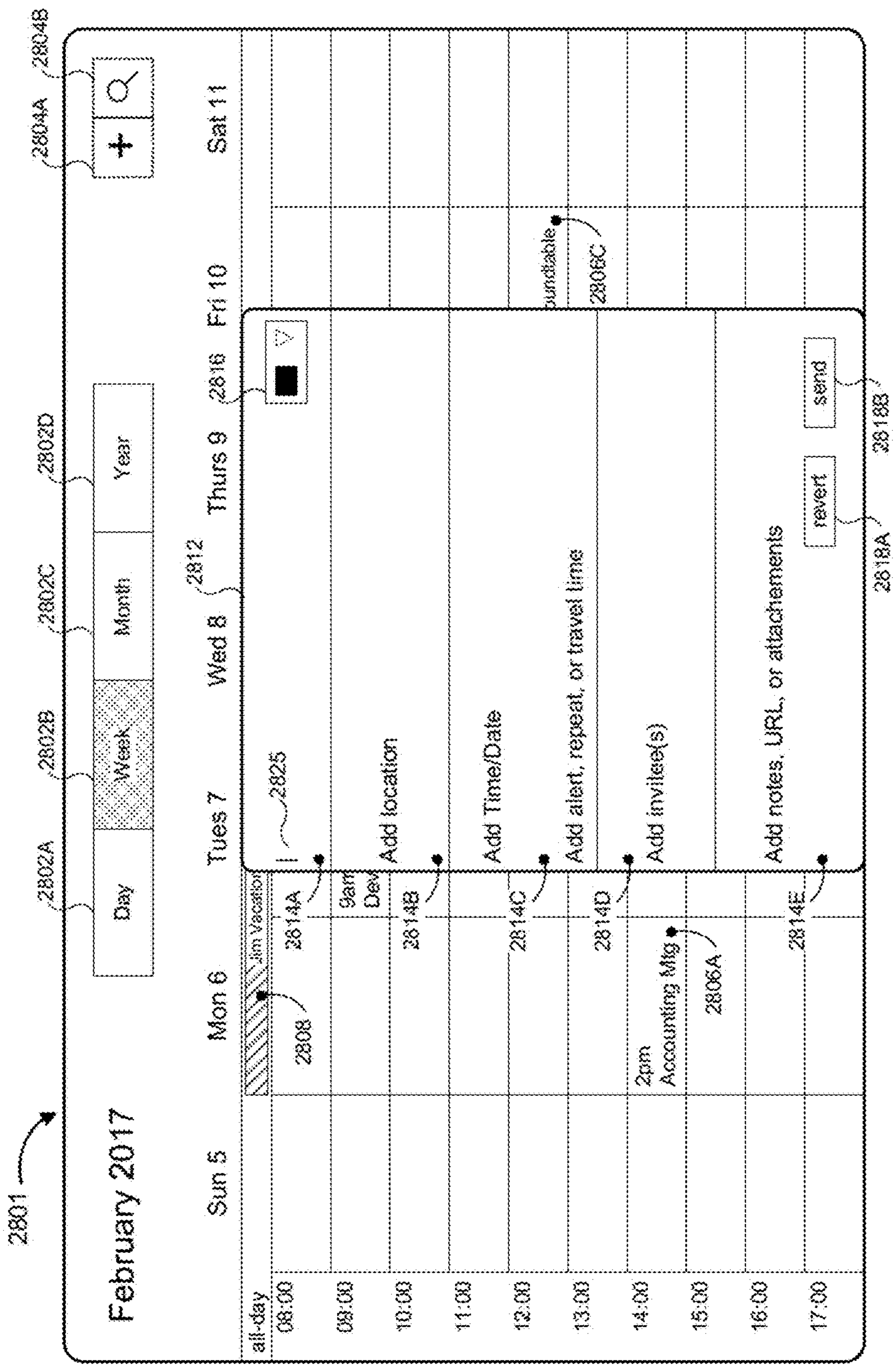
Figure 28O:
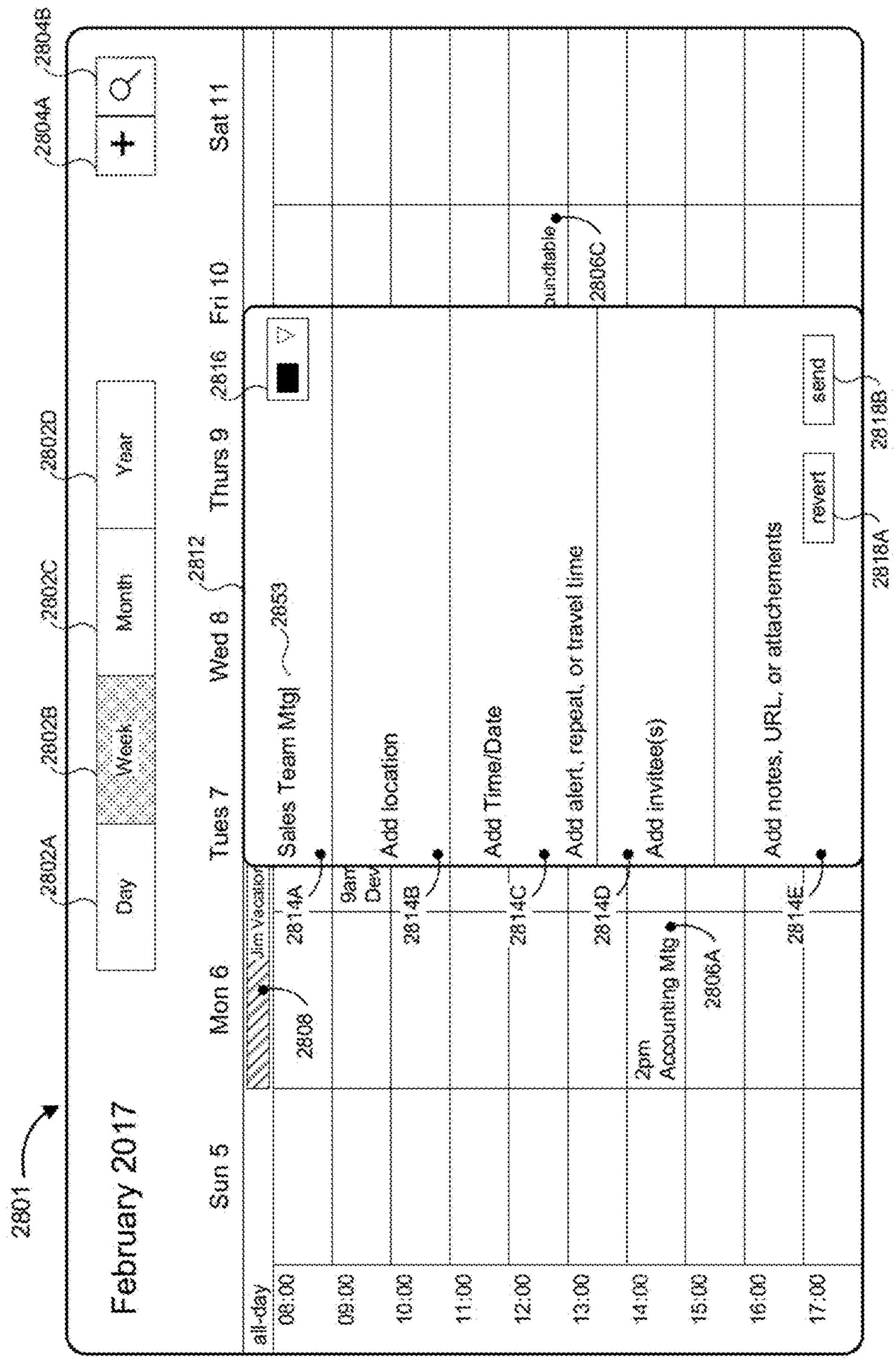

FIG. 28M also illustrates detecting a contact 2850 at a location corresponding to the title input element 2814A. FIG. 28N illustrates displaying the cursor-indicator 2825 within the title input element 2814A in response to selection of the title input element 2814A in FIG. 28M. For example, the user of the device inputs a string of characters (e.g., "Sales Team Mtg") into the title input element 2814A via a software keyboard. FIG. 28O illustrates displaying a string of characters 2853 (e.g., "Sales Team Mtg") within the title input element 2814A. For example, the user of the device completes entry of the string of characters (e.g., "Sales Team Mtg") within the title input element 2814A.

Figure 28P:
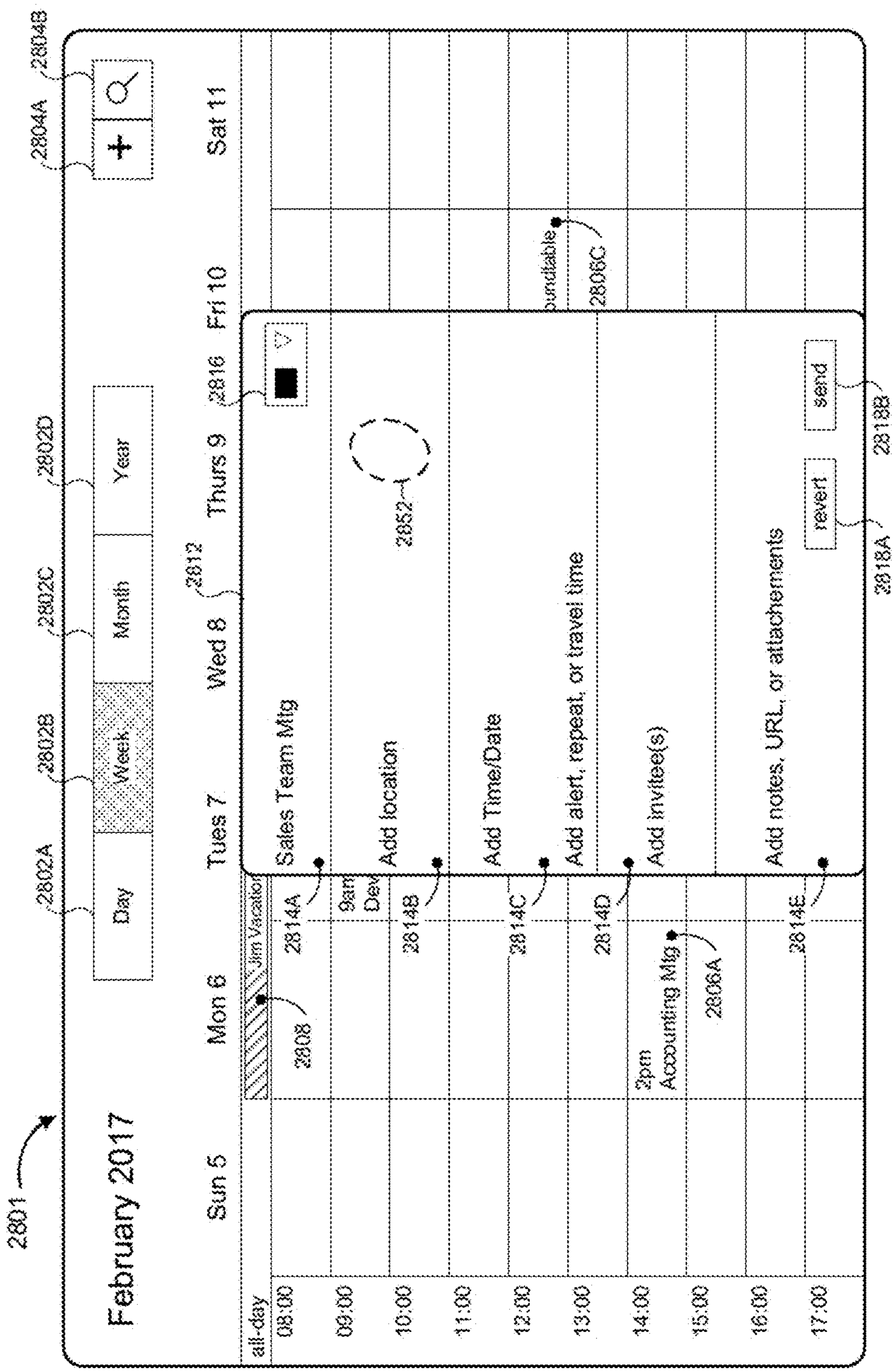
Figure 28Q:
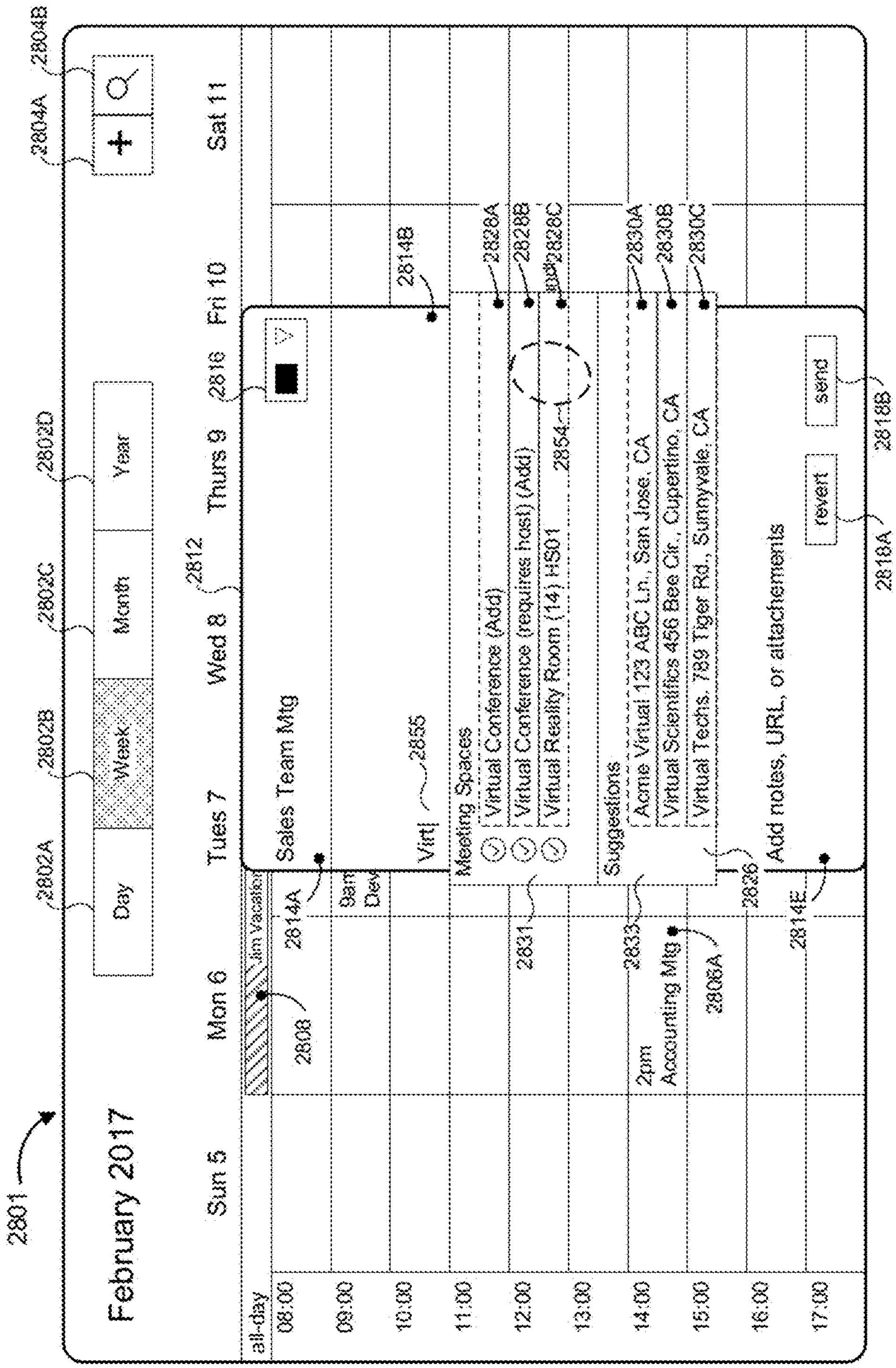

FIG. 28P illustrates displaying the event title entered in FIGS. 28M-28O within the display portion of the title input element 2814A. FIG. 28P also illustrates detecting a contact 2852 at a location corresponding to the location input element 2814B. For example, the user of the device inputs a string of characters (e.g., "Virt") into the location input element 2814B via a software keyboard. FIG. 28Q illustrates displaying a string of characters 2855 (e.g., "Virt") within the location input element 2814B. FIG. 28Q also illustrates displaying the second list 2831 of meeting spaces that match the string of characters 2855 and the third list 2833 of suggested addresses that match the string of characters 2855 proximate to the location input element 2814B.

Figure 28R:
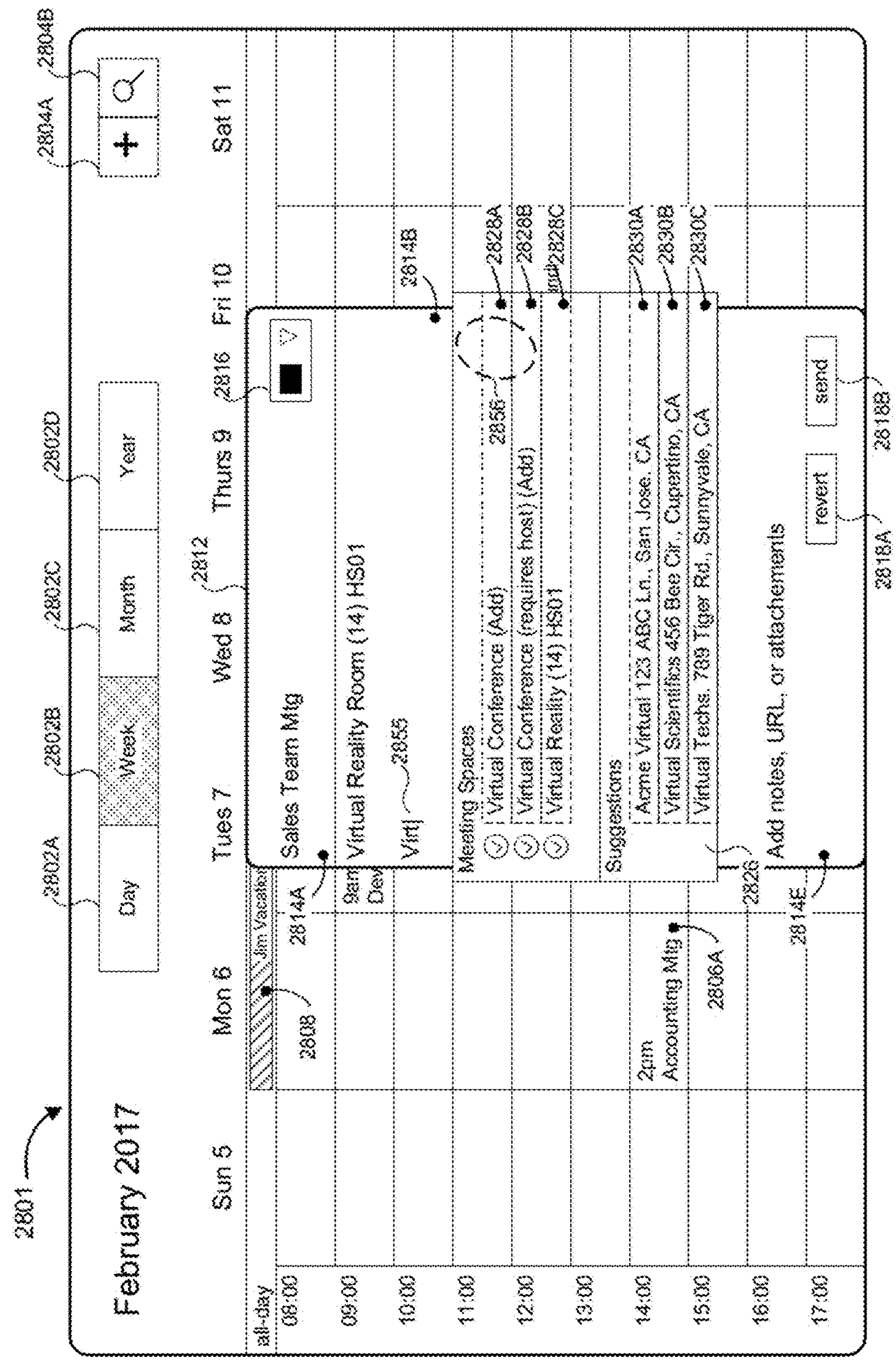

FIG. 28Q also illustrates detecting a contact 2854 at a location corresponding to the physical meeting space indicator 2828C. FIG. 28R illustrates displaying "Virtual Reality Room" within the display portion of the location input element 2814B in response to selection of the physical meeting space indicator 2828C in FIG. 28Q. FIG. 28R also illustrates detecting a contact 2856 at a location corresponding to the virtual conference room indicator 2828A. FIG.

28S illustrates displaying "Virtual Conference" in addition to "Virtual Reality Room" within the display portion of the location input element 2814B in response to selection of the virtual conference room indicator 2828A in FIG. 28R.

Figure 28S:
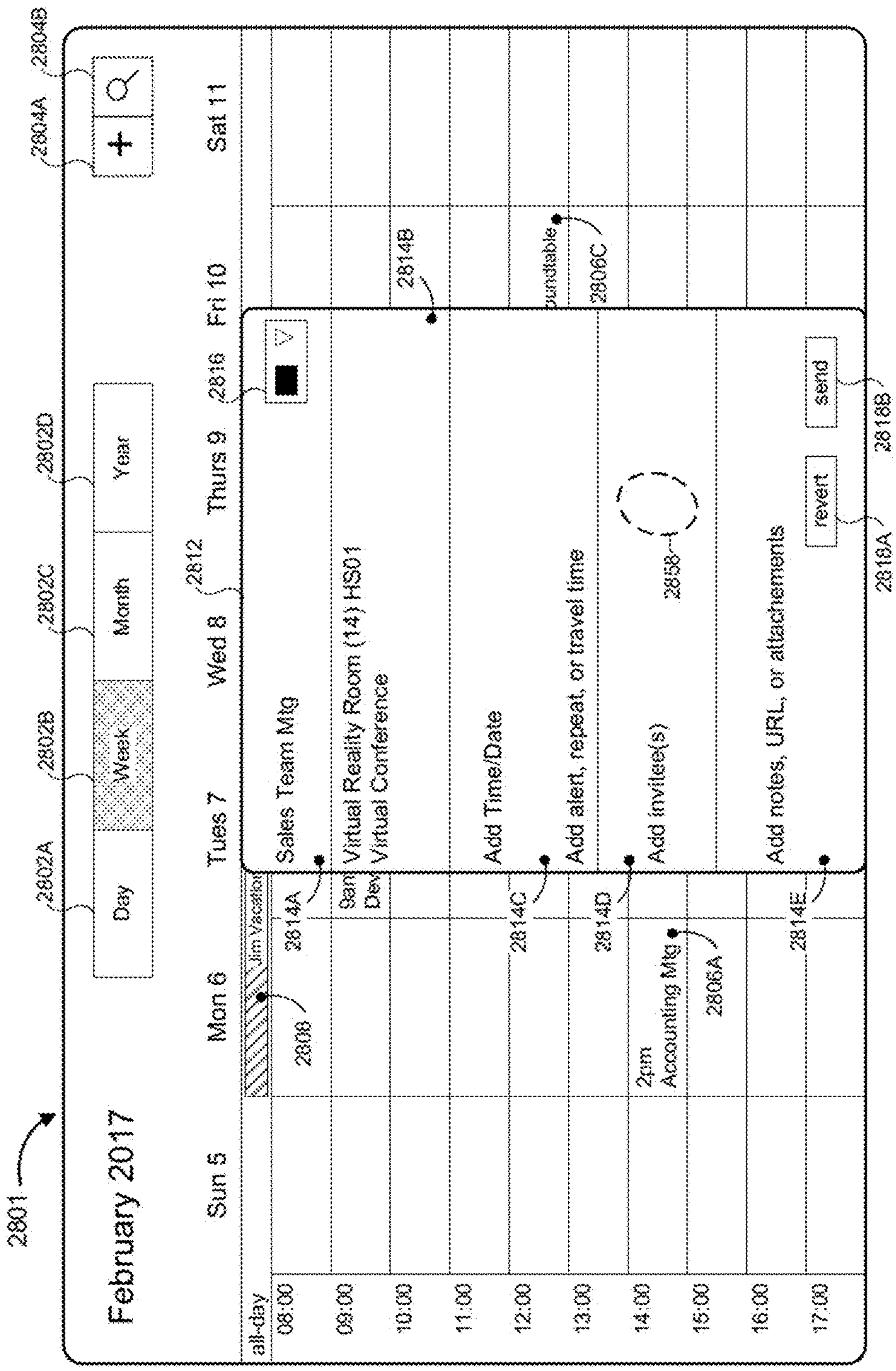

FIG. 28S also illustrates detecting a contact 2858 at a location corresponding to the invitees input element 2814D. For example, the user of the device selects invitees from a list of contacts. In another example, the user of the device enters the names of the invitees using a software keyboard. In yet another example, in response to selection of the invitees input element 2814D, a directory/contacts interface is displayed that enables the user of the device to search for and select invitees.

Figure 28T:
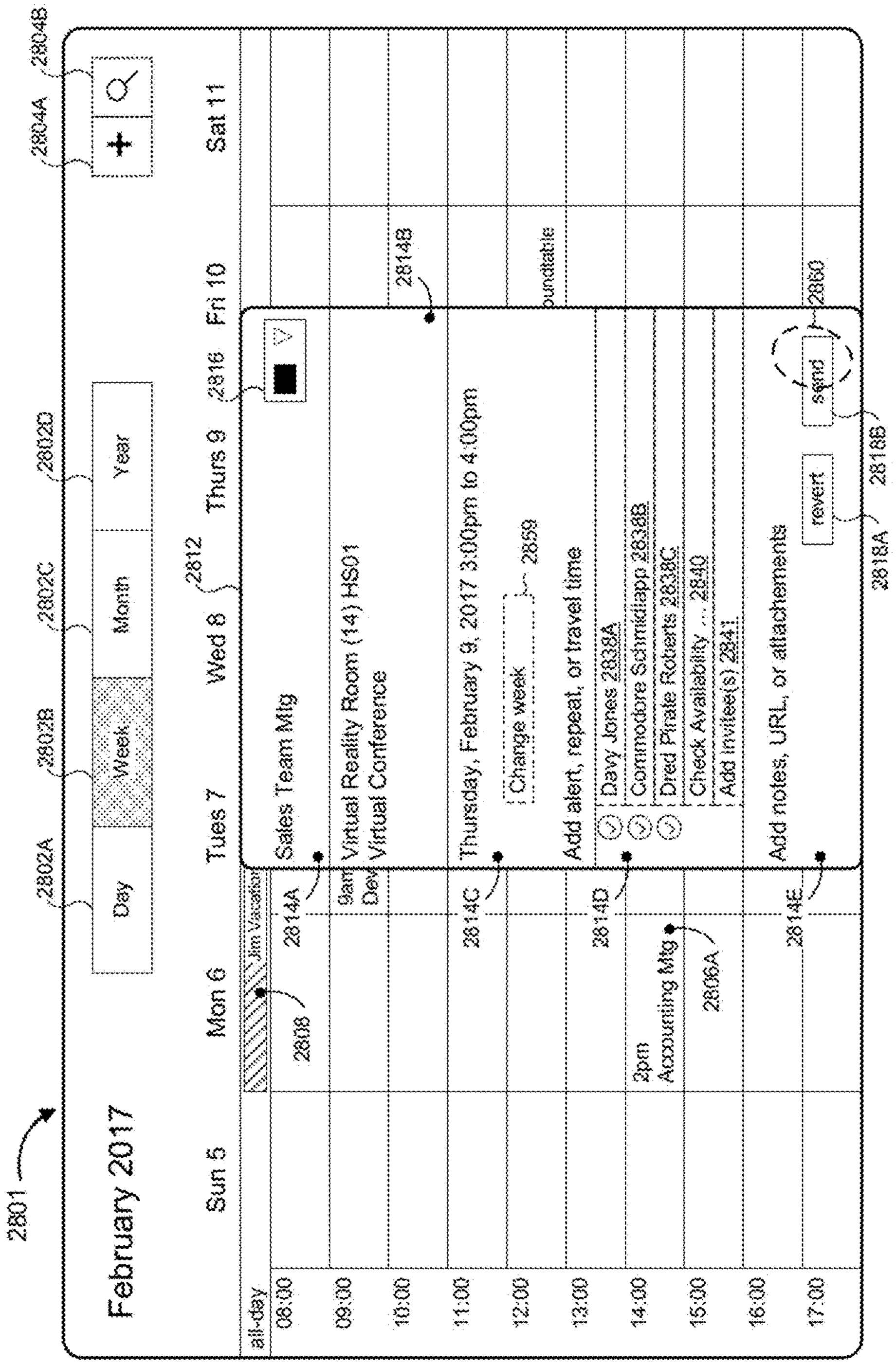

FIG. 28T illustrates displaying a first invitee indicator 2838A associated with a first invitee (e.g., Davy Jones), a second invitee indicator 2838B associated with a second invitee (e.g., Commodore Schmidlapp), and a third invitee indicator 2838C associated with a third invitee (e.g., Dred Pirate Roberts) (sometimes collectively referred to herein as the "invitee indicators 2838") within the display portion of the invitees input element 2814D in response to selection or entry of the associated invitees. According to some embodiments, selection of one of the invitee indicators 2838 causes a contact card (e.g., phone number, address, location, title, etc.) to be displayed for the person associated with the selected one of the invitee indicators 2838.

FIG. 28T also illustrates displaying "Thursday, Feb. 9, 2017, 3:00 pm to 4:00 pm" within the display portion of the scheduling input element 2814C in response to selecting the invitees. According to some embodiments, the display portion of the scheduling input element 2814C is populated with a date and time that satisfies a time and date criterion based on schedule attributes of the organizer of the new event (e.g., the user of the device) and the selected invitees. For example, a time and date during the current calendar week that does not conflict with the existing calendars of the organizer and the selected invitees is selected to auto-populate the scheduling input element 2814C for the new event. As shown in FIG. 28T, the scheduling input element 2814C includes a change week affordance 2859 provided to change the week associated with the new event. For example, in response to selection of the change week affordance 2859, a time and date during the next calendar week that does not conflict with the existing calendars of the organizer and the selected invitees is selected to auto-populate the scheduling input element 2814C for the new event.

Figure 28U:
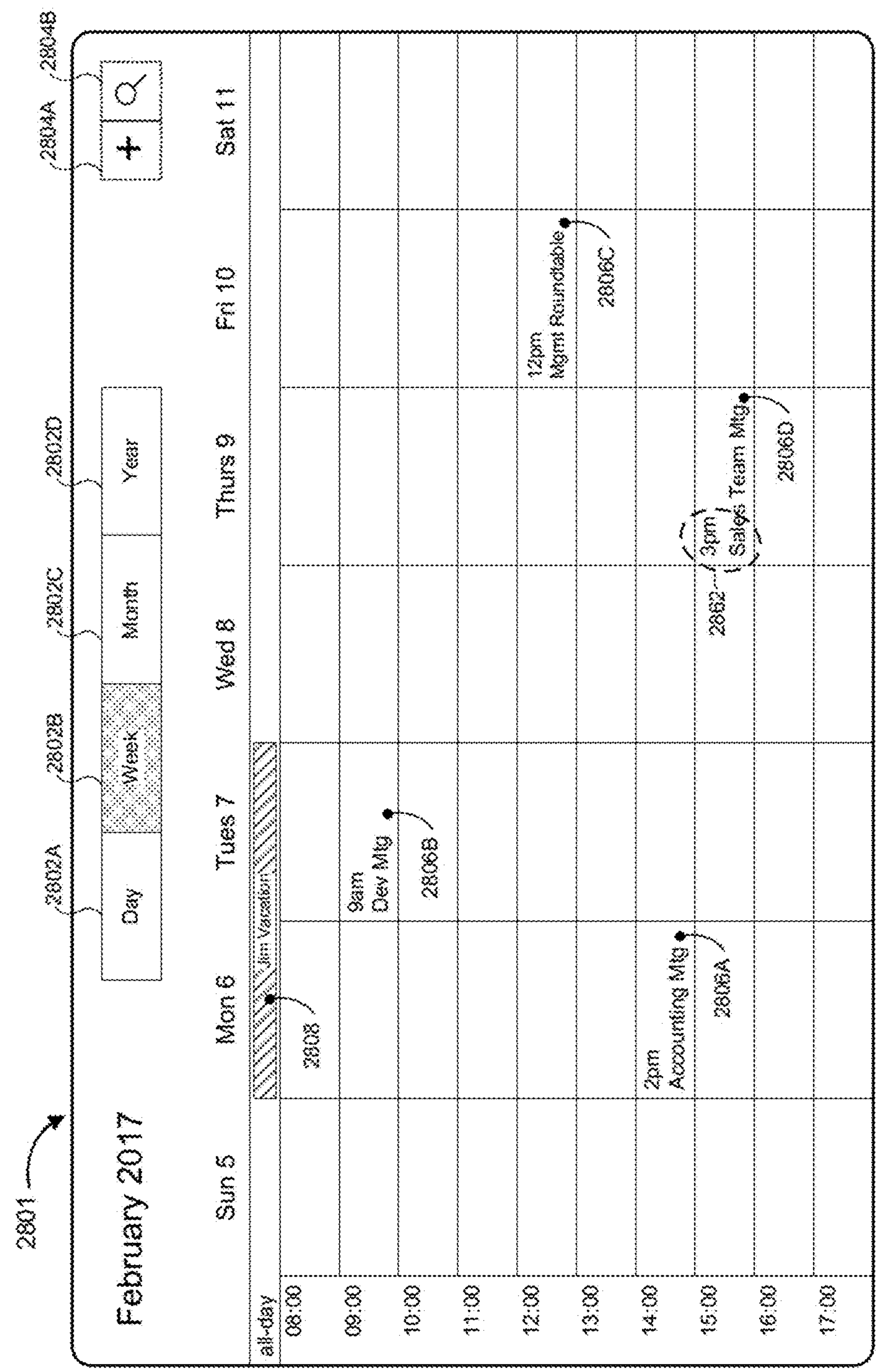

FIG. 28T further illustrates detecting a contact 2860 at a location corresponding to the send affordance 2818B. FIG. 28U illustrates ceasing to display the event creation interface 2812 in response to selection of the send affordance 2818B in FIG. 28T. FIG. 28U also illustrates displaying a fourth calendar event indicator 2806D within the calendar interface 2801 in response to the sequence of event creation operations in FIGS. 28M-28T. As shown in FIG. 28U, the fourth calendar event indicator 2806D correspond to the newly created scheduled from 3-4 pm on Thursday, Feb. 9, 2017 entitled "Sales Team Mtg."

Figure 28V:
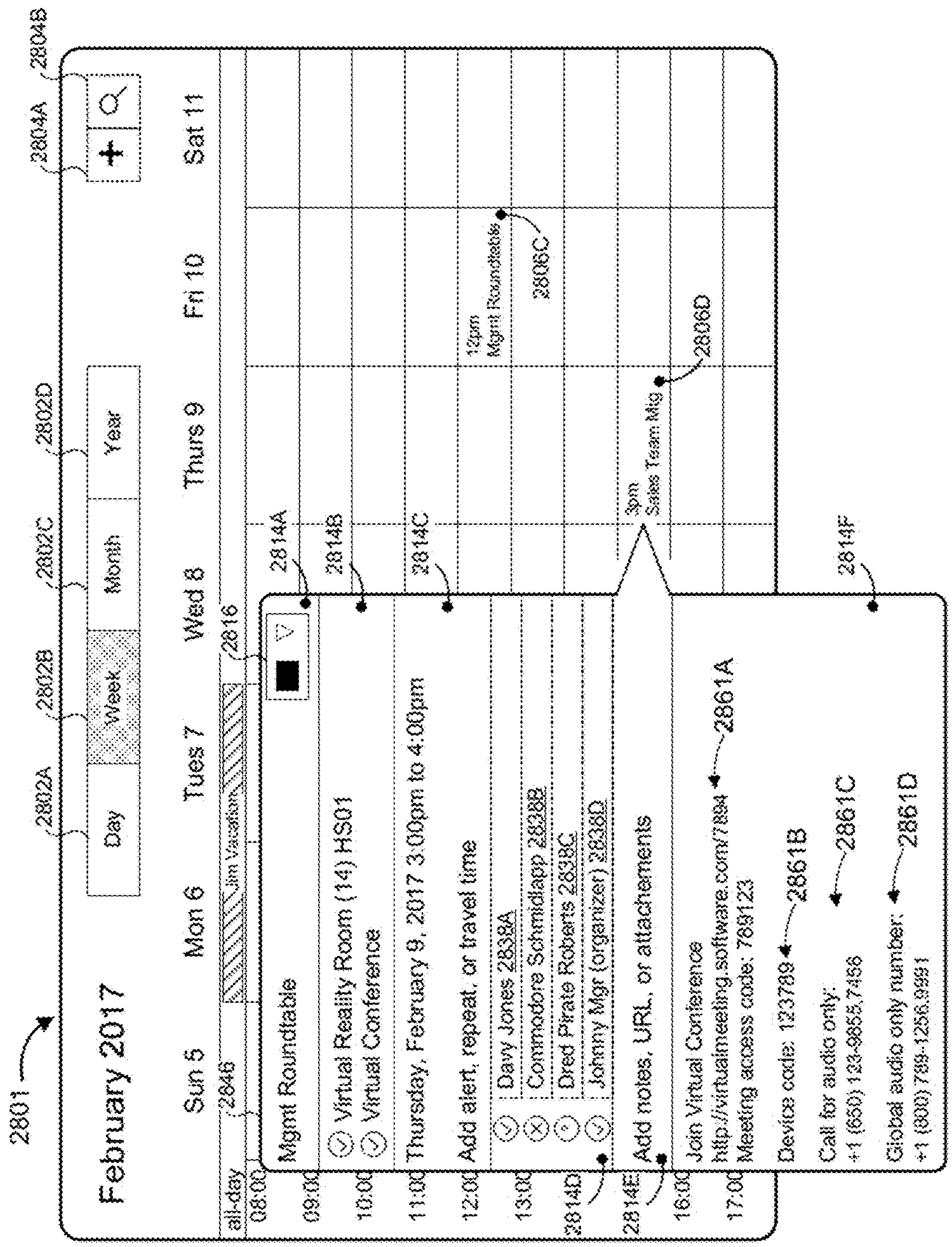

FIGS. 28U-28V show a sequence in which an event details interface is shown for the previously created calendar event with the physical meeting space location and the virtual conference. FIG. 28U further illustrates detecting a contact 2862 at a location corresponding to the fourth calendar event indicator 2806D. FIG. 28V illustrates displaying the event details interface 2846 for the event created in FIGS. 28M-28T in response to selection of the fourth calendar event indicator 2806D in FIG. 28U.

The event details interface 2846 in FIG. 28V is similar to and adapted the event creation interface 2812 in FIG. 28T. As such, event details interface 2846 in FIG. 28V and event creation interface 2812 in FIG. 28T include similar user interfaces and elements labeled with the same reference number in both figures have the same function, with only the differences are described herein for the sake of brevity.

As shown in FIG. 28V, the display portion of the invitees input element 2814D includes a fourth invitee indicator 2838D associated with the organizer of the event created in FIGS. 28B-28I (e.g., Johnny Mgr—the user of the device). As shown in FIG. 28V, the virtual conference details interface element 2814F includes a first sub-region 2861A that includes a URL to the virtual conference and a meeting access code for the virtual conference. As shown in FIG. 28V, the virtual conference details interface element 2814F also includes a second sub-region 2861B that includes a device code to access a device for controlling the physical meeting space and equipment therein (e.g., the "Virtual Reality Room"). As shown in FIG. 28V, the virtual conference details interface element 2814F further includes a third sub-region 2845C that includes a domestic (e.g., US) call-in number for the virtual conference. As shown in FIG. 28V, the virtual conference details interface element 2814F further includes a fourth sub-region 2845D that includes a foreign (e.g., non-US) call-in number for the virtual conference.

Figure 28W:
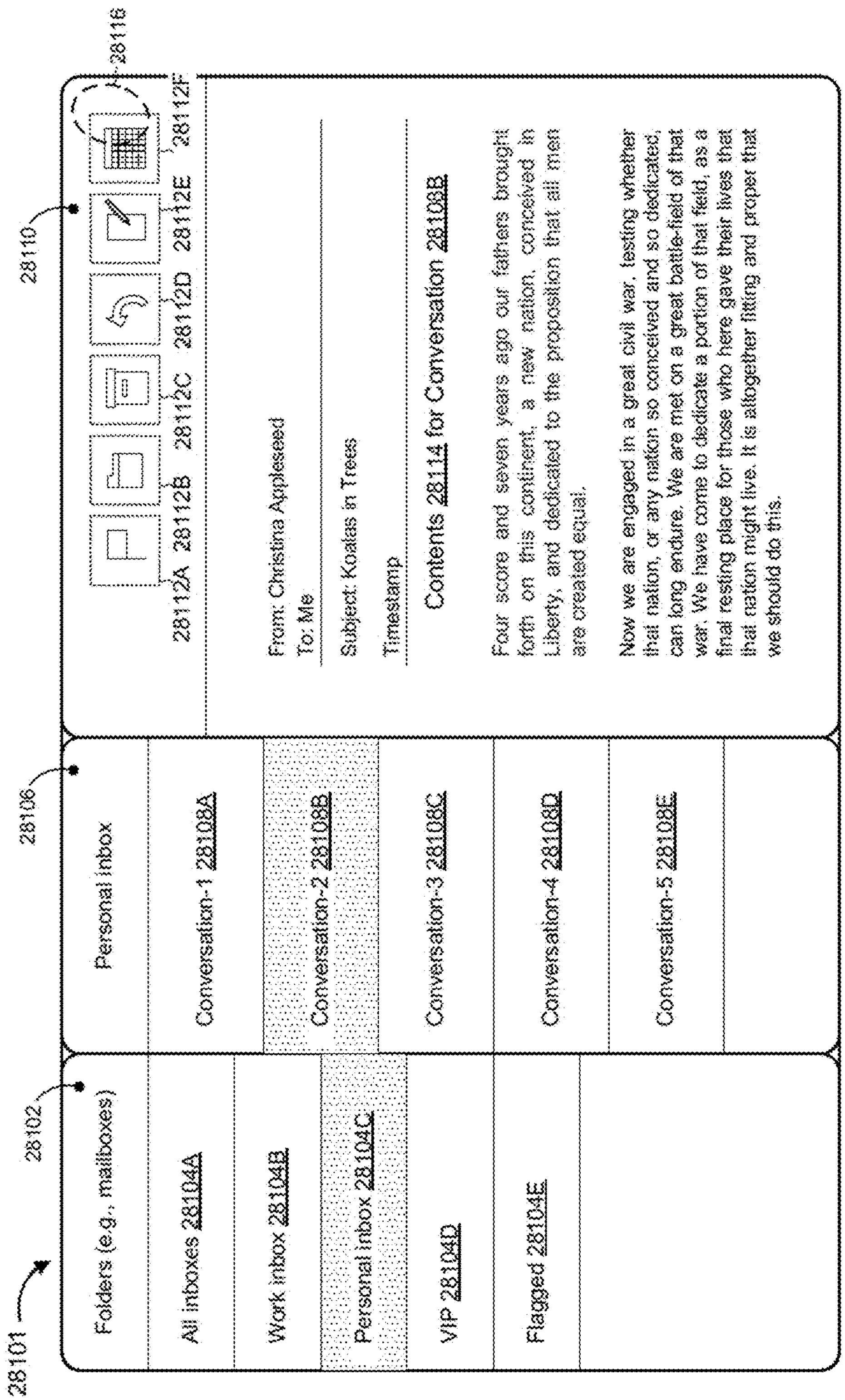

FIG. 28W illustrates displaying a messaging interface 28101 (e.g., associated with a text messaging, instant messaging, or email application). For example, the messaging interface 28101 is displayed by a portable multifunction device 100 such as a phone, wearable computing device, tablet, laptop, or the like. As shown in FIG. 28W, the messaging interface 28101 includes a first region 28102 with a plurality of selectable folders (e.g., mailboxes), including: an "All inboxes" folder 28104A that aggregates the folders; a "Work inbox" folder 28104B; a "Personal inbox" folder 28104C; a "VIP" folder 28104D; and a "Flagged" folder 28104E. As shown in FIG. 28W, the "Personal inbox" folder 28104C is currently selected within the messaging interface 28101.

As shown in FIG. 28W, the messaging interface 28101 also includes a second region 28106 with a plurality of selectable conversations 28108A, 28108B, 28108C, 28108D, and 28108E (sometimes collectively referred to herein as the "conversations 28108") within the "Personal inbox" folder 28104C. In some embodiments, each of the conversations 28108 includes one or more messages. As one example, the conversation 28108A corresponds to a message thread with two or more messages exchanged between a group of two or more users. As another example, the conversation 28108B corresponds to a single message between two users. As shown in FIG. 28W, the conversation 28108B is currently selected within the messaging interface 28101.

As shown in FIG. 28W, the messaging interface 28101 further includes a third region 28110 displaying the conversation 28108B (e.g., a single email between two users). The third region 28110 includes content 28114 for the conversation 28108B and a plurality of affordances 28112A, 28112B, 28112C, 28112D, 28112E, and 28112F (sometimes collectively referred to herein as the "affordances 28112"). In some embodiments, the affordance 28112A is provided to flag one or more messages in the currently selected conversation. In some embodiments, the affordance 28112B is provided to move the currently selected conversation to a different folder. In some embodiments, the affordance 28112C is provided to archive the currently selected conversation. In some embodiments, the affordance 28112D is provided to reply to the most recent message in the currently selected conversation. In some embodiments, the affordance 28112E is provided to compose a new message. In some embodiments, the affordance 28112F is provided to create a calendar event.

Figure 28X:
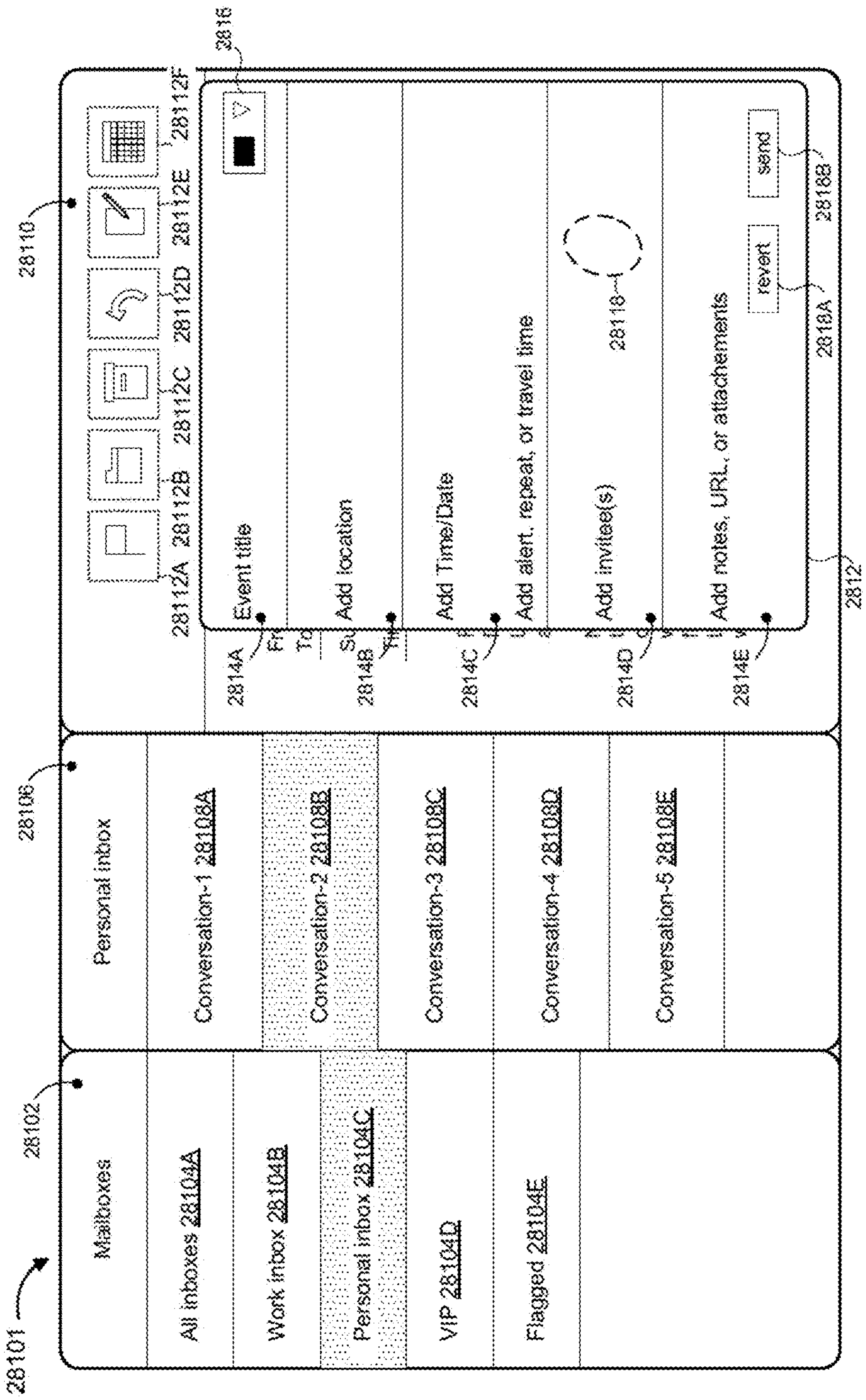

FIGS. 28W-28CC show a sequence in which a calendar event is created with multiple physical meeting space locations and a virtual conference. FIG. 28W also illustrates detecting a contact 28116 at a location corresponding to the affordance 28112F. FIG. 28X illustrates displaying the event creation interface 2812 overlaid on the messaging interface 28101 in response to selection of the affordance 28112F in FIG. 28W.

The event creation interface 2812 in FIG. 28X is similar to and adapted the event creation interface 2812 in FIG. 28B. As such, the event creation interface 2812 in FIG. 28X and the event creation interface 2812 in FIG. 28B include similar user interfaces and elements labeled with the same reference number in both figures have the same function, with only the differences are described herein for the sake of brevity. As shown in FIG. 28X, the display portion of the scheduling input element 2814C is empty as compared to FIG. 28B due to selection of the affordance 28112F instead of a timeslot within the calendar interface 2801.

FIG. 28X also illustrates detecting a contact 28118 at a location corresponding to the invitees input element 2814D. For example, the user of the device selects invitees from a list of contacts. In another example, the user of the device enters the names of the invitees using a software keyboard. In yet another example, in response to selection of the invitees input element 2814D, a directory/contacts interface is displayed that enables the user of the device to search for and select invitees.

Figure 28Y:
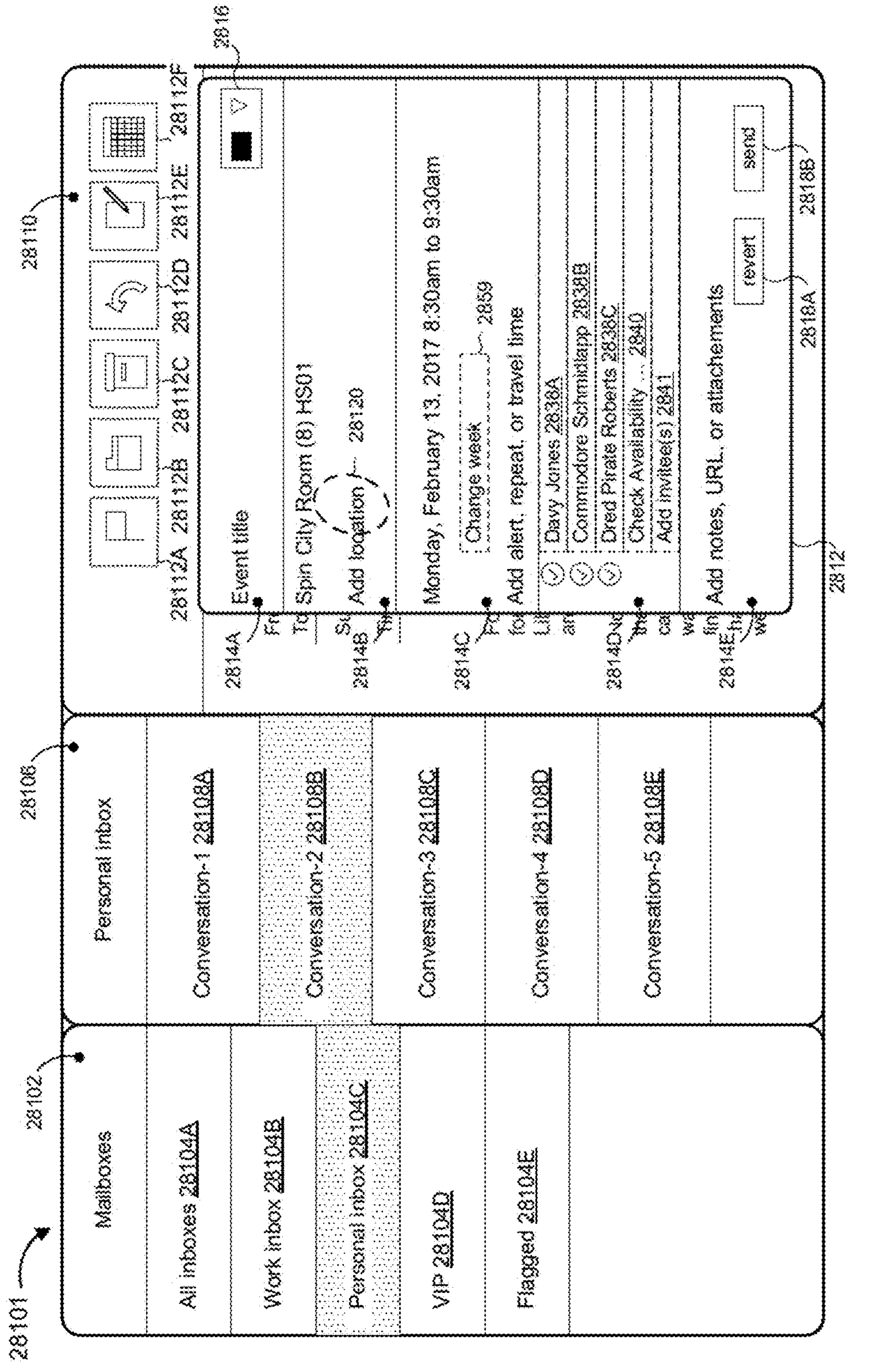

FIG. 28Y illustrates displaying a first invitee indicator 2838A associated with a first invitee (e.g., Davy Jones), a second invitee indicator 2838B associated with a second invitee (e.g., Commodore Schmidlapp), and a third invitee indicator 2838C associated with a third invitee (e.g., Dred Pirate Roberts) (sometimes collectively referred to herein as the "invitee indicators 2838") within the display portion of the invitees input element 2814D in response to selection or entry of the associated invitees. According to some embodiments, selection of one of the invitee indicators 2838 causes a contact card (e.g., phone number, address, location, title, etc.) to be displayed for the person associated with the selected one of the invitee indicators 2838.

FIG. 28Y also illustrates displaying "Spin City Room" within the display portion of the location input element 2814B in response to selecting the invitees. According to some embodiments, the display portion of the location input element 2814B is populated with a location (e.g., a meeting space or conference room) that satisfies a location based on location attributes of the organizer of the new event (e.g., the user of the device) and the selected invitees. For example, a location closest to the organizer and the selected invitees is selected to auto-populate the location input element 2814B for the new event.

FIG. 28Y also illustrates displaying "Monday, Feb. 13, 2017, 8:30 am to 9:30 am" within the display portion of the scheduling input element 2814C in response to selecting the invitees. According to some embodiments, the display portion of the scheduling input element 2814C is populated with a date and time that satisfies a time and date criterion based on schedule attributes of the organizer of the new event (e.g., the user of the device) and the selected invitees. For example, a time and date during the current calendar week that does not conflict with the existing calendars of the organizer and the selected invitees is selected to auto-populate the scheduling input element 2814C for the new event.

Figure 28Z:
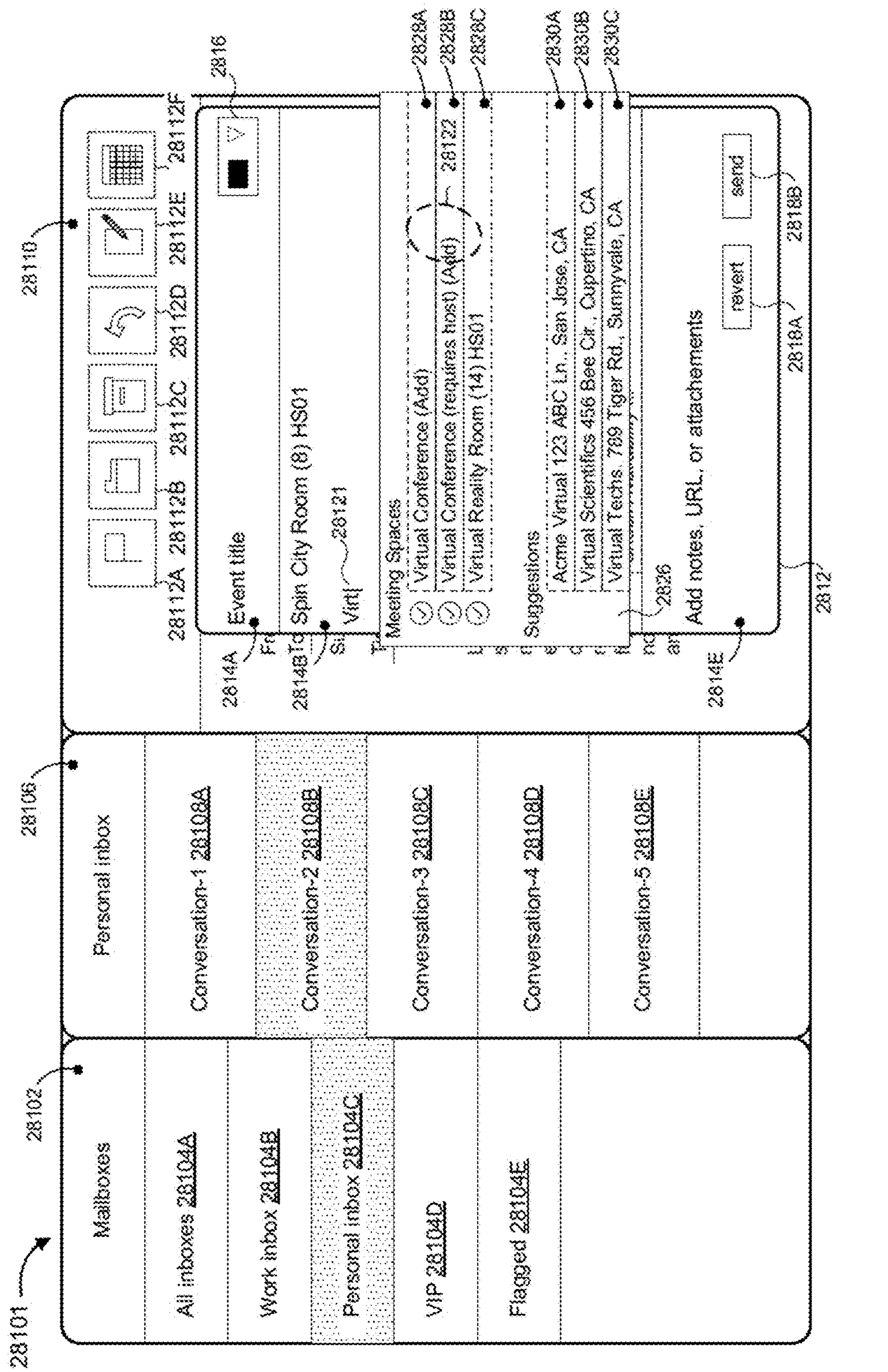
Figure 28A:
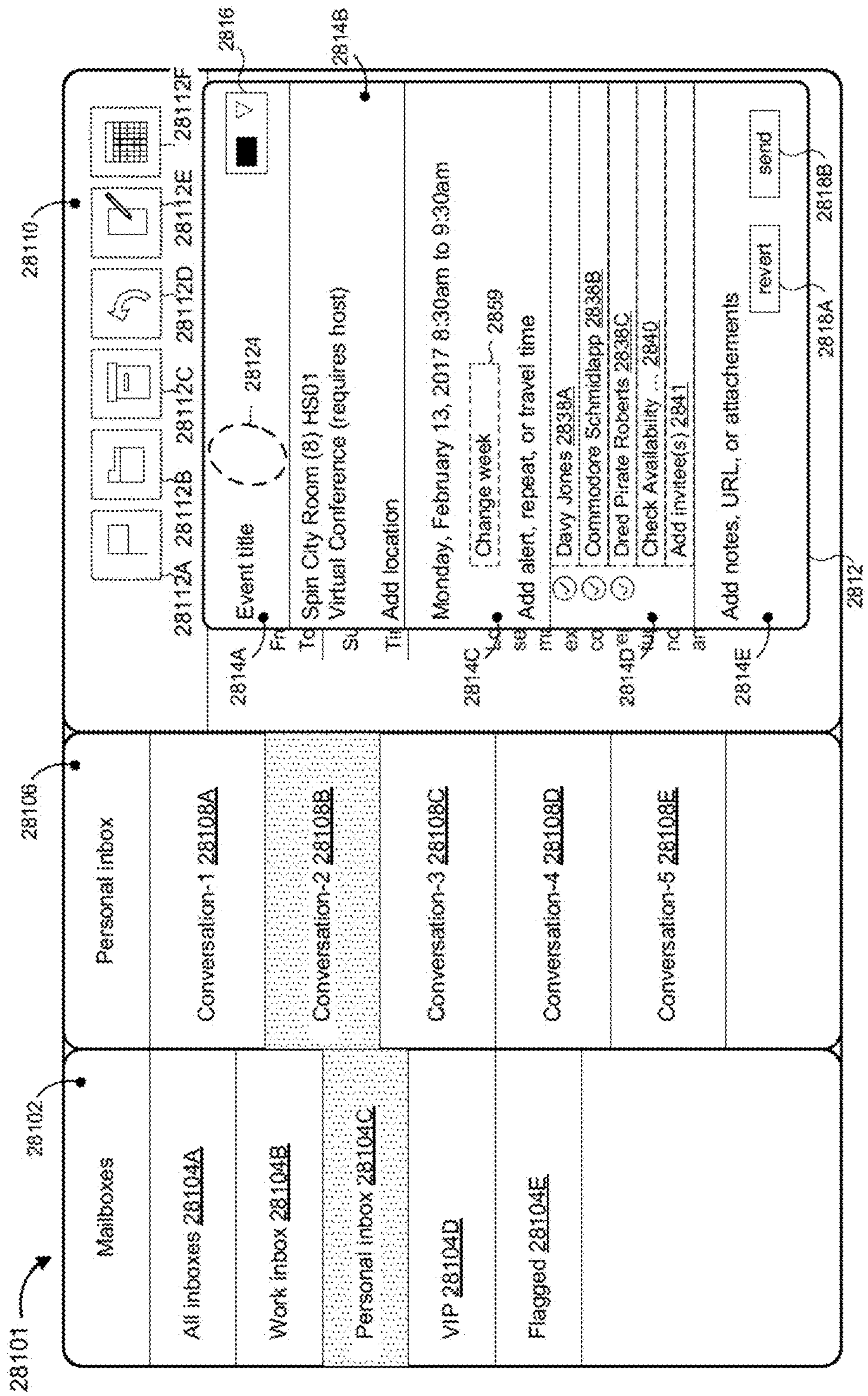
Figure 28B:
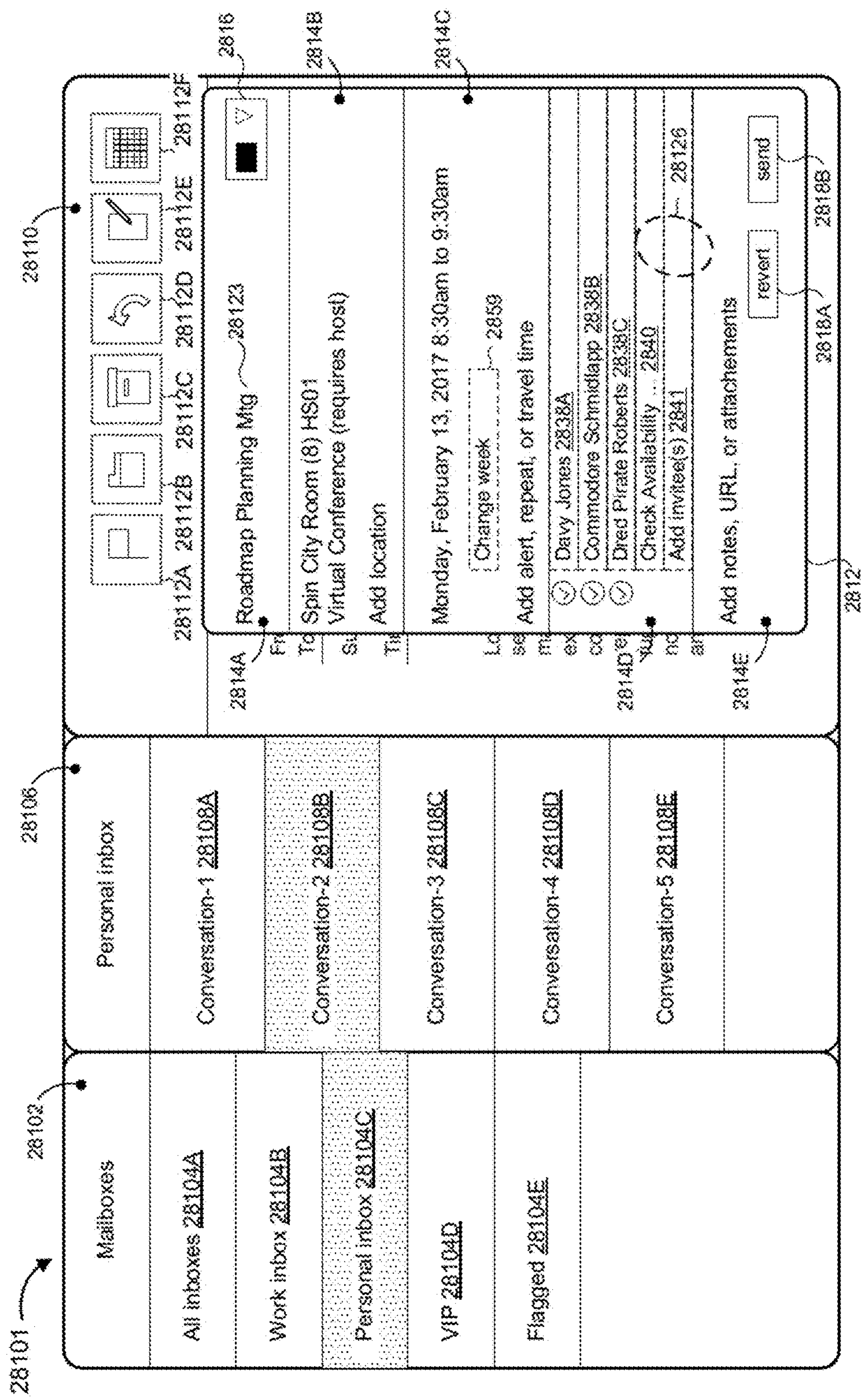
Figure 28C:
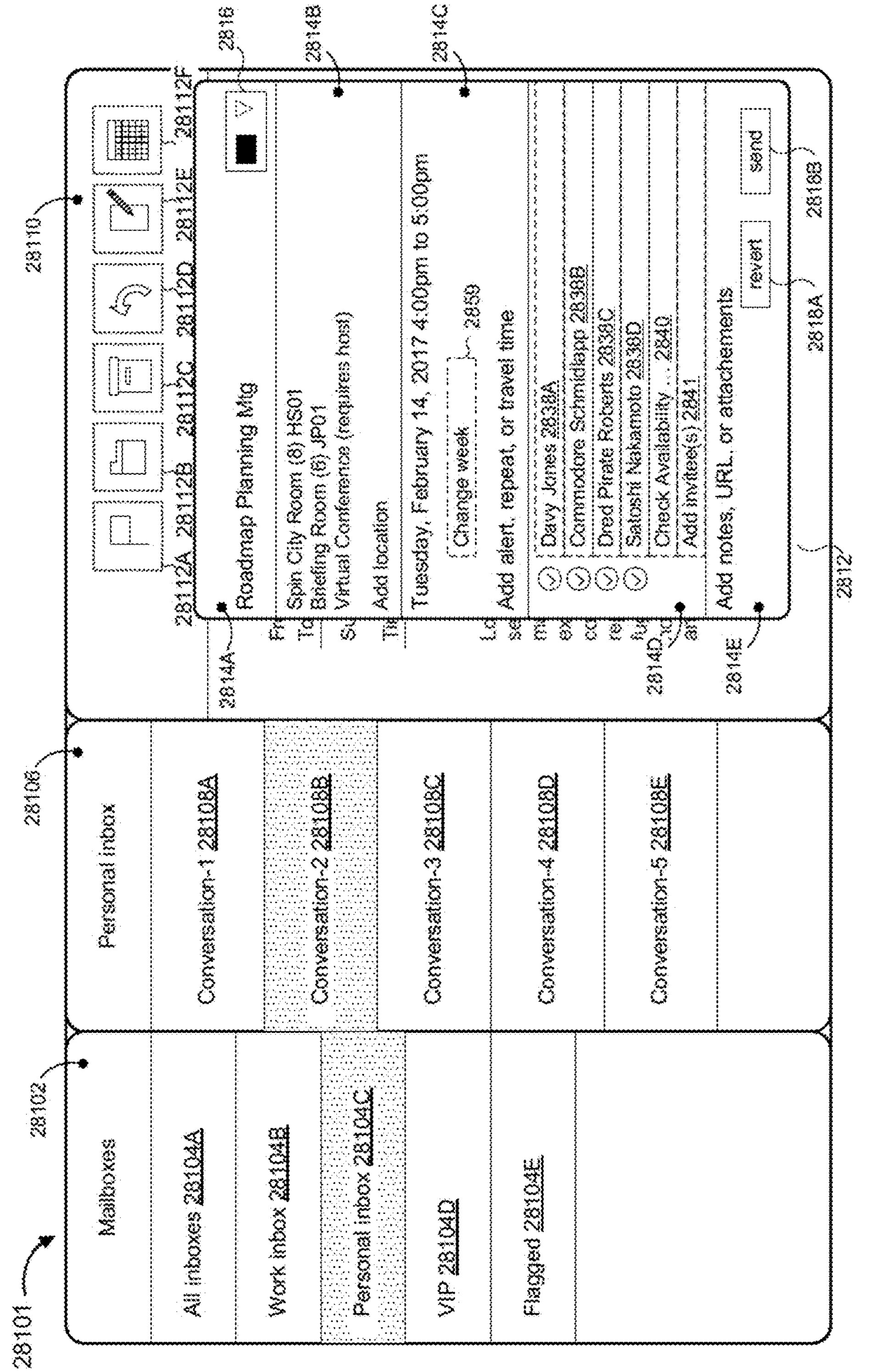

FIG. 28Y further illustrates detecting a contact 28120 at a location corresponding to the location input element 2814B. For example, the user of the device inputs a string of characters (e.g., "Virt") into the location input element 2814B via a software keyboard. FIG. 28Z illustrates displaying a string of characters 28121 (e.g., "Virt") within the location input element 2814B. FIG. 28Y also illustrates displaying the second list 2831 of meeting spaces that match the string of characters 28121 and the third list 2833 of suggested addresses that match the string of characters 28121 proximate to the location input element 2814B.

FIG. 28Z further illustrates detecting a contact 28122 at a location corresponding to the virtual conference room indicator 2828B associated with a host code. FIG. 28AA illustrates displaying "Virtual Conference" in addition to "Spin City Room" within the display portion of the location input element 2814B in response to selection of the virtual conference room indicator 2828B in FIG. 28Z.

FIG. 28AA also illustrates detecting a contact 28124 at a location corresponding to the title input element 2814A. For example, the user of the device inputs a string of characters (e.g., "Roadmap Planning Mtg") into the title input element 2814A via a software keyboard. FIG. 28BB illustrates displaying a string of characters 28123 (e.g., "Roadmap Planning Mtg") within the title input element 2814A. For example, the user of the device completes entry of the string of characters (e.g., "Roadmap Planning Mtg") within the title input element 2814A.

FIG. 28BB also illustrates detecting a contact 28126 at a location corresponding to the add invitee(s) affordance 2841. For example, the user of the device selects an additional invitee from the list of contacts. In another example, the user of the device enters the name of the additional invitee using a software keyboard. In yet another example, in response to selection of the add invitee(s) affordance 2841, a directory/contacts interface is displayed that enables the user of the device to search for and select invitees.

FIG. 28CC illustrates displaying a fourth invitee indicator 2838D associated with a fourth invitee (e.g., Satoshi Nakamoto) within the display portion of the invitees input element 2814D in response to selection or entry of the additional invitee.

FIG. 28CC also illustrates displaying "Briefing Room" within the display portion of the location input element 2814B in response to selecting the additional invitee. According to some embodiments, the location(s) populating the display portion of the location element 2814B dynamically changes as invitees are added or removed from the event. For example, the "Briefing Room," in the JP01 building, is located near the office of the fourth invitee (e.g., Satoshi Nakamoto) who is located in a different state than the other invitees.

FIG. 28CC further illustrates displaying "Tuesday, Feb. 14, 2017, 4:00 pm to 5:00 pm" within the display portion of the scheduling input element 2814C in response to selecting the additional invitee. According to some embodiments, the time and date populating the display portion of the scheduling element 2814C dynamically changes as invitees are added or removed from the event. For example, a time and date during the current calendar week that does not conflict with the existing calendars of the organizer and the selected invitees (e.g., the three invitees selected in FIGS. 28X-28Y and the additional invitee selected in FIGS. 28BB-28CC) is selected for the event.

FIGS. 29A-29L illustrate example user interfaces for managing meeting attendance and screen sharing in accordance with some embodiments. The user interfaces in these figures are used to illustrate the processes described below, including the processes in FIGS. 32A-32C and 33A-33C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 29A:
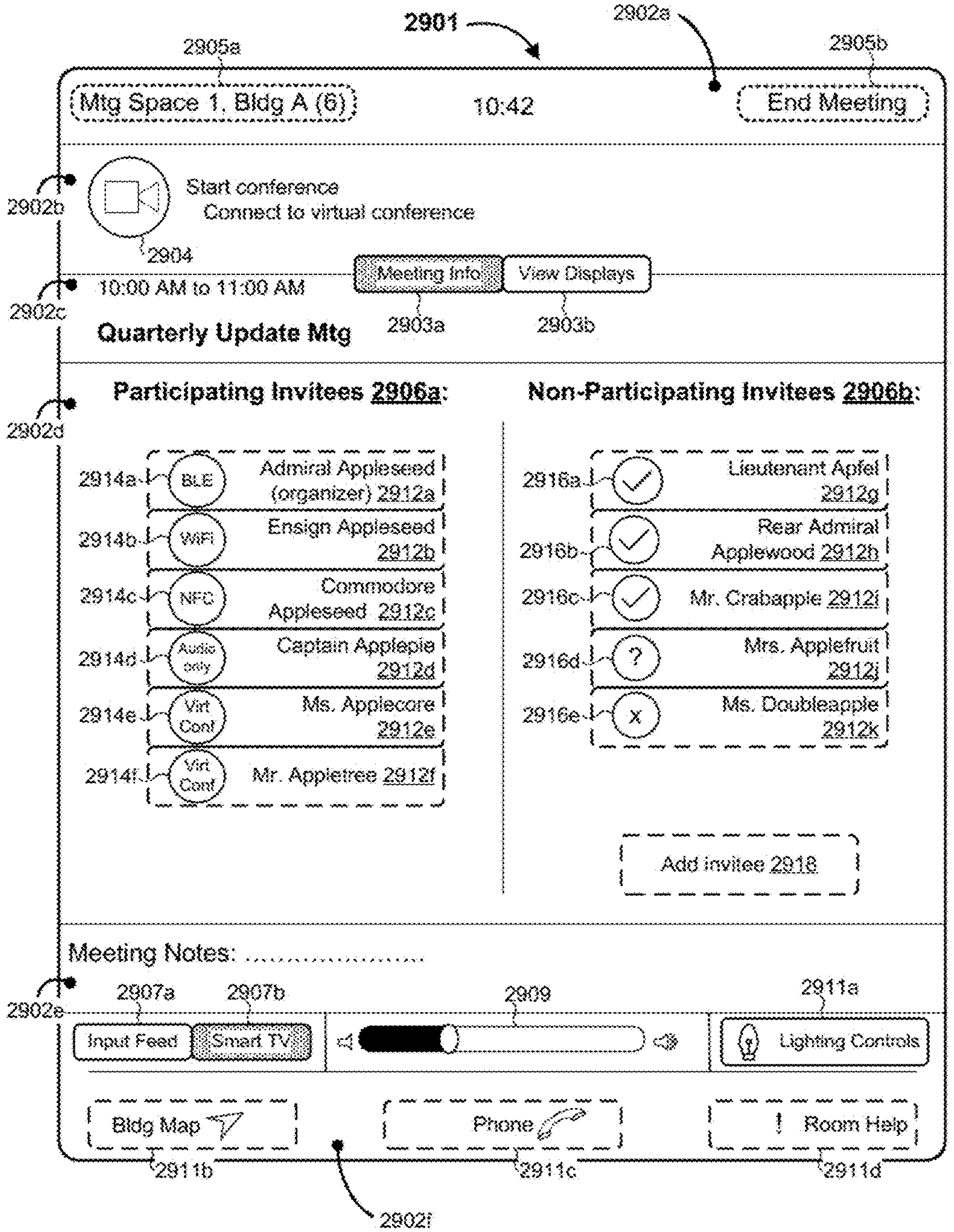
FIGS. 29A-29L illustrate example user interfaces for managing meeting attendance and screen sharing in accordance with some embodiments.

FIG. 29A shows a device displaying a meeting manifest interface 2901 (e.g., associated with an ongoing meeting). As one example, the device displaying the meeting manifest interface 2901 corresponds to a portable multifunction device 100 such as a phone, wearable computing device, tablet, laptop, or the like. In another example, the device displaying the meeting manifest interface 2901 is a portable multifunction device 100 corresponding to the first device 502-A-1 in FIGS. 5A-5B (e.g., the personal device associated with a user such as a phone, wearable computing device, tablet, laptop, or the like). In yet another example, the device displaying the meeting manifest interface 2901 is a portable multifunction device 100 corresponding to the second device 504-A-1 in FIGS. 5A-5B (e.g., the device associated with the meeting space such as being fixed to a wall inside of the meeting space, fixed to furniture or equipment within the meeting space, or portably located within the meeting space).

In some embodiments, the first device is located outside of the meeting space (e.g., the first device 502-A-1 in FIGS. 5A-5B). For example, the first device is associated with the meeting space such as being fixed to a wall outside of the meeting space. In some embodiments, the first device is associable with the meeting space. For example, the first device is a personal device associated with a user such as a phone, tablet, laptop, or the like. In this example, when the user walks into the meeting space with the first device, the location of the device is associated with the meeting space and meeting space functionality for the particular meeting space is enabled on the first device. In some embodiments, a second device inside of the meeting space (e.g., the second device 504-A-1 in FIGS. 5A-5B) is synchronized with the first device. For example, the second device is associated with the meeting space such as being fixed to a wall inside of the meeting space, fixed to furniture or equipment within the meeting space, or portably located within the meeting space.

As shown in FIG. 29A, the meeting manifest interface 2901 (e.g., similar to the meeting manifest interface 750 in FIG. 7D and the meeting manifest interface 1858 in FIG. 18D) shows details associated with an ongoing meeting entitled "Quarterly Update Mtg." As shown in FIG. 29A, the meeting manifest interface 2901 includes: a chrome region 2902*a*, a first content region 2902*b*, a second content region 2902*c*, a third content region 2902*d*, a fourth content region 2902*e*, and a control region 2902*f*. The meeting manifest interface 2901 includes: a meeting information view affordance 2903*a*, which, when activated (e.g., selected with a contact), causes the meeting manifest interface 2901 to be displayed in a meeting info mode that shows details associated with the ongoing meeting; and view displays affordance 2903*b*, which, when activated (e.g., selected with a contact), causes the meeting manifest interface 2901 to be displayed in a display mode that shows current content being shared by a meeting participant (e.g., similar to the media management interface 1861 in FIG. 18E). For example, in FIG. 29A, the meeting info view affordance 2903*a* is currently selected, and the meeting manifest interface 2901 is shown in the meeting information mode.

The chrome region 2902*a* includes: the current time (e.g., 10:42); a meeting space affordance 2905*a* provided to indicate the meeting space associated with the ongoing meeting (e.g., meeting space 1 in building A with an occupancy limit of 6 persons); and an end meeting affordance 2905*b* provided to terminate the ongoing meeting (e.g., in response to selection with a contact). For example, the meeting space affordance 2905*a* is similar to the meeting space affordance 606 in FIG. 6A and the meeting space affordance 1506 in FIG. 15A. For example, the end meeting affordance 2905*b* is similar to the end meeting affordance 754 in FIG. 7D. The first content region 2902*b* includes a start conference affordance 2904, which, when activated (e.g., selected with a contact), causes the device (or the physical meeting space) to connect to a virtual conference (e.g., as shown in FIGS. 29F-29G). The second content region 2902*c* includes the length of the ongoing meeting (e.g., 10:00 am-11:00 am) and the title of the ongoing meeting (e.g., "Quarterly Update Mtg").

The third content region 2902*d* includes a first sub-region 2906*a* (e.g., the participating invitees column) with a first plurality of invitee representations 2912*a*, 2912*b*, 2912*c*, 2912*d*, 2912*e*, and 2912*f* (e.g., invitee labels) associated with invitees that are currently participating in the ongoing conference (e.g., connected via a local or remote interface) and a second sub-region 2906*b* (e.g., the non-participating invitees column) with a second plurality of invitee representations 2912*g*, 2912*h*, 2912*i*, 2912*j*, and 2912*k* (e.g., invitee labels) associated with invitees that are currently not participating in the ongoing conference (e.g., not connected via the local or remote interface) (sometimes collectively referred to herein as the "invitee representations 2912"). According to some embodiments, selection of one of the invitee representations 2912 causes a contact card (e.g., phone number, address, location, title, etc.) to be displayed for the person associated with the selected one of the invitee representations 2912.

As shown in FIG. 29A, each of the first plurality of invitee representations 2912*a*, 2912*b*, 2912*c*, 2912*d*, 2912*e*, and 2912*f* is associated with a connection indicator 2914*a*, 2914*b*, 2914*c*, 2914*d*, 2914*e*, and 2914*f* (e.g., an icon with text and/or an image) indicating the connection type for the associated participating invitee. As one example, the connection indicator 2914*a* (e.g., BLE icon) indicates that a local BLUETOOTH (e.g., BLE) connection between a device associated with Admiral Appleseed (e.g., a personal phone, laptop, tablet, etc.) and the device (or a controller device associated with physical meeting space) is detected. As another example, the connection indicator 2914*e* (e.g., a "Virt Conf" icon) shows that a remote connection between a device associated with Ms. Applecore and a remote virtual conference service application is detected (e.g., a server that hosts the virtual conference).

As shown in FIG. 29A, each of the second plurality of invitee representations 2912*g*, 2912*h*, 2912*i*, 2912*j*, and 2912*k* is associated with an invitation response indicator 2916*a*, 2916*b*, 2916*c*, 2916*d*, and 2916*e* (e.g., an icon with text and/or an image) indicating the response status of the associated non-participating invitee to the meeting invitation. As one example, the invitation response indicator 2916*a* (e.g., a check-mark icon) shows that Lieutenant Apfel responded to the meeting invitation by confirming that he would attend the meeting. As another example, the invitation response indicator 2916*d* (e.g., a question-mark icon) shows that Mrs. Applefruit responded to the meeting invitation by confirming that she might attend the meeting. As yet another example, the invitation response indicator 2916*e* (e.g., an ex icon) shows that Ms. Doubleapple responded to the meeting invitation by confirming that she would not be attending the meeting.

The third content region 2902*d* also includes an add invitee affordance 2918 provided to send a meeting invite to an additional invitee. For example, the user of the device selects an additional invitee from a list of contacts. In another example, the user of the device enters the name of the additional invitee using a software keyboard. In yet another example, in response to selection of the add invitee affordance 2918, the device displays a directory/contacts interface that enables the user of the device to search for and select the additional invitee.

The fourth content region 2902*e* includes meeting notes, attachments, links, and/or the like associated with the ongoing meeting. The control region 2902*f* includes a plurality of affordances for controlling equipment associated with the physical meeting space and for performing other operations. As shown in FIG. 29A, the control region 2902*f* includes: an input feed affordance 2907*a* provided to display an external media input feed (e.g., an HDMI input feed) via the displays within the physical meeting space; and a smart TV affordance 2907*b* provided to share a media input feed (e.g., local screen sharing over WiFi) via the displays within the physical meeting space.

As shown in FIG. 29A, the control region 2902*f* also includes a volume bar 2909 provided to adjust the output volume of the speakers within the physical meeting space. As shown in FIG. 29A, the control region 2902*f* further includes: a lighting controls affordance 2911*a* provided to display a lighting controls interface for adjusting one or more illumination devices within the physical meeting space (e.g., as shown in FIGS. 29H-29I); a building map affordance 2911*b* provided to display a floorplan or map associated with the building in which the physical meeting space is located; a phone affordance 2911*c* provided to display a dialing interface for placing a phone call; and a room help affordance 2911*d* provided to display a room problems interface for reporting a problem with the physical meeting space or requesting a service associated with the physical meeting space.

For example, selection of the building map affordance 2911*b* causes an interface similar to the find-as-space interface 6105 in FIG. 6T or the find-as-space interface 7165 in FIG. 7Y to be displayed. For example, selection of the phone affordance 2911*c* causes the dial-pad within the conference instantiation interface 1832 in FIG. 18B to be displayed. For example, selection of the room help affordance 2911*d* causes an interface similar to the reporting interface 655 in FIG. 6K to be displayed.

Figure 29B:
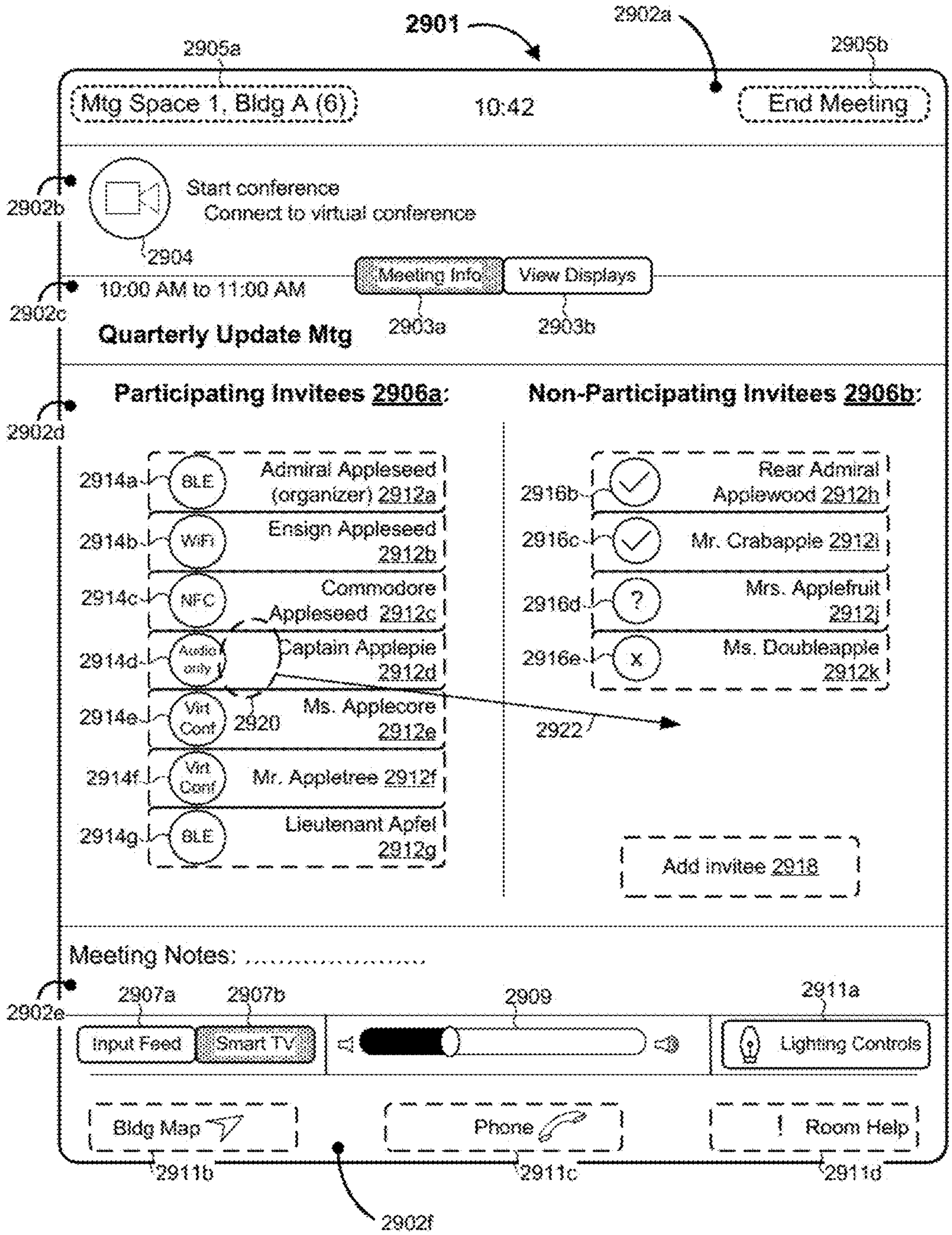

FIGS. 29A-29B show a sequence in which a connection with a non-participating invitee is detected. For example, a local BLUETOOTH (e.g., BLE) connection between a device associated with Lieutenant Apfel (e.g., a personal phone, laptop, tablet, etc.) and the device (or a controller device associated with physical meeting space) is detected. FIG. 29B illustrates ceasing to display the invitee representation 2912*g* associated with Lieutenant Apfel within the second sub-region 2906*b* and displaying the invitee representation 2912*g* associated with Lieutenant Apfel within the first sub-region 2906*a* in response to detecting the local connection associated with Lieutenant Apfel. FIG. 29B also illustrates displaying the connection indicator 2914*g* proximate to the invitee representation 2912*g* associated with Lieutenant Apfel indicating that a local BLUETOOTH (e.g., BLE) connection between a device associated with Lieutenant Apfel (e.g., a personal phone, laptop, tablet, etc.) and the device (or a controller device associated with the physical meeting space) is detected.

Figure 29C:
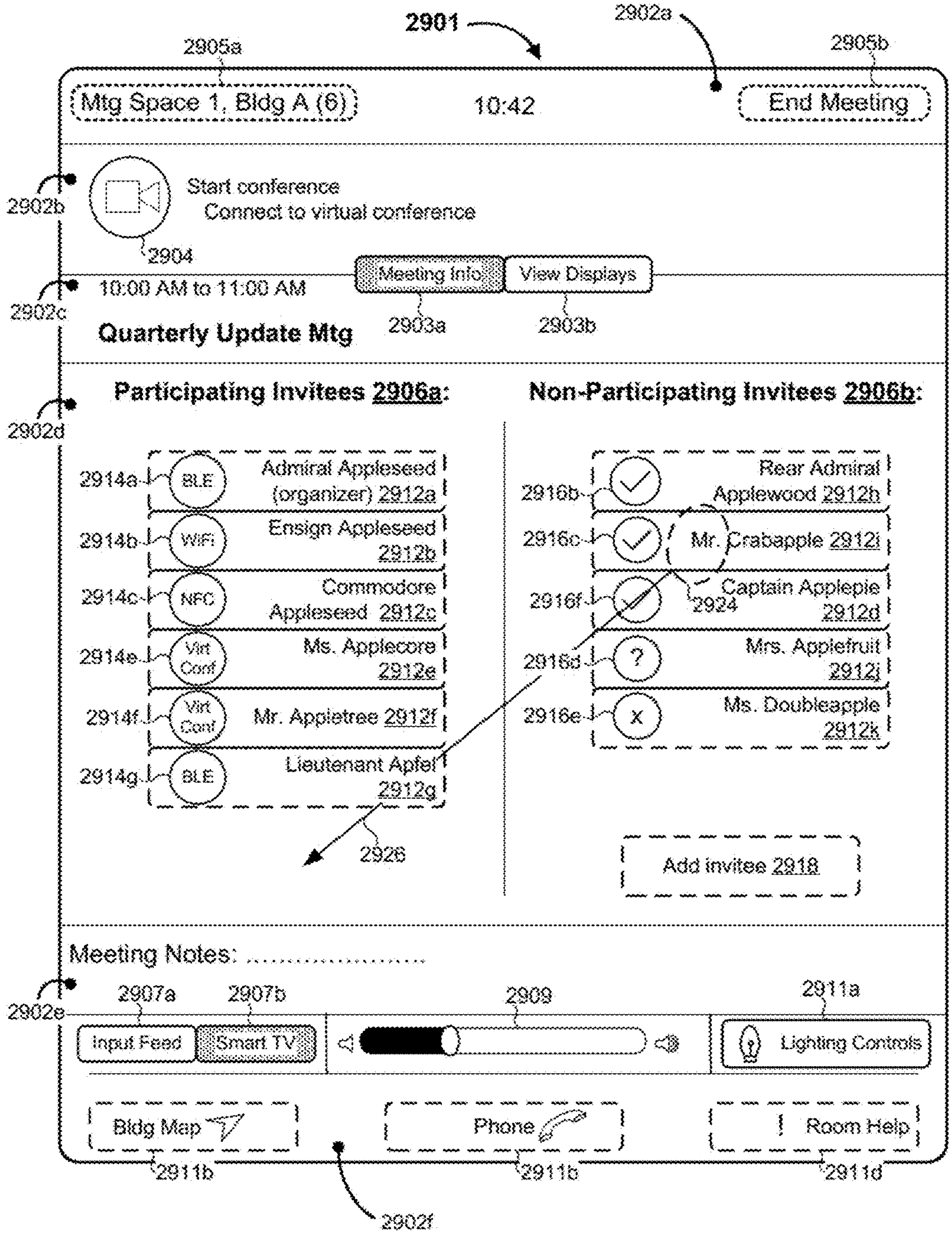

FIGS. 29B-29C show a sequence in which a first invitee representation is dragged from the first sub-region 2906*a* of the meeting manifest interface 2901 associated with participating invitees and dropped into the second sub-region 2906*b* of the meeting manifest interface 2901 associated with non-participating invitees. FIG. 29B further illustrates detecting a contact 2920 associated with a motion vector 2922 that drags the invitee representation 2912*d* associated with Captain Applepie from the first sub-region 2906*a* and drops the invitee representation 2912*d* associated with Captain Applepie into the second sub-region 2906*b*. FIG. 29C illustrates ceasing to display the invitee representation 2912*d* associated with Captain Applepie within the first sub-region 2906*a* and displaying the invitee representation 2912*d* associated with Captain Applepie within the second sub-region 2906*b* in response to detecting the drag-and-drop gesture in FIG. 28B. FIG. 29C also illustrates displaying the invitation response indicator 2916*f* proximate to the invitee representation 2912*d* associated with Captain Applepie indicating that Captain Applepie responded to the meeting invitation by confirming that she would attend the meeting in response to detecting the drag-and-drop gesture in FIG. 28B.

Figure 29D:
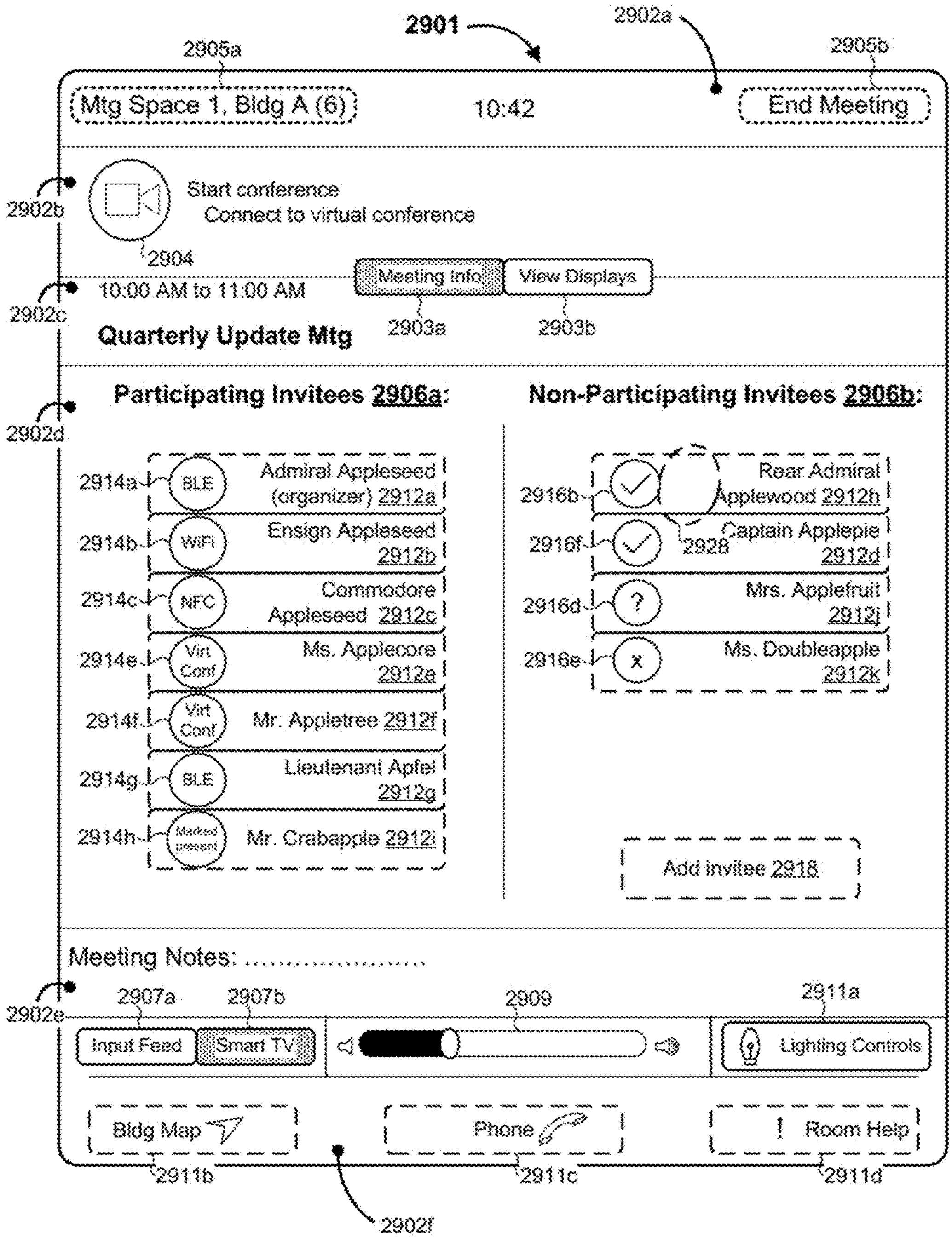

FIGS. 29C-29D show a sequence in which a second invitee representation is dragged from the second sub-region 2906*b* of the meeting manifest interface 2901 associated with non-participating invitees and dropped into the first sub-region 2906*a* of the meeting manifest interface 2901 associated with participating invitees. FIG. 29C further illustrates detecting a contact 2924 associated with a motion vector 2926 that drags the invitee representation 2912*i* associated with Mr. Crabapple from the second sub-region 2906*b* and drops the invitee representation 2912*i* associated with Mr. Crabapple into the first sub-region 2906*a*. FIG. 29D illustrates ceasing to display the invitee representation 2912*i* associated with Mr. Crabapple within the second sub-region 2906*b* and displaying the invitee representation 2912*i* associated with Mr. Crabapple within the first sub-region 2906*a* in response to detecting the drag-and-drop gesture in FIG. 28C. FIG. 29D also illustrates displaying the connection indicator 2914*h* proximate to the invitee representation 2912*i* associated with Mr. Crabapple indicating that Mr. Crabapple was manually marked as present in response to detecting the drag-and-drop gesture in FIG. 28C.

Figure 29E:
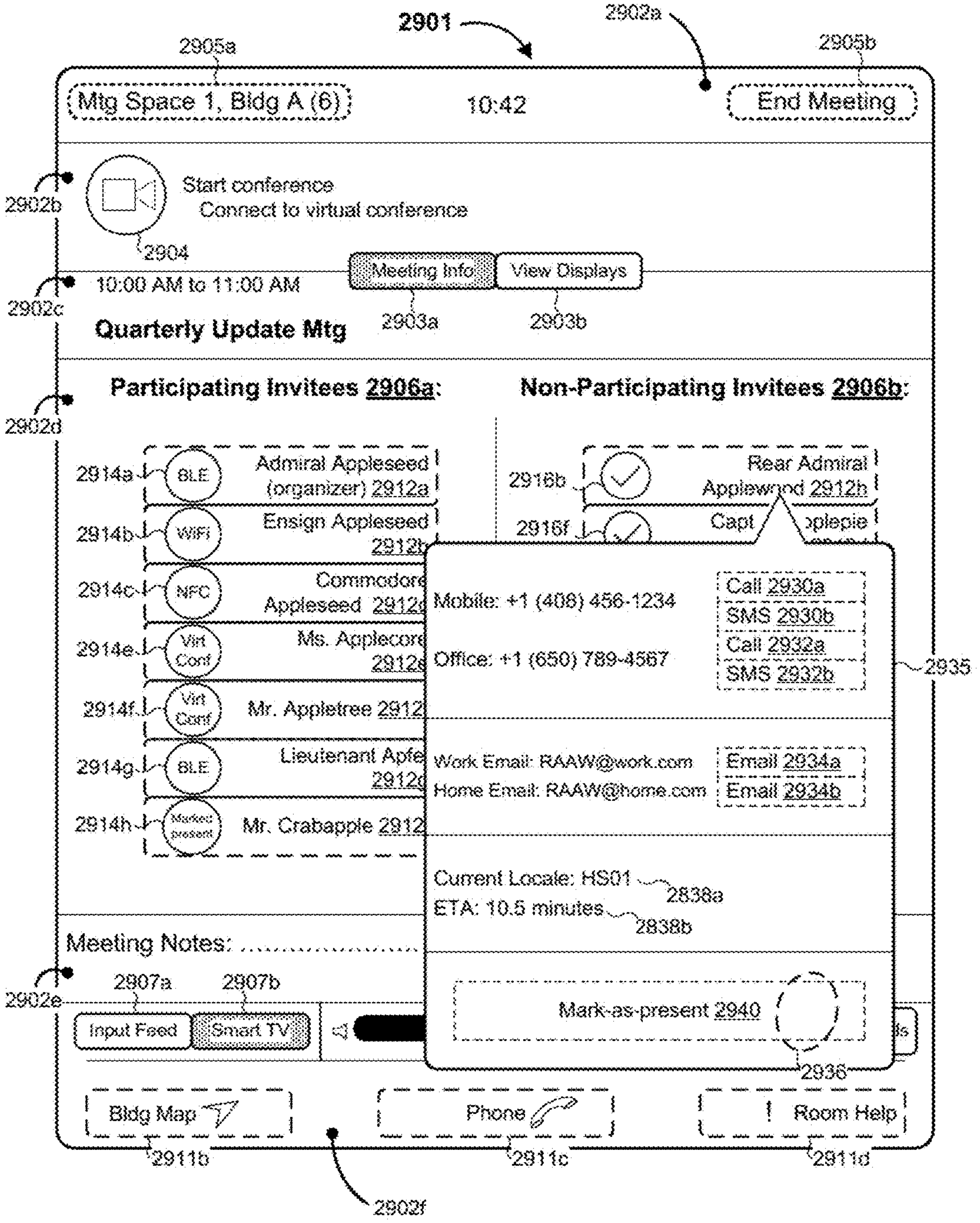
Figure 29F:
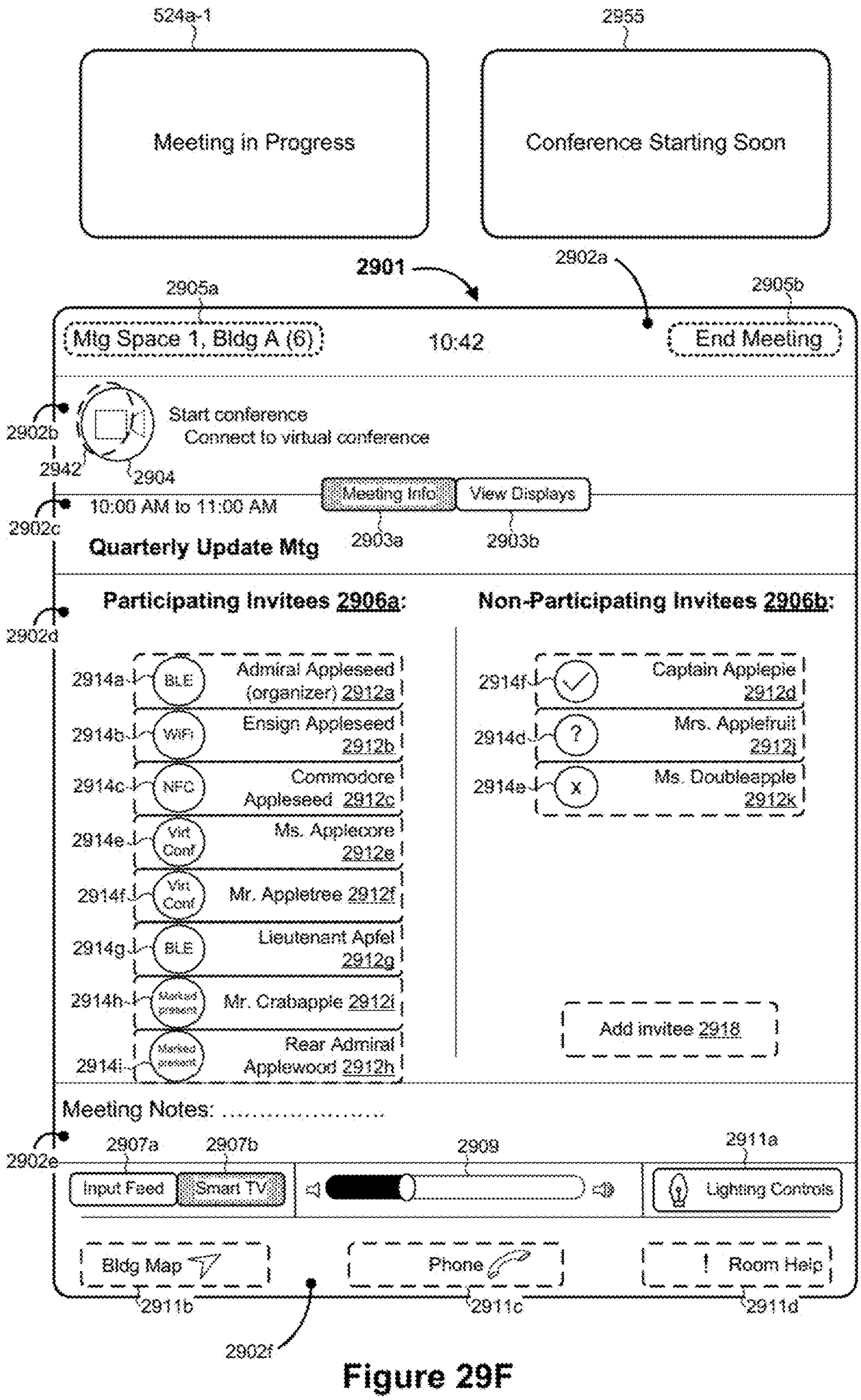
Figure 29G:
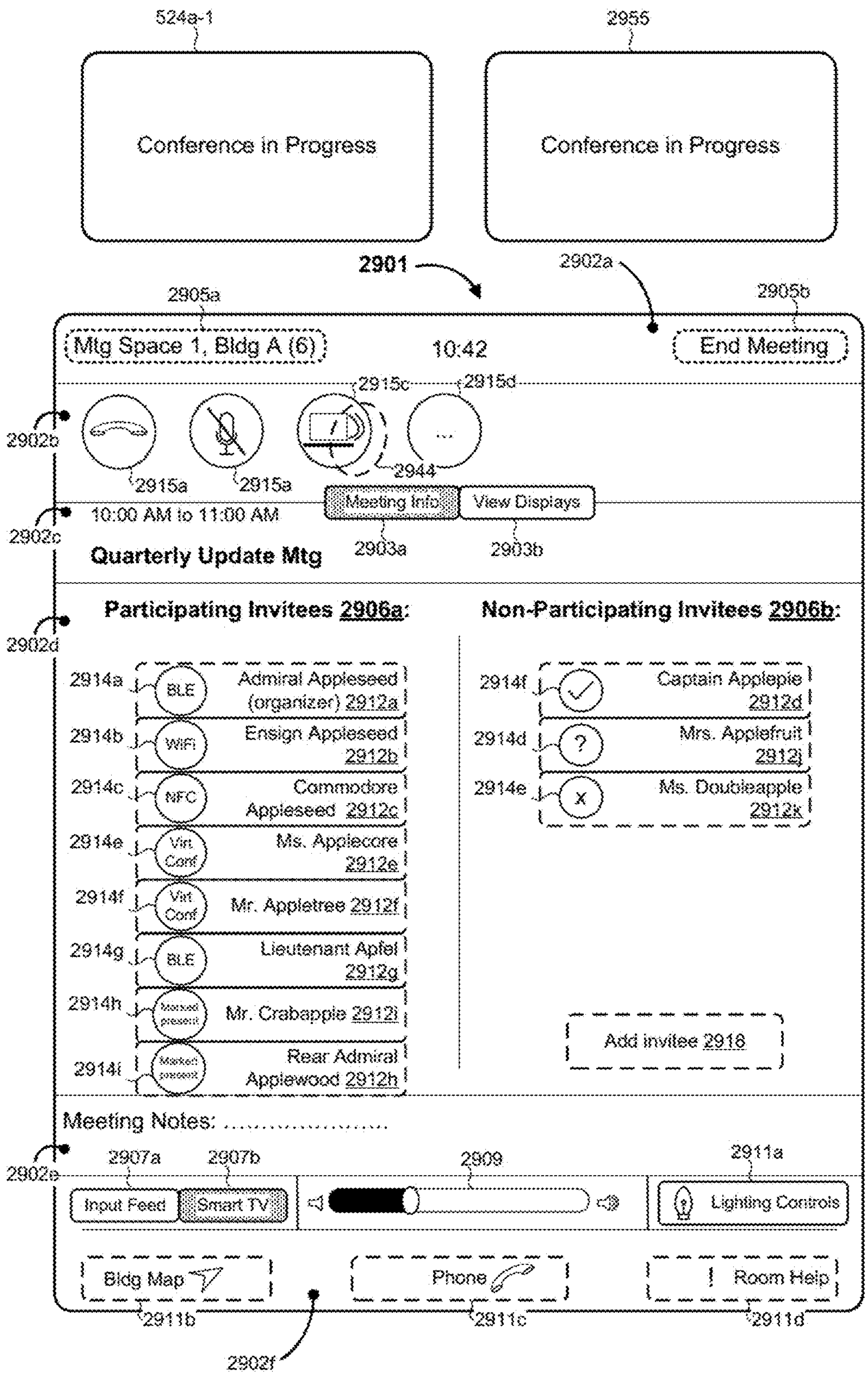
Figure 29H:
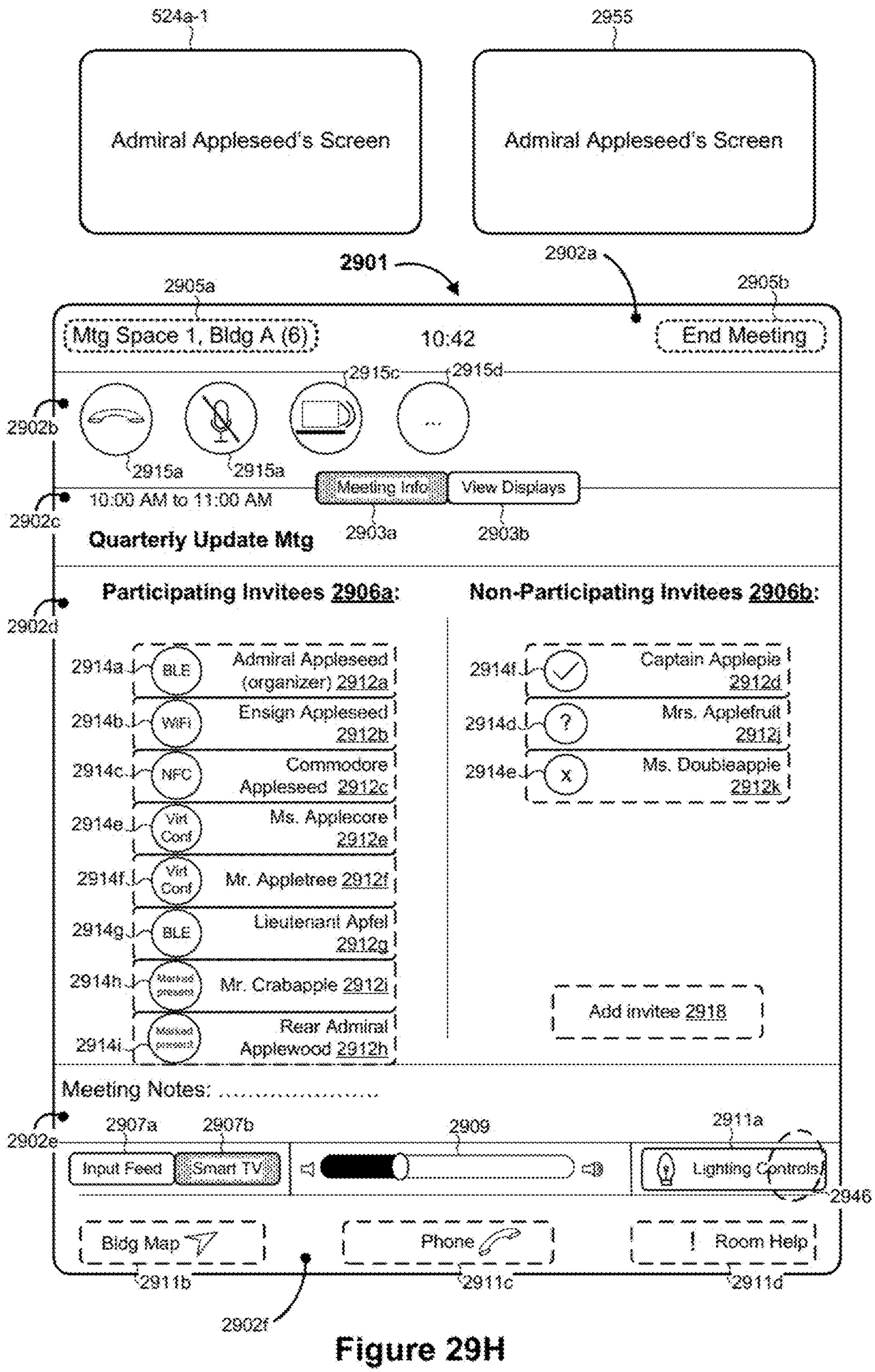
Figure 29I:
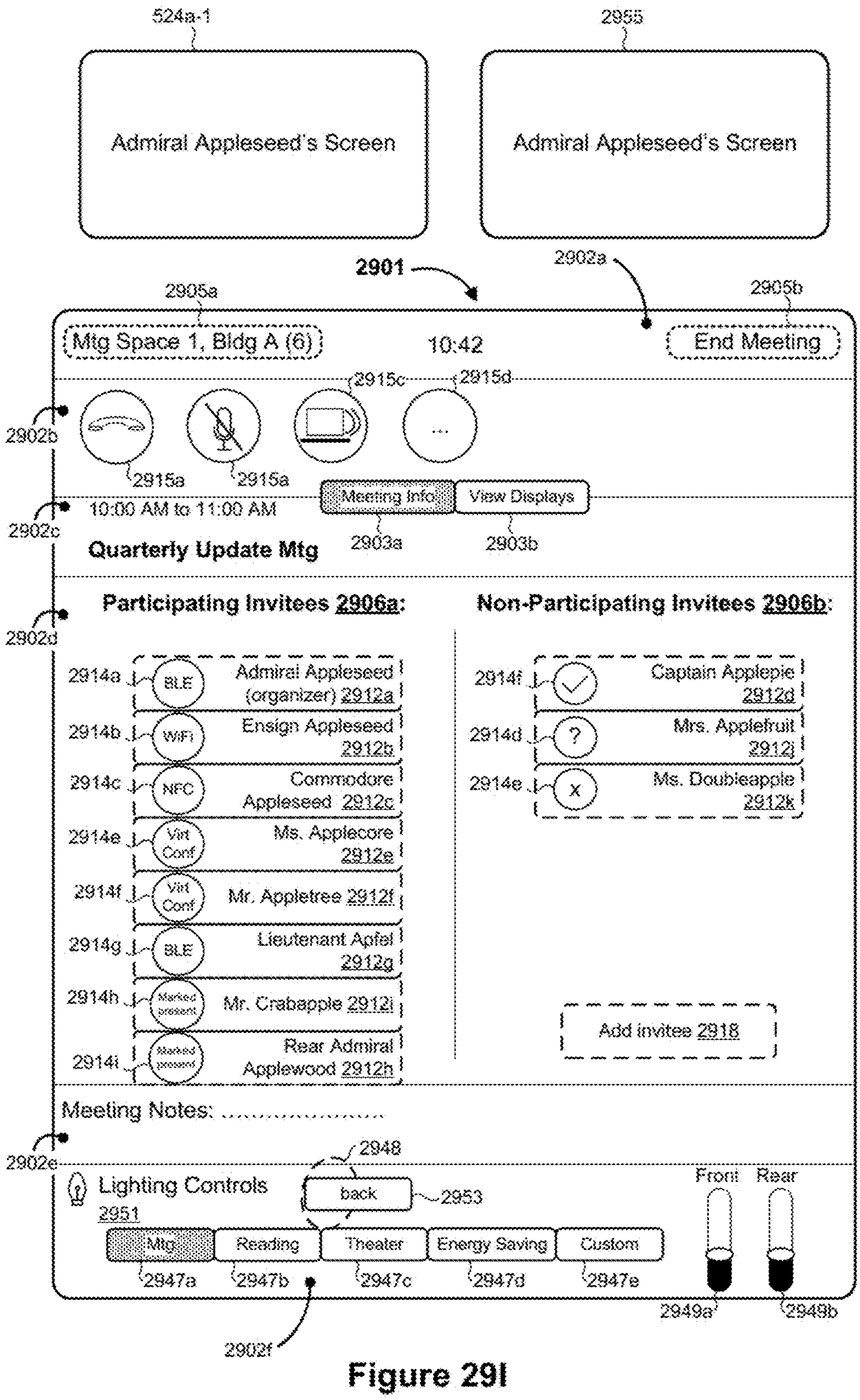

FIGS. 29D-29F show a sequence in which a respective invitee is manually marked as present. FIG. 29D further illustrates detecting a contact 2928 at a location corresponds to the invitee representation 2912*h* associated with Rear Admiral Applewood. FIG. 29E illustrates displaying a reminder interface 2935 (e.g., a pane, window, panel, or the like) overlaid on the meeting manifest interface 2901 in response to selection of the invitee representation 2912*h* in FIG. 29D. As shown in FIG. 29E, the reminder interface 2935 includes: a first call affordance 2930*a* provided to initiate a phone-call to the mobile phone number associated with Rear Admiral Applewood; and a first SMS affordance 2930*b* provided to compose a text message to the mobile phone number associated with Rear Admiral Applewood. As shown in FIG. 29E, the reminder interface 2935 also includes: a second call affordance 2932*a* provided to initiate a phone-call to the work phone number associated with Rear Admiral Applewood; and a second SMS affordance 2932*b* provided to compose a text message to the work phone number associated with Rear Admiral Applewood.

As shown in FIG. 29E, the reminder interface 2935 further includes: a first email affordance 2934*a* provided to compose an email to the work email associated with Rear Admiral Applewood; and a second email affordance 2934*b* provided to compose an email to the home email associated with Rear Admiral Applewood. According to some embodiments, the communication means shown in the reminder interface 2935 are based on the organizer's contact card for the associated invitee. As such, the reminder interface 2935 includes different communication means based on the contact card for the associated invitee.

As shown in FIG. 29E, the reminder interface 2935 further includes: the current locale 2838*a* of Rear Admiral Applewood (e.g., within building HS01); and the current estimated time of arrival (ETA) 2838*b* for Rear Admiral Applewood (e.g., estimated based on the current locale 2838*a* of Rear Admiral Applewood and the estimated velocity or mode of transport). As shown in FIG. 29E, the reminder interface 2935 further includes a mark-as-present affordance 2940 provided to manually mark Rear Admiral Applewood as present (e.g., participating in the ongoing meeting).

FIG. 29E also illustrates detecting a contact 2936 at a location corresponding to the mark-as-present affordance 2940. FIG. 29F illustrates ceasing to display the invitee representation 2912*h* associated with Rear Admiral Applewood within the second sub-region 2906*b* and displaying the invitee representation 2912*h* associated with Rear Admiral Applewood within the first sub-region 2906*a* in response to detecting the selection of the mark-as-present affordance 2940 in FIG. 28E. FIG. 29F also illustrates displaying the connection indicator 2914*i* proximate to the invitee representation 2912*h* associated with Rear Admiral Applewood indicating that Rear Admiral Applewood was manually marked as present in response to detecting the selection of the mark-as-present affordance 2940 in FIG. 28E.

FIGS. 29F-29J show a sequence in which the screen of a local participating invitee is shared both locally and remotely. FIG. 29F illustrates detecting a contact 2942 at a location corresponding to the start conference affordance 2904. FIG. 29F also illustrates the content displayed by the first display 524*a*-1 within the meeting space (e.g., "Meeting in Progress") and content displayed by a remote device 2955 connected to the virtual conference service application (e.g., "Conference Starting Soon").

FIG. 29G illustrates displaying a plurality of affordances 2915*a*, 2915*b* 2915*c*, and 2915*d* within the first content region 2902*a* in response to selection of the start conference affordance 2904 in FIG. 29F. FIG. 29G also illustrates updating the content displayed by the first display 524*a*-1 and the remote device 2955 (e.g., "Conference in Progress") in response to selection of the start conference affordance 2904 in FIG. 29F. In some embodiments, the affordance 2915*a* is provided to terminate the virtual conference. In some embodiments, the affordance 2915*b* is provided to mute the microphone associated with the physical meeting space. In some embodiments, the affordance 2915*c* is provided to initiate a screen sharing operation associated with sharing content associated with the organizer of the ongoing meeting (e.g., a local participant within the physical meeting space) via both local and remote interfaces. In some embodiments, the affordance 2915*d* is provided to display additional tools and/or options associated with the virtual conference.

FIG. 29G further illustrates detecting a contact 2944 at a location corresponding to the affordance 2915*c*. FIG. 29H illustrates updating the content displayed by the first display 524*a*-1 and the remote device 2955 (e.g., "Admiral Appleseed's Screen") to show content associated with the Admiral Appleseed's device (e.g., the personal device of the organizer of the ongoing meeting) in response to selection of the affordance 2915*c* in FIG. 29G.

FIG. 29H also illustrates detecting a contact 2946 at a location corresponding to the lighting controls affordance 2911*a*. FIG. 29I illustrates displaying lighting controls interface 2951 within the controls region 2902*f* in response to selection of the lighting controls affordance 2911*a* in FIG. 29H. In some embodiments, the lighting controls interface 2951 is provided to adjust one or more illumination devices within the physical meeting space. As shown in FIG. 29I, the lighting controls interface 2951 includes a plurality of lighting mode affordances 2947*a*, 2947*b*, 2947*c*, 2947*d*, and 2947*e* associated with preset settings for the one or more illumination devices within the physical meeting space. For example, in FIG. 29I, the lighting interface 2951 shows that the lighting mode affordance 2947*a* associated with a preset "Mtg" mode for the one or more illumination devices within the physical meeting space was selected in response to selection of the start conference affordance 2904 in FIG. 29F. As shown in FIG. 29I, the lighting controls interface 2951 also includes: a first slider affordance 2949*a* provided to control the front illumination devices within the physical meeting space; and a second slider affordance 2949*b* provided to control the rear illumination devices within the physical meeting space. As shown in FIG. 29I, the lighting controls interface 2951 further includes a back affordance 2953 provided to dismiss the lighting controls interface 2951.

Figure 29J:
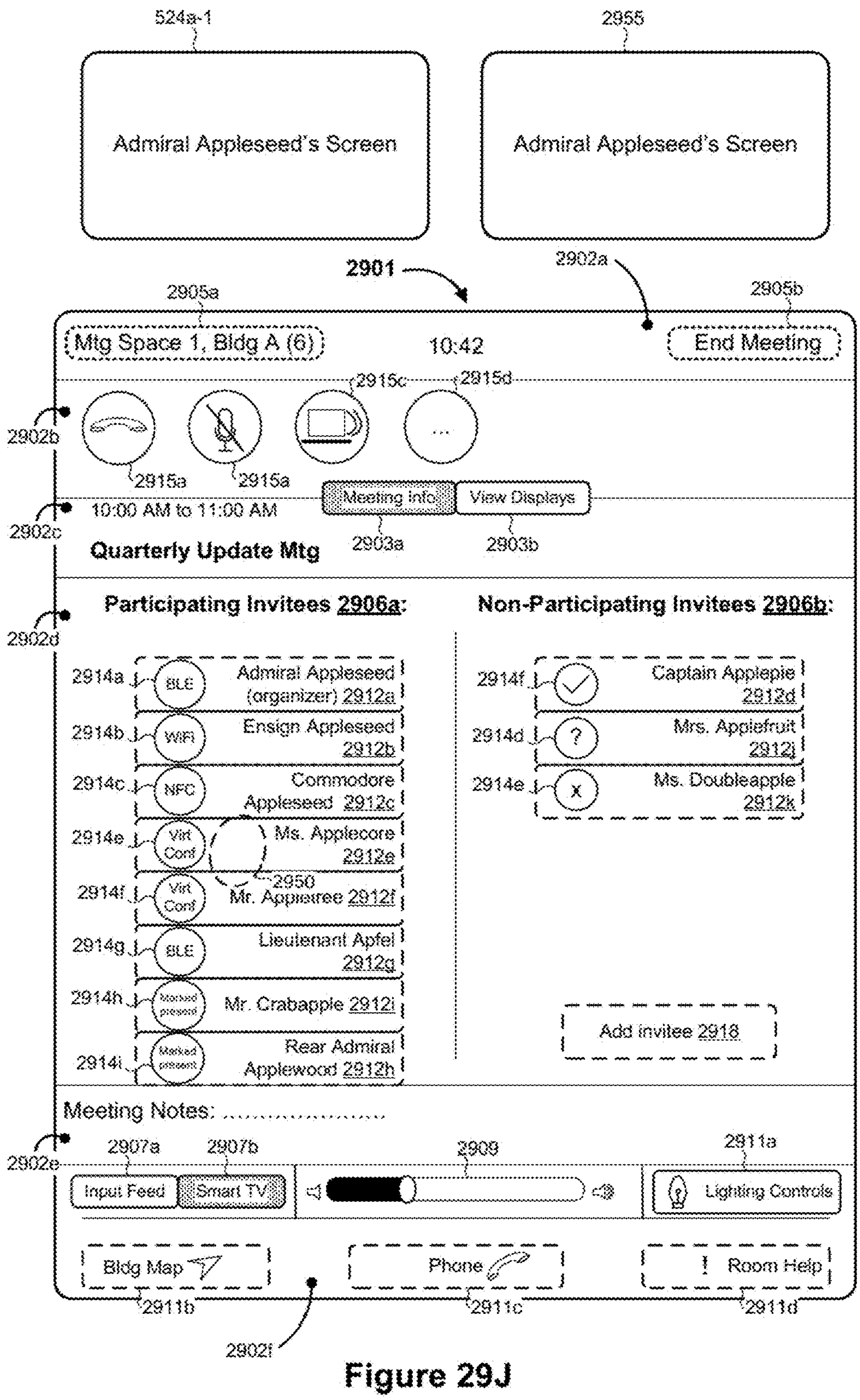

FIG. 29I also illustrates detecting a contact 2948 at a location corresponding to the back affordance 2953. FIG. 29J illustrates ceasing to display the lighting controls interface 2951 within the controls region 2902*f* in response to selection of the back affordance 2953 in FIG. 29I.

Figure 29K:
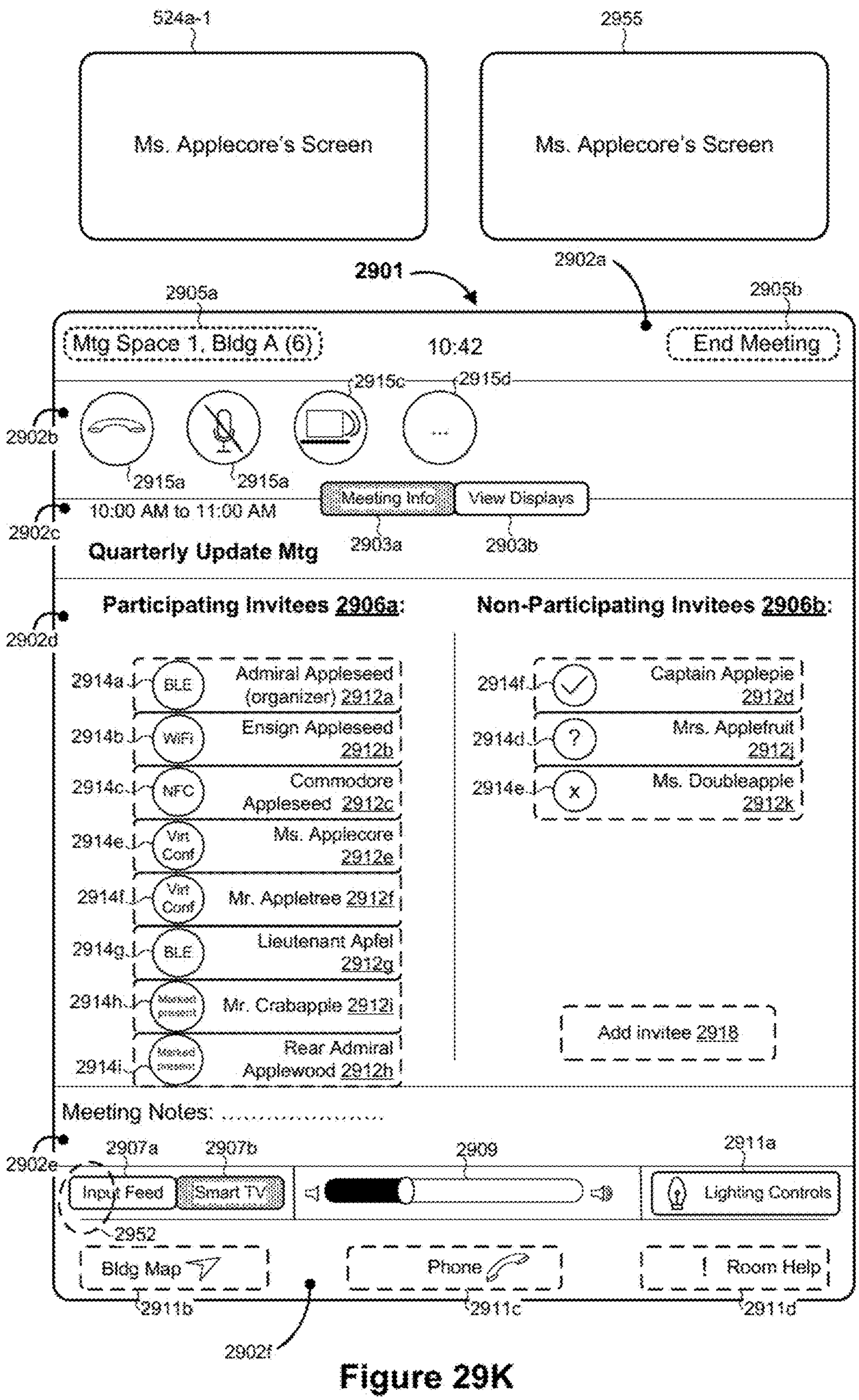

FIGS. 29J-29K show a sequence in which the screen of a remote participating invitee is shared both locally and remotely. FIG. 29J also illustrates detecting a contact 2950 at a location corresponding to the invitee representation 2912*e* associated with Ms. Applecore. FIG. 29K illustrates updating the content displayed by the first display 524*a*-1 and the remote device 2955 (e.g., "Ms. Applecore's Screen") to show content associated with the Ms. Applecore's device in response to selection of the invitee representation 2912*e* associated with Ms. Applecore in FIG. 29J.

Figure 29L:
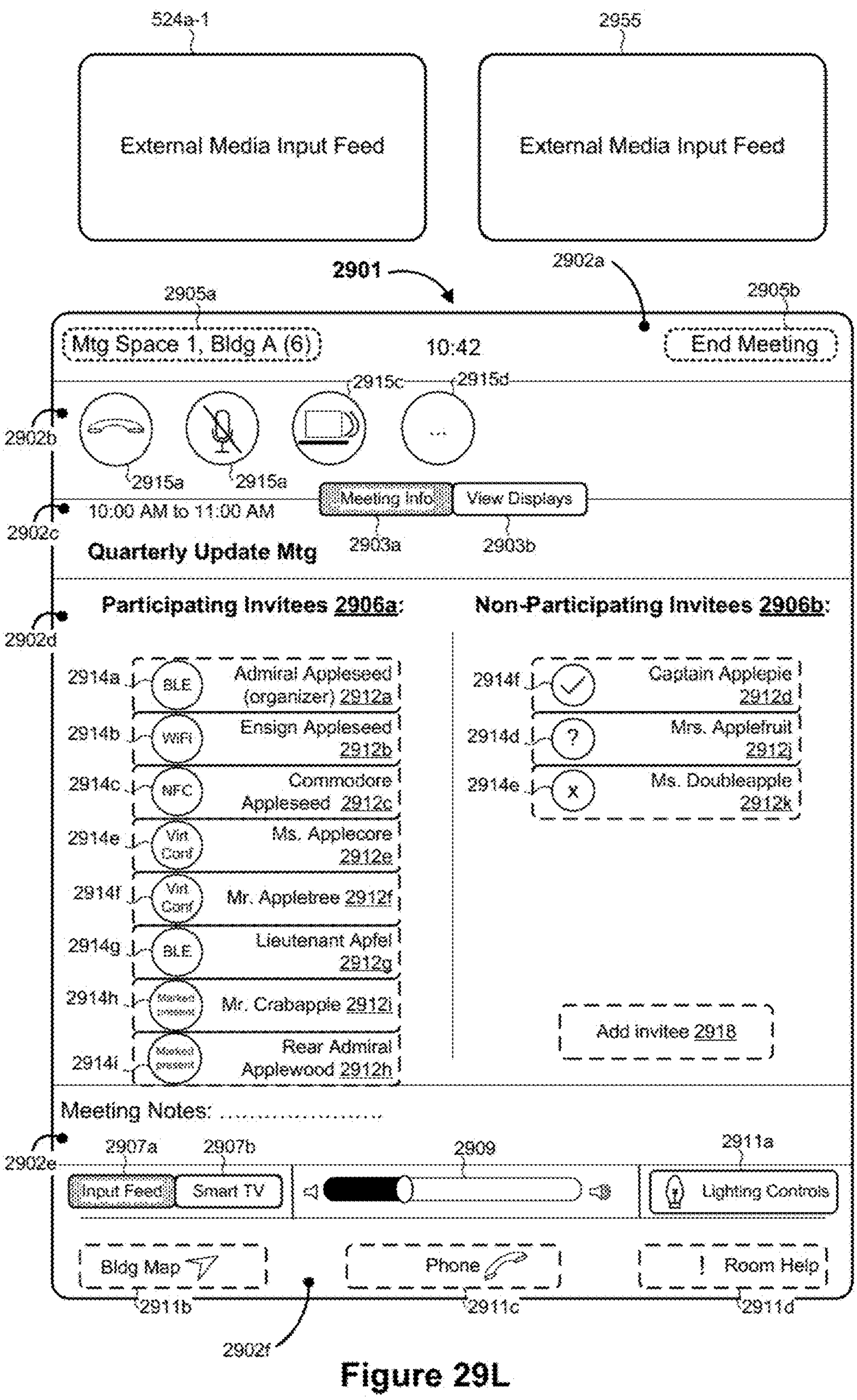
Figure 30A:
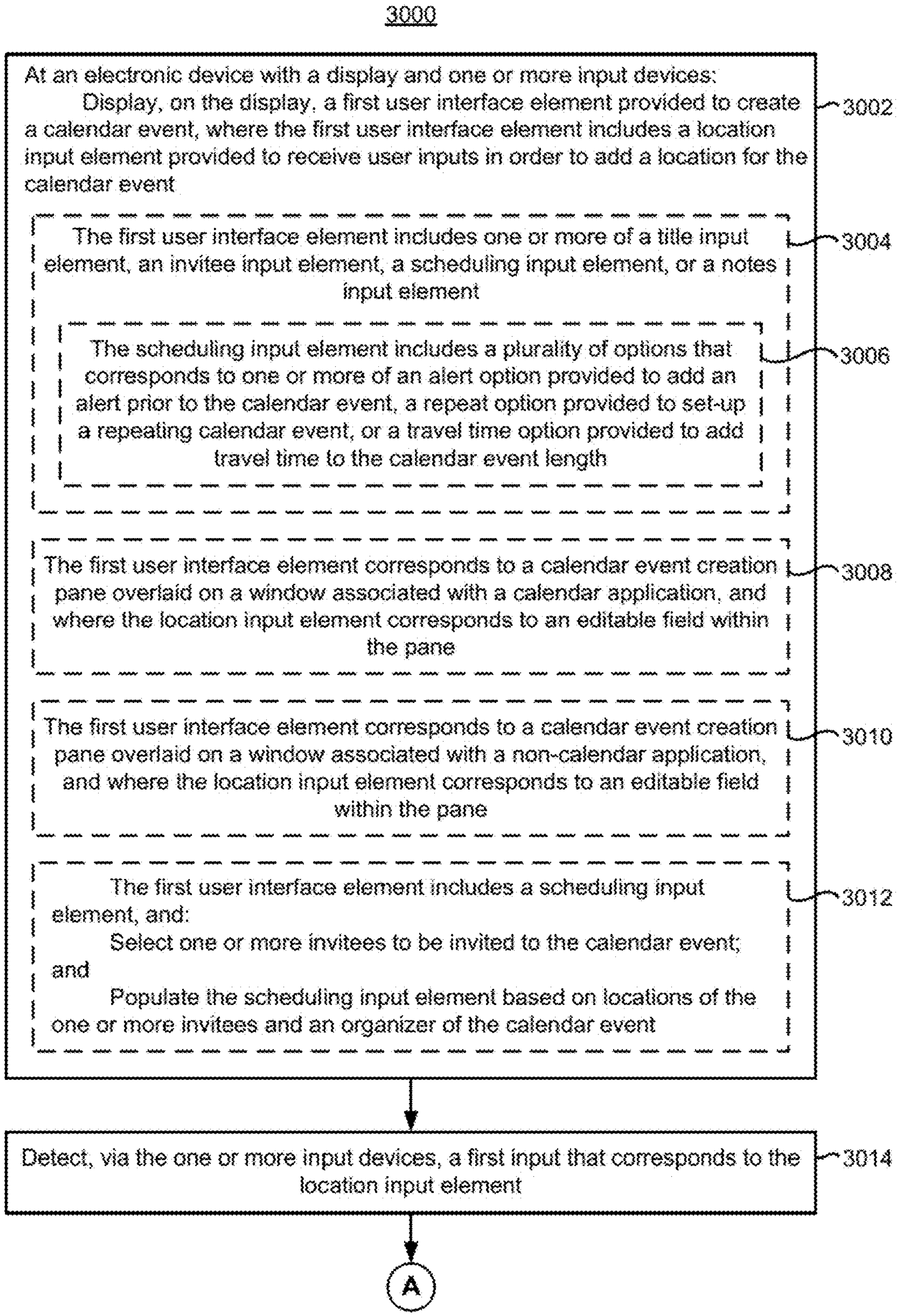
Figure 30B:
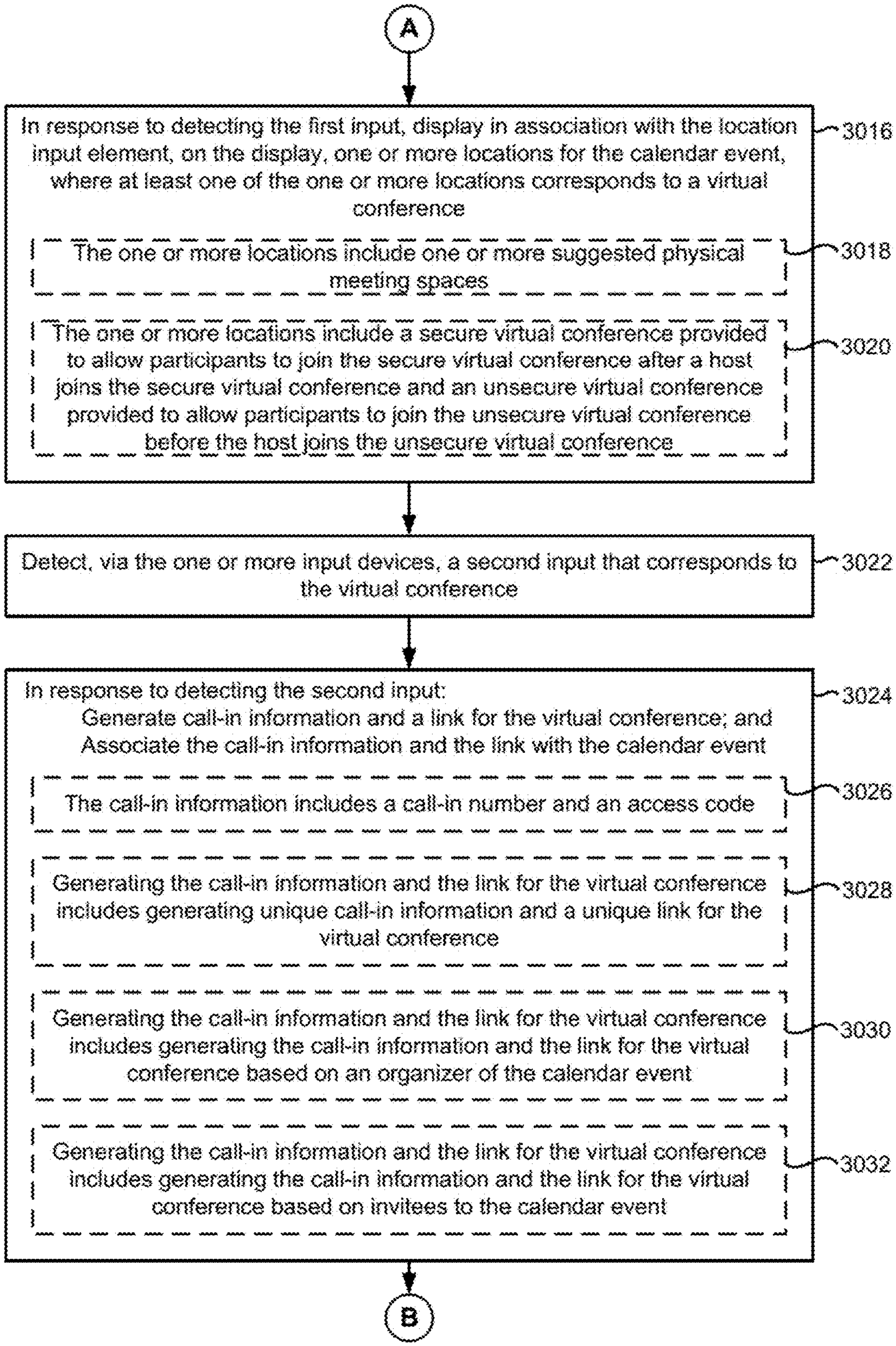
Figure 30C:
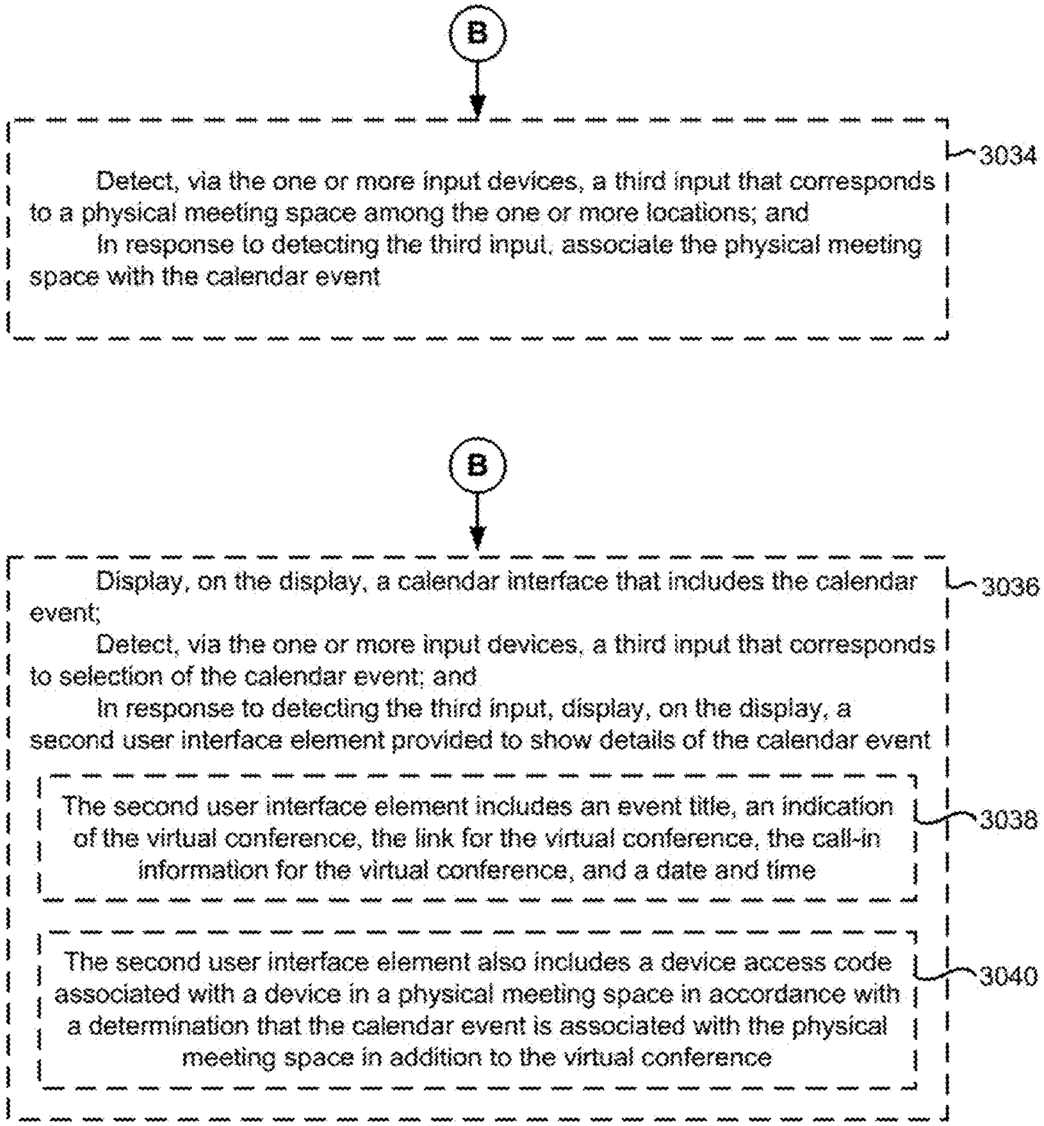

FIGS. 29K-29L show a sequence in which a local input feed overrides a screen sharing operation. FIG. 29K also illustrates detecting a contact 2952 at a location corresponding to the input feed affordance 2907*a*. FIG. 29L illustrates updating the content displayed by the first display 524*a*-1 and the remote device 2955 (e.g., "External Media Input Feed") to show content associated with an external media input feed (e.g., an HDMI input feed connected to a local interface within the physical meeting space) in response to selection of the input feed affordance 2907*a* in FIG. 29K.

FIGS. 30A-30D illustrate a flow diagram of a method 3000 of creating a calendar event associated with a virtual conference in accordance with some embodiments. In some embodiments, the method 3000 is performed at an electronic device (e.g., the portable multifunction device 100 in FIG.

1A, or the device 300 in FIG. 3) with one or more processors, non-transitory memory, a display, and one or more input devices. In some embodiments, the display is a touch-screen display and the input device is on or integrated with the display. In some embodiments, the display is separate from the input device. Some operations in method 3000 are, optionally, combined and/or the order of some operations is, optionally, changed.

As described below, the method 3000 provides an intuitive way to create a calendar event associated with a virtual conference. The method reduces the cognitive burden on a user when creating a calendar event associated with a virtual conference, thereby creating a more efficient human-machine interface. For battery-operated electronic devices, creating a calendar event associated with a virtual conference faster and more efficiently conserves power and increases the time between battery charges.

For example, the electronic device corresponds to the device 502-A-1 located outside of a meeting space in FIGS. 5A-5B. In another example, the electronic device corresponds to the device 504-A-1 located inside of the meeting space in FIGS. 5A-5B. In yet another example, the electronic device corresponds to a personal device associated with a user such as a phone, wearable computing device, tablet, laptop, or the like.

The electronic device displays (3002), on the display, a first user interface element provided to create a calendar event, where the first user interface element includes a location input element (e.g., an affordance, field, etc.) provided to receive user inputs in order to add a location for the calendar event. In some embodiments, the first user interface element corresponds to a pane, panel, window, and/or the like overlaid on the calendar application for creating a calendar event. In some embodiments, the first user interface element corresponds to a drop-down menu overlaid on the calendar or non-calendar application for creating a calendar event. In one example, FIG. 28B shows an event creation interface 2812 (e.g., the first user interface element) that includes the location input element 2814B overlaid on the calendar interface 2801. In another example, FIG. 28X shows an event creation interface 2812 (e.g., the first user interface element) that includes the location input element 2814B overlaid on the messaging interface 28101.

In one example, the first user interface element is displayed in response to a previous input that corresponds to double clicking/tapping on a time slot/day within a calendar application (e.g., as shown in FIGS. 28A-28B). In another example, the first user interface element is displayed in response to a previous input that corresponds to interacting with an affordance for creating a calendar event within a calendar application (e.g., as shown in FIGS. 28L-28M). In yet another example, the first user interface element is displayed in response to a previous input that corresponds to interacting with a calendar creation drop down menu in the title/tool bar of a non-calendar application (e.g., an email application (e.g., as shown in FIGS. 28W-28X).

In some embodiments, the first user interface element includes (3004) one or more of a title input element, an invitee input element, a scheduling input element, or a notes input element. In some embodiments, the other input elements correspond to fields. For example, if the user starts typing characters in the invitee field, suggested invitees are shown for addition to the calendar event. In some embodiments, the other input elements correspond to affordances. For example, if the user selects the invitee affordance, a directory is displayed for selecting invitees to add to the calendar event.

In FIG. 28B, for example, the event creation interface 2812 (e.g., the first user interface element) includes: a title input element 2814A (e.g., a user-modifiable field) provided to receive and subsequently display a title for the new event; a location input element 2814B (e.g., a user-modifiable field) provided to receive and subsequently display one or more locations for the new event; a scheduling input element 2814C (e.g., a user-modifiable field) provided to receive and subsequently display a time and date for the new event; an invitees input element 2814D (e.g., a user-modifiable field) provided to receive and subsequently display one or more invitees to be invited to the new event; and a notes input element 2814E (e.g., a user-modifiable field) provided to receive and (optionally) subsequently display notes, links (e.g., URLs), attachments, and/or the like for the new event In some embodiments, the scheduling input element includes (3006) a plurality of options that corresponds to one or more of an alert option provided to add an alert prior to the calendar event, a repeat option provided to set-up a repeating calendar event, or a travel time option provided to add travel time to the calendar event length. FIG. 28B, for example, shows the scheduling input element 2814C within the event creation interface 2812 that includes the ability to add an alert, repeating sequence, travel time, and/or the like for the new event. According to some embodiments, this helps to provide a reminder of an upcoming event, facilitate re-use of the calendar event, and/or improve punctuality.

In some embodiments, the first user interface element corresponds to (3008) a calendar event creation pane overlaid on a window associated with a calendar application, and where the location input element corresponds to an editable field within the pane. In one example, FIG. 28B shows an event creation interface 2812 (e.g., the first user interface element) that includes the location input element 2814B overlaid on the calendar interface 2801 associated with a calendar application.

In some embodiments, the first user interface element corresponds to (3010) a calendar event creation pane overlaid on a window associated with a non-calendar application, and where the location input element corresponds to an editable field within the pane. For example, FIG. 28X shows an event creation interface 2812 (e.g., the first user interface element) that includes the location input element 2814B overlaid on the messaging interface 28101 associated with an email application.

In some embodiments, the first user interface element includes (3012) a scheduling input element, and the electronic device: selects one or more invitees to be invited to the calendar event (e.g., the user of the device selects representations/labels for the one or more invitees); and populates the scheduling input element based on locations of the one or more invitees and an organizer of the calendar event. As one example, selecting the one or more invitees includes typing one or more strings of characters into the invitees input element. In another example, selecting the one or more invitees includes auto-selecting the one or more invitees based on frequent meetings. In yet another example, selecting the one or more invitees includes importing a list of the one or more invitees from an outside source.

FIGS. 28S-28T, for example, show a sequence in which three invitees are selected (e.g., Davy Jones, Commodore Schmidlapp, and Dred Pirate Roberts) by the user of the device. For example, the user of the device selects the three invitees from a list of contacts. In another example, the user of the device enters the names of the three invitees using a software keyboard. In yet another example, in response to selection of the invitees input element 2814D, a directory/ contacts interface is displayed that enables the user of the device to search for and select the three invitees. Continuing with this example, as a result of selecting the three invitees, the invitee indicators 2838A, 2838B, and 2838C are displayed within the display portion of the invitees input element 2814D in FIG. 28T.

Furthermore, as a result of selecting the three invitees, in in FIG. 28T, the display portion of the scheduling input element 2814C is populated with a date and time (e.g., Thursday, Feb. 9, 2017, 3:00 pm to 4:00 pm) that satisfies a time and date criterion based on schedule attributes of the organizer of the new event (e.g., the user of the device) and the selected invitees. For example, a time and date during the current calendar week that does not conflict with the existing calendars of the organizer and the selected invitees is selected to auto-populate the scheduling input element 2814C for the new event. According to some embodiments, the smart auto-population of the scheduling input element provides a seamless user experience that requires less time and user inputs when creating a calendar event, which, additionally, reduces power usage and improves battery life of the device by enabling the user to use the device more quickly and efficiently.

The electronic device detects (3014), via the one or more input devices, a first input that corresponds to the location input element. In one example, the first input corresponds to selection of the location input element. In another example, the first input corresponds to entry of characters within location input element. As shown in FIG. 28B, for example, the device detects a contact 2820 at a location corresponding to the location input element 2814B.

In response to detecting the first input, the electronic device displays (3016) in association with the location input element, on the display, one or more locations for the calendar event (e.g., the one or more locations are displayed as a list overlaid on or below the input element), where at least one of the one or more locations corresponds to a virtual conference. Continuing with the example above in step 3014, as shown in FIG. 28C, the device display a first list 2829 of frequently used meeting spaces proximate to the location input element 2814B in response to selection of the location input element 2814B in FIG. 28B. According to some embodiments, the one or more locations for the calendar event correspond to smart recommendations or previously/frequently used locations in order to provide a seamless user experience that requires less time and user inputs when creating a calendar event, which, additionally, reduces power usage and improves battery life of the device by enabling the user to use the device more quickly and efficiently. In some embodiments, the virtual conference location among the one or more locations enables the user to quickly create a virtual conference in order to provide a seamless user experience that requires less time and user inputs when creating a calendar event, which, additionally, reduces power usage and improves battery life of the device by enabling the user to use the device more quickly and efficiently.

In some embodiments, the one or more locations include (3018) one or more suggested physical meeting spaces. For example, the one or more suggested physical meeting spaces are most frequently used by the organizer. In another example, the one or more suggested physical meeting spaces correspond to meeting spaces that are located nearby the current location of the organizer. As shown in FIG. 28C, the device displays the first list 2829 of frequently used meeting spaces, which includes a plurality of frequently and/or recently used meeting space. In some embodiments, the one or more suggested physical meeting spaces correspond to meeting rooms that match input(s) provided by the user (e.g., one or more typed characters). According to some embodiments, the one or more locations for the calendar event correspond to smart recommendations or previously/frequently used locations in order to provide a seamless user experience that requires less time and user inputs when creating calendar events, which, additionally, reduces power usage and improves battery life of the device by enabling the user to use the device more quickly and efficiently.

In some embodiments, the one or more locations include (3020) a secure virtual conference provided to allow participants to join the secure virtual conference after a host joins the secure virtual conference and an unsecure virtual conference provided to allow participants to join the unsecure virtual conference before the host joins the unsecure virtual conference. According to some embodiments, the secure virtual conference begins after the organizer provides an access or host code (e.g., any early attendees are placed on hold or into a virtual waiting room). In some embodiments, the attendees are able to join the unsecure virtual conference with or without an access code before the organizer joins. As shown in FIG. 28C, for example, the first list 2829 of frequently used meeting spaces includes a virtual conference room indicator 2824A for an unsecure virtual conference (e.g., no host and/or host code needed to enter/start the virtual conference) and a virtual conference room indicator 2824B for a secure virtual conference (e.g., a host and/or host coded is needed to enter/start the virtual conference). According to some embodiments, the secure virtual conference room option provides an additional measure of security and/or confidentiality to deter eavesdroppers and interlopers.

The electronic device detects (3022), via the one or more input devices, a second input that corresponds to the virtual conference. As shown in FIG. 28D, for example, a contact 2832 is detected at a location corresponding to the virtual conference room indicator 2828A. According to some embodiments, the ability to select a virtual conference for the new calendar event provides a seamless user experience that requires less time and user inputs, which when creating calendar events, additionally, reduces power usage and improves battery life of the device by enabling the user to use the device more quickly and efficiently.

In response to detecting the second input, the electronic device (3024): generates call-in information and a link (e.g., URL or URI) for the virtual conference; and associates the call-in information and the link with the calendar event. In some embodiments, associating the call-in information and the link with the calendar event includes displaying said items in the first user interface element. In some embodiments, associating the call-in information and the link with the calendar event includes storing said items in a calendar database and not displaying said items in the first user interface element (e.g., the event creation interface 2812) but displaying said items in the second user interface element (e.g., the event details interface 2846). According to some embodiments, the generation of call-in information and the virtual conference link provides a seamless user experience that requires less time and user inputs when creating virtual conferences, which, additionally, reduces power usage and improves battery life of the device by enabling the user to use the device more quickly and efficiently.

Continuing with the example above in step 3022, FIG. 28E shows "Virtual Conference" displayed within the display portion of the location input element 2814B in response to selection of the virtual conference room indicator 2828A in FIG. 28D. Furthermore, FIG. 28E also shows a virtual conference details interface element 2814F within the event creation interface 2812 in response to selection of the virtual conference room indicator 2828A in FIG. 28D. As shown in FIG. 28E, the virtual conference details interface element 2814F includes a first sub-region 2845A that includes a URL to the virtual conference and a meeting access code for the virtual conference. As shown in FIG. 28E, the virtual conference details interface element 2814F also includes a second sub-region 2845B that includes a domestic (e.g., US) call-in number for the virtual conference. As shown in FIG. 28E, the virtual conference details interface element 2814F further includes a third sub-region 2845C that includes a foreign (e.g., non-US) call-in number for the virtual conference.

In some embodiments, the call-in information includes (3026) a call-in number and an access code. As shown in FIG. 28E, for example, the virtual conference details interface element 2814F includes a domestic (e.g., US) call-in number for the virtual conference within the second sub-region 2845B, a foreign (e.g., non-US) call-in number for the virtual conference within the third sub-region 2845C, and a meeting access code within the first sub-region 2845A.

In some embodiments, generating the call-in information and the link for the virtual conference includes (3028) generating unique call-in information and a unique link for the virtual conference. In some embodiments, the link and call-in information are pseudo-randomly generated for each virtual conference (e.g., based on the location, rights, privileges, etc. of the event organizer/creator). As one example, the virtual conference URL and call-in numbers within the virtual conference details interface element 2814F in FIGS. 28E and 28V are different. According to some embodiments, the unique call-in information and the unique link for the virtual conference provides an additional measure of security and/or confidentiality to deter eavesdroppers and interlopers.

In some embodiments, generating the call-in information and the link for the virtual conference includes (3030) generating the call-in information and the link for the virtual conference based on an organizer of the calendar event. For example, the organizer is the user of the device. In some embodiments, the organizer is associated with a dedicated virtual conference room that has a same link and call-in information.

In some embodiments, generating the call-in information and the link for the virtual conference includes (3032) generating the call-in information and the link for the virtual conference based on the invitees to the calendar event. In some embodiments, a recurring calendar event uses the same link and call-in information. In some embodiments, the server that hosts the virtual conference is based on the location attributes of the invitees. As such, the link to the virtual conference is based on the invitees. In some embodiments, the call-in information is selected based on the locations of the invites. For example, a US number is provided if all invitees are located in the US. In another example, both US and global call-in information are provided if the invitees are located in and out of the US. For example, the global call-in information corresponds to the locations of the non-US invitees such as a local call-in number for a UK invite and a local call-in number for a DE invitee.

In some embodiments, the electronic device (3034): detects, via the one or more input devices, a third input that corresponds to a physical meeting space among the one or more locations; and, in response to detecting the third input, associates the physical meeting space with the calendar event. In some embodiments, associating the meeting space with the calendar event includes displaying said item in the first user interface element. In some embodiments, associating the meeting space with the calendar event includes storing said item in a calendar database and not displaying said item in the first user interface element (e.g., the event creation interface 2812) but displaying said items in the second user interface element (e.g., the event details interface 2846).

As one example, FIGS. 28P-28S show a sequence in which a physical meeting space (e.g., the "Virtual Reality Room") and a virtual conference (e.g., the "Virtual Conference") are associated with a calendar event (e.g., as shown by the display portion of the locations input element 2814B in FIG. 28S). According to some embodiments, the ability to associate a new meeting with both a physical meeting space and a virtual conference room provides a seamless user experience that requires less time and user inputs when creating new calendar events, which, additionally, reduces power usage and improves battery life of the device by enabling the user to use the device more quickly and efficiently.

According to some embodiments, the physical meeting space has an option to approve/decline the scheduling request based on additional information not included in the scheduling database (e.g., maintenance, local events, holidays, etc.). According to some embodiments, the physical meeting space is reserved for the calendar event, but an attendee still checks-in at the physical meeting space.

In some embodiments, the electronic device (3036): displays, on the display, a calendar interface that includes the calendar event; detects, via the one or more input devices, a third input that corresponds to selection of the calendar event; and, in response to detecting the third input, displays, on the display, a second user interface element provided to show details of the calendar event. In one example, the second user interface element corresponds to an event details interface (e.g., a pane, panel, or window) that is overlaid on the current application. In some embodiments, the second user interface element includes an affordance for editing the calendar event.

For example, FIGS. 28J-28K show a sequence in which an event details interface is shown for the previously created calendar event with a virtual conference. FIG. 28J further illustrates detecting a contact 2844 at a location corresponding to the third calendar event indicator 2806C. FIG. 28K illustrates displaying an event details interface 2846 for the event created in FIGS. 28B-28I in response to selection of the third calendar event indicator 2806C in FIG. 28J.

In some embodiments, the second user interface element includes (3038) an event title, an indication of the virtual conference, the link for the virtual conference, the call-in information for the virtual conference, and a date and time. In some embodiments, the virtual conference is accessed by selecting the link within the second user interface element. In some embodiments, the audio associated with the virtual conference is accessed by selecting the call-in information. For example, the call-in information includes the call-in number following by a comma then the access code. As such, a user need not manually input the access code. For example, in FIG. 28K, the virtual conference details interface element 2814F within the event details interface 2846 includes a URL to the virtual conference, a meeting access code for the virtual conference, a domestic call-in number for the virtual conference, and a global/foreign call-in number for the virtual conference.

In some embodiments, the second user interface element also includes (3040) a device access code associated with a device in a physical meeting space in accordance with a determination that the calendar event is associated with the physical meeting space in addition to the virtual conference. According to some embodiments, the device access code unlocks the device located in the physical meeting space. According to some embodiments, the device access code enables enhanced meeting details associated the calendar event to be displayed by the device located in the meeting space. For example, in FIG. 28V, the virtual conference details interface element 2814F within the event details interface 2846 includes the second sub-region 2861B with the device access code (e.g., for an electronic device within the physical meeting space—the "Virtual Reality Room"). According to some embodiments, the device access code provides an additional measure of security and/or confidentiality to deter commandeering of the physical meeting space by non-invitees and/or unauthorized access of the device within the physical meeting space.

In some embodiments, the electronic device (3042): detects, via the one or more input devices, a third input that corresponds to sending the calendar invite; and, in response to detecting the third input: adds the calendar event to a calendar associated with a user of the device (e.g., the organizer of the calendar event); and sends invitations to the calendar event to one or more invitees. In some embodiments, the invitation includes an indication that the calendar event is associated with a virtual conference. In some embodiments, selection of the send affordance causes the calendar event to be added to the organizer's calendar and also causes an invitation email associated with the calendar event to be sent to any invitees. As one example, in FIG. 28I, a contact 2842 at a location corresponding to the send affordance 2818B. Continuing with this example, in response to selection of the send affordance 2818B, invitations to the event created in FIGS. 28B-28I are sent to the invitees selected in FIGS. 28H-28I (e.g., Davy Jones, Commodore Schmidlapp, and Dred Pirate Roberts) via one or more communication means (e.g., email, SMS, and/or the like). In some embodiments, the first user interface element includes revert and send affordances. For example, selection of the revert affordance clear the entire calendar event or clear the most recently completed field of the calendar event.

In some embodiments, the electronic device (3044): displays, on the display, the first user interface element provided to create a second calendar event, where the first user interface element includes a location input element; detects, via the one or more input devices, a fourth input that corresponds to the location input element; and, in response to detecting the fourth input, displays, on the display, one or more locations for the calendar event proximate to the location input element, where one of the one or more locations corresponds to the virtual conference. The electronic device also: detects, via the one or more input devices, a fifth input that corresponds to the virtual conference; and, in response to detecting the fifth input: generates a second call-in information and a second link for the virtual conference; and associates the second call-in information and the second link with the calendar event. According to some embodiments, the link and call-in information for the virtual conference associated with the second calendar event are different from those for the previously created calendar event. In some embodiments, the link and call-in information for the virtual conference associated with the second calendar event are the same as those for the previously created calendar event. As one example, the calendar event created in FIGS. 28B-28I is associated with a different URL for the virtual conference and different call-in numbers for the virtual conference than the calendar event created in FIGS. 28M-28T (e.g., as shown by the event details interfaces 2846 in FIGS. 28K and 28V).

It should be understood that the particular order in which the operations in FIGS. 30A-30D have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 2000, 2100, 2200, 2300, 3100, 3200, and 3300) are also applicable in an analogous manner to method 3000 described above with respect to FIGS. 30A-30D. For example, the user interface objects, interfaces, calendar events, and contacts described above with reference to method 3000 optionally have one or more of the characteristics of the user interface objects, interfaces, calendar events, and contacts described herein with reference to other methods described herein (e.g., methods 900, 1000, 1100, 2000, 2100, 2200, 2300, 3100, 3200, and 3300). For brevity, these details are not repeated here.

FIGS. 31A-31C illustrate a flow diagram of a method 3100 of populating scheduling and/or location portions of a new calendar event based on invitees in accordance with some embodiments. In some embodiments, the method 3100 is performed at an electronic device (e.g., the portable multifunction device 100 in FIG. 1A, or the device 300 in FIG. 3) with one or more processors, non-transitory memory, a display, and one or more input devices. In some embodiments, the display is a touch-screen display and the input device is on or integrated with the display. In some embodiments, the display is separate from the input device. Some operations in method 3100 are, optionally, combined and/or the order of some operations is, optionally, changed.

As described below, the method 3100 provides an intuitive way to populate schedule and/or location portions of a new calendar event based on invitees. The method reduces the cognitive burden on a user when populating scheduling and/or location portions of a new calendar event based on invitees, thereby creating a more efficient human-machine interface. For battery-operated electronic devices, populating scheduling and/or location portions of a new calendar event based on invitees faster and more efficiently conserves power and increases the time between battery charges.

For example, the electronic device corresponds to the device 502-A-1 located outside of a meeting space in FIGS. 5A-5B. In another example, the electronic device corresponds to the device 504-A-1 located inside of the meeting space in FIGS. 5A-5B. In yet another example, the electronic device corresponds to a personal device associated with a user such as a phone, wearable computing device, tablet, laptop, or the like.

The electronic device displays (3102), on the display, a first user interface element provided to create a calendar event, where the first user interface element includes a location input element (e.g., an affordance, field, etc.) provided to receive user inputs in order to add a location for the calendar event and a scheduling input element (e.g., an affordance, field, etc.) provided to receive user inputs in order to add a time and date for the calendar event. In some embodiments, the first user interface element corresponds to a pane, panel, window, and/or the like for creating a calendar event overlaid on the calendar application. In some embodiments, the first user interface element corresponds to a drop-down menu overlaid on the calendar or non-calendar application. In one example, FIG. 28B shows an event creation interface 2812 (e.g., the first user interface element) that includes the location input element 2814B and the scheduling input element 2814C overlaid on the calendar interface 2801. In another example, FIG. 28X shows an event creation interface 2812 (e.g., the first user interface element) that includes the location input element 2814B and the scheduling input element 2814C overlaid on the messaging interface 28101.

In one example, the first user interface element is displayed in response to a previous input that corresponds to double clicking/tapping on a time slot/day within a calendar application (e.g., as shown in FIGS. 28A-28B). In another example, the first user interface element is displayed in response to a previous input that corresponds to interacting with an affordance for creating a calendar event within a calendar application (e.g., as shown in FIGS. 28L-28M). In yet another example, the first user interface element is displayed in response to a previous input that corresponds to interacting with a calendar creation drop down menu in the title/tool bar of a non-calendar application (e.g., an email application (e.g., as shown in FIGS. 28W-28X).

The electronic device selects (3104) one or more invitees to be invited to the calendar event (e.g., the user of the device selects representations/labels for the one or more invitees). As one example, selecting the one or more invitees includes typing one or more strings of characters into the invitees input element. In another example, selecting the one or more invitees includes auto-selecting the one or more invitees based on frequent meetings. In yet another example, selecting the one or more invitees includes importing a list of the one or more invitees from an outside source.

FIGS. 28X-28Y, for example, show a sequence in which three invitees are selected (e.g., Davy Jones, Commodore Schmidlapp, and Dred Pirate Roberts) by the user of the device. For example, the user of the device selects the three invitees from a list of contacts. In another example, the user of the device enters the names of the three invitees using a software keyboard. In yet another example, in response to selection of the invitees input element 2814D, the device displays a directory/contacts interface that enables the user of the device to search for and select the three invitees. Continuing with this example, as a result of selecting the three invitees, the device displays the invitee indicators 2838A, 2838B, and 2838C within the display portion of the invitees input element 2814D in FIG. 28Y.

After the one or more invitees have been selected, the electronic device (3106): populates a display portion of the location input element with a meeting space identifier that satisfies a location criterion based on location attributes of the one or more invitees and an organizer of the calendar event (e.g., the organizer is the user of the device); and populates a display portion of the scheduling input element with a date and time identifier that satisfies a time and date criterion based on schedule attributes of the one or more invites and the organizer of the calendar event (e.g., the organizer is the user of the device). Continuing with the example above in step 3104, as a result of selecting the three invitees, the device populates the display portion of the location input element 2814B with a location (e.g., "Spin City Room") that satisfies a location based on location attributes of the organizer of the new event (e.g., the user of the device) and the selected invitees. For example, a location closest to the organizer and the selected invitees is selected to auto-populate the location input element 2814B for the new event. Furthermore, as a result of selecting the three invitees, the device populates the display portion of the scheduling input element 2814C with a date and time (e.g., Monday, Feb. 13, 2017, 8:30 am to 9:30 am) that satisfies a time and date criterion based on schedule attributes of the organizer of the new event (e.g., the user of the device) and the selected invitees. For example, a time and date during the current calendar week that does not conflict with the existing calendars of the organizer and the selected invitees is selected to auto-populate the scheduling input element 2814C for the new event. According to some embodiments, the smart auto-population of the scheduling input element and the location input element provide a seamless user experience that requires less time and user inputs when creating a calendar event, which, additionally, reduces power usage and improves battery life of the device by enabling the user to use the device more quickly and efficiently.

In some embodiments, the location attributes of the one or more invitees are (3108) based on at least one of an office directory, an address book of a user of the device, or current geographic locations of the one or more invitees. In some embodiments, the location attributes correspond to home office locations from a directory. In some embodiments, the location attributes of correspond to home addresses from address book of the user of the device. In some embodiments, the location attributes correspond to current locations. In some embodiments, the location attributes correspond to location preferences. In some embodiments, the location criterion is satisfied when a meeting space is found that matches a threshold number of the location attributes of the selected invitees. In some embodiments, the location criterion is satisfied when a meeting space is found that matches all of the location attributes of the selected invitees. In some embodiments, the location criterion is satisfied when a meeting space is found that is the best compromise of the location attributes of the selected invitees. According to some embodiments, the usage of the location attributes improves the accuracy of the location(s) selected to populate the location input element in order to provide a seamless user experience that requires less time and user inputs when creating a calendar event, which, additionally, reduces power usage and improves battery life of the device by enabling the user to use the device more quickly and efficiently.

In some embodiments, the schedule attributes of the one or more invitees are (3109) based on at least one of calendars or availability indicators of the one or more invitees. In some embodiment, the schedule attributes correspond to one or more schedules (e.g., work, personal, etc. calendars) of each invitee with available time slots. In some embodiment, the time and date criterion is satisfied when a time slot is found that is available for all invitees. In some embodiment, the time and date criterion is satisfied when a time slot is found that is available for all required invitees. In some embodiment, the time and date criterion is satisfied when a time slot is found that is available for a majority of invitees. According to some embodiments, the usage of the schedule attributes improves the accuracy of the date and time selected to populate the scheduling input element in order to provide a seamless user experience that requires less time and user inputs when creating a calendar event, which, additionally, reduces power usage and improves battery life of the device by enabling the user to use the device more quickly and efficiently.

In some embodiments, the meeting space identifier includes (3110) a first identifier associated with a physical meeting space and a second identifier associated with a virtual conference. As one example, FIGS. 28P-28S show a sequence in which a physical meeting space (e.g., the "Virtual Reality Room") and a virtual conference (e.g., the "Virtual Conference") are associated with a calendar event (e.g., as shown by the display portion of the locations input element 2814B in FIG. 28S).

In some embodiments, the meeting space identifier corresponds to (3112) a virtual conference in accordance with a determination that the location attributes of the one or more invites and the organizer indicate geographic diversity. According to some embodiments, the call-in information is automatically generated when the location attributes for the invitees indicate that the one or more invites and the organizer are located in geographically diverse locations. According to some embodiments, providing the virtual conference based on geographic diversity of the invitees improves the accuracy and inclusivity of the location(s) selected to populate the location input element in order to provide a seamless user experience that requires less time and user inputs when creating a calendar event, which, additionally, reduces power usage and improves battery life of the device by enabling the user to use the device more quickly and efficiently.

In some embodiments, the meeting space identifier corresponds to (3114) a virtual conference in accordance with a determination that location attributes for at least one of the one or more invites is unknown. According to some embodiments, the call-in information is automatically generated when the location attributes for at least one of the one or more invitees are unknown or unavailable. According to some embodiments, providing the virtual conference based on unavailable/unknown location attributes for the invitees improves the accuracy and inclusivity of the location(s) selected to populate the location input element in order to provide a seamless user experience that requires less time and user inputs when creating a calendar event, which, additionally, reduces power usage and improves battery life of the device by enabling the user to use the device more quickly and efficiently.

In some embodiments, the electronic device (3116): selects an additional invitee to be invited to the calendar event; and, after the additional invitee has been selected, and in accordance with a determination that location attributes associated with the additional invitee cause the meeting space to fail to satisfy the location criterion, updates the location input element with a new meeting space identifier that satisfies the location criterion based on location attributes of the one or more invitees, the additional invitee, and the organizer of the calendar event. As one example, FIGS. 28BB-28CC show a sequence in which an additional invitee (e.g., Satoshi Nakamoto) is added to the group of invitees. As a result of adding the invitee, the device updates the display portion of the location input element 2814B to show an additional physical meeting space (e.g., the "Briefing Room"). For example, the "Briefing Room" in the JP01 building is located near the office of the additional invitee who is located in a different state than the other invitees. According to some embodiments, the dynamic smart auto-population of the location input element provides a seamless user experience that requires less time and user inputs when creating a calendar event, which, additionally, reduces power usage and improves battery life of the device by enabling the user to use the device more quickly and efficiently.

In some embodiments, the electronic device (3118): selects an additional invitee to be invited to the calendar event; and, after the additional invitee has been selected, and in accordance with a determination that schedule attributes associated with the additional invitee cause the meeting space to fail to satisfy the time and date criterion, updates the scheduling input element with a new time and date identifier that satisfies the time and date criterion based on schedule attributes of the one or more invitees, the additional invitee, and the organizer of the calendar event. As one example, FIGS. 28BB-28CC show a sequence in which an additional invitee (e.g., Satoshi Nakamoto) is added to the group of invitees. As a result of adding the invitee, the device updates the display portion of the scheduling input element 2814C to show a different time and date for the event (e.g., Tuesday, Feb. 14, 2017, 4:00 pm to 5:00 pm). According to some embodiments, the time and date populating the display portion of the scheduling element 2814C dynamically changes as invitees are added or removed from the event. According to some embodiments, the dynamic smart auto-population of the scheduling input element provides a seamless user experience that requires less time and user inputs when creating a calendar event, which, additionally, reduces power usage and improves battery life of the device by enabling the user to use the device more quickly and efficiently.

In some embodiments, the electronic device (3120): detects a first input, via the one or more input devices, that corresponds to editing the display portion of the location input element; and, in response to the first input, updates the display portion of the location input element to reflect the change to the location input element. In one example, the meeting space is replaced with a new meeting space. In another example, a second meeting space is added. As one example, FIGS. 28Y-28Z show a sequence in which the display portion of the location input element 2814B is modified to show the "Virtual Conference" in addition to "Spin City Room." According to some embodiments, the ability to quickly edit the location input element provides a seamless user experience that requires less time and user inputs when creating a calendar event, which, additionally, reduces power usage and improves battery life of the device by enabling the user to use the device more quickly and efficiently.

In some embodiments, the electronic device (3122): detects a second input, via the one or more input devices, that corresponds to changing the time and date identifier within the display portion of the scheduling input element; and, in response to the second input, updates the display portion of the scheduling input element to reflect the change to the time and date identifier. For example, the time and/or date is replaced with a new time and/or date. According to some embodiments, the ability to quickly edit the scheduling input element provides a seamless user experience that requires less time and user inputs when creating a calendar event, which, additionally, reduces power usage and improves battery life of the device by enabling the user to use the device more quickly and efficiently.

In some embodiments, the electronic device (3124): detects a third input, via the one or more input devices, that corresponds to changing a week associated with the time and date identifier within the display portion of the scheduling input element to a particular week; and, in response to the third input, updates the display portion of the scheduling input element to a date and time identifier within the particular week that satisfies the time and date criterion based on schedule attributes of the one or more invites and the organizer of the calendar event. For example, the first user interface element includes an affordance for changing the week. As one example, in FIG. 28T, the event creation interface 2812 includes a change week affordance 2859 within the scheduling input element 2814C that is provided to change the week associated with the new event. For example, in response to selection of the change week affordance 2859, the device selects a time and date during the next calendar week that does not conflict with the existing calendars of the organizer and the selected invitees to auto-populate the scheduling input element 2814C for the new event. According to some embodiments, the ability to quickly change the week by which to auto-populate the scheduling input element provides a seamless user experience that requires less time and user inputs when creating a calendar event, which, additionally, reduces power usage and improves battery life of the device by enabling the user to use the device more quickly and efficiently.

In some embodiments, the electronic device (3126): generates call-in information for the calendar event; and associates the call-in information with the calendar event. In one example, the call-in information includes a US call-in number if the invitees are located in the US. In another example, the call-in information includes a global call-in number is a global call-in number if at least one of the invitees is located outside of the US. As shown in FIG. 28E, the virtual conference details interface element 2814F includes a first sub-region 2845A that includes a URL to the virtual conference and a meeting access code for the virtual conference. As shown in FIG. 28E, the virtual conference details interface element 2814F also includes a second sub-region 2845B that includes a domestic (e.g., US) call-in number for the virtual conference. As shown in FIG. 28E, the virtual conference details interface element 2814F further includes a third sub-region 2845C that includes a foreign (e.g., non-US) call-in number for the virtual conference. According to some embodiments, the generation of call-in information provides a seamless user experience that requires less time and user inputs when creating a calendar event, which, additionally, reduces power usage and improves battery life of the device by enabling the user to use the device more quickly and efficiently.

In some embodiments, the call-in information includes (3128) a call-in number and an access code. As shown in FIG. 28E, for example, the virtual conference details interface element 2814F includes a domestic (e.g., US) call-in number for the virtual conference within the second sub-region 2845B, a foreign (e.g., non-US) call-in number for the virtual conference within the third sub-region 2845C, and a meeting access code within the first sub-region 2845A.

In some embodiments, the call-in information is generated and associated with (3130) the calendar event in accordance with a determination that the location attributes of the one or more invites and the organizer indicate geographic diversity. According to some embodiments, the call-in information is automatically generated when the location attributes for the invitees indicate that the one or more invites and the organizer are located in geographically diverse locations. According to some embodiments, generating the call-in information based on geographic diversity of the invitees improves the accuracy and inclusivity of the location(s) selected to populate the location input element in order to provide a seamless user experience that requires less time and user inputs when creating a calendar event, which, additionally, reduces power usage and improves battery life of the device by enabling the user to use the device more quickly and efficiently.

In some embodiments, the call-in information is generated and associated with (3132) the calendar event in accordance with a determination that location attributes for at least one of the one or more invites is unknown. According to some embodiments, the call-in information is automatically generated when the location attributes for at least one of the one or more invitees are unknown or unavailable. According to some embodiments, generating the call-in information based on unavailable/unknown location attributes for the invitees improves the accuracy and inclusivity of the location(s) selected to populate the location input element in order to provide a seamless user experience that requires less time and user inputs when creating a calendar event, which, additionally, reduces power usage and improves battery life of the device by enabling the user to use the device more quickly and efficiently.

It should be understood that the particular order in which the operations in FIGS. 31A-31C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 2000, 2100, 2200, 2300, 3000, 3200, and 3300) are also applicable in an analogous manner to method 3100 described above with respect to FIGS. 31A-31C. For example, the user interface objects, interfaces, calendar events, invitees, and contacts described above with reference to method 3100 optionally have one or more of the characteristics of the user interface objects, interfaces, calendar events, invitees, and contacts described herein with reference to other methods described herein (e.g., methods 900, 1000, 1100, 2000, 2100, 2200, 2300, 3000, 3200, and 3300). For brevity, these details are not repeated here.

FIGS. 32A-32C illustrate a flow diagram of a method 3200 of managing the attendance of meeting invitees in accordance with some embodiments. In some embodiments, the method 3200 is performed at an electronic device (e.g., the portable multifunction device 100 in FIG. 1A, or the device 300 in FIG. 3) with one or more processors, non-transitory memory, a display, and one or more input devices. In some embodiments, the display is a touch-screen display and the input device is on or integrated with the display. In some embodiments, the display is separate from the input device. Some operations in method 3200 are, optionally, combined and/or the order of some operations is, optionally, changed.

As described below, the method 3200 provides an intuitive way to manage the attendance of meeting invitees. The method reduces the cognitive burden on a user when managing the attendance of meeting invitees, thereby creating a more efficient human-machine interface. For battery-operated electronic devices, managing the attendance of meeting invitees faster and more efficiently conserves power and increases the time between battery charges.

For example, the electronic device corresponds to the device 502-A-1 located outside of a meeting space in FIGS. 5A-5B. In another example, the electronic device corresponds to the device 504-A-1 located inside of the meeting space in FIGS. 5A-5B. In yet another example, the electronic device corresponds to a personal device associated with a user such as a phone, wearable computing device, tablet, laptop, or the like.

The electronic device displays (3202), on the display, a meeting manifest interface indicating details for an ongoing meeting, the meeting manifest interface includes a meeting invitees region with a first sub-region comprising a first plurality of invitee representations (e.g., first set of invitee labels) associated with participating invitees and a second sub-region comprising a second plurality of invitee representations (e.g., second set of invitee labels) associated with non-participating invitees. In some embodiments, the first plurality of invitee representations is a list of "connected" or participating invitees sorted by the time they joined the meeting. For example, the representation associated with the organizer is located at the top position of the participating list if he/she has joined the meeting; if not, the representation associated with the organizer is located at the top position of the non-participating list. In some embodiments, the second plurality of invitee representations is a list of "unconnected" or non-participating invitees sorted according to the status of their response to the meeting invitation. According to some embodiments, the first and second sub-regions within the meeting manifest provide visibility as to the participation/connectivity of invitees to the organizer/facilitator of the meeting. In turn, this provides a seamless user experience that requires less time and user inputs when facilitating/managing an ongoing meeting, which, additionally, reduces power usage and improves battery life of the device by enabling the user to use the device more quickly and efficiently.

As one example, FIG. 29A shows a meeting manifest interface 2901 (e.g., associated with an ongoing meeting) that includes a first sub-region 2906*a* (e.g., the participating invitees column) with a first plurality of invitee representations 2912*a*, 2912*b*, 2912*c*, 2912*d*, 2912*e*, and 2912*f* (e.g., invitee labels) associated with invitees that are currently participating in the ongoing conference (e.g., connected via a local or remote interface). Continuing with this example, in FIG. 29A, the meeting manifest interface 2901 also includes a second sub-region 2906*b* (e.g., the non-participating invitees column) with a second plurality of invitee representations 2912*g*, 2912*h*, 2912*i*, 2912*j*, and 2912*k* (e.g., invitee labels) associated with invitees that are currently not participating in the ongoing conference (e.g., not connected via the local or remote interface)

In some embodiments, the first sub-region includes (3204) connection indicators proximate to the first plurality of invitee representations associated with participating invitees, where a respective connection indicator among the connection indicators corresponds to a connection type associated with a corresponding participating invitee. In some embodiment, a connection indicator corresponds to an icon or text associated with the connection type such as BLE, WiFi, beacon, NFC, virtual conference, audio call-in, or the like. In some embodiments, the connection indicator changes based on a changed connection type. As one example, if an audio-only user walks into the physical meeting space and his/her device is detected via BLE, WiFi, beacon, NFC, or the like. According to some embodiments, the connection indicators provide visibility to the organizer/facilitator of the meeting as to the connection type of meeting participants. In turn, this provides a seamless user experience that requires less time and user inputs when facilitating/managing an ongoing meeting, which, additionally, reduces power usage and improves battery life of the device by enabling the user to use the device more quickly and efficiently.

In FIG. 29A, for example, each of the first plurality of invitee representations 2912*a*, 2912*b*, 2912*c*, 2912*d*, 2912*e*, and 2912*f* is associated with a connection indicator 2914*a*, 2914*b*, 2914*c*, 2914*d*, 2914*e*, and 2914*f* (e.g., an icon with text and/or an image) indicating the connection type for the associated participating invitee. As one example, the connection indicator 2914*a* (e.g., BLE icon) indicates that a local BLUETOOTH (e.g., BLE) connection between a device associated with Admiral Appleseed (e.g., a personal phone, laptop, tablet, etc.) and the device (or a controller device associated with physical meeting space) is detected. As another example, the connection indicator 2914*e* (e.g., a "Virt Conf" icon) shows that a remote connection between a device associated with Ms. Applecore and a remote virtual conference service application is detected (e.g., a server that hosts the virtual conference).

In some embodiments, the second sub-region includes (3206) invitation response indicators proximate to the second plurality of invitee representations associated with non-participating invitees, where a respective invitation response indicator among the invitation response indicators corresponds to a status of a response to an invitation to the ongoing meeting associated with a corresponding non-participating invitee. In some embodiment, a response status indicator corresponds to an icon or text associated the manner in which an invitee responded to the invitation to the meeting. For example, a non-participating invitee may have responded to the invitation to the ongoing meeting as accepted, tentative, declined, or non-responsive. According to some embodiments, the invitation response indicators provide visibility to the organizer/facilitator of the meeting as to the meeting invitation response status of non-participating invitees. In turn, this provides a seamless user experience that requires less time and user inputs when facilitating/managing an ongoing meeting, which, additionally, reduces power usage and improves battery life of the device by enabling the user to use the device more quickly and efficiently.

In FIG. 29A, for example, each of the second plurality of invitee representations 2912*g*, 2912*h*, 2912*i*, 2912*j*, and 2912*k* is associated with an invitation response indicator 2916*a*, 2916*b*, 2916*c*, 2916*d*, and 2916*e* (e.g., an icon with text and/or an image) indicating the response status of the associated non-participating invitee to the meeting invitation. As one example, the invitation response indicator 2916*a* (e.g., a check-mark icon) shows that Lieutenant Apfel responded to the meeting invitation by confirming that he would attend the meeting. As another example, the invitation response indicator 2916*d* (e.g., a question-mark icon) shows that Mrs. Applefruit responded to the meeting invitation by confirming that she might attend the meeting. As yet another example, the invitation response indicator 2916*e* (e.g., an ex icon) shows that Ms. Doubleapple responded to the meeting invitation by confirming that she would not be attending the meeting.

In some embodiments, the meeting invitees region of the meeting manifest interface includes (3208) an add invitee affordance provided to invite an additional invitee to the ongoing meeting. According to some embodiments, the add invitee affordance enables a user to add an invitee on-the-fly from within the meeting manifest interface. FIG. 29A, for example, shows an add invitee affordance 2918 within the meeting manifest interface 2901 that is provided to send a meeting invite to an additional invitee. For example, the user of the device selects an additional invitee from a list of contacts. In another example, the user of the device enters the name of the additional invitee using a software keyboard. In yet another example, in response to selection of the add invitee affordance 2918, the device displays a directory/contacts interface that enables the user of the device to search for and select the additional invitee. According to some embodiments, the add invitee affordance enables the organizer/facilitator to quickly add additional invitees onthe-fly during the ongoing meeting. In turn, this provides a seamless user experience that requires less time and user inputs when facilitating/managing an ongoing meeting, which, additionally, reduces power usage and improves battery life of the device by enabling the user to use the device more quickly and efficiently.

In some embodiments, the meeting manifest interface includes (3210) one or more of a meeting notes region, a meeting information region, or a meeting controls region. For example, as shown in FIG. 29A, the meeting manifest interface 2901 includes: a chrome region 2902*a*, a first content region 2902*b*, a second content region 2902*c* (e.g., with the meeting title and meeting duration), a third content region 2902*d* (e.g., with the first and second sub-regions), a fourth content region 2902*e* (e.g., with notes, attachments, links, and/or the like), and a control region 2902*f* (e.g., with controls for the meeting space).

In some embodiments, ongoing meeting corresponds to (3212) a virtual conference. For example, in FIGS. 29A-29L, the ongoing meeting is associated with a virtual conference. As shown in FIG. 29A, the first content region 2902*b* includes a start conference affordance 2904, which, when activated (e.g., selected with a contact), causes the device (or the physical meeting space) to connect to a virtual conference (e.g., as shown in FIGS. 29F-29G).

The electronic device detects (3214) a connection corresponding to the ongoing meeting. In some embodiments, the connection corresponds to a remote connection that corresponds to an audio call-in number and/or a virtual conference. For example, each invitee/person is given a unique access code in order to determine their identity. In some embodiments, the connection corresponds to a local connection between an attendee's device and equipment in the physical meeting space (e.g., BLE, WiFi, NFC, beacon, etc.). For example, devices are related to invitees/persons based on login information, contact card, or the like in order to determine identity. In some embodiments, the connection corresponds to facial recognition of an attendee in the physical meeting space based on cameras in the physical meeting space.

As one example, FIGS. 29A-29B show a sequence in which a connection with a non-participating invitee is detected. For example, a local BLUETOOTH (e.g., BLE) connection between a device associated with Lieutenant Apfel (e.g., a personal phone, laptop, tablet, etc.) and the device (or a controller device associated with physical meeting space) is detected.

In some embodiments, the connection corresponds to (3216) one of a local beacon, BLUETOOTH, near field communication (NFC), or wireless local area network (LAN) connection to a device associated with the first invitee among the non-participating invitees. For example, a user comes to a meeting late and his/her phone, laptop, tablet, etc. makes a local connection with or transmission to equipment within a meeting space associated with the ongoing meeting.

In some embodiments, the connection corresponds to (3218) one of a remote audio, video, or virtual conference connection associated with the first invitee among the non-participating invitees. For example, a user connects to a virtual conference or calls-in to an audio bridge associated with the ongoing meeting.

In accordance with a determination that the connection corresponds to a first invitee among the non-participating invitees, the electronic device updates (3220) the meeting manifest interface by ceasing to display a first representation of a first invitee in the second plurality of invitee representations in the second sub-region and displaying the first representation of the first invitee in the first plurality of invitee representations in the first sub-region associated with participating invitees. For example, the representation moves to the bottom of the list comprised of the first plurality of invitee representations. Continuing with the example above in step 3216, FIG. 29B illustrates ceasing to display the invitee representation 2912*g* associated with Lieutenant Apfel within the second sub-region 2906*b* and displaying the invitee representation 2912*g* associated with Lieutenant Apfel within the first sub-region 2906*a* in response to detecting the local connection associated with Lieutenant Apfel. FIG. 29B also illustrates displaying the connection indicator 2914*g* proximate to the invitee representation 2912*g* associated with Lieutenant Apfel indicating that a local BLUETOOTH (e.g., BLE) connection between a device associated with Lieutenant Apfel (e.g., a personal phone, laptop, tablet, etc.) and the device. According to some embodiments, the dynamic updating of the invitee representations within the meeting manifest interface provides a seamless user experience that requires less time and user inputs when facilitating/managing an ongoing meeting, which, additionally, reduces power usage and improves battery life of the device by enabling the user to use the device more quickly and efficiently.

In some embodiments, in accordance with a determination that the connection does not correspond to one of the non-participating invitees, the electronic device maintaining (3222) display the first representation of the first invitee in the second plurality of invitee representations in the second sub-region and forgoes updating the meeting manifest interface. For example, if a participating invitee connects a second device to the WiFi associated with the meeting space, maintain the meeting manifest interface as-is without making any changes. In another example, if non-invitee connects to the WiFi associated with the meeting space, maintain the meeting manifest interface as-is without making any changes. According to some embodiments, this maintains the accuracy of the participating and non-participating invitee columns. In turn, this provides a seamless user experience that requires less time and user inputs when facilitating/managing an ongoing meeting, which, additionally, reduces power usage and improves battery life of the device by enabling the user to use the device more quickly and efficiently.

In some embodiments, the electronic device (3224): detects a first input, via the one or more input devices, that corresponds to dragging a second representation among the second plurality of invitee representations that corresponds to a second invitee from the second sub-region and dropping the second representation in the first sub-region; and, in response to detecting the first input, updates the meeting manifest interface by displaying the second representation among the first plurality of invitee representations associated with participating invitees and ceasing to display the second representation among the second plurality of invitee representations associated with non-participating invitees. In some embodiment, an invitee is manually marked as present by dragging and dropping a representation associated with the invitee into the participating column of the meeting manifest interface. For example, the invitee does not have a device to connect to the meeting space equipment (e.g., BLE, WiFi, NFC, etc.). In another example, the invitee's device is not communicating with the meeting space equipment (e.g., BLE, WiFi, NFC, etc.) due to a malfunction or non-transmission (airplane) mode.

As one example, FIGS. 29C-29D show a sequence in which a second invitee representation is dragged from the second sub-region 2906*b* of the meeting manifest interface 2901 associated with non-participating invitees and dropped into the first sub-region 2906*a* of the meeting manifest interface 2901 associated with participating invitees. FIG. 29C further illustrates detecting a contact 2924 associated with a motion vector 2926 that drags the invitee representation 2912*i* associated with Mr. Crabapple from the second sub-region 2906*b* and drops the invitee representation 2912*i* associated with Mr. Crabapple into the first sub-region 2906*a*. FIG. 29D illustrates ceasing to display the invitee representation 2912*i* associated with Mr. Crabapple within the second sub-region 2906*b* and displaying the invitee representation 2912*i* associated with Mr. Crabapple within the first sub-region 2906*a* in response to detecting the drag-and-drop gesture in FIG. 28C. According to some embodiments, the ability to manually change the participation status of invitees within the meeting manifest interface provides a seamless user experience that requires less time and user inputs when facilitating/managing an ongoing meeting, which, additionally, reduces power usage and improves battery life of the device by enabling the user to use the device more quickly and efficiently.

In some embodiments, an invitation response indicator was displayed (3226) proximate to the second representation while the second representation was displayed among the second plurality of invitee representations; and a connection indicator is displayed proximate to the second representation while the second representation is displayed among the first plurality of invitee representations, the connection indicator indicates that the second invitee is marked as present for the ongoing meeting. (or a controller device associated with the physical meeting space) is detected. Continuing with the example above in step 3224, FIG. 29D also illustrates displaying the connection indicator 2914*h* proximate to the invitee representation 2912*i* associated with Mr. Crabapple indicating that Mr. Crabapple was manually marked as present in response to detecting the drag-and-drop gesture in FIG. 28C.

In some embodiments, the electronic device (3228): detects a second input, via the one or more input devices, that corresponds to dragging a third representation among the first plurality of invitee representations that corresponds to a third invitee from the first sub-region and dropping the third representation in the second sub-region; and, in response to detecting the second input, updates the meeting manifest interface by displaying the third representation among the second plurality of invitee representations associated with non-participating invitees and ceasing to display the third representation among the first plurality of invitee representations associated with participating invitees. In some embodiment, an invitee is manually marked as not present by dragging and dropping a representation associated with the invitee into the non-participating column of the meeting manifest interface.

As one example, FIGS. 29B-29C show a sequence in which a first invitee representation is dragged from the first sub-region 2906*a* of the meeting manifest interface 2901 associated with participating invitees and dropped into the second sub-region 2906*b* of the meeting manifest interface 2901 associated with non-participating invitees. FIG. 29B further illustrates detecting a contact 2920 associated with a motion vector 2922 that drags the invitee representation 2912*d* associated with Captain Applepie from the first sub-region 2906*a* and drops the invitee representation 2912*d* associated with Captain Applepie into the second sub-region 2906*b*. FIG. 29C illustrates ceasing to display the invitee representation 2912*d* associated with Captain Applepie within the first sub-region 2906*a* and displaying the invitee representation 2912*d* associated with Captain Applepie within the second sub-region 2906*b* in response to detecting the drag-and-drop gesture in FIG. 28B. According to some embodiments, the ability to manually change the participation status of invitees within the meeting manifest interface provides a seamless user experience that requires less time and user inputs when facilitating/managing an ongoing meeting, which, additionally, reduces power usage and improves battery life of the device by enabling the user to use the device more quickly and efficiently.

In some embodiments, a connection indicator was displayed (3230) proximate to the third representation while the third representation was displayed among the first plurality of invitee representations; and an invitation response indicator is displayed proximate to the third representation while the third representation is displayed among the second plurality of invitee representations, where the invitation response indicator corresponds to a status of a response to an invitation to the ongoing meeting associated with the third invitee. Continuing with the example above in step 3228, FIG. 29C also illustrates displaying the invitation response indicator 2916*f* proximate to the invitee representation 2912*d* associated with Captain Applepie indicating that Captain Applepie responded to the meeting invitation by confirming that she would attend the meeting in response to detecting the drag-and-drop gesture in FIG. 28B.

In some embodiments, the electronic device (3232): detects a third input, via the one or more input devices, that corresponds to selection of a fourth representation among the second plurality of invitee representations in the second sub-region that corresponds to a fourth invitee; and, in response to detecting the third input, displays, on the display, a reminder interface that includes contact information associated with the fourth invitee (e.g., affordances for texting, emailing, and calling the fourth invitee) and a mark-as present affordance provided to move the fourth representation from the second sub-region to the first sub-region. In some embodiments, the reminder interface (e.g., a pane, panel, window, or the like) also includes an option to send a quick reminder without additional user input (e.g., an automatically generated text message that says "Come to meeting X in room Y with dial in number Z" or the like). According to some embodiments, the ability to send reminders to invitees via various communication means from within the meeting manifest interface provides a seamless user experience that requires less time and user inputs when facilitating/managing an ongoing meeting, which, additionally, reduces power usage and improves battery life of the device by enabling the user to use the device more quickly and efficiently.

As one example, FIGS. 29D-29F show a sequence in which a respective invitee is manually marked as present. FIG. 29D further illustrates detecting a contact 2928 at a location corresponds to the invitee representation 2912*h* associated with Rear Admiral Applewood. FIG. 29E illustrates displaying a reminder interface 2935 (e.g., a pane, window, panel, or the like) overlaid on the meeting manifest interface 2901 in response to selection of the invitee representation 2912*h* in FIG. 29D. As shown in FIG. 29E, the reminder interface 2935 includes affordances 2930*a*, 2930*b*, 2932*a*, 2932*b*, 2934*a*, and 2934*b* associated with various communications means associated with the selected invitee and a mark-as-present affordance 2940 provided to manually mark Rear Admiral Applewood as present (e.g., participating in the ongoing meeting). According to some embodiments, the communication means shown in the reminder interface 2935 are based on the organizer's contact card for the associated invitee.

In some embodiments, the electronic device (3234): detects a fourth input, via the one or more input devices, that corresponds to selection of the mark-as present affordance within the reminder interface; and, in response to detecting the fourth input, updates the meeting manifest interface by displaying the fourth representation among the first plurality of invitee representations associated with participating invitees and ceasing to display the fourth representation among the second plurality of invitee representations associated with non-participating invitees. Continuing with the example, above in step 3232, FIG. 29E also illustrates detecting a contact 2936 at a location corresponding to the mark-as-present affordance 2940. FIG. 29F illustrates ceasing to display the invitee representation 2912*h* associated with Rear Admiral Applewood within the second sub-region 2906*b* and displaying the invitee representation 2912*h* associated with Rear Admiral Applewood within the first sub-region 2906*a* in response to detecting the selection of the mark-as-present affordance 2940 in FIG. 28E. FIG. 29F also illustrates displaying the connection indicator 2914*i* proximate to the invitee representation 2912*h* associated with Rear Admiral Applewood indicating that Rear Admiral Applewood was manually marked as present in response to detecting the selection of the mark-as-present affordance 2940 in FIG. 28E.

In some embodiments, the reminder interface includes (3236) at least one of a current location of the fourth invitee or an estimated time of arrival of the fourth invitee. In some embodiment, the invitee's current location and ETA is based on the location of their most frequently detected device (e.g., phone). As shown in FIG. 29E, for example, the reminder interface 2935 also includes: the current locale 2838*a* of Rear Admiral Applewood (e.g., within building HS01); and the current estimated time of arrival (ETA) 2838*b* for Rear Admiral Applewood (e.g., estimated based on the current locale 2838*a* of Rear Admiral Applewood and the estimated velocity or mode of transport).

It should be understood that the particular order in which the operations in FIGS. 32A-32C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 2000, 2100, 2200, 2300, 3000, 3100, and 3300) are also applicable in an analogous manner to method 3200 described above with respect to FIGS. 32A-32C. For example, the user interface objects, interfaces, indicators, invitees, and contacts described above with reference to method 3200 optionally have one or more of the characteristics of the user interface objects, interfaces, indicators, invitees, and contacts described herein with reference to other methods described herein (e.g., methods 900, 1000, 1100, 2000, 2100, 2200, 2300, 3000, 3100, and 3300). For brevity, these details are not repeated here.

FIGS. 33A-33C illustrate a flow diagram of a method 3300 of screen sharing via a remote virtual conference service application and also via a local interface in accordance with some embodiments. In some embodiments, the method 3300 is performed at a first electronic device (e.g., the portable multifunction device 100 in FIG. 1A, or the device 300 in FIG. 3) with one or more processors, non-transitory memory, a display, and one or more input devices. In some embodiments, the display is a touch-screen display and the input device is on or integrated with the display. In some embodiments, the display is separate from the input device. Some operations in method 3300 are, optionally, combined and/or the order of some operations is, optionally, changed.

As described below, the method 3300 provides an intuitive way to perform a screen sharing operation via both a remote virtual conference service application and also a local interface. The method reduces the cognitive burden on a user when performing the screen sharing operation via both the remote virtual conference service application and also the local interface, thereby creating a more efficient human-machine interface. For battery-operated electronic devices, performing the screen sharing operation via both the remote virtual conference service application and also the local interface faster and more efficiently conserves power and increases the time between battery charges.

For example, the first electronic device corresponds to the device 502-A-1 located outside of a meeting space in FIGS. 5A-5B. In another example, the first electronic device corresponds to the device 504-A-1 located inside of the meeting space in FIGS. 5A-5B. In yet another example, the first electronic device corresponds to a personal device associated with a user such as a phone, wearable computing device, tablet, laptop, or the like.

The electronic device displays (3302), on the display of the first electronic device, a meeting manifest interface indicating details for an ongoing meeting associated with a virtual conference service application and a physical meeting space, the meeting manifest interface includes a screen sharing affordance provided to share content displayed on the display of the first electronic device to one or more other devices connected to the virtual conference service application (e.g., a server that hosts the virtual conference) and to a second electronic device (e.g., a smart TV) associated with the physical meeting space connected to a local interface (e.g., WiFi) different from the virtual conference service application. According to some embodiments, the screen sharing affordance is provided to merge remote virtual conference screen sharing and local smart TV screen sharing. In FIG. 29G, for example, the first content region 2902*b* of the meeting manifest interface 2901 includes plurality of affordances 2915*a*, 2915*b* 2915*c*, and 2915*d*. In this example, the affordance 2915*c* is provided to initiate a screen sharing operation associated with sharing content associated with the organizer of the ongoing meeting (e.g., a local participant within the physical meeting space) via both local and remote interfaces.

In some embodiments, the meeting manifest interface includes (3304) lighting controls provided to adjust one or more illumination devices (e.g., smart lightbulbs, smart light fixtures, and/or the like) within the physical meeting space. For example, the lighting controls include a plurality of lighting modes such as meeting, reading, theater, energy savings, and/or the like. As shown in FIG. 29G, the control region 2902*f* of the meeting manifest interface 2901 includes a lighting controls affordance 2911*a* provided to display a lighting controls interface for adjusting one or more illumination devices within the physical meeting space (e.g., as shown in FIGS. 29H-29I).

As one example, FIGS. 29H-29I show a sequence in which a lighting controls interface is displayed within the meeting manifest interface 2901. FIG. 29H illustrates detecting a contact 2946 at a location corresponding to the lighting controls affordance 2911*a*. FIG. 29I illustrates displaying lighting controls interface 2951 within the controls region 2902*f* in response to selection of the lighting controls affordance 2911*a* in FIG. 29H. In some embodiments, the lighting controls interface 2951 is provided to adjust one or more illumination devices within the physical meeting space. As shown in FIG. 29I, the lighting controls interface 2951 includes a plurality of lighting mode affordances 2947*a*, 2947*b*, 2947*c*, 2947*d*, and 2947*e* associated with preset settings for the one or more illumination devices within the physical meeting space. For example, in FIG. 29I, the lighting interface 2951 shows that the lighting mode affordance 2947*a* associated with a preset "Mtg" mode for the one or more illumination devices within the physical meeting space is currently selected.

The electronic device detects (3306) a first input, via the one or more input devices, that corresponds to selection of the screen sharing affordance displayed by the first electronic device. As one example, FIGS. 29G-29H show a sequence in which the screen of a local meting attendee is shared both locally and remotely. FIG. 29G illustrates detecting a contact 2944 at a location corresponding to the affordance 2915*c*. In FIG. 29G, the content displayed by the first display 524*a*-1 and the remote device 2955 shows "Conference in Progress."

In response to detecting the first input, the first electronic device (3308): causes content displayed by the first electronic device to be included in a virtual display region that is available to the one or more other devices connected to the virtual conference service application; and causes the content displayed by the first electronic device to be displayed by the second electronic device associated with the physical meeting space connected to the local interface. In some embodiments, the content corresponds to an attachment associated with the meeting. In some embodiments, the content corresponds to the meeting manifest interface, which may be subsequently replaced with other content such as a slide-deck, PDF, etc.

Continuing with the example above in step 3306, FIG. 29H illustrates updating the content displayed by the first display 524*a*-1 and the remote device 2955 (e.g., "Admiral Appleseed's Screen") to show content associated with Admiral Appleseed's device (e.g., the personal device of the organizer of the ongoing meeting) in response to selection of the affordance 2915*c* in FIG. 29G. For example, the content displayed by the first display 524*a*-1 (e.g., associated with the second device) is controlled by a local interface (e.g., local smart TV screen sharing), and the content displayed by the remote device 2955 (e.g., one of the one or more other devices) is controlled by the virtual conference service application (e.g., remote virtual conference screen sharing). According to some embodiments, the ability to screen share both locally and remotely via a single affordance provides a more seamless user experience that requires less time and user inputs when performing a screen sharing operation, which, additionally, reduces power usage and improves battery life of the device by enabling the user to use the device more quickly and efficiently.

In some embodiments, causing the content displayed by the first electronic device to be displayed by the second electronic device associated with the physical meeting space connected to the local interface includes (3310) transmitting the content via the local interface to the second electronic device. In some embodiments, the content is transmitted to an auxiliary display via a local WiFi connection or the like so attendees within the physical meeting space are able to see the shared content associated with the first device on the auxiliary display (e.g., the second device). In some embodiments, the content is transmitted to a conferencing server that relays the content to the auxiliary display so attendees within the physical meeting space are able to see the shared content associated with the first device on the auxiliary display (e.g., the second device).

In some embodiments, causing the content displayed by the first electronic device to be included in the virtual display region that is available to the one or more other devices connected to the virtual conference service application includes (3312) transmitting the content to a server that hosts the virtual conference service application. In some embodiments, the content is transmitted to a server that hosts the virtual conference so that attendees connected to the virtual conference are able to see the shared content associated with the first device on their personal devices (e.g., the one or more other devices) that are connected to the virtual conference service application.

In some embodiments, the first electronic device (3314): detects an intervening media feed; and, in response to detecting the intervening media feed: ceases to cause the content displayed by the first electronic device to be included in the virtual display region that is available to the one or more other devices connected to the virtual conference service application and causes the intervening media feed to be included in the virtual display region that is available to the one or more other devices connected to the virtual conference service application; and ceases to cause the content displayed by the first electronic device to be displayed by the second electronic device associated with the physical meeting space connected to the local interface and causes the intervening media feed to be displayed by the second electronic device associated with the physical meeting space connected to the local interface. For example, a local HDMI is detected by the auxiliary display within the physical meeting space. In another example, a user selects an HDMI option from within the meeting manifest interface.

As one example, FIGS. 29K-29L show a sequence in which a local input feed overrides a screen sharing operation. FIG. 29K illustrates detecting a contact 2952 at a location corresponding to the input feed affordance 2907*a*. FIG. 29L illustrates updating the content displayed by the first display 524*a*-1 and the remote device 2955 (e.g., "External Media Input Feed") to show content associated with an external media input feed (e.g., an HDMI input feed connected to a local interface within the physical meeting space) in response to selection of the input feed affordance 2907*a* in FIG. 29K. According to some embodiments, the ability to override a screen sharing operation provides a more seamless user experience that requires less time and user inputs when connecting a local media feed, which, additionally, reduces power usage and improves battery life of the device by enabling the user to use the device more quickly and efficiently.

In some embodiments, the meeting manifest interface includes (3316) a plurality of invitee representations (e.g., invitee labels) that correspond to invitees associated with the ongoing meeting, and the first electronic device: detects a second input, via the one or more input devices, that corresponds to selection of a respective invitee representation among the plurality of invitee representations associated with a respective invitee; and, in response to detecting the second input: ceasing to cause the content displayed by the first electronic device to be included in the virtual display region that is available to the one or more other devices connected to the virtual conference service application and causing content displayed by another device associated with the respective invitee to be included in the virtual display region that is available to the one or more other devices connected to the virtual conference service application; and ceasing to cause the content displayed by the first electronic device to be displayed by the second electronic device associated with the physical meeting space connected to the local interface and causing the content displayed by the other device associated with the respective invitee to be displayed by the second electronic device associated with the physical meeting space connected to the local interface. For example, selection of the respective representation causes screen sharing to pass to the respective invitee. In another example, selection of the respective representation causes an options pane to be displayed, where one of the options is a pass the ball option.

As one example, FIGS. 29J-29K show a sequence in which the screen of a remote participating invitee is shared both locally and remotely. FIG. 29J illustrates detecting a contact 2950 at a location corresponding to the invitee representation 2912*e* associated with Ms. Applecore who is connected to the virtual conference service application (e.g., as indicated by the connection indicator 2914*e* proximate to the invitee representation 2912*e*). FIG. 29K illustrates updating the content displayed by the first display 524*a*-1 and the remote device 2955 (e.g., "Ms. Applecore's Screen") to show content associated with the Ms. Applecore's device in response to selection of the invitee representation 2912*e* associated with Ms. Applecore in FIG. 29J. According to some embodiments, the ability to change control of screen sharing authority provides a more seamless user experience that requires less time and user inputs when screen sharing, which, additionally, reduces power usage and improves battery life of the device by enabling the user to use the device more quickly and efficiently.

In some embodiments, the first electronic device (3318): displays, on the display, a request from a respective invitee associated with the ongoing meeting to share their screen; detecting a second input, via the one or more input devices, that corresponds to approval of the request; and, in response to detecting the second input: ceases to cause the content displayed by the first electronic device to be included in the virtual display region that is available to the one or more other devices connected to the virtual conference service application and causes content displayed by another device associated with the respective invitee to be included in the virtual display region that is available to the one or more other devices connected to the virtual conference service application; and ceases to cause the content displayed by the first electronic device to be displayed by the second electronic device associated with the physical meeting space connected to the local interface and causes the content displayed by the other device associated with the respective invitee to be displayed by the second electronic device associated with the physical meeting space connected to the local interface. In some embodiments, another participating invitee requests that the current screen sharer allow them to share their screen, and the current screen sharer relinquishes control. According to some embodiments, the ability to request screen sharing authority provides a more seamless user experience that requires less time and user inputs when changing which participant's screen is being shared, which, additionally, reduces power usage and improves battery life of the device by enabling the user to use the device more quickly and efficiently.

In some embodiments, in response to detecting the first input, the first electronic device causes (3320) one or more illumination devices (e.g., smart lightbulbs, smart light fixtures, and/or the like) within the physical meeting space to change to a predefined mode. For example, the lighting can be set to several predefined lighting modes such as meeting, reading, theater, energy savings, etc. For example, in FIG. 29I, the lighting interface 2951 shows that the lighting mode affordance 2947*a* associated with a preset "Mtg" mode for the one or more illumination devices within the physical meeting space was selected in response to selection of the start conference affordance 2904 in FIG. 29F. According to some embodiments, the ability to control illumination devices within a meeting space as a result of performing a screen sharing operation provides a more seamless user experience that requires less time and user inputs, which, additionally, reduces power usage and improves battery life of the device by enabling the user to use the device more quickly and efficiently.

It should be understood that the particular order in which the operations in FIGS. 33A-33C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 2000, 2100, 2200, 2300, 3000, 3100, and 3200) are also applicable in an analogous manner to method 3300 described above with respect to FIGS. 33A-33C. For example, the user interface objects, interfaces, displays, and contacts described above with reference to method 3300 optionally have one or more of the characteristics of the user interface objects, interfaces, displays, and contacts described herein with reference to other methods described herein (e.g., methods 900, 1000, 1100, 2000, 2100, 2200, 2300, 3000, 3100, and 3200). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at an electronic device with a display and one or more input devices:

displaying, on the display, a first user interface element provided to create a calendar event, wherein the first user interface element includes a location input element provided to receive user inputs in order to add a location for the calendar event;

detecting, via the one or more input devices, a first input associated with the location input element that includes a string of characters;

in response to detecting the first input, displaying in association with the location input element, on the display, one or more locations for the calendar event, wherein at least one of the one or more locations corresponds to a virtual conference;

detecting, via the one or more input devices, a second input selecting the virtual conference from among the one or more locations for the calendar event; and in response to detecting the second input:

generating call-in information and a link for the virtual conference; and associating the call-in information and the link with the calendar event.

2. The method of claim 1, further comprising:

detecting, via the one or more input devices, a third input that corresponds to a physical meeting space among the one or more locations; and in response to detecting the third input, associating the physical meeting space with the calendar event.

3. The method of claim 1, wherein the call-in information includes a call-in number and an access code.

4. The method of claim 1, wherein generating the call-in information and the link for the virtual conference includes generating unique call-in information and a unique link for the virtual conference.

5. The method of claim 1, wherein generating the call-in information and the link for the virtual conference includes generating the call-in information and the link for the virtual conference based on an organizer of the calendar event.

6. The method of claim 1, wherein generating the call-in information and the link for the virtual conference includes generating the call-in information and the link for the virtual conference based on invitees to the calendar event.

7. The method of claim 1, wherein the first user interface element includes a scheduling input element and the method further comprises:

selecting one or more invitees to be invited to the calendar event; and populating the scheduling input element based on locations of the one or more invitees and an organizer of the calendar event.

8. The method of claim 1, wherein the first user interface element corresponds to a calendar event creation pane overlaid on a window associated with a calendar application, and wherein the location input element corresponds to an editable field within the pane.

9. The method of claim 1, wherein the first user interface element corresponds to a calendar event creation pane overlaid on a window associated with a non-calendar application, and wherein the location input element corresponds to an editable field within the pane.

10. The method of claim 1, further comprising:

displaying, on the display, a calendar interface that includes the calendar event;

detecting, via the one or more input devices, a third input that corresponds to selection of the calendar event; and in response to detecting the third input, displaying, on the display, a second user interface element provided to show details of the calendar event.

11. The method of claim 10, wherein the second user interface element includes an event title, an indication of the virtual conference, the link for the virtual conference, the call-in information for the virtual conference, and a date and time.

12. The method of claim 11, wherein the second user interface element also includes a device access code associated with a device in a physical meeting space in accordance with a determination that the calendar event is associated with the physical meeting space in addition to the virtual conference.

13. An electronic device comprising:

a display;

one or more input devices;

one or more processors;

non-transitory memory; and one or more programs, wherein the one or more programs are stored in the memory and configured to be executed by the one or more processors, the one or more programs including instructions for:

displaying, on the display, a first user interface element provided to create a calendar event, wherein the first user interface element includes a location input element provided to receive user inputs in order to add a location for the calendar event;

detecting, via the one or more input devices, a first input associated with the location input element that includes a string of characters;

in response to detecting the first input, displaying in association with the location input element, on the display, one or more locations for the calendar event, wherein at least one of the one or more locations corresponds to a virtual conference;

detecting, via the one or more input devices, a second input selecting the virtual conference from among the one or more locations for the calendar event; and in response to detecting the second input:

generating call-in information and a link for the virtual conference; and associating the call-in information and the link with the calendar event.

14. The electronic device of claim 13, wherein the one or more programs include instructions for:

detecting, via the one or more input devices, a third input that corresponds to a physical meeting space among the one or more locations; and in response to detecting the third input, associating the physical meeting space with the calendar event.

15. The electronic device of claim 13, wherein the call-in information includes a call-in number and an access code.

16. The electronic device of claim 13, wherein generating the call-in information and the link for the virtual conference includes generating unique call-in information and a unique link for the virtual conference.

17. The electronic device of claim 13, wherein generating the call-in information and the link for the virtual conference includes generating the call-in information and the link for the virtual conference based on an organizer of the calendar event.

18. The electronic device of claim 13, wherein generating the call-in information and the link for the virtual conference includes generating the call-in information and the link for the virtual conference based on invitees to the calendar event.

19. The electronic device of claim 13, wherein the first user interface element includes a scheduling input element and the one or more programs include instructions for:

selecting one or more invitees to be invited to the calendar event; and populating the scheduling input element based on locations of the one or more invitees and an organizer of the calendar event.

20. A non-transitory computer readable storage medium storing one or more programs, the one or more programs comprising instructions, which, when executed by an electronic device with a display, and one or more input devices, cause the electronic device to:

display, on the display, a first user interface element provided to create a calendar event, wherein the first user interface element includes a location input element provided to receive user inputs in order to add a location for the calendar event;

detect, via the one or more input devices, a first input associated with the location input element that includes a string of characters;

in response to detecting the first input, display in association with the location input element, on the display, one or more locations for the calendar event, wherein at least one of the one or more locations corresponds to a virtual conference;

detect, via the one or more input devices, a second input selecting the virtual conference from among the one or more locations for the calendar event; and in response to detecting the second input:

generate call-in information and a link for the virtual conference; and associate the call-in information and the link with the calendar event.

21. The non-transitory computer readable storage medium of claim 20, wherein the instructions cause the electronic device to:

detecting, via the one or more input devices, a third input that corresponds to a physical meeting space among the one or more locations; and in response to detecting the third input, associating the physical meeting space with the calendar event.

22. The non-transitory computer readable storage medium of claim 20, wherein the call-in information includes a call-in number and an access code.

23. The non-transitory computer readable storage medium of claim 20, wherein generating the call-in information and the link for the virtual conference includes generating unique call-in information and a unique link for the virtual conference.

24. The non-transitory computer readable storage medium of claim 20, wherein generating the call-in information and the link for the virtual conference includes generating the call-in information and the link for the virtual conference based on an organizer of the calendar event.

25. The non-transitory computer readable storage medium of claim 20, wherein generating the call-in information and the link for the virtual conference includes generating the call-in information and the link for the virtual conference based on invitees to the calendar event.

26. The non-transitory computer readable storage medium of claim 20, wherein the first user interface element includes a scheduling input element and the instructions cause the electronic device to:

selecting one or more invitees to be invited to the calendar event; and populating the scheduling input element based on locations of the one or more invitees and an organizer of the calendar event.

* * * * *